US008862507B2

(12) United States Patent
Sandhu et al.

(10) Patent No.: US 8,862,507 B2
(45) Date of Patent: *Oct. 14, 2014

(54) SYSTEM AND METHOD FOR CONDUCTING WEB-BASED FINANCIAL TRANSACTIONS IN CAPITAL MARKETS

(75) Inventors: Harpal S. Sandhu, Palo Alto, CA (US); Viral V. Tolat, Menlo Park, CA (US); Stephen Rees, Bristol (GB)

(73) Assignee: Integral Development Corporation, Palo Alto, CA (US)

( * ) Notice: Subject to any disclaimer, the term of this patent is extended or adjusted under 35 U.S.C. 154(b) by 1883 days.

This patent is subject to a terminal disclaimer.

(21) Appl. No.: 10/105,084

(22) Filed: Mar. 22, 2002

(65) Prior Publication Data

US 2003/0033212 A1    Feb. 13, 2003

Related U.S. Application Data

(63) Continuation-in-part of application No. 09/703,198, filed on Oct. 31, 2000.

(60) Provisional application No. 60/162,873, filed on Nov. 1, 1999, provisional application No. 60/139,113, filed on Jun. 14, 1999.

(51) Int. Cl.
*G06Q 40/00* (2012.01)
*G06Q 30/06* (2012.01)
*G06Q 40/06* (2012.01)

(52) U.S. Cl.
CPC .................. *G06Q 40/06* (2013.01); *G06Q 30/0601* (2013.01)
USPC ............. 705/35; 705/4; 705/26.41; 705/36 R; 705/37; 705/39; 705/44; 705/54; 705/410; 709/223

(58) Field of Classification Search
CPC ........ G06Q 40/00; G06Q 99/00; G06F 17/60; G06F 19/00; G06F 17/00; G06F 15/30; G06F 13/00; G06F 15/00; G07B 17/00

USPC ............. 705/4, 26.41, 36 R, 37, 39, 44, 410; 709/223
See application file for complete search history.

(56) References Cited

U.S. PATENT DOCUMENTS 4,677,552 A * 6/1987 Sibley, Jr. ........................ 705/37
5,126,936 A * 6/1992 Champion et al. .......... 705/36 R (Continued)

FOREIGN PATENT DOCUMENTS

AU          778101       3/2005 .............. G06F 17/60
AU          780518       7/2005 .............. G06F 17/60

(Continued)

OTHER PUBLICATIONS

International Search Report for Application No. PCT/US02/09108, dated Dec. 3, 2003 (mailing date).

(Continued)

*Primary Examiner* — James Trammell
*Assistant Examiner* — Sanjeev Malhotra
(74) *Attorney, Agent, or Firm* — Patterson & Sheridan, LLP

(57) ABSTRACT

The present invention provides a system and method that enables users, such as institutional investors and financial institutions, to interactively engage in capital market transactions, including the trading of Over-the-Counter financial products, via the Internet (including the World Wide Web). The system includes a variety of servers, applications, and interfaces that enable users to interactively communicate and trade financial instruments among one another. Interactive communications supported by the system include: requesting price quotes, monitoring and reviewing quote requests, issuing price quotes, monitoring and reviewing price quotes, negotiation between users, acceptance of price quotes, reporting, portfolio management, analysis of financial information and market data, and communications among users via an automated processor. Such automated communications enable connectivity with users' internal, back-end systems to execute automated, straight-through processing, including transaction pricing, payment scheduling and journaling, derivatives trading, trade confirmation, and trade settlement.

18 Claims, 177 Drawing Sheets

(56) References Cited

U.S. PATENT DOCUMENTS

| | | | | |
|---|---|---|---|---|
| 5,270,922 A * | 12/1993 | Higgins | | 705/37 |
| 5,497,317 A | 3/1996 | Hawkins et al. | | 705/37 |
| 5,508,913 A * | 4/1996 | Yamamoto et al. | | 705/37 |
| 5,630,127 A | 5/1997 | Moore et al. | | 707/103 R |
| 5,710,889 A | 1/1998 | Clark et al. | | 235/379 |
| 5,742,932 A * | 4/1998 | Levitsky | | 705/410 |
| 5,774,878 A * | 6/1998 | Marshall | | 705/36 R |
| 5,787,402 A * | 7/1998 | Potter et al. | | 705/37 |
| 5,799,151 A | 8/1998 | Hoffer | | 709/204 |
| 5,884,274 A * | 3/1999 | Walker et al. | | 705/4 |
| 5,905,974 A | 5/1999 | Fraser et al. | | |
| 5,913,202 A | 6/1999 | Motoyama | | 705/36 R |
| 5,946,667 A * | 8/1999 | Tull et al. | | 705/36 R |
| 5,950,176 A * | 9/1999 | Keiser et al. | | 705/36 R |
| 5,963,923 A * | 10/1999 | Garber | | 705/37 |
| 5,973,695 A | 10/1999 | Walsh et al. | | 715/854 |
| 6,012,046 A | 1/2000 | Lupien et al. | | |
| 6,012,098 A | 1/2000 | Bayeh et al. | | 709/246 |
| 6,029,146 A | 2/2000 | Hawkins et al. | | 705/35 |
| 6,049,783 A | 4/2000 | Segal et al. | | 705/37 |
| 6,085,203 A | 7/2000 | Ahlers et al. | | 715/523 |
| 6,092,056 A * | 7/2000 | Tull et al. | | 705/36 R |
| 6,105,012 A * | 8/2000 | Chang et al. | | 705/64 |
| 6,112,189 A | 8/2000 | Rickard et al. | | 705/36 R |
| 6,125,391 A * | 9/2000 | Meltzer et al. | | 709/223 |
| 6,144,990 A | 11/2000 | Brandt et al. | | 709/203 |
| 6,167,448 A | 12/2000 | Hemphill et al. | | 709/224 |
| 6,182,029 B1 | 1/2001 | Friedman | | 704/9 |
| 6,195,647 B1 | 2/2001 | Martyn et al. | | 705/36 R |
| 6,205,433 B1 | 3/2001 | Boesch et al. | | 705/26 |
| 6,226,675 B1 * | 5/2001 | Meltzer et al. | | 709/223 |
| 6,247,000 B1 * | 6/2001 | Hawkins et al. | | 705/37 |
| 6,278,982 B1 * | 8/2001 | Korhammer et al. | | 705/36 R |
| 6,317,727 B1 * | 11/2001 | May | | 705/36 R |
| 6,347,307 B1 * | 2/2002 | Sandhu et al. | | 705/36 R |
| 6,393,411 B1 * | 5/2002 | Bishop et al. | | 705/44 |
| 6,415,270 B1 | 7/2002 | Rackson et al. | | 705/36 R |
| 6,542,912 B2 * | 4/2003 | Meltzer et al. | | 705/39 |
| 6,850,907 B2 | 2/2005 | Lutnick et al. | | 705/37 |
| 6,892,184 B1 * | 5/2005 | Komem et al. | | 705/26.41 |
| 7,206,768 B1 * | 4/2007 | deGroeve et al. | | 705/54 |
| 7,389,915 B1 * | 6/2008 | Dyor | | 235/380 |
| 2003/0093360 A1 * | 5/2003 | May | | 705/37 |

FOREIGN PATENT DOCUMENTS

| | | | | |
|---|---|---|---|---|
| JP | 10222581 | 8/1998 | | G06F 17/60 |
| WO | WO 02/52369 | 7/2002 | | G06F 17/06 |

OTHER PUBLICATIONS

International Preliminary Examination Report for Application No. PCT/US02/09106, dated Jun. 14, 2004 (mailing date).

FinXML.org web page located at http://www.finxml.com/default.asp, Last visited on Jun. 27, 2001, 1 p.

International Search Report for Application No. PCT/US00/30076, dated Apr. 20, 2001 (mailing date).

International Search Report for Application No. PCT/US00/16526, dated Nov. 27, 2000 (mailing date).

Java Servlet Technology (Product Description), Sun Microsystems Web Page, http://java.sun.com/products/servlet, printed Oct. 2, 2000.

JavaScript (Functional Description), Netscape Web page, http://home.netscape.com/eng/mozilla/3.0/handbook/javascript/getstart.htm, printed Oct. 2, 2000.

"At FTC Workshop Harpal Sandhu Says 'Neutrality' is Key to Competition in B2B Electronic Markets," Business Wire, Jul. 2000.

"Risk Portals Make Their Debut," Wall Street & Technology Online (Jun. 2, 2000), <www.wstonline.com/story/WST20000602S0015>.

Adriana Senior, "Web Sites Planned for Trade in Credit Derivatives, Forex," American Banker Online (Nov. 9, 1999), <www.integral.com/news_and_events/itn_991109.asp>.

Gus Hahn, "Derivatives Standards," Wall Street & Technology Online (Oct. 1, 1999), <www.westonline.com/story/WST20000609S0001>.

Bernhard Warner, "Big Brokerage Firms Inch Online," The Standard (May 7, 1999), <www.thestandard.com/article/display/0,1151,4519,00.html>.

Koch, Timothy W., "Banking and Finance Technology," Fourth Edition, Washington, D.C.: American Bankers Association, 1999.

Press Release, "CFOWeb.com Brings the Power of the Internet to Capital Markets," Sep. 1999.

Fields, Duane K., "Java Servlets for JavaScripters," Netscape Communications Corporation, pp. 1-10, Oct. 1998.

Perry Colley McKinney, "Internet Foreign Exchange Trading Draws Smaller Investors," The Detroit News (Sep. 26, 1998), <http://detnews.com/1998/technology/9809/26/09260095.html>.

John Greenwald, "A Nation of Stock Keepers," Time, vol. 151, No. 18 (May 11, 1998), <www.time.com/time/magazine/1998/dom/980511/business_.a_nation_of_st6. htm>.

"Currency Management Corporation: CMC Hits $20 Billion Traded Over Internet in Year," M2 Presswire, pp. 1-2, Feb. 16, 1998.

Goldfarb, Charles, et al., "XML Handbook," Prentice-Hall, Inc., pp. 89, 316-317, 527-529, 1998.

Press Release, Open Financial Exchange, "Intuit, Microsoft, and CheckFree Create Open Financial Exchange" [online], Jan. 16, 1997, Retrieved from the Internet: http://www.ofx.net/ofx/pressget.asp?id=5.

Higgins, Kieran, "Internet FX Trading Goes On-Line," Corporate Finance, pp. 1-2, Sep. 16, 1996.

Massimb, et al., "Electronic Trading, Market Structure, and Liquidity," Financial Analysts Journal, vol. 50, No. 1, pp. 39-50 (Jan.-Feb. 1994).

"Pioneering Users Moving to Faster Methods of EDI," Network World, 1 p., May 6, 1991.

International Search Report and the Written Opinion for Application No. PCT/USO4/25273, dated Apr. 6, 2006 (mailing date).

European Search Report for Application No. EP 00 97 8322, dated Apr. 28, 2008.

Glushko, Robert J., et al., "An XML Framework for Agent-Based E-Commerce," *Communications of the ACM*, vol. 42, No. 3, pp. 106-114, Mar. 1999.

Bond Markets Go Electronic, Jun. 1, 1988.

Examination Report mailed Aug. 29, 2009 for Great Britain Application No. 701757.7.

* cited by examiner

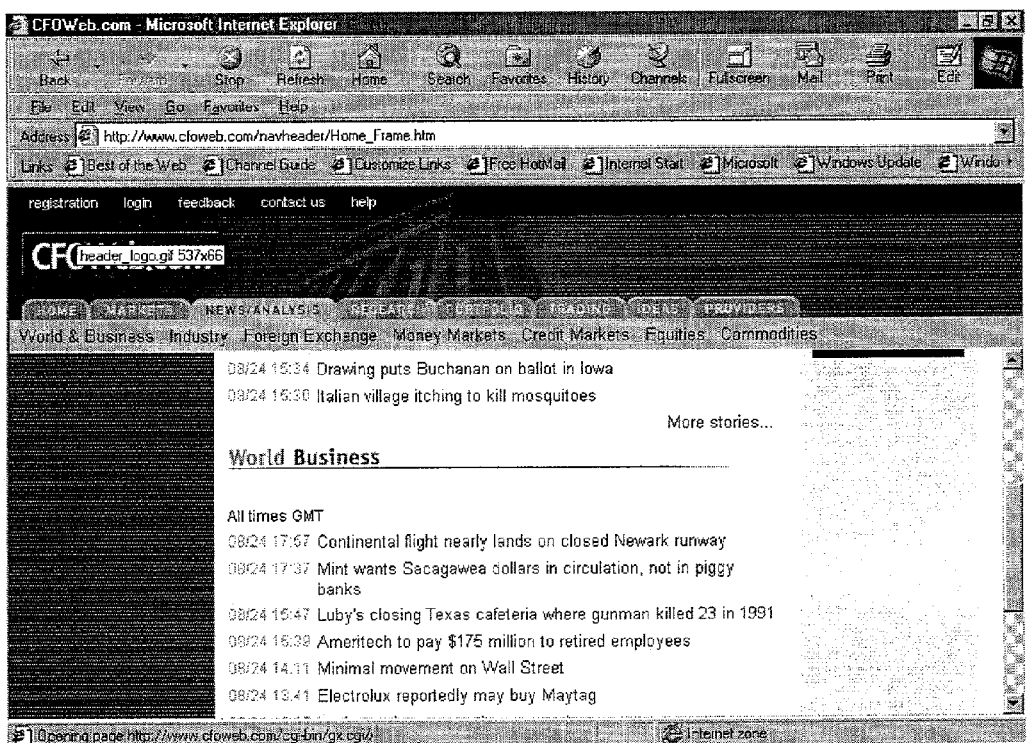
FIG. 21

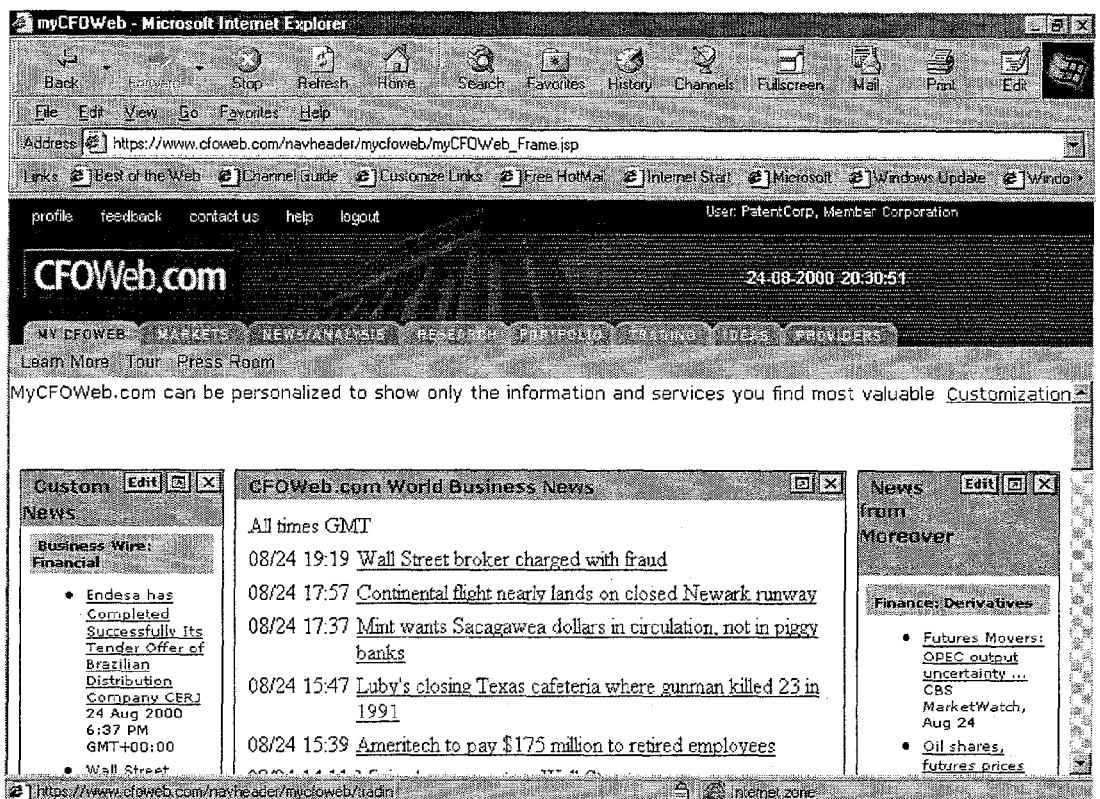
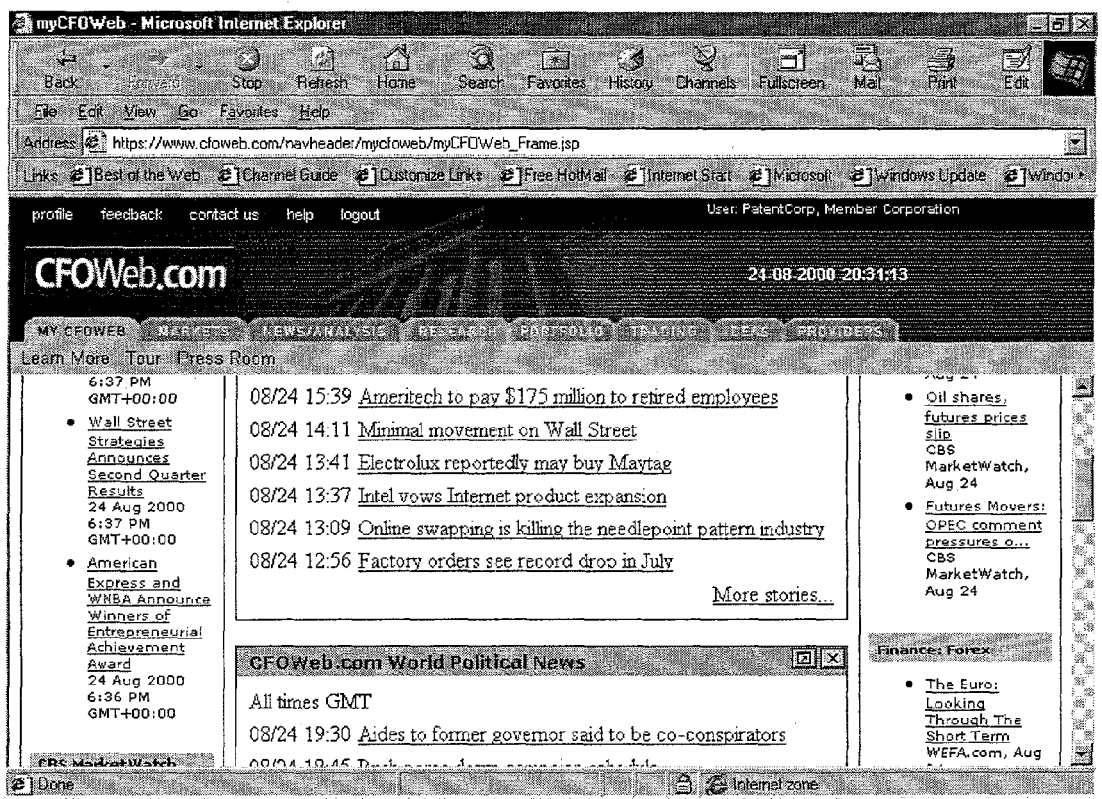
FIG. 25

|  | GBP | | EUR | | JPY | | CHF | | CAD | | AUD | | NZD | |
|---|---|---|---|---|---|---|---|---|---|---|---|---|---|---|
| SPOT | 1.4809 | 1.4815 | 0.9026 | 0.9029 | 106.98 | 107.04 | 1.7115 | 1.7122 | 1.4866 | 1.4872 | 0.5725 | 0.5730 | 0.4339 | 0.4344 |
| O/N |  |  | 0.48 | 0.50 |  |  |  |  |  |  |  |  |  |  |
| T/N | 0.28 | 0.31 | 0.46 | 0.48 | -1.85 | -1.83 | -4.84 | -4.78 | -0.33 | -0.30 | 0.21 | 0.23 | 0.02 | 0.00 |
| S/N | 0.26 | 0.31 | 0.46 | 0.48 | -1.85 | -1.83 | -1.59 | -1.57 | -0.33 | -0.30 | 0.22 | 0.23 | 0.02 | 0.00 |
| 1WK | 2.05 | 2.15 | 3.30 | 3.35 | -13.00 | -12.80 | -12.50 | -12.30 | -2.40 | -2.20 | 0.45 | 0.50 | 0.00 | 0.10 |
| 1MO | 7.80 | 8.10 | 14.30 | 14.40 | -57.25 | -57.15 | -48.00 | -47.50 | -10.40 | -9.90 | 1.25 | 1.45 | 0.00 | 0.70 |
| 2MO | 14.40 | 14.70 | 27.80 | 28.10 | -114.35 | -114.00 | -95.00 | -94.00 | -20.70 | -19.70 | 1.70 | 2.50 | 0.45 | 0.75 |
| 3MO | 21.10 | 21.50 | 40.30 | 40.60 | -169.00 | -168.50 | -135.00 | -134.00 | -32.00 | -31.00 | 2.25 | 2.35 | 0.50 | 0.90 |
| 4MO | 27.00 | 27.50 | 52.00 | 52.50 | -224.00 | -223.00 | -175.00 | -173.00 | N/A | N/A | 2.30 | 2.80 | 0.40 | 0.90 |
| 5MO | 36.00 | 36.75 | 64.60 | 65.10 | -281.50 | -280.50 | -217.00 | -215.00 | N/A | N/A | 3.80 | 4.30 | 0.50 | 1.00 |
| 6MO | 42.25 | 43.25 | 75.30 | 75.80 | -336.00 | -335.00 | -254.50 | -252.50 | -68.00 | -65.30 | 4.10 | 5.20 | -0.50 | 0.80 |
| 9MO | 61.00 | 63.00 | 107.50 | 109.00 | -498.00 | -496.50 | -370.00 | -366.00 | -98.00 | -94.00 | 5.20 | 6.20 | -2.50 | -0.50 |
| 12MO | 78.00 | 80.00 | 139.50 | 141.00 | -656.00 | -654.00 | -480.00 | -475.00 | -131.00 | -125.00 | 6.30 | 7.80 | -5.00 | -3.00 |

FIG. 28A

FIG. 29

FIG. 30

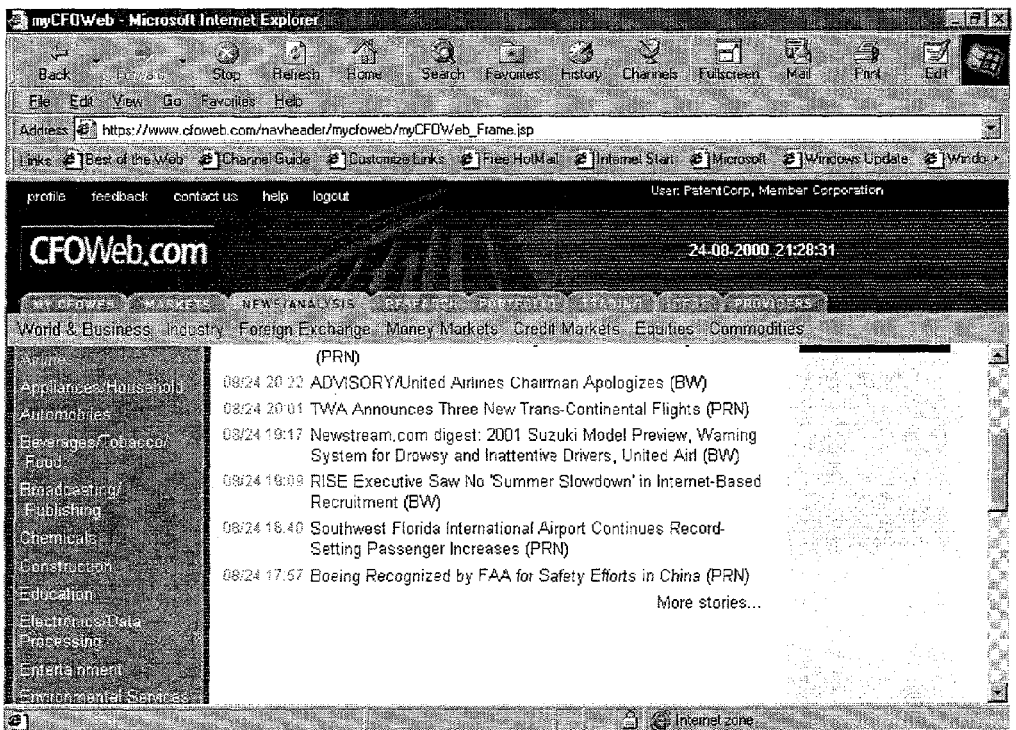
FIG. 33

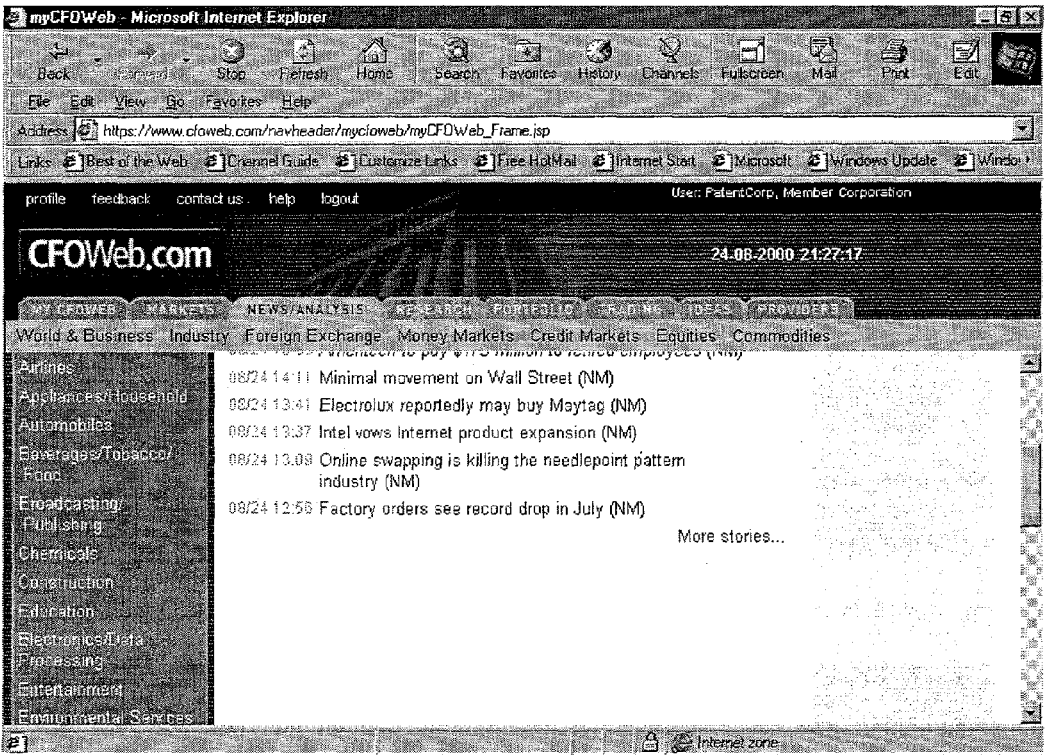
FIG. 34

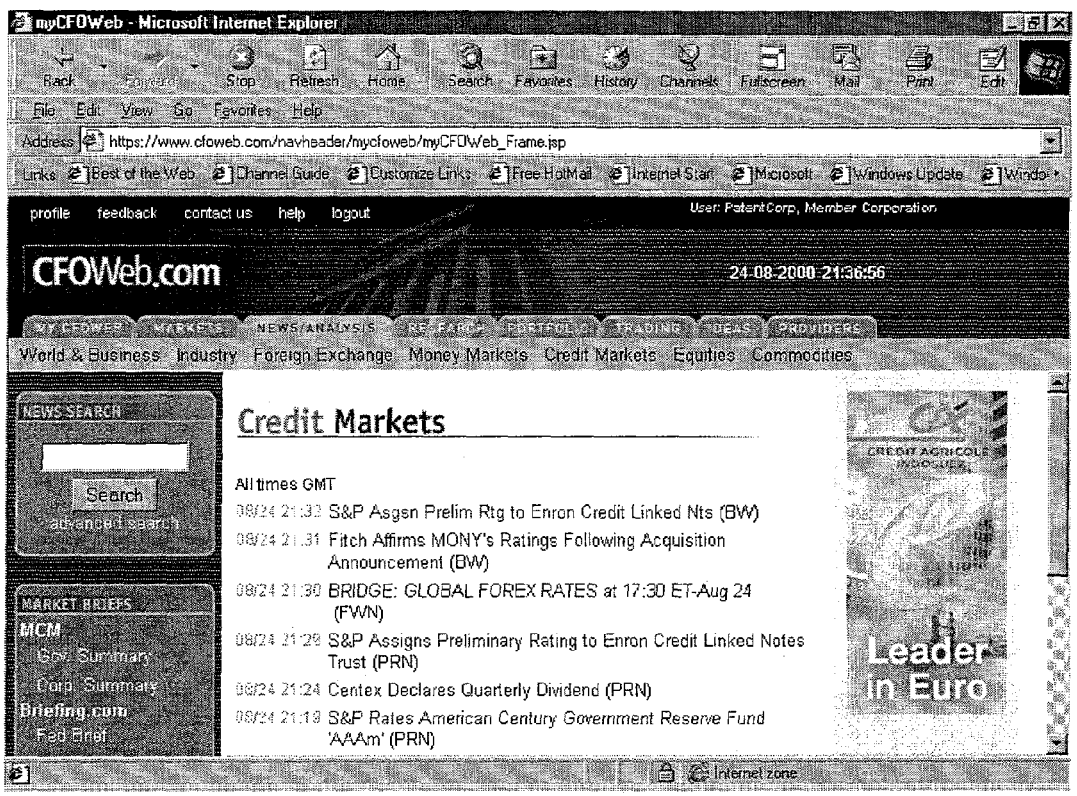
FIG. 39

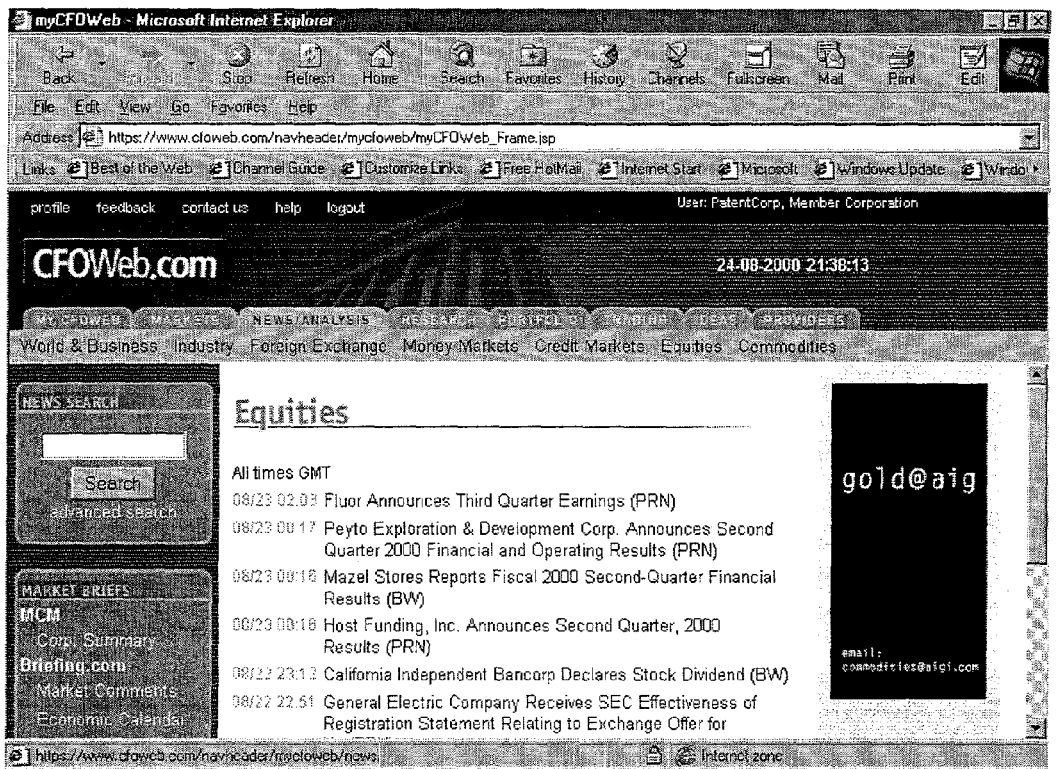
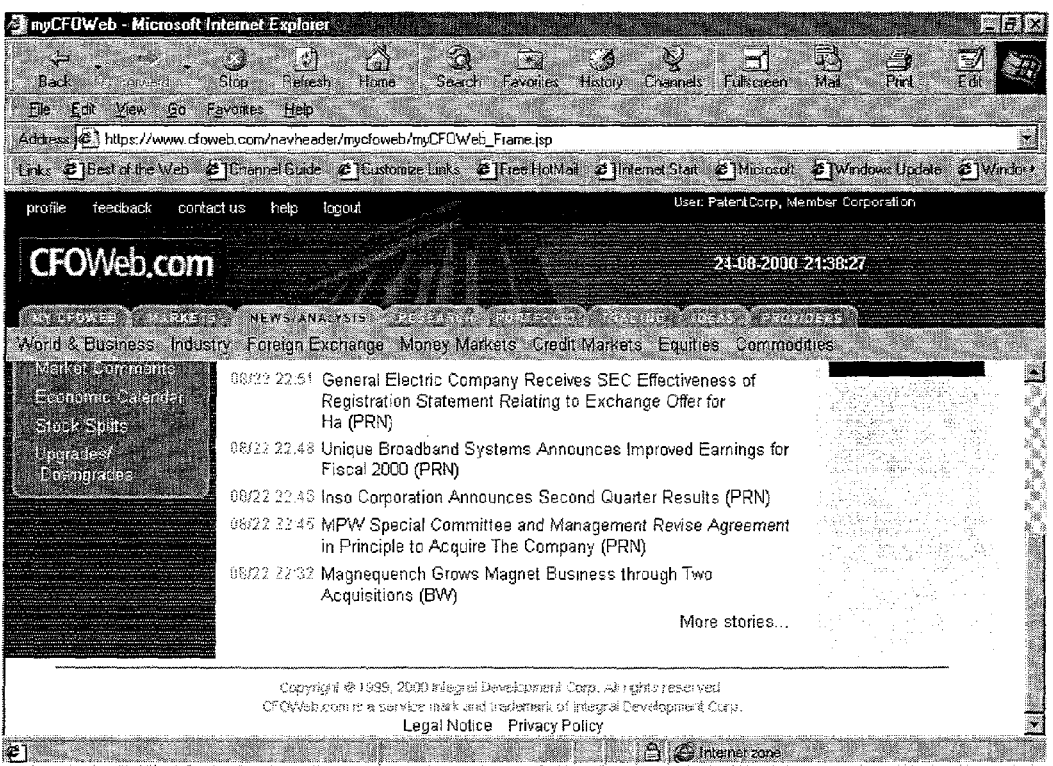
FIG. 40

FIG. 41

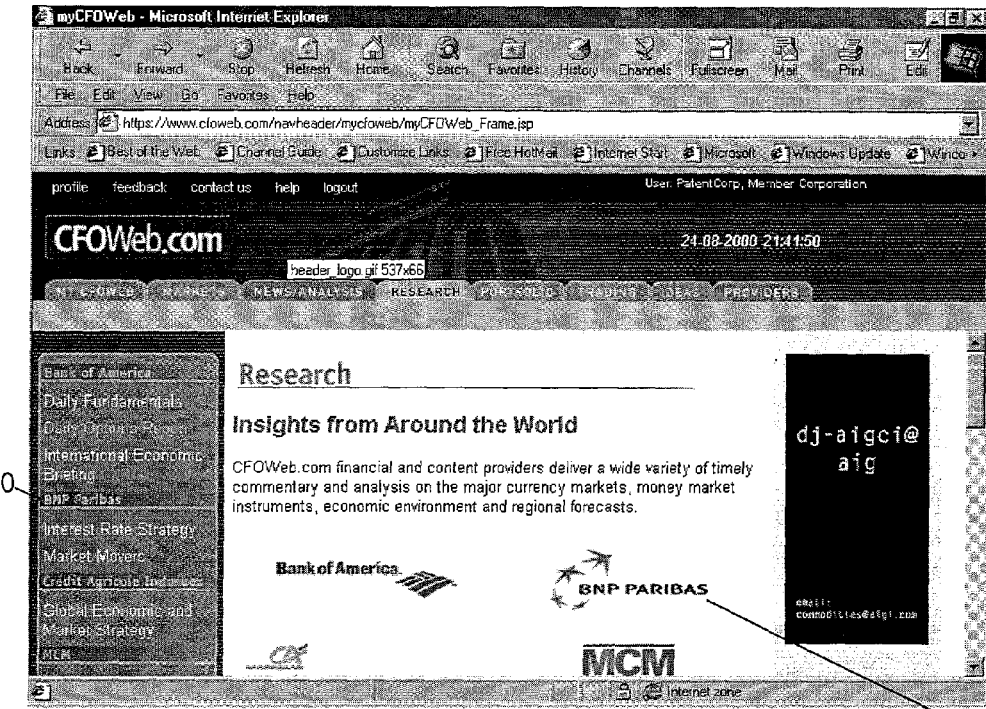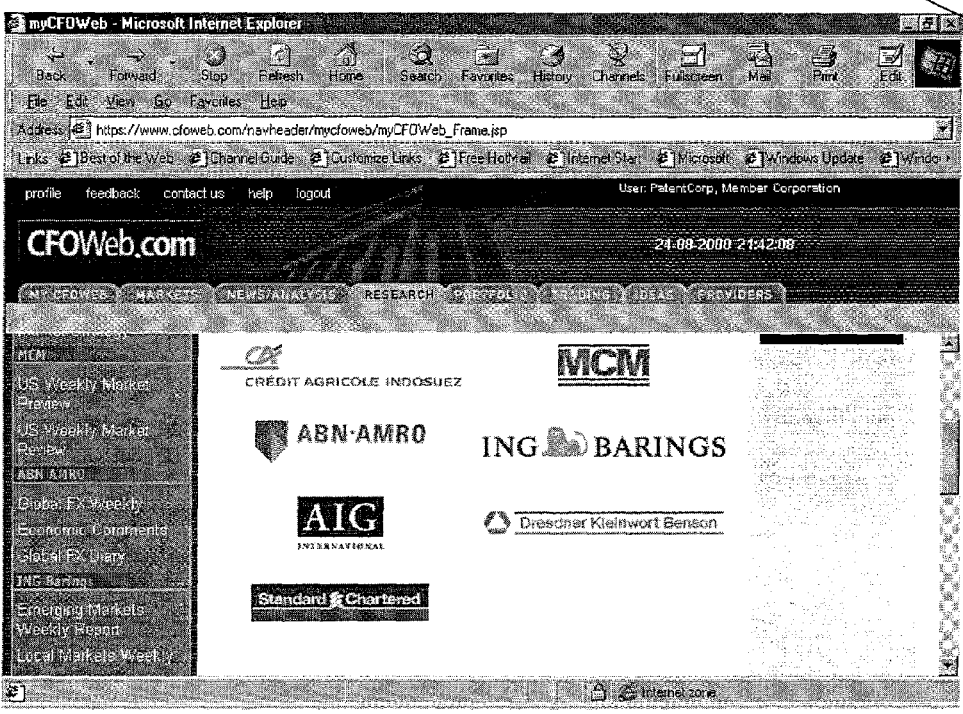
FIG. 42

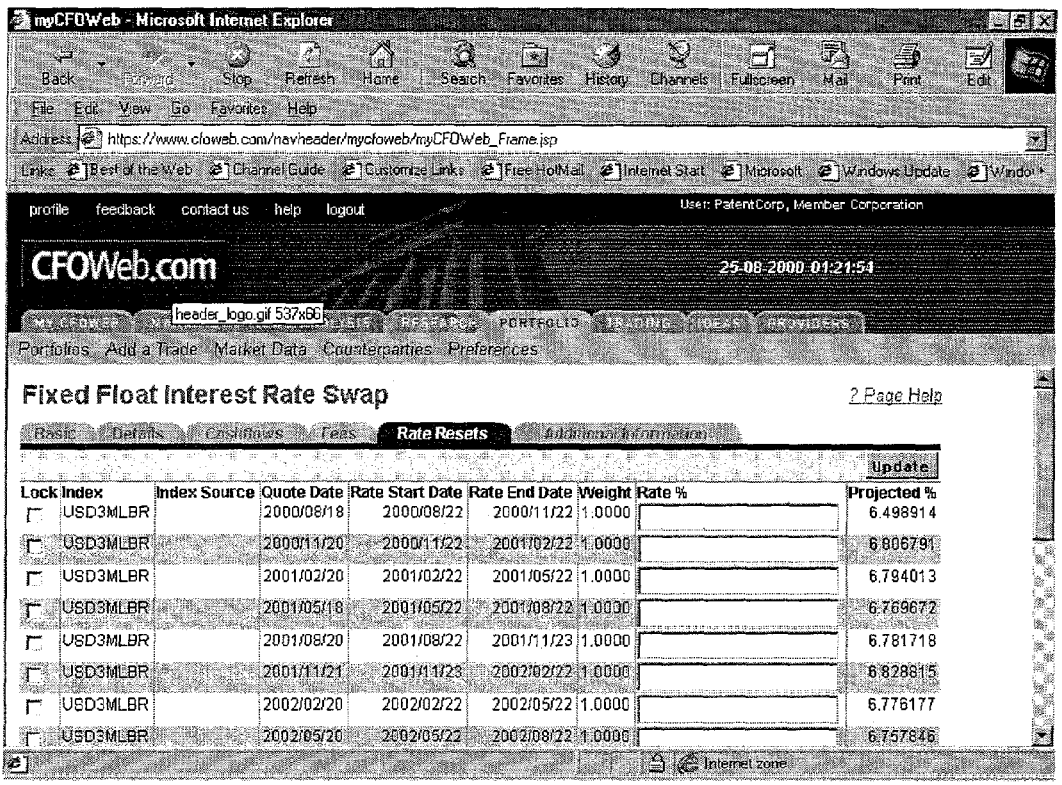
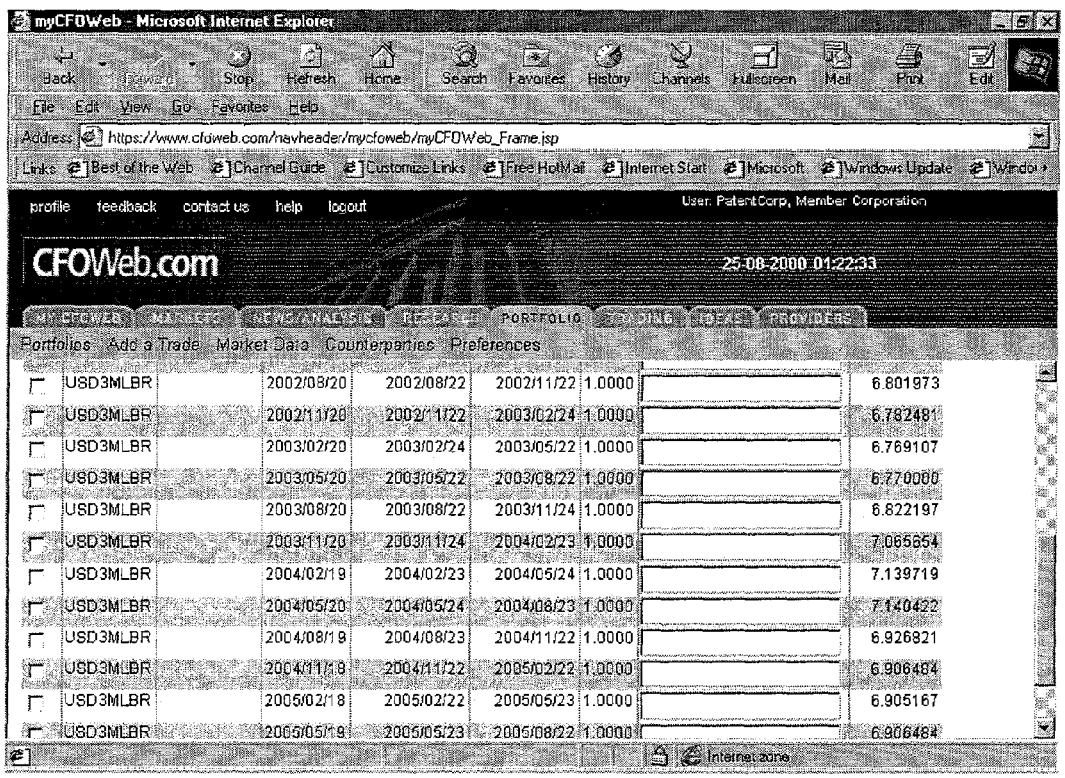
FIG. 53

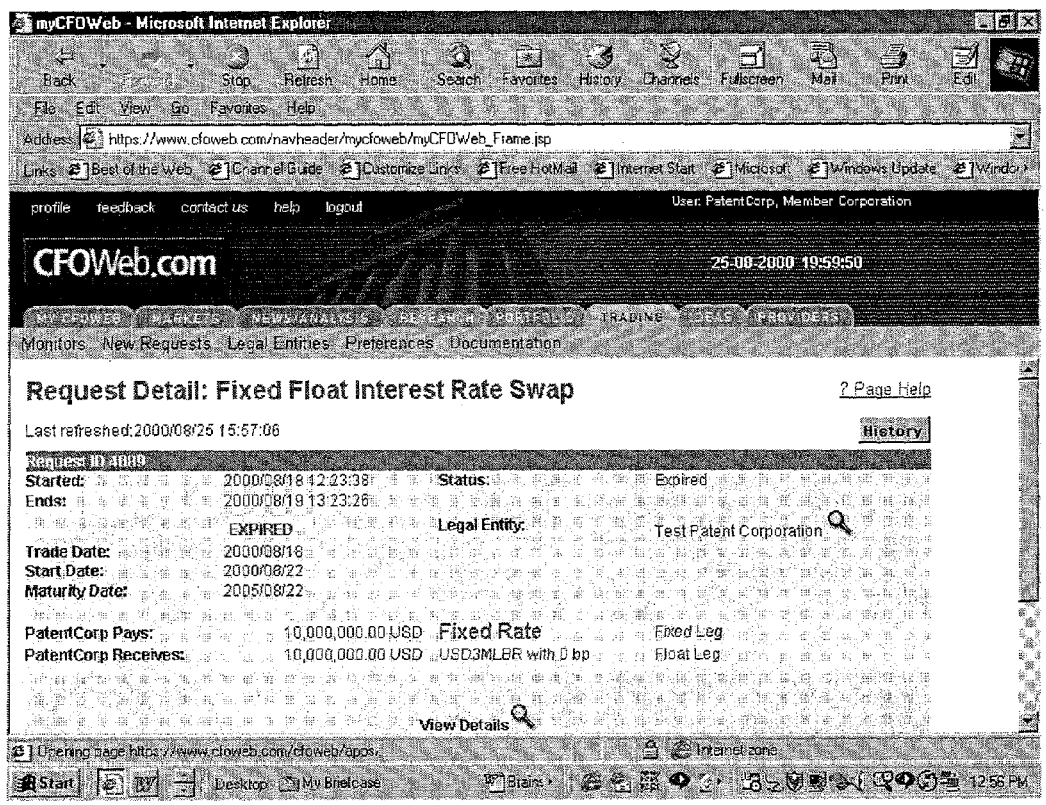
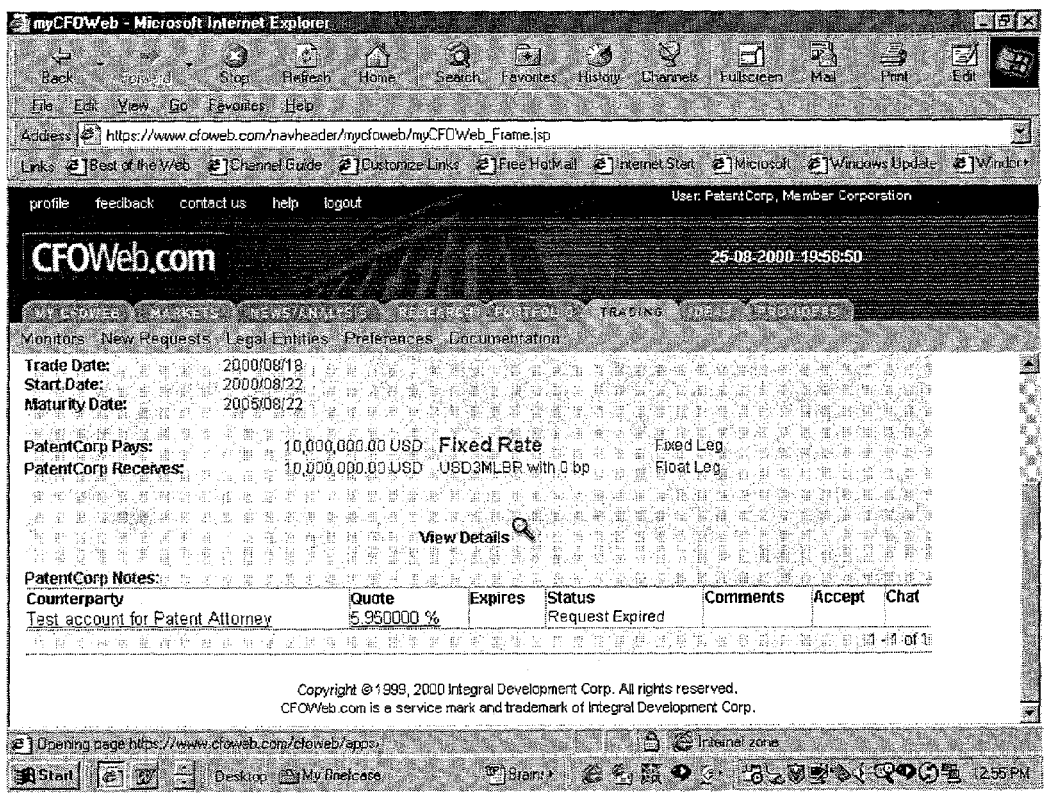
FIG. 69

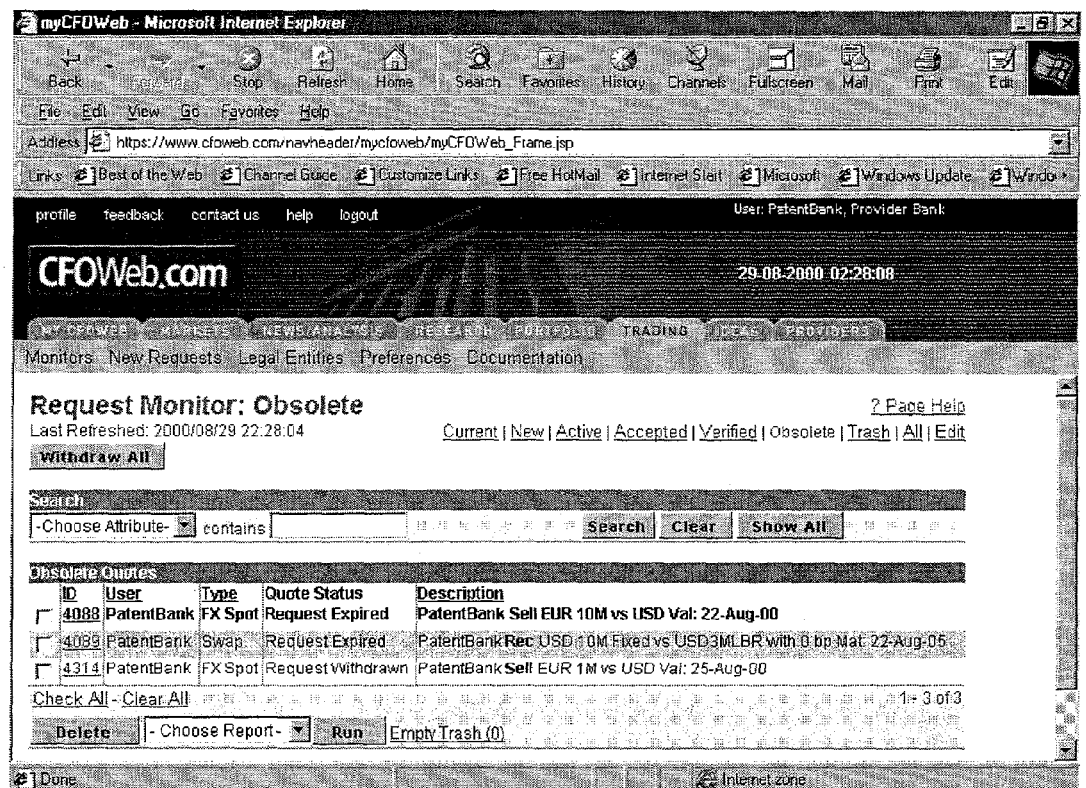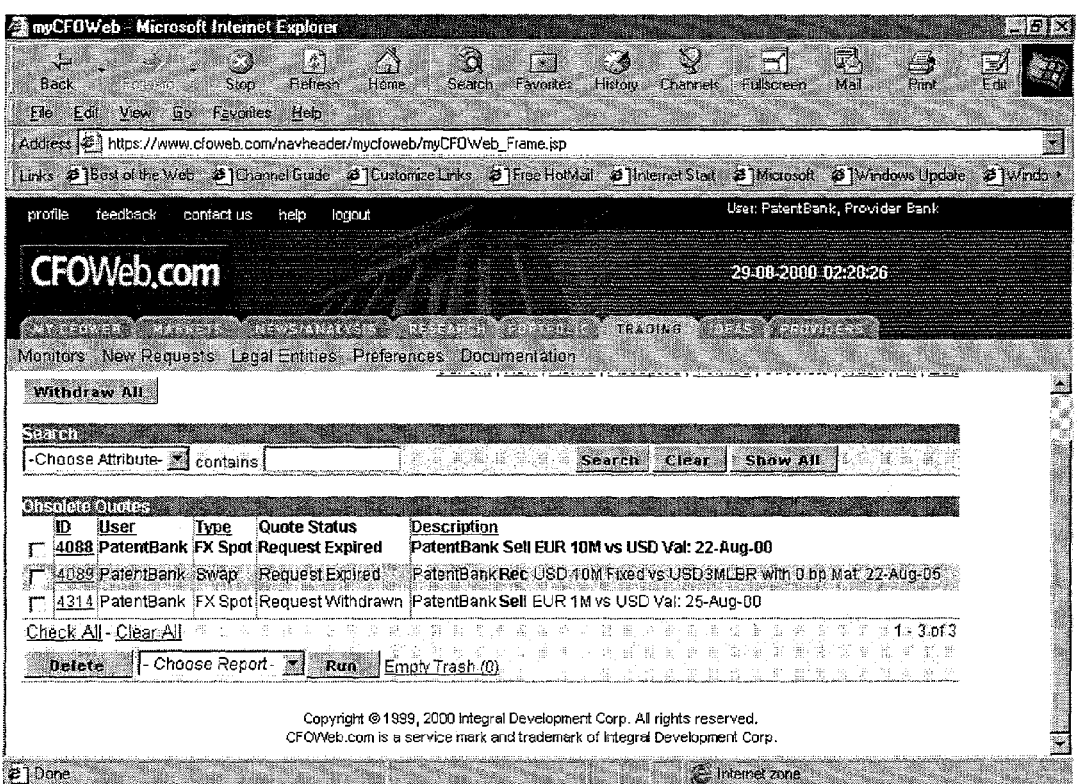
FIG. 91

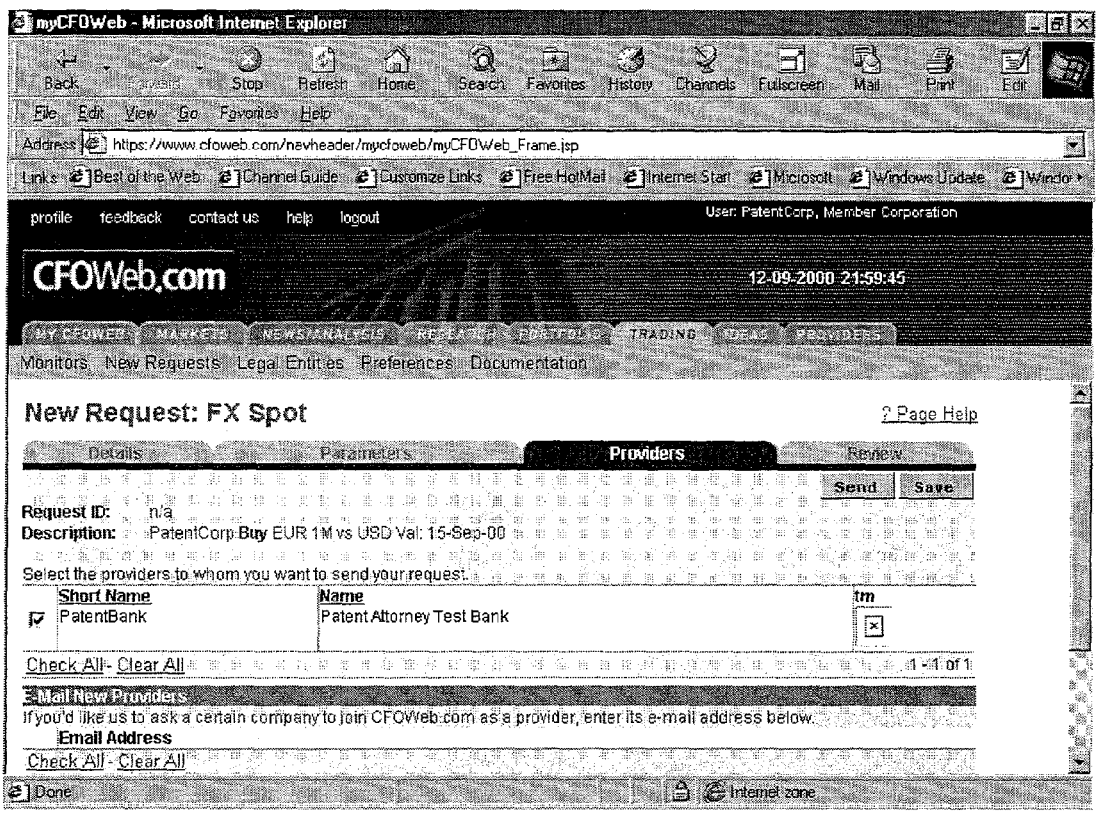
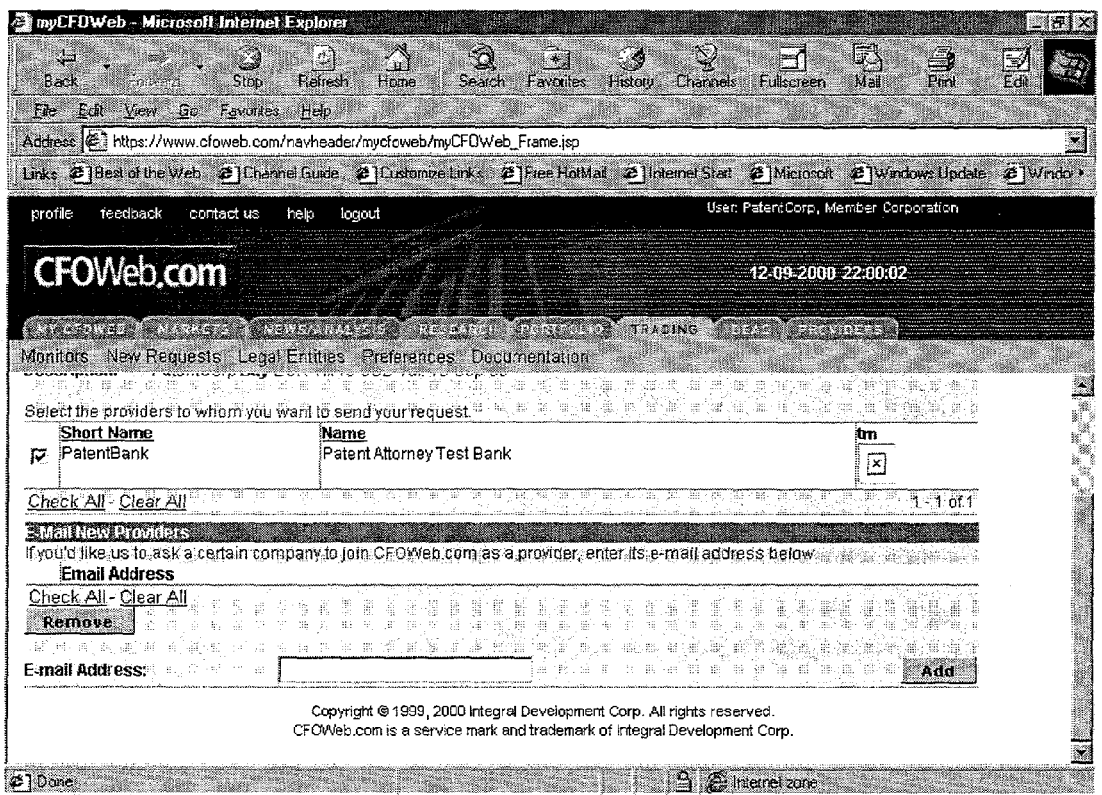
FIG. 106

Best Price Rules

Dealing Entities | Default Dealing Entities | Favorite Banks/Bank Groups | Display Preferences | Best Price Rules Save | Help Best price rules are as defined below.

| First | Second | Third | Criteria |
|-------|--------|-------|----------|
| ● | | | Highest bid and lowest offer |
| | ● | | Tightest bid/offer spread |
| | | ● | Selected bank: AIG |

SYSTEM AND METHOD FOR CONDUCTING WEB-BASED FINANCIAL TRANSACTIONS IN CAPITAL MARKETS

CROSS REFERENCE TO RELATED APPLICATIONS

This is a continuation-in-part application of U.S. patent application Ser. No. 09/703,198 filed Oct. 31, 2000, entitled "SYSTEM AND METHOD FOR CONDUCTING WEB-BASED FINANCIAL TRANSACTIONS IN CAPITAL MARKETS". This application incorporates by reference: (i) U.S. Provisional Patent Application Ser. No. 60/139,113 filed Jun. 14, 1999, entitled "SYSTEM AND METHOD FOR AN XML VOCABULARY FOR CAPITAL MARKETS"; (ii) U.S. Provisional Patent Application Ser. No. 60/162,873 filed Nov. 1, 1999, entitled "METHOD AND APPARATUS FOR WEB-BASED MANAGEMENT OF FINANCIAL RISK AND PRICING AND TRADING OF FINANCIAL PRODUCTS"; (iii) U.S. patent application Ser. No. 09/593,324 filed Jun. 13, 2000, entitled "SYSTEM AND METHOD FOR CONDUCTING WEB-BASED FINANCIAL TRANSACTIONS IN CAPITAL MARKETS", now U.S. Pat. No. 6,347,307; and (iv) U.S. patent application Ser. No. 09/703,198.

FIELD OF THE INVENTION

This invention relates generally to the field of interactive and automated Web-based financial transaction applications, and in particular to interactive and automated systems and methods for conducting financial transactions and managing portfolios and related financial information in capital markets.

BACKGROUND

During the evolution of the Internet, including the World Wide Web, there has been a continual introduction of applications and services to enable individuals and organizations to conduct financial research, manage their financial portfolios, and engage in certain types of financial transactions. The wide array of applications and services ranges from on-line banking to stock quote and financial information services to sites that enable users to engage in on-line, real-time market trades involving various instruments such as stocks, stock options, bonds, and mutual funds. The trading services, for example E*TRADE Securities, Inc.'s "E*TRADE"<www.etrade.com>, Charles Schwab & Co., Inc.'s "Schwab.com"<www.schwab.com>, and Fidelity Brokerage Services, Inc.'s "Fidelity.com"<www.fidelity.com>, permit trading of standard instruments in recognized markets. In such services, the investor uses credit or an account set up through the trade service to engage in trades through the service's proprietary system and interfaces. Such services, which are geared towards individual investors, do not permit seamless integration with users' internal or back-end systems or the creation and trading of customized transactions. These services, and many others like them, do not enable trading between parties in currency derivatives or foreign exchange, or the pricing and modeling of other capital market transactions.

Some steps have been taken to tap into the potentially vast market of institutional investors wishing to engage in complex transactions via the Internet. The "Open Financial Exchange" (Intuit Inc., Microsoft Corp., CheckFree Corp.) <www.ofx.net> was created to provide a common specification for the electronic exchange of financial data between financial institutions, businesses, and consumers via the Internet that enables financial data exchange among disparate systems, in order to support online banking, bill payment and presentment, and the trading of stocks, bonds, and mutual funds. The Open Financial Exchange does not, however, provide a vocabulary, platform, and communication protocol to enable the creation, negotiation, and execution of complex, capital market transactions among financial institutions and institutional investors.

What is needed is a system and method that enables institutional investors and financial institutions to seamlessly create, price, negotiate, execute, settle and analyze complex, capital market transactions, including interest and currency derivatives, foreign exchange, loans and deposits, and fixed-income instruments, in an online environment, using a standard vocabulary and messaging system that enables seamless integration with the proprietary, existing systems of the users.

SUMMARY

The present invention provides a system and method that enables users, such as "Members" (e.g., institutional investors) and "Providers" (e.g., banks, financial institutions), to engage in capital market transactions, including the trading of Over-the-Counter financial products, via the Internet (including the World Wide Web). The system includes a variety of servers, applications, and interfaces that enable users to interactively communicate and trade financial instruments among one another and to manage their portfolios. Interactive communications supported by the system include: establishing credit relationships, structuring financial transactions, requesting price quotes, monitoring and reviewing transaction requests, issuing price quotes, monitoring and reviewing price quotes, negotiations between Members and Providers, acceptance and confirmation of price quotes, reporting, portfolio management, analysis of financial information and market data, and communications among Members, Providers, and/or system administrators, including e-mail, chat, and message boards.

The present invention also supports communications with the server side in an automated manner via an automated processor (the "Connect Processor" and "Connect Messaging Server"). Such automated communications enable connectivity with users' internal, back-end systems to execute automated, straight-through processing, including transaction pricing, payment scheduling and journaling, derivatives trading, trade confirmation, and trade settlement. Such communications are facilitated using a novel XML-based syntax ("FinXML") and XSL-based processing language ("FinScript"). FinXML provides a standard data interchange language for capital market transactions and supports a broad set of elements and attributes that represent a wide variety of financial transactions, reference data, and market data. The common description of the FinXML syntax can be used for all aspects of straight-through-processing, including deal creation, confirmation, settlement, payment, risk management, and accounting.

BRIEF DESCRIPTION OF THE FIGURES

The above objects and description of the present invention may be better understood with the aid of the following text and accompanying drawings:

FIG. 21 shows a screen print of an interactive user interface for displaying and searching news stories in an embodiment of the present invention.

FIG. 25 shows a screen print of an interactive user interface for displaying and selecting news headlines in an embodiment of the present invention.

FIGS. 27-27A show a screen print of a user interface displaying a summary of market interest rates in an embodiment of the present invention.

FIGS. 28-28A show a screen print of a user interface displaying a summary of foreign exchange rates in an embodiment of the present invention.

FIGS. 29-29A show a screen print of a user interface displaying a summary of bank deposit and lending rates in an embodiment of the present invention.

FIGS. 30-30A show a screen print of a user interface displaying a summary of bond rates in an embodiment of the present invention.

FIG. 33 shows a screen print of an interactive user interface for displaying and searching industry news headlines in an embodiment of the present invention.

FIG. 34 shows a screen print of an interactive user interface for displaying and searching world business news headlines in an embodiment of the present invention.

FIG. 39 shows a screen print of an interactive user interface for displaying and searching credit market news headlines in an embodiment of the present invention.

FIG. 40 shows a screen print of an interactive user interface for displaying and searching equities news headlines in an embodiment of the present invention.

FIG. 41 shows a screen print of an interactive user interface for displaying and searching commodities news headlines in an embodiment of the present invention.

FIG. 42 shows a screen print of an interactive user interface for selecting for display research briefs from providers of corporate finance content in an embodiment of the present invention.

FIG. 44 shows a screen print of an interactive user interface for displaying a Member's list of financial transactions created using the system in an embodiment of the present invention.

FIG. 44A shows a screen print of another view of an interactive user interface for displaying a Member's list of financial transactions created using the system, including reports regarding the portfolio that can be selected and run, in an embodiment of the present invention.

FIG. 47 shows a screen print of an interactive user interface for displaying additional information associated with a Member's FX Spot transaction created using the system in an embodiment of the present invention.

FIG. 48 shows a screen print of an interactive user interface for displaying the details of a Member's Foreign Exchange ("FX") Forward transaction created using the system in an embodiment of the present invention.

FIG. 50 shows a screen print of an interactive user interface for displaying the details of a Member's Foreign Exchange ("FX") European Option transaction created using the system in an embodiment of the present invention.

FIG. 51 shows a screen print of an interactive user interface for displaying basic information regarding a Member's Fixed-Float Interest Rate Swap transaction created using the system in an embodiment of the present invention.

FIG. 52 shows a screen print of an interactive user interface for displaying the cashflows associated with a Member's Fixed Float Interest Rate Swap transaction created using the system in an embodiment of the present invention.

FIG. 53 shows a screen print of an interactive user interface for displaying the rate resets associated with a Member's Fixed Float Interest Rate Swap transaction created using the system in an embodiment of the present invention.

FIG. 54 shows a screen print of an interactive user interface for displaying the details of a Member's Forward Rate Agreement transaction created using the system in an embodiment of the present invention.

FIG. 57 shows a screen print of an interactive user interface for displaying the details of a Member's Fixed Rate Deposit transaction created using the system in an embodiment of the present invention.

FIGS. 59-59A show a screen print of an interactive user interface for displaying the details of a Member's Cap transaction created using the system in an embodiment of the present invention.

FIG. 60 shows a screen print of an interactive user interface for displaying the cashflows associated with a Member's Cap transaction created using the system in an embodiment of the present invention.

FIG. 62 shows a screen print of an interactive user interface for displaying the rate resets associated with a Member's Cap transaction created using the system in an embodiment of the present invention.

FIGS. 63-63A show a screen print of an interactive user interface for displaying the details of a Member's Floor transaction created using the system in an embodiment of the present invention.

FIG. 64 shows a screen print of an interactive user interface for displaying the cashflows associated with a Member's Floor transaction created using the system in an embodiment of the present invention.

FIG. 66 shows a screen print of an interactive user interface for displaying the rate resets associated with a Member's Floor transaction created using the system in an embodiment of the present invention.

FIG. 69 shows a screen print of an interactive user interface for displaying the trade details of a Member's Fixed-Float Interest Rate Swap transaction created using the system in an embodiment of the present invention.

FIG. 79B shows a screen print of an interactive user interface for defining a contact for a legal entity associated with a Member in an embodiment of the present invention.

FIGS. 80-80A show a screen print of an interactive user interface for enabling a Member to set defaults and filters for selecting price quotes to view in an embodiment of the present invention.

FIG. 81 shows a screen print of an interactive user interface for creating and updating a Member's profile in an embodiment of the present invention.

FIGS. 82-82A show a screen print of an interactive user interface for enabling a Member to set display preferences for viewing price quotes in an embodiment of the present invention.

FIGS. 86-86A show a screen print of an interactive user interface for displaying the transaction details of a Provider's Fixed-Float Interest Rate Swap price quote created using the system in an embodiment of the present invention.

FIG. 91 shows a screen print of an interactive user interface for displaying a summary of a Provider's obsolete price quotes created using the system in an embodiment of the present invention.

Figure 94:
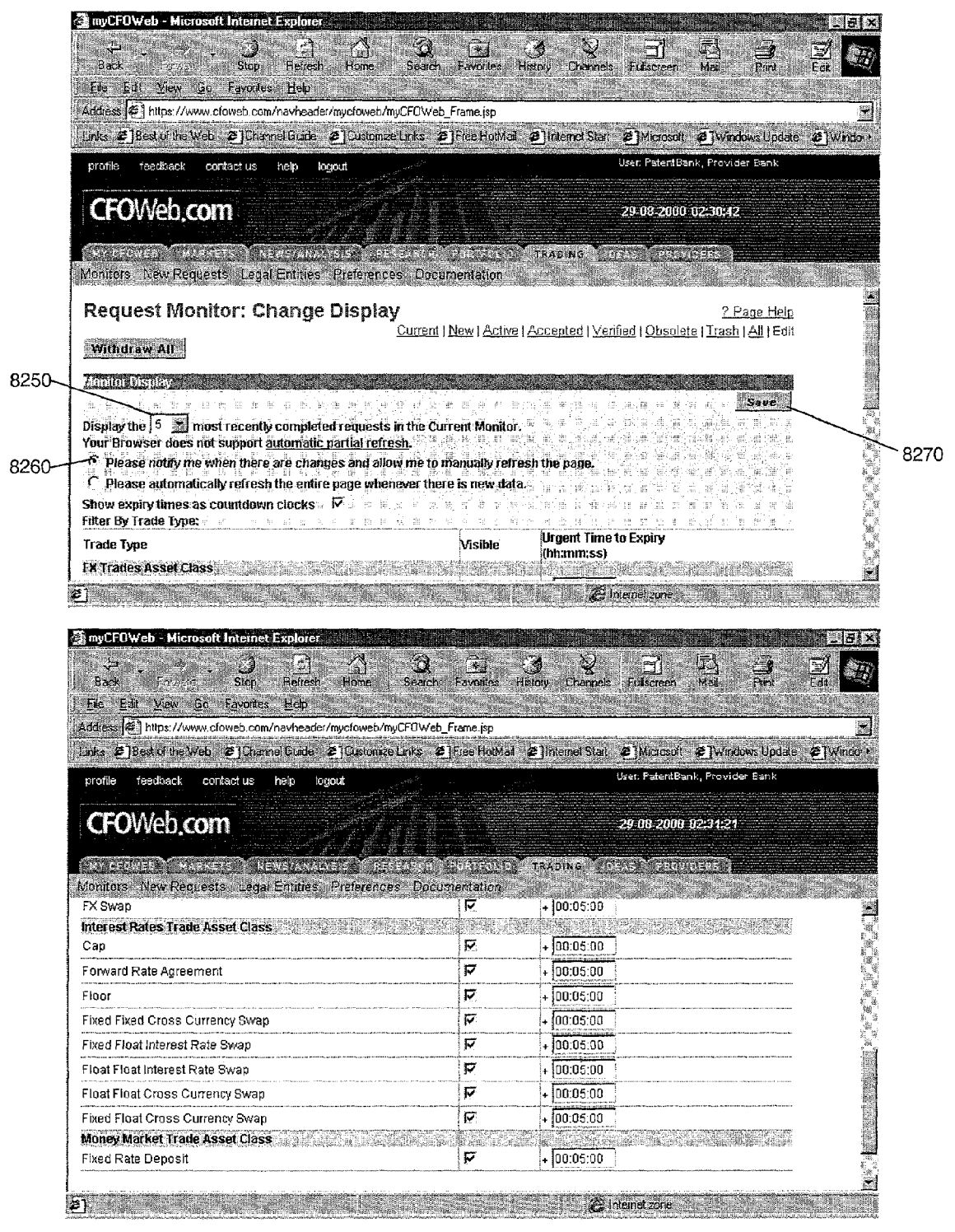

FIG. 94 shows a screen print of an interactive user interface for enabling a Provider to set defaults and filters for the monitor display screens for transaction requests created using the system in an embodiment of the present invention.

FIGS. 97-97B show a screen print of an interactive user interface for enabling a Provider to set defaults for creating price quotes in an embodiment of the present invention.

FIG. 100 shows a screen print of an interactive user interface for enabling a Provider to set communication preferences for price quotes created using the system in an embodiment of the present invention.

FIG. 106 shows a screen print of an interactive user interface that enables a Member to select the Providers to be sent the Member's FX Spot transaction request created using the system in an embodiment of the present invention.

FIG. 109C shows a screen print of an interactive user interface for displaying to a Provider active transaction requests created using the system in an embodiment of the present invention.

FIG. 109D shows a screen print of an interactive user interface for displaying a summary of a Provider's active price quotes created using the system in an embodiment of the present invention.

FIG. 110A shows a screen print of an interactive user interface for displaying the status and a summary of a Member's active and recently-completed transaction requests created using the system in an embodiment of the present invention.

FIG. 110B shows a screen print of an interactive user interface for displaying the trade details of a Member's Foreign Exchange ("FX") Spot transaction created using the system in an embodiment of the present invention.

FIG. 110C shows a screen print of an interactive user interface for displaying to a Member the trade details of an accepted price quote for the Member's FX Spot transaction request created using the system in an embodiment of the present invention.

FIG. 110D shows a screen print of an interactive user interface for displaying a summary of a Member's accepted transaction requests created using the system in an embodiment of the present invention.

FIG. 111A shows a screen print of an interactive user interface for displaying the status and a summary of a Provider's active transaction requests and recently-completed price quotes created using the system in an embodiment of the present invention.

FIG. 111B shows a screen print of an interactive user interface for displaying the status and a summary of a Provider's recently-completed price quotes created using the system in an embodiment of the present invention.

FIG. 111C shows a screen print of an interactive user interface for displaying a summary of a Provider's verified price quotes created using the system in an embodiment of the present invention.

FIG. 112 shows a screen print of an interactive user interface for creating and displaying the details of a Member's Foreign Exchange ("FX") Swap transaction request using the system in an embodiment of the present invention.

FIG. 113 shows a screen print of an interactive user interface for creating and displaying the details of a Member's Foreign Exchange ("FX") Option transaction request using the system in an embodiment of the present invention.

FIG. 114 shows a screen print of an interactive user interface for creating and displaying the details of a Member's Swap transaction request using the system in an embodiment of the present invention.

Figure 114:
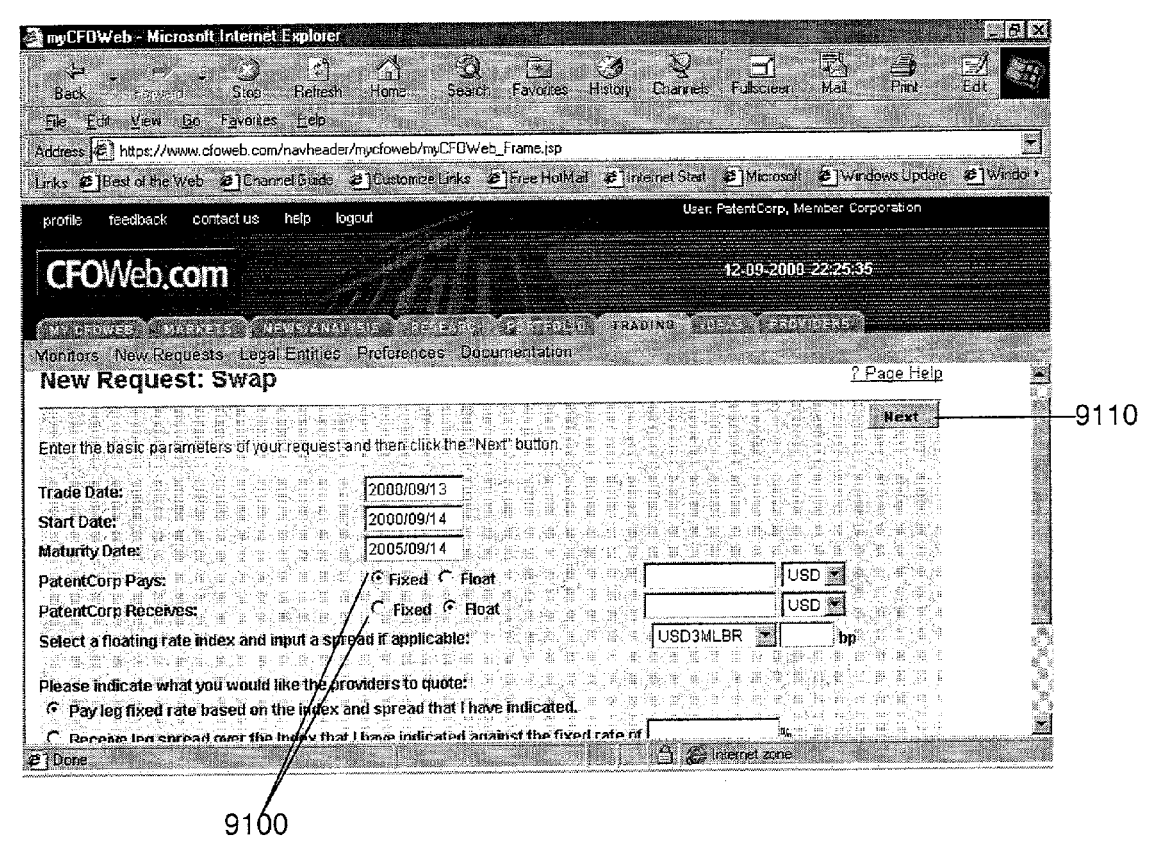
Figure 114A:
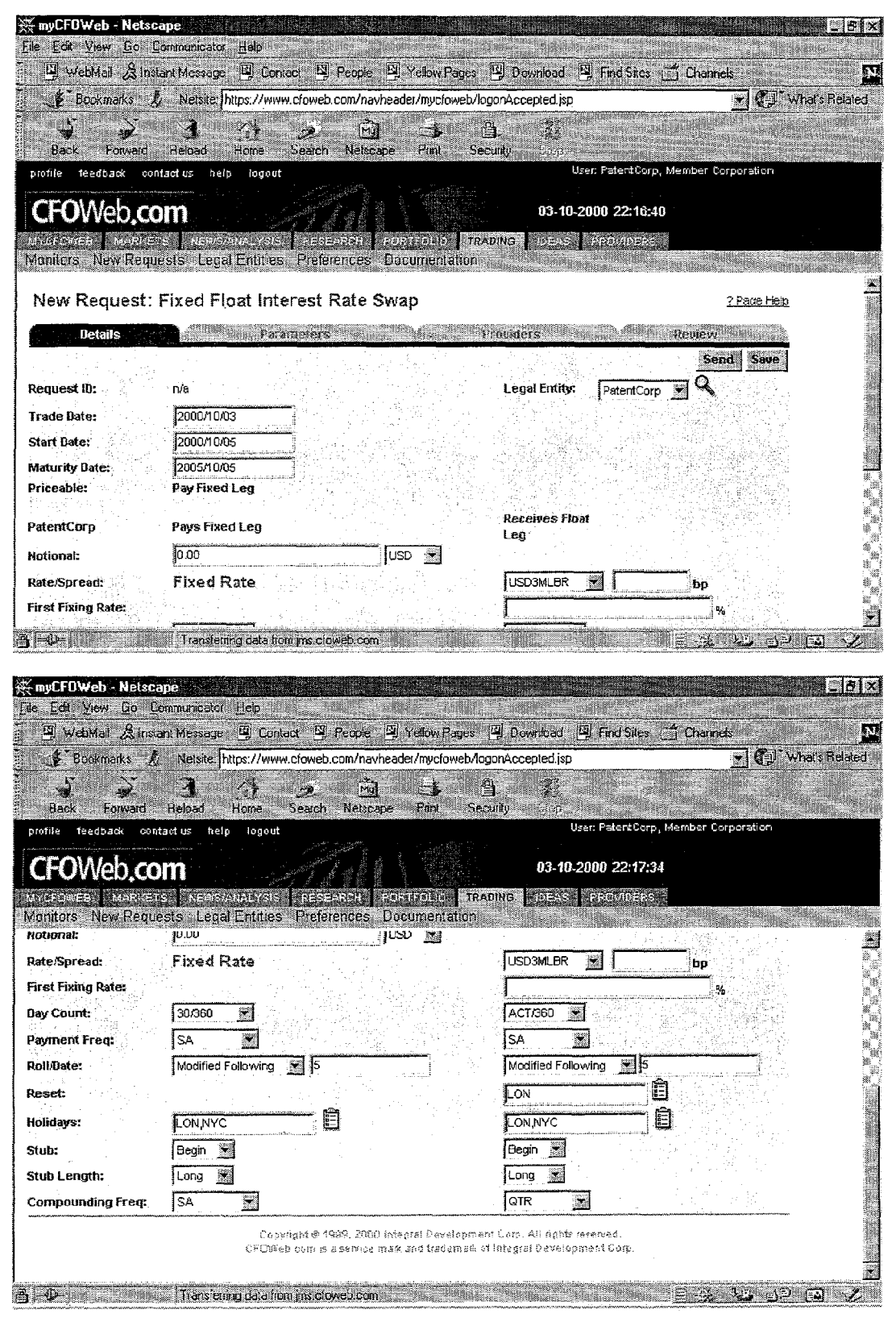

FIG. 114A shows a screen print of an interactive user interface for creating and displaying the details of a Member's Fixed-Float Interest Rate Swap transaction request using the system in an embodiment of the present invention.

Figure 114B:
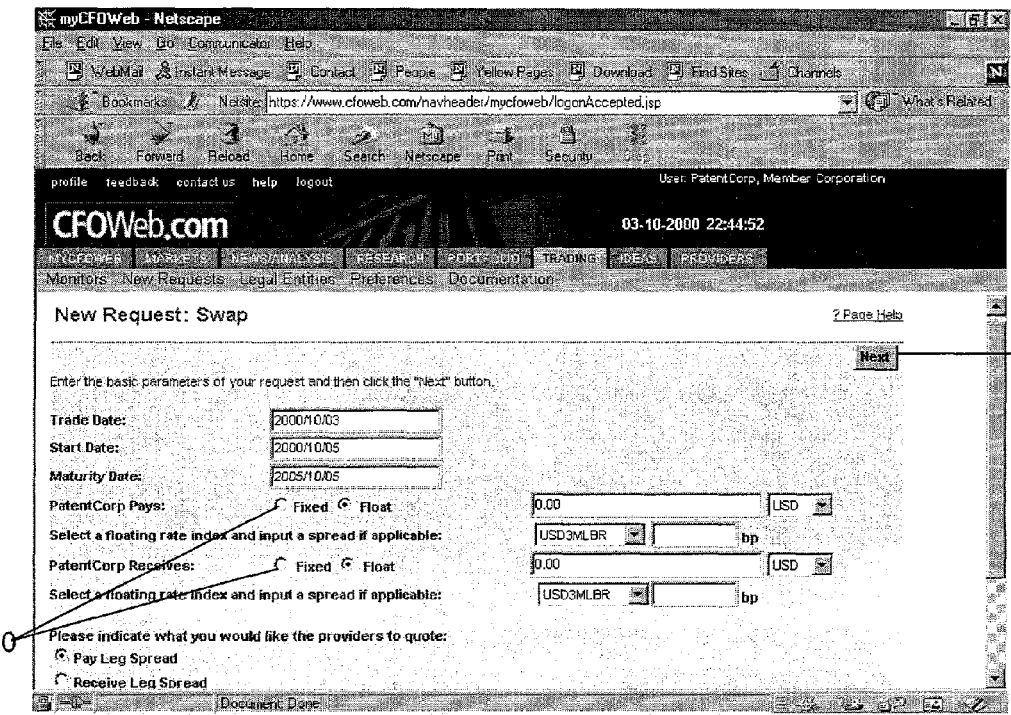

FIG. 114B shows a screen print of another view of an interactive user interface for creating and displaying the details of a Member's Swap transaction request using the system in an embodiment of the present invention.

Figure 114C:
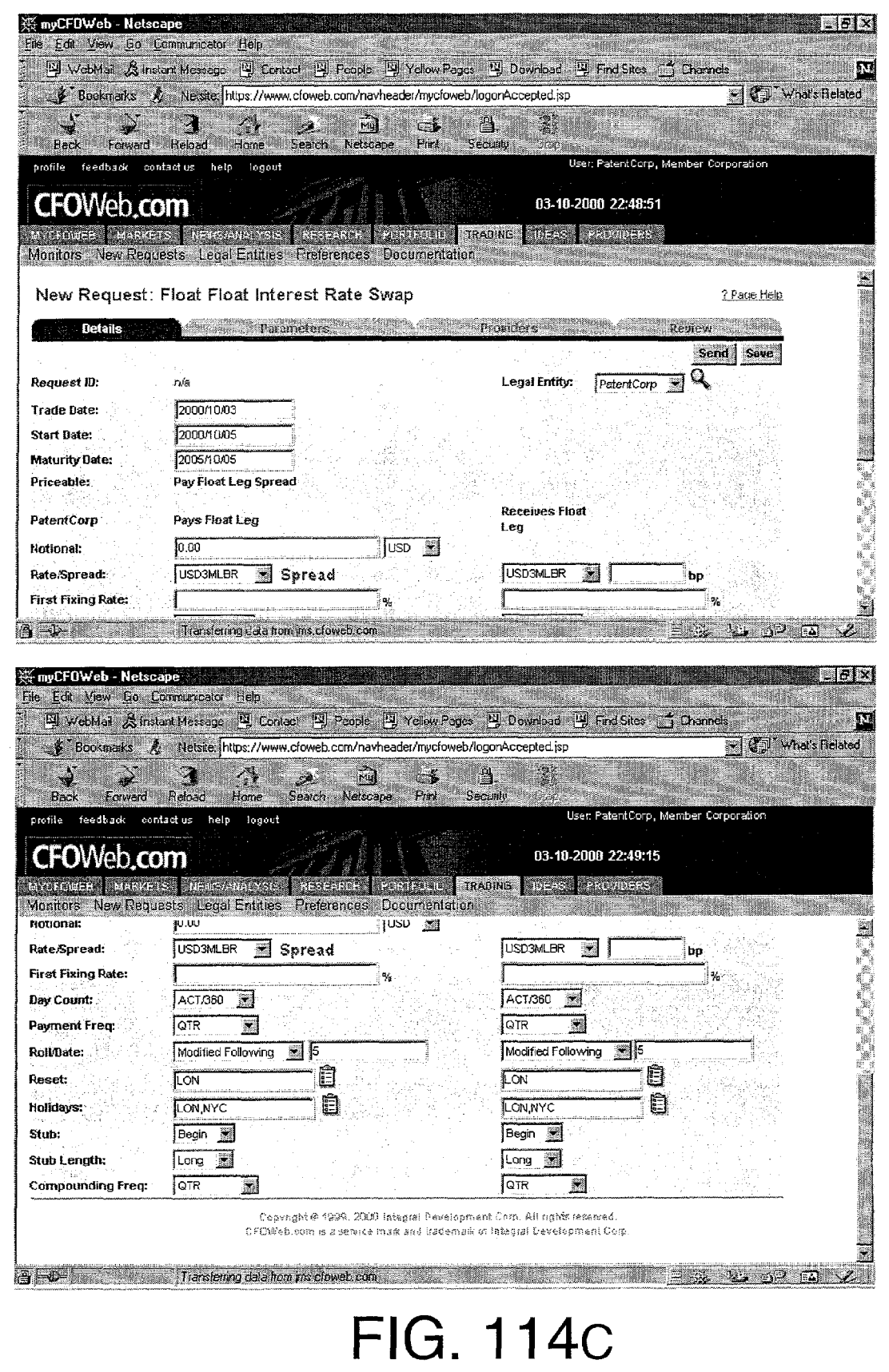

FIG. 114C shows a screen print of an interactive user interface for creating and displaying the details of a Member's Float-Float Interest Rate Swap transaction request using the system in an embodiment of the present invention.

Figure 114D:
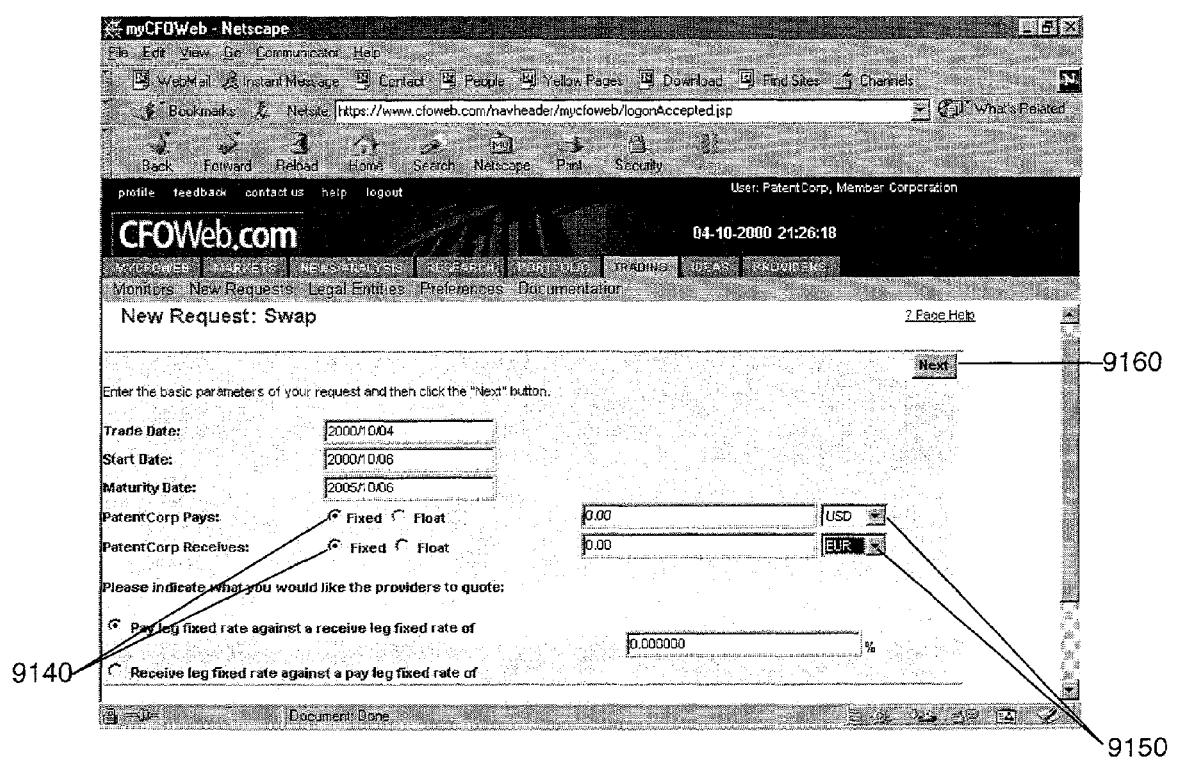

FIG. 114D shows a screen print of another view of an interactive user interface for creating and displaying the details of a Member's Swap transaction request using the system in an embodiment of the present invention.

Figure 114E:
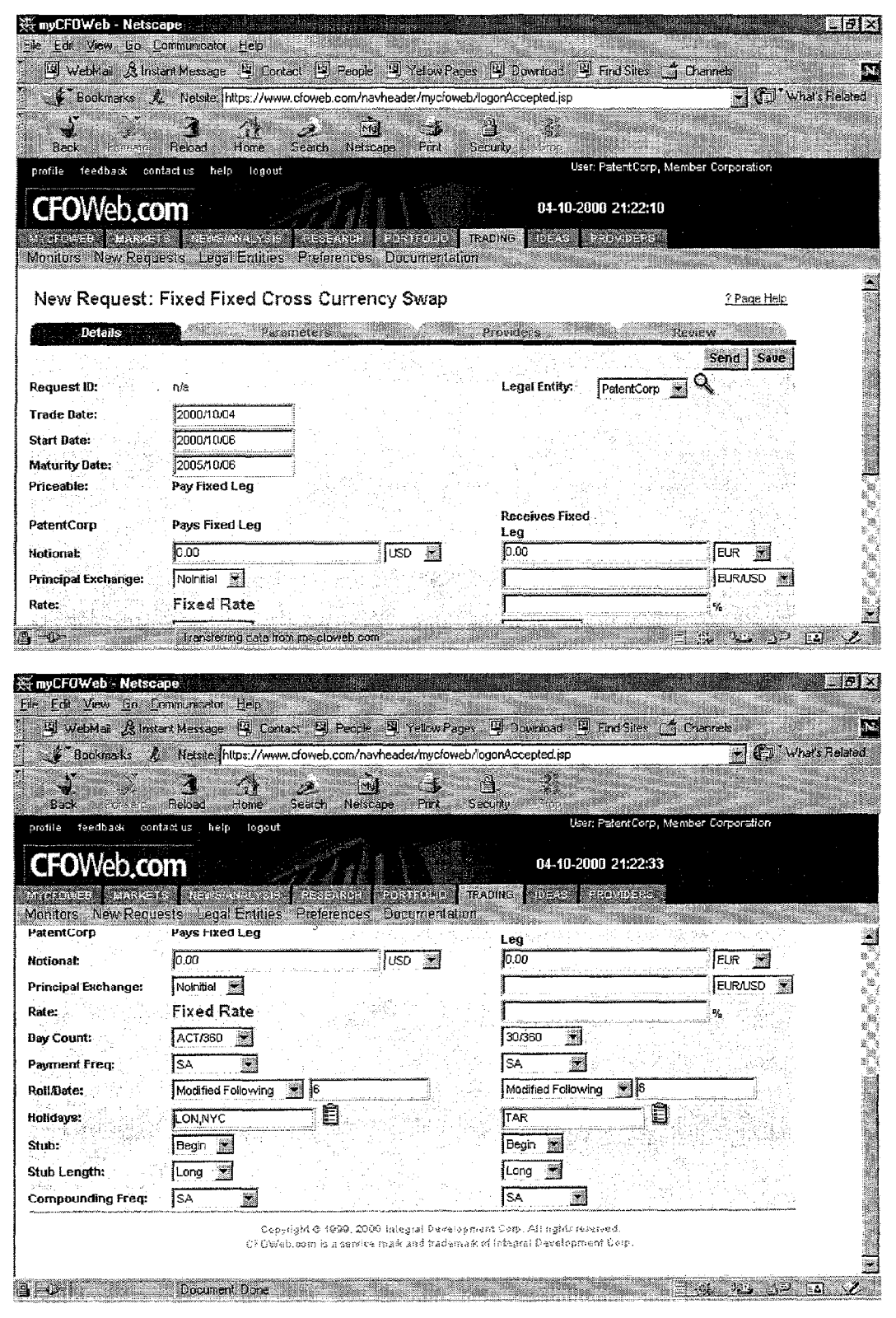

FIG. 114E shows a screen print of an interactive user interface for creating and displaying the details of a Member's Fixed-Fixed Cross Currency Swap transaction request using the system in an embodiment of the present invention.

Figure 114F:
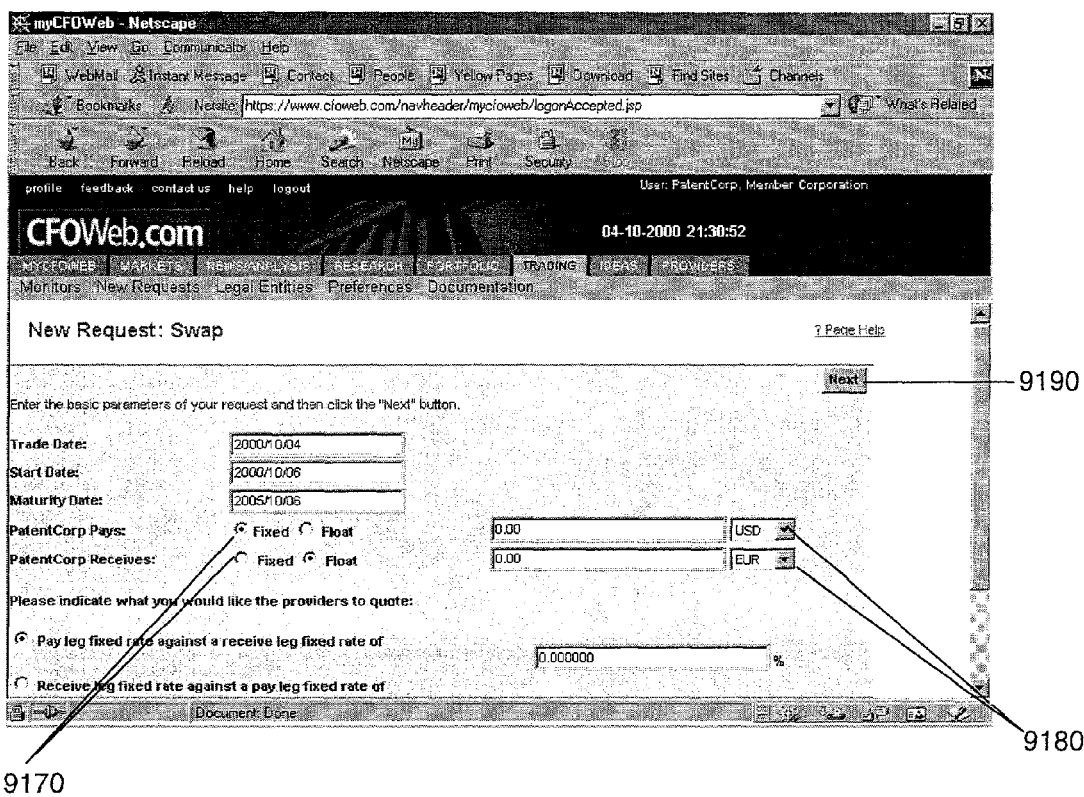

FIG. 114F shows a screen print of another view of an interactive user interface for creating and displaying the details of a Member's Swap transaction request using the system in an embodiment of the present invention.

Figure 114G:
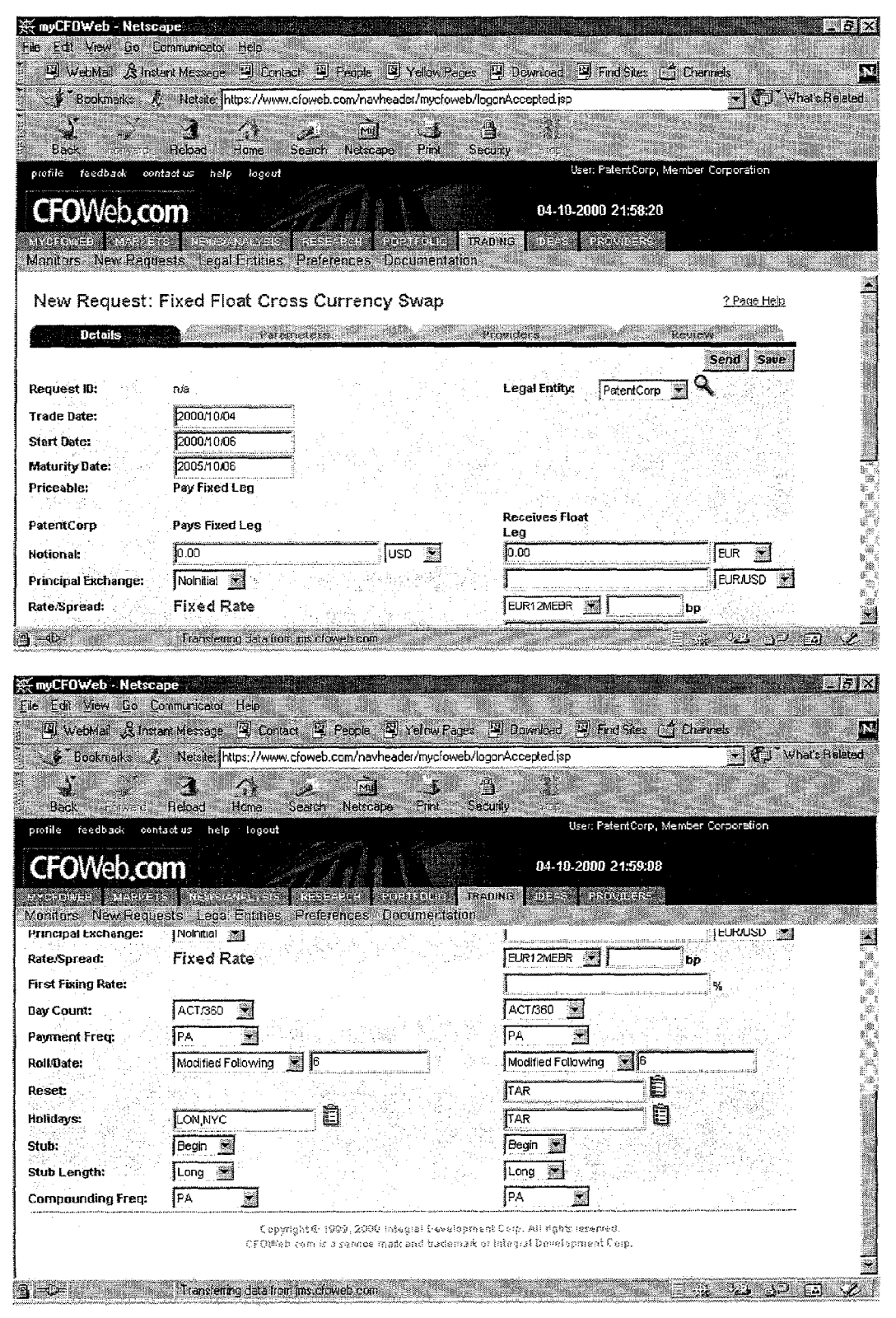

FIG. 114G shows a screen print of an interactive user interface for creating and displaying the details of a Member's Fixed-Float Cross Currency Swap transaction request using the system in an embodiment of the present invention.

Figure 114H:
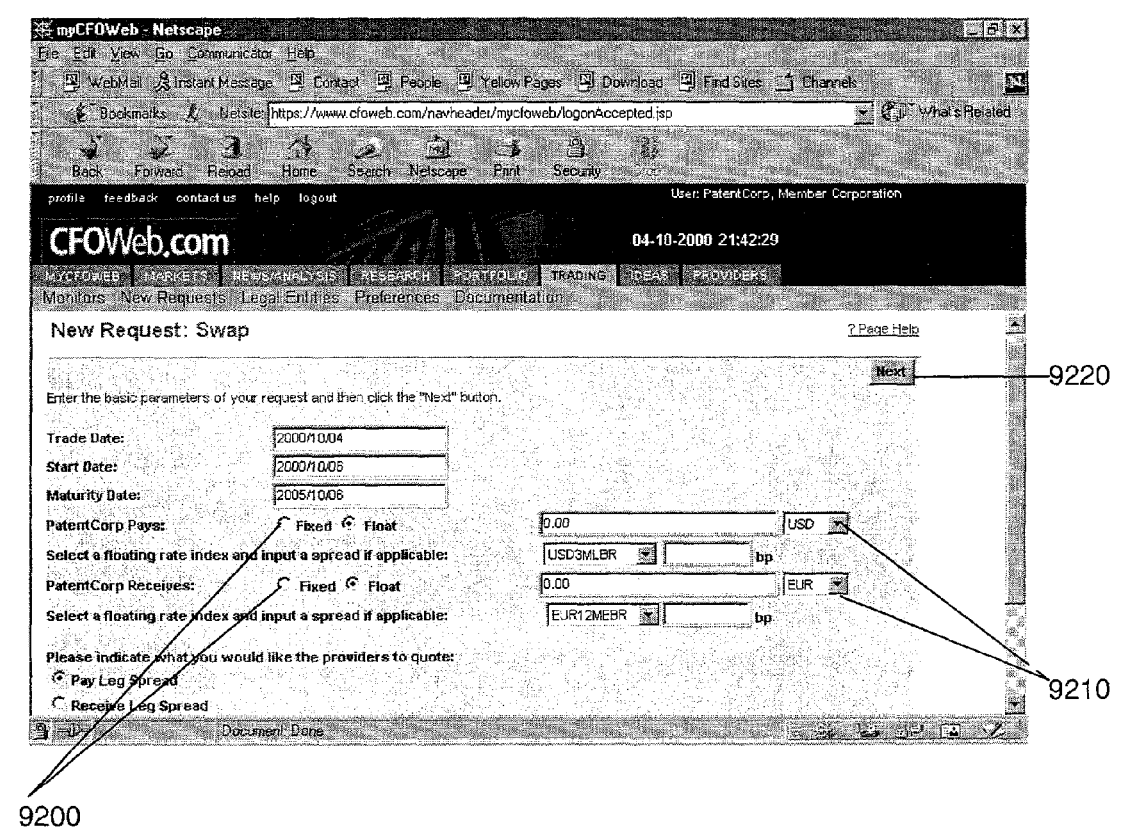

FIG. 114H shows a screen print of another view of an interactive user interface for creating and displaying the details of a Member's Swap transaction request using the system in an embodiment of the present invention.

Figure 114I:
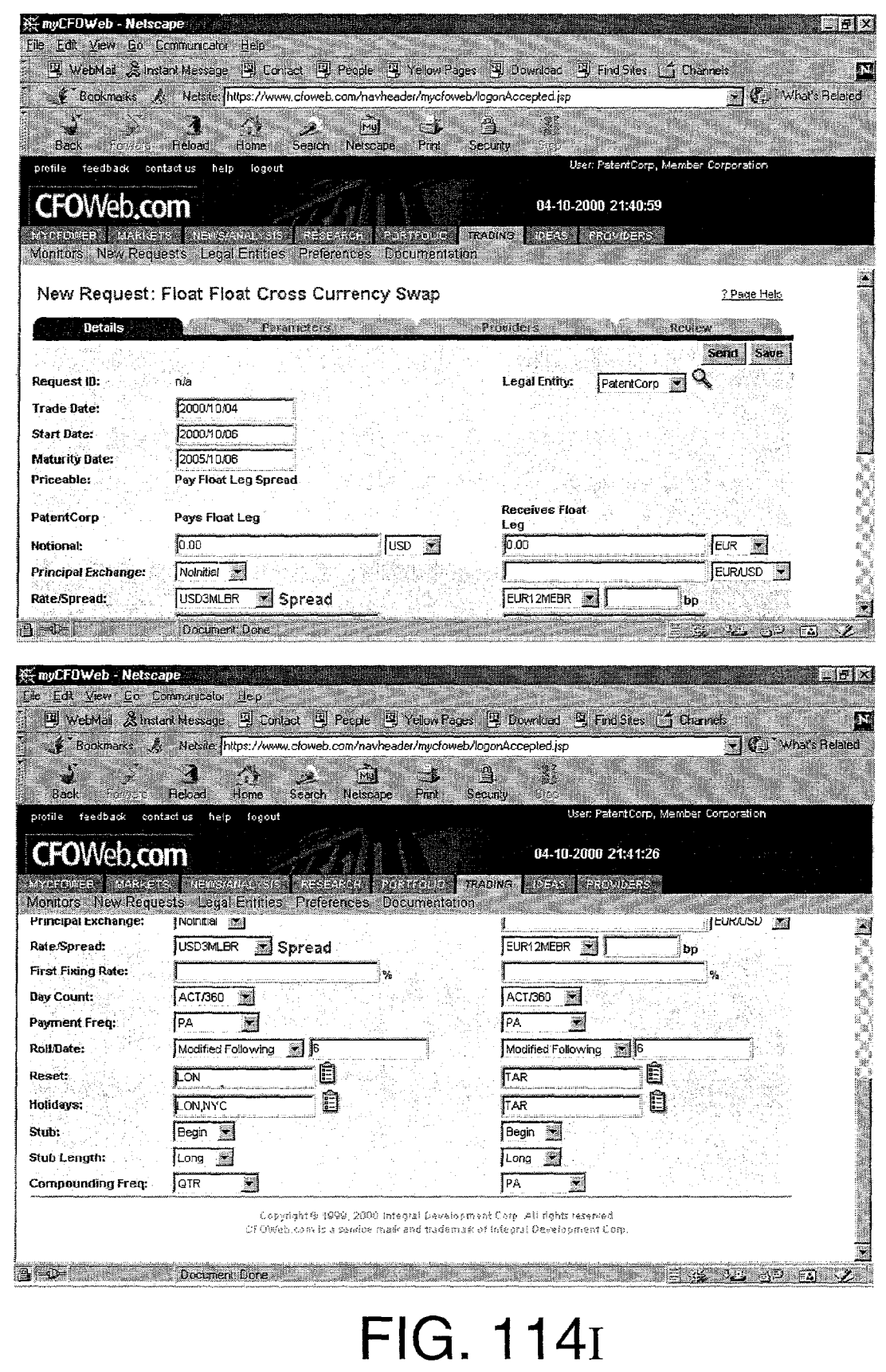

FIG. 114I shows a screen print of an interactive user interface for creating and displaying the details of a Member's Float-Float Cross Currency Swap transaction request using the system in an embodiment of the present invention.

Figure 115:
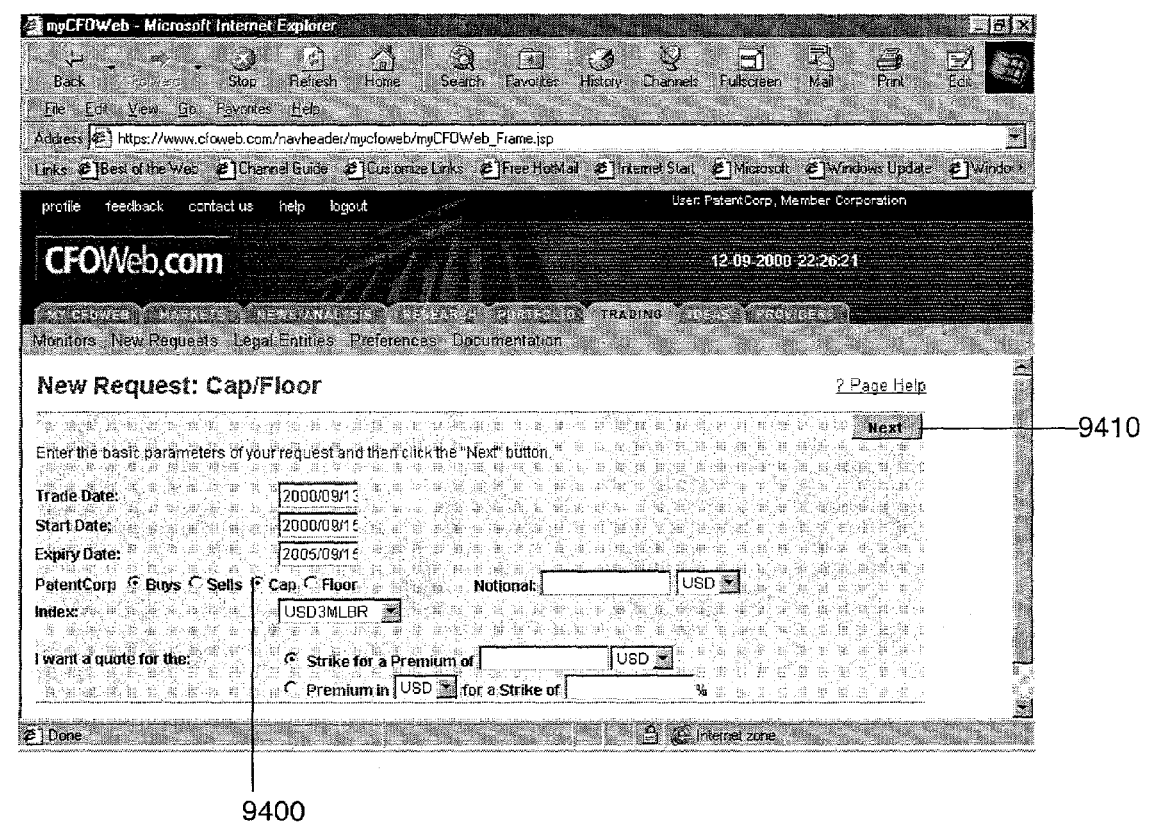

FIG. 115 shows a screen print of an interactive user interface for creating and displaying the details of a Member's Cap or Floor transaction request using the system in an embodiment of the present invention.

Figure 115A:
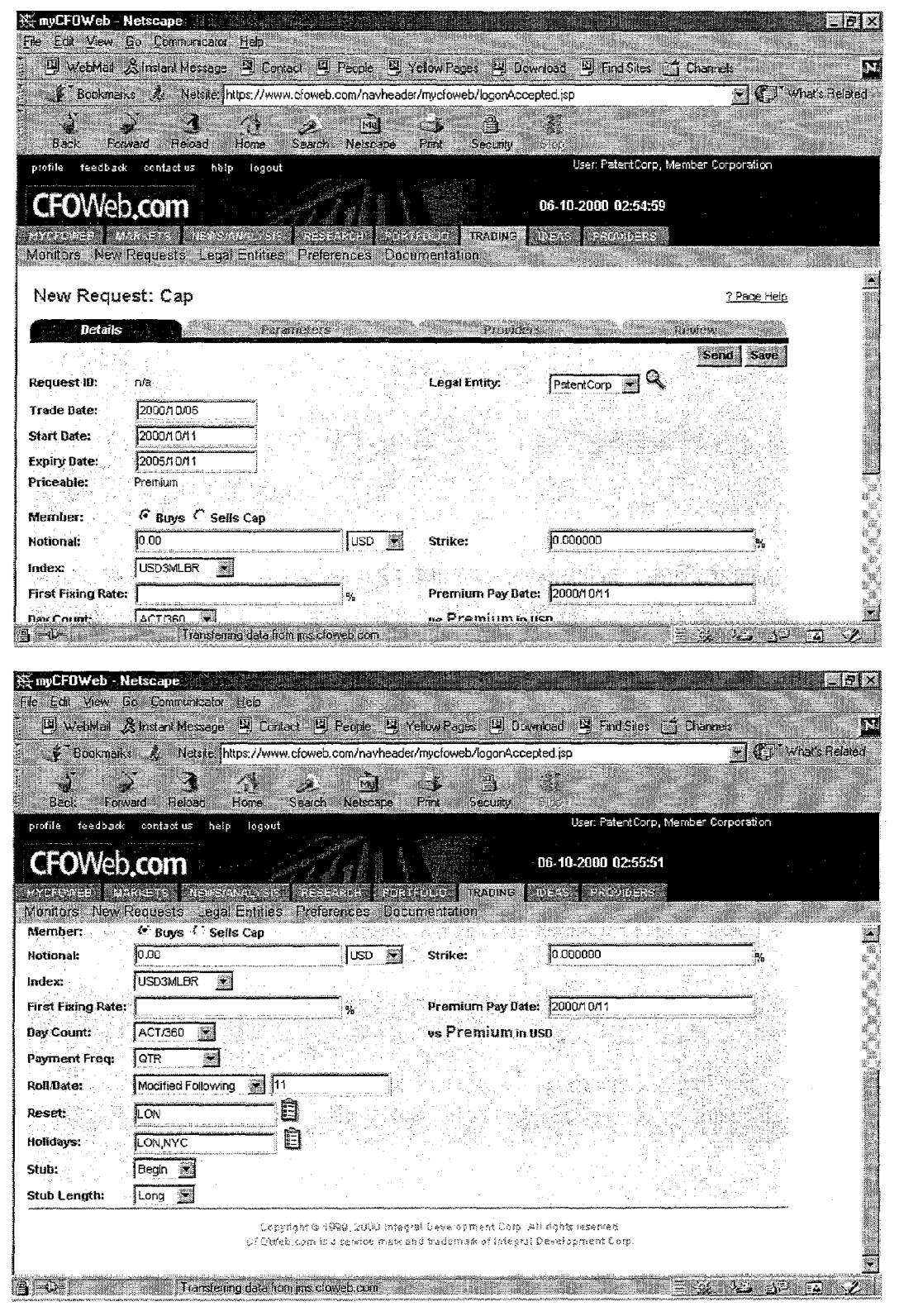

FIG. 115A shows a screen print of an interactive user interface for creating and displaying the details of a Member's Cap transaction request using the system in an embodiment of the present invention.

Figure 115B:
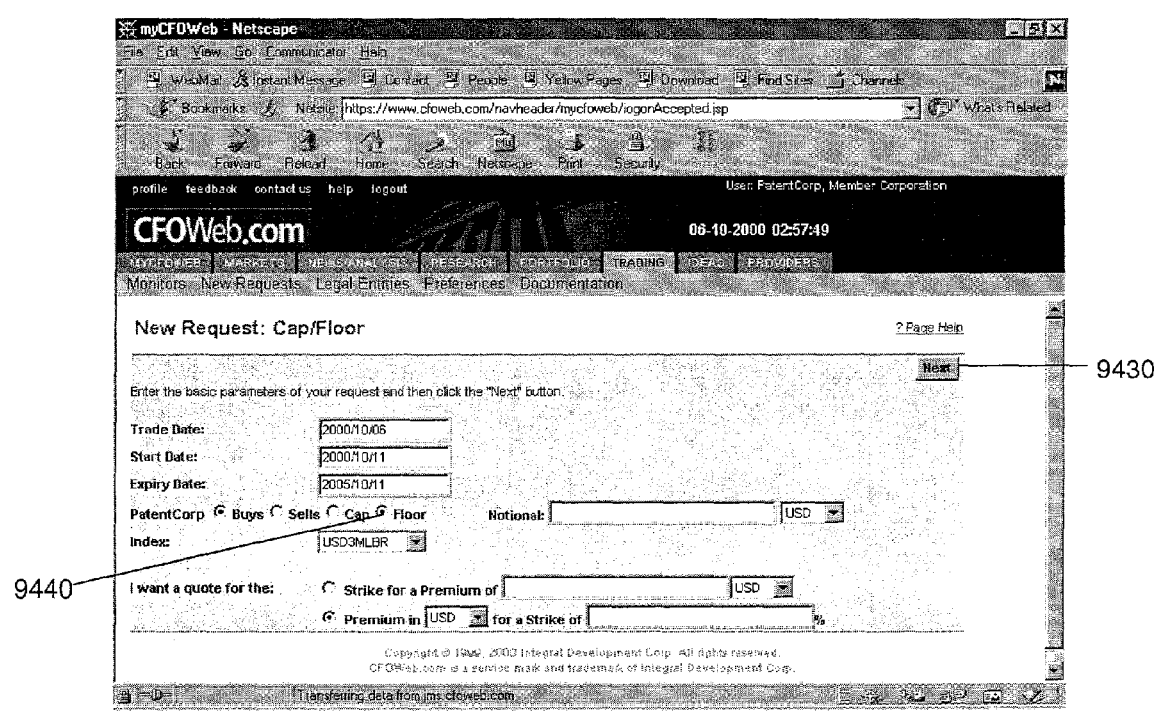

FIG. 115B shows another view of a screen print of an interactive user interface for creating and displaying the details of a Member's Cap or Floor transaction request using the system in an embodiment of the present invention.

Figure 115C:
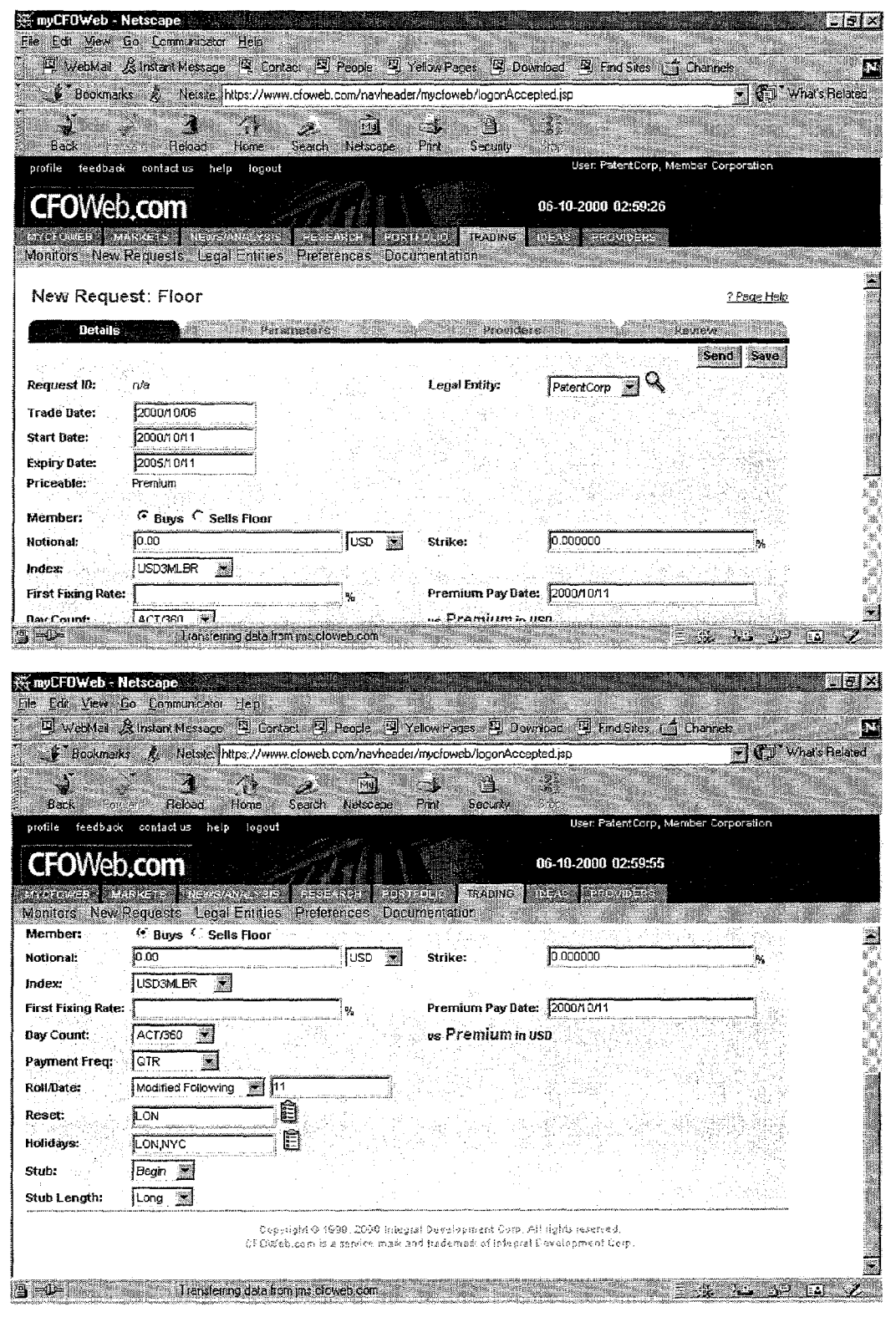

FIG. 115C shows a screen print of an interactive user interface for creating and displaying the details of a Member's Floor transaction request using the system in an embodiment of the present invention.

Figure 116:
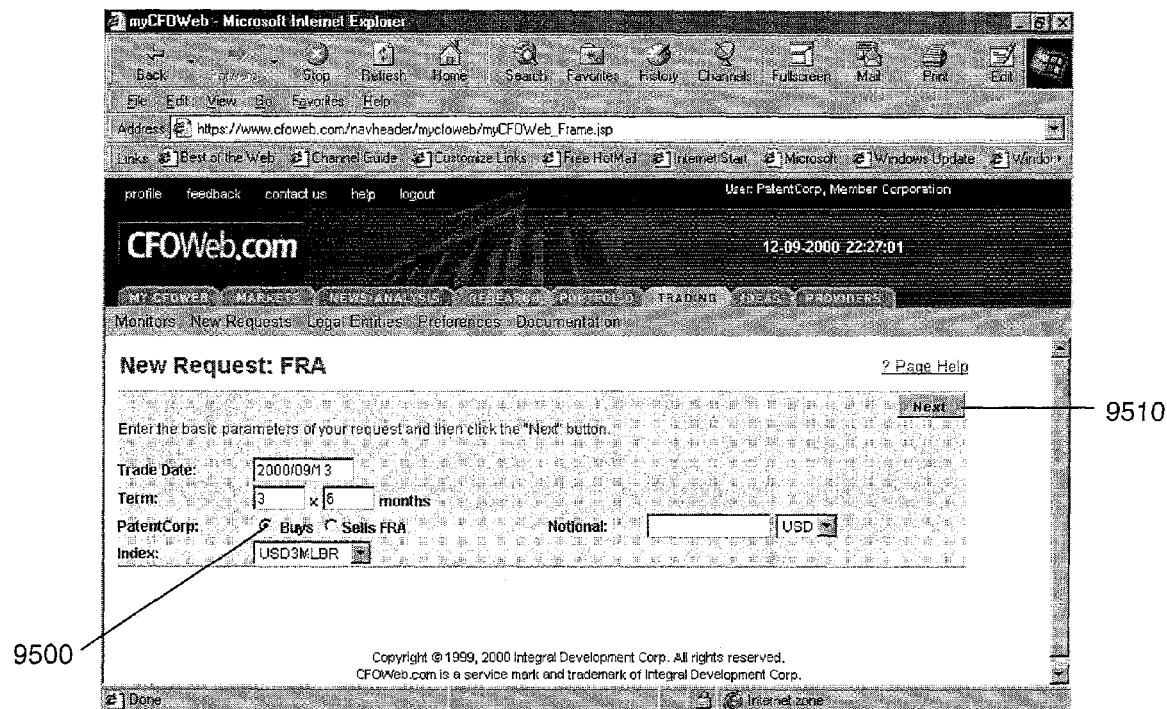

FIG. 116 shows a screen print of an interactive user interface for creating and displaying the details of a Member's Forward Rate Agreement transaction request using the system in an embodiment of the present invention.

Figure 116A:
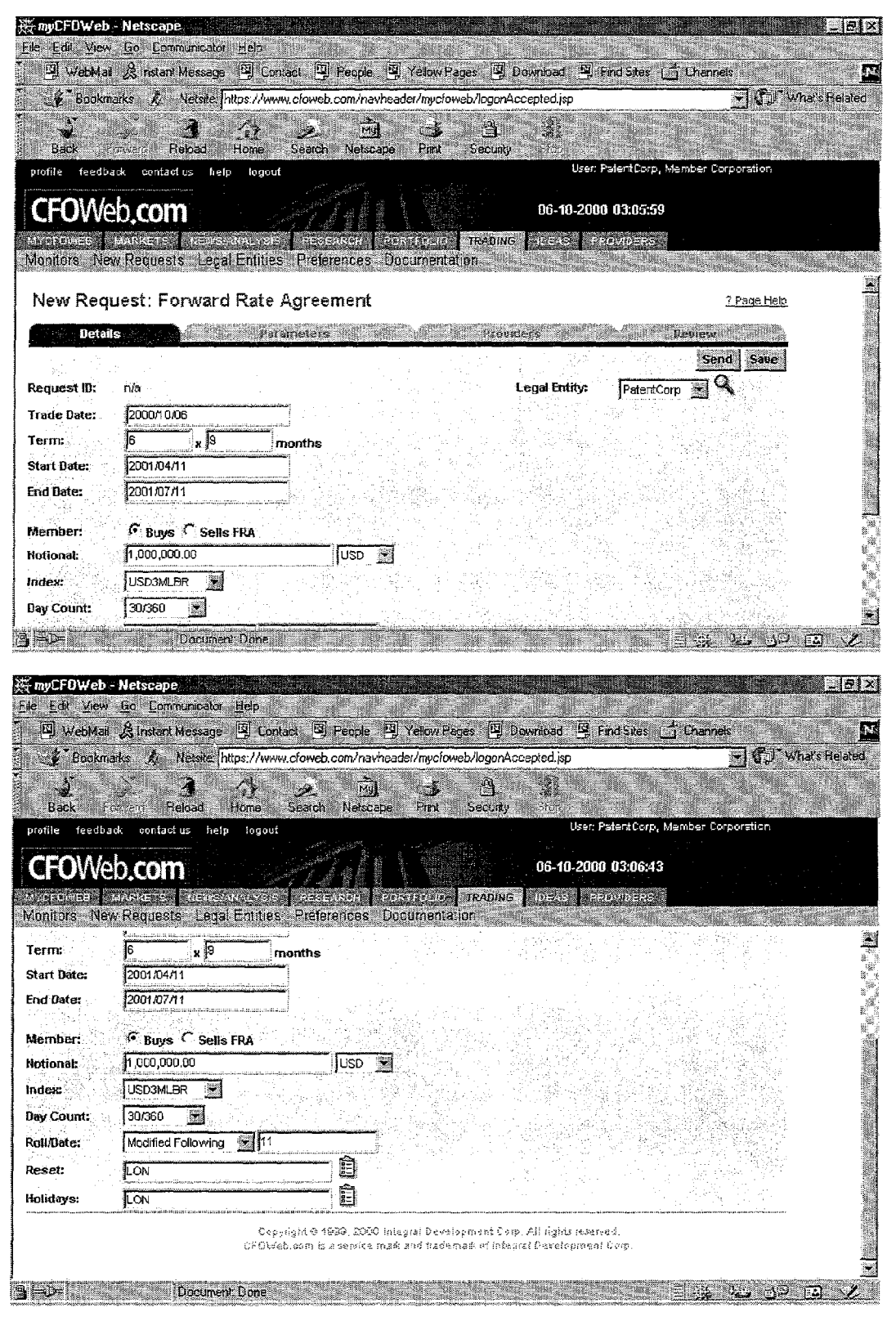

FIG. 116A shows a screen print of a second interactive user interface for creating and displaying the details of a Member's Forward Rate Agreement transaction request using the system in an embodiment of the present invention.

Figure 117:
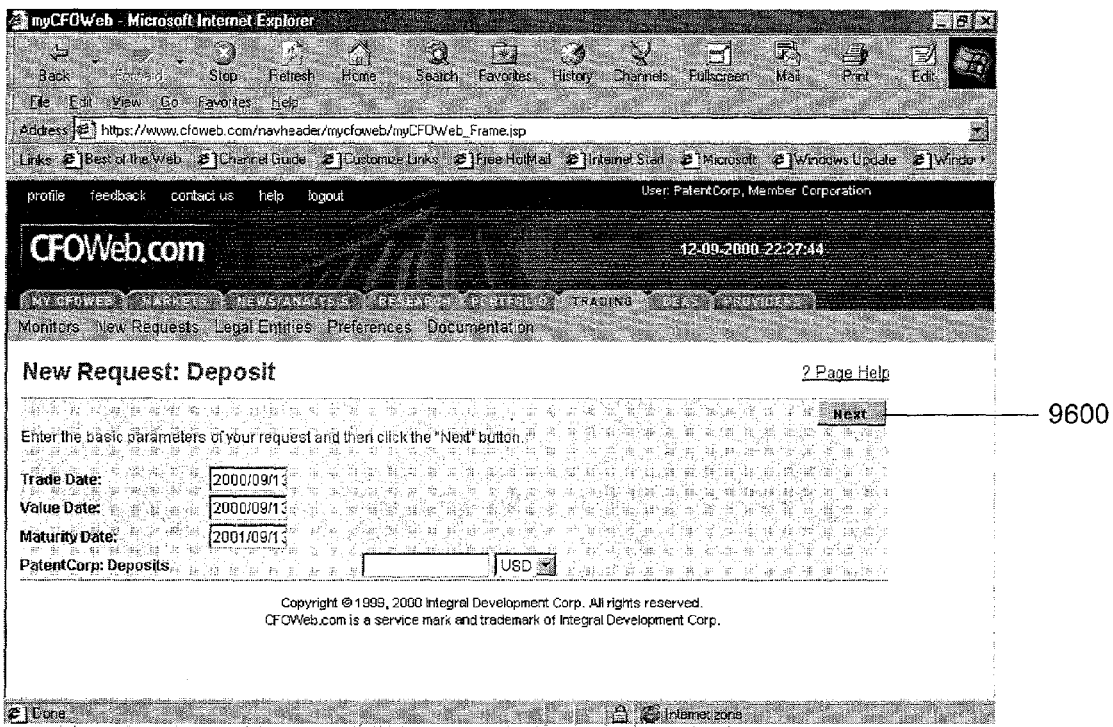

FIG. 117 shows a screen print of an interactive user interface for creating and displaying the details of a Member's Deposit transaction request using the system in an embodiment of the present invention.

Figure 117A:
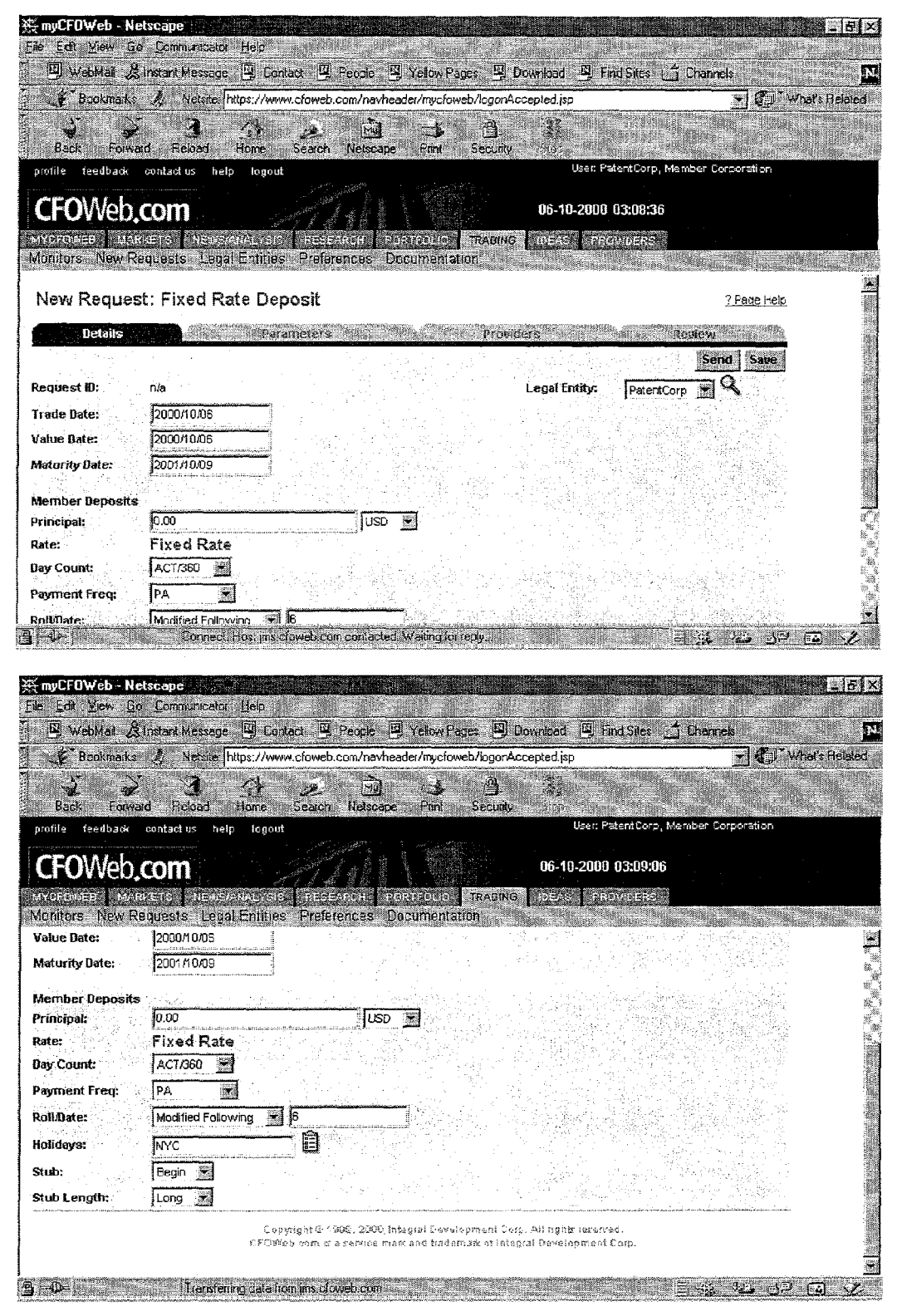

FIG. 117A shows a screen print of a second interactive user interface for creating and displaying the details of a Member's Fixed Rate Deposit transaction request using the system in an embodiment of the present invention.

Figure 118:
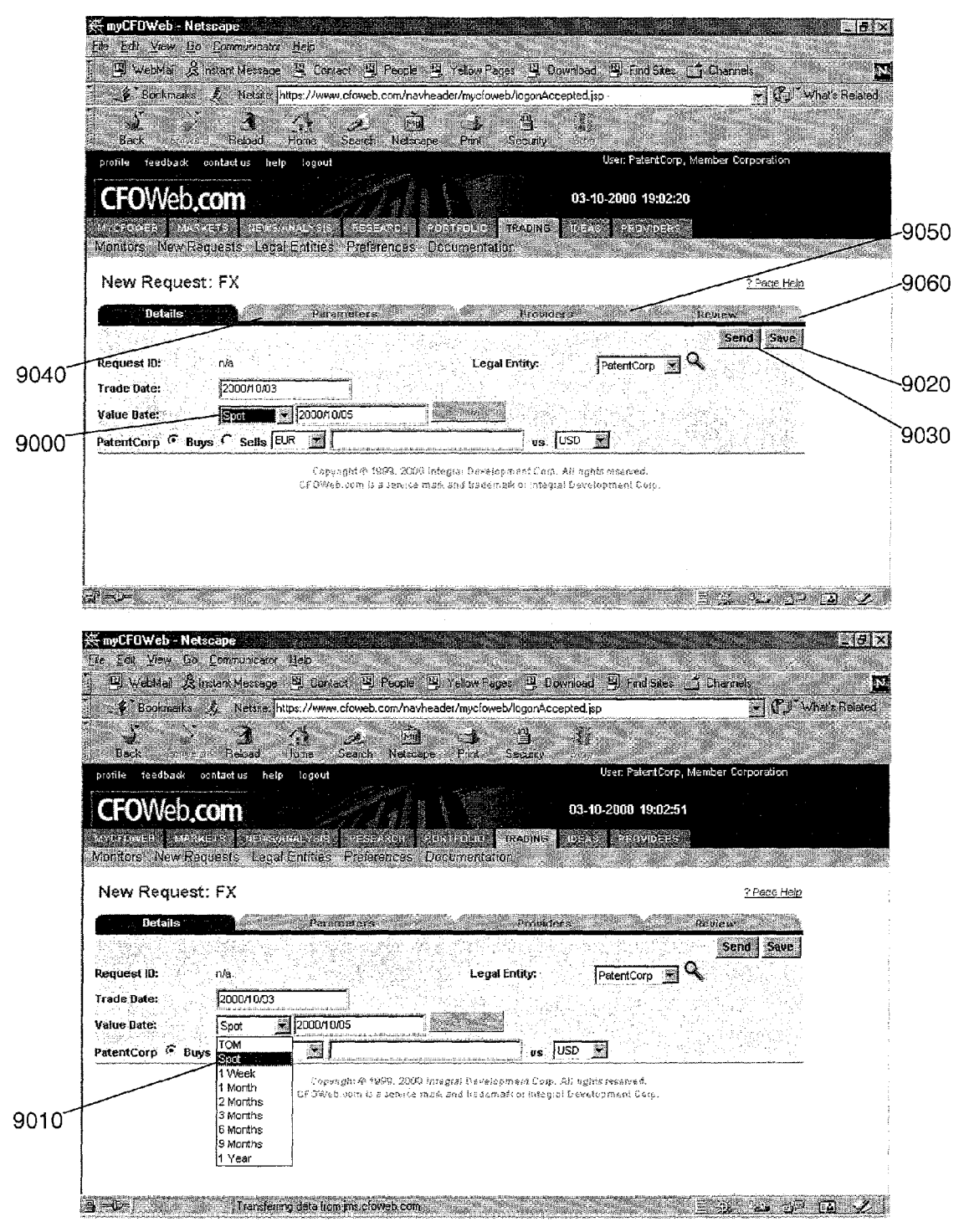

FIG. 118 shows a screen print of an interactive user interface for creating and displaying the details of a Member's Foreign Exchange ("FX") Spot or Forward transaction request using the system in an embodiment of the present invention.

Figure 119:
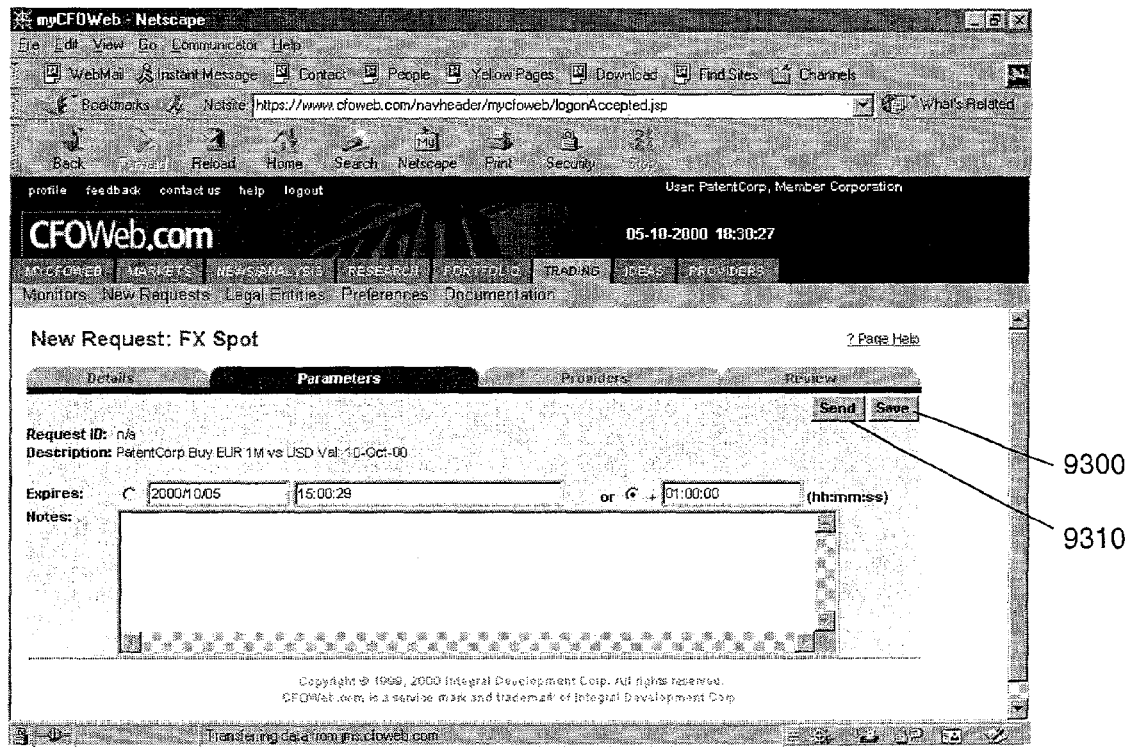

FIG. 119 shows a screen print of an interactive user interface for creating and displaying the transaction parameters of a Member's FX Spot or Forward transaction request using the system in an embodiment of the present invention.

Figure 120:
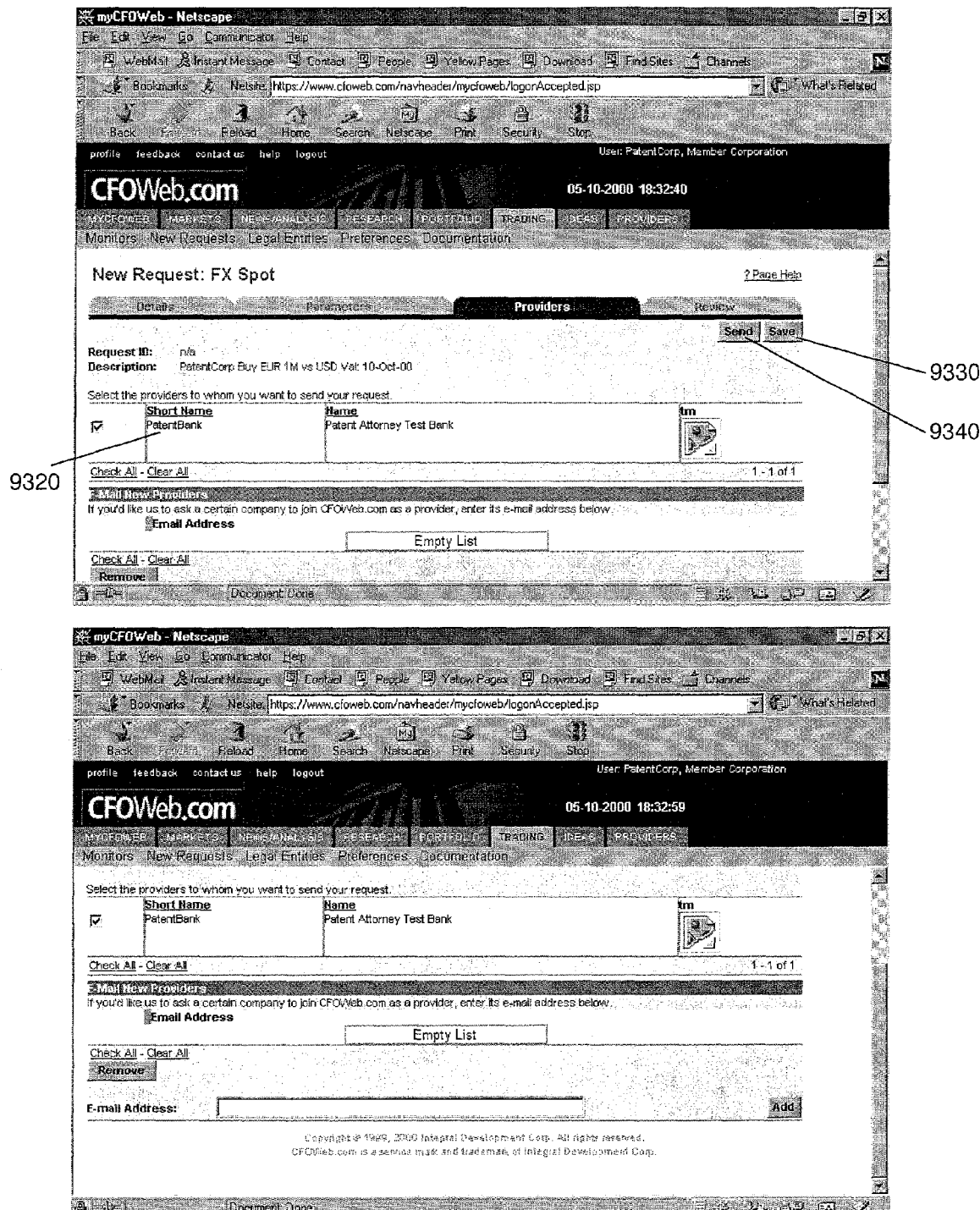

FIG. 120 shows a screen print of an interactive user interface for selecting the Providers to send a Member's FX Spot transaction request using the system in an embodiment of the present invention.

Figure 121:
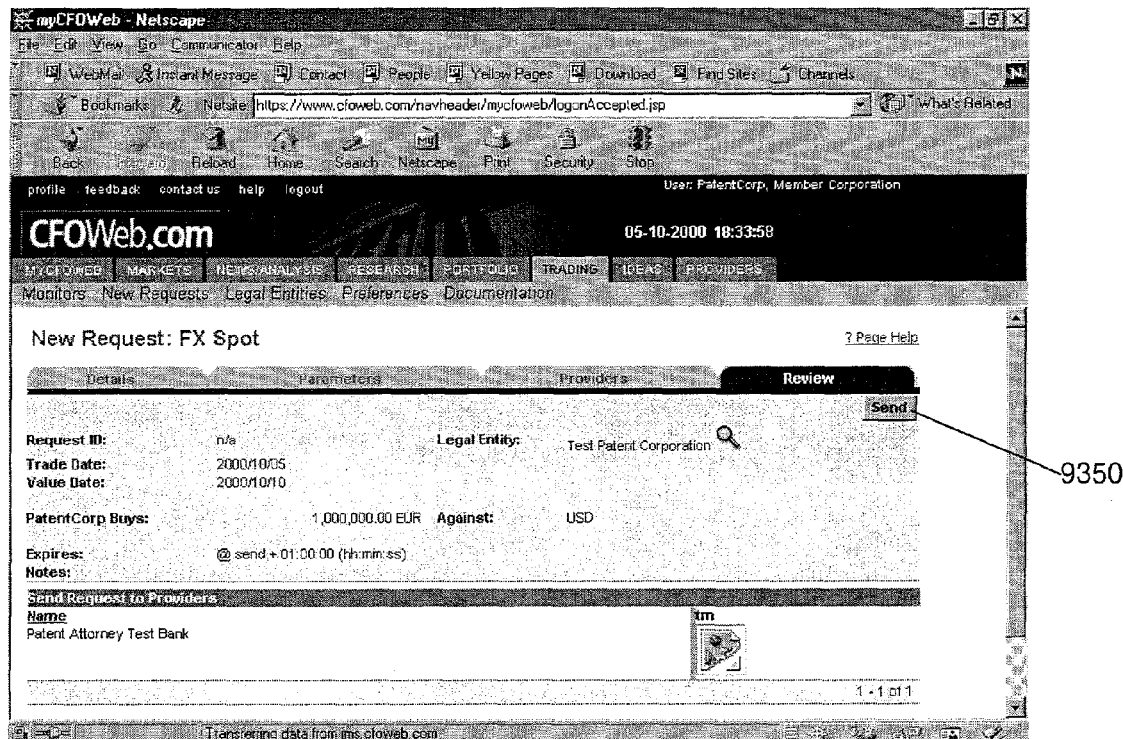

FIG. 121 shows a screen print of an interactive user interface for reviewing a Member's FX Spot transaction request using the system in an embodiment of the present invention.

Figure 122:
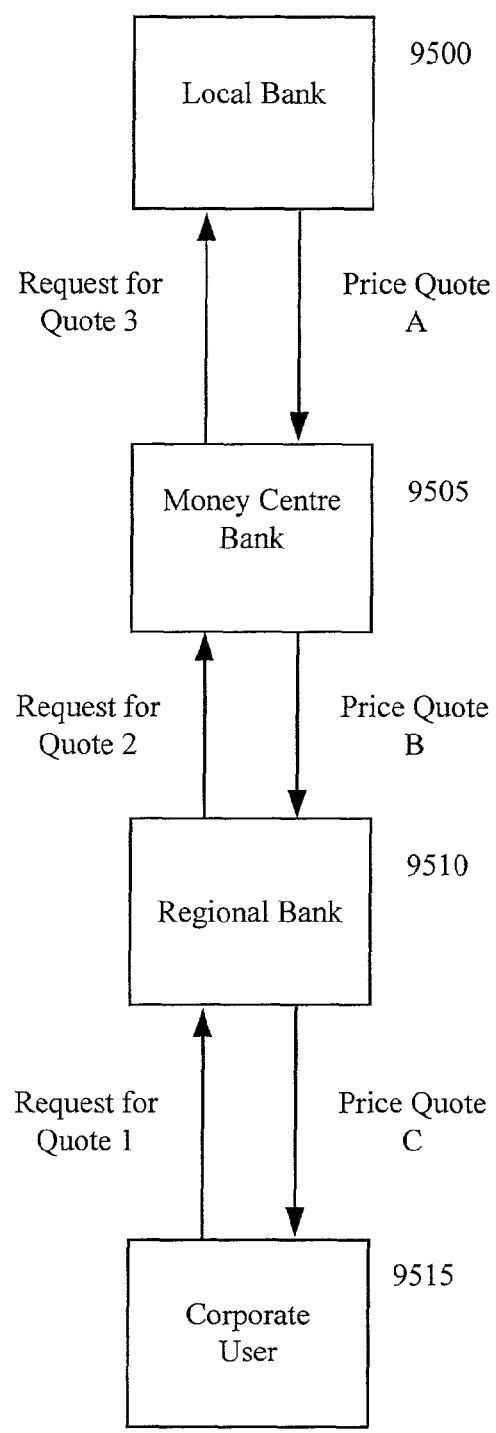

FIG. 122 shows a diagram of the bank-to-bank-to-bank-to customer workflow included in an embodiment of the present invention.

Figure 123:
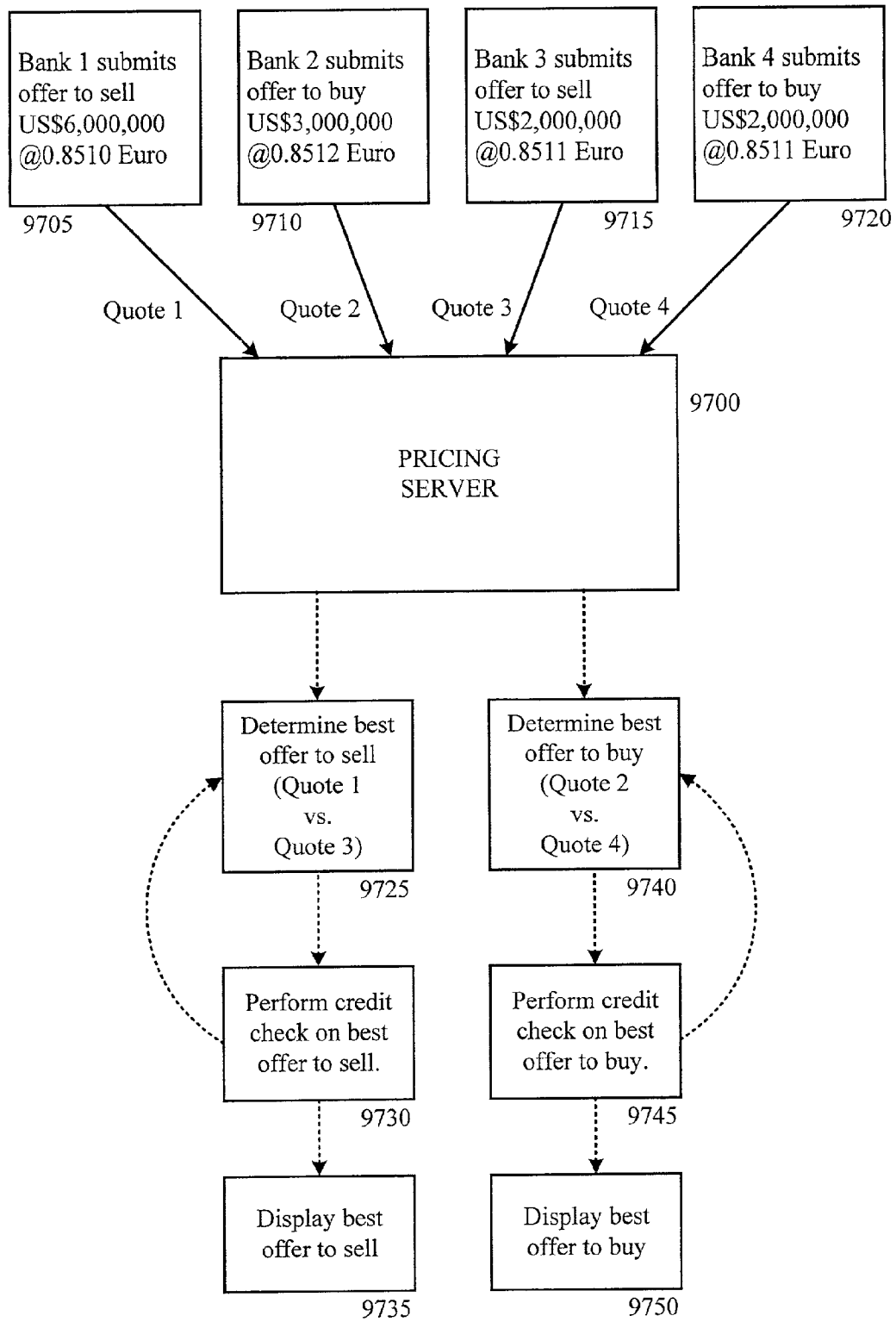

FIG. 123 shows the workflow for the continuous pricing auction system in an embodiment of the present invention.

Figure 124:
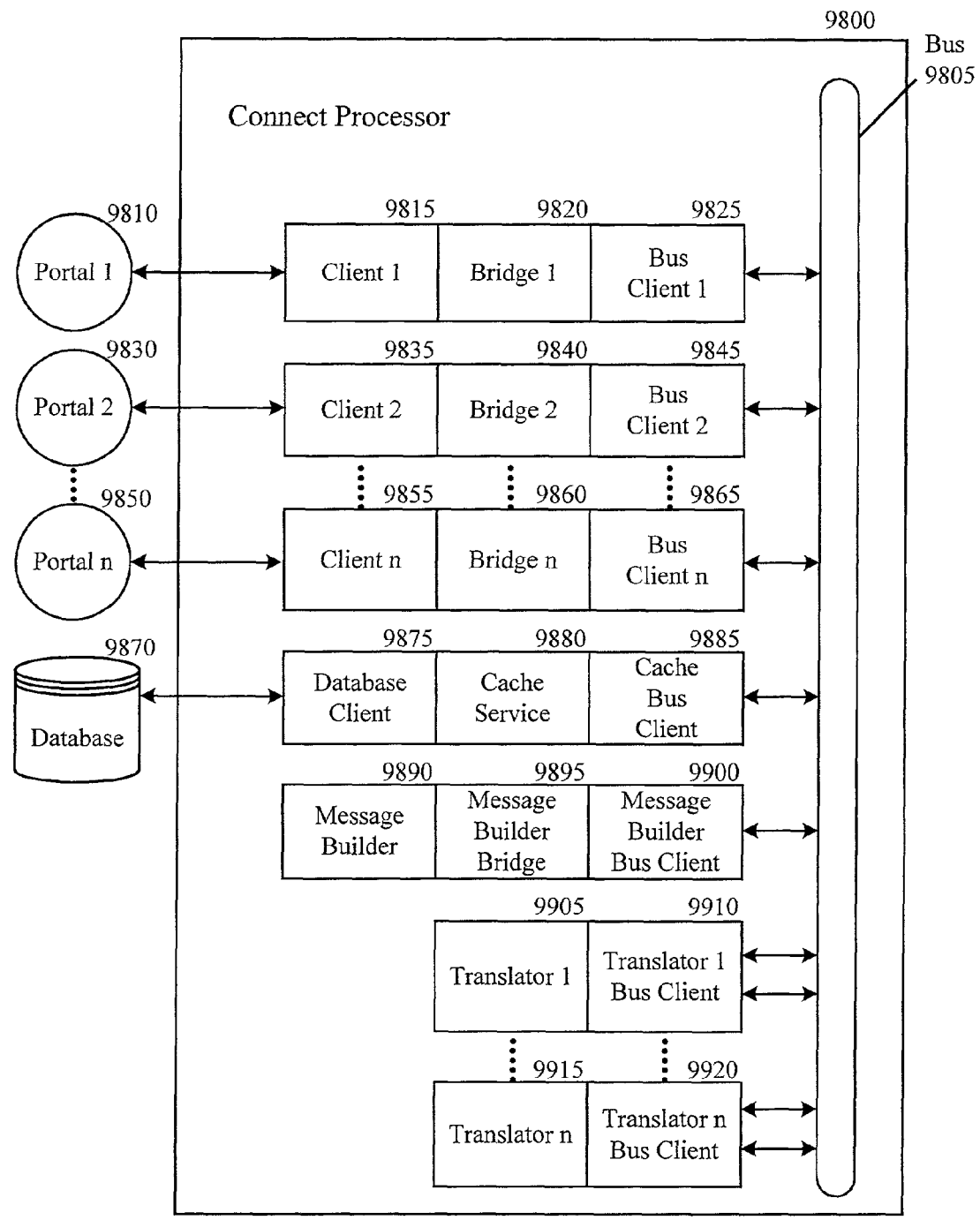

FIG. 124 shows a diagram of the multi-portal Connect Processor included in an embodiment of the present invention.

Figure 125:
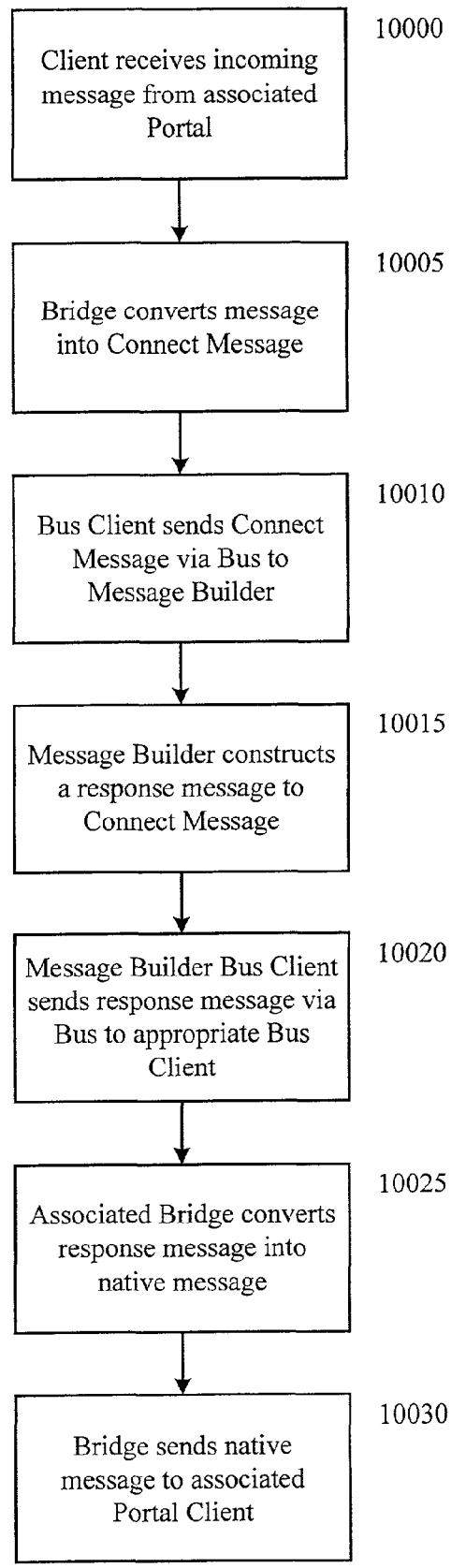

FIG. 125 shows the workflow for message exchange using the multi-portal Connect Processor in an embodiment of the present invention.

Figure 126:
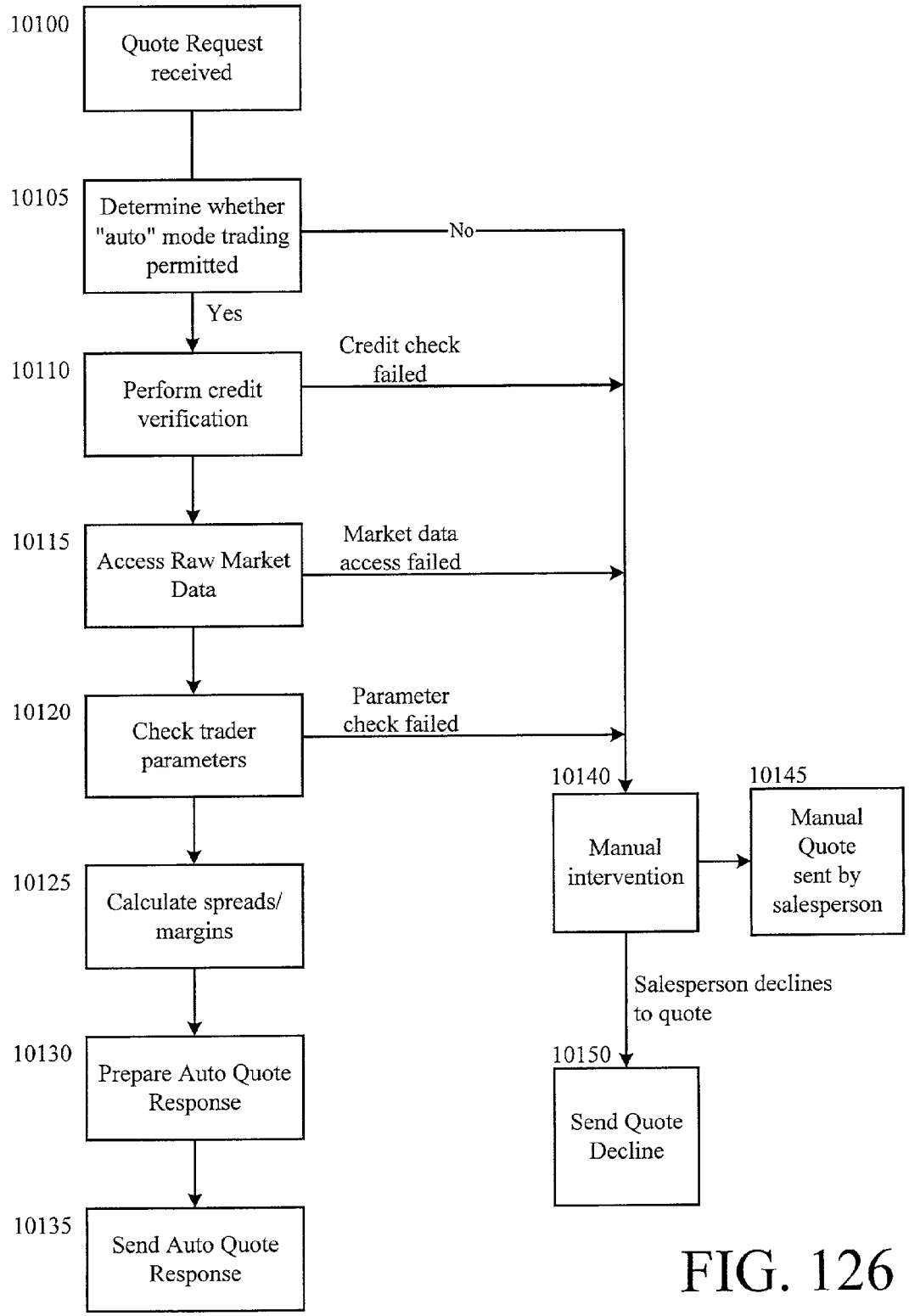

FIG. 126 shows the workflow for the "Auto Dealer" processing engine included in an embodiment of the present invention.

Figure 127:
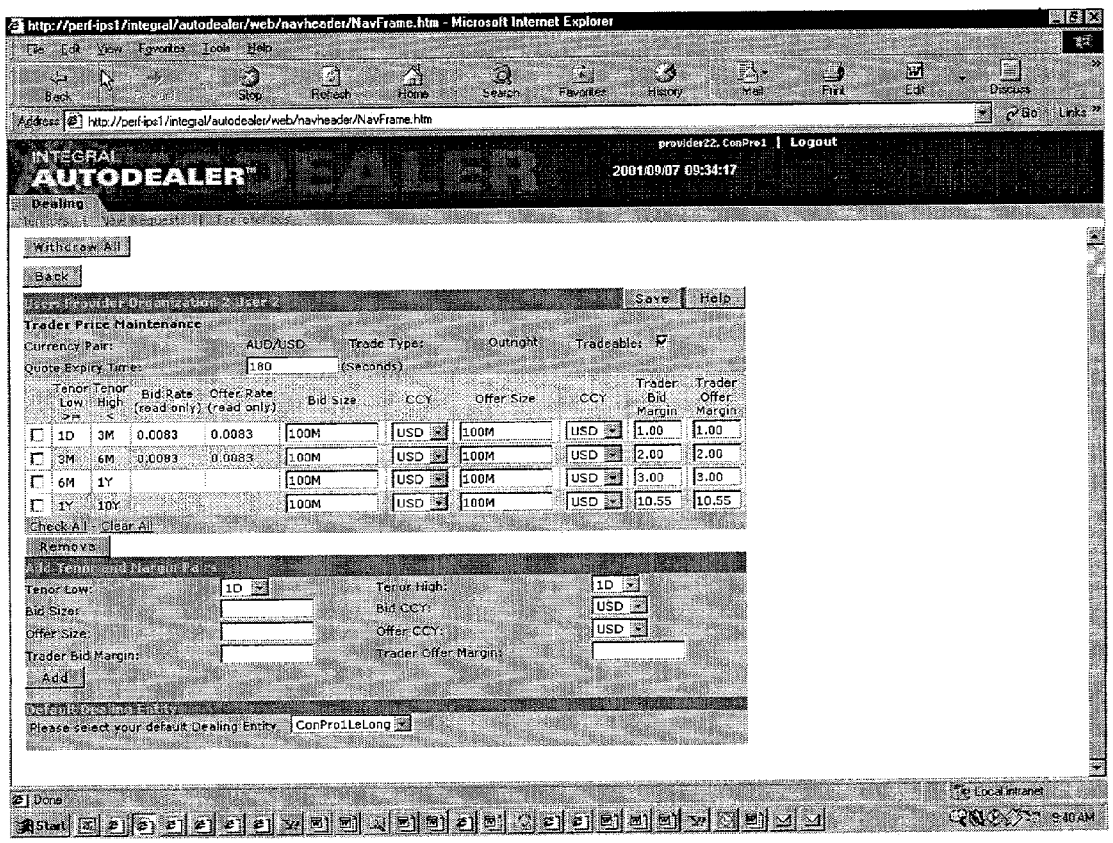

FIG. 127 shows a screen print of an interactive user interface for creating and modifying transaction parameters using the "Auto Dealer" processing engine in an embodiment of the present invention.

Figure 128:
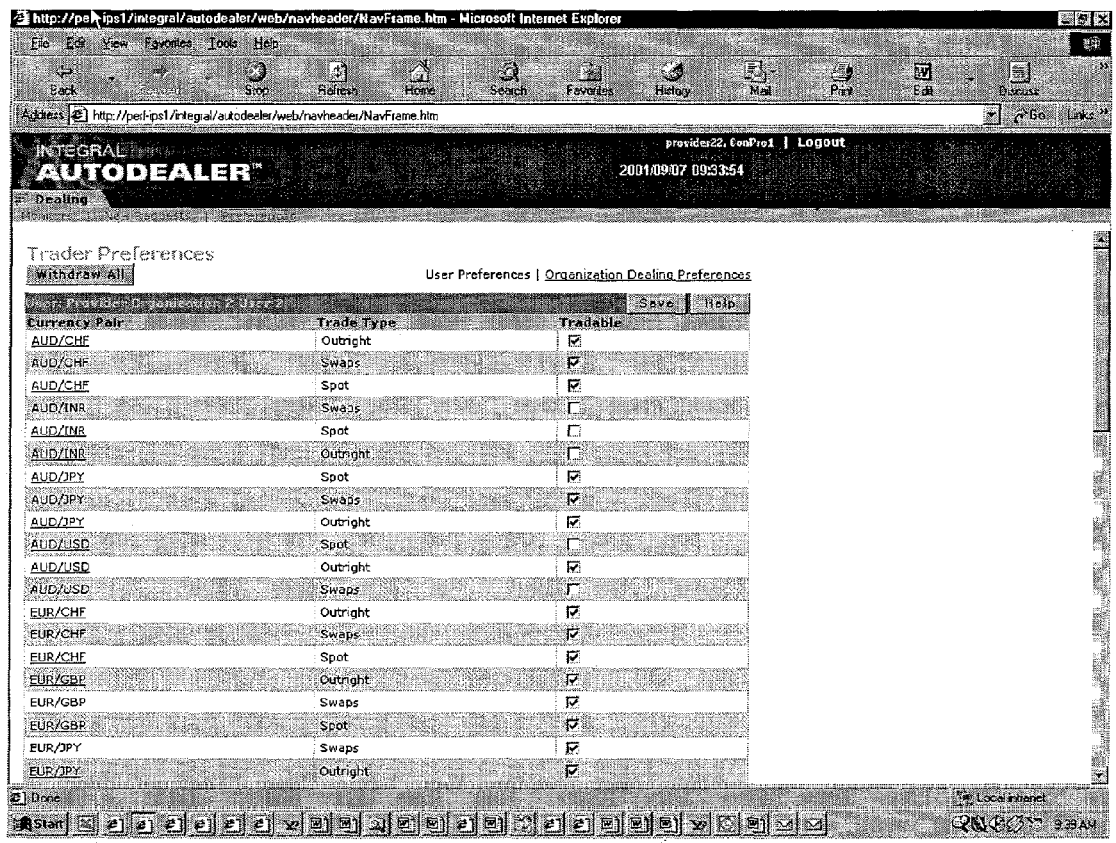

FIG. 128 shows a screen print of an interactive user interface for specifying currency pair and trade type combinations using the "Auto Dealer" processing engine in an embodiment of the present invention.

Figure 129:
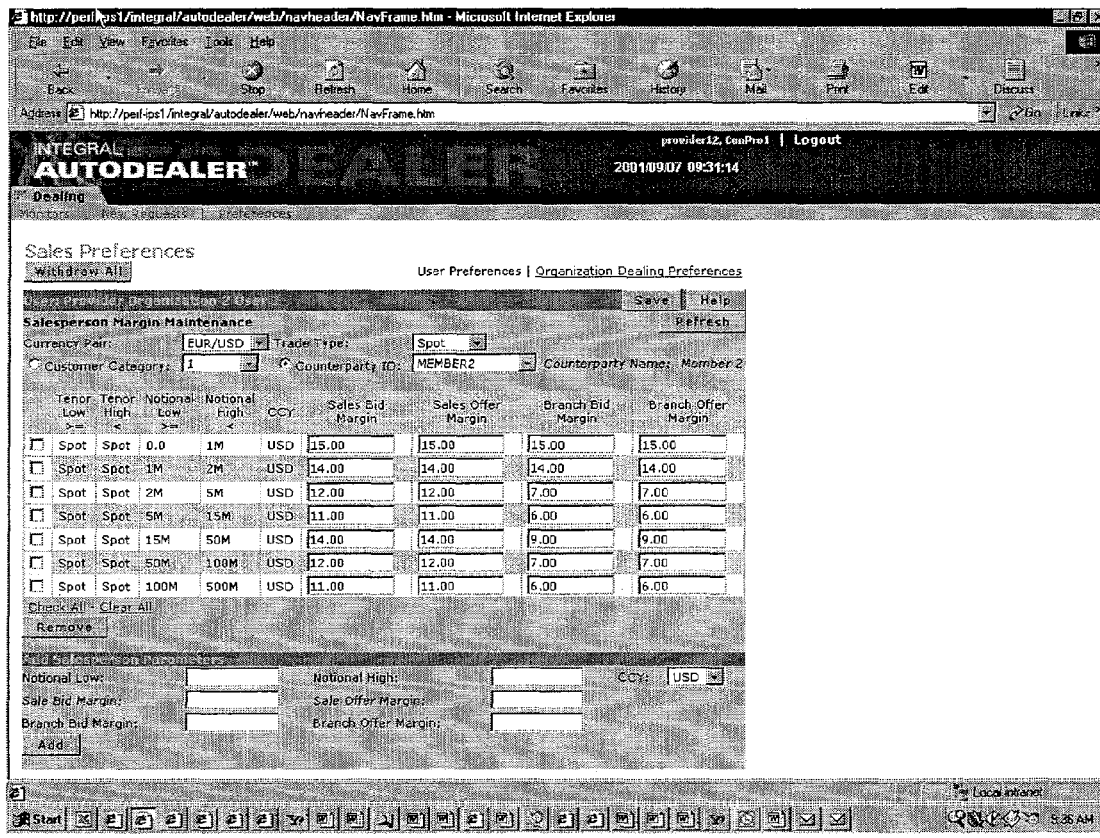

FIG. 129 shows a screen print of an interactive user interface for creating and modifying transaction margins using the "Auto Dealer" processing engine in an embodiment of the present invention.

Figure 130:
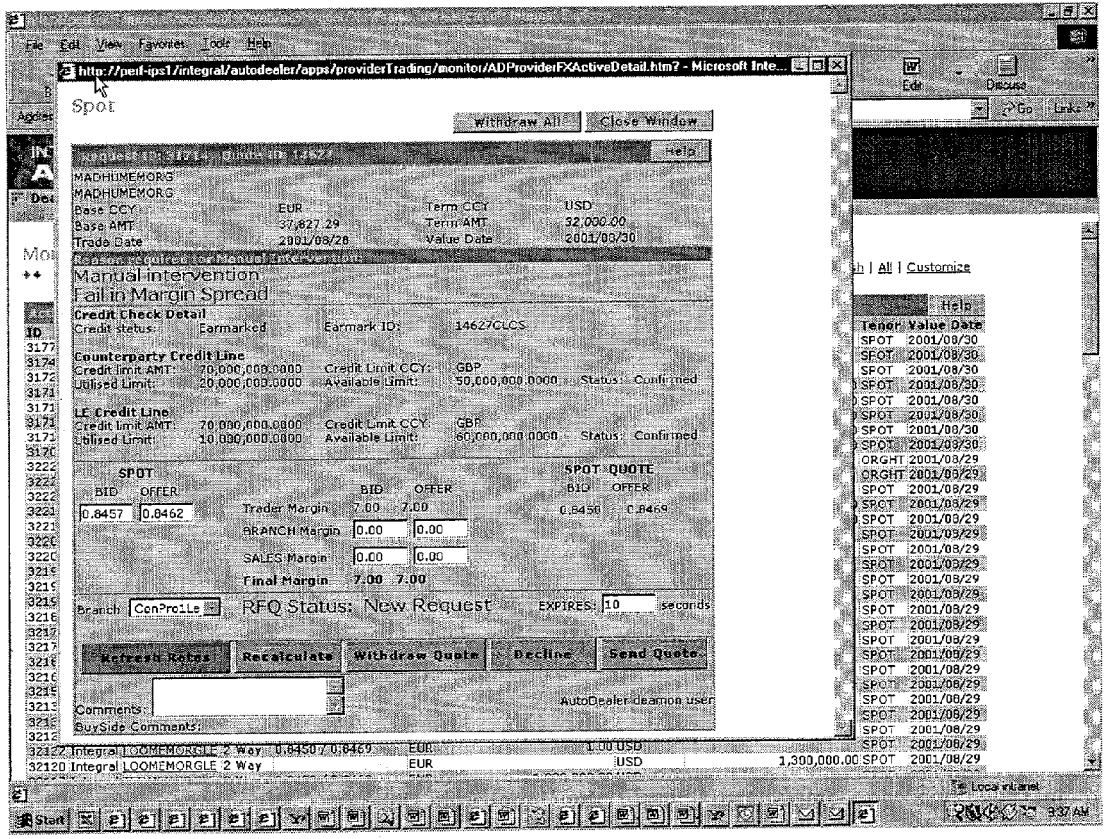

FIG. 130 shows a screen print of an interactive user interface for creating and modifying manual price quotes using the "Auto Dealer" processing engine in an embodiment of the present invention.

FIG. 131 shows a screen print of an interactive user interface for defining "best price" rules using the system in an embodiment of the present invention.

Figure 132:
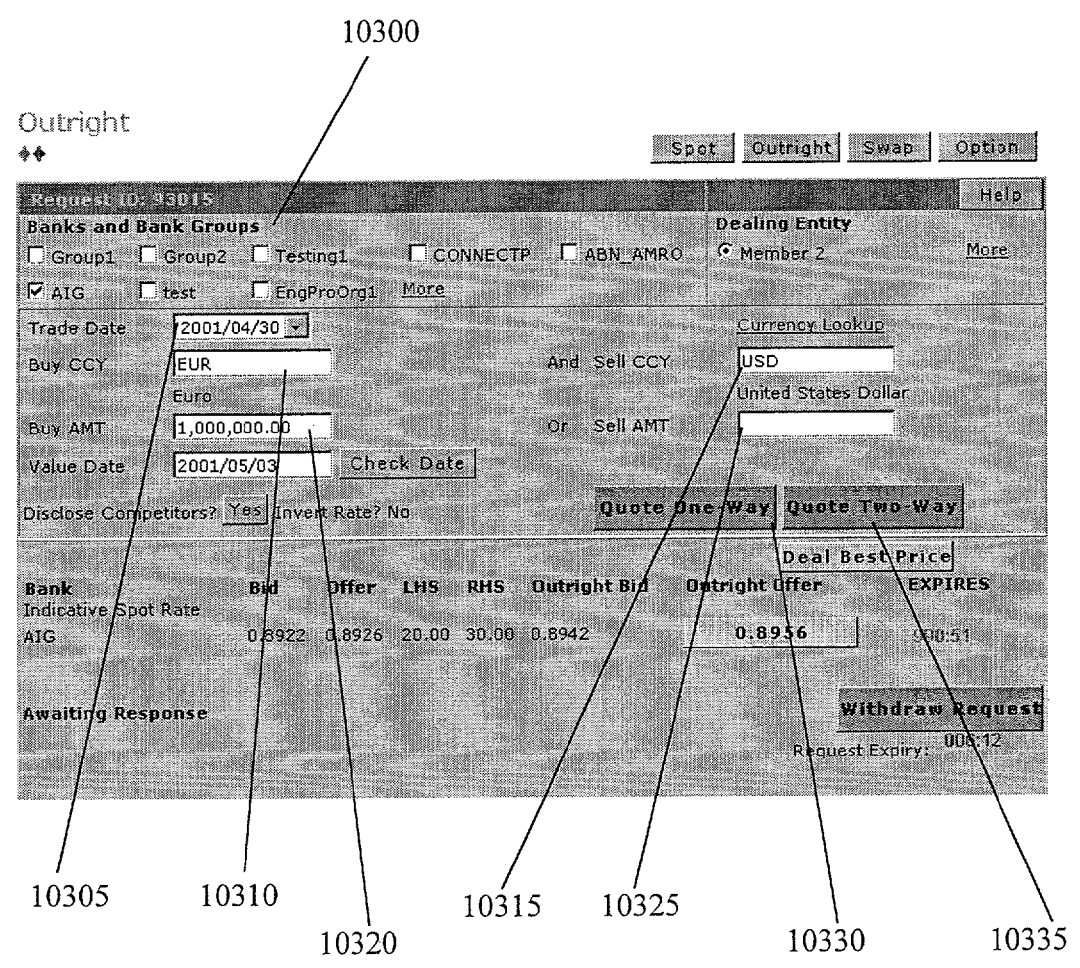

FIG. 132 shows a screen print of an interactive user interface for requesting "two-way" price quotes using the system in an embodiment of the present invention.

Figure 133:
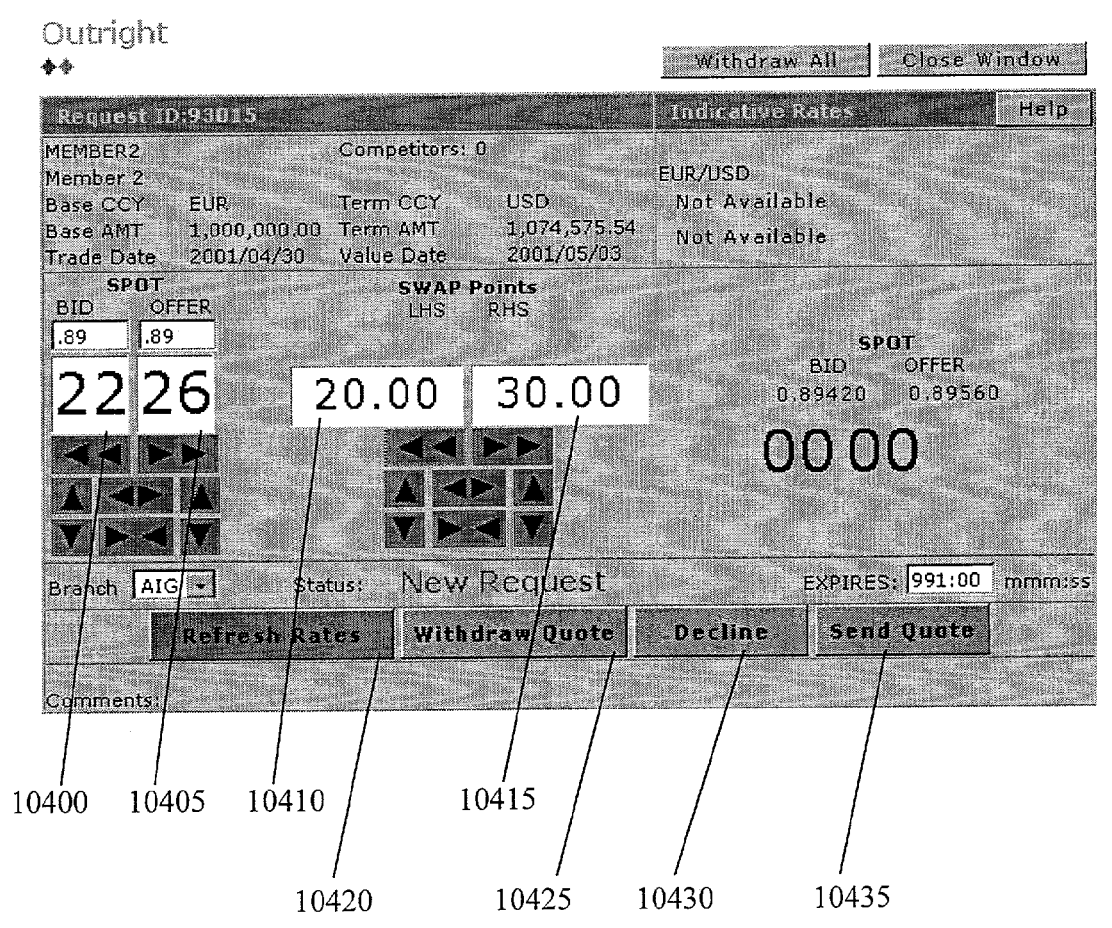

FIG. 133 shows a screen print of an interactive user interface for providing "two-way" price quotes using the system in an embodiment of the present invention.

DETAILED DESCRIPTION OF THE INVENTION

A. System Functionality

The technology of the present invention can be embodied in various forms to provide a platform for conducting interactive and automated financial transactions and management of portfolios and related financial information in capital markets. The platform enables members, including end-users and providers of financial products and services, to engage in the trading of standard and customized financial instruments in capital markets. System functionality includes: capture and pricing of financial instrument trades; presentation of real-time market data; saving of completed trades to a portfolio; management of trading workflow; transmission of trades to end-users' proprietary, back-end systems for pricing, trading, payment processing, confirmation, and settlement; performance of portfolio analysis; performance of risk management analysis; and inter-user communications.

In the present embodiment of the invention, the system includes both server-side and client-side functionality. The server-side functionality enables system users to interactively and seamlessly: engage in financial instrument trades; perform portfolio management, analysis, and reporting; obtain real-time market data and news; communicate with the system and other users via electronic mail, chat, and message boards; and maintain a calendar. The server-side includes interactive system servers that host such user activities, as well as one or more system databases, and an automated messaging server that controls communication with the automated back-end systems of clients.

The client side functionality includes an automated processor that communicates with the automated messaging server of the system side and serves as a seamless interface to the automated back-end systems and proprietary databases of clients. Thus, the system enables organizations with disparate systems and data to engage in transactions using the common functionality and interfaces of this invention. The client side also includes client web browsers that enable interactive communication with the system servers.

The invention described herein provides a standard, XML-based vocabulary to represent and facilitate the financial transactions, as well as a system and method for converting users' data and information to/from the standard vocabulary and communicating such information through the system in an automated manner.

1. Manual Transaction Process

Figure 19:
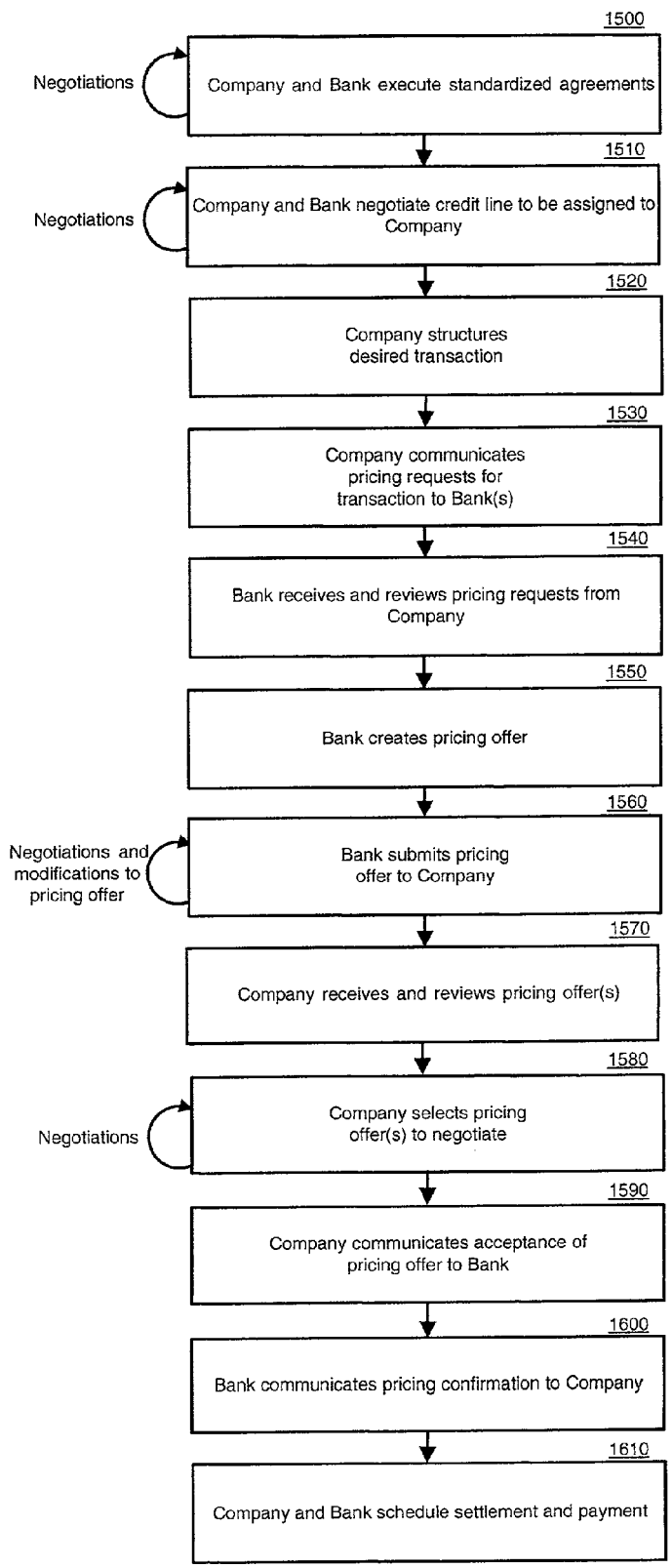
FIG. 19 shows a flowchart of the manual process by which a company and a bank conduct a financial transaction.

FIG. 19 illustrates the steps by which a company and a bank engage in the type of financial transaction that the present invention will facilitate in an interactive and automated manner.

a. Pre-Transaction

When a company and bank decide to engage in financial transactions, the parties first establish their relationship by executing certain standardized agreements (step 1500). Such agreements govern the rules of engagement, rate sources, confirmation and settlement procedures, and other information that can be reused over a series of transaction between the parties. The International Swaps and Derivatives Association, Inc. ("ISDA") <http://www.isda.org> provides certain standardized agreements (e.g., "1992 ISDA Master Agreement") that may be used by the parties for these purposes. The company and bank may engage in multiple iterations of this step, depending upon the number of standardized agreements that the parties will execute.

Next, the company and bank negotiates one or more lines of credit to be assigned by the bank to the company for future transactions (step 1510). In assigning a credit line to a company, the bank analyzes the company's asset portfolio, credit ratings, and type of financial transactions to be executed by company.

b. Transaction

Once the company and bank have established their relationship and negotiated a credit line, the company can commence the process of engaging in a financial transaction. The company must decide on the type of transaction it wishes to execute (e.g., Foreign Exchange Spot, Foreign Exchange Forward, Interest Rate Swap, etc.) and structure the desired transaction (step 1520), including the various details and parameters. For example, the company might specify a Foreign Exchange Spot transaction in which the company desires to buy 1 million Euro currency for U.S. Dollars, with the transaction request set to expire on Dec. 1, 2000 at 11:59 P.M. Pacific Standard Time.

After structuring the transaction, the company communicates a request for pricing of the transaction to one or more banks (step 1530). Each such bank, in turn, receives and reviews the company's pricing request (step 1540). If interested in the company's transaction, the bank can create a pricing offer for the transaction (step 1550) and submit the pricing offer (i.e., price quote) to the requesting company (step 1560). Each pricing offer typically has an expiration period because of constantly changing market conditions, and the bank may submit modified pricing offers to the company, based on market conditions and negotiations.

The company receives and reviews any pricing offers submitted by banks (step 1570). The company selects one or more pricing offers (step 1580) and negotiates with the particular bank(s) who provided the offer(s). The number of iterations of negotiations depends upon the market volatility and other conditions. Upon completion of such negotiations regarding pricing offers, the company accepts a pricing offer and communicate its acceptance to the offering bank (step 1590).

c. Post-Transaction

Upon receipt of the company's acceptance of its pricing offer, the bank sends confirmation of the transaction to the company (step 1600), including specific terms, payment dates, and amounts. Following confirmation, the company and bank schedule settlement of the transaction and future payments related to the transaction (step 1610).

2. System Architecture Overview

Figure 1:
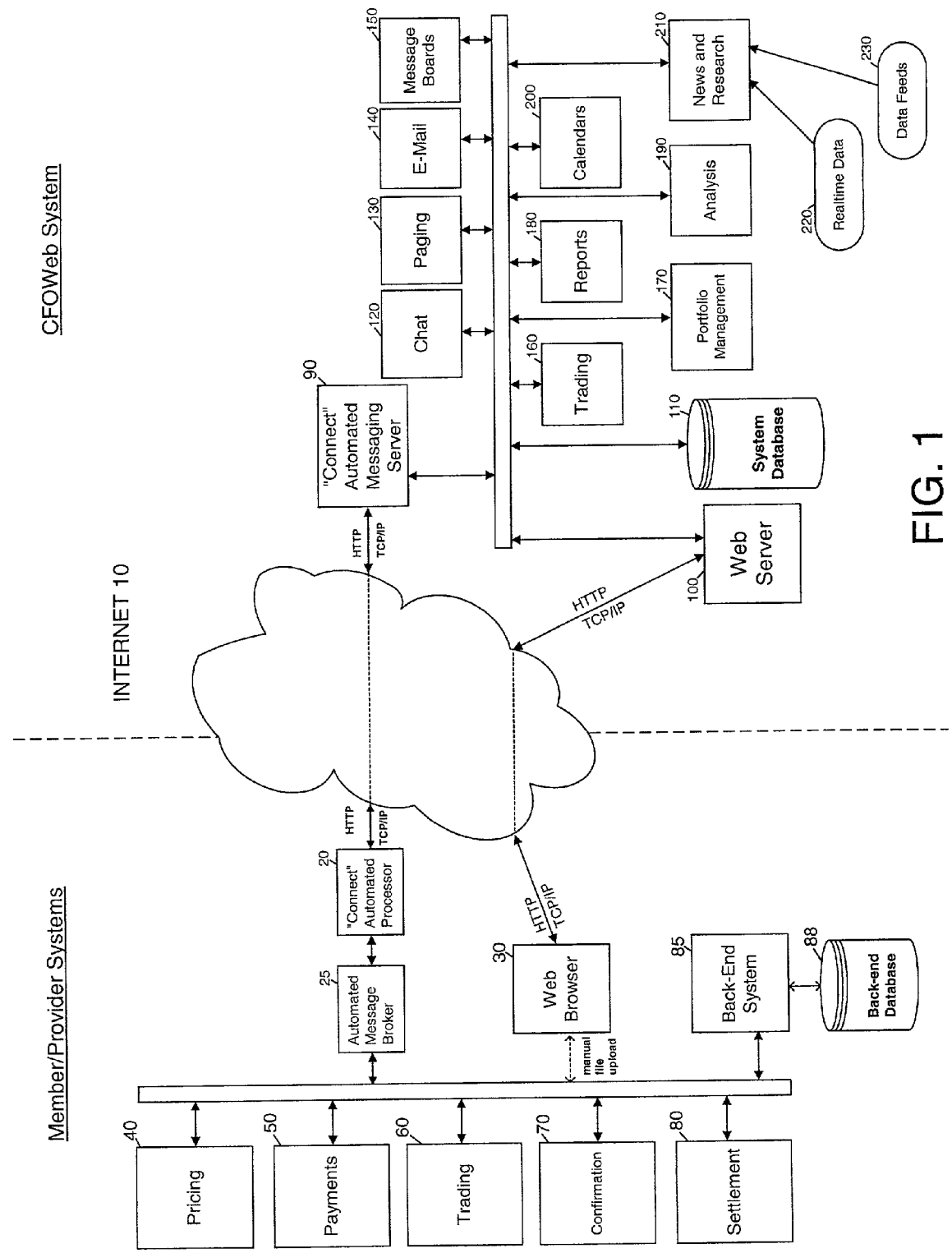
FIG. 1 shows the architecture of an embodiment of the present invention.

FIG. 1 illustrates the architecture of one embodiment of this invention. This embodiment is presented for purposes of illustration and description, and other embodiments will be apparent to and could be implemented by practitioners skilled in this art.

In describing the present embodiment of this invention, the descriptive terms "Member" and "Provider" are used to identify the parties on the opposite sides of financial transactions (e.g., buyer and seller of foreign exchange). In this and other embodiments of this invention, however, users defined as "Members" can engage in transactions with other "Members", and users defined as "Providers" can engage in transactions with other "Providers"; in such transactions, one user will occupy the position of "Member" and utilize the "Member" functionality, and the other user will occupy the position of "Provider" and utilize the "Provider" functionality.

a. Server Side

The server side (sometimes referred to as the "CFOWeb System" in this embodiment) communicates with the client side (consisting of users known as "Members", e.g., corporations and institutional investors, and "Providers", e.g., financial institutions) via the Internet (including the World Wide Web) 10. The server side includes a variety of interactive system servers that provide functionality to users. Web server 100 enables communications (through the Internet via a transfer protocol such as, e.g., HyperText Transfer Protocol ("HTTP") or TCP/IP) between users who connect to the server side through their web browsers 30 and the various system servers. Trading server 160 provides a graphic user interface and applications that enable users to interactively trade financial derivatives among each other. Portfolio management server 170 provides a graphic user interface and applications that enable users to manage their portfolios of financial derivatives. Reports server 180 provides a graphic user interface and applications that enable users to run and produce standard and customizable reports regarding their portfolios, including mark to market, upcoming events, and trade lists. Analysis server 190 provides a graphic user interface and applications that enable users to run analytics against their portfolios, including valuation, and interest rate sensitivity. Calendar server 200 provides a graphic user interface and applications that enable users to automatically calendar key dates regarding settlement, payments, cash flows, and other details related to their financial derivative transactions and portfolios. News and research server 210 provides a graphic user interface and applications that enable users to obtain real-time market data and financial and other news, as well as proprietary third-party data feeds. News and research server 210 includes connections to real-time market data feeds and news services 220 and third-party data feeds 230.

The interactive system servers also include servers that enable communication among system users and administrators. Chat server 120 provides real-time chat, thus enabling users to engage in discussion forums related to financial derivatives. Paging server 130 enables users to build a messaging community and determine which users are online and available to receive messages at a given instance (i.e., instant messaging). E-mail server 140 provides an intra-system electronic mail vehicle, enabling communications among users and system administrators, including all aspects of a financial trade from quote requests to settlement. Message boards server 150 provides an arena for users and system administrators to post and read system-wide messages, as well as quote requests and quotes.

Automated messaging server 90 (sometimes referred to as the "Connect Messaging Server" in this embodiment) controls communications (through the Internet via a transfer protocol, e.g., HTTP or TCP/IP) between the various system servers of the server side and users whose internal, back-end systems 85 execute automated processes that require communication with the server side. Such automated processes could include transaction pricing 40, payment scheduling and journaling 50, derivatives trading 60, trade confirmation 70, and trade settlement 80. Communications between Connect Messaging Server 90 and the client side pass through automated processor 20 (sometimes referred to as the "Connect Processor" in this embodiment)—which shares the same functionality as automated messaging server 90—and automated message broker 25 and are facilitated using the "FinXML" vocabulary and the "FinScript" processing language, as described below.

The CFOWeb System includes one or more system databases 110, which store data related to the processing of financial transactions, as well as user communications and interactions with the system servers.

b. Client Side

The client side includes functionality that enables users—Members and Providers—to communicate, either interactively or in an automated manner, with the various system servers. Web browser 30 enables interactive communications (through the Internet via a transfer protocol, e.g., HTTP or TCP/IP) between users and the CFOWeb System with connection made on the server side at web server 100. Interactive communications might include: requesting price quotes (Members), monitoring and reviewing quote requests (Providers), issuing price quotes (Providers), monitoring and reviewing price quotes (Members), negotiation between Members and Providers, acceptance of price quotes (Members), reporting, portfolio management, analysis of financial information and market data, calendaring, and communications among Members, Providers, and/or system administrators, including e-mail, chat, and message boards.

Alternatively, users can communicate with the server side in an automated manner via Connect Processor 20 (and automated message broker 25) which communicates (through the Internet via a transfer protocol, e.g., HTTP or TCP/IP) with Connect Messaging Server 90. Such automated communications enable users' internal back-end systems 85 (which include one or more back-end databases 88) to execute automated processes, which could include transaction pricing 40, payment scheduling and journaling 50, derivatives trading 60, trade confirmation 70, and trade settlement 80. Such communications are facilitated using the "FinXML" vocabulary and the "FinScript" processing language, as described below.

3. Financial Transaction Functionality

For system users—Members and Providers—the functionality included in an embodiment of this invention can be categorized as follows: pre-transaction, transaction, post-transaction, and general. The present invention (i) automates and/or (ii) provides an interactive interface for such functionality.

a. Pre-Transaction

Figure 2:
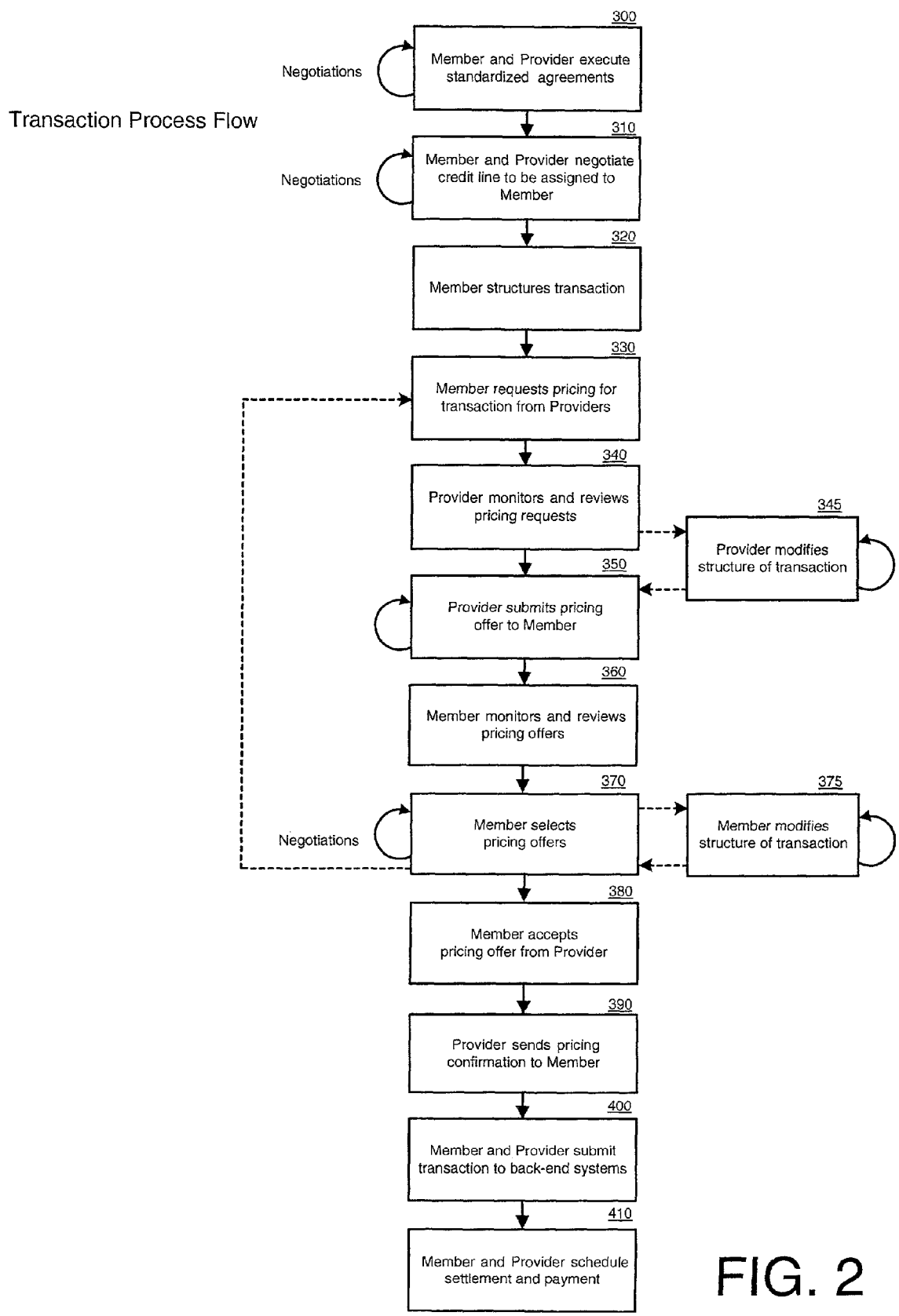
FIG. 2 shows a flowchart of the process by which Members and Providers conduct a financial transaction in an embodiment of the present invention.

Members and Providers (or in other embodiments of this invention, Members and Members) that engage in a financial transaction of a type enabled by this invention proceed through a series of steps illustrated in FIG. 2. When a Member and Provider decide that they may engage in financial transactions in the future, the parties establish their relationship by executing certain agreements (step 300). Such agreements (e.g., "1992 ISDA Master Agreement") govern the rules of engagement, rate sources, confirmation and settlement procedures, and other information that can be reused over a series of transaction between the parties. The parties can carry out this step by using the interactive e-mail function of the system (provided by e-mail server 140 in FIG. 1) to exchange information to be included in the agreements. In addition, by combining off-the-shelf electronic signature software with the system, the parties can electronically sign and exchange the standardized agreements. Members and Providers may engage in multiple iterations of this step, depending upon the number of standardized agreements that the parties will execute.

Next, the Member and Provider will negotiate one or more lines of credit to be assigned by the Provider to the Member for future transactions (step 310). Each Member will negotiate such line(s) of credit with each Provider with which the Member intends to engage in future transactions. In assigning a credit line to a Member, the Provider will analyze the Member's asset portfolio, credit ratings, and type of financial transactions to be executed by Member. The parties can carry out this step via the "Credit Relationships" interactive user interface shown in FIG. 83 (described below), in which a Member can specify one or more Providers to receive electronic requests via the system to establish credit relationships. Alternatively, the parties can carry out this step using the interactive e-mail function of the system (provided by e-mail server 140 in FIG. 1), the paging (instant messaging) function of the system (provided by paging server 130 in FIG. 1), or the chat function of the system (provided by e-mail server 120 in FIG. 1) to exchange information during the credit line negotiations.

b. Transaction

Once the Member and Provider have established their relationship and negotiated a credit line, the Member can commence the process of engaging in a financial transaction. The Member must decide on the type of transaction it wishes to execute (e.g., Foreign Exchange Spot, Foreign Exchange Forward, Interest Rate Swap, etc.) and structure the desired transaction (step 320). In this step, the Member will use the interactive trading function of the system (provided by trading server 160 in FIG. 1), including graphic user interfaces and tools. Depending upon the type of transaction, the structure might include pricing variables, an expiration period, a list of Providers to whom the Member would like to request pricing, and any other particulars specific to the Member and the desired transaction. For example, a Member might specify a Foreign Exchange Spot transaction in which the Member desires to buy 1 million Euro currency for U.S. Dollars, with the transaction request set to expire on Jul. 30, 2000 at 11:59 P.M. Pacific Standard Time.

After structuring the transaction, the Member submits a request for pricing of the transaction to one or more Providers (step 330), using the interactive trading function of the system (provided by trading server 160 in FIG. 1). Alternatively, the Member might communicate a request for pricing directly to a particular Provider using the interactive e-mail function of the system (provided by e-mail server 140 in FIG. 1). Such an e-mail communication would include a URL to the structured transaction and request for pricing.

Providers monitor and review the Member's pricing request (step 340) via communications between the automated messaging server 90 and automated processor 20, as will be described below. Such communications result in the posting of pricing requests on a request-monitoring interface hosted by the system. Upon reviewing the transaction and pricing request on the interactive monitoring interface, including information about the particular Member (unless the Member's identity was not disclosed), a Provider can create and submit a pricing offer (i.e., price quote) to the requesting Member (step 350). The Provider creates the pricing offer using the interactive interfaces (described below) controlled by trading server 160. The submission of the pricing offer occurs via a communication between the automated processor 20 and automated messaging server 90, as will be described below. Each pricing offer typically has an expiration period because of constantly changing market conditions, and the Provider may submit multiple iterations of modified pricing offers to the Member. In some embodiments of this invention, the Provider can modify the structure of the Member's transaction (e.g., change the transaction amount) (step 345) before creating and submitting the pricing offer to the Member. Such modification may proceed through multiple iterations.

The Member can monitor and review any pricing offers submitted by Providers (step 360) on an interactive monitoring interface hosted by the system. The Member will select one or more pricing offers (step 370) and negotiate with the particular Provider(s) who provided the offer(s). In the present embodiment, such negotiations may occur using the interactive e-mail function of the system (provided by e-mail server 140 in FIG. 1), the paging (instant messaging) function of the system (provided by paging server 130 in FIG. 1), or the chat function of the system (provided by chat server 120 in FIG. 1), or through traditional methods (e.g., telephone calls). The number of iterations of negotiations will depend upon the market volatility and other conditions. In other embodiments of this invention, such negotiations may be unnecessary if certain parameters are met by a Provider's pricing offer. Note that at this stage in the process, the Member may decide to modify the structure of the Member's original transaction (e.g., change the transaction amount) (step 375) and submit a new pricing request to one or more Providers (step 330). Such modification may proceed through multiple iterations.

Following negotiations regarding pricing offers, the Member will accept the best pricing offer (step 380) and communicate its acceptance to the Provider using the interactive trading function of the system (provided by trading server 160 in FIG. 1). The Provider will receive the Member's acceptance via communications between the automated messaging server 90 and automated processor 20, as will be described below. Such communications result in the posting of the Member's acceptance of the pricing offer on the request monitoring interface hosted by the system.

c. Post-Transaction

Upon receipt of the Member's acceptance, the Provider sends confirmation of the transaction to the Member (step 390), including specific terms, payment dates, and amounts. The Provider sends the confirmation information to the Member via communications between the automated processor 20 and the automated messaging server 90, as will be described below. The Provider's back-end system 85 provides automated processing of this information.

Following confirmation, the Member and Provider will submit the transaction to their respective back-end systems 85 (step 400) for purposes including internal accounting and payment scheduling. This step can be handled by the system via an automated connection between the automated processor 20 and the back-end system 85. Using their respective back-end systems 85, the Member and Provider schedule settlement of the transaction and future payments (step 410).

d. General

Interactive system functionality that can be accessed and implemented at any time by the Member and Provider includes: reporting; portfolio management; risk management; analysis of financial information and market data; e-mail communication with Members, Providers, and system administrators; chat with Members and Providers; message boards; calendaring; and paging. This functionality is made available to Members and Providers via buttons and/or pull-down menus on the system's interactive user interfaces (described below).

B. Automated Processing and Transferring of Financial Information

The present embodiment of this invention supports financial transactions between Members and Providers by providing automated processing and transfer of the underlying financial information between the messaging server of the server side and the automated processor of the client side. The system enables such processing and transfer by using a novel tag-based language—FinXML™—that describes financial instrument trades, including transaction-specific data, reference data, and market data. FinXML conforms to the *Extensible Markup Language (XML) 1.0 Recommendation* (Feb. 10, 1998), World Wide Web Consortium (Massachusetts Institute of Technology, Institut National de Recherche en Informatique et en Automatique, Keio University) <http://www.w3.org/TR/REC-xml>. The XML Recommendation describes a set of rules for conforming documents that is based around the use of element tags which mark the components of a document or describe the structure of data files as textual documents.

FinXML also conforms to the 1991 *ISDA Definitions* (and 1998 *Supplement*) of the International Swaps and Derivatives Association, Inc. ("ISDA") <http://www.isda.org>. The ISDA Definitions provide a set of standard terms for use in privately-negotiated financial derivatives transactions. The element tags and attribute names and values defined in FinXML, as described below, correspond to the terms defined in the ISDA Definitions.

FinXML, as a type of XML vocabulary, is ideally suited to electronic transmission over corporate intranets, extranets, and the Internet (including the World Wide Web), using a transfer protocol such as HTTP or TCP/IP. The HTTP protocol is intended to transmit text documents such as the HyperText Markup Language ("HTML") documents used to describe the pages to be displayed in a Web browser. XML documents—and, thus, FinXML documents—are similar to HTML documents in that both types of documents are text-based, both consist of a mixture of element tags and data content, and both may include references to other external material.

In a basic financial transaction between two organizations, a financial transaction encoded in XML is sent using a transfer protocol such as HTTP or TCP/IP from a client application of one organization to a server of the other organization. The server, in turn, sends back a response that is also encoded in XML.

As will be described below, the present embodiment of this invention includes a novel method of encoding/decoding financial objects to/from FinXML (or other XML) documents using the automated processor 20 (also known as "Connect Processor") and automated messaging server 90 (also known as "Connect Messaging Server"). In a financial transaction between two organizations, one organization (e.g., a Member) submits a Java object to automated processor 20 which, as will be described below, uses a XML mapping and Fin-Script™—proprietary stylesheets created in Extensible Stylesheet Language ("XSL")—to create a FinXML (or other XML) document that can be sent using a transfer protocol such as HTTP or TCP/IP to the automated messaging server 90 for conversion to an object and processing on the server side. Following processing, the automated messaging server 90 converts objects to a FinXML (or other XML) document and sends the document to the automated processor 20 which, as will be described below, uses FinScript to create a JavaScript program from the FinXML (or other XML) document. In turn, Java objects are created from the JavaScript program and sent to the other organization (e.g., a Provider). XSL, which serves as the foundation for FinScript, is described in the *Extensible Stylesheet Language (XSL) Version 1.0* (Mar. 27, 2000), World Wide Web Consortium (Massachusetts Institute of Technology, Institut National de Recherche en Informatique et en Automatique, Keio University) <http://www.w3.org/TR/xsl>.

1. FinXML

In the present embodiment of this invention, FinXML documents are distributed between servers in order to communicate the details of financial transactions and related data. The FinXML syntax provides a general structure for all financial transactions. The financial transactions, in turn, consist of underlying elements, each of which contains attributes and/or other elements.

a. Trade Structure

The basic financial transaction element of the FinXML syntax is a "Trade", of which there are multiple types (described below). The Trade element is the root element for the description of each financial transaction object. The Trade element is contained within the Connect message "payload" component (described below).

Figure 3:
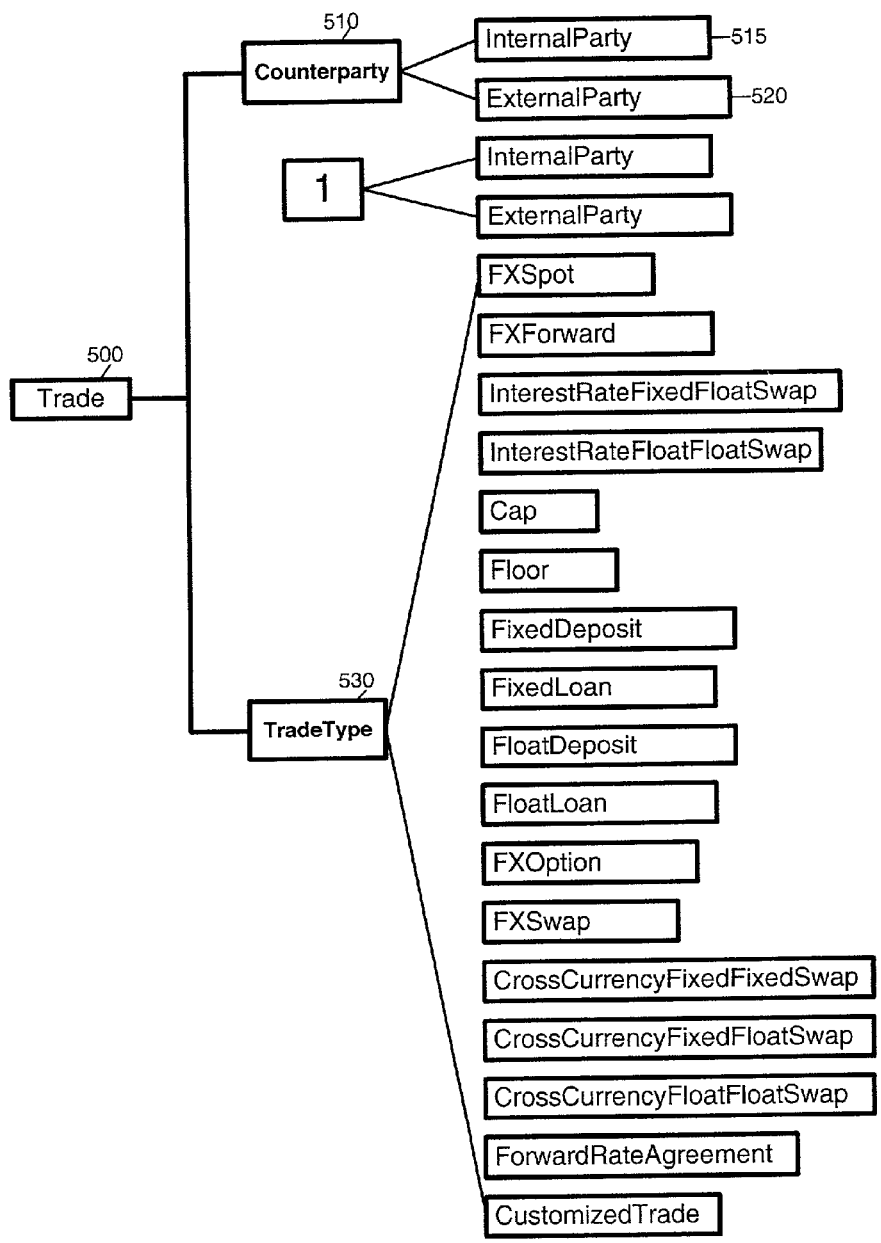
FIG. 3 shows the structure of a FinXML "Trade" element in an embodiment of the present invention.

FIG. 3 illustrates the structure of a Trade element. Trade element 500 contains at least one pair of "Counterparty" elements 510, which are the parties engaged in the transaction. Each Counterparty element 510 can be an "Internal Party" element 515 or an "External Party" element 520 (described below). Trade element 500 also contains a "Trade Type" element 530, which contains one of the following Trade Type sub-elements:

(1) Foreign Exchange ("FX") Spot
(2) FX Forward
(3) Interest Rate Fixed Float Swap
(4) Interest Rate Float Float Swap
(5) Cap
(6) Floor
(7) Fixed Deposit
(8) Fixed Loan
(9) Float Deposit
(10) Float Loan
(11) FX Option
(12) FX Swap
(13) Cross Currency Fixed Fixed Swap
(14) Cross Currency Fixed Float Swap
(15) Cross Currency Float Float Swap
(16) Forward Rate Agreement
(17) Customized Trade Each Trade Type element represents a different type of financial transaction, which will be described separately below. Note that other embodiments of this invention may include combinations of one or more of the Trade Type elements described herein, as well other trade types.

In the present embodiment of this invention, Trade element 500 has the following XML definition:

```
<!ELEMENT trade (% parties;, (fxSpot | fxForward | interestRateFixedFloatSwap |
interestRateFloatFloatSwap | cap | floor | fixedDeposit | fixedLoan | floatDeposit | floatLoan | fxOption |
fxSwap | crossCurrencyFixedFixedSwap | crossCurrencyFixedFloatSwap | crossCurrencyFloatFloatSwap |
forwardRateAgreement | customizedTrade))>
<!ATTLIST trade tradeId CDATA #REQUIRED isBuiltFromParameters CDATA #IMPLIED >
``` b. Financial Transaction Data

The FinXML syntax describes various types of data that comprise a financial transaction, including transaction data, reference data, and market data. Each of these types of data includes elements and attributes. Note that the elements, attributes, and definitions of the types of data described herein are illustrative of one embodiment of this invention; other embodiments of this invention may include some or all of these elements, attributes, and/or definitions as well as other elements, attributes, and/or definitions to describe the included types of data.

i. Transaction Data

Transaction data describes the various components of a financial transaction or trade. These components include "Counterparty" elements, "Trade Type" elements, "Trade Specific" elements, "Financial Event" elements, and "Calculation" elements.

(a) Counterparty Elements

In a financial transaction of the type described by FinXML, there are typically two parties, also referred to as "counterparties". As described above, FinXML describes such parties to a transaction with Counterparty element 510 (as shown in FIG. 3), including an Internal Party element and an External Party element. In the present embodiment of this invention, Counterparty element 510 has the following XML definition:

```
<!ENTITY %counterParty "internalParty | externalParty">
<!ENTITY %parties "(%counterParty;), (%counterParty;)">
```

In each transaction, from the perspective of an organization, that organization is the "internal" party and the other, unrelated organization is the "external" party, e.g., a corporation and a third-party bank that engages in a foreign exchange transaction. Alternatively, where a corporation engages in a transaction with a subsidiary legal entity within the corporation, the subsidiary is also an "internal" party.

Figure 4:
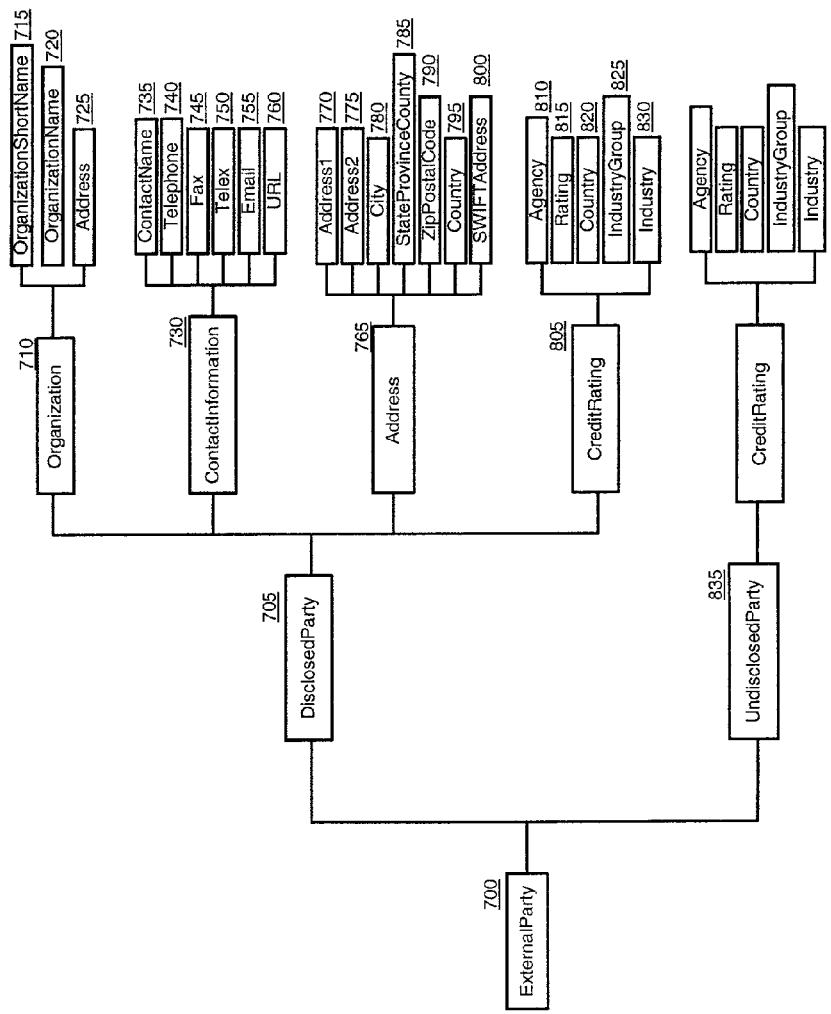
FIG. 4 shows the structure of a FinXML "External Party" element in an embodiment of the present invention.

FIG. 4 illustrates the structure of the External Party element 700, which represents an external party to a transaction. Each external party can be either a "disclosed party" or an "undisclosed party". In the present embodiment of this invention, External Party element 700 has the following XML definition:

```
<!ELEMENT externalParty ((disclosedParty |undisclosedParty)) >
<!ATTLIST externalParty id ID #IMPLIED type CDATA #IMPLIED >
```

Disclosed Party element 705 represents a party to a transaction (e.g., a Member) whose details, including corporate identification, are fully known to the other party to the transaction. Each Disclosed Party element 705 includes the following sub-elements (described in greater detail below in the discussion regarding "Reference Data" elements): Organization 710, Contact Information 730, Address 765, and Credit Rating 805. In the present embodiment of this invention, Disclosed Party element 705 has the following XML definition:

```
<!ELEMENT disclosedParty (organization, contactInformation*,
address, creditRating+)>
```

Undisclosed Party element 835 represents a party that remains anonymous to the other party; the only information disclosed is the party's credit rating. Thus, each Undisclosed Party element 835 includes the Credit Rating 805 element (described in greater detail below in the discussion regarding "Reference Data" elements). In the present embodiment of this invention, Undisclosed Party element 805 has the following XML definition:

```
<!ELEMENT undisclosedParty (creditRating+)>
```

Figure 5:
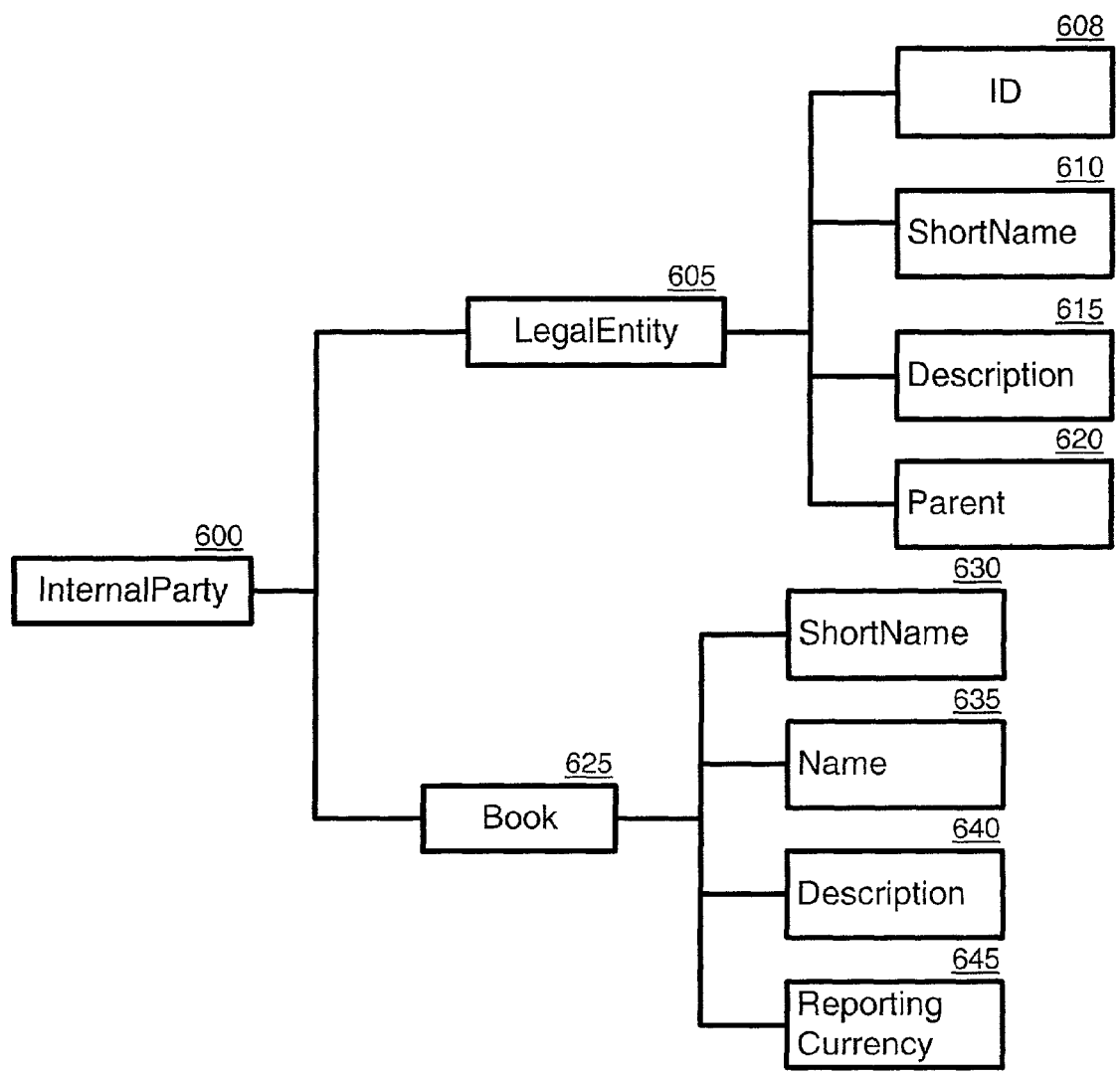
FIG. 5 shows the structure of a FinXML "Internal Party" element in an embodiment of the present invention.

FIG. 5 illustrates the structure of the Internal Party element 600, which represents an internal party to a transaction. Internal Party element 600 includes Legal Entity element 605, which represents each of the separate legal (i.e., corporate) entities associated with the internal party, and Book element 625, which represents the trading book(s) in which a party will group transactions for accounting purposes (described in greater detail below in the discussion regarding "Reference Data" elements). In the present embodiment of this invention, Internal Party element 600 has the following XML definition:

```
<!ELEMENT internalParty (legalEntity?, book?)>
<!ATTLIST internalParty id ID #IMPLIED type CDATA #IMPLIED >
```

(b) Trade Type Elements

As shown in FIG. 3, Trade element 500 includes Trade Type element 530. Each Trade Type element 530, in turn, includes a Trade Type sub-element that describes one type of financial transaction or trade.

(1) Foreign Exchange Spot

A Foreign Exchange Spot ("FX Spot") transaction is one in which one party acquires a specified quantity of one currency in exchange for another currency from another party, to be paid or settled as soon as is standard (i.e., usually two days) in the foreign exchange market. For example, a Member buys from a Provider 2 million Euro for U.S. Dollars to be paid in two days.

The FX Spot element represents such a transaction and includes the following sub-elements and attributes:

"Dealt Amount": the specified amount of currency to be converted into the currency being acquired.

"Settled Amount": the amount of currency being acquired.

"Trade Date": the date on which the currency trade has been agreed to by the parties.

"Value Date": the date on which the traded currencies will be exchanged (i.e., the trade will be settled).

"FX Rate": the foreign exchange rate at which the trade will be executed.

"Base Currency": the currency against which the currency to be acquired will be measured.

"Base Units": the number of units of the Base Currency against which the currency to be acquired will be quoted (usually one unit).

"Quote Currency": the currency to be acquired or the currency to which the quote is pegged.

"Quote Units": the number of units of the Quote Currency to be acquired.

"External ID": one or more identifiers assigned by a user to identify a transaction in its internal or back-end system; optional.

In the present embodiment of this invention, the FX Spot element has the following XML definition:

```
<!-- Foreign Exchange Trades - FXSPOT -->
<!ENTITY % fxTradeSpec "%trade.elements;
        , dealtAmount
        , settledAmount">
<!ELEMENT fxSpot (%fxTradeSpec; )>
<!ELEMENT dealtAmount (currency, amount )>
<!ATTLIST dealtAmount %payReceiver; >
<!ELEMENT settledAmount (currency, (fxRate | amount ))>
<!ATTLIST settledAmount %payReceiver; >
<!ELEMENT fxRate (baseCurrency, baseUnits,
quoteCurrency, quoteUnits, rate )>
<!ELEMENT baseCurrency (#PCDATA )>
<!ELEMENT baseUnits (#PCDATA )>
<!ELEMENT quoteCurrency (#PCDATA )>
<!ELEMENT quoteUnits (#PCDATA )>
<!ENTITY % trade.elements "tradeDate
        , settlementDate?
        , valueDate?
        , externalId?">
```

(2) Foreign Exchange Forward

A Foreign Exchange Forward ("FX Forward") transaction is one in which one party acquires a quantity of one currency in exchange for a specified amount of another currency from another party, with the amounts to be paid on a specified future date. For example, a Member buys from a Provider 2 million Euro for U.S. Dollars to be paid 60 days from the trade date.

The FX Forward element represents such a transaction and includes the following sub-elements and attributes:

"Dealt Amount": the specified amount of currency to be converted into the currency being acquired.

"Settled Amount": the amount of currency being acquired.

"Trade Date": the date on which the currency trade has been agreed to by the parties.

"Value Date": the date on which the traded currencies will be exchanged (i.e., the trade will be settled).

"FX Rate": the foreign exchange rate at which the trade will be executed.

"Base Currency": the currency against which the currency to be acquired will be measured.

"Base Units": the number of units of the Base Currency against which the currency to be acquired will be quoted (usually one unit).

"Quote Currency": the currency to be acquired or the currency to which the quote is pegged.

"Quote Units": the number of units of the Quote Currency to be acquired.

"External ID": one or more identifiers assigned by a user to identify a transaction in its internal or back-end system; optional.

In the present embodiment of this invention, the FX Forward element has the following XML definition:

```
<!-- Foreign Exchange Trades - FXFORWARD -->
<!ENTITY % fxTradeSpec "%trade.elements;
        , dealtAmount
        , settledAmount">
<!ELEMENT fxForward (%fxTradeSpec; )>
<!ELEMENT dealtAmount (currency, amount )>
<!ATTLIST dealtAmount %payReceiver; >
<!ELEMENT settledAmount (currency, (fxRate | amount ))>
<!ATTLIST settledAmount %payReceiver; >
<!ELEMENT fxRate (baseCurrency, baseUnits,
quoteCurrency, quoteUnits, rate )>
<!ELEMENT baseCurrency (#PCDATA )>
<!ELEMENT baseUnits (#PCDATA )>
<!ELEMENT quoteCurrency (#PCDATA )>
<!ELEMENT quoteUnits (#PCDATA )>
<!ENTITY % trade.elements "tradeDate
        , settlementDate?
        , valueDate?
        , externalId?">
```

(3) Interest Rate Fixed-Float Swap

An Interest Rate Fixed-Float Swap is a type of interest rate swap in which two parties exchange periodic payment streams, where one payment stream is based on a fixed interest rate and the other payment stream is based on a floating rate index (e.g., LIBOR), with each payment stream in the same currency. For example, a Member buys from a Provider a fixed payment stream in Euro in exchange for a floating payment stream in Euro based on the LIBOR index.

The Interest Rate Fixed-Float Swap element represents such a transaction and includes the following sub-elements and attributes:

"Trade Date": the date on which the trade has been agreed to by the parties.

"Start Date": the date on which the exchanged payments will begin.

"End Date": the date on which the exchanged payments will end.

"Fixed Leg Details": the details of the fixed interest payments for the fixed leg.

"Float Leg Details": the details of the floating interest payments for the floating leg.

"Events": the various payment and calculation events in the swap transaction, including cash payment, principal payment, interest payment, interest calculation, compound interest calculation, and interest rate reset information.

"External ID": one or more identifiers assigned by a user to identify a transaction in its internal or back-end system; optional.

In the present embodiment of this invention, the Interest Rate Fixed-Float Swap element has the following XML definition:

```
<!-- Interest Rate Fixed Float Swap -->
<!ELEMENT interestRateFixedFloatSwap (tradeDate, startDate,
endDate, externalId?, fixedLegDetails,
floatLegDetails, events?)>
```

(4) Interest Rate Float-Float Swap

An Interest Rate Float-Float Swap is a type of interest rate swap in which two parties exchange periodic payment streams, where each payment stream is based on a floating rate index (e.g., LIBOR), with each payment stream in the same currency. For example, a Member buys from a Provider a floating payment stream in Euro in exchange for a floating payment stream in Euro, where each payment stream is based on the LIBOR index.

The Interest Rate Float-Float Swap element represents such a transaction and includes the following sub-elements and attributes:

"Trade Date": the date on which the trade has been agreed to by the parties.

"Start Date": the date on which the exchanged payments will begin.

"End Date": the date on which the exchanged payments will end.

"Float Leg Details": the details of the floating interest payments; separate information for each of the two floating legs.

"Events": the various payment and calculation events in the swap transaction, including cash payment, principal payment, interest payment, interest calculation, compound interest calculation, and interest rate reset information.

"External ID": one or more identifiers assigned by a user to identify a transaction in its internal or back-end system; optional.

In the present embodiment of this invention, the Interest Rate Float-Float Swap element has the following XML definition:

```
<!-- Interest Rate Float Float Swap -->
<!ELEMENT interestRateFloatFloatSwap (tradeDate, startDate,
endDate, externalId?, floatLegDetails,
floatLegDetails, events?)>
```

(5) Cap

A Cap transaction is one in which one party, in exchange for a premium payment, acquires from another party the right to receive a payment stream (i.e., a series of options ("Caplet")) from the other party with respect to a specified quantity of one currency if, on the scheduled payment dates, the level of a specified rate or index exceeds an agreed "strike rate" for the period involved. For example, a Member purchases from a Provider an interest rate cap at a strike rate of 8 percent on U.S. Dollars based on the 3-month LIBOR for a period of 12 months, in order to hedge its exposure to increasing interest rates on a 10 million U.S. Dollars floating-rate loan based on the 3-month LIBOR.

The Cap element represents such a transaction and includes the following sub-elements and attributes:

"Cap Floor Spec": describes the structured elements common to Cap and Floor transactions.

"Trade Date": the date on which the trade has been agreed to by the parties.

"Settlement Date": the date on which the trade will be settled.

"Start Date": the beginning date of the period for which the interest rate is protected.

"End Date": the date on which the payment stream will end.

"Premium Details": the details of the premium to be paid, as either a percentage ("Premium Percentage") or a specified amount ("Premium Amount"), and the payment date ("Premium Date").

"Strike Rate": the rate that, if exceeded, will trigger the settlement of a single payment (Caplet) within the Cap transaction.

"Buyer": the buyer of the option to be exercised; this is a reference to a Counterparty element.

"Writer": the recipient of the premium for the option to be exercised; this is a reference to a Counterparty element.

"Volatility Spread": the spread over the volatility calculated using the volatility surface; an additional spread for pricing the cap transaction.

"Discount Curve": the definition of the discount curve used to calculate the payment stream.

"Forecast Curve": the definition of the forecast curve used to calculate the payment stream.

"Notional Amount": the amount used as the basis for calculating the payment stream.

"Floating Interest Rate": the floating interest rate.

"First Fixing Rate": the interest rate to be used for the first interest calculation period.

"Day Count": the day-count method to be used for calculating interest.

"Payment Frequency": the frequency of interest/principal payment.

"Roll Date": the specific day each month to be used for payment/settlement of interest/principal.

"Payment Calendar": the calendar to be used for reference to business holidays.

"Rate Reset Calendar": the calendar to be used for reference to business holidays for interest rate resets.

"Date Stub": an indicator for an irregular schedule of payments.

"Anchor Date": the date to which the payment schedule is anchored, i.e., the end date of the first interest period or specific date of first payment; could be the start of the last interest period if dates generated in reverse.

"Amortization Details": details regarding how the payment cashflow should be amortized, including amortization method (e.g., single payment at end, equal payments over term of stream).

"Compounding Details": details regarding how the interest should be compounded, including calculation frequency and rate.

"External ID": one or more identifiers assigned by a user to identify a transaction in its internal or back-end system; optional.

In the present embodiment of this invention, the Cap element has the following XML definition:

"Volatility Spread": the spread over the volatility calculated using the volatility surface; an additional spread for pricing the cap transaction.

"Discount Curve": the definition of the discount curve used to calculate the payment stream.

```
<!-- Cap -->
<!ENTITY % capFloorSpec "premium details
        , strikeRate
        , volatilitySpread
        , discountCurve?
        , forecastCurve?">
<!ELEMENT cap (tradeDate, settlementDate?, startDate, endDate, externalID?,
        %genericSpecDetails; , %floatRateDetails; , %capFloorSpec; , events? )>
<!ATTLIST cap buyer IDREF #REQUIRED writer IDREF #REQUIRED>
<!ELEMENT premiumDetails ( (premiumPercentage | premiumAmount ) , premiumDate)>
<!ELEMENT premiumAmount (%currencyAmount; )>
<!ATTLIST premiumAmount %payReceiverAmount;>
<!ELEMENT premiumPercentage (#PCDATA )*>
<!ATTLIST premiumPercentage %payReceiverAmount;>
<!ELEMENT volatilitySpread (#PCDATA )>
<!ELEMENT discountCurve (#PCDATA )>
<!ELEMENT forecastCurve (#PCDATA )>
```

(6) Floor

A Floor transaction is one in which one party, in exchange for a premium payment, acquires from another party the right to receive a payment stream (i.e., a series of options ("Floorlet")) from the other party with respect to a specified quantity of one currency if, on the scheduled payment dates, the level of a specified rate or index is less than an agreed "strike rate" for the period involved. For example, a Member purchases from a Provider an interest rate floor at a strike floor level of 8 percent on U.S. Dollars based on the 3-month LIBOR for a period of 12 months, in order to protect its investment returns on a 10 million U.S. Dollars money market investment based on the 3-month LIBOR.

The Floor element represents such a transaction and includes the following sub-elements and attributes:

"Cap Floor Spec": describes the structured elements common to Cap and Floor transactions.

"Trade Date": the date on which the trade has been agreed to by the parties.

"Settlement Date": the date on which the trade will be settled.

"Start Date": the beginning date of the period for which the interest rate is protected.

"End Date": the date on which the payment stream will end.

"Premium Details": the details of the premium to be paid, as either a percentage ("Premium Percentage") or a specified amount ("Premium Amount"), and the payment date ("Premium Date").

"Strike Rate": the rate that, if exceeded, will trigger the settlement of a single payment (Floorlet) within the Floor transaction.

"Buyer": the buyer of the option to be exercised; this is a reference to a Counterparty element.

"Writer": the recipient of the premium for the option to be exercised; this is a reference to a Counterparty element.

"Forecast Curve": the definition of the forecast curve used to calculate the payment stream.

"Notional Amount": the amount used as the basis for calculating the payment stream.

"Floating Interest Rate": the floating interest rate.

"First Fixing Rate": the interest rate to be used for the first interest calculation period.

"Day Count": the day-count method to be used for calculating interest.

"Payment Frequency": the frequency of interest/principal payment.

"Roll Date": the specific day each month to be used for payment/settlement of interest/principal.

"Payment Calendar": the calendar to be used for reference to business holidays.

"Rate Reset Calendar": the calendar to be used for reference to business holidays for interest rate resets.

"Date Stub": an indicator for an irregular schedule of payments.

"Anchor Date": the date to which the payment schedule is anchored, i.e., the end date of the first interest period or specific date of first payment; could be the start of the last interest period if dates generated in reverse.

"Amortization Details": details regarding how the payment cashflow should be amortized, including amortization method e.g., single payment at end, equal payments over term of stream).

"Compounding Details": details regarding how the interest should be compounded, including calculation frequency and rate.

"External ID": one or more identifiers assigned by a user to identify a transaction in its internal or back-end system; optional.

In the present embodiment of this invention, the Floor element has the following XML definition:

```
<!-- Floor -->
<!ENTITY % capFloorSpec "premium details
        , strikeRate
        , volatilitySpread
        , discountCurve?
        , forecastCurve?">
```

```
<!ELEMENT floor (tradeDate, settlementDate?, startDate, endDate, externalID?,
    %genericSpecDetails; , %floatRateDetails; , %capFloorSpec; , events? )>
<!ATTLIST floor buyer IDREF #REQUIRED writer IDREF #REQUIRED>
<!ELEMENT premiumDetails ( (premiumPercentage | premiumAmount ) , premiumDate)>
<!ELEMENT premiumAmount (%currencyAmount; )>
<!ATTLIST premiumAmount %payReceiverAmount;>
<!ELEMENT premiumPercentage (#PCDATA )*>
<!ATTLIST premiumPercentage %payReceiverAmount;>
<!ELEMENT volatilitySpread (#PCDATA )>
<!ELEMENT discountCurve (#PCDATA )>
<!ELEMENT forecastCurve (#PCDATA )>
```

(7) Fixed Rate Loan/Deposit

A Fixed Rate Loan/Deposit transaction is one in which one party borrows a sum of money from another party at a fixed interest rate. For example, a Member borrows from a Provider 1 million U.S. Dollars at a fixed interest rate for one year.

The Fixed Loan/Deposit element represents such a transaction and includes the following sub-elements and attributes:

"Trade Date": the date on which the loan has been agreed to by the parties.

"Start Date": the date on which the loan will begin.

"End Date": the date on which the loan will end.

"Lender": the lender of the loan; this is a reference to a Counterparty element.

"Borrower": the borrower of the loan; this is a reference to a Counterparty element.

"Notional Amount": the loan amount.

"Fixed Interest Rate": the fixed interest rate.

"Day Count": the day-count method to be used for calculating interest.

"Payment Frequency": the frequency of interest/principal payment.

"Roll Date": the specific day each month to be used for payment/settlement of interest/principal.

"Payment Calendar": the calendar to be used to generate payment dates.

"Date Stub": an indicator for an irregular schedule of loan payments.

"Anchor Date": the date to which the payment schedule is anchored, i.e., the end date of the first interest period or specific date of first payment; could be the start of the last interest period if dates generated in reverse.

"Amortization Details": details regarding how the loan payment cashflow should be amortized, including amortization method (e.g., single payment at end, equal payments over term of loan).

"Compounding Details": details regarding how the loan interest should be compounded, including calculation frequency and rate.

"External ID": one or more identifiers assigned by a user to identify a transaction in its internal or back-end system; optional.

In the present embodiment of this invention, the Fixed Loan/Deposit element has the following XML definition:

```
<!-- Loan and Deposit -->
<!ELEMENT fixedLoan (tradeDate, startDate, endDate, externalId?, %genericSpecDetails;
    , %fixedRateDetails; , events? )>
<!ATTLIST fixedLoan lender IDREF #REQUIRED
    borrower IDREF #REQUIRED>
<!ELEMENT fixedDeposit (tradeDate, startDate, endDate, externalId?, %genericSpecDetails;
    , %fixedRateDetails; , events? )>
<ATTLIST fixedDeposit lender IDREF #REQUIRED
    borrower IDREF #REQUIRED>
<!ENTITY % genericSpecDetails "notionalAmount
        , dayCount
        , paymentFrequency
        , rollDate
        , anchorDate?
        , paymentCalendar
        , dateStub
        , amortizationDetails?
        , compoundingDetails?">
<!ENTITY % fixedRateDetails " (fixedInterestRate
        | fxRate )">
```

(8) Floating Rate Loan/Deposit

A Floating Rate Loan/Deposit transaction is one in which one party borrows a sum of money from another party at a variable interest rate, generally based on a floating rate index (e.g., London Interbank Offered Rate or "LIBOR"). For example, a Member borrows from a Provider 1 million U.S. Dollars at a variable interest rate for two years.

The Floating Loan/Deposit element represents such a transaction and includes the following sub-elements and attributes:

"Trade Date": the date on which the loan has been agreed to by the parties.

"Start Date": the date on which the loan will begin.

"End Date": the date on which the loan will end.

"Lender": the lender of the loan; this is a reference to a Counterparty element.

"Borrower": the borrower of the loan; this is a reference to a Counterparty element.

"Notional Amount": the loan amount.

"Floating Interest Rate": the floating interest rate.

"First Fixing Rate": the interest rate to be used for the first interest calculation period.

"Day Count": the day-count method to be used for calculating interest.

"Payment Frequency": the frequency of interest/principal payment.

"Roll Date": the specific day each month to be used for payment/settlement of interest/principal.

"Payment Calendar": the calendar to be used to generate payment dates.

"Rate Reset Calendar": the calendar to be used for reference to business holidays for interest rate resets.

"Date Stub": an indicator for an irregular schedule of loan payments.

"Anchor Date": the date to which the payment schedule is anchored, i.e., the end date of the first interest period or specific date of first payment; could be the start of the last interest period if dates generated in reverse.

"Amortization Details": details regarding how the loan payment cashflow should be amortized, including amortization method (e.g., single payment at end, equal payments over term of loan).

"Compounding Details": details regarding how the loan interest should be compounded, including calculation frequency and rate.

"External ID": one or more identifiers assigned by a user to identify a transaction in its internal or back-end system; optional.

In the present embodiment of this invention, the Floating Loan/Deposit element has the following XML definition:

"Expiration Date": the expiration date by which the option must be exercised.

"Dealt Amount": the specified amount of currency to be converted into the currency to be bought or sold upon exercise of the option.

"Settled Amount": the amount of currency to be bought or sold upon exercise of the option.

"Delivery Date": the date on which either the cash difference or the underlying contract nominal amount must be exchanged upon exercise of the option.

"Delivery Mode": indicator of whether the cash difference ("Cash") or the underlying contract nominal amount ("Physical") must be exchanged upon exercise of the option.

"Option Type": the type of option to be exercised ("Put" or "Call").

"Volatility": the definition of the volatility surface used to calculate the option premium.

"Call": amount and currency of the Call option.

"Put": amount and currency of the Put option.

"Buyer": the buyer of the option to be exercised; this is a reference to a Counterparty element.

"Physical": indicates whether the option will be settled on the basis of delivery of an underlying asset.

"Cash" indicates whether the option will be settled on the basis of a net cash payment.

"Writer": the recipient of the premium for the option to be exercised; this is a reference to a Counterparty element.

```
<!-- Loan and Deposit -->
<!ELEMENT floatLoan (tradeDate, startDate, endDate, externalId?, %genericSpecDetails; ,
        %floatRateDetails; , events? )>
<!ATTLIST floatLoan lender IDREF #REQUIRED
        borrower IDREF #REQUIRED>
<!ELEMENT floatDeposit (tradeDate, startDate, endDate, externalId?, %genericSpecDetails;
        , %floatRateDetails; , events? )>
<!ATTLIST floatDeposit lender IDREF #REQUIRED
        borrower IDREF #REQUIRED>
<!ENTITY % genericSpecDetails "notionalAmount
        , dayCount
        , paymentFrequency
        , rollDate
        , anchorDate?
        , paymentCalendar
        , dateStub
        , amortizationDetails?
        , compoundingDetails?">
<!ENTITY % floatRateDetails "floatingInterestRate
        , firstFixingRate?
        , rateResetCalendar">
```

(9) Foreign Exchange Option

A Foreign Exchange Option ("FX Option") transaction is one in which one party, in exchange for a premium payment, acquires from another party the right, but not the obligation, to buy (i.e., exercise a put option) or sell (i.e., exercise a call option) a specified quantity of one currency at a specified price on a specified exercise date or during a specified exercise period. For example, a Member pays a premium to a Provider for the right to exercise an option to purchase 1 million Euro for a set price in U.S. Dollars in three months.

The FX Option element represents such a transaction and includes the following sub-elements and attributes:

"Settlement Date": the date on which the trade will be settled.

"Premium Details": the details of the premium to be paid, as either a percentage ("Premium Percentage") or a specified amount ("Premium Amount"), and the payment date ("Premium Date").

"External ID": one or more identifiers assigned by a user to identify a transaction in its internal or back-end system; optional.

In the present embodiment of this invention, the FX Option element has the following XML definition:

```
<!-- FX Option -->
<!ENTITY % fxOptionSpec "tradeDate
        , settlementDate
        , externalId?
        , premiumDetails
        , expirationDate
        , deliveryDate
        , optionType
        , dealtAmount
        , strikeRate?
        , settledAmount
        , deliveryMode
```

```
    , volatility?">
<!ELEMENT fxOption (%fxOptionSpec; )>
<!ATTLIST fxOption buyer IDREF #REQUIRED
    writer IDREF #REQUIRED>
<!ELEMENT optionType (call | put)>
<!ELEMENT deliveryMode (physical | cash)>
<!ELEMENT volatility (#PCDATA )>
<!ELEMENT call (#PCDATA )>
<!ELEMENT put (#PCDATA )>
<!ELEMENT physical EMPTY>
<!ELEMENT cash EMPTY>
```

(10) Foreign Exchange Swap

A Foreign Exchange Swap ("FX Swap") transaction is one in which two parties exchange two payments ("Near" and "Far"), each in a different currency. The first payment is delivered at the beginning of the transaction period and the second payment is delivered at the end of the transaction period. The payments may be based upon a specified interest rate. For example, a Member buys a payment of 3 million Euro from a Provider in exchange for a payment of 1 million U.S. Dollars to be paid six months after the first payment.

The FX Swap element represents such a transaction and includes the following sub-elements and attributes:

"Trade Date": the date on which the trade has been agreed to by the parties.

"Near Leg Value Date": the date on which the final payment of the first leg (the "Near Leg") of the swap will be paid.

"Far Leg Value Date": the date on which the final payment of the second leg (the "Far Leg") of the swap will be paid.

"Notional Amount": the amount used as the basis for calculating the payments to be exchanged.

"Near Leg Settled Amount": the amount that will be paid under the Near Leg; alternative to Near Leg FXRate.

"Near Leg FXRate": the foreign exchange rate of the Near Leg; alternative to Near Leg Settled Amount.

"Far Leg Settled Amount": the amount that will be paid under the Far Leg; alternative to Far Leg FXRate.

"Far Leg FXRate": the foreign exchange rate of the Far Leg; alternative to Far Leg Settled Amount.

"External ID": one or more identifiers assigned by a user to identify a transaction in its internal or back-end system; optional.

In the present embodiment of this invention, the FX Swap element has the following XML definition:

```
<!-- FXSwap -->
<!ENTITY % fxSwapSpec "tradeDate
    , externalId?
    , nearLegValueDate
    , farLegValueDate
    , notionalAmount
    , (nearLegFXRate | nearLegSettledAmount)
    , (farLegFXRate | farLegSettledAmount)">
<!ELEMENT fxSwap (%fxSwapSpec; )>
<!ELEMENT nearLegValueDate (#PCDATA )>
<!ELEMENT farLegValueDate (#PCDATA )>
<!ELEMENT nearLegFXRate (fxRate )>
<!ELEMENT farLegFXRate (fxRate )>
<!ELEMENT nearLegSettledAmount (%currencyAmount; )>
<!ATTLIST nearLegSettledAmount %payReceiver;>
<!ELEMENT farLegSettledAmount (%currencyAmount; )>
<!ATTLIST farLegSettledAmount %payReceiver;>
```

(11) Cross-Currency Fixed-Fixed Swap

A Cross-Currency Fixed-Fixed Swap is a type of interest rate swap in which two parties exchange periodic payment streams based on fixed interest rates each in a different currency.

The Cross-Currency Fixed-Fixed Swap element represents such a transaction and includes the following sub-elements and attributes:

"Trade Date": the date on which the trade has been agreed to by the parties.

"Start Date": the date on which the exchanged payments will begin.

"End Date": the date on which the exchanged payments will end.

"Tenor": the period of time from the Start Date to the End Date.

"Notional Amount": the amount used as the basis for calculating the payment streams to be exchanged.

"Fixed Leg Details": the details of the fixed interest payments; separate information for each of the two fixed legs.

"Events": the various payment and calculation events in the swap transaction, including cash payment, principal payment, interest payment, interest calculation, compound interest calculation, and interest rate reset information.

"External ID": one or more identifiers assigned by a user to identify a transaction in its internal or back-end system; optional.

In the present embodiment of this invention, the Cross-Currency Fixed-Fixed Swap element has the following XML definition:

```
<!-- Cross Currency Fixed Fixed Swap -->
<!ELEMENT crossCurrencyFixedFixedSwap (%tenor.elements;,
    fixedLegDetails, fixedLegDetails, events?)>
<!ATTLIST crossCurrencyFixedFixedSwap notionalAmount
    (Yes | No) #REQUIRED >
```

(12) Cross-Currency Float-Float Swap

A Cross-Currency Float-Float Swap is a type of interest rate swap in which two parties exchange periodic payment streams based on a floating rate index (e.g., LIBOR), each in a different currency.

The Cross-Currency Float-Float Swap element represents such a transaction and includes the following sub-elements and attributes:

"Trade Date": the date on which the trade has been agreed to by the parties.

"Start Date": the date on which the exchanged payments will begin.

"End Date": the date on which the exchanged payments will end.

"Tenor": the period of time from the Start Date to the End Date.

"Notional Amount": the amount used as the basis for calculating the payment streams to be exchanged.

"Float Leg Details": the details of the floating interest payments; separate information for each of the two fixed legs.

"Events": the various payment and calculation events in the swap transaction, including cash payment, principal payment, interest payment, interest calculation, compound interest calculation, and interest rate reset information.

"External ID": one or more identifiers assigned by a user to identify a transaction in its internal or back-end system; optional.

In the present embodiment of this invention, the Cross-Currency Float-Float Swap element has the following XML definition:

```
<!-- Cross Currency Float Float Swap -->
<!ELEMENT crossCurrencyFloatFloatSwap (%tenor.elements;,
floatLegDetails, floatLegDetails, events?)>
<!ATTLIST crossCurrencyFloatFloatSwap notionalAmount
(Yes | No) #REQUIRED >
```

(13) Cross-Currency Fixed-Float Swap

A Cross-Currency Fixed-Float Swap is a type of interest rate swap in which two parties exchange periodic payment streams, where one payment stream is based on a fixed interest rate and the other payment stream is based on a floating rate index (e.g., LIBOR), each in a different currency.

The Cross-Currency Fixed-Float Swap element represents such a transaction and includes the following sub-elements and attributes:

"Trade Date": the date on which the trade has been agreed to by the parties.

"Start Date": the date on which the exchanged payments will begin.

"End Date": the date on which the exchanged payments will end.

"Tenor": the period of time from the Start Date to the End Date.

"Notional Amount": the amount used as the basis for calculating the payment streams to be exchanged.

"Fixed Leg Details": the details of the fixed interest payments for the fixed leg.

"Float Leg Details": the details of the floating interest payments for the floating leg.

"Events": the various payment and calculation events in the swap transaction, including cash payment, principal payment, interest payment, interest calculation, compound interest calculation, and interest rate reset information.

"External ID": one or more identifiers assigned by a user to identify a transaction in its internal or back-end system; optional.

In the present embodiment of this invention, the Cross-Currency Fixed-Float Swap element has the following XML definition:

```
<!-- Cross Currency Fixed Float Swap -->
<!ELEMENT crossCurrencyFixedFloatSwap (%tenor.elements; ,
fixedLegDetails, floatLegDetails, events?)>
<!ATTLIST crossCurrencyFixedFloatSwap notionalAmount
(Yes | No) #REQUIRED>
```

(14) Forward Rate Agreement

A Forward Rate Agreement transaction is one in which one party buys a single floating rate payment in exchange for a single fixed rate payment. The fixed rate payment amount is determined by applying a fixed rate of interest to the notional amount of the transaction, while the floating rate payment amount is determined by sampling the value of a specified floating rate option on a specified date and applying the sampled rate to the notional amount. The parties settle the Forward Rate Agreement by netting the effects of the two payments into a single payment made by one or the other of the parties: if the floating rate amount due is greater than the fixed rate amount due, then the floating rate payer pays the excess to the fixed rate payer; conversely, if the fixed rate amount due is greater than the floating rate amount due, then the fixed rate payer pays the excess to the floating rate payer. Settlement occurs at the beginning of the transaction subject to future discounting specific to the Forward Rate Agreement (i.e., payment of difference in fixed and floating rates).

The Forward Rate Agreement element represents such a transaction and includes the following sub-elements and attributes:

"Trade Date": the date on which the trade has been agreed to by the parties.

"Settlement Date": the date on which payment settlement will be completed.

"Start Date": the date on which the transaction will begin.

"End Date": the date on which the transaction will end.

"Adjusted Start Date": the date on which the transaction will begin, adjusted for holidays.

"Adjusted End Date": the date on which the transaction will end, adjusted for holidays.

"Notional Amount": the amount used as the basis for calculating the payments to be exchanged.

"Fixed Interest Rate": the fixed interest rate for the fixed rate payment.

"Interest Index": the details of the floating interest index to be used for the floating rate payment.

"Day Count": the day-count method to be used for calculating interest.

"Roll Date": the specific day each month to be used for payment/settlement of interest/principal.

"Roll Convention": the convention to be used for rolling the payment dates in the event the date falls on a holiday.

"Holiday Calendar": the calendar to be used for reference to business holidays.

"Fixing Date": the date on which the rate to be used for settlement is fixed.

"Rate Reset Calendar": the calendar to be used for determining the dates on which to reset floating interest rates.

"Buyer": the buyer of the floating rate payment; this is a reference to a Counterparty element.

"Seller": the seller of the floating rate payment; this is a reference to a Counterparty element.

"Premium Details": the details of the premium to be paid, as either a percentage ("Premium Percentage") or a specified amount ("Premium Amount"), and the payment date ("Premium Date").

"External ID": one or more identifiers assigned by a user to identify a transaction in its internal or back-end system; optional.

In the present embodiment of this invention, the Forward Rate Agreement element has the following XML definition:

```
<!-- Forward Rate Agreement -->
<!ELEMENT forwardRateAgreement (tradeDate,
settlementDate?, startDate, endDate ,
    externalId?, adjustedStartDate, adjustedEndDate,
    notionalAmount, dayCount, rollConvention, rollDate,
    holidayCalendar, fixedInterestRate, interestIndex,
    fixingDate, rateResetCalendar, premiumDetails? )>
<!ATTLIST forwardRateAgreement buyer IDREF #REQUIRED>
<!ATTLIST forwardRateAgreement seller IDREF #REQUIRED>
<!ELEMENT adjustedStartDate (#PCDATA )>
<!ELEMENT adjustedEndDate (#PCDATA )>
<!ELEMENT fixingDate (#PCDATA )>
```

(15) Customized Trade

In addition to the financial transactions represented by the elements described above, the present embodiment of this invention supports customized trades and transactions created by Members and/or Providers, so long as such transactions are permitted by applicable law. Such customized transactions might include hybrid trades, where one or more aspects of one type of trade are combined with those of another. For example, a party might structure a foreign exchange "swaption" in which a stream of periodic payments in one currency is exchanged for the right to buy a specified quantity of another currency at a specified price on a specified date.

FinXML enables the representation of customized transactions through the combination of elements that comprise different types of transactions. Using FinXML, a party can specify the element fields and values that it wishes to comprise the particular customized transactions. The Customized Trade element represents such a transaction and includes the following sub-elements and attributes:

"Field Name": a particular component included in the transaction; separate information for each component; paired with "Field Value".

"Field Value": the value of a particular component included in the transaction; separate information for each component; paired with "Field Name".

"Buyer": the buyer of the customized trade; this is a reference to a Counterparty element.

"Seller": the seller of the customized trade; this is a reference to a Counterparty element.

"External ID": one or more identifiers assigned by a user to identify a transaction in its internal or back-end system; optional.

In the present embodiment of this invention, the Customized Trade element has the following XML definition:

```
<!-- Customized Trade -->
<!ELEMENT customizedTrade ((fieldName , fieldValue) * )>
<!ATTLIST customizedTrade buyer IDREF #REQUIRED>
<!ATTLIST customizedTrade seller IDREF #REQUIRED>
<!ELEMENT fieldName (#PCDATA)>
<!ELEMENT fieldValue (#PCDATA)>
```

(c) Trade Specific Elements

In the present embodiment of this invention, FinXML includes a number of elements that represent details common to one or more of the Trade Type elements 530. Such elements may also be included in customized trades.

(1) Generic Trade Details

Generic trade details include information relating to notional amounts and interest rate, amortization, and compounding calculations that are common to different types of trades. The "Generic Spec Details" element represents such information and includes the following sub-elements and attributes:

"Notional Amount": the transaction amount.

"Day Count": the day-count method to be used for calculating interest.

"Payment Frequency": the frequency of interest/principal payment (e.g., monthly, quarterly, semi-annually).

"Roll Date": the specific day each month to be used for payment/settlement of interest/principal.

"Anchor Date": the date to which the payment schedule is anchored, i.e., the end date of the first interest period or specific date of first payment.

"Payment Calendar": the calendar to be used for reference to business holidays.

"Date Stub": an indicator for a schedule of loan payments in which the payment period differs (i.e., is offset from the start of) from all other payment periods.

"Amortization Details": details regarding how the loan payment cashflow should be amortized, including amortization method (e.g., single payment at end, equal payments over term of loan).

"Compounding Details": details regarding how the loan interest should be compounded, including calculation frequency and rate.

In the present embodiment of this invention, the Generic Spec Details element has the following XML definition:

```
<!ENTITY % genericSpecDetails "notionalAmount
    , dayCount
    , paymentFrequency
    , rollDate
    , anchorDate?
    , paymentCalendar
    , dateStub
    , amortizationDetails?
    , compoundingDetails?">
```

(2) Fixed Rate Details

Fixed rate details include information relating to fixed interest rates. The "Fixed Spec Details" element represents such information and includes the following sub-elements and attributes:

"Fixed Interest Rate": the fixed interest rate.

"FX Rate": the foreign exchange rate at which a trade will be executed.

In the present embodiment of this invention, the Fixed Spec Details element has the following XML definition:

```
<!ENTITY % fixedSpecDetails "fixedInterestRate | fxRate">
```

(3) Floating Rate Details

Floating rate details include information relating to floating interest rates that are based on a floating rate index (e.g., LIBOR). The "Floating Spec Details" element represents such information and includes the following sub-elements and attributes:

"Floating Interest Rate": the floating interest rate.

"First Fixing Rate": the interest rate to be used for the first interest calculation period.

"Rate Reset Calendar": the calendar to be used for reference to business holidays for interest rate resets.

In the present embodiment of this invention, the Floating Spec Details element has the following XML definition:

```
<!ENTITY % floatingSpecDetails "floatingInterestRate,
    firstFixingRate?, rateResetCalendar">
```

(4) Fixed Leg Details

A number of the transactions described above include multiple "legs," where each leg is a series of payments or cashflows. Such legs can be "fixed" or "floating."

A "fixed leg" is a payment stream based on a fixed interest rate. The "Fixed Leg Details" elements represents information regarding the fixed leg of a trade and includes generic trade details (described above in "Generic Spec Details" element), fixed rate details (described above in "Fixed Spec Details" element), financial events details (described below in "Events" element), and the following additional sub-elements and attributes:

"Leg ID": identifier of a particular leg of a trade.

"Payer": the payer of the fixed leg in a trade; this is a reference to a Counterparty element.

"Receiver": the recipient of the proceeds of the fixed leg in a trade; this is a reference to a Counterparty element.

In the present embodiment of this invention, the Fixed Leg Details element has the following XML definition:

```
<!ELEMENT fixedLegDetails (%genericSpecDetails; ,
%fixedRateDetails; , events?)>
<!ATTLIST fixedLegDetails legID ID #REQUIRED>
<!ATTLIST fixedLegDetails payer IDREF #REQUIRED>
<!ATTLIST fixedLegDetails receiver IDREF #REQUIRED>
```

(5) Floating Leg Details

A "floating leg" is a payment stream based on a floating interest rate. The "Float Leg Details" elements represents information regarding the floating leg of a trade and includes generic trade details (described above in "Generic Spec Details" element), floating rate details (described above in "Float Spec Details" element), financial event details (described below in "Events" element), and the following additional sub-elements and attributes:

"Leg ID": identifier of a particular leg of a trade.

"Payer": the payer of the floating leg in a trade; this is a reference to a Counterparty element.

"Receiver": the recipient of the proceeds of the floating leg in a trade; this is a reference to a Counterparty element.

In the present embodiment of this invention, the Float Leg Details element has the following XML definition:

```
<!ELEMENT floatLegDetails (%genericSpecDetails; ,
%floatRateDetails; , events?)>
<!ATTLIST floatLegDetails legID ID #REQUIRED>
<!ATTLIST floatLegDetails payer IDREF #REQUIRED>
<!ATTLIST floatLegDetails receiver IDREF #REQUIRED>
```

(d) Financial Event Elements

Figure 6:
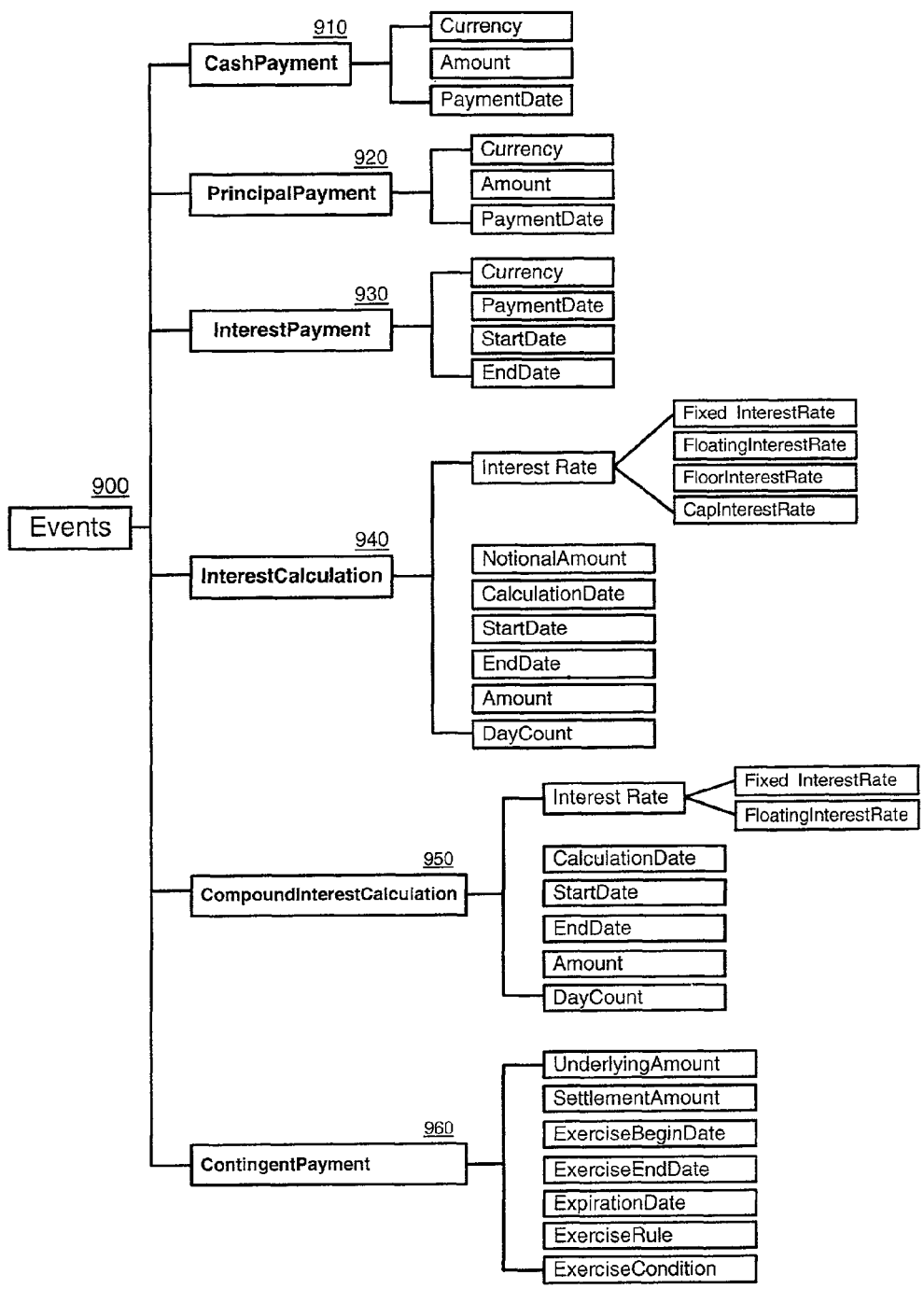
FIG. 6 shows the structure of a FinXML "Events" element in an embodiment of the present invention.

In the present embodiment of this invention, FinXML includes a number of elements that represent details common to certain Trade Type elements 530, including customized trades, that relate to optional events during the life cycle of a trade such as premium payment, interest payment, contingent payment, and interest calculation. "Events" element 900, shown in FIG. 6, describes such information and includes the following sub-elements: "Cash Payment" 910, "Principal Payment" 920, "Interest Payment" 930, "Interest Calculation" 940, "Compound Interest Calculation" 950, and "Contingent Payment" 960.

In the present embodiment of this invention, Events element 900 has the following XML definition:

```
<!ELEMENT events ((cashPayment | principalPayment |
interestPayment | contingentPayment |
interestCalculation | compoundInterestCalculation )+)>
<!ATTLIST events id ID #IMPLIED>
```

(1) Cash Payment

Cash Payment element 910 describes information relating to cash payments to be made as a part of certain trades, and includes the following sub-elements and attributes:

"Currency": the currency of the cash payment.

"Amount": the amount of the cash payment.

"Payment Date": the date on which the cash payment is to be made.

"ID": the identifier of the particular cash payment.

"Type": the indicator of type of payment (e.g., "Premium" or "Fees").

"Payer": the payer of the cash payment; this is a reference to a Counterparty element.

"Receiver": the recipient of the cash payment; this is a reference to a Counterparty element.

In the present embodiment of this invention, Cash Payment element 910 has the following XML definition:

```
<!ELEMENT cashPayment (currency, amount, paymentDate)>
<!ATTLIST cashPayment id ID #REQUIRED
    type (Premium | Fees) #REQUIRED
    payer IDREF #REQUIRED
    receiver IDREF #REQUIRED>
```

(2) Principal Payment

Principal Payment element 920 describes information relating to principal payments to be made as a part of certain trades, and includes the following sub-elements and attributes:

"Currency": the currency of the principal payment.

"Amount": the amount of the principal payment.

"Payment Date": the date on which the principal payment is to be made.

"ID": the identifier of the particular principal payment.

"Payer": the payer of the principal payment; this is a reference to a Counterparty element.

"Receiver": the recipient of the principal payment; this is a reference to a Counterparty element.

In the present embodiment of this invention, Principal Payment element 920 has the following XML definition:

```
<!ELEMENT principalPayment (currency, amount, paymentDate)>
<!ATTLIST principalPayment id ID #REQUIRED
    payer IDREF #REQUIRED
    receiver IDREF #REQUIRED>
```

(3) Interest Payment

Interest Payment element 930 describes information relating to interest payments to be made as a part of certain trades, and includes the following sub-elements and attributes:

"Currency": the currency of the interest payment.

"Amount": the amount of the interest payment.

"Payment Date": the date on which the interest payment is to be made.

"Start Date": the start date of the interest period to which the interest payment pertains.

"End Date": the end date of the interest period to which the interest payment pertains.

"ID": the identifier of the particular interest payment.

"Payer": the payer of the interest payment; this is a reference to a Counterparty element.

"Receiver": the recipient of the interest payment; this is a reference to a Counterparty element.

"Interest Type": the indicator of type of interest payment (e.g., "Coupon", "Swap", "Loan", "Deposit", or "Other").

"Calculations": the identifier of the particular interest calculation periods.

In the present embodiment of this invention, Interest Payment element 930 has the following XML definition:

```
<!ELEMENT interestPayment (currency, paymentDate, startDate,
endDate)>
<!ATTLIST interestPayment id ID #REQUIRED
    payer IDREF #REQUIRED
    receiver IDREF #REQUIRED
```

```
interestType (Coupon | Swap | Loan | Deposit | Other) #IMPLIED
calculations IDREFS #REQUIRED>
```

(4) Contingent Payment

Contingent Payment element 960 describes information relating to contingent payments to be made in the settlement of certain trades after the exercise of an option, and includes the following sub-elements and attributes:

"Underlying Amount": the amount of the option-underlying instrument.
"Settlement Amount": the amount to be paid in settlement of the exercise of the option in return for the underlying instrument.
"Expiration Date": the date of expiry of the option.
"Exercise Begin Date": the first date on which the option may be exercised.
"Exercise End Date": the last date on which the option may be exercised.
"Exercise Rule": the rule governing normal exercise of the option (e.g., "American"—the option may be exercised on any day within a given period; "European"—the option may only be exercised on the option expiration date).
"Exercise Condition": any conditions that must be met to permit exercise of the option (e.g., the 3-month LIBOR rate must be greater than 4.5% on the exercise date).
"Volatility": the volatility value to be used when valuing the option.
"ID": the identifier of the particular interest payment.
"Payer": the party responsible for delivering the option underlying instrument; this party will receive the settlement amount in exchange for the option underlying instrument.
"Receiver": the recipient of the option-underlying instrument; this party will pay the settlement amount as the price for exercising the option.
"Option Type": the nature of the option (e.g., "Call"—an option to buy the underlying instrument at the exercise price; "Put"—an option to sell the underlying instrument at the exercise price).
"Delivery Type": an indicator describing whether the Payer will physically deliver the option underlying instrument to the Receiver or, alternatively, that the transaction will be settled for cash where the option writer will, upon exercise, pay to the option holder the difference between the value of the underlying instrument and the exercise price.

In the present embodiment of this invention, Contingent Payment element 960 has the following XML definition:

```
<!ELEMENT contingentPayment (underlyingAmount, settlementAmount,
expirationDate, exerciseBeginDate, exerciseEndDate, exerciseRule,
exerciseCondition, volatility)>
<!ATTLIST contingentPayment id ID #REQUIRED
   payer IDREF #REQUIRED
   receiver IDREF #REQUIRED
   optionType (call | put)#REQUIRED
   deliveryType (deliverable | non-deliverable) #REQUIRED>
<!ELEMENT underlyingAmount (currency, amount)>
<!ELEMENT settlementAmount (currency, amount)>
<!ELEMENT exerciseBeginDate (#PCDATA)>
<!ELEMENT exerciseEndDate (#PCDATA)>
<!ELEMENT exerciseRule (#PCDATA)>
<!ELEMENT exerciseCondition (#PCDATA)>
<!ELEMENT volatility (#PCDATA)>
```

(5) Interest Calculation

Interest Calculation element 940 describes information relating to an interest amount calculated for a given period within a particular interest payment, and includes the following sub-elements and attributes:

"ID": the identifier of the particular interest calculation period.
"Resets": the identifiers of the rate reset elements used in the interest calculation.
"Notional Amount": the amount involved in the interest calculation.
"Calculation Date": the date on which the interest calculation is performed.
"Start Date": the start date of the interest period for which the interest calculation is to be performed.
"End Date": the end date of the interest period for which the interest calculation is to be performed.
"Amount": the calculated interest amount.
"Day Count": the day-count method to be used for performing the interest calculation.
"% InterestRate.Elements": definition of the type of interest rate involved (e.g., "Fixed" or "Floating").

In the present embodiment of this invention, Interest Calculation element 940 has the following XML definition:

```
<!ELEMENT interestCalculation ((%interestRate.elements;)?,
   notionalAmount, calculationDate, startDate,
   endDate, amount?, dayCount)>
<!ATTLIST interestCalculation id ID #REQUIRED
   resets IDREFS #IMPLIED>
```

(6) Compound Interest Calculation

Compound Interest Calculation element 950 describes information relating to a compound interest amount calculated for a given period within a particular interest payment, and includes the following sub-elements and attributes:

"ID": the identifier of the particular interest calculation period.
"Rate": the identifier of the particular interest rate.
"Resets": the identifiers of the rate reset elements used in the interest calculation.
"Notional Amount": the amount involved in the compound interest calculation.
"Calculation Date": the date the compound interest calculation is performed.
"Start Date": the start date of the interest period for which the compound interest calculation is to be performed.
"End Date": the end date of the interest period for which the compound interest calculation is to be performed.
"Amount": the calculated compound interest amount.
"% InterestRate.Elements": definition of the type of interest rate involved (e.g., "Fixed" or "Floating").

In the present embodiment of this invention, Compound Interest Calculation element 950 has the following XML definition:

```
<!ELEMENT compoundInterestCalculation
   ((fixedInterestRate | floatingInterestRate)?,
   calculationDate, startDate, endDate, amount)>
<!ATTLIST compoundInterestCalculation id ID #REQUIRED
   resets IDREF #REQUIRED
   rate IDREF #IMPLIED>
```

(e) Calculation Elements

In the present embodiment of this invention, FinXML includes a number of elements that represent details regarding calculations to be performed in certain Trade Type elements 530, including customized trades. These elements relate to compounding, amortization, and calculation frequency.

(1) Compounding Details

The "Compounding Details" element describes information relating to any compounding calculations that need to be performed in a particular transaction. This typically arises where the actual interest payment frequency is longer than the interest calculation frequency. For example, if interest is calculated every three months but paid every 6 months, then the interest calculated at the end of the 3-month period would be compounded and paid along with the interest calculated for the fourth through sixth months. The Compounding Details element includes the following sub-element:

"Calculation Frequency": the frequency at which interest calculations should be performed in a multi-period transaction.

In the present embodiment of this invention, the Compounding Details element has the following XML definition:

```
<!ELEMENT compoundingDetails (calculationFrequency)>
```

(2) Amortization Details

The "Amortization Details" element describes information relating to any amortization calculations that need to be performed in a particular swap transaction. If the amortization method is defined to be "bullet", principal will be paid in one lump sum at maturity, whereas under "equal" amortization, principal will be paid in equal installments during the life of the swap transaction. The Amortization Details element includes the following sub-elements and attributes:

"Amortization Frequency": the frequency at which amortization will be performed in a particular transaction (e.g., semi-annual or annual).

"Amortization Method": the amortization method (e.g., "bullet" or "equal").

In the present embodiment of this invention, the Amortization Details element has the following XML definition:

```
<!ELEMENT amortizationDetails (amortizationFrequency )>
<!ATTLIST amortizationDetails amortizationMethod
   %amortMethod; #REQUIRED>
```

(3) Calculation Frequency

The "Calculation Frequency" element describes information relating to the frequency of a particular calculation to be performed. The Calculation Frequency element includes the following sub-elements and attributes:

"Convention": the particular calculation methodology based on the market convention (e.g., "IMM", "FRN", "Eurodollar", or "Normal").

"End of Month": indicator of whether the particular calculation should be moved to the end of the month.

"Term": the period of time for a single calculation period (e.g., 3-months, 6-months, etc.).

In the present embodiment of this invention, the Calculation Frequency element has the following XML definition:

```
<!ELEMENT calculationFrequency (term)>
<!ATTLIST calculationFrequency convention (IMM | FRN | Eurodollar | Normal) 'Normal'
   endOfMonth (Yes | No) #REQUIRED>
```

(4) Payment Frequency

The "Payment Frequency" element describes information relating to the frequency of a particular payment to be made. The Payment Frequency element includes the following sub-elements and attributes:

"Convention": the particular calculation methodology based on the market convention (e.g., "IMM", "FRN", "Eurodollar", or "Normal").

"End of Month": indicator of whether the particular payment should be moved to the end of the month.

"Term": the term of the interest index used in calculating the particular payment (e.g., 3-months, 6-months, etc.).

In the present embodiment of this invention, the Payment Frequency element has the following XML definition:

```
<!ELEMENT paymentFrequency (term)>
<!ATTLIST paymentFrequency convention (IMM | FRN | Eurodollar | Normal) 'Normal'
   endOfMonth (Yes | No) #REQUIRED>
```

(5) Amortization Frequency

The "Amortization Frequency" element describes information relating to the frequency of a particular amortization to be performed. The Amortization Frequency element includes the following sub-elements and attributes:

"Convention": the particular calculation methodology based on the market convention (e.g., "IMM", "FRN", "Eurodollar", or "Normal").

"End of Month": indicator of whether the particular amortization should be moved to the end of the month.

"Term": the period of time for a single amortization calculation period (e.g., 3-months, 6-months, etc.).

In the present embodiment of this invention, the Payment Frequency element has the following XML definition:

```
<!ELEMENT paymentFrequency (term)>
<!ATTLIST paymentFrequency convention (IMM | FRN | Eurodollar | Normal) 'Normal'
   endOfMonth (Yes | No) #REQUIRED>
``` ii. Reference Data

Reference data describes the profile information specific to Members and Providers that will be referenced in any transactions engaged in by such parties. The FinXML syntax represents this profile information with the following elements: "Organization" element 710 (FIG. 4), "Contact Information" element 730 (FIG. 4), "Address" element 765 (FIG. 4), "Credit Rating" element 805 (FIG. 4), "Legal Entity" element 605 (FIG. 5), and "Book" element 625 (FIG. 5).

(a) Organization

Organization element 710 (as shown in FIG. 4) describes the organizational information regarding a Disclosed Party 705. Organization element 710 includes the following sub-elements and attributes:

"Organization Name" 715: the full name of the organization.

"Organization Short Name" 720: the short name of the organization.

"Address" 725: the address of the organization.

In the present embodiment of this invention, Organization element 710 has the following XML definition:

```
<!ELEMENT organization (organizationShortName,
organizationName, address)>
<!ELEMENT organizationShortName (#PCDATA)>
<!ELEMENT organizationName (#PCDATA)>
```

(b) Contact Information

Contact Information element 730 (as shown in FIG. 4) describes the information necessary to contact a Disclosed Party 705 during the transaction process. Contact Information element 730 includes the following sub-elements and attributes:

"Contact Name" 735: name of the specific contact within the party.

"Contact ID": the identifier of the particular contact.

"Telephone" 740: the telephone details of the party.

"Fax" 745: the fax details of the party.

"Telex" 750: the telex details of the party.

"Email" 755: the electronic mail details of the party.

"URL" 760: the Uniform Resource Locator details of the party.

In the present embodiment of this invention, Contact Information element 730 has the following XML definition:

```
<!ELEMENT contactInformation (contactName, (telephone | fax | telex | email | url)*)>
<!ATTLIST contactInformation contactID #REQUIRED
    default (Y | N) #REQUIRED>
<!ELEMENT contactName (#PCDATA)>
<!ELEMENT telex (#PCDATA)>
<!ELEMENT telephone (#PCDATA)>
<!ELEMENT fax (#PCDATA)>
<!ELEMENT email (#PCDATA)>
<!ELEMENT URL (#PCDATA)>
```

(c) Address

Address element 765 (as shown in FIG. 4) describes the registered address information of the Disclosed Party 705. Address element 765 includes the following sub-elements and attributes:

"Address1" 770: the first line of the street address of the party.

"Address2" 775: the second line of the street address of the party.

"City" 780: the city of the party.

"State-Province-County" 785: the state, province, and/or county of the party.

"Zip Postal Code" 790: the zip or postal code of the party.

"Country" 795: the country of the party.

"SWIFT Address" 800: the Bank-identifier Code ("BIC") of the party (as assigned by S.W.I.F.T. sc).

In the present embodiment of this invention, Address element 765 has the following XML definition:

```
<!ELEMENT address (address1, address2, city,
stateProvinceCounty, zipPostalCode, country,
swiftAddress?)>
<!ELEMENT address1 (#PCDATA)>
<!ELEMENT address2 (#PCDATA)>
<!ELEMENT city (#PCDATA)>
<!ELEMENT stateProvinceCounty (#PCDATA)>
<!ELEMENT zipPostalCode (#PCDATA)>
<!ELEMENT country (#PCDATA)>
<!ELEMENT swiftAddress (#PCDATA)>
```

(d) Credit Rating

Credit Rating element 805 (as shown in FIG. 4) describes the details of the credit rating of the Disclosed Party 705 or Undisclosed Party 835, as rated by standard credit rating agencies. Credit Rating element 805 includes the following sub-elements and attributes:

"Agency" 810: the name of the credit rating agency that provided the credit rating of the party.

"Rating" 815: the actual rating value (e.g., AAA, BB, etc.) of the party provided by the credit rating agency.

"Country" 820: the country to which the party is assigned for purposes of the credit rating by the credit rating agency.

"Industry Group" 825: the industry group to which the party is assigned for purposes of the credit rating by the credit rating agency.

"Industry" 830: the industry to which the party is assigned for purposes of the credit rating by the credit rating agency.

In the present embodiment of this invention, Credit Rating element 805 has the following XML definition:

```
<!ELEMENT creditRating (agency, rating, country, industryGroup,
industry)>
```

-continued

```
<!ELEMENT agency (#PCDATA)>
<!ELEMENT rating (#PCDATA)>
<!ELEMENT name (#PCDATA)>
<!ELEMENT industryGroup (#PCDATA)>
<!ELEMENT industry (#PCDATA)>
```

(e) Legal Entity

Legal Entity element 605 (as shown in FIG. 5) describes the details of any legal entities (e.g., subsidiaries or affiliate companies) associated with an Internal Party 600 (as shown in FIG. 5). Legal Entity element 605 includes the following sub-elements and attributes:

"ID" 608: the identifier of the legal entity.

"Short Name" 610: the short name of the legal entity.

"Description" 615: the description of the legal entity.

"Parent" 620: the name of the parent organization of the legal entity.

In the present embodiment of this invention, Legal Entity element 605 has the following XML definition:

```
<!ELEMENT legalEntity (shortName, description, parent)>
<!ATTLIST legalEntity id ID #IMPLIED>
```

Book element 625 (as shown in FIG. 5) describes the details of any internal trading book associated with the transaction by a party. Book element 625 includes the following sub-elements and attributes:

"ID": the identifier of the trading book.

"Type": the type of trading book.

"Short Name" 630: the short name of the trading book.

"Name" 635: the full name of the trading book.

"Description" 640: the description of the trading book.

"Reporting Currency" 645: the reporting currency of the trading book.

In the present embodiment of this invention, Book element 625 has the following XML definition:

```
<!ELEMENT book (shortName, name, description, reportingCurrency)>
<!ATTLIST book id ID #REQUIRED
    type CDATA #IMPLIED>
``` iii. Market Data

Market data describes information obtained from market sources for use in financial transactions. FinXML represents this information with the following elements: "Floating Interest Rate" element and "Interest Index" element.

(1) Floating Interest Rate

The "Floating Interest Rate" element describes information relating to the floating interest rate that can be used in a transaction. The Floating Interest Rate element includes the following sub-elements and attributes:

"ID": the identifier of the particular floating interest rate definition.

"Interest Index": the details of a particular index used for a floating interest rate, including currency ("Currency"), term ("Term"), and name ("Index Name").

"Spread": the differential (plus or minus) to be applied to the index rate in order to determine the floating interest rate.

In the present embodiment of this invention, the Floating Interest Rate element has the following XML definition:

```
<!ELEMENT floatingInterestRate (interestIndex, spread)>
<!ATTLIST floatingInterestRate id ID #IMPLIED>
```

(2) Interest Index

The "Interest Index" element describes information relating to the interest index used to calculate the floating interest rate. The Interest Index element includes the following sub-elements and attributes:

"ID": the identifier of the particular interest index.

"Currency": the currency of the interest index.

"Term": the term of the interest index (e.g., 3-months, 6-months, etc.).

"Index Name": the name of the interest index (e.g., "LIBOR").

In the present embodiment of this invention, the Interest Index element has the following XML definition:

```
<!ELEMENT interestIndex (currency, term, indexName)>
<!ATTLIST interestIndex id ID #IMPLIED>
<!ELEMENT indexName (#PCDATA)>
```

2. "Connect" Processor

In the present embodiment of this invention, the Connect Processor 20 (as shown in FIG. 1) provides the means for communicating information related to financial transactions between users (i.e., Members and Providers) and the CFOWeb System. Connect Processor 20 performs this function by converting FinXML (or other XML) documents to/from financial (Java) objects using proprietary stylesheets created in XSL, known as "FinScript", as will be described below.

In the present embodiment of this invention, both Connect Processor 20 and Connect Messaging Server 90 process messages between users and the CFOWeb System and convert FinXML (or other XML) documents to/from financial (Java) objects. Whereas Connect Processor 20 performs such conversion between FinXML (or other XML) documents and the proprietary objects of Members and Providers, Connect Messaging Server 90 performs such conversion between FinXML (or other XML) documents and the proprietary objects of the CFOWeb System. Connect Messaging Server 90 provides centralized (within the CFOWeb System) messaging and conversion functionality, while Connect Processor 20 provides distributed messaging and conversion functionality at Member and Provider client sites. Therefore, in the present embodiment of this invention, descriptions of the messaging and conversion functionality of Connect Processor 20 are also applicable to Connect Messaging Server 90.

a. Functional Overview

Figure 7:
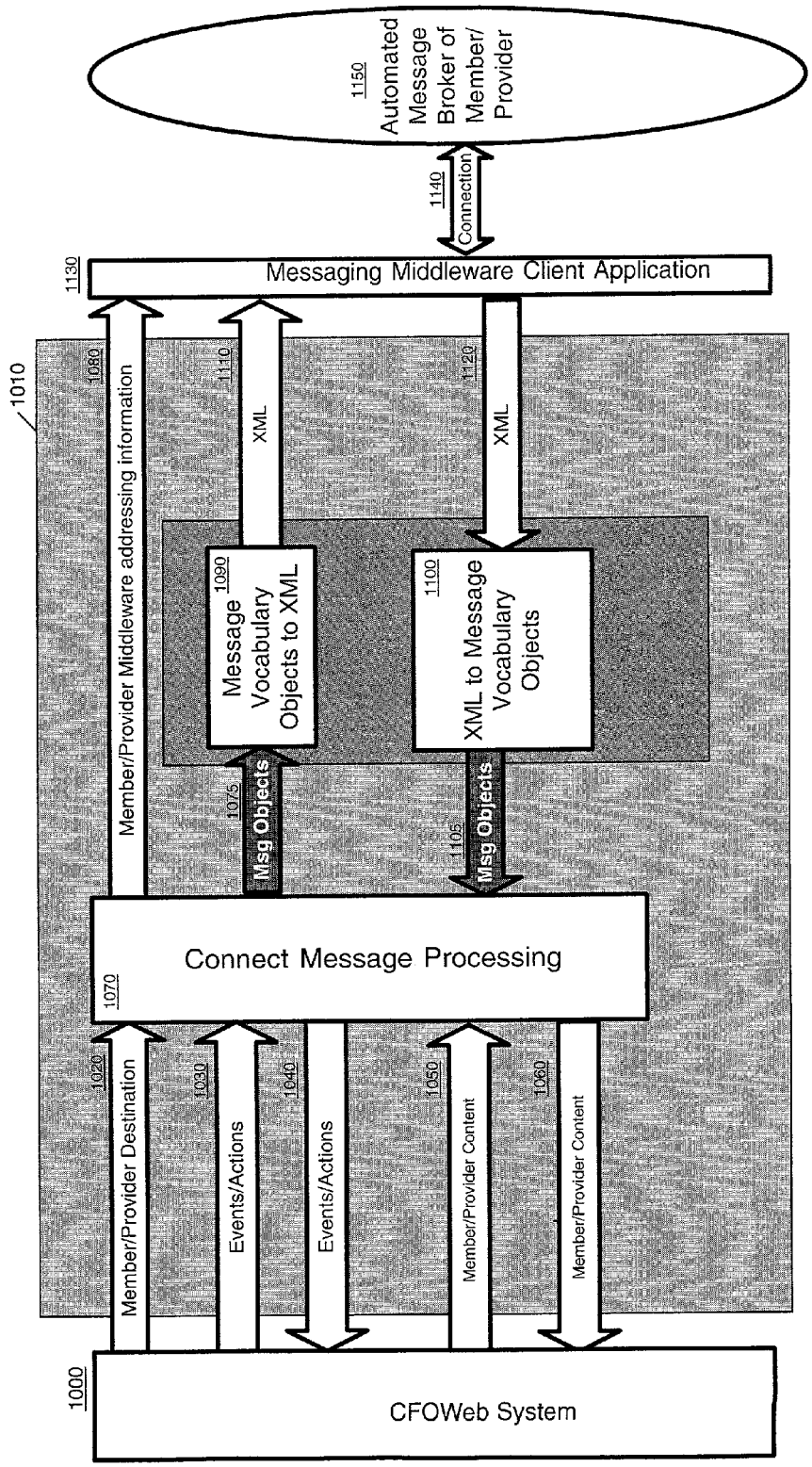
FIG. 7 shows the general architecture of the Connect Automated Processor in an embodiment of the present invention.

FIG. 7 illustrates an overview of the Connect Processor and its functionality. Connect Processor 1010 (including Connect Messaging Server) serves as an intermediary between the CFOWeb System 1000, including its various servers (as shown in FIG. 1), and the systems of Members and Providers. Connect Processor 1010 processes "messages" and "trades." Messages include communications between Members/Providers and the various servers of CFOWeb System 1010 (e.g., chat, e-mail, reports, portfolio management, etc.) that describe actions and events to be performed. Messages include trade information regarding financial transactions between Members and Providers. Note, however, that not all messages include information regarding specific financial transactions.

Members and Providers send requests for price quotes, price quotes, and other messages via an automated message broker 1150, which in turn sends such information through automated connection 1140 to a messaging middleware client application 1130 that is in communication with Connect Processor 1010. Messaging middleware client application 1130 sends the information, in the form of XML streams 1120 to Connect Processor 1010. Connect Processor 1010 converts 1100 the XML information into "Connect" message objects (including trade objects) 1105 (as will be described below). Connect Processor 1010 processes 1070 the message objects 1105 and, if related to trades, sends the message objects 1105 to the CFOWeb System 1000, including the content 1060 provided by the Member or Provider. Alternatively, if the message objects 1105 do not include information regarding specific financial transactions and relate to non-trade functions on CFOWeb System 1000, Connect Processor 1010 will send the message objects 1105 as actions or events to be performed at one of the system servers.

Connect Processor 1010 processes 1070 messages 1050 (which may include trade information) to Members or Providers by converting them into message objects 1075. In addition, Connect Processor 1010 processes actions and events 1030 occurring at any of the system servers by converting them into message objects 1075. Next, Connect Processor 1010 converts 1090 the message objects 1075 into XML documents 1110 (which may be in the form of FinXML documents). Connect Processor 1010 sends the resulting XML documents 1110 (e.g., a price quote or price quote request) to messaging middleware client application 1130. Messaging middleware client application 1130 sends the XML documents 1110 to the automated message broker 1150 of the appropriate Member or Provider through automated connection 1140, for conversion into objects. Note that in parallel to the processing and conversion of messages and objects from CFOWeb System 1000, Connect Processor 1010 routes the appropriate destination 1020 and addressing information 1080 for the particular Member or Provider that will receive the XML documents 1110. The XML documents (which may be in the form of FinXML documents) will be converted into objects appropriate for processing by the Member or Provider (as described below).

b. Architecture

Figure 8:
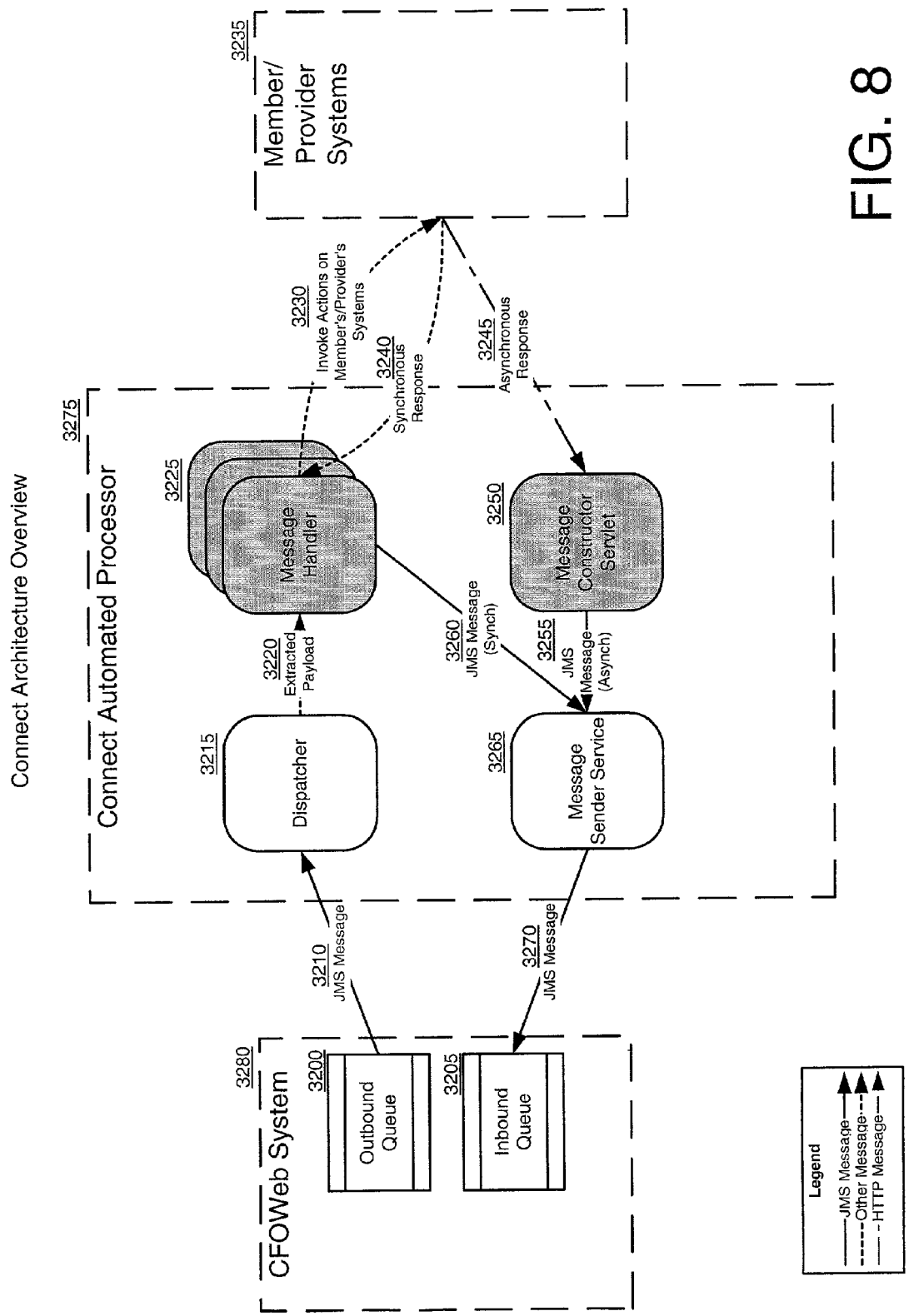
FIG. 8 shows an architectural overview of the Connect Automated Processor in an embodiment of the present invention.

FIG. 8 shows the architecture of the Connect Processor 3275 in an embodiment of this invention. CFOWeb System 3280 includes Outbound Queue 3200 and Inbound Queue 3205 for the storage of outgoing messages 3210 and incoming messages 3270, respectively. In this embodiment, messages 3210 and 3270 are in "Java Messaging Server" ("JMS") format. Connect Processor 3275 includes Dispatcher module 3215, which extracts the message "payload" 3220 from message 3210 and passes the payload 3220 as a Java object to the appropriate Message Handler 3225. Payload 3220 contains the information represented by the FinXML "Trade" element (described above and in FIG. 3), including information regarding the parties engaged in the transaction and the type of transaction. Connect Processor 3275 contains one or more Message Handlers 3225; a different Message Handler 3225 can be constructed to handle each type of message to be received by the Member or Provider. Using payload 3220, the appropriate Message Handler 3225 will invoke actions 3230 on the target Member or Provider system 3235, where the action is based on the information contained in payload 3220. The Member/Provider system 3235 communicates with Message Handler 3225 by sending a synchronous response 3240. The Member/Provider system 3235 sends an asynchronous response 3245 to Message Constructor Servlet 3250. Message Constructor Servlet 3250 enables the Member/Provider system 3235 to asynchronously construct messages for the CFOWeb System 3280 by sending parameters via transfer protocol (e.g., HTTP or TCP/IP) calls. Message Constructor Servlet 3250 will send the asynchronous message 3255 to Message Sender Service 3265. Message Sender Service 3265 also receives synchronous messages 3260 from Message Handler 3225. Message Sender Service 3265, in turn, forwards the messages 3270 to Inbound Queue 3205 of CFOWeb System 3280.

c. Message Structure

Figure 9:
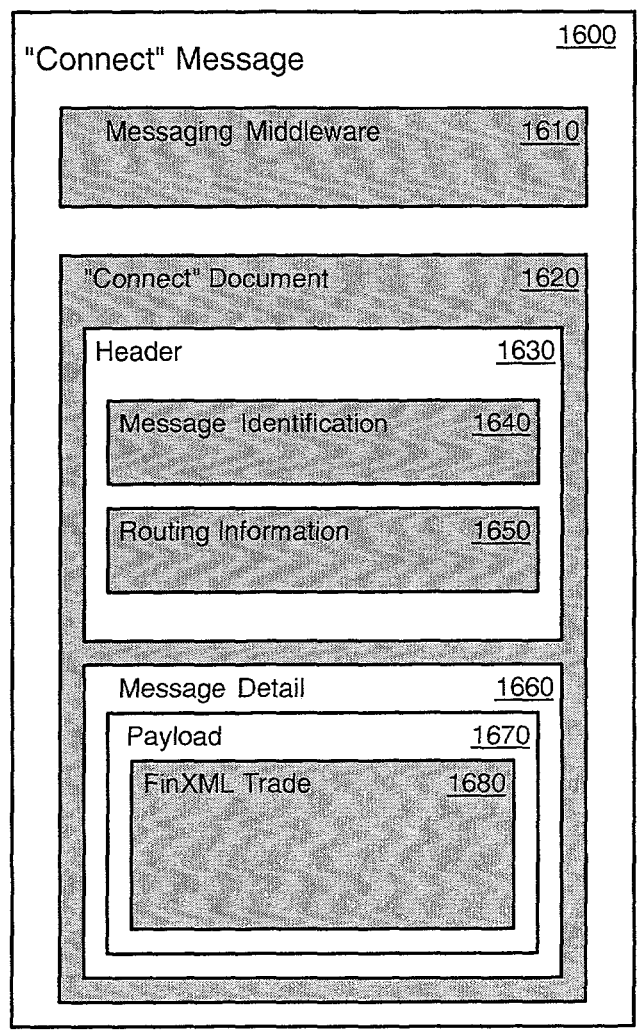
FIG. 9 shows the layout of a Connect Message in an embodiment of the present invention.

FIG. 9 shows the structure of the messages 1600 that are distributed by the Connect Processor between the CFOWeb System and systems of Members and Providers, in an embodiment of this invention. The system uses the messages to communicate all system events and transactions among system users. There are two categories of messages: "Workflow" messages and "Control" messages. Workflow messages are the main messages that describe the structure and value of transactions, deliver information to and from system servers for portfolio management, trading, and other functions, and deliver information between Members and Providers. Control messages communicate acknowledgement and exception information.

In this embodiment, each message 1600 is expressed in XML in Java Messaging Server" ("JMS") format. Each message 1600 consists of JMS-based middleware 1610 and document 1620. Middleware 1610, which may be an off-the-shelf product, includes communications protocol (e.g., HTTP, TCP/IP, SSL) and message administration and logging functionality that enable the reliable transmission of XML documents across networks and between the CFOWeb System and the Connect Processor.

Document 1620, which is an XML document, includes header 1630 and message detail 1660. Header 1630, in turn, includes message identification 1640 and routing information 1650. Message identification 1640 includes the message type (e.g., Workflow or Control), a message identifier, and a date/time stamp. Routing information 1650 identifies the message source and destination. Such information is managed by a routing table within the CFOWeb System that maps source and destination identifiers against participating Members and Providers.

Message detail 1660 includes text describing the purpose and detail of the message and may contain the payload 1670, which includes FinXML Trade information 1680 (represented by the FinXML "Trade" element described above and in FIG. 3) that defines the transaction.

i. XML Message Structure

Figure 10:
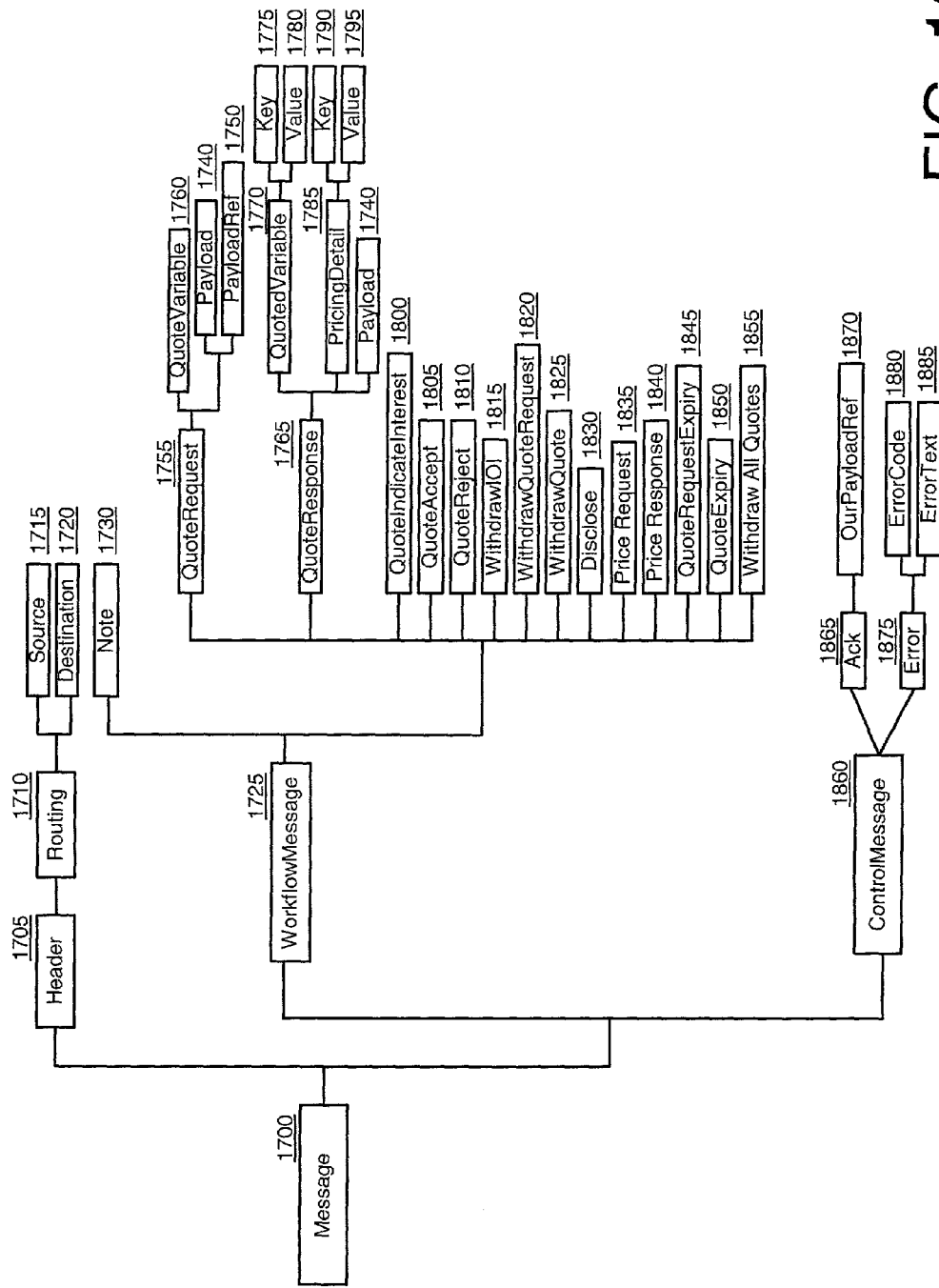
FIG. 10 shows the structure of a Connect Message in an embodiment of the present invention.

FIG. 10 illustrates the structure of a Connect message, as expressed in XML, in the present embodiment of this invention.

(a) Message Root Tag

Message root tag 1700 (or "CFOWeb Connect" root tag) identifies the message as a Connect message, and includes the following attributes:

"System Name": the name of the system that generated the message, e.g., "CFOWeb", "Connect" (for a Member or Provider system), or the name of a third-party system, if applicable.

"System ID": the identifier of the system that generated the message.

"Version": the version of the Connect message vocabulary; may differ for different Member/Provider configurations.

"Test": identifier of messages as "test" ("Y") or "live" ("N"); a test message in a live environment will be communicated but not included and acted on in the business workflow.

In the present embodiment of this invention, the Message root tag 1700 has the following XML definition:

```
<!ELEMENT Message (header, (workflowMsg | controlMsg))>
<!ATTLIST Message systemName CDATA #REQUIRED
    systemId CDATA #REQUIRED
    version CDATA #FIXED '1.0'
    test (Y | N) #REQUIRED>
```

(b) Header

Header element 1705 describes message identification information, and includes the following attributes:

"Conversation ID": a system-assigned sequence number that identifies the message as belonging to a particular conversation initiated by one of the communicating parties.

"Sequence ID": a sequence number generated separately by each communicating node that is used as a reference by control messages and to provide chronological ordering of messages.

"Sent Time": a system-assigned timestamp which indicates the time that the XML document was formed.

In the present embodiment of this invention, the Header element 1705 has the following XML definition:

```
<!ELEMENT header (routing)>
<!ATTLIST header conversationId CDATA #REQUIRED
    sequenceId CDATA #REQUIRED
    sentTime CDATA #REQUIRED>
```

(c) Routing Information

Routing element 1710 contains reference routing information about the source and destination of the message. This information includes the system-defined identifier of Members and Providers. The routing information is used to derive the middleware-addressing scheme (e.g., point-to-point message queue, topic of a publish/subscribe channel) and to identify the user responsible for the conversation. Routing element 1710 includes the following sub-elements:

"Source" 1715: the identifier of the source organization; this is a reference to a Counterparty element; can be anonymous.

"Destination" 1720: the identifier of the destination organization; this is a reference to a Counterparty element; can be anonymous.

In the present embodiment of this invention, the Routing element 1710 has the following XML definition:

```
<!ELEMENT routing (source, destination)>
<!ELEMENT source (#PCDATA)>
<!ELEMENT destination (#PCDATA)>
```

(d) Workflow Messages

Workflow Message element 1725 contains descriptions of messages that effect state transition and actions in the workflow cycle, including financial transactions, communications between Members and Providers, and interactions with CFOWeb System servers. Workflow Message element 1725 contains "Note" element 1730, which is used as an indicator whenever a Member or Provider desires to attach freeform, textual information with trade information. In addition, each instance of Workflow Message element 1725 contains one of the following Workflow Message types:

(1) Quote Request
(2) Quote Response
(3) Quote Indicate Interest
(4) Quote Accept
(5) Quote Reject
(6) Withdraw Indication of Interest ("IOI")
(7) Withdraw Quote Request
(8) Withdraw Quote
(9) Withdraw All Quotes
(10) Disclose
(11) Price Request
(12) Price Response
(13) Quote Request Expiry
(14) Quote Expiry Each Workflow Message type element represents a different type of Workflow Message, which will be described below.

In the present embodiment of this invention, Workflow Message element 1725 has the following XML definition:

```
<!ELEMENT workflowMsg (note?,
(quoteRequest | quoteResponse | quoteIndicateInterest | quoteAccept | quoteReject |    withdrawIOI |
withdrawQuoteRequest | withdrawQuote | withdrawAllQuotes | disclose | priceRequest | priceResponse |
quoteRequestExpiry | quoteExpiry))>
```

(1) Quote Request Message

Quote Request Message element 1755 describes a message to notify a Provider's system that a Member is requesting a price quote. Quote Request Message element 1755 includes the FinXML trade object as its payload, as well as information regarding the type of quote requested by the Member (e.g., spread). The CFOWeb System may handle an incoming Quote Request Message element 1755 in the following ways: (i) use Provider-configured automated pricing and send a "Quote Response Message" containing a computed price; or (ii) pass the Quote Request information to an internal trading environment to alert a Provider that the quote is available to be filled, in which case the trade details from the payload could be loaded into a back-end spreadsheet or other pricing system to allow a Provider to price the trade manually.

Quote Request Message element 1755 includes the following sub-elements and attributes:

"Quote Variable" 1760: the variable(s) necessary to express a quote.

"Request ID": identifier of the Quote Request.

"Expiry Time": deadline (in 24-hour format) specified by Member for submission of quotes in response to Quote Request.

"Leg Ref": identifier of particular trade leg for which quote requested, if applicable (e.g., "Leg ID" of particular leg or "None").

"Payload" 1740: information describing a particular financial transaction.

"Payload Type": the category of payload (e.g., FinXML).

"Payload Ref" 1750: identifier of particular financial transaction.

In the present embodiment of this invention, Quote Request Message element 1755 has the following XML definition:

```
<!ENTITY % payloadDef "payload
    | payloadType">
<!ELEMENT quoteRequest (quoteVariable+, (%payloadDef;))>
<!ATTLIST quoteRequest requestId CDATA #REQUIRED
    expiryTime CDATA #REQUIRED>
```

The following is an example Quote Request Message element 1755 in the present embodiment of this invention:

```
<?xml version="1.0"?>
<!DOCTYPE cfoWebConnect SYSTEM "CFOWEBConnect.dtd">
<cfoWebConnect systemName="CFOWeb Connect" systemId="cfoweb" version="1.0" test="N">
    <header conversationId="000001" sequenceId="000002" sentTime="1999-12-13T19:39:34">
        <routing>
            <source>ABC Corp.</source>
            <destination>XYZ</destination>
        </routing>
    </header>
    <workflowMsg>
        <note>This is a quote request</note>
        <quoteRequest requestId="1234" expiryTime="1999-12-13T19:40:34">
            <quoteVariable legRef="none">
                <key>fxRate</key>
            </quoteVariable>
            <payloadType="FinXML"/>
        </quoteRequest>
    </workflowMsg>
</cfoWebConnect>
```

(2) Quote Response Message

Quote Response Message element 1765 describes a message to notify the CFOWeb System that a Provider has submitted a price quote in response to a Quote Request Message from a Member. Quote Response Message element 1765 includes the value of the quoted variables and can optionally include a payload of the complete trade, which is useful where the Provider may have suggested a modified or alternate structure. The CFOWeb System uses the payload information to update the original quote request with a price quote and refreshes the requesting Member's web browser to display the offered price quote.

Quote Response Message element 1765 includes the following sub-elements and attributes:

"Quoted Variable" 1770: the quoted variable(s) used to express a quote.
"Key" 1775: name of the quoted variable.
"Value" 1780: the value of the price quote.
"Pricing Detail" 1785: additional information regarding the price quote (e.g., price sensitivity).
"Key" 1790: name of the pricing detail.
"Value" 1795: the value of the pricing detail.
"Request ID": identifier of the Quote Request for which Quote Response is submitted.
"Quote ID": identifier of the Quote Response.
"Expiry Time": deadline (in 24-hour format) specified by Provider for validity of price quote.
"Leg Ref": identifier of particular trade leg for which price quote submitted, if applicable (e.g., "Leg ID" of particular leg or "None").
"Payload" 1740: information describing a particular financial transaction.
"Payload Type": the category of payload (e.g., FinXML).

In the present embodiment of this invention, Quote Response Message element 1765 has the following XML definition:

```
<!ELEMENT quotedVariable (%keyValuePair;)>
<!ATTLIST quotedVariable legRef CDATA #REQUIRED>
<!ELEMENT pricingDetail (%keyValuePair;)>
<!ATTLIST pricingDetail legRef CDATA #REQUIRED>
<!ENTITY % requestQuoteRef "requestId CDATA #REQUIRED
    quoteId CDATA #REQUIRED">
<!ELEMENT quoteResponse (quotedVariable+, pricingDetail*,
payload?)>
<!ATTLIST quoteResponse %requestQuoteRef;
    expiryTime CDATA #REQUIRED>
```

The following is an example Quote Response Message element 1765 in the present embodiment of this invention:

```
<?xml version="1.0"?>
<!DOCTYPE cfoWebConnect SYSTEM "CFOWEBConnect.dtd">
<cfoWebConnect systemName="CFOWeb Connect" systemId="connect" version="1.0" test="N">
    <header conversationId="000001" sequenceId="000005" sentTime="1999-12-12T19:39:52">
        <routing>
            <source>XYZ</source>
            <destination>ABC Corp.</destination>
        </routing>
    </header>
    <workflowMsg>
        <note>This is a quoteResponse</note>
        <quoteResponse requestId="1234" quoteId="1" expiryTime="1999-12-13T19:40:22">
            <quotedVariable legRef="none">
```

```
        <key>fxRate</key>
        <value>102</value>
      </quotedVariable>
      <pricingDetail legRef="none">
        <key>market data</key>
        <value>Reuters at 1999-12-13T19:41:09</value>
      </pricingDetail>
    </quoteResponse>
  </workflowMsg>
</cfoWebConnect>
```

(3) Other Workflow Messages

In the present and other embodiments of this invention, Workflow Message element 1725 can include other message types to enable communications related to financial transactions.

(i) Quote Indicate Interest Message

Quote Indicate Interest Message element 1800 describes a message used by the CFOWeb System 3280 (in FIG. 8) to notify the Connect Processor 3275 that a Member has indicated interest in a price quote submitted by a Provider in response to the Member's earlier quote request. The Connect Processor 3275 can be configured with a Message Handler 3225 that will route Quote Indicate Interest Message element 1800 to the Provider's internal system 3235 as a screen pop-up or alert.

(ii) Quote Accept Message

Quote Accept Message element 1805 describes a message used by the CFOWeb System to notify the Connect Processor that a Member wishes to accept the price quote submitted by a Provider. Quote Accept Message element 1805 includes a reference to the quote request and the price accepted by the Member. The system will send the Quote Accept Message only to the Provider whose price was accepted; all other Providers who submitted price quotes in response to the quote request will receive a "Quote Reject Message" (described below). The Connect Processor 3275 (in FIG. 8) can be configured with a Message Handler 3225 that will route Quote Accept Message element 1805 to the Provider's internal system 3235 as a screen pop-up or alert.

(iii) Quote Reject Message

Quote Reject Message element 1810 describes a message used by the CFOWeb System to notify a Provider that a Member has rejected the price quote submitted by the Provider. This will occur when a Member expressly rejects a Provider's price quote, or accepts another Provider's quote in response to the same quote request, thus implicitly rejecting all other price quotes. Quote Reject Message element 1810 includes a reference to the quote request. The Connect Processor 3275 (in FIG. 8) can be configured with a Message Handler 3225 that will route Quote Reject Message element 1810 to the Provider's internal system 3235 as a screen pop-up or alert.

(iv) Withdraw Indication of Interest Message

Withdraw Indication of Interest ("IOI") Message element 1815 describes a message used by the CFOWeb System 3280 (in FIG. 8) to notify the Connect Processor 3275 that a Member has withdrawn its indication of interest in a price quote submitted by a Provider in response to the Member's earlier quote request. The Connect Processor 3275 can be configured with a Message Handler 3225 that will route WithdrawIOI Message element 1815 to the Provider's internal system 3235 as a screen pop-up or alert.

(v) Withdraw Quote Request Message

Withdraw Quote Request Message element 1820 describes a message used by the CFOWeb System to notify the Connect Processor that a Member wishes to withdraw a quote request that was sent previously. All Providers that were sent the original Quote Request Message will receive the Withdraw Quote Request Message as they no longer need to track activity on their price quotes regarding the particular quote request. its indication of interest in a price quote submitted by a Provider in response to the Member's earlier quote request. The Connect Processor 3275 (in FIG. 8) can be configured with a Message Handler 3225 that will route Withdraw Quote Request Message element 1820 to the Provider's internal system 3235 as a screen pop-up or alert.

(vi) Withdraw Quote Message

Withdraw Quote Message element 1825 describes a message used by the CFOWeb System to indicate that a Provider wishes to withdraw a price quote that was sent previously. The Withdraw Quote Message can be sent from either the CFOWeb System if a Provider withdraws the price quote manually or through the Connect Processor if the withdrawal action is generated by means of a Provider's internal system (either manually or automatically). If the Withdraw Quote Message is generated through the Connect Processor, a synchronized clock timestamp will be set on the message indicating the expiration time of the price quote.

(vii) Disclose Message

Disclose Message element 1830 describes a message used by the CFOWeb System to disclose to a party the identity of a previously undisclosed Counterparty. Such disclosure will only occur upon notification of the system by the Counterparty to disclose its identity.

(viii) Price Request Message

Price Request Message element 1835 describes a message used by the CFOWeb System for semi-automated pricing to notify the Connect Processor that a Member is requesting a price quote for a request from the Member's internal system. Price Request Message element 1835 includes the FinXML trade object as its payload, as well as information regarding the type of quote requested by the Member (e.g., spread). The Connect Processor handles the message with one or more Providers and sends the CFOWeb System a "Price Response Message" (described below) containing a price quote.

(ix) Price Response Message

Price Response Message element 1840 describes a message used by the Connect Processor for semi-automated pricing to notify the CFOWeb System that a Provider's internal system has calculated a price quote for a quote request and to submitted the price quote to the CFOWeb System. The CFOWeb System uses the information to refresh the requesting Member's web browser to display the offered price quote. The Provider may submit the quote with this pricing information or with information entered manually. In either case, the Provider submits the price quote to the Member manually (e.g., by clicking a button).

(x) Quote Request Expiry Message

Quote Request Expiry Message element 1845 describes a message used by the CFOWeb System to notify the Connect Processor that a Member's quote request has expired. The CFOWeb System generates the Quote Request Expiry Message automatically upon the occurrence of the expiry time for the quote request. All Providers that were sent the original Quote Request Message will receive the Quote Request Expiry Message as they no longer need to track activity on their price quotes regarding the particular quote request. The Connect Processor 3275 (in FIG. 8) can be configured with a Message Handler 3225 that will route Quote Request Expiry Message element 1845 to the Provider's internal system 3235 as a screen pop-up or alert.

(xi) Quote Expiry Message

Quote Expiry Message element 1850 describes a message used by the CFOWeb System to notify the Connect Processor that a Provider's price quote has expired. The CFOWeb System generates the Quote Expiry Message automatically upon the occurrence of the expiry time for the price quote.

(xii) Withdraw All Quotes Message

Withdraw All Quotes Message element 1855 describes a message used by the CFOWeb System to notify the Connect Processor that a Provider wishes to withdraw all price quotes. The message can specify criteria for the quotes to be withdrawn.

(e) Control Messages

Control Message element 1860 contains descriptions of messages that are sent in response to Workflow Messages to indicate the success or failure of message receipt and processing. While the middleware serves to transmit messages between the CFOWeb System and the Connect Processor, the middleware does not guarantee certain system performance parameters, including particular delivery time, successful translation and processing of the XML content, or the successful provision of a price quote. Thus, Control Message element 1860 provides acknowledgement of message delivery and reports error conditions to the sender of a message.

Control Message element 1860 includes a "Sequence ID" element, which is a system-assigned sequence number for the particular Workflow Message to which Control Message element 1860 applies. In addition, each instance of Control Message element 1860 contains one of the following Control Message types:

(1) Ack
(2) Error

Each Control Message type element represents a different type of Control Message, which will be described below.

In the present embodiment of this invention, Control Message element 1860 has the following XML definition:

```
<!ELEMENT controlMessage ack | error)>
<!ATTLIST controlMessage sequenceId CDATA #REQUIRED>
```

(1) Acknowledge Message

Acknowledge ("Ack") Message element 1865 is used to acknowledge the successful receipt, translation, and processing of a Connect message and transaction payload. Ack Message element 1865 includes "Our Payload Ref" element 1870, which contains a reference to a Payload element 1740 carried by the acknowledged message. Our Payload Ref element 1870 includes the following sub-elements:

"Payload Type": the category of payload (e.g., FinXML).
"Payload ID": the identifier of a previously communicated payload.

In the present embodiment of this invention, Ack Message element 1865, including Our Payload Ref element 1870, has the following XML definition:

```
<!ENTITY % payloadRef "payloadType CDATA #REQUIRED
   payloadId CDATA #REQUIRED">
<!ELEMENT ourPayloadRef EMPTY>
<!ATTLIST ourPayloadRef %payloadRef;>
<!ELEMENT ack (ourPayloadRef?)>
```

The following is an example Ack Message element 1865 in the present embodiment of this invention:

```
<?xml version="1.0"?>
<!DOCTYPE cfoWebConnect SYSTEM "CFOWEBConnect.dtd">
<cfoWebConnect systemName="CFOWeb Connect" systemId="connect" version="1.0" test="N">
   <header conversationId="000001" sequenceId="000003" sentTime="1999-12-13T19:39:52">
      <routing>
         <source>ABC Corp.</source>
         <destination>XYZ</destination>
      </routing>
   </header>
   <controlMsg sequenceId="000001">
      <ack/>
   </controlMsg>
</cfoWebConnect>
```

In the present and other embodiments of this invention, Ack Message element 1865 may include specific acknowledgement messages for verification and completion of a transaction, as described below.

(i) Trade Download Response Message

Trade Download Response Message element describes a message used by the CFOWeb System to notify a Provider's internal system that both the Provider and a Member have agreed to the terms of a particular price quote and that the specified trade should now be processed. The Connect Processor uses the Trade Download Response Message element to send all relevant trade information to the Provider's internal system for processing. The Trade Download Response Message element includes the trade payload.

(ii) Trade Download Acknowledge Message

Trade Download Acknowledge Message element describes a message used by the CFOWeb System to notify the Connect Processor that all necessary internal systems of the Provider have completed initial processing for a particular trade.

(iii) Trade Download Request Message

Trade Download Request Message element describes a message used by the Connect Processor when it needs to download executed trades from the CFOWeb System. Typically, this occurs when trades did not load properly. The CFOWeb System uses the Trade Download Request Message to send all trades to the Connect Processor so that it may process and feed the trade information to Providers' internal systems.

(iv) Deal Verify Request Message

Deal Verify Request Message element describes a message used by the Connect Processor to notify the CFOWeb System that a completed transaction has been verified at the Provider internal system and to request that the CFOWeb System also verify the completed transaction.

(v) Deal Verify Acknowledge Message

Deal Verify Acknowledge Message element describes a message used by the Connect Processor to communicate confirmation to the CFOWeb System that a Deal Verify Request Message has been received.

(vi) Deal Verify Confirm Message

Deal Verify Confirm Message element describes a message used by the CFOWeb System to communicate confirmation to the Connect Processor that a verification request has been carried out successfully.

(2) Error Message

Error Message element 1875 is used to provide notification to the sender of a message any time application-level processing of the XML message content fails, including the unsuccessful translation of XML into objects or execution of a pricing algorithm. Error Message element 1875 includes the following sub-elements:

"Error Code" 1880: the identifier of the particular type of error.

"Error Text" 1885: the text description of the particular type of error.

In the present embodiment of this invention, Error Message element 1875, has the following XML definition:

```
<!ELEMENT error (errorText?, errorCode)>
<!ELEMENT errorText (#PCDATA)>
<!ELEMENT errorCode (#PCDATA)>
```

The following is an example Error Message element 1875 in the present embodiment of this invention:

type of processing (e.g., automated, manual, synchronous, asynchronous).

i. Automated Pricing—Synchronous

Figure 11:
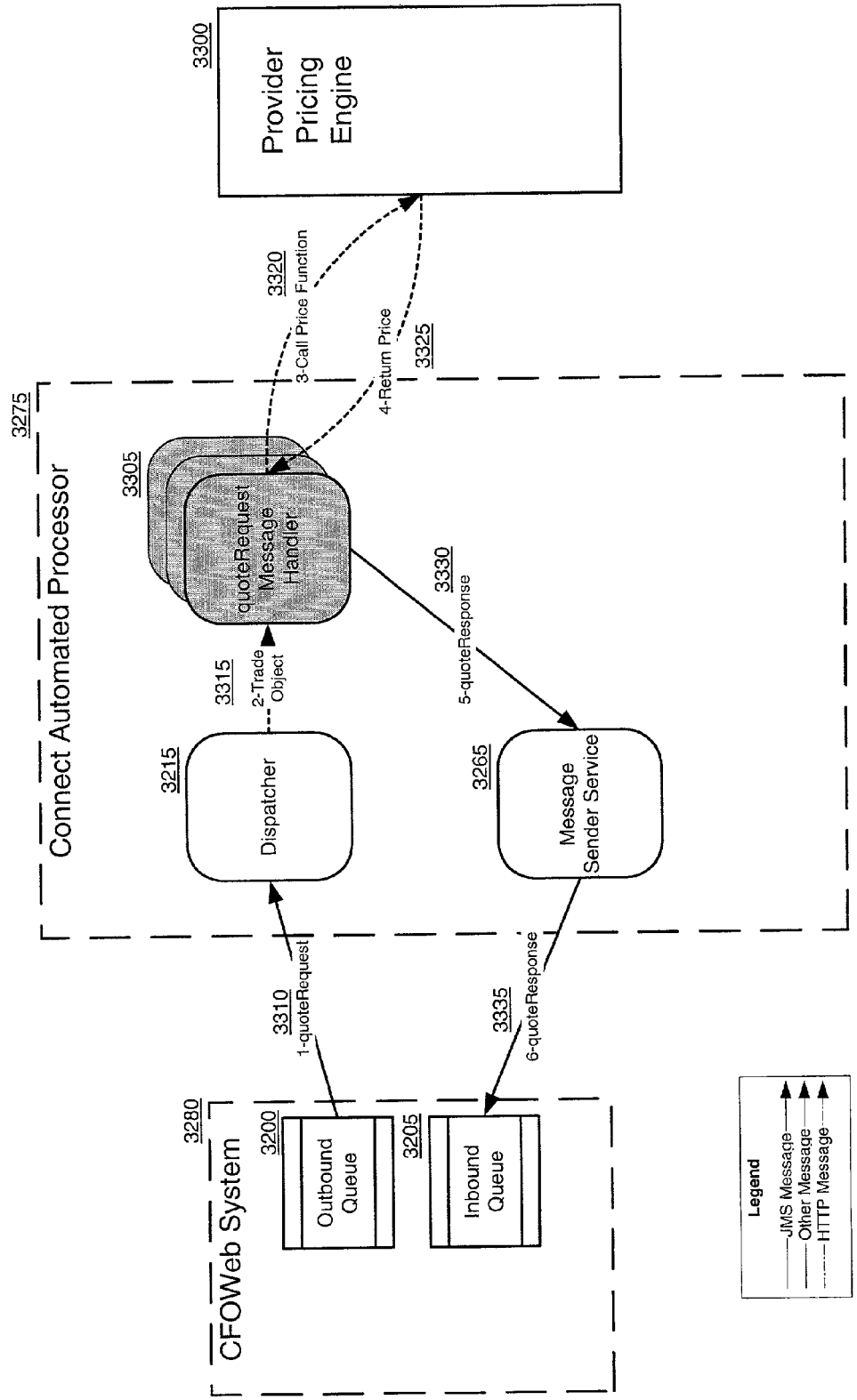
FIG. 11 shows a diagram of the Connect Message Flow for the automated pricing (synchronous) function in an embodiment of the present invention.

FIG. 11 illustrates the flow of Workflow Messages when synchronous automated pricing occurs. CFOWeb System 3280 sends Quote Request Message 3310 from Outbound Queue 3200 to Dispatcher module 3215 in Connect Processor 3275. Dispatcher 3215 extracts the payload from Quote Request Message 3310 and passes the payload as a Trade Object (Java object) 3315 to the Quote Request Message Handler 3305. Using the payload in Trade Object 3315, Quote Request Message Handler 3305 executes a "Call Price Function" 3320 on the target Provider pricing engine 3300 in the Provider's internal system. Call Price Function 3320 notifies the Provider's pricing engine 3300 to calculate and send a price quote, based on the information contained in Trade Object 3315. The Provider's pricing engine 3300 sends a synchronous response back to Quote Request Message Handler 3305 in the form of a "Return Price" Message 3325. Quote Request Message Handler 3305 generates a Quote Response Message 3330 using the price quote and sends it to Message Sender Service 3265. Message Sender Service 3265, in turn, forwards the Quote Response Message 3335 to Inbound Queue 3205 of CFOWeb System 3280 for processing.

ii. Automated Pricing—Asynchronous

Figure 12:
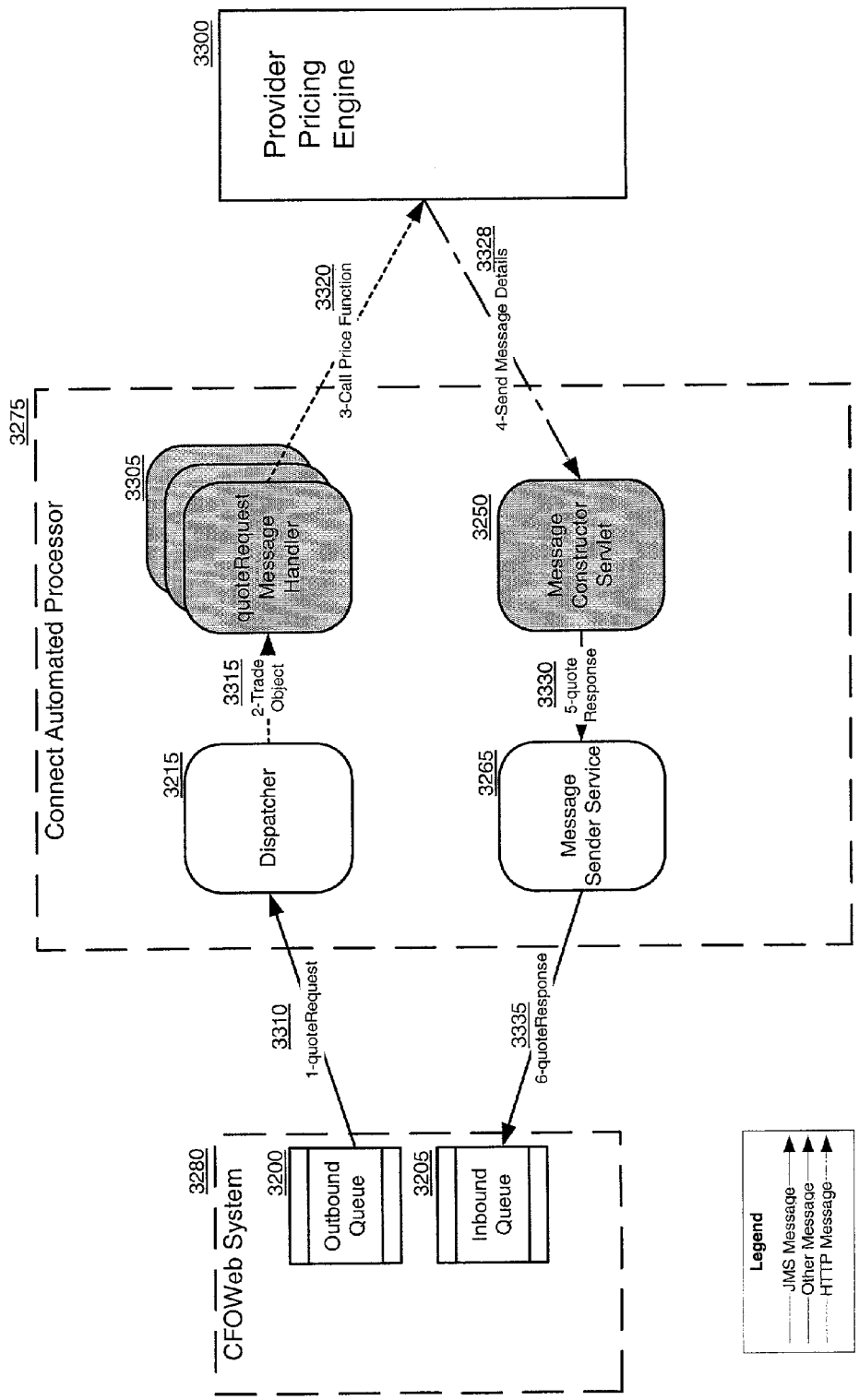
FIG. 12 shows a diagram of the Connect Message Flow for the automated pricing (asynchronous) function in an embodiment of the present invention.

FIG. 12 illustrates the flow of Workflow Messages when asynchronous automated pricing occurs. CFOWeb System 3280 sends Quote Request Message 3310 from Outbound Queue 3200 to Dispatcher module 3215 in Connect Processor 3275. Dispatcher 3215 extracts the payload from Quote Request Message 3310 and passes the payload as a Trade Object (Java object) 3315 to the Quote Request Message Handler 3305. Using the payload in Trade Object 3315, Quote Request Message Handler 3305 executes a "Call Price Function" 3320 on the target Provider pricing engine 3300 in the Provider's internal system. Call Price Function 3320 notifies the Provider's pricing engine 3300 to calculate and send a price quote, based on the information contained in Trade Object 3315. The Provider's pricing engine 3300 sends an

```
<?xml version="1.0"?>
<!DOCTYPE cfoWebConnect SYSTEM "CFOWEBConnect.dtd">
<cfoWebConnect systemName="CFOWeb Connect" systemId="connect" version="1.0" test="N">
    <header>
        <routing>
            <source>ABC Corp.</source>
            <destination>XYZ</destination>
        </routing>
        <message payloadType="FinXML" payloadId="123456" sequenceId="000005"
sentTime="1999-12-13T19:39:22">
            <error sequenceId="000001">
                <errorText>Failed to instantiate trade in Connect Cache</errorText>
                <errorCode>001</errorCode>
            </error>
        </message>
    </header>
    <body>
        <note>This is an error control message</note>
    </body>
</cfoWebConnect>
``` d. Message Flow

The flow of Workflow Messages back and forth from the CFOWeb System through the Connect Processor to Member and Provider internal systems differs depending on the type of Workflow Message (e.g., quote request, price quote) and the asynchronous response that contains message details 3328 (i.e., price quote) to Message Constructor Servlet 3250. Message Constructor Servlet 3250 constructs a Quote Response Message 3330 using the price quote and sends it to Message Sender Service 3265. Message Sender Service 3265, in turn, forwards the Quote Response Message 3335 to Inbound Queue 3205 of CFOWeb System 3280 for processing.

iii. Semi-Automated Pricing—Synchronous

Figure 13:
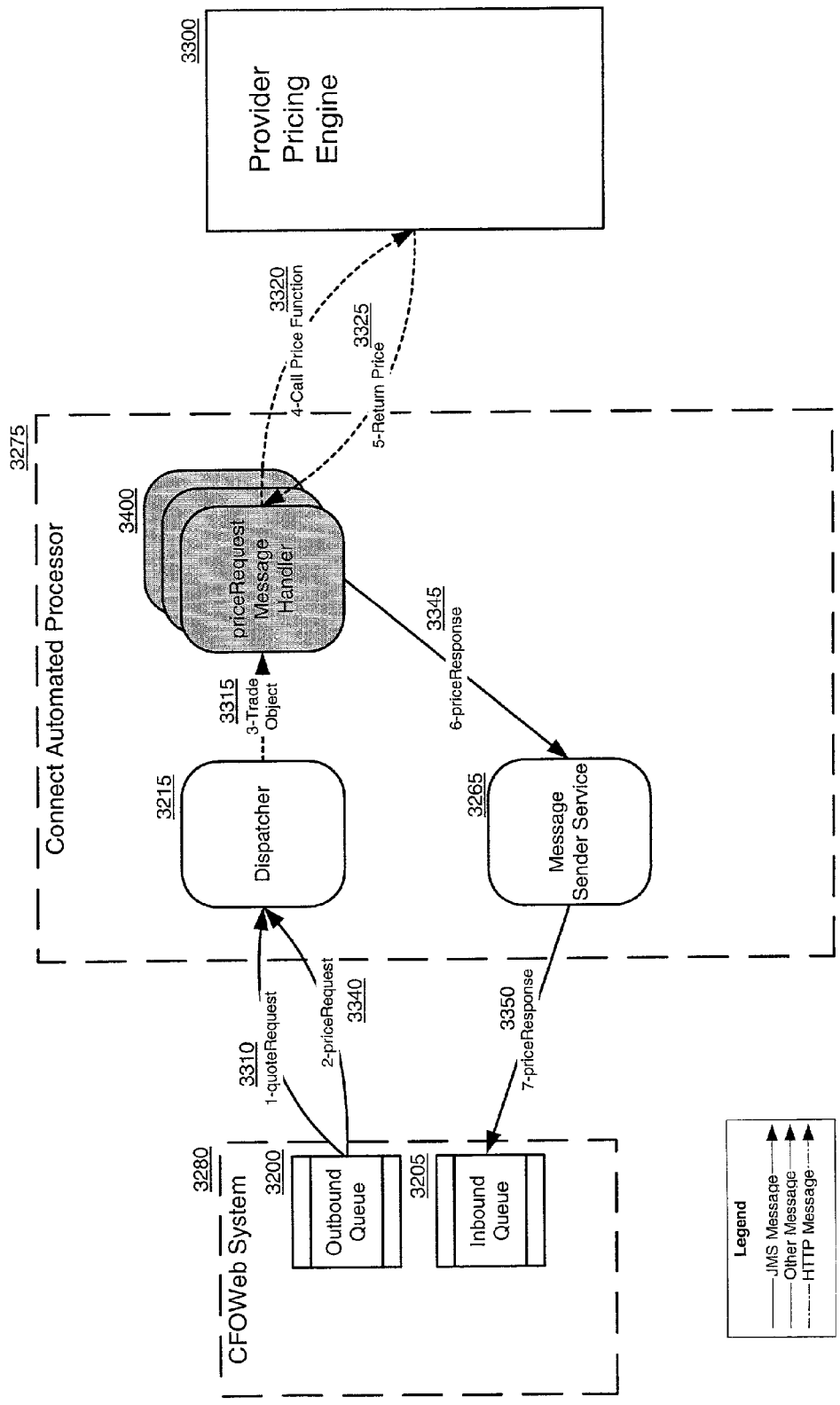
FIG. 13 shows a diagram of the Connect Message Flow for the semi-automated pricing (synchronous) function in an embodiment of the present invention.

FIG. 13 illustrates the flow of Workflow Messages when synchronous semi-automated pricing occurs. CFOWeb System 3280 sends Quote Request Message 3310 and Price Request Message 3340 from Outbound Queue 3200 to Dispatcher module 3215 in Connect Processor 3275. Price Request Message 3340 is a message used by the CFOWeb System 3280 for semi-automated pricing to notify the Connect Processor 3275 that a Member is requesting a price quote for a request from the Member's internal system. Dispatcher 3215 extracts the payload from Quote Request Message 3310 and passes the payload as a Trade Object (Java object) 3315 to the Price Request Message Handler 3400. Using the payload in Trade Object 3315, Price Request Message Handler 3400 executes a "Call Price Function" 3320 on the target Provider pricing engine 3300 in the Provider's internal system. Call Price Function 3320 notifies the Provider's pricing engine 3300 to calculate and send a price quote, based on the information contained in Trade Object 3315.

The Provider's pricing engine 3300 sends a synchronous response back to Price Request Message Handler 3400 in the form of a "Return Price" Message 3325. Price Request Message Handler 3400 generates a Price Response Message 3345 using the price quote and sends it to Message Sender Service 3265. Price Response Message 3345 is a message used by the Connect Processor 3275 for semi-automated pricing to notify the CFOWeb System 3280 that a Provider's internal system has calculated a price quote for a quote request and to submitted the price quote to the CFOWeb System 3280; the CFOWeb System 3280 uses the information to refresh the requesting Member's web browser to display the offered price quote. Message Sender Service 3265, in turn, forwards the Price Response Message 3350 to Inbound Queue 3205 of CFOWeb System 3280 for processing.

iv. Deal Transmission—Asynchronous

Figure 14:
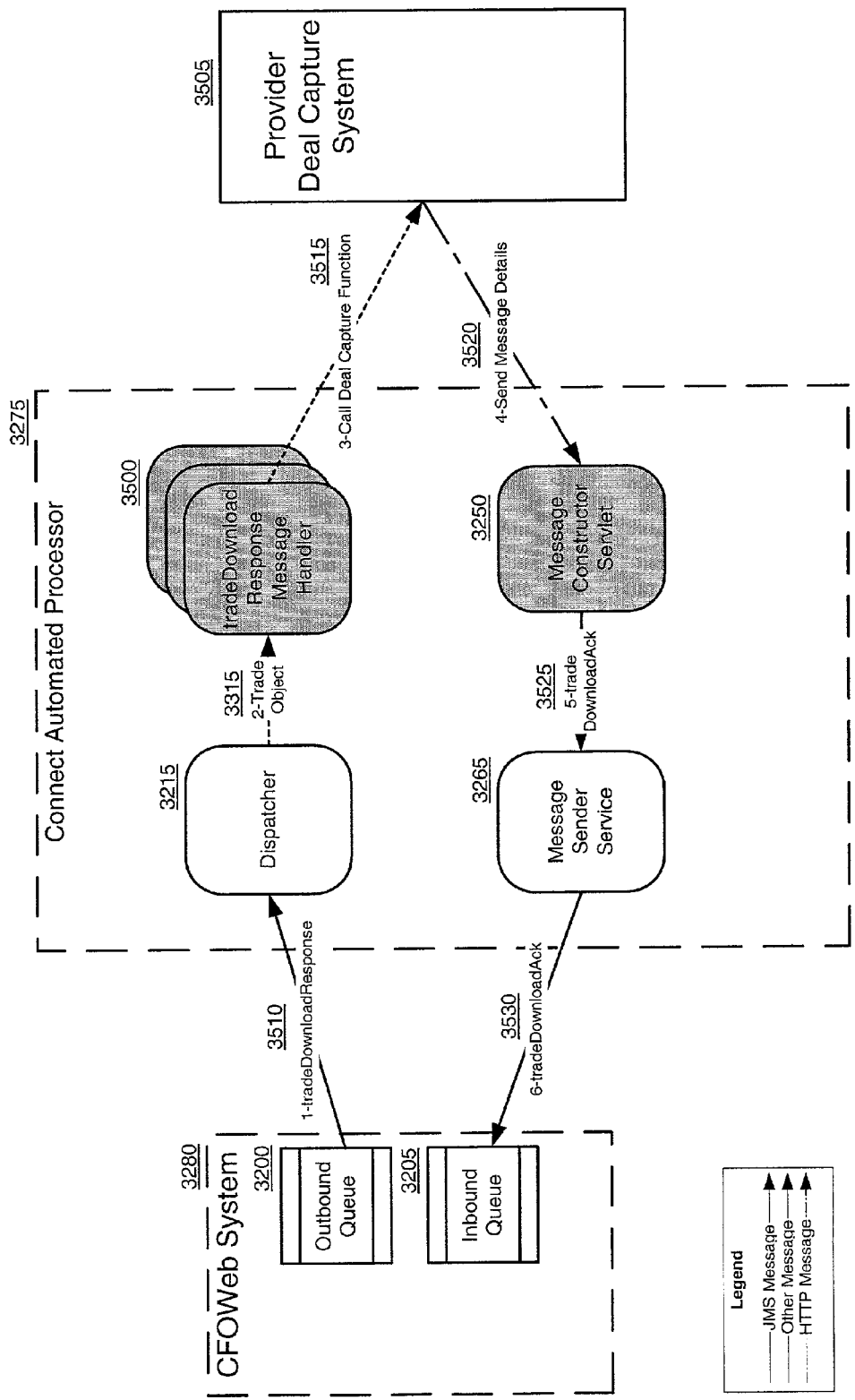
FIG. 14 shows a diagram of the Connect Message Flow for the deal transmission (asynchronous) function in an embodiment of the present invention.

FIG. 14 illustrates the flow of Workflow Messages when asynchronous transmission of a completed transaction occurs. CFOWeb System 3280 sends Trade Download Response Message 3510 from Outbound Queue 3200 to Dispatcher module 3215 in Connect Processor 3275. Trade Download Response Message is a message used by the CFOWeb System 3280 to notify a Provider's internal system that both the Provider and a Member have agreed to the terms of a particular price quote and that the specified trade should now be processed. The Connect Processor uses the Trade Download Response Message to send all relevant trade information to the Provider's internal system (i.e., deal capture system 3505) for processing.

Dispatcher 3215 extracts the payload from Trade Download Response Message 3510 and passes the payload as a Trade Object (Java object) 3315 to the Trade Download Response Message Handler 3500. Using the payload in Trade Object 3315, Trade Download Response Message Handler 3500 executes a "Call Deal Capture Function" 3515 on the target Provider deal capture system 3505 in the Provider's internal system. Call Deal Capture Function 3515 notifies the Provider's deal capture system 3505 to process the completed transaction, based on the information contained in Trade Object 3315. The Provider's deal capture system 3505 sends an asynchronous response containing message details 3520 to Message Constructor Servlet 3250. Message Constructor Servlet 3250 constructs a Trade Download Acknowledge ("Ack") Message 3525 using message details 3520 and sends it to Message Sender Service 3265. Trade Download Ack Message is a message used by the Connect Processor 3275 to notify the CFOWeb System 3280 that all necessary internal systems of the Provider have completed initial processing for a particular trade. Message Sender Service 3265, in turn, forwards the Trade Download Ack Message 3530 to Inbound Queue 3205 of CFOWeb System 3280 for processing.

3. "FinScript"

The present invention enables users (Members and Providers) to conduct financial transactions using the CFOWeb System and Connect Processor via connections to the users' internal, back-end systems. In the present embodiment of this invention, the Connect Processor enables the communication of information related to financial transactions between users (i.e., Members and Providers) and the CFOWeb System by converting FinXML (or other XML) documents to/from proprietary financial (Java) objects—as used on the users' internal systems—using proprietary stylesheets created in XSL, known as "FinScript". The Connect Processor 20 (as shown in FIG. 1) creates a FinXML document that can be sent using a transfer protocol (e.g., HTTP or TCP/IP) to the Connect Messaging Server 90 for conversion to objects that can be processed on the server side. Following processing, the Connect Messaging Server 90 converts the objects to a FinXML (or other XML) document, using XSL stylesheets, and sends the FinXML (or other XML) document to the Connect Processor 20, which uses FinScript to create a JavaScript program from the FinXML (or other XML) document. In turn, Java objects are created from the JavaScript program and sent to the other organization (e.g., a Provider).

a. Conversion (Encoding) of Financial Objects to FinXML Documents

Figure 15:
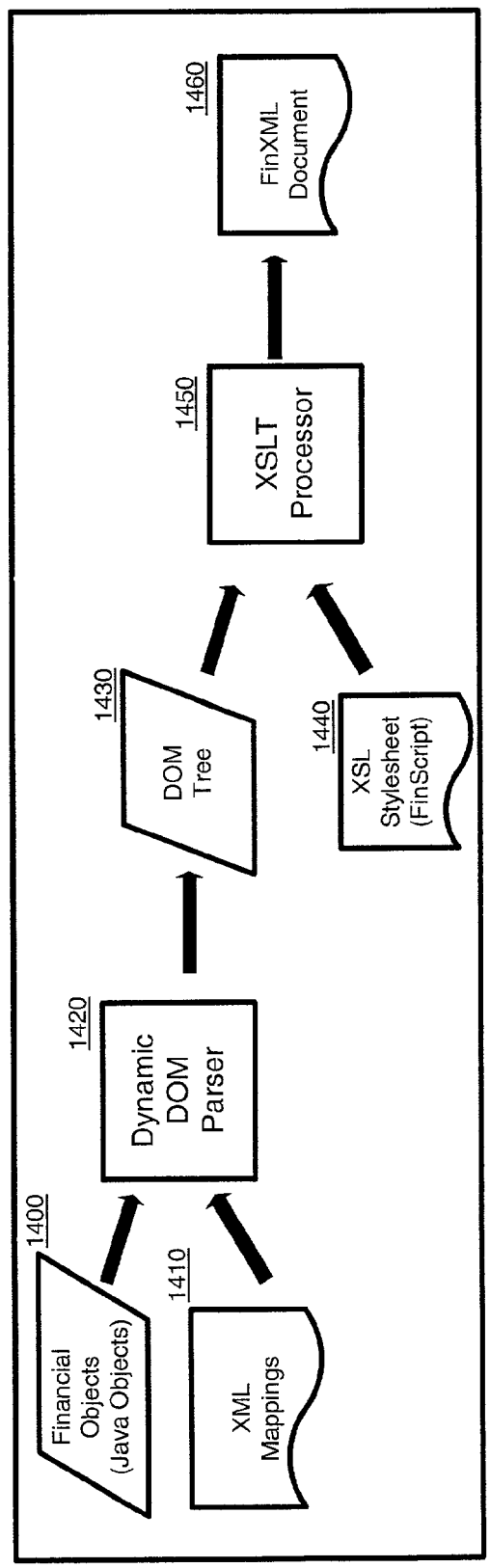
FIG. 15 shows the components utilized in converting financial objects into a FinXML document using FinScript in an embodiment of the present invention.
Figure 16:
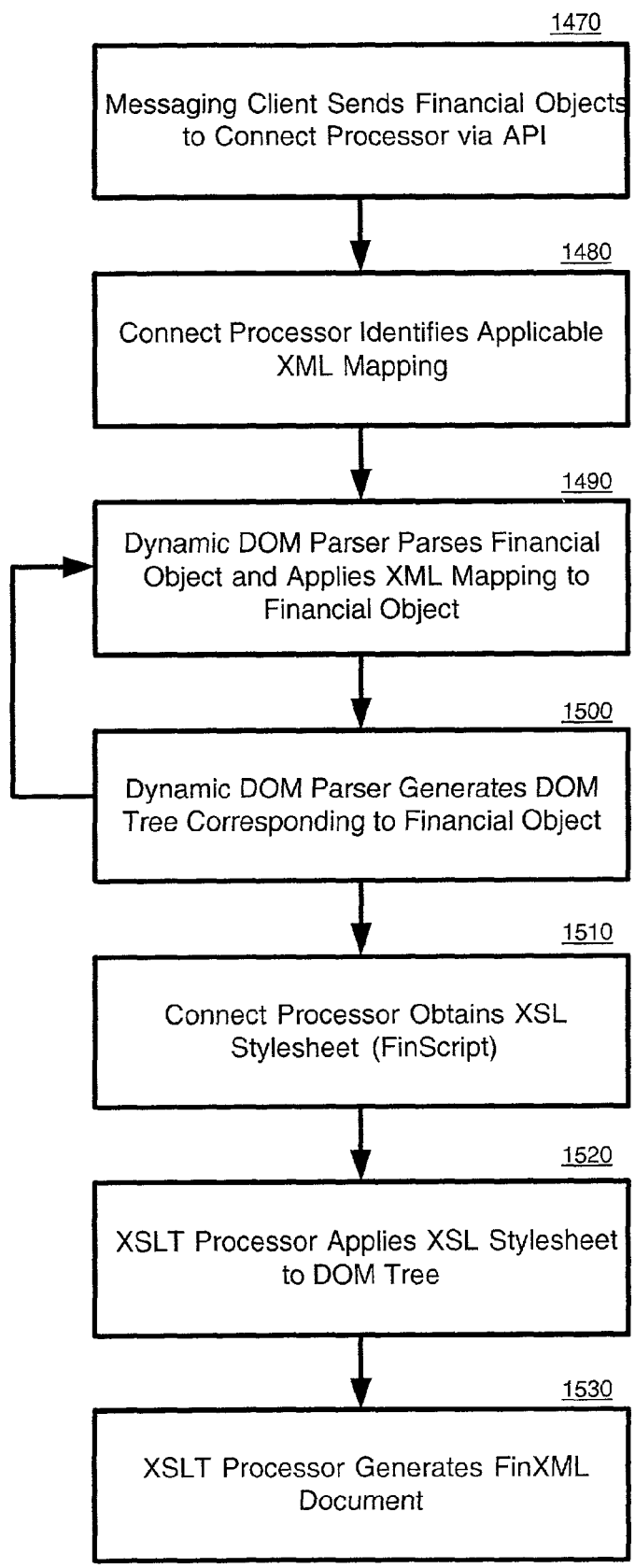
FIG. 16 shows a flowchart of the process of converting financial objects into a FinXML document using FinScript in an embodiment of the present invention.

When a user (Member or Provider) wishes to send information (e.g., a quote request or a price quote) to the CFOWeb System, the Connect Processor must convert the proprietary financial objects used by the user's internal system into FinXML (or other XML) documents that can be used by the CFOWeb System. FIG. 15 illustrates the components of the conversion (or encoding) process and FIG. 16 shows the steps to be executed by the system to perform such conversion, in an embodiment of the present invention. Note that these steps could be combined, certain steps could be removed and others deleted, and/or the order of the steps could be modified, in various other embodiments of this invention.

When the user wishes to submit information regarding a transaction (e.g., a quote request from a Member, a price quote from a Provider), the user's messaging client sends the financial objects 1400 (as shown in FIG. 15) as represented on the user's internal system to the Connect Processor via an application programming interface ("API") (step 1470 of FIG. 16). Typically, financial objects 1400 will be stored on the user's internal system as Java objects, which are in the form of "object graphs." Such object graphs consist of interlinked nodes representing the elements and attributes of the financial object.

Upon receiving financial objects 1400, the Connect Processor will identify the applicable XML object mapping 1410 to apply to financial objects 1400 (step 1480). In some embodiments of this invention, XML object mappings 1410 may be customized by the user, in order to correspond to the form and structure of the user's proprietary financial objects.

The following is an example XML object mapping 1410 used in the present embodiment of this invention:

```
<object class='com.integral.finance.fx.FXRateC' tag='fxRate'>
    <objectProperty tag='baseQuoteCcy' accessor='getBaseQuoteCcy'/>
    <doubleProperty tag='rate' accessor='getRate'/>
```

-continued

```
<objectProperty tag='variableQuoteCcy'
    accessor='getVariableQuoteCcy'/>
</object>
<object class='com.integral.finance.currency.CurrencyC' tag='currency'>
    <stringProperty tag='isoCode' accessor='getISOName'/>
</object>
<object class='com.integral.finance.fx.FXTradeC' tag='fxTrade'>
    <objectProperty tag='dealtCcy' accessor='getDealtCcy'/>
    <doubleProperty tag='dealtPrincipal' accessor='getDealtPrincipal'/>
```

DOM tree 1430. The proprietary XSL stylesheet 1440—known as "FinScript"—contains rules for navigating (i.e., determining boundaries of) and converting DOM tree 1430 into a FinXML document. In the present embodiment of this invention, XSL stylesheets 1440 are linked to a single root. In some embodiments of this invention, XSL stylesheets 1440 may be customized by the user, in order to correspond to the form and structure of the user's proprietary financial objects.

The following is an example XSL stylesheet 1440 used in the present embodiment of this invention:

```
<xsl:stylesheet xmlns:xsl="http://www.w3.org/XSL/Transform/1.0">
    <xsl:import href="counterparties2XML.xsl" />
    <xsl:import href="fxUtil2XML.xsl" />
    <xsl:import href="events2xml.xsl" />
    <xsl:output method="xml" indent="yes" />
    <!-- replace the built-in rules for text and attributes -->
    <xsl:template match="text()|@*" />
    <xsl:template name="fxSpot2XML">
        <fxSpot>
            <entryDate>
                <xsl:value-of select="getTradeDate" />
            </entryDate>
            <xsl:apply-templates select="getTradeDate" mode="fxSpot2XML" />
            <xsl:apply-templates select="getSettlementDate" mode="fxSpot2XML" />
            <xsl:apply-templates select="getValueDate" mode="fxSpot2XML" />
            <xsl:apply-templates select="getDealtCurrency" mode="fxSpot2XML" />
            <xsl:apply-templates select="getSettledCurrency" mode="fxSpot2XML" />
            <events>
                <xsl:apply-templates select="getFinancialEvents" mode="events2xml" />
            </events>
        </fxSpot>
    </xsl:template>
    <!-- fxSpot2XML -->
</xsl:stylesheet>
```

-continued

```
<objectProperty tag='fxRate' accessor='getFXRate'/>
<objectProperty tag='settledCcy' accessor='getSettledCcy'/>
<doubleProperty tag='settledPrincipal'
    accessor='getSettledPrincipal'/>
<dateProperty tag='valueDate' accessor='getValueDate'/>
<booleanProperty tag='isBuy' accessor'isBuy'/>
</object>
```

Next, the Connect Processor invokes a dynamic Document Object Model ("DOM") parser module 1420 to parse financial objects 1400 and apply XML object mapping 1410 to the elements and attributes of financial objects 1400 (step 1490). DOM is a platform- and language neutral interface that will allow programs and scripts to dynamically access and update the content, structure and style of documents. DOM provides a standard set of objects for representing HTML and XML documents, a standard for how these objects can be combined, and a standard interface for accessing and manipulating them. DOM is described in the *Document Object Model (DOM)Level 1 Specification Version* 1.0 (Oct. 1, 1998), World Wide Web Consortium (Massachusetts Institute of Technology, Institut National de Recherche en Informatique et en Automatique, Keio University) <http://www.w3.org/TR/REC-DOM-Level-1>.

The dynamic DOM parser generates a DOM "tree" (1430), which is a 1:1 mapping to the object graph of financial objects 1400 (step 1500). Generation of the DOM tree is dynamic and occurs on an as-needed basis as finite boundaries (transitive closure) of the object graph are determined. Thus, steps 1490 and 1500 may be repeated as necessary. Next, the Connect Processor obtains the XSL stylesheet 1440 to apply to DOM tree 1430 (step 1510), based on the object values contained in Next, the Connect Processor invokes a XSLT processor 1450—an off-the-shelf component (e.g., International Business Machines Corp.'s Lotus XSL product)—to apply the rules of the XSL stylesheet 1440 to DOM tree 1430 (step 1520). This process results in the generation of a FinXML document 1460 (step 1530) that can be used by the CFOWeb System. The following is an example FinXML document 1460 generated by the XSLT processor 1450 in the present embodiment of this invention:

```
<fxSpot>
    <tradeDate>1999-12-24</tradeDate>
    <valueDate>1999-11-04</valueDate>
    <dealtAmount payer="ABC" receiver="XYZ">
        <currency>JPY</currency>
        <amount>100000000</amount>
    </dealtAmount>
    <settledAmount payer"XYZ"
        receiver="ABC">    <currency>USD</currency>
        <fxRate>
            <baseCurrency> USD </baseCurrency>
            <baseUnits> 1 </baseUnits>
            <quoteCurrency> JPY </quoteCurrency>
            <quoteUnits> 1 </quoteUnits>
            <rate> 102.5 <rate>
        </fxRate>
    </settledAmount>
</fxSpot>
```

Note that the same process described above will be used by the Connect Messaging Server to convert the proprietary financial objects used by the various servers of the CFOWeb System into FinXML (or other XML) documents that can be sent to the Connect Processor.

b. Conversion (Decoding) of FinXML Documents to Financial Objects

Figure 17:
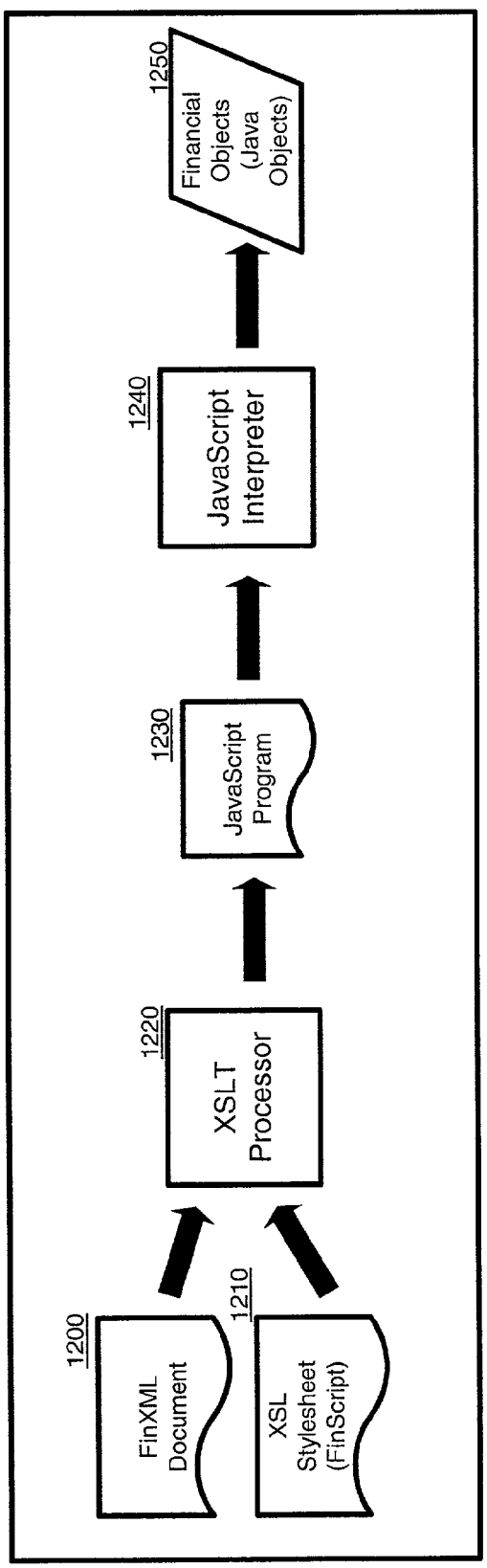
FIG. 17 shows the components utilized in converting a FinXML document into financial objects using FinScript in an embodiment of the present invention.
Figure 18:
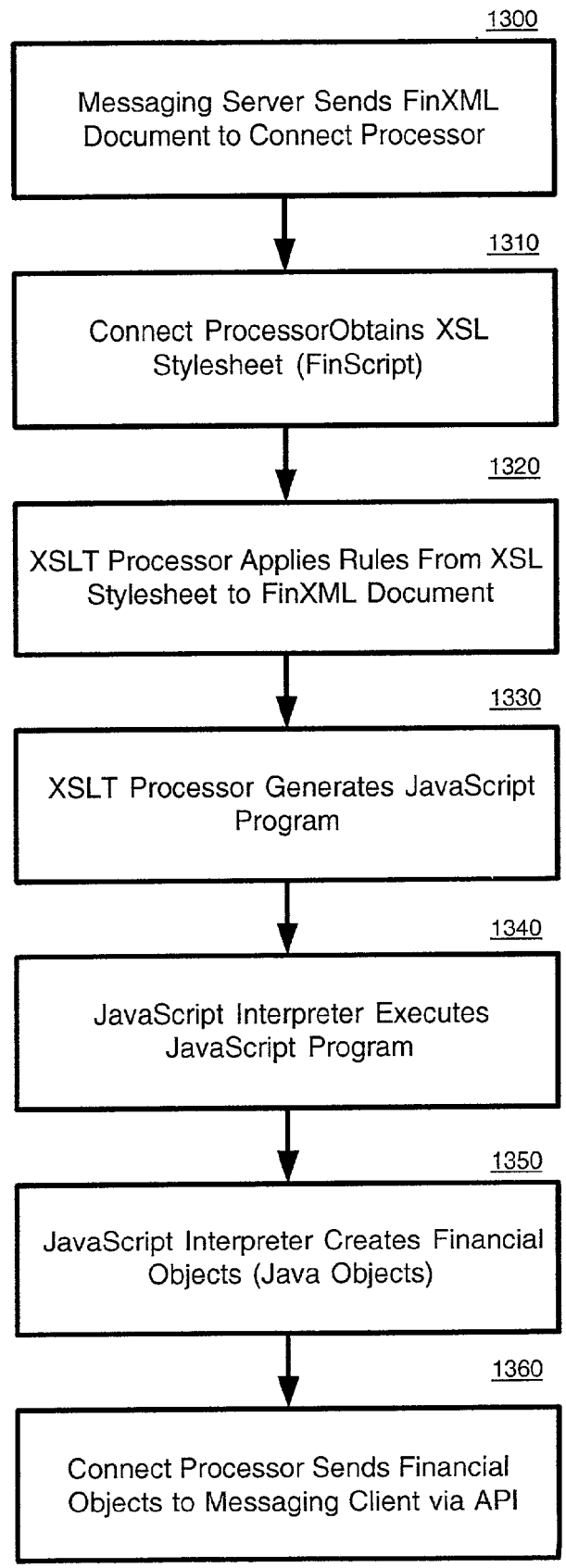
FIG. 18 shows a flowchart of the process of converting a FinXML document into financial objects using FinScript in an embodiment of the present invention.

When the CFOWeb System is ready to send information regarding a transaction to a user (Member or Provider) Connect Processor must convert the FinXML (or other XML) documents into proprietary financial objects that can be used by the user's internal system. FIG. 17 illustrates the components of the conversion (or decoding) process and FIG. 18 shows the steps to be executed by the system to perform such conversion, in an embodiment of the present invention. Note that these steps could be combined, certain steps could be removed and others deleted, and/or the order of the steps could be modified, in various other embodiments of this invention.

When the CFOWeb System wishes to send information regarding a transaction (e.g., a quote request from a Member, a price quote from a Provider), the Connect Messaging Server sends the previously-created FinXML (or other XML) document 1200 (as shown in FIG. 17) to the Connect Processor (step 1300 of FIG. 18). The following is an example FinXML document 1200 created in the present embodiment of this invention:

```
<fxSpot>
    <tradeDate>1999-12-24</tradeDate>
    <valueDate>1999-11-04</valueDate>
    <dealtAmount payer="ABC" receiver="XYZ">
        <currency>JPY</currency>
        <amount>100000000</amount>
    </dealtAmount>
    <settledAmount payer="XYZ" receiver"ABC">     <currency>USD</currency>
        <fxRate>
            <baseCurrency> USD </baseCurrency>
            <baseUnits> 1 </baseUnits>
            <quoteCurrency> JPY </quoteCurrency>
            <quoteUnits> 1 </quoteUnits>
            <rate> 102.5 </rate>
        </fxRate>
    </settledAmount>
</fxSpot>
```

Upon receiving FinXML (or other XML) document 1200, the Connect Processor will obtain the XSL stylesheet 1440 to apply to FinXML document 1200 (step 1310), based on the transaction type identified in FinXML document 1200. There is a different XSL stylesheet for each type of transaction and all options supported by the CFOWeb System. The proprietary XSL stylesheet 1210—known as "FinScript"—contains rules for converting FinXML document 1200 into a JavaScript program, including reusable fragments of JavaScript programming code. In the present embodiment of this invention, XSL stylesheets 1210 are linked to a single root. In some embodiments of this invention, XSL stylesheets 1210 may be customized by the user, in order to correspond to the form and structure of the user's proprietary financial objects.

The following is an example XSL stylesheet 1210 used in the present embodiment of this invention:

```
<xsl:stylesheet xmlns:xsl="http://www.w3.org/XSL/Transform/1.0">
    xmlns="http://www.finxml.org/finxml/1.0">
    <xsl:output method="text" />
    <xsl:output indent="yes" />
    <xsl:template match="text()|@*" mode="fxSpot" />
    <xsl:template match="fxSpot">
        <xsl:text>someProperties=newPackages.java.util.HashMap();
            someProperties.put
            (Packages.com.integral.finance.trade.TradeCreationKeys.TRADE_DATE, "</xsl:text>
        <xsl:value-of select="tradeDate" />
        <xsl:text>")trade =
            Packages.com.integral.apps.ui.fxtrade.FXTradeFactory.newFXSpotTrade
            (applicationEnvironment, uow, null, null, someProperties);
            trade.setFrontOfficeID(tradeID);
        </xsl:text>
        <xsl:apply-templates select="externalId" mode="fxSpot" />
        <xsl:apply-templates select="valueDate" mode="fxSpot" />
        <xsl:apply-templates select="settlementDate" mode="fxSpot" />
        <xsl:apply-templates select="dealtAmount" mode="fxSpot" />
        <xsl:apply-templates select="settledAmount" mode="fxSpot" />
            events = trade.getFinancialEvents();
        <xsl:apply-templates select="events" mode="events">
            <xsl:with-param name="object" select=""events"" />
        </xsl:apply-templates>
    </xsl:template>
    <!-- fxSpot -->
...
</xsl:stylesheet>
```

Next, the Connect Processor invokes a XSLT processor 1220—an off-the-shelf component (e.g., International Business Machines Corp.'s Lotus XSL product)—to apply the rules of the XSL stylesheet 1210 to FinXML (or other XML) document 1200 (step 1320). This process results in the generation of a JavaScript program 1230 (step 1330) that can be executed to generate Java objects. The following is an example JavaScript program 1230 generated by the XSLT processor 1220 in the present embodiment of this invention:

viders) and the CFOWeb System by converting documents in non-XML formats, such as binary data streams, byte streams, other digital information streams, or hash tables, to/from proprietary financial (Java) objects—as used on the users' internal systems—using the FinScript stylesheets described above. The Connect Processor 20 (as shown in FIG. 1) can create a non-XML-format document that can be sent using a transfer protocol (e.g., HTTP or TCP/IP) to the Connect Messaging Server 90 for conversion to objects that can be pro-

```
counterpartyA = Packages.com.integral.finance.counterparty.CounterpartyFactory.newLegalEntity ( );
...
someProperties = newPackages.java.util.HashMap ( );
someProperties.put (Packages.com.integral.finance.trade.TradeCreationKeys.TRADE_DATE, "2000-06-
12")
trade = packages.com.integral.apps.ui.fxtrade.FXTradeFactory.newFXSpotTrade (applicationEnvironment,
uow, null, null, someProperties);
valueDate = Packages.com.integral.finance.dateTime.DateTimeFactory.newDate ("2002-06-14");
trade.setValueDate (valueDate);
...
trade.setCounterpartyA (counterpartyA);
trade.setCounterpartyB (counterpartyB);
```

Next, the Connect Processor invokes a JavaScript interpreter 1240—an off-the-shelf component (e.g., Mozilla.org's "Rhino" JavaScript interpreter)—to execute the JavaScript program 1230 (step 1340). This process results in the generation of financial objects 1250—Java objects—(step 1350) that can be used by the user's internal systems. The Connect Processor sends the financial objects 1250 to the messaging client application of the user's system via an API (step 1360).

Note that the same process described above will be used by the Connect Messaging Server to convert the FinXML (or other XML) documents created and sent by the Connect Processor into proprietary financial objects to be used by the various servers of the CFOWeb System.

c. Conversion of non-XML Documents to Financial Objects

In other embodiments of this invention, the Connect Processor enables the communication of information related to financial transactions between users (i.e., Members and Processed on the server side. Following processing, the Connect Messaging Server 90 converts the objects to a non-XML-format document, using XSL stylesheets, and sends the document to the Connect Processor 20, which uses FinScript to create a JavaScript program from the document. In turn, Java objects are created from the JavaScript program and sent to the other organization (e.g., a Provider).

4. Multi-Portal "Connect" Processor

In an embodiment of the present invention, the above-described Connect Processor can be modified to enable multiple, separate portals to communicate with the Connect Processor, and in turn each other, simultaneously. Such portals can include banks (i.e., Providers) and corporate entities (i.e., Members) that desire to engage in financial transactions of the type described herein using the system.

There are several scenarios under which multi-portal transactions can occur using the Connect Processor. First, a single corporate entity can conduct transactions with one or more banks, where the corporate entity and each bank use the same message set (e.g., XML-based or non-XML-based message set) and protocol. Second, one or more corporate entities can conduct transactions with a single bank, where the parties to a transaction may use different message sets and protocols; the Connect Processor will translate the parties' transaction messages into a common message set (e.g., FinXML) and aggregate them into a single message flow for processing by the bank, as well as translate messages from the bank into the message set and protocol applicable to each corporate entity. Third, one or more banks can conduct transactions with a single corporate entity, where the parties to a transaction may use different message sets and protocols; the Connect Processor will translate the parties' transaction messages into a common message set (e.g., FinXML) and aggregate them into a single message flow for communication with the corporate entity, as well as translate messages from the corporate entity into the message set and protocol applicable to each bank.

a. Architecture

The architecture of the multi-portal embodiment of the Connect Processor, as modified to enable multi-portal transactions, is shown in FIG. 124. Multiple external portals (portals 9810, 9830, 9850) from banks and corporate entities connect to Connect Processor 9800 via public or private networks. Each portal has an associated client (clients 9815, 9835, 9855) that receives incoming messages from the portal, as well as response messages sent from Connect Processor 9800. Each client is connected to an associated bridge (bridges 9820, 9840, 9860).

Each bridge is a "plug-in" adapter that, in turn, consists of an incoming "receiver" adapter and an outgoing "sender" adapter and performs a certain function. Such plug-in adapters may be included with the system Connect Processor 9800 or created by a corporate entity or bank for interface with Connect Processor 9800. The bridge serves to convert between the native message format of the associated portal (XML-based or non-XML-based) and the standard format of Connect Processor 9800 (e.g., FinXML), and tie together the transport protocol (e.g., DLL, FTP, JMS, etc.) of the associated portal with that of Connect Processor 9800. Each bridge is connected to an associated bus client (bus clients 9825, 9845, 9865) that serves to send/receive messages to/from and communicate with Bus 9805. The bus clients can use filters to control the delivery and receipt of messages by a particular entity. Such filters can be specified in the form of message header properties applied to each message, where such properties include information such as system identifier, entity name, message type, transaction type, time zone, currency type, and other profile information provided by the entity.

Bus 9805 connects the various bridges, services, translators, message builders and other plug-in adapters connected to Connect Processor 9800. Bus 9805 determines the appropriate bus client to which each message will be dispatched, using a dispatch registry. The dispatch registry is a database that includes, for each bank and corporate entity connected to Connect Processor 9800, the address of a specific bus client for each type of message that the bank or corporate entity indicated it is willing to receive in its system profile information. Note that the different "channels" (i.e., portals, services, translators, message builder, etc.) for which Bus 9805 enables inter-communication may not know about each other. For example, corporate entities and banks can communicate through a common set of "topics", by sending messages to the topic and specifying the topics for which messages should be received. An entity could send a message to the topic without knowing whether any other entities or banks were currently "listening" to the topic; conversely, an entity could subscribe to receive messages related to a particular topic without knowing whether any other entities or banks were currently "publishing" to the topic. Bus 9805 determines how to route such topic messages to the appropriate destinations.

In addition to portals, other functionality may be connected to Connect Processor 9800, such as a database containing information necessary for generating certain response messages, for example, exchange or interest rate information. Database 9870, for example, is connected to Connect Processor 9800 via Database Client 9875. Database Client 9875 receives data from Database 9870, as well as data request messages sent from Connect Processor 9800. Database Client 9875 is connected to Cache Service 9880, a plug-in adapter that creates data request messages from FinXML messages received from Connect Processor 9800. Cache Service 9880 is connected to Cache Bus Client 9885 that serves to send/receive messages to/from and communicate with Bus 9805.

Message Builder 9890, in combination with Message Builder Bridge 9895, creates FinXML response messages to messages sent by portals via Connect Processor 9800. Message Builder Bus Client 9900 serves to send/receive messages to/from and communicate with Bus 9805.

One or more translators (9905, 9915) serve to transform one application language into another, independent of portals and bridges, as necessary for exchanging transaction messages. For example, a translator might translate XSL stylesheets into XML-based or non-XML-based objects. Translator bus clients (9910, 9920) serve to send/receive messages to/from and communicate with Bus 9805.

b. Message Flow

The message flow of the multi-portal embodiment of the Connect Processor, as modified to enable multi-portal transactions, is shown in FIG. 125. In a typical transaction, such as a request for a quote submitted by a corporate entity to one or more recipient banks using the system, the corporate entity—e.g., Portal 1 9810 in FIG. 124—submits a quote request for a particular type of transaction (e.g., swap, spot, etc.) to the system, i.e., Connect Processor 9800. Client 1 9815 receives the incoming message from its associated Portal 1 9810 (step 10000 in FIG. 125). Bridge 1 9820 converts the message from the native format used by the corporate entity in Portal 1 9810 into a "Connect Message," i.e., a message in the format used by Connect Processor 9800, e.g., FinXML (step 10005). Next, associated Bus Client 1 9825 sends the Connect Message via Bus 9805 to the appropriate destination, as determined by Bus 9805 (step 10010). In this particular example, the destination is Message Builder 9890; with respect to other messages, the destination might be another portal, or a service, such as Cache Service 9880, or a language translator, such as Translator 1 9905.

Message Builder Bus Client 9900 receives the Connect Message from Bus 9805 and Message Builder 9890, in combination with Message Builder Bridge 9895, constructs a FinXML response message to the Connect Message (step 10015). Message Builder Bus Client 9900 sends the response message via Bus 9805 to the appropriate portal(s), for example the portals of one or more banks. In this example, Message Builder Bus Client 9900 sends the response message via Bus 9805 to Bus Client 2 9845 (step 10020). Bridge 2 9840 (associated with Bus Client 2 9845) converts the response message from FinXML to the native message format utilized by destination Portal 2 9830 (step 10025). Finally, Bridge 2 9840 sends the response message in the native format to Client 2 9835 (step 10030) for processing by Portal 2 9830.

5. "Auto Dealer" Processing Engine

In an embodiment of the present invention, the system includes the "Auto Dealer" processing engine that enables banks to provide instantaneous responses to requests for quotes placed by entities that desire to engage in financial transactions using the system described herein. The "Auto Dealer" processing engine integrates a bank's internal processing systems and automates one- and two-way pricing, margining, and credit checking mechanisms.

The message flow of the Auto Dealer processing engine is shown in FIG. 126. In a typical transaction, a corporate entity will submit a request for a quote (via the entity's system integrated with Auto Dealer) which is received by one or more recipient banks using the system (step 10100). The recipient banks will be those banks that set their profile information to allow receipt of a quote request based on the specified type of transaction, the specified currency, the amount of the request, and/or the identity of the requesting entity. Upon receipt of the quote request, the processing engine will check the requesting entity's profile in order to determine whether the entity is permitted to engage in "auto" trading and receive auto quotes (step 10105). If not, manual intervention will be required (step 10140), whereby the bank (i.e., an employee) will make the decision to create and send a manual quote to the requesting entity (step 10145) or decline to send a quote (step 10150).

If the requesting entity is permitted to engage in "auto" trading, the processing engine will perform credit verification regarding the entity (step 10110), in order to determine whether the entity has an established line of credit with a particular bank or whether, based on the entity's financial status, the bank is willing to provide a credit line to the entity, engage in a financial transaction with the entity, and offer it a price quote. The credit relationship and amount will be confirmed if a quote acceptance is subsequently received for an issued price quote. The credit amount will be withdrawn in the event that a quote request expires or is withdrawn by the requesting entity. If the credit verification is not successful, manual intervention will be required (step 10140), whereby the bank (i.e., an employee) will make the decision to create and send a manual quote to the requesting entity (step 10145) or decline to send a quote (step 10150).

If the credit verification of the requesting entity is successful, the processing engine will access raw market data (step 10115), for use in creating a price quote. In an embodiment of this invention, this step may be performed by accessing an electronic spreadsheet containing currency pairs, spot and forward dates, and continually-updated currency rates (bid and offer) for those dates. If, because of a technical problem or lack of an updated rate, market data related to the quote request cannot be accessed, manual intervention will be required (step 10140), whereby the bank (i.e., an employee) will make the decision to create and send a manual quote to the requesting entity (step 10145) or decline to send a quote (step 10150).

If the market data access is successful, the processing engine will check the trade parameters of the quote request (step 10120), in order to determine whether the transaction specified in the quote request is executable, e.g., whether the specified currency is tradable and whether the specified notional amount is within the bank's acceptable bid/offer range. If not, manual intervention will be required (step 10140), whereby the bank (i.e., an employee) will make the decision to create and send a manual quote to the requesting entity (step 10145) or decline to send a quote (step 10150).

If verification of the trade parameters is successful, the processing engine will initiate the calculation of spreads and margins, as applicable (step 10125), which are necessary for the creation of a price quote. Such calculation will incorporate the following factors: transaction currency pair, trade type, trade tenor, notional amount, and margin level. A bank can define multiple margin types, such as sales margin, branch margin, and volume margin, each of which would be applicable in different situations. Margins could also be customized for particular trading entities. Typically, each margin type would have two versions: a bid-side version and an offer-side version.

After calculating the margin, the processing engine will then prepare the auto quote response containing the price quote (step 10130) and send the auto quote response to the requesting entity (step 10135).

Note that in another embodiment of this invention, the credit verification (step 10110), access of raw market data (step 10115), and verification of trade parameters (step 10120) steps are not inter-dependent and should all be processed independently, regardless of whether any of those steps were not successful. If any of those steps were not successful, then the processing engine will route the request to manual intervention (step 10140) prior to initiating the calculation of spreads and margins (step 10125).

The processing engine also enables the bank to create and send multiple price quotes for each quote request received. For example, if a price quote expires but the underlying quote request is still valid (i.e., not expired or withdrawn), the processing engine can be set to automatically issue a new price quote from the bank (if the bank set its profile for such automatic quote issuance).

The Auto Dealer processing engine includes user interfaces for the input of transaction parameters. FIG. 127 illustrates the "Trader Price Maintenance" user interface 1o that enables a bank trader to change, at any moment, the parameters for a given currency pair and trade type combination, including the following: tenor, bid and offer amount, bid and offer currency, trader margins (bid and offer), default expiry time, and currency tradable indicator. The trader could also add or remove currency pairs for a particular trade type using the "Trader Preferences" interface illustrated in FIG. 128.

FIG. 129 illustrates the "Salesperson Margin Maintenance" user interface that enables a non-trader (e.g., salesperson or sales branch personnel) to change, at any moment, certain parameters for a given currency pair, trade type, and counterparty combination, including: sales margins (bid and offer) and branch margins (bid and offer). Such margins are applied on top of trader margins in order to determine a price quote.

The processing engine also provides interfaces for the generation of manual price quotes, in situations in which certain steps of the auto quote process were not successful (e.g., credit verification, access of market data, trade parameter verification). Such interfaces show quote request details, credit verification details, and market data details, and enable the bank to input and modify the price quote and margins. FIG. 130 illustrates such an interface for a Spot transaction; similar interfaces exist for other types of transactions.

C. Interactive Processing of Financial Information

The present embodiment of this invention includes a web-based system that enables users (e.g., Members and Providers) to interactively communicate and trade financial instruments among one another and to manage their portfolios. Interactive communications supported by the system include: establishing credit relationships, structuring financial transactions, requesting price quotes, monitoring and reviewing quote requests, issuing price quotes, monitoring and reviewing price quotes, negotiations between Members and Providers, acceptance and confirmation of price quotes, reporting, portfolio management, analysis of financial information and market data, and communications among Members, Providers, and/or system administrators, including e-mail, chat, and message boards.

Figure 20:
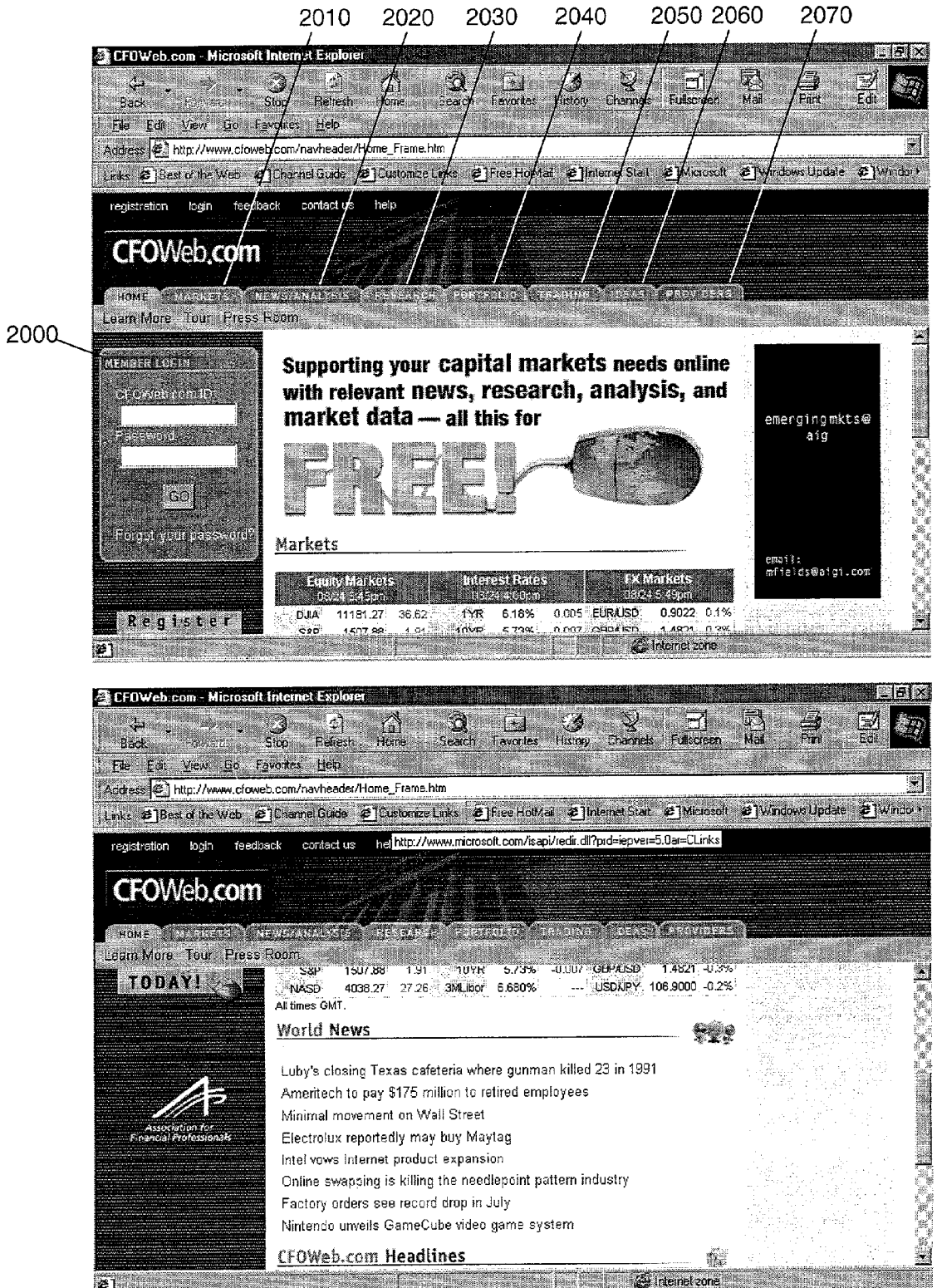
FIG. 20 shows a screen print of an interactive login interface in an embodiment of the present invention.

When a user (e.g., a Member or Provider) accesses the web-based system, the system presents the user with a home page as shown in FIG. 20. This page includes a registration link for new users and member login interface 2000 for existing users, which requires entry of the user's account ID and password. The home pages also includes market data and news headlines, as well as links to the following system functionality (each of which will be described below):
- market data 2010
- news and financial information 2020
- financial research 2030
- Member portfolio management 2040
- trading 2050
- financial ideas and practices 2060
- Provider functionality 2070

1. Transaction-Specific Functionality

The functionality provided by the present embodiment of this invention enables users to conduct interactive and automated financial transactions in capital markets. The types of transactions that may be conducted are described above. The functionality and interactive user interfaces that support the creation and execution of such transactions enable users to engage in pre-transaction, transaction, and post-transaction activities. Note that the functionality and interfaces described in this embodiment could be combined with other functionality and interfaces, or certain of such functionality and interfaces (or portions thereof) could be isolated in separate systems, in various other embodiments of this invention. The system can be implemented as a stand-alone central system or as a distributed system, with separate versions of the functionality and interfaces distributed to multiple users' platforms or portals. In other embodiments, portions of the system functionality and interfaces could be divided into separate systems (e.g., a transaction structuring system, a price quote system, a transaction acceptance system) with a communication links that enable the different systems to exchange data. Other embodiments will be apparent to and could be implemented by practitioners skilled in this art.

a. Pre-Transaction

The present embodiment of this invention enables Members and Providers to interactively establish certain defaults and parameters that will facilitate the on-line financial transactions.

i. Filtering

As will be described below with respect to the present embodiment, this invention provides each user (Member or Provider) of the system with the ability to customize their interaction with the trading community through the use of automated filters. By selecting user-defined and/or system-defined criteria from an interactive filtering interface, a user can set limits and restrictions on (i) which other users will receive communications, such as messages, transaction requests, and/or price quotes, from the user via the system and (ii) which communications, such as messages, transactions requests, and/or price quotes, the user will receive from other users via the system.

Example filtering criteria for limiting recipient users include:
- the name of a particular user
- the credit rating or other credit criteria (e.g., asset value) of a particular user
- the corporate nationality of a particular user
- the industry of a particular user (SIC code for semiconductor manufacturing)
- the type of financial instrument (e.g., FX Spot)
- the minimum or maximum notional amount of a transaction (U.S. $ 1,000,000)
- any other variable parameter of the transaction Example filtering criteria for restricting receipt of communications include:
- the type of financial instrument (e.g., FX Spot) of a transaction request or price quote
- the particular currency (e.g., U.S. Dollars) or currency pair of a transaction request or price quote
- the minimum or maximum interest rate or exchange rate of a transaction request or price quote
- the minimum or maximum notional amount of a transaction request or price quote (e.g., U.S. $ 1,000,000)
- any other variable parameter of the transaction
- the name of a sender
- the credit rating or other credit criteria (e.g., asset value) of sender
- the corporate nationality of sender
- the industry of a sender (e.g., SIC code for semiconductor manufacturing)

Other filtering criteria may be defined by users or the system administrator.

For example, a user could set a filter such that only price quotes from U.S. banks for FX Swap transactions be sent to the user via the system. A financial institution could set a filter such that it would only receive transaction requests for Forward Rate Agreements from companies with a Moody's credit rating of AA+.

ii. Member Functions (a) Legal Entities and Trading Books

Figure 77:
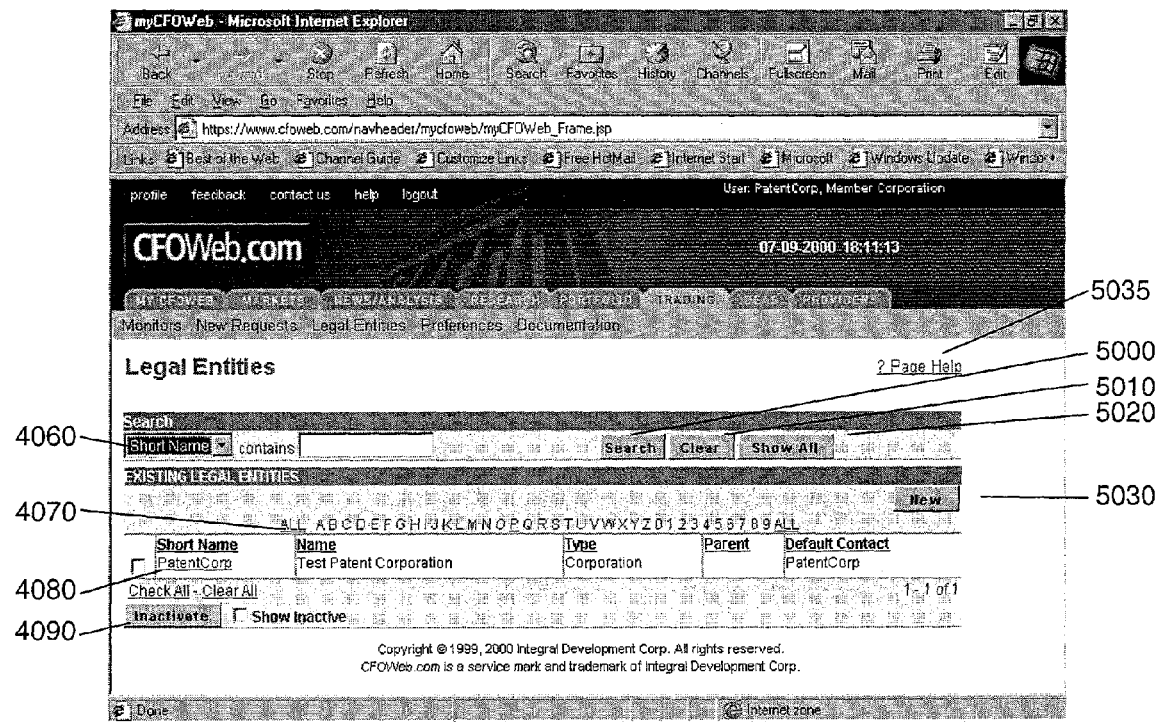
FIG. 77 shows a screen print of an interactive user interface for selecting a legal entity associated with a Member in an embodiment of the present invention.

The "Legal Entities" interface, illustrated by FIG. 77, enables a Member to display, add, or edit the details of any legal entities (see Legal Entity element 605 shown in FIG. 5 and described above) associated with the Member. The Member can search for an existing legal entity using search pull-down menu and keyword field 4060. After conducting a search, the Member can click on "Search" button 5000 to conduct a new search or click on "Clear" button 5010 to clear the legal entity display. Alternatively, the Member can use alphabetic index 4070 to search for an existing legal entity. The Member can display all existing legal entities by clicking "Show All" button 5020.

As shown in FIG. 77, for each legal entity, the interface displays a short name (e.g., "PatentCorp"), name (e.g., "Test Patent Corporation"), entity type (e.g., "Corporation"), parent (i.e., if other than Member), and default contact. The Member can remove the displayed legal entity from its list of active entities by clicking "Inactivate" button 4090.

Figure 78:
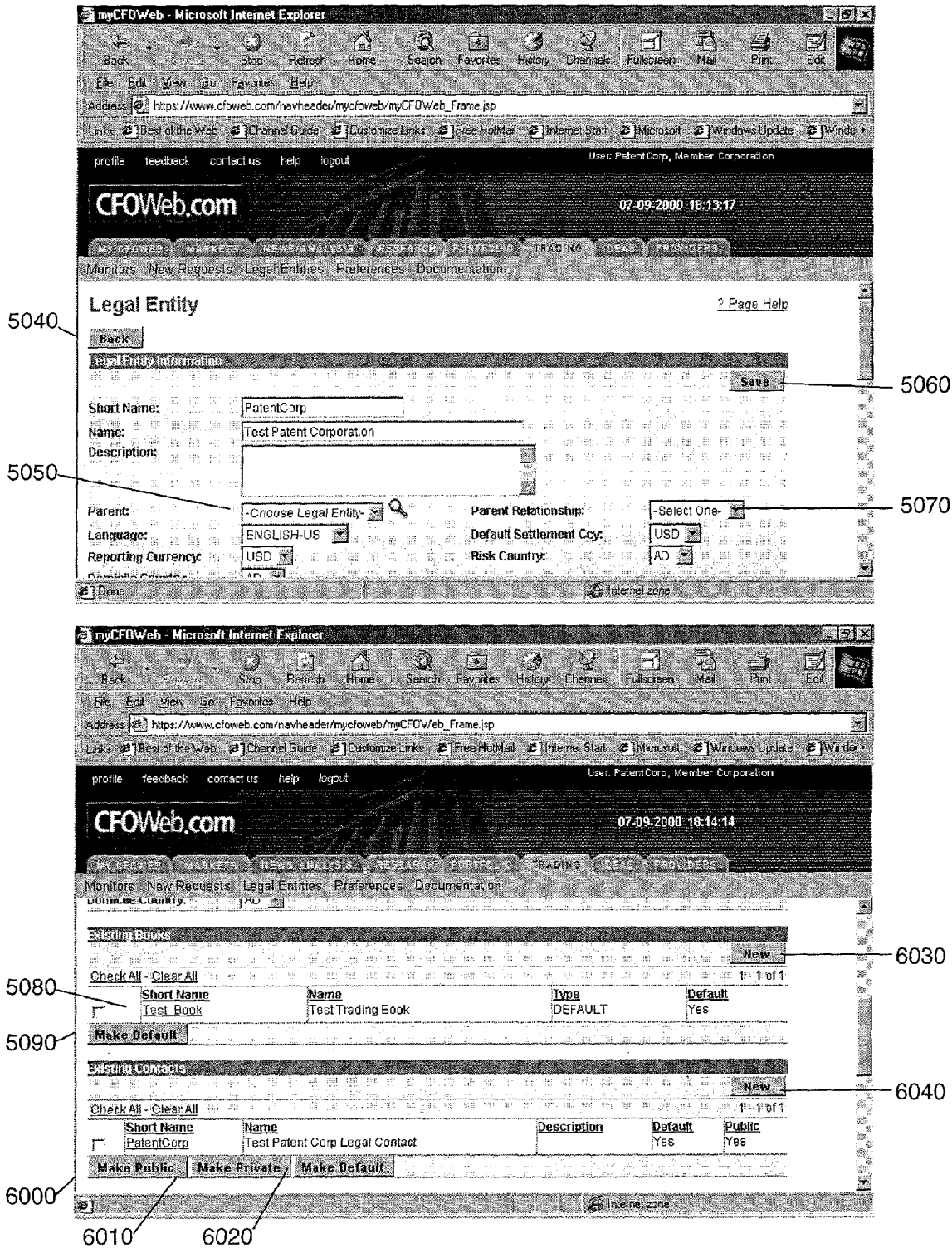
FIGS. 78-78A show a screen print of an interactive user interface for defining a legal entity associated with a Member in an embodiment of the present invention.
Figure 78A:
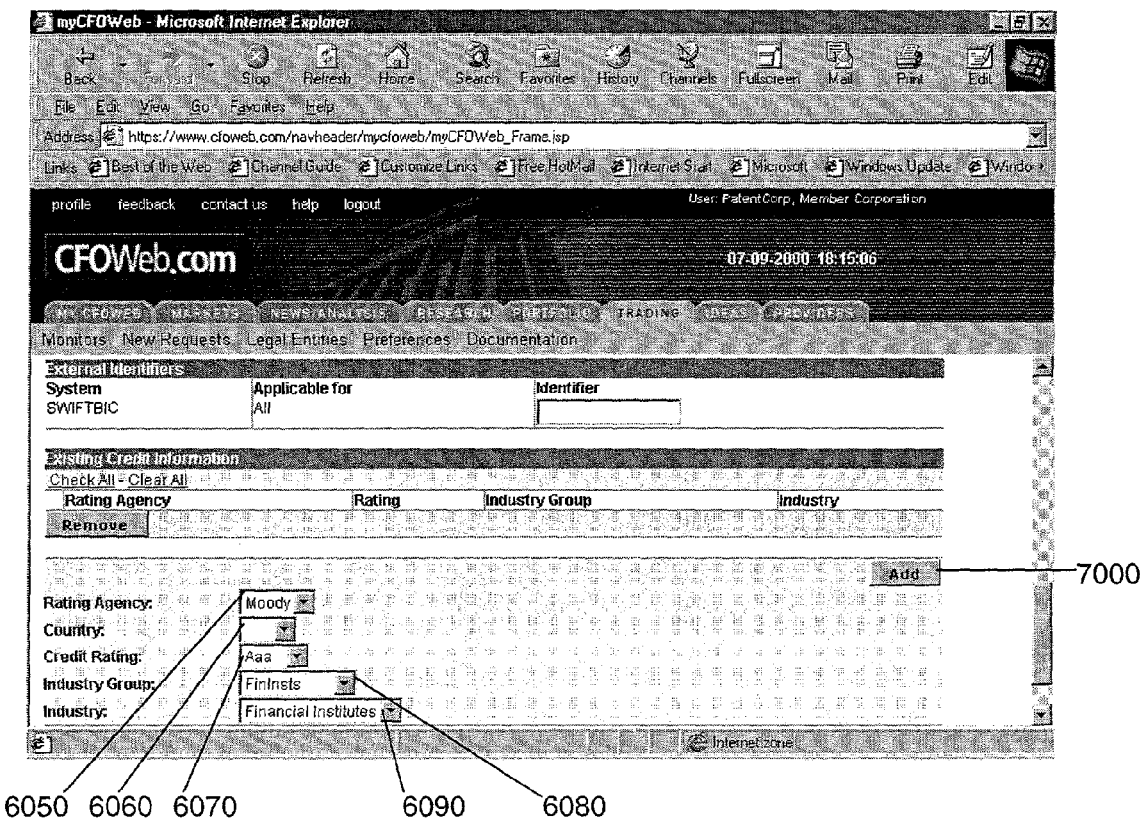

Upon clicking "New" button 5030, the system will display the "Legal Entity" interface shown in FIGS. 78-78A, which enables the Member to create a new legal entity or edit the information regarding an existing legal entity. For each legal entity, information that can be inputted on this interface includes the following:
- short name (e.g., "PatentCorp")
- name (e.g., "Test Patent Corporation")
- parent (using pull-down menu 5050)
- parent relationship (using pull-down menu 5070, e.g., branch or subsidiary)
- primary language
- reporting currency
- default settlement currency
- home (domicile) country
- risk country The "Legal Entity" interface also displays any existing trading book (see Book element 625 shown in FIG. 5 and described above) associated with the Member. As shown in FIG. 78, for each trading book, the interface displays a short name (e.g., "Test Book"), name (e.g., "Test Trading Book"), trading book type (e.g., "DEFAULT"), and a radio button showing whether the trading book is the default book. The Member can set the displayed trading book as the default book by clicking "Make Default" button 5090.

Figure 79A:
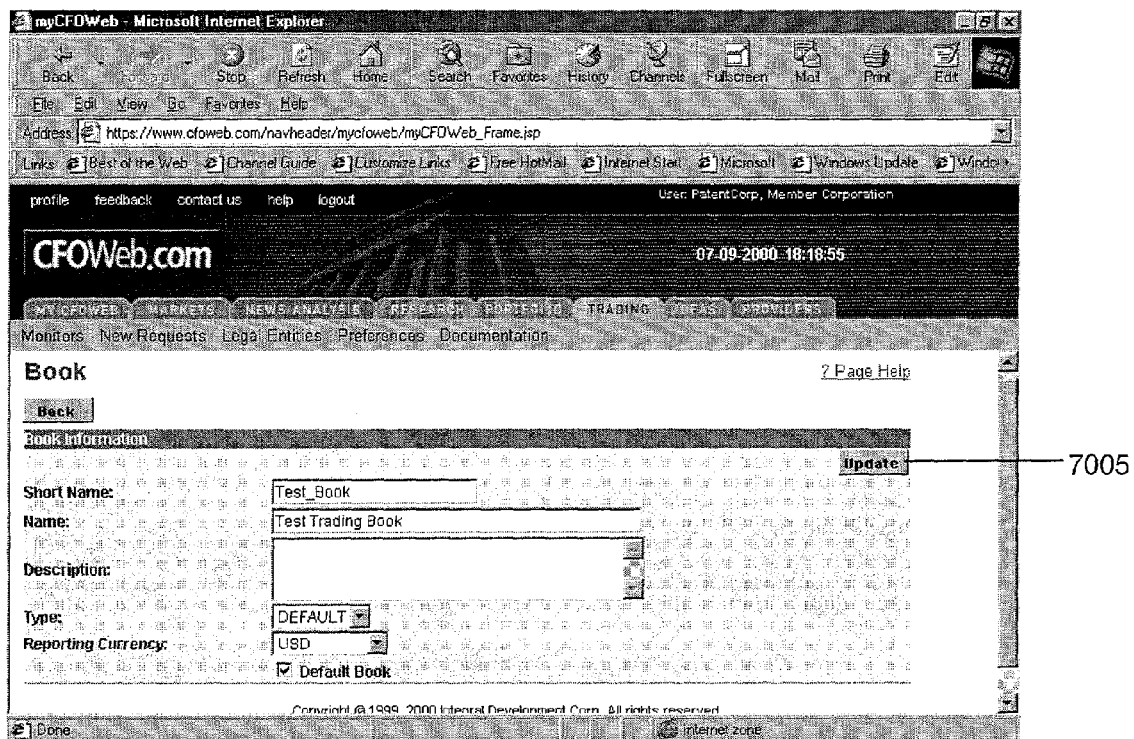
FIG. 79A shows a screen print of an interactive user interface for defining a trading book associated with a Member in an embodiment of the present invention.

Clicking on the displayed short name of the trading book (e.g., "Test Book" 5080) will cause the system to display the "Book" interface shown in FIG. 79A, which enables the Member to edit the information regarding the trading book. Alternatively, clicking "New" button 6030 will enable the Member to create a new trading book on the "Book" interface shown in FIG. 79A. For each trading book, information that can be inputted on this interface includes the following:
- short name (e.g., "Test Book")
- name (e.g., "Test Trading Book")
- description
- type (e.g., "DEFAULT")
- reporting currency
- default indicator By clicking "Update" button 7005, the Member can save the information inputted on the "Book" interface.

The "Legal Entity" interface shown in FIG. 78 also displays any existing contacts (see Contact Information element 730 shown in FIG. 4 and described above) associated with a legal entity. As shown in FIG. 78, for each existing contact, the interface displays a short name, name, description, and radio buttons showing whether the contact is a default contact and/or a public contact. The Member can set the displayed contact as a (i) public, (ii) private, and/or (iii) default contact by clicking "Make Public" button 6000, "Make Private" button 6010, and/or "Make Default" button 6020, respectively.

Figure 79B:
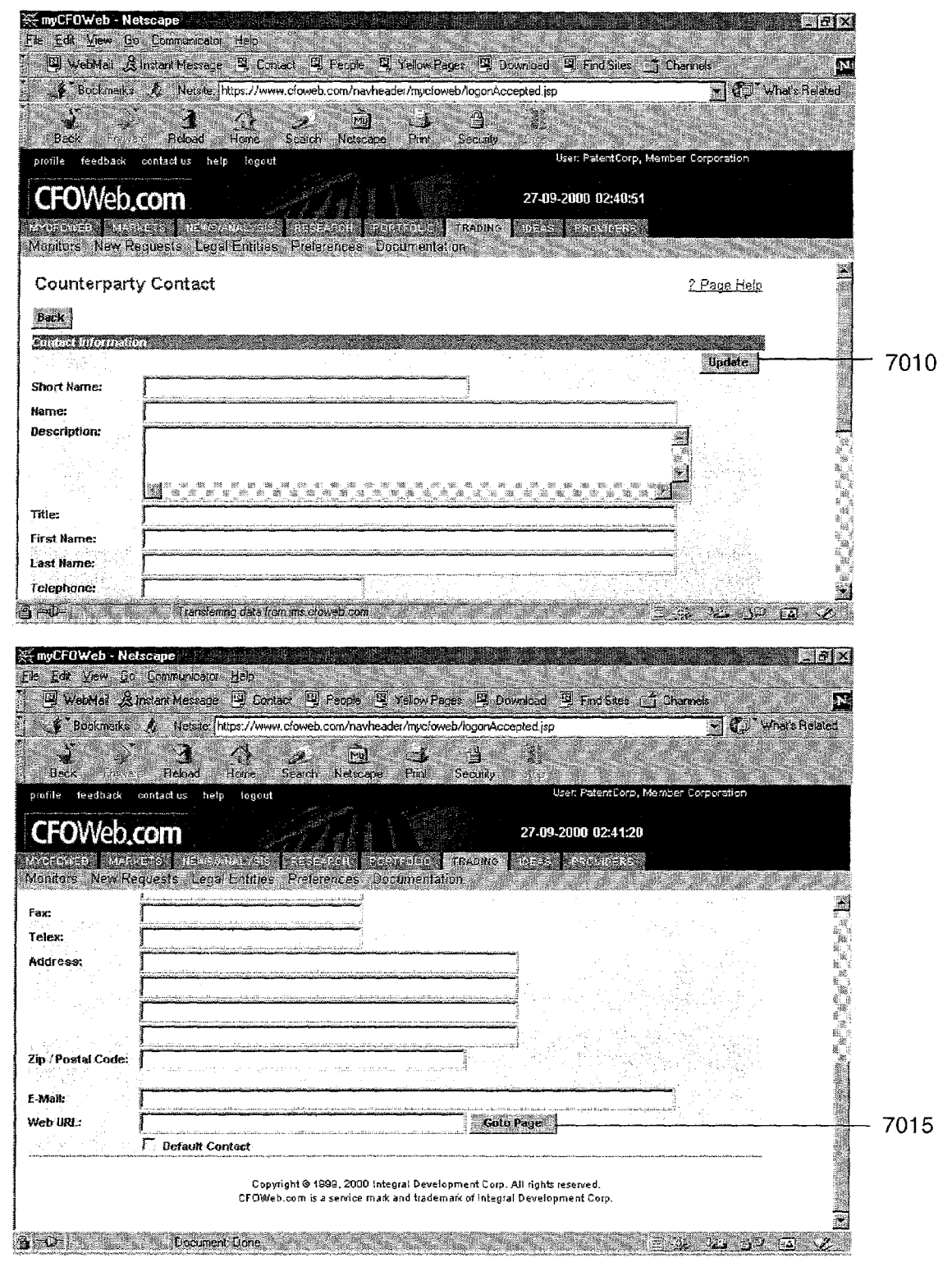

Clicking on the displayed short name of contact will cause the system to display the "Contact" interface shown in FIG. 79B, which enables the Member to edit the information regarding the contact. Alternatively, clicking "New" button 6040 will enable the Member to create a new contact on the "Contact" interface shown in FIG. 79B. For each contact, information that can be inputted on this interface includes short name, full name, mailing address, telephone and facsimile numbers, e-mail address, and Web URL address. Clicking "Goto Page" button 7015 will cause the system to access the contact's specified Web URL address. By clicking "Update" button 7010, the Member can save the information inputted on the "Contact" interface.

The "Legal Entity" interface shown in FIG. 78A also displays and enables modification of any existing credit information (see Credit Rating element 805 shown in FIG. 4 and described above) associated with a legal entity. As shown in FIG. 78A, for each existing credit rating, the interface displays the rating industry (e.g., "Moody"), credit rating (e.g., "Aaa"), industry group, and industry. The interface provides pull-down menus for editing of rating agency 6050, country 6060, credit rating 6070, industry group 6080, and industry 6090. By clicking "Add" button 7000, the Member can save the modified credit information.

Returning to the "Legal Entity" interface shown in FIG. 78, by clicking "Save" button 5060, the Member can save the information inputted on the "Legal Entity" interface. Further, clicking "Back" button 5040 will cause the system to return to the previous interface visited by the Member (i.e., the "Legal Entities" interface shown in FIG. 77). A similar "Back" button appears on most interfaces included in the system.

Note that the "Page Help" button 5035 that appears on the "Legal Entities" interface shown in FIG. 77 and all other interactive interfaces leads the user to a comprehensive, context-dependent interactive system assistance utility.

(b) Pricing Request Preferences

Figure 80:
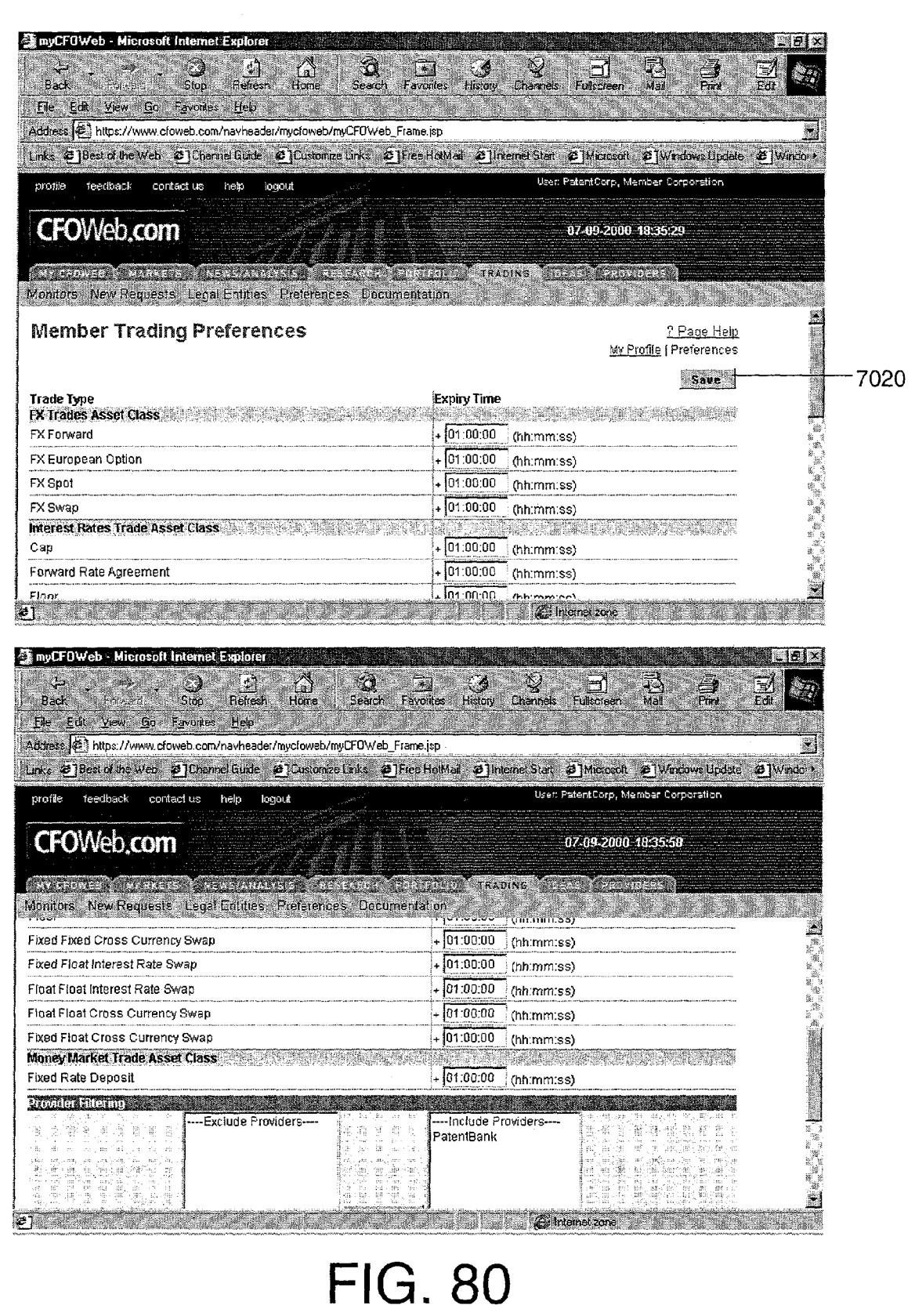
Figure 80A:
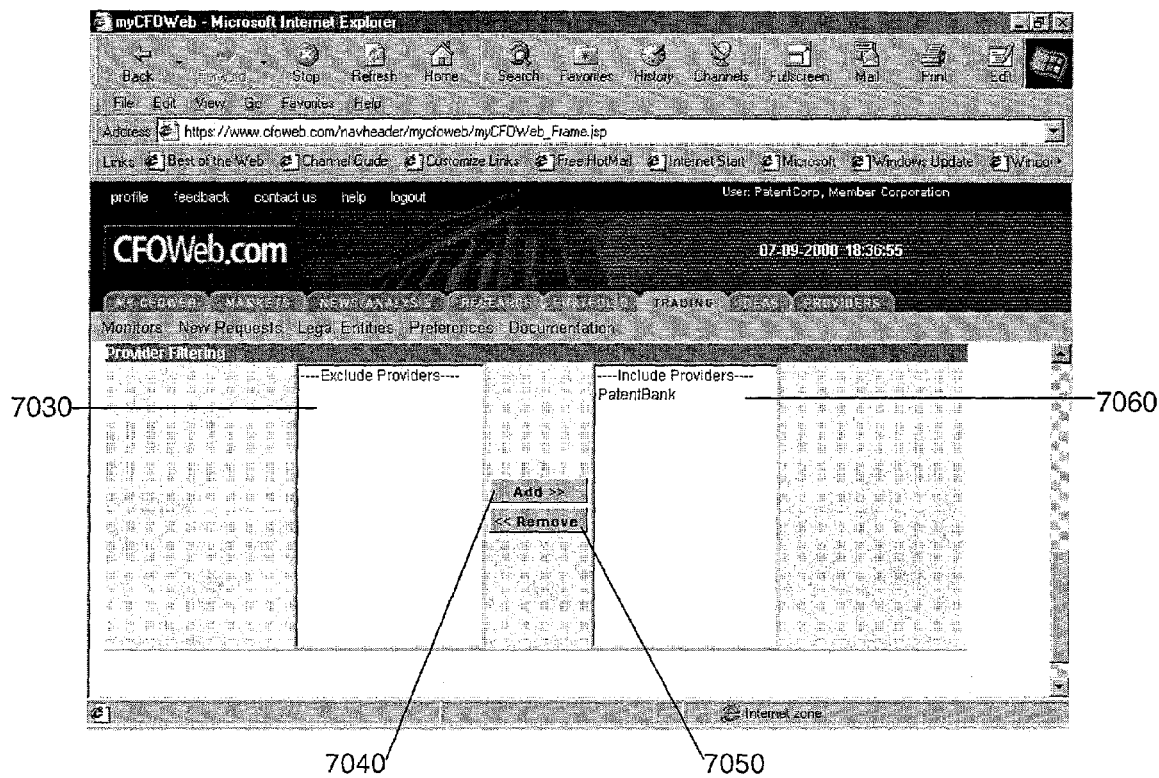

The "Member Trading Preferences" interface, illustrated by FIGS. 80-80A, enables a Member to customize on-line financial transactions by setting default expiration times for the Member's pricing requests for each type of financial transaction (e.g., FX Swap, Forward Rate Agreement, etc.) that the Member will seek to execute using the system. The interface also enables the Member to create filters to specifically include (by clicking "Add" button 7040 shown in FIG. 80A) or exclude particular Providers as recipients of the Member's pricing requests. The interface displays such "included" Providers (field 7050 as shown in FIG. 80A, e.g., "PatentBank") and "excluded" Providers (field 7040 as shown in FIG. 80A). By clicking "Save" button 7020, the Member can save the pricing request preference settings.

(c) Price Quote Preferences

Figure 82:
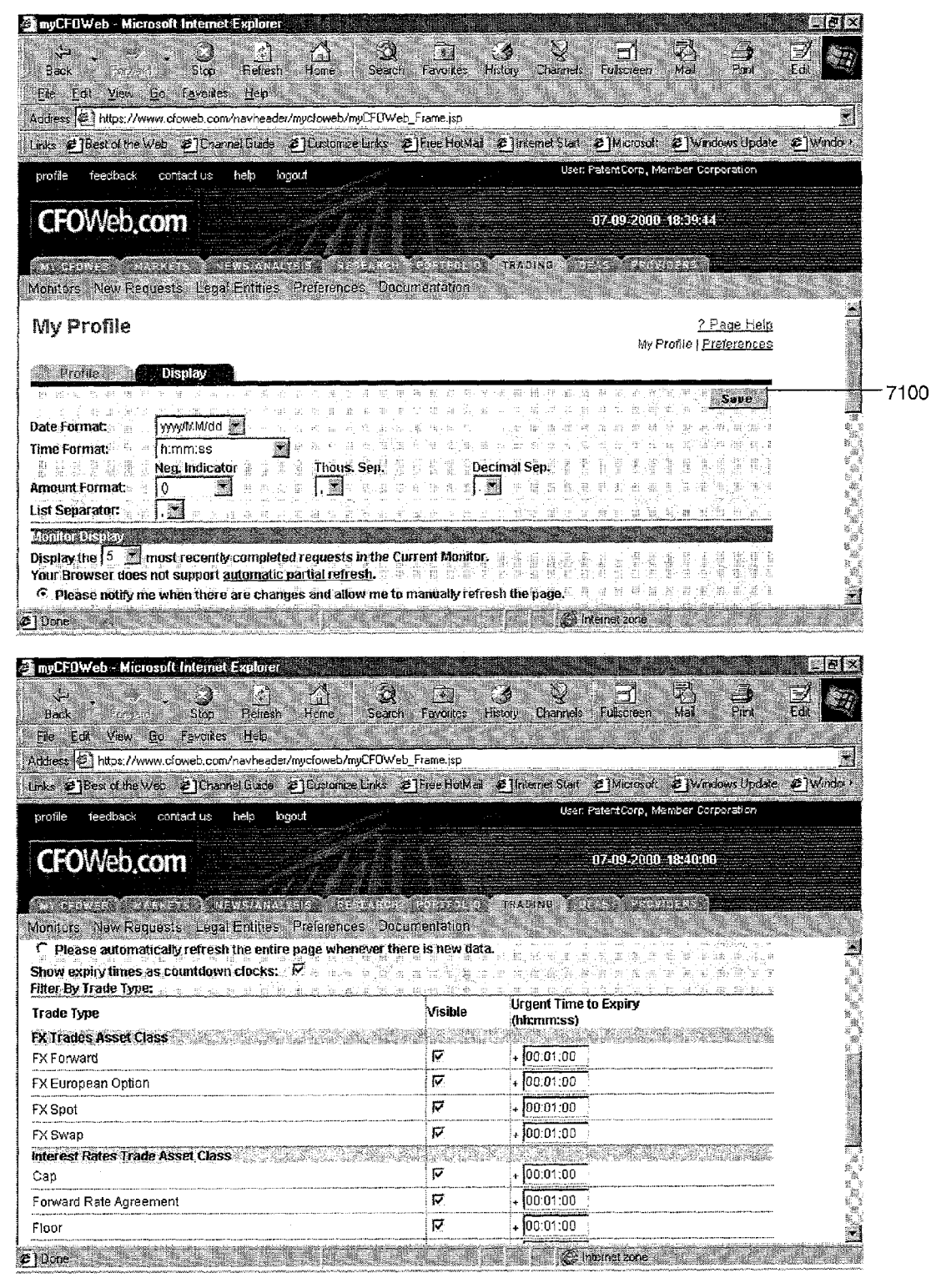
Figure 82A:
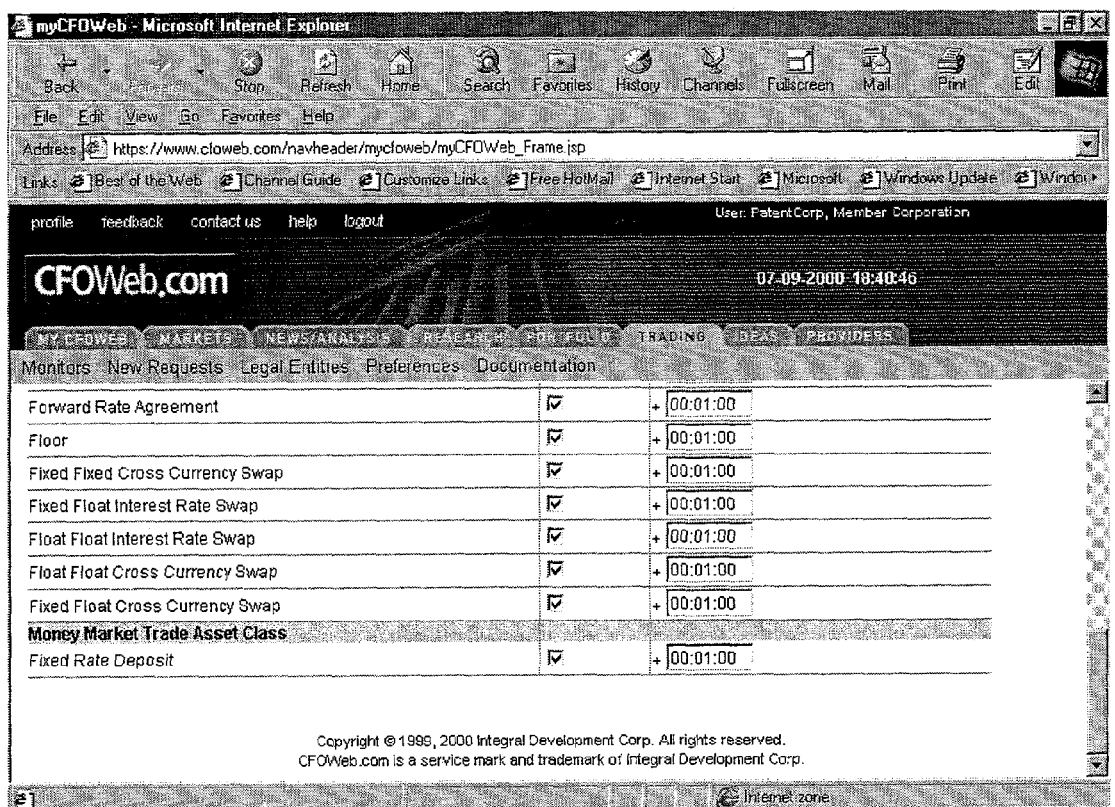

The "My Profile—Display" interface, illustrated by FIGS. 82-82A, enables a Member to customize on-line financial transactions by setting certain defaults related to the display of price quotes received from Providers in response to the Member's pricing requests. The default settings include the following:
- date and time formats
- decimal formats
- number of completed pricing requests to be displayed in the "Current Monitor" "Recently Completed" table
- radio buttons that control automatic page refresh when new price quotes are received
- filter radio buttons that enable the Member to select the types of price quotes (e.g., FX Swap, Forward Rate Agreement, etc.) received from Providers to be displayed
- default expiration times for classifying the price quotes received from Providers as "Urgent" for each type of financial transaction (e.g., FX Swap, Forward Rate Agreement, etc.)

By clicking "Save" button 7100, the Member can save the trading display settings.

(d) Trading Documentation and Credit Relationships

Figure 83:
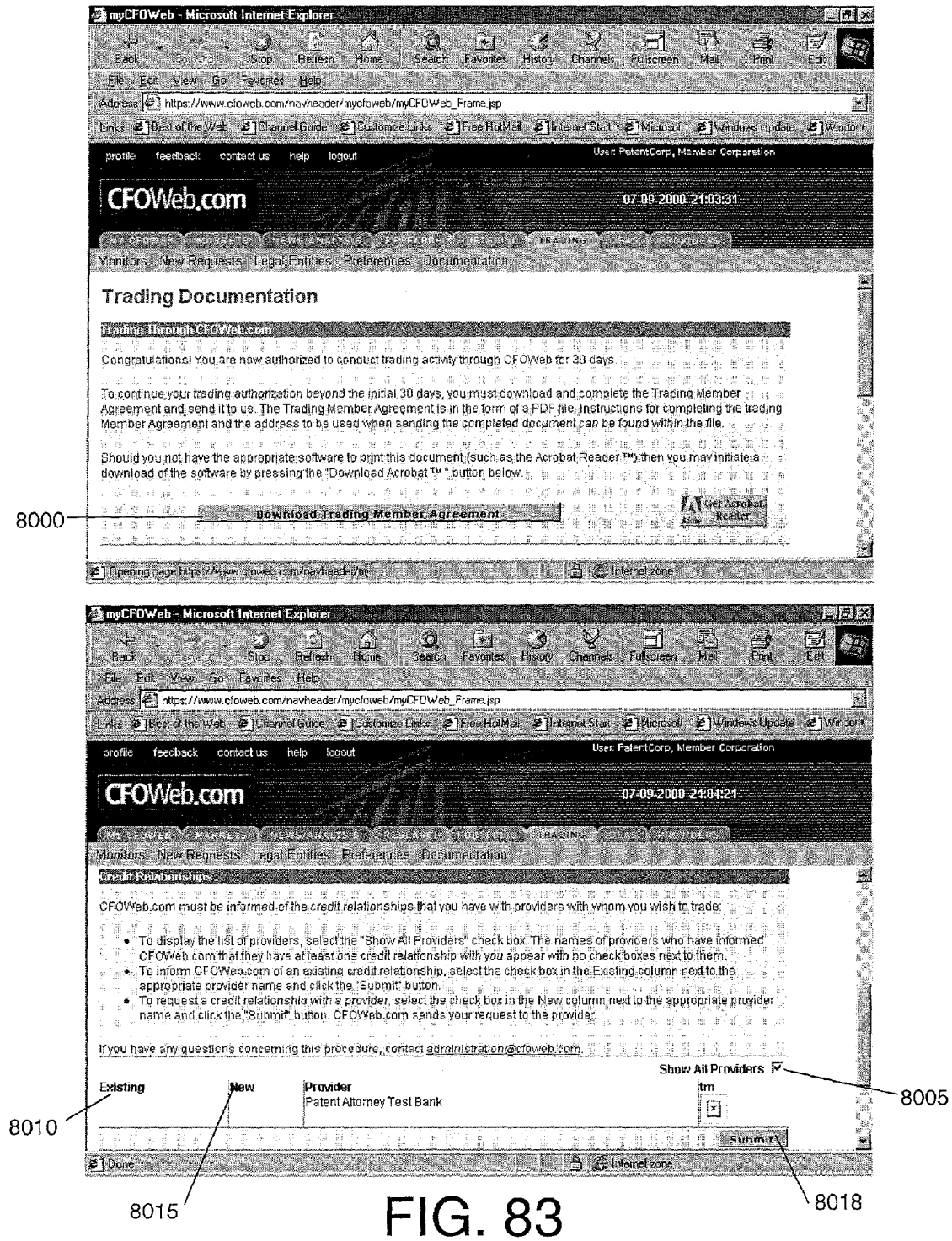
FIG. 83 shows a screen print of an interactive user interface for displaying and requesting credit relationships between a Member and Providers in an embodiment of the present invention.

The "Trading Documentation" interface, illustrated by FIG. 83, enables a Member to take two preliminary steps necessary to engage in on-line financial transactions using the system. One step involves executing a trading agreement with the system administrator. The Member can download the agreement by clicking "Download Trading Member Agreement" button 8000.

The other step involves the establishment of credit relationships between the Member and each Provider with which the Member may engage in on-line financial transactions using the system (see step 310 in FIG. 2). The "Trading Documentation" interface displays any Providers with which the Member has existing credit relationships and who have notified the system of such relationships. If the Member clicks "Show All Providers" indicator 8005, the interface will display all Providers that may engage in financial transactions via the system. Using such list of Providers, the Member can notify the system of any existing credit relationships with the Providers by clicking under "Existing" column 8010 next to the name of a Provider and then clicking "Submit" button 8018; the system will communicate with any selected Providers to verify the existence of such relationships. The Member can also request the creation of a credit relationship with any of the Providers by clicking under "New" column 8015 next to the name of a Provider and then clicking "Submit" button 8018. The system will automatically forward the Member's request to each selected Provider. The Member and each such Provider can then negotiate a credit relationship by communicating via the electronic mail or chat functionality provided by the system.

iii. Provider Functions (a) Price Quote Preferences

Figure 97:
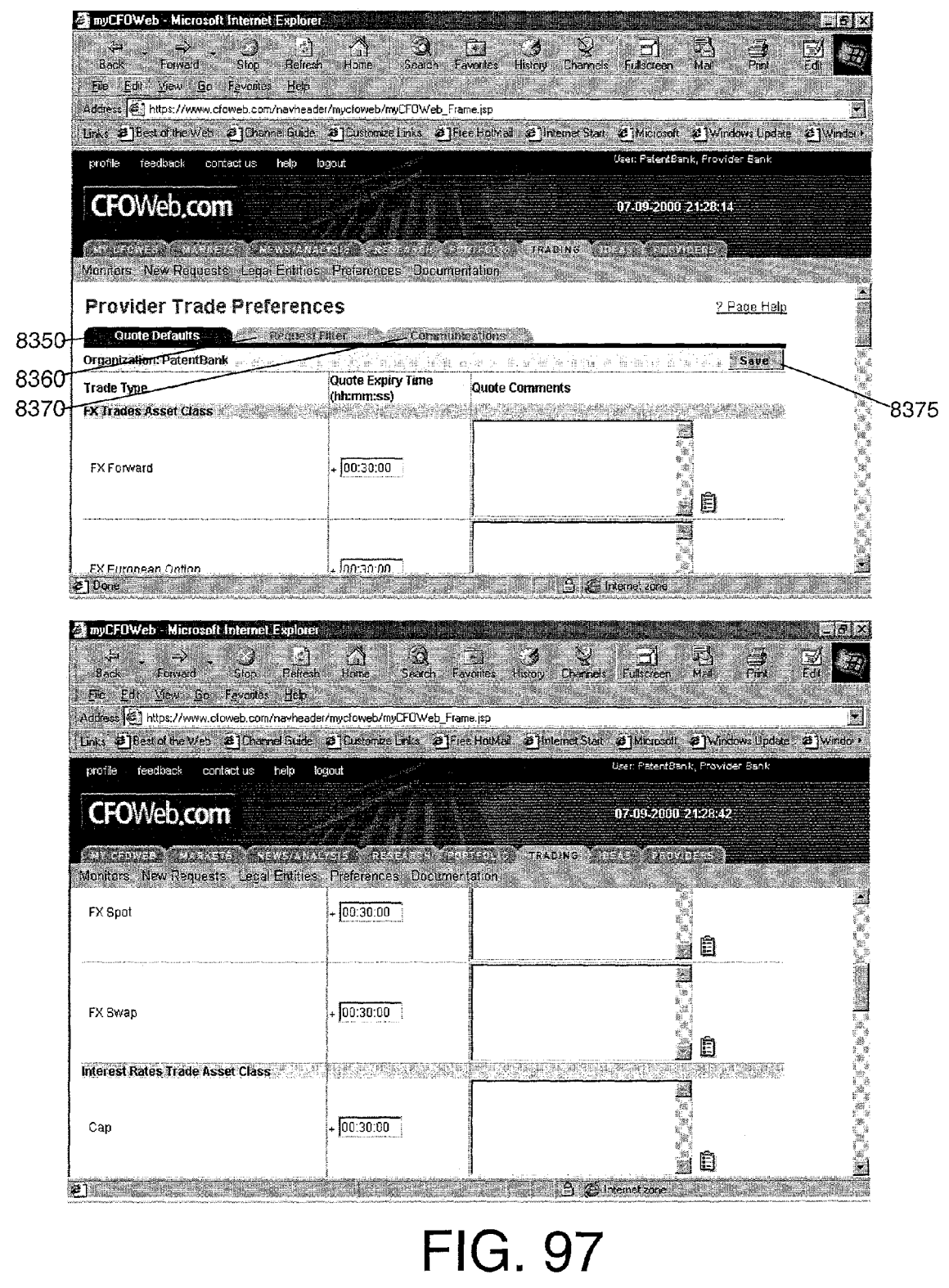
Figure 97A:
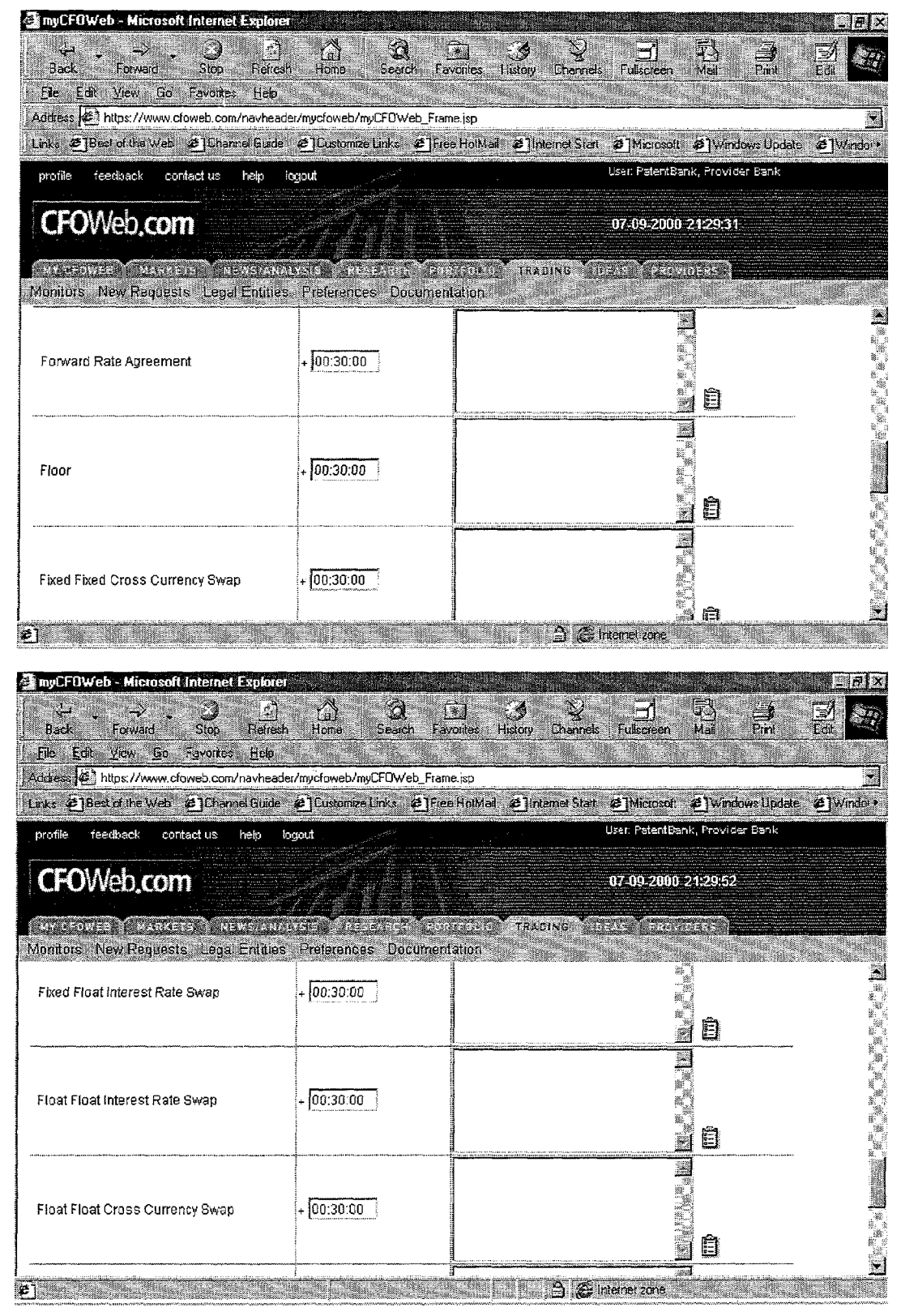
Figure 97B:
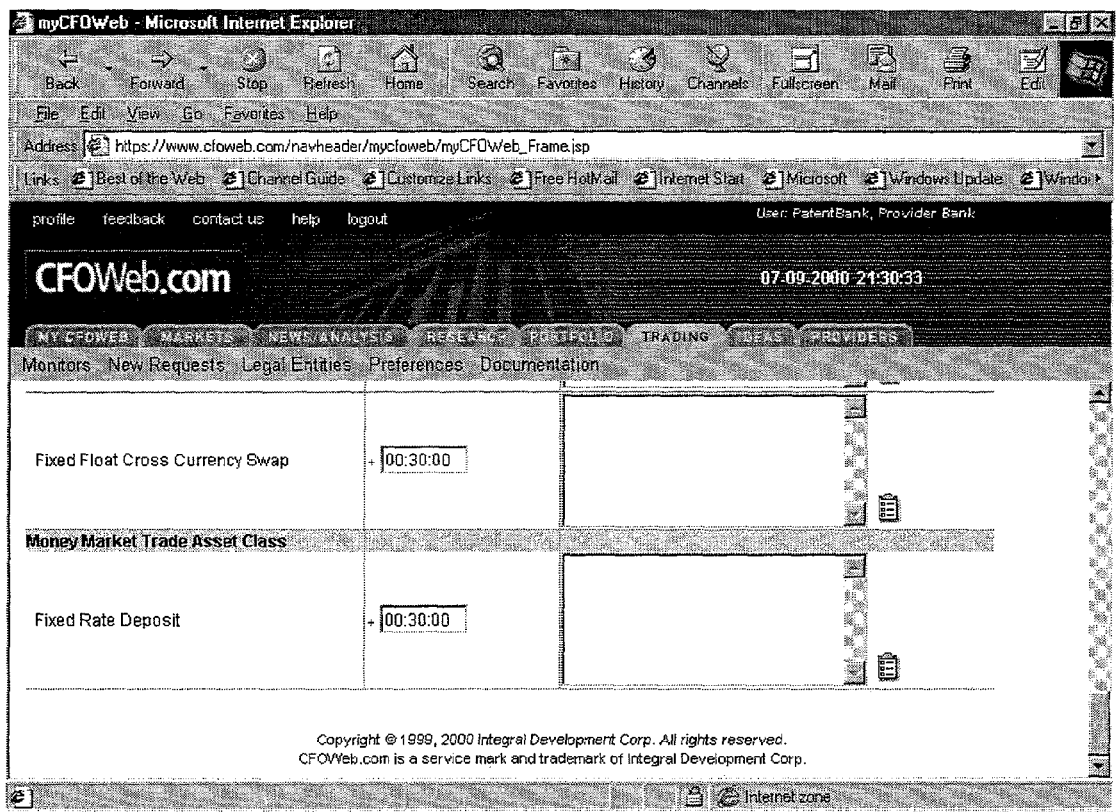

The "Provider Trade Preferences—Quote Defaults" interface, illustrated by FIGS. 97-97B, enables a Provider to customize on-line financial transactions by setting default expiration times for the Provider's price quotes for each type of financial transaction (e.g., FX Swap, Forward Rate Agreement, etc.) submitted in response to pricing requests received from Members. The Provider can also add default comments (e.g., additional trade requirements) to its price quotes. By clicking "Save" button 8375, the Provider can save the price quote preference settings.

(b) Pricing Request Filters

Figure 98:
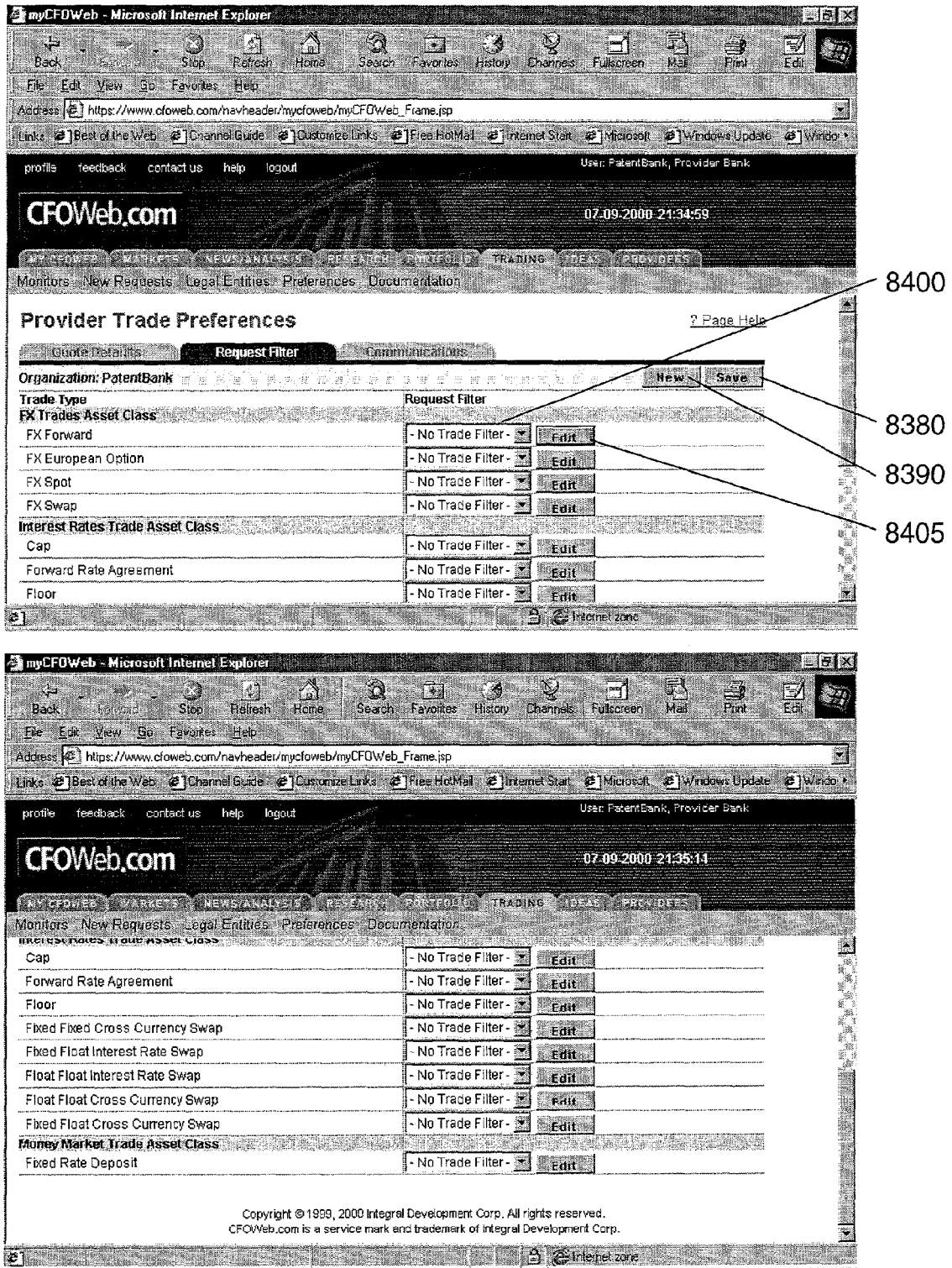
FIG. 98 shows a screen print of an interactive user interface for enabling a Provider to set filters for viewing transaction requests created using the system in an embodiment of the present invention.
Figure 99:
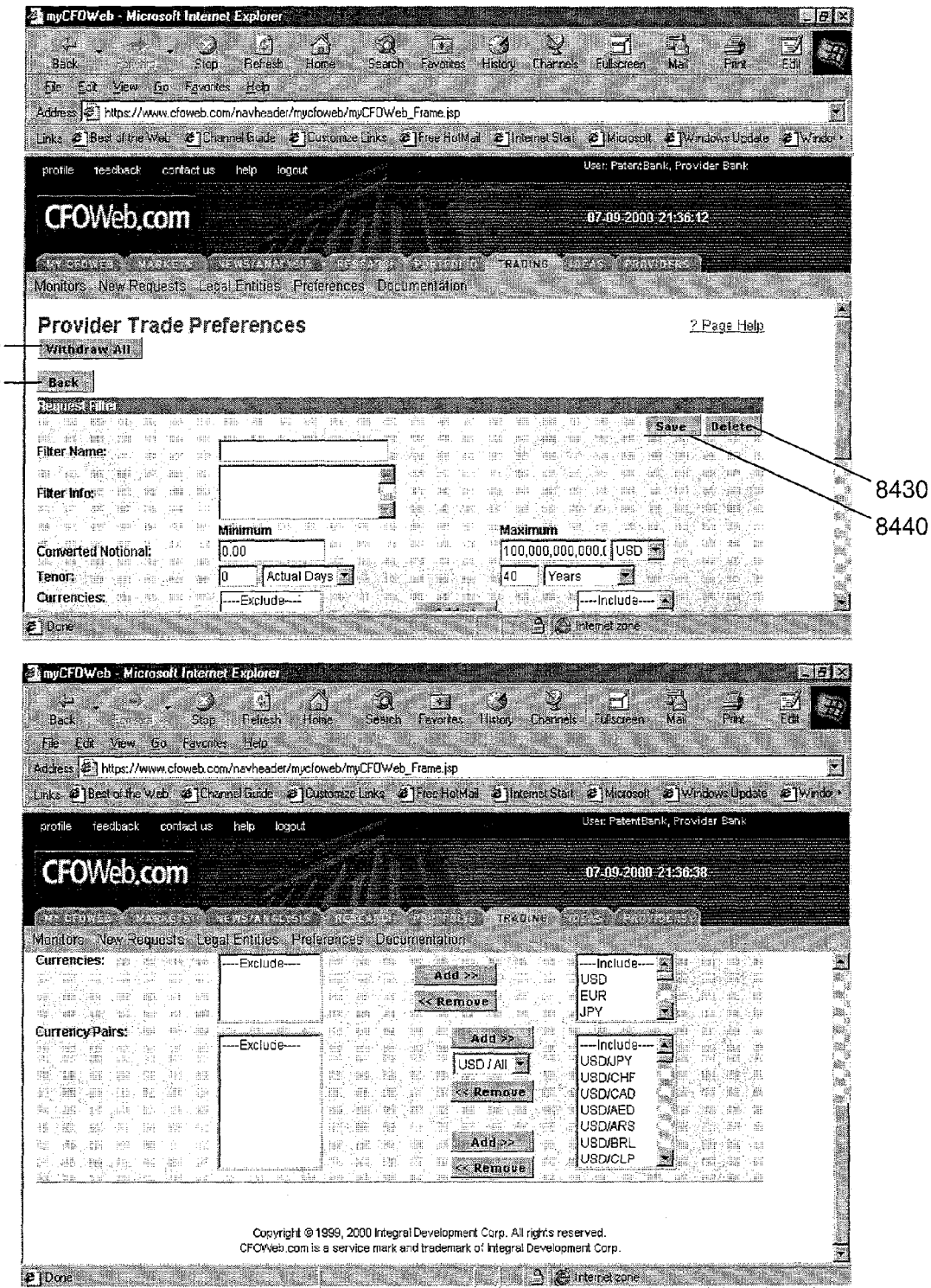
FIG. 99 shows a screen print of an interactive user interface for enabling a Provider to define filters and set default preferences for creating price quotes using the system in an embodiment of the present invention.

Clicking "Request Filter" button 8360 on the "Provider Trade Preferences—Quote Defaults" interface shown in FIG. 97 will cause the system to display the "Provider Trade Preferences—Request Filter" interface, illustrated by FIG. 98. The "Provider Trade Preferences—Request Filter" interface enables a Provider to customize on-line financial transactions by setting filter indicators that allow the Provider to select certain pricing requests (submitted by Members) of each type of transaction to be displayed. Clicking "New" button 8390 will enable the Provider to create a new filter using the "Filter" interface shown in FIG. 99. Alternatively, clicking "Edit" button 8405 adjacent to a particular transaction type (e.g., "FX Forward") will cause the system to display the "Filter" interface shown in FIG. 99, which enables the Provider to edit the information regarding the filter for the particular transaction type. For each request filter, information that can be inputted on the "Filter" interface shown in FIG. 99 includes:

filter name descriptive information minimum or maximum notional amounts of pricing request minimum or maximum tenor of pricing request currencies to exclude or include (e.g., require U.S. Dollars)

currency pairs to exclude or include

The interface includes "Add" and "Remove" buttons to add or delete currencies. By clicking "Save" button 8440, the Provider can save the information inputted on the "Filter" interface. Alternatively, clicking "Delete" button 8430 will cause the displayed filter to be deleted. Clicking "Back" button 8420 will cause the system to display the "Provider Trade Preferences—Request Filter" interface shown in FIG. 98.

(c) Communication Defaults

Figure 100:
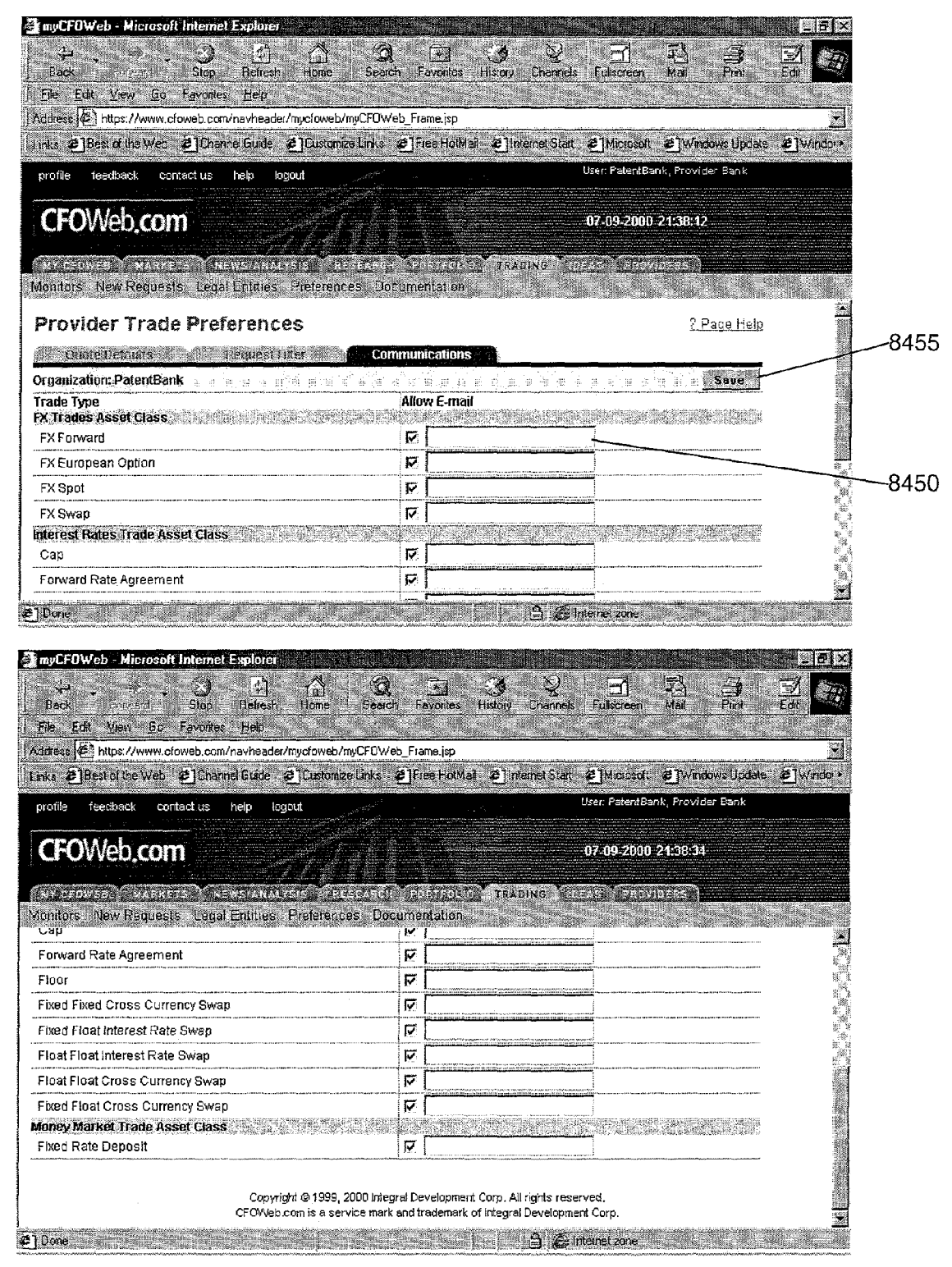

Clicking "Communications" button 837 on the "Provider Trade Preferences—Quote Defaults" interface shown in FIG. 97 will cause the system to display the "Provider Trade Preferences—Communications" interface, illustrated by FIG. 100. The "Provider Trade Preferences—Communications" interface enables a Provider to set a filter that indicates whether the Provider desires to receive an electronic mail notification from the system each time a Member submits a pricing request for a particular type of transaction. The Provider can specify the electronic mail address to receive such messages for each type of transaction in field 8450. By clicking "Save" button 8455, the Provider can save the information inputted on this interface.

(d) Standard Text

Figure 101:
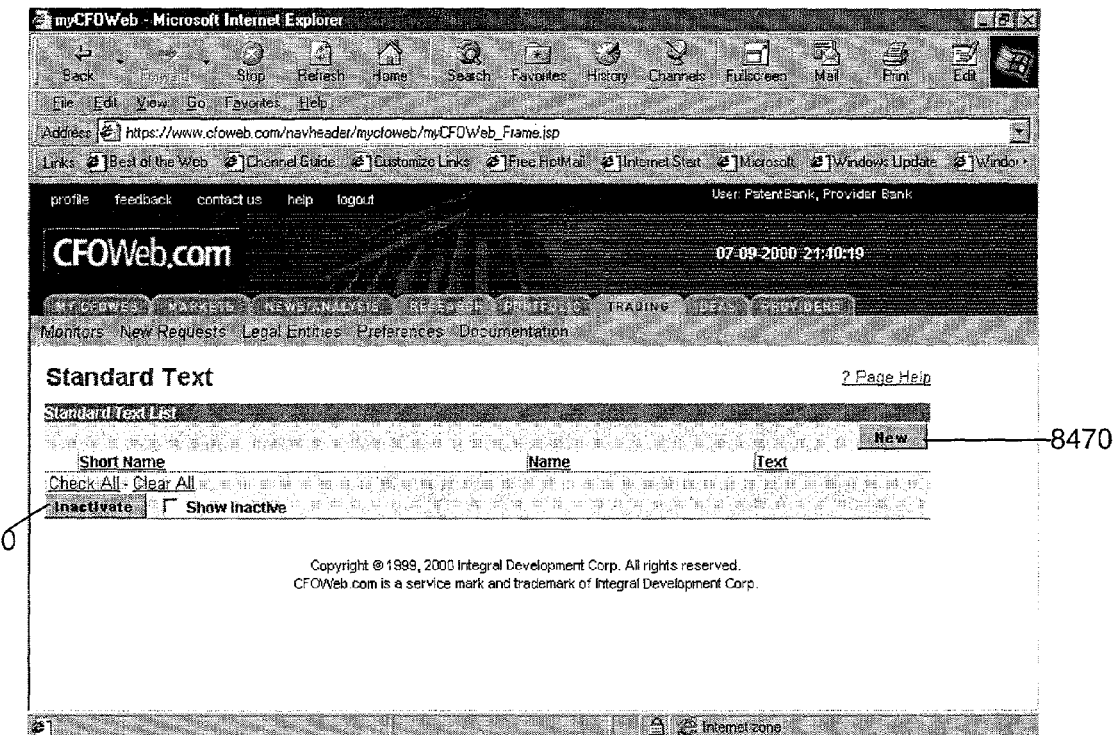
FIG. 101 shows a screen print of an interactive user interface for enabling a Provider to select standard text to be associated with price quotes created using the system in an embodiment of the present invention.
Figure 102:
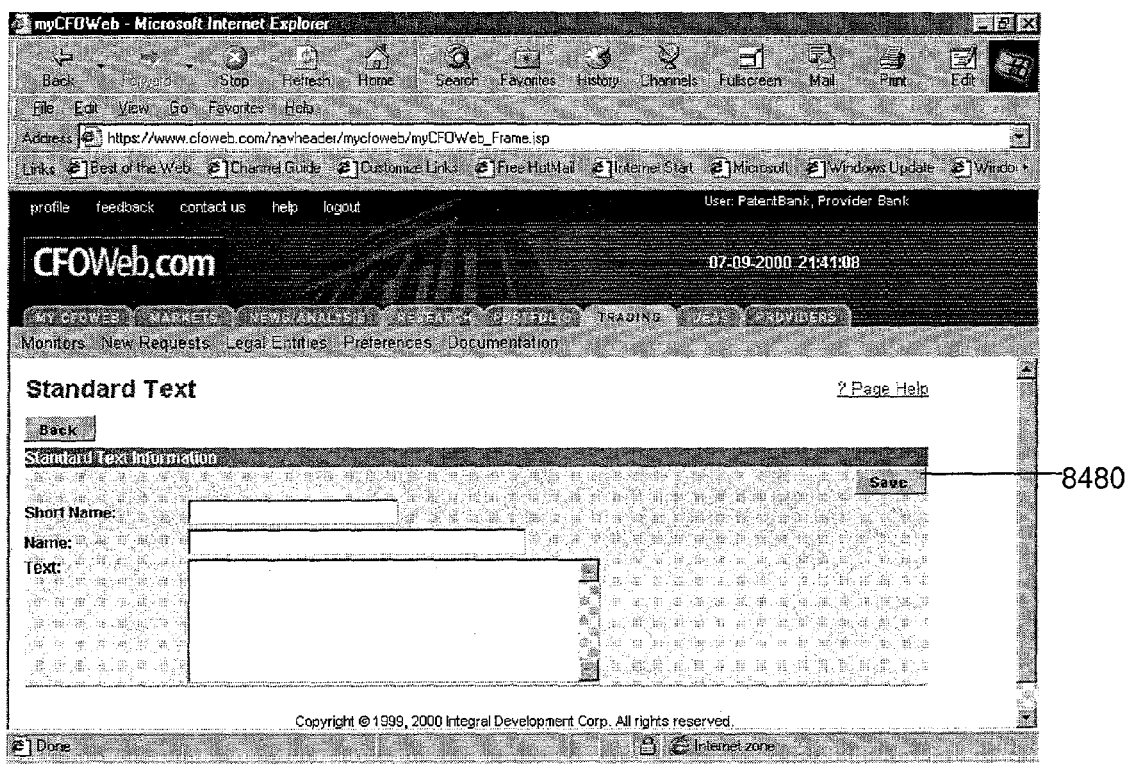
FIG. 102 shows a screen print of an interactive user interface for enabling a Provider to create standard text to be associated with price quotes created using the system in an embodiment of the present invention.

The "Standard Text List" interface illustrated by FIG. 101 enables a Provider to create standardized text, such as boilerplate language, disclaimers, or other comments, to attach to all of the Provider's price quotes. The Provider can create one or more versions of text and name and save the text files. The "Standard Text List" interface will display each of the Provider's standard text files, including short name, name, and the text. By selecting a text file and clicking "Inactivate" button 8460, the Provider can inactivate the text file such that it will not be attached to its price quotes. Clicking "New" button 8470 will enable the Provider to create a new text file using the "Standard Text Information" interface shown in FIG. 102. Alternatively, clicking on the name of a text file will cause the system to display the "Standard Text Information" interface shown in FIG. 102, which enables the Provider to edit the particular standard text file. For each text file, the Provider can input short name, name, and the text information. By clicking "Save" button 8480, the Provider can save the information inputted on the "Standard Text Information" interface.

b. Transactions

The present embodiment of this invention enables Members and Providers to interactively engage in financial transactions in capital markets, through a series of interfaces. Using such interfaces, Members can structure desired financial transactions and automatically communicate pricing requests for such transactions. Providers can monitor incoming pricing requests from Members and respond to any of the request with structured price quotes. In turn, Members can monitor incoming price quotes, conduct back-and-forth negotiations with Providers via the system regarding such price quotes, and accept price quotes. Members and Providers can also confirm payment schedules and other settlement details of accepted transactions via the system.

i. Member Request Structuring

The present embodiment of the invention includes a request structuring interface for each type of financial transaction that a Member may structure and trade using the system, as will be described below.

(a) Foreign Exchange Spot/Forward

The "New Request: FX" interface, illustrated by FIG. 118, enables a Member to create a Foreign Exchange Spot ("FX Spot") (see Section B.1.b.i.(b)(1) above for description of FX Spot Trade Type sub-element) or Foreign Exchange Forward ("FX Forward") (see Section B.1.b.i.(b)(2) above for description of FX Forward Trade Type sub-element) transaction request to be submitted via the system to Providers. As shown in FIG. 118, the information to be inputted by the Member using the interface for each FX Spot or FX Forward transaction request includes the following:

Trade Date: the date on which the currency trade has been agreed to by the parties.

Value Date: the date on which the traded currencies will be exchanged. For FX Spot transaction, Member selects "Spot" 9000 in pull-down menu. For FX Forward transaction, Member selects forward period 9010 (e.g., "1 Week", "1 Month", etc.) in pull-down menu.

Radio button showing whether Member is buying or selling currency.

Base Currency: the currency against which the currency to be acquired will be measured (e.g., "EUR" in FIG. 118).

Dealt Amount: the specified amount of currency to be converted into the currency being acquired.

Quote Currency: the currency to be acquired or the currency to which the quote will be pegged (e.g., "USD" in FIG. 118).

Legal Entity: the name of the Member or the Member's associated legal entity to which the transaction will be assigned.

By clicking "Save" button 9020, the Member can save the transaction request information inputted on this interface. By clicking "Send" button 9030, the Member can automatically send the transaction request information to Providers.

Clicking "Parameters" button 9040 will cause the system to display the "Parameters" interface illustrated by FIG. 119. This interface enables the Member to specify parameters related to the transaction request. The parameters include the expiration trigger for the request, which may be (i) a specific date and time or (ii) a specific duration. In addition, the Member can input notes to accompany the transaction request. By clicking "Save" button 9300, the Member can save the transaction request information inputted on this interface. By clicking "Send" button 9310, the Member can automatically send the transaction request information to Providers. Note that the system provides a similar "Parameters" interface for each type of transaction request described below.

Clicking "Providers" button 9050 on the "New Request: FX" interface shown in FIG. 118 will cause the system to display the "Providers" interface illustrated by FIG. 120. This interface enables the Member to specify the Providers to whom the FX Spot transaction request should be forwarded via the system. The interface enables the Member to select all or particular Providers as recipients from the list of system Providers. For each such Provider, the interface displays a short name 9320, full name, and company symbol, as well as a check box that indicates whether the Provider is a selected recipient. The interface also permits the Member to specify the e-mail address of a potential Provider to be contacted by the system administrator. By clicking "Save" button 9330, the Member can save the transaction request information inputted on this interface. By clicking "Send" button 9340, the Member can automatically send the associated transaction request information to Providers. Note that the system provides a similar "Providers" interface for each type of transaction request described below.

Clicking "Review" button 9060 on the "New Request: FX" interface shown in FIG. 118 will cause the system to display the "Review" interface illustrated by FIG. 121. This interface enables the Member to review the details, parameters, and Provider recipient list for each FX Spot transaction request. If, upon review, the Member wishes to modify and of that information, the Member can click on the appropriate "Details", "Parameters", or "Providers" buttons located on the interface, in order to access any of those interfaces and make the modifications. By clicking "Send" button 9350, the Member can automatically send the associated transaction request information to Providers. Note that the system provides a similar "Review" interface for each type of transaction request described below.

(b) Foreign Exchange Swap

Figure 112:
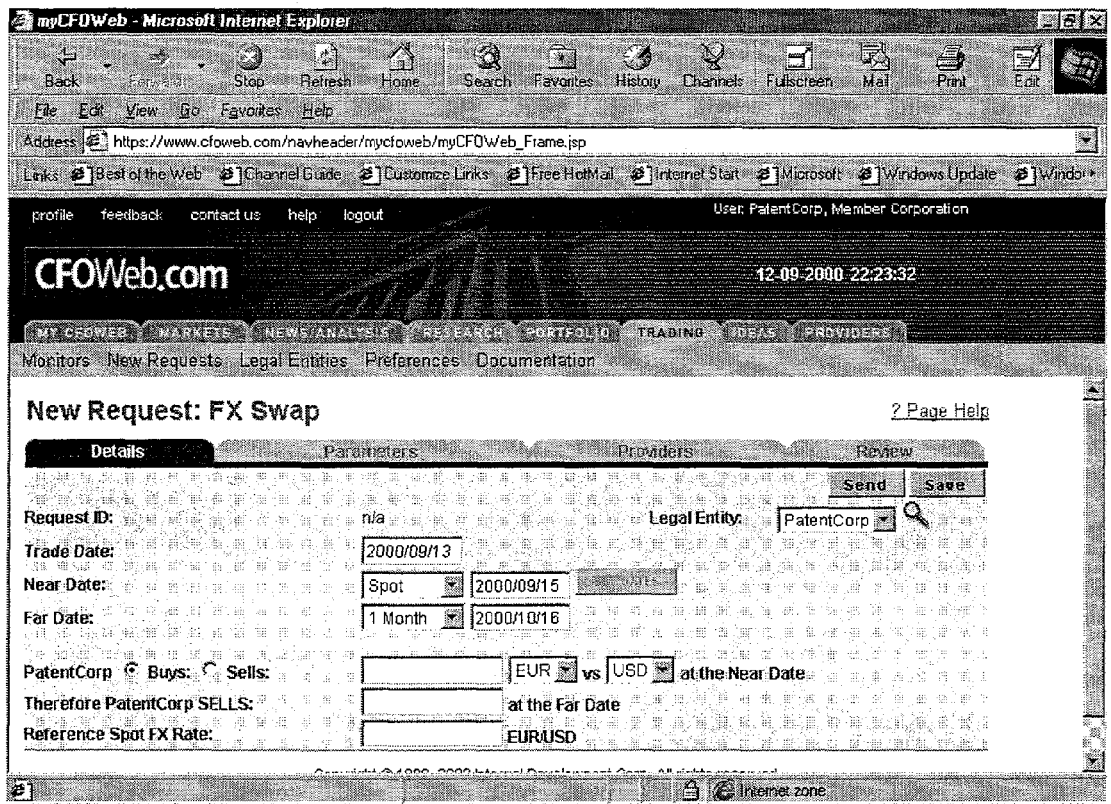

The "New Request: FX Swap" interface, illustrated by FIG. 112, enables a Member to create a Foreign Exchange Swap ("FX Swap") transaction request (see Section B.1.b.i.(b)(10) above for description of FX Swap Trade Type sub-element) to be submitted via the system to Providers. As shown in FIG. 112, the information to be inputted by the Member using the interface for each FX Swap transaction request includes the following:

Trade Date: the date on which the currency trade has been agreed to by the parties.
Near Date: the date on which the final payment of the first leg of the swap will be paid.
Far Date: the date on which the final payment of the second leg of the swap will be paid.
Radio button showing whether Member is buying or selling currency.
Near Leg Principal Amount: the amount that will be paid/received at the near date.
Near Leg Currency: the currency of the near leg (e.g., "EUR" in FIG. 112).
Far Leg Currency: the currency of the far leg (e.g., "USD" in FIG. 112).
Far Leg Principal Amount: the amount that will be paid at the far date.
Reference Spot FX Rate (optional): the spot rate to be used when calculating the foreign exchange rate for this transaction.
Legal Entity: the name of the Member or the Member's associated legal entity to which the transaction will be assigned.

By clicking the "Save" button, the Member can save the transaction request information inputted on this interface. By clicking the "Send" button, the Member can automatically send the transaction request information to Providers.

(c) Foreign Exchange Option

Figure 113:
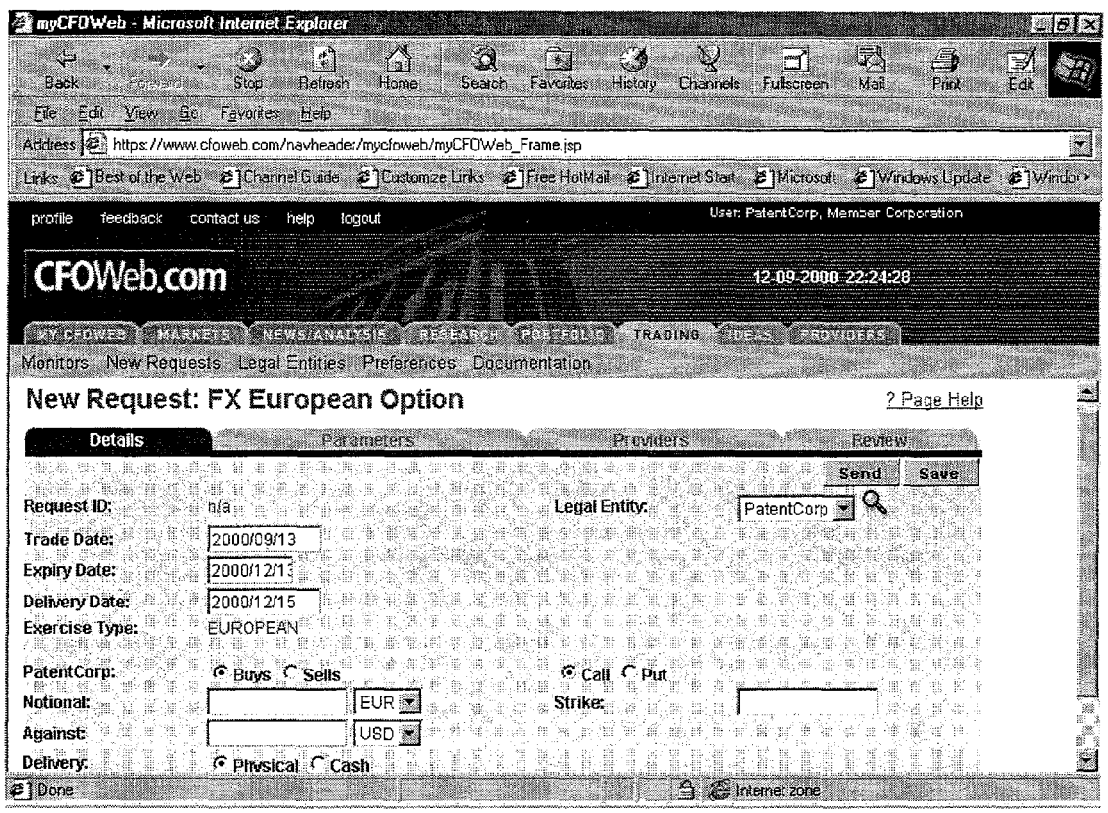

The "New Request: FX European Option" interface, illustrated by FIG. 113, enables a Member to create a Foreign Exchange Option ("FX Option") transaction request (see Section B.1.b.i.(b)(9) above for description of FX Option Trade Type sub-element) to be submitted via the system to Providers. As shown in FIG. 113, the information to be inputted by the Member using the interface for each FX Option transaction request includes the following:

Trade Date: the date on which the currency trade has been agreed to by the parties.
Settlement Date: the date on which the trade will be settled.
Expiry Date: the date by which the option must be exercised.
Delivery Date: the date on which either the cashflow or underlying trade amount must be exchanged upon exercise of the option.
Radio button showing whether Member is buying or selling currency.
Notional Amount: the amount of currency to be converted into the currency to be bought or sold upon exercise of the option.
Notional Currency: the currency of the notional amount (e.g., "EUR" in FIG. 113).
Against Amount: the settled amount of currency that will be bought or sold upon exercise of the option.
Against Currency: the currency of the settled amount (e.g., "USD" in FIG. 113).
Radio button showing whether the option to be exercised is a "put" or "call".
Strike: the strike rate that triggers the exercise of the option.
Delivery: radio button showing whether to settle (i) the net cashflow, only, of the underlying trade ("Cash") or (ii) the underlying trade ("Physical"), upon exercise of the option.
Legal Entity: the name of the Member or the Member's associated legal entity to which the transaction will be assigned.

By clicking the "Save" button, the Member can save the transaction request information inputted on this interface. By clicking the "Send" button, the Member can automatically send the transaction request information to Providers.

(d) Swap

The "New Request: Swap" interface, illustrated by FIG. 114, enables a Member to create any of the following types of transaction requests to be submitted via the system to Providers:

Fixed-Float Interest Rate Swap
Float-Float Interest Rate Swap
Fixed-Fixed Cross-Currency Swap
Fixed-Float Cross-Currency Swap
Float-Float Cross-Currency Swap As shown in FIG. 114, the information to be inputted by the Member using the interface for each swap transaction request includes the following:

Trade Date: the date on which the swap has been agreed to by the parties.

Start Date: the date on which the swap contract will begin.

Maturity Date: the date on which the swap contract will end.

Radio button showing whether Member will pay to Provider fixed or floating interest interest payments.

Pay Leg Notional Amount and Currency: the amount and type of currency of the leg to be paid by Member.

Radio button showing whether Member will receive from Provider fixed or floating interest payments.

Receive Leg Notional Amount and Currency: the amount and type of currency of the leg to be received by Member.

Floating rate index and basis point spread, if applicable to Pay Leg or Receive Leg.

Radio button showing whether Provider will quote (i) fixed rate for Pay Leg/Receive Leg or (ii) floating rate for Receive Leg/Pay Leg.

The combination of fixed/floating interest rates and the same or different currencies specified by the Member for the Pay and Receive Legs on this interface will determine the specific type of transaction requested, which will in turn cause the system to display one of five different interfaces, as described below.

(1) Fixed-Float Interest Rate Swap

If the Member specifies a "Fixed" Pay Leg and "Float" Receive Leg, as shown on radio buttons 9100 in FIG. 114, with the same currency, and clicks on "Next" button 9110, the system will display the "New Request: Fixed Float Interest Rate Swap" interface, illustrated by FIG. 114A. This interface enables a Member to create a Fixed-Float Interest Rate Swap transaction request (see Section B.1.b.i.(b)(3) above for description of Interest Rate Fixed Float Swap Trade Type sub-element) to be submitted to Providers via the system. As shown in FIG. 114A, the information to be inputted by the Member using the interface for each Fixed-Float Interest Rate Swap transaction request includes the following:

Trade Date: the date on which the swap has been agreed to by the parties.

Start Date: the date on which the swap contract will begin.

Maturity Date: the date on which the swap contract will end.

Notional Amount and Currency to be specified for each of the (i) fixed leg and (ii) floating leg.

Floating rate index and basis point spread for the floating leg.

First Fixing Rate: the interest rate to be used for the first interest rate calculation period for the floating leg (optional).

Day Count: the day-count method to be used for calculating interest, specified for each of the (i) fixed leg and (ii) floating leg.

Payment Frequency: the frequency of interest payment, specified for each of the (i) fixed leg and (ii) floating leg.

Roll/Date: the specific day and convention for each period to be used for determining payment of interest when such event occurs on a non-business day, specified for each of the (i) fixed leg and (ii) floating leg.

Rate Reset Calendar: the location-specific (e.g., New York, London) calendar to be used for reference to business holidays for interest rate resets for the floating leg.

Holidays: the location-specific (e.g., New York, London) business holidays to be used for reference for payment calculations, specified for each of the (i) fixed leg and (ii) floating leg.

Stub: an indicator for an irregular schedule of payments, specified for each of the (i) fixed leg and (ii) floating leg.

Stub Length: the irregular payment schedule length, specified for each of the (i) fixed leg and (ii) floating leg.

Compounding Frequency: interest compounding calculation frequency, specified for each of the (i) fixed leg and (ii) floating leg.

Legal Entity: the name of the Member or the Member's associated legal entity to which the transaction will be assigned.

By clicking the "Save" button, the Member can save the transaction request information inputted on this interface. By clicking the "Send" button, the Member can automatically send the transaction request information to Providers.

Note that if the Member specifies a "Float" Pay Leg and "Fixed" Receive Leg using radio buttons 9100 in FIG. 114, with the same currency, and clicks on "Next" button 9110, the system will display the "New Request: Float Fixed Interest Rate Swap" interface. This interface enables a Member to create a Float-Fixed Interest Rate Swap transaction request, which is structured opposite of the Fixed-Float Interest Rate Swap described above.

(2) Float-Float Interest Rate Swap

If the Member specifies a "Float" Pay Leg and "Float" Receive Leg, as shown on radio buttons 9120 in FIG. 114B, with the same currency, and clicks on "Next" button 9130, the system will display the "New Request: Float Float Interest Rate Swap" interface, illustrated by FIG. 114C. This interface enables a Member to create a Float-Float Interest Rate Swap transaction request (see Section B.1.b.i.(b)(4) above for description of Interest Rate Float Float Swap Trade Type sub-element) to be submitted to Providers via the system. As shown in FIG. 114C, the information to be inputted by the Member using the interface for each Float-Float Interest Rate Swap transaction request includes the following:

Trade Date: the date on which the swap has been agreed to by the parties.

Start Date: the date on which the swap contract will begin.

Maturity Date: the date on which the swap contract will end.

Notional Amount and Currency to be specified for each of the (i) floating Pay Leg and (ii) floating Receive Leg.

Floating rate index and basis point spread for each of the (i) floating Pay Leg and (ii) floating Receive Leg.

First Fixing Rate: the interest rate to be used for the first interest rate calculation period for each of the (i) floating Pay Leg and (ii) floating Receive Leg (optional).

Day Count: the day-count method to be used for calculating interest, specified for each of the (i) floating Pay Leg and (ii) floating Receive Leg.

Payment Frequency: the frequency of interest payment, specified for each of the (i) floating Pay Leg and (ii) floating Receive Leg.

Roll/Date: the specific day and convention for each period to be used for determining payment of interest when such event occurs on a non-business day, specified for each of the (i) floating Pay Leg and (ii) floating Receive Leg.

Rate Reset Calendar: the location-specific (e.g., New York, London) calendar to be used for reference to business holidays for interest rate resets for each of the (i) floating Pay Leg and (ii) floating Receive Leg.

Holidays: the location-specific (e.g., New York, London) business holidays to be used for reference for payment calculations, specified for each of the (i) floating Pay Leg and (ii) floating Receive Leg.

Stub: an indicator for an irregular schedule of payments, specified for each of the (i) floating Pay Leg and (ii) floating Receive Leg.

Stub Length: the irregular payment schedule length, specified for each of the (i) floating Pay Leg and (ii) floating Receive Leg.

Compounding Frequency: interest compounding calculation frequency, specified for each of the (i) floating Pay Leg and (ii) floating Receive Leg.

Legal Entity: the name of the Member or the Member's associated legal entity to which the transaction will be assigned.

By clicking the "Save" button, the Member can save the transaction request information inputted on this interface. By clicking the "Send" button, the Member can automatically send the transaction request information to Providers.

(3) Fixed-Fixed Cross-Currency Swap

If the Member specifies a "Fixed" Pay Leg and "Fixed" Receive Leg, as shown on radio buttons 9140 in FIG. 114D, with different currencies for the Pay Leg and Receive Leg, as shown on radio buttons 9150, and clicks on "Next" button 9160, the system will display the "New Request: Fixed Fixed Cross Currency Swap" interface, illustrated by FIG. 114E. This interface enables a Member to create a Fixed-Fixed Cross-Currency Swap transaction request (see Section B.1.b.i.(b)(11) above for description of Cross-Currency Fixed-Fixed Swap Trade Type sub-element) to be submitted to Providers via the system. As shown in FIG. 114E, the information to be inputted by the Member using the interface for each Fixed-Fixed Cross-Currency Swap transaction request includes the following:

Trade Date: the date on which the swap has been agreed to by the parties.

Start Date: the date on which the swap contract will begin and exchange of principal (if applicable) will occur.

Maturity Date: the date on which the swap contract will end.

Notional Amount and Currency to be specified for each of the (i) fixed Pay Leg and (ii) fixed Receive Leg.

Principal Exchange Type: the type of principal exchange, if any, to be included in the transaction.

Principal Exchange Rate and Currency: the exchange rate and currency of the principal exchange, if any.

Fixed rate: the interest rate of either the (i) fixed Pay Leg or (ii) fixed Receive Leg.

Day Count: the day-count method to be used for calculating interest, specified for each of the (i) fixed Pay Leg and (ii) fixed Receive Leg.

Payment Frequency: the frequency of interest payment, specified for each of the (i) fixed Pay Leg and (ii) fixed Receive Leg.

Roll/Date: the specific day and convention for each period to be used for determining payment of interest when such event occurs on a non-business day, specified for each of the (i) fixed Pay Leg and (ii) fixed Receive Leg.

Holidays: the location-specific (e.g., New York, London) business holidays to be used for reference for payment calculations, specified for each of the (i) fixed Pay Leg and (ii) fixed Receive Leg.

Stub: an indicator for an irregular schedule of payments, specified for each of the (i) fixed Pay Leg and (ii) fixed Receive Leg.

Stub Length: the irregular payment schedule length, specified for each of the (i) fixed Pay Leg and (ii) fixed Receive Leg.

Compounding Frequency: interest compounding calculation frequency, specified for each of the (i) fixed Pay Leg and (ii) fixed Receive Leg.

Legal Entity: the name of the Member or the Member's associated legal entity to which the transaction will be assigned.

By clicking the "Save" button, the Member can save the transaction request information inputted on this interface. By clicking the "Send" button, the Member can automatically send the transaction request information to Providers.

(4) Fixed-Float Cross-Currency Swap

If the Member specifies a "Fixed" Pay Leg and "Float" Receive Leg, as shown on radio buttons 9170 in FIG. 114F, with different currencies for the Pay Leg and Receive Leg, as shown on radio buttons 9180, and clicks on "Next" button 9190, the system will display the "New Request: Fixed Float Cross Currency Swap" interface, illustrated by FIG. 114G. This interface enables a Member to create a Fixed-Float Cross-Currency Swap transaction request (see Section B.1.b.i.(b)(13) above for description of Cross-Currency Fixed-Float Swap Trade Type sub-element) to be submitted to Providers via the system. As shown in FIG. 114G, the information to be inputted by the Member using the interface for each Fixed-Float Cross-Currency Swap transaction request includes the following:

Trade Date: the date on which the swap has been agreed to by the parties.

Start Date: the date on which the swap contract will begin and exchange of principal (if applicable) will occur.

Maturity Date: the date on which the swap contract will end.

Notional Amount and Currency to be specified for each of the (i) fixed leg and (ii) floating leg.

Principal Exchange Type: the type of principal exchange, if any, to be included in the transaction.

Principal Exchange Rate and Currency: the rate and currency of the principal exchange, if any.

Fixed rate index and basis point spread for the fixed leg or floating rate index and basis point spread for the floating leg.

First Fixing Rate: the interest rate to be used for the first interest rate calculation period for the floating leg (optional).

Day Count: the day-count method to be used for calculating interest, specified for each of the (i) fixed leg and (ii) floating leg.

Payment Frequency: the frequency of interest payment, specified for each of the (i) fixed leg and (ii) floating leg.

Roll/Date: the specific day and convention for each period to be used for determining payment of interest when such event occurs on a non-business day, specified for each of the (i) fixed leg and (ii) floating leg.

Rate Reset Calendar: the location-specific (e.g., New York, London) calendar to be used for reference to business holidays for interest rate resets for the floating leg.

Holidays: the location-specific (e.g., New York, London) business holidays to be used for reference for payment calculations, specified for each of the (i) fixed leg and (ii) floating leg.

Stub: an indicator for an irregular schedule of payments, specified for each of the (i) fixed leg and (ii) floating leg.

Stub Length: the irregular payment schedule length, specified for each of the (i) fixed leg and (ii) floating leg.

Compounding Frequency: interest compounding calculation frequency, specified for each of the (i) fixed leg and (ii) floating leg.

Legal Entity: the name of the Member or the Member's associated legal entity to which the transaction will be assigned.

By clicking the "Save" button, the Member can save the transaction request information inputted on this interface. By clicking the "Send" button, the Member can automatically send the transaction request information to Providers.

Note that if the Member specifies a "Float" Pay Leg and "Fixed" Receive Leg using radio buttons 9100 in FIG. 114, with the same currency, and clicks on "Next" button 9110, the system will display the "New Request: Float Fixed Cross Currency Swap" interface. This interface enables a Member to create a Float-Fixed Cross Currency Swap transaction request, which is structured opposite of the Fixed-Float Cross Currency Swap described above.

(5) Float-Float Cross-Currency Swap

If the Member specifies a "Float" Pay Leg and "Float" Receive Leg, as shown on radio buttons 9200 in FIG. 114H, with different currencies for the Pay Leg and Receive Leg, as shown on radio buttons 9210, and clicks on "Next" button 9220, the system will display the "New Request: Float Float Cross Currency Swap" interface, illustrated by FIG. 114I. This interface enables a Member to create a Float-Float Cross-Currency Swap transaction request (see Section B.1.b.i.(b)(12) above for description of Cross-Currency Float-Float Swap Trade Type sub-element) to be submitted to Providers via the system. As shown in FIG. 114I, the information to be inputted by the Member using the interface for each Float-Float Cross-Currency Swap transaction request includes the following:

Trade Date: the date on which the swap has been agreed to by the parties.

Start Date: the date on which the swap contract will begin and exchange of principal (if applicable) will occur.

Maturity Date: the date on which the swap contract will end.

Notional Amount and Currency to be specified for each of the (i) floating Pay Leg and (ii) floating Receive Leg.

Principal Exchange Type: the type of principal exchange, if any, to be included in the transaction.

Principal Exchange Rate and Currency: the exchange rate and currency of the principal exchange, if any.

Floating rate index and basis point spread for each of the (i) floating Pay Leg and (ii) floating Receive Leg.

First Fixing Rate: the interest rate to be used for the first interest rate calculation period for each of the (i) floating Pay Leg and (ii) floating Receive Leg (optional).

Day Count: the day-count method to be used for calculating interest, specified for each of the (i) floating Pay Leg and (ii) floating Receive Leg.

Payment Frequency: the frequency of interest/principal payment, specified for each of the (i) floating Pay Leg and (ii) floating Receive Leg.

Roll/Date: the specific day and convention for each period to be used for determining payment of interest when such event occurs on a non-business day, specified for each of the (i) floating Pay Leg and (ii) floating Receive Leg.

Rate Reset Calendar: the location-specific (e.g., New York, London) calendar to be used for reference to business holidays for interest rate resets for each of the (i) floating Pay Leg and (ii) floating Receive Leg.

Holidays: the location-specific (e.g., New York, London) business holidays to be used for reference for payment calculations, specified for each of the (i) floating Pay Leg and (ii) floating Receive Leg.

Stub: an indicator for an irregular schedule of payments, specified for each of the (i) floating Pay Leg and (ii) floating Receive Leg.

Stub Length: the irregular payment schedule length, specified for each of the (i) floating Pay Leg and (ii) floating Receive Leg.

Compounding Frequency: interest compounding calculation frequency, specified for each of the (i) floating Pay Leg and (ii) floating Receive Leg.

Legal Entity: the name of the Member or the Member's associated legal entity to which the transaction will be assigned.

By clicking the "Save" button, the Member can save the transaction request information inputted on this interface. By clicking the "Send" button, the Member can automatically send the transaction request information to Providers.

(e) Cap/Floor

The "New Request: Cap/Floor" interface, illustrated by FIG. 115, enables a Member to create Cap and Floor transaction requests to be submitted via the system to Providers. As shown in FIG. 115, the information to be inputted by the Member using the interface for each Cap or Floor transaction request includes the following:

Trade Date: the date on which the trade has been agreed to by the parties.

Start Date: the date on which the option will begin.

Expiry Date: the date on which the option will expire.

Radio buttons 9400 showing whether Member is buying or selling a Cap or Floor.

Notional Amount and Currency: the amount and type of currency to be used as a basis for calculating the payment stream.

Index for floating interest rate.

Radio button showing whether Member requests a price quote with (i) a premium amount in a specified currency or (ii) a strike percentage in a specified currency.

(1) Cap

If the Member specifies the purchase or sale of a "Cap", as shown on radio buttons 9400 in FIG. 115, and clicks on "Next" button 9410, the system will display the "New Request: Cap" interface, illustrated by FIG. 115A. This interface enables a Member to create a Cap transaction request (see Section B.1.b.i.(b)(5) above for description of Cap Trade Type sub-element) to be submitted to Providers via the system. As shown in FIG. 115A, the information to be inputted by the Member using the interface for each Cap transaction request includes the following:

Trade Date: the date on which the trade has been agreed to by the parties.

Start Date: the date on which the option will begin.

Expiry Date: the date on which the option will expire.

Radio button showing whether Member is buying or selling Cap.

Notional Amount and Currency: the amount and type of currency to be used as a basis for calculating the payment stream.

Strike: strike rate for exercise of each Cap transaction.

Index for floating interest rate.

First Fixing Rate: the interest rate to be used for the Cap calculation period.

Premium Pay Date: the date on which the premium payment will be made.

Day Count: the day-count method to be used for calculating interest.

Payment Frequency: the frequency of option payments.

Roll/Date: the specific day and convention for each period to be used for determining payment of option payments when such event occurs on a non-business day.

Rate Reset Calendar: the location-specific (e.g., New York, London) calendar to be used for reference to business holidays for interest rate resets.

Holidays: the location-specific (e.g., New York, London) business holidays to be used for reference for payment calculations.

Stub: an indicator for an irregular schedule of payments.

Stub Length: the irregular payment schedule length.

Legal Entity: the name of the Member or the Member's associated legal entity to which the transaction will be assigned.

By clicking the "Save" button, the Member can save the transaction request information inputted on this interface. By clicking the "Send" button, the Member can automatically send the transaction request information to Providers.

(2) Floor

If the Member specifies the purchase or sale of a "Floor", as shown on radio buttons 9420 in FIG. 115B, and clicks on "Next" button 9430, the system will display the "New Request: Floor" interface, illustrated by FIG. 115C. This interface enables a Member to create a Floor transaction request (see Section B.1.b.i.(b)(6) above for description of Floor Trade Type sub-element) to be submitted to Providers via the system. As shown in FIG. 115C, the information to be inputted by the Member using the interface for each Floor transaction request includes the following:

Trade Date: the date on which the trade has been agreed to by the parties.

Start Date: the date on which the option will begin.

Expiry Date: the date on which the option will expire.

Radio button showing whether Member is buying or selling Floor.

Notional Amount and Currency: the amount and type of currency to be used as a basis for calculating the payment stream.

Strike: strike rate for exercise of each Floor transaction.

Index for floating interest rate.

First Fixing Rate: the interest rate to be used for the Floor calculation period.

Premium Pay Date: the date on which the premium payment will be made.

Day Count: the day-count method to be used for calculating interest.

Payment Frequency: the frequency of option payments.

Roll/Date: the specific day and convention for each period to be used for determining payment of option payments when such event occurs on a non-business day.

Rate Reset Calendar: the location-specific e.g., New York, London) calendar to be used for reference to business holidays for interest rate resets.

Holidays: the location-specific (e.g., New York, London) business holidays to be used for reference for payment calculations.

Stub: an indicator for an irregular schedule of payments.

Stub Length: the irregular payment schedule length.

Legal Entity: the name of the Member or the Member's associated legal entity to which the transaction will be assigned.

By clicking the "Save" button, the Member can save the transaction request information inputted on this interface. By clicking the "Send" button, the Member can automatically send the transaction request information to Providers.

(f) Forward Rate Agreement

The "New Request: FRA" interface, illustrated by FIG. 116, enables a Member to create a Forward Rate Agreement transaction request to be submitted via the system to Providers. As shown in FIG. 116, the information to be inputted by the Member using the interface for each Forward Rate Agreement transaction request includes the following:

Trade Date: the date on which the trade has been agreed to by the parties.

Term: the start and end dates of the trade; e.g., "3×6 months" means that the trade will begin on the first business date three months after the trade date and will end on the first business date six months after the trade date.

Radio button 9500 showing whether Member is buying or selling a Forward Rate Agreement.

Notional Amount and Currency: the amount and type of currency to be used as a basis for calculating the payment stream.

Index for floating interest rate.

Clicking "Next" button 9510 will cause the system to display the "New Request: Forward Rate Agreement" interface, illustrated by FIG. 116A. This interface enables a Member to provide the details of a Forward Rate Agreement transaction request (see Section B.1.b.i.(b)(14) above for description of Forward Rate Agreement sub-element) to be submitted to Providers via the system. As shown in FIG. 116A, the information to be inputted by the Member using the interface for each Forward Rate Agreement transaction request includes the following:

Trade Date: the date on which the trade has been agreed to by the parties.

Term: the start and end dates of the trade; e.g., "3×6 months" means that the trade will begin on the first business date three months after the trade date and will end on the first business date six months after the trade date.

Start Date: the date on which the Forward Rate Agreement contract will begin.

End Date: the date on which the Forward rate Agreement contract will end.

Radio button showing whether Member buying or selling Forward Rate Agreement.

Notional Amount and Currency: the amount and type of currency to be used as a basis for calculating the payment stream.

Index for floating interest rate.

Day Count: the day-count method to be used for calculating interest.

Roll/Date: the specific day and convention for each period to be used for determining payment of Forward Rate Agreement payments when such event occurs on a non-business day.

Rate Reset Calendar: the location-specific (e.g., New York, London) calendar to be used for reference to business holidays for interest rate resets.

Holidays: the location-specific (e.g., New York, London) business holidays to be used for reference for payment calculations.

Legal Entity: the name of the Member or the Member's associated legal entity to which the transaction will be assigned.

By clicking the "Save" button, the Member can save the transaction request information inputted on this interface. By clicking the "Send" button, the Member can automatically send the transaction request information to Providers.

(g) Fixed Rate Deposit

The "New Request: Deposit" interface, illustrated by FIG. 117, enables a Member to create a Fixed Rate Deposit transaction request to be submitted via the system to Providers. As shown in FIG. 117, the information to be inputted by the Member using the interface for each Fixed Rate Deposit transaction request includes the following:

Trade Date: the date on which the deposit has been agreed to by the parties.

Value Date: the date on which the deposit will begin.

Maturity Date: the date on which the deposit will end.

Deposit Amount and Currency: the amount and type of currency of the deposit.

Clicking "Next" button 9600 will cause the system to display the "New Request: Fixed Rate Deposit" interface, illustrated by FIG. 117A. This interface enables a Member to provide the details of a Fixed Rate Deposit transaction request (see Section B.1.b.i.(b)(7) above for description of Fixed Rate Deposit sub-element) to be submitted to Providers via the system. As shown in FIG. 117A, the information to be inputted by the Member using the interface for each Fixed Rate Deposit transaction request includes the following:

Trade Date: the date on which the deposit has been agreed to by the parties.

Value Date: the date on which the deposit will begin.

Maturity Date: the date on which the deposit will end.

Deposit Amount and Currency: the amount and type of currency of the deposit by the Member to a Provider.

Day Count: the day-count method to be used for calculating interest.

Payment Frequency: the frequency of interest/principal payment.

Roll/Date: the specific day and convention for each period to be used for determining payment of deposit payments when such event occurs on a non-business day.

Rate Reset Calendar: the location-specific (e.g., New York, London) calendar to be used for reference to business holidays for interest rate resets.

Holidays: the location-specific (e.g., New York, London) business holidays to be used for reference for payment calculations.

Stub: an indicator for an irregular schedule of payments.

Stub Length: the irregular payment schedule length.

Legal Entity: the name of the Member or the Member's associated legal entity to which the transaction will be assigned.

By clicking the "Save" button, the Member can save the transaction request information inputted on this interface. By clicking the "Send" button, the Member can automatically send the transaction request information to Providers.

ii. Member Request Monitoring

The present embodiment of the invention includes a series of interfaces that enable a Member to monitor the status of transactions created by the Member, including new transactions requests, requests to which one or more Providers submitted responsive price quotes, accepted requests, and expired requests, as will be described below. Such monitors aggregate the requests for the particular Member, regardless of the counterparty (e.g., Provider) to the transaction.

(a) Current Request Monitor

Figure 67:
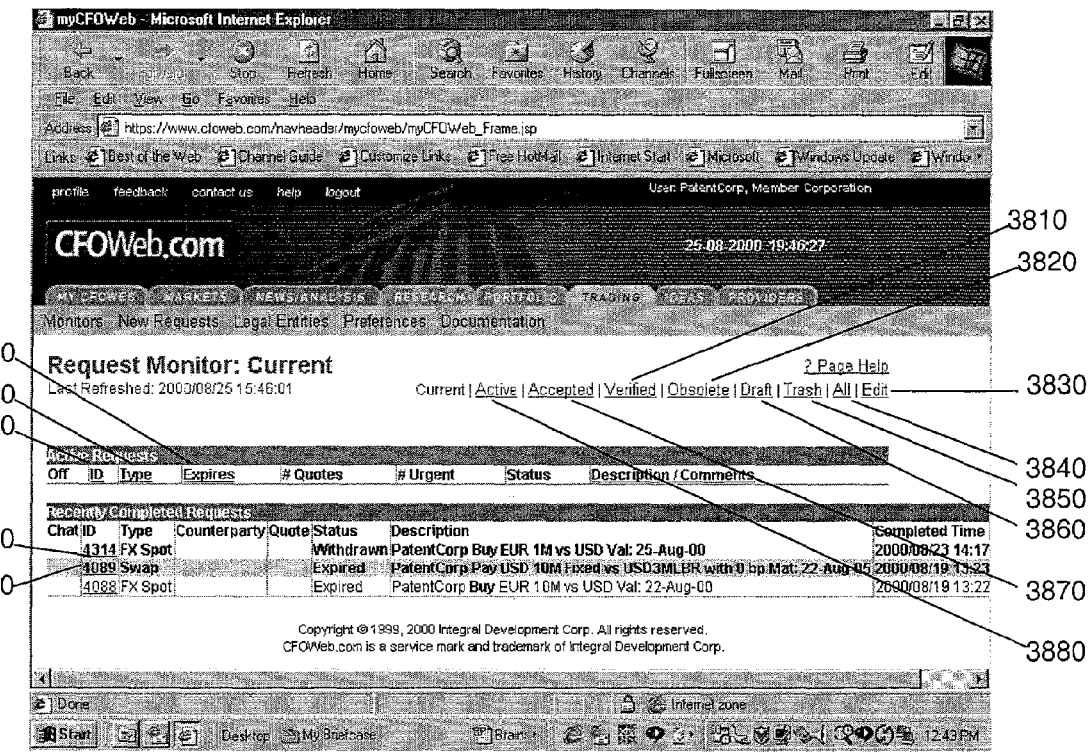
FIG. 67 shows a screen print of an interactive user interface for displaying the status of a Member's active and recently-completed transaction requests created using the system in an embodiment of the present invention.

The "Request Monitor: Current" interface, illustrated by FIG. 67, enables a Member to view an aggregated summary of the Member's (i) active and (ii) recently-completed transaction requests. As shown in FIG. 67, the information displayed for each "active" (i.e., un-expired) request includes the following:

an "Off" button that can be clicked to withdraw the request unique (system-assigned) identification number transaction type (e.g., FX Spot)

expiration date and time the number of price quotes received in response to the request the number of new price quotes received in response to the request status (e.g., "Expired")

description/comments

By clicking "ID" button 3780, "Type" button 3770, or "Expires" button 3760, the display of "active" requests can be sorted by identification number, transaction type, or expiration date/time, respectively.

The information displayed on the interface for each "recently completed" request includes the following:

a "Chat" button that can be clicked to communicate with the Provider that submitted the responsive price quote (if Provider permits chat communication for particular type of transaction)

unique (system-assigned) identification number transaction type (e.g., FX Spot)

counterparty name price quote (if any)

status (e.g., "Expired")

description completion date and time/comments

Clicking on the identification number for a particular transaction request will cause the system to display the details for that request. This functionality is also available from the other request monitor interfaces described below. For example, clicking on the identification number ("4314") for the FX Spot transaction request (identified as button 3790) will cause the system to display the "Request Detail: FX Spot" interface shown in FIG. 68. This interface shows the details of the FX Spot transaction request created by the Member, including the following information:

Start and end date/time of the request.

Status of the request (e.g., "Withdrawn").

Trade Date: the date on which the currency trade has been agreed to by the parties.

Value Date: the date on which the traded currencies will be exchanged.

Transaction amount and currency.

Figure 68:
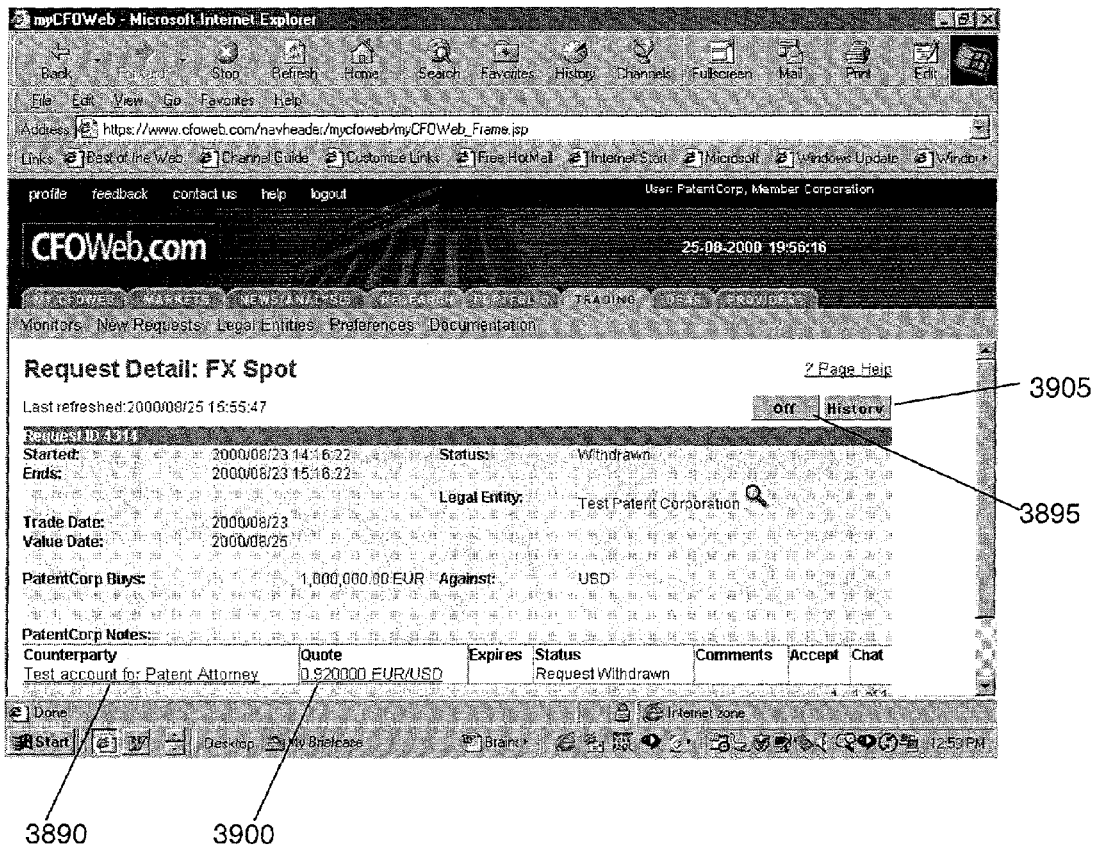
FIG. 68 shows a screen print of an interactive user interface for displaying the trade details of a Member's Foreign Exchange Spot transaction created using the system in an embodiment of the present invention.

Currency to be acquired or the currency to which the quote will be pegged (e.g., "USD" in FIG. 68).

Legal Entity: the name of the Member or the Member's associated legal entity to which the transaction will be assigned.

If a responsive price quote has already been received, the interface will also display the following information:

counterparty name price quote amount/rate and currency expiration date/time of quote status of quote comments accompanying quote an "Accept" button that can be clicked to accept the price quote a "Chat" button that can be clicked to communicate with the Provider (if Provider permits chat communication for particular type of transaction)

Figure 85:
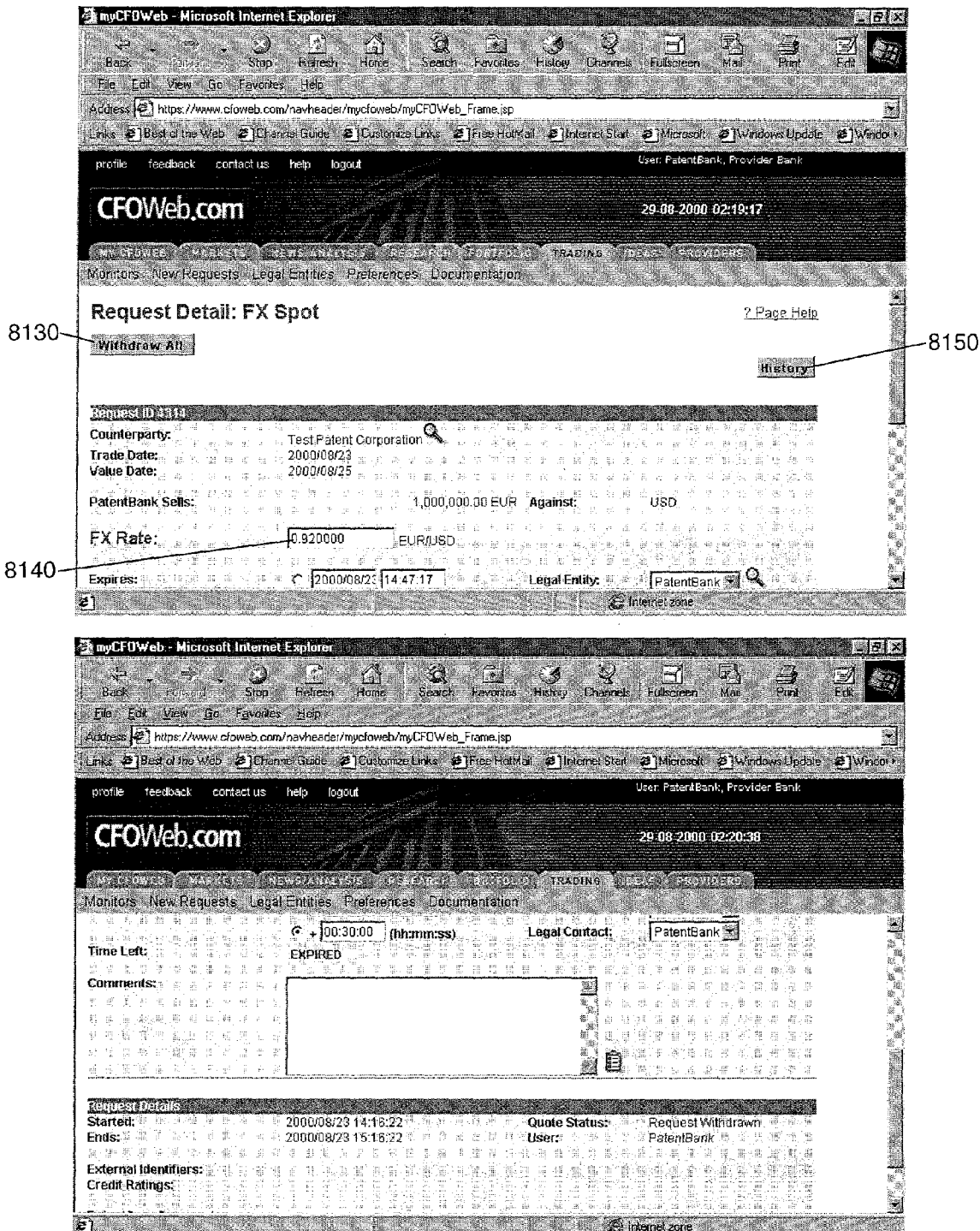
FIG. 85 shows a screen print of an interactive user interface for displaying the transaction details of a Provider's Foreign Exchange Spot price quote created using the system in an embodiment of the present invention.

The Member can click on the Counterparty name 3890, which will cause the system to display profile information regarding the counterparty (see FIG. 97 described below), and the quote 3900, which will cause the system to display further details regarding the quote (see FIG. 85 described below). By clicking "Off" button 3895, the Member can withdraw the transaction request. By clicking "History" button 3905, the Member will cause the system to display a summary of all events related to the transaction request, such as modifications to the initial request and price quotes received from different Providers.

As another example, clicking on the identification number ("4089") for the Swap transaction request (identified as button 3800 on FIG. 67) will cause the system to display the "Request Detail: Fixed Float Interest Rate Swap" interface shown in FIG. 69. This interface shows the details of the Fixed-Float Interest Rate Swap transaction request created by the Member, including the following information:

Start and end date/time of the request.
Status of the request (e.g., "Expired").
Trade Date: the date on which the swap has been agreed to by the parties.
Start Date: the date on which the swap contract will begin.
Maturity Date: the date on which the swap contract will end.
Amount and currency to be paid by the Member for the fixed Pay Leg
Amount and currency to be paid by the Provider for the floating Receive Leg.
Floating rate index and basis point spread for the Receive Leg.
Legal Entity: the name of the Member or the Member's associated legal entity to which the transaction will be assigned.

If a responsive price quote has already been received, the interface will also display the following information:
counterparty name
price quote amount/rate and currency
expiration date/time of quote
status of quote
comments accompanying quote
an "Accept" button that can be clicked to accept the price quote
a "Chat" button that can be clicked to communicate with the Provider (if Provider permits chat communication for particular type of transaction)

The system includes similar interfaces displaying detail of transaction requests and price quotes for all other types of transaction requests displayed on the request monitor interfaces. The system will automatically refresh the "Request Monitor: Current" interface and the "Request Detail" interfaces for each type of transaction request when a new price quote is received or the status of a transaction request changes.

(b) Active Request Monitor

Figure 70:
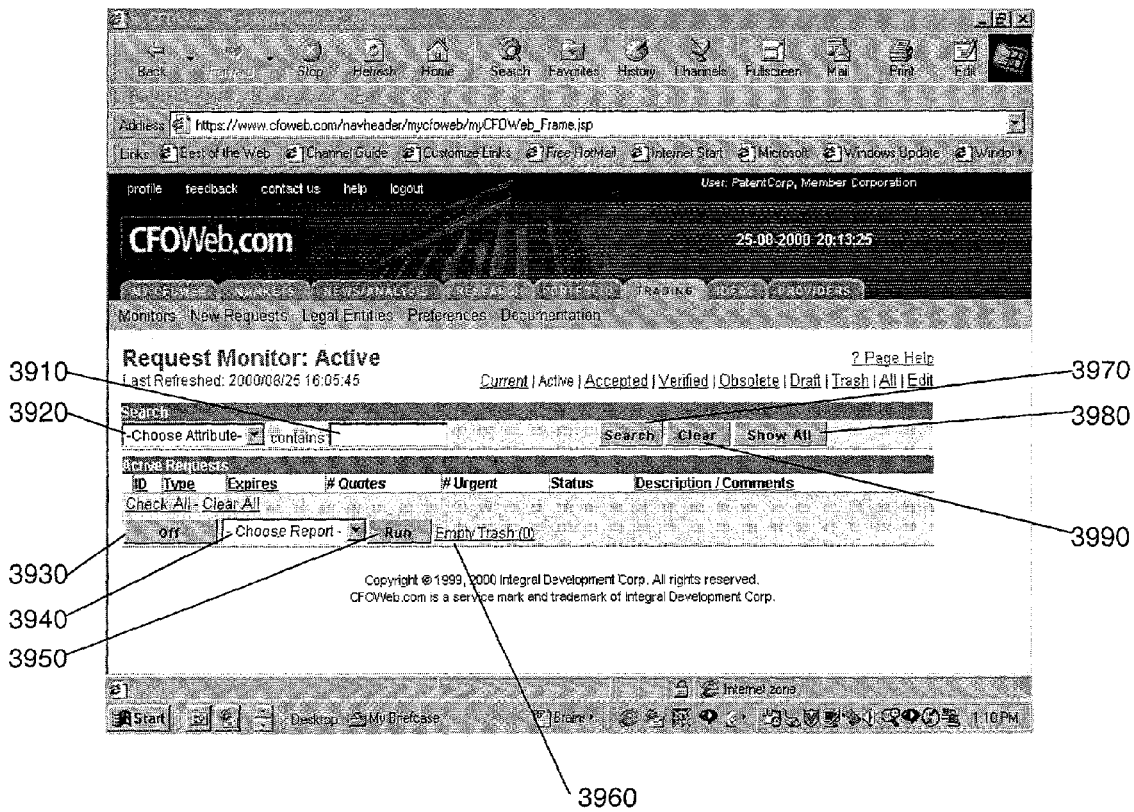
FIG. 70 shows a screen print of an interactive user interface for displaying the status and a summary of a Member's active transaction requests created using the system in an embodiment of the present invention.

The "Request Monitor: Active" interface, illustrated by FIG. 70, which can be accessed by clicking "Active" button 3880 on the "Request Monitor: Current" interface (shown in FIG. 67), enables a Member to view an aggregated summary of the Member's active transaction requests. As shown in FIG. 70, the information displayed for each "active" (i.e., un-expired) request includes the following:

"Off" button 3930 that can be clicked to withdraw the particular request
unique (system-assigned) identification number
transaction type (e.g., FX Spot)
expiration date and time
the number of price quotes received in response to the request
the number of new price quotes received in response to the request
status (e.g., "Expired")
description/comments By clicking the "ID" button, "Type" button, or "Expires" button, the display of "active" requests can be sorted by identification number, transaction type, or expiration date/time, respectively. Clicking "Run" button 3950 will cause the system to run a report that can be selected from pull-down menu 3940 regarding the displayed active request(s). Such reports may include an activity log of events, transaction statistics, and an audit log regarding the active requests. Such aggregate reports are available for each of the request monitors describe below.

The "Request Monitor: Active" interface, as well as the other request monitor interfaces describe below, also enables the Member to conduct an automated search of the listed requests, which is useful in the event that there are a large number of active requests. Using pull-down menu 3920, the user can select the attribute on which to search (e.g., transaction type, description) and input the search term in field 3910 (e.g., "FX Spot"). Clicking "Search" button 3970 will cause the system to run the search and display the results. Clicking "Clear" button 3980 will cause the system to clear the search criteria in order that new search criteria can be entered. Clicking "Show All" button 3990 will cause the system to display all active requests. Clicking "Empty Trash" button 3960 will cause the system to permanently delete obsolete or draft transaction requests; the quantity of such requests is indicated next to "Empty Trash" button 3960.

(c) Accepted Request Monitor

Figure 71:
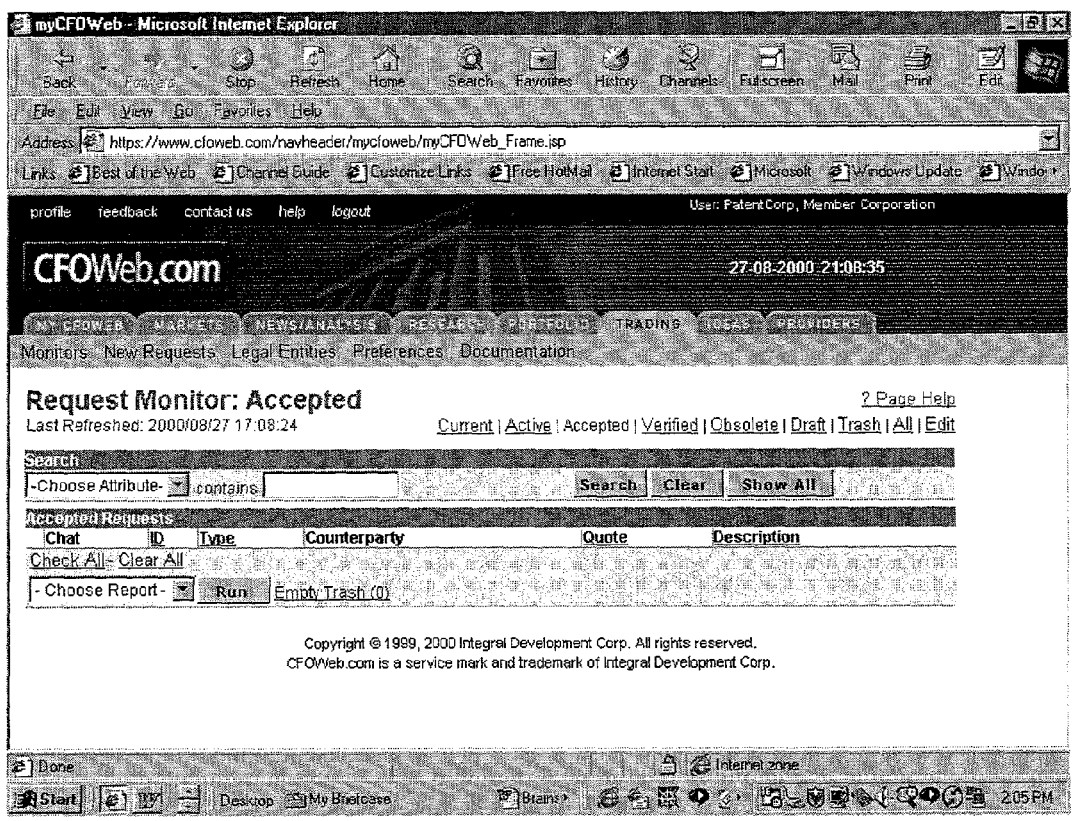
FIG. 71 shows a screen print of an interactive user interface for displaying a summary of a Member's accepted transaction requests created using the system in an embodiment of the present invention.
Figure 72:
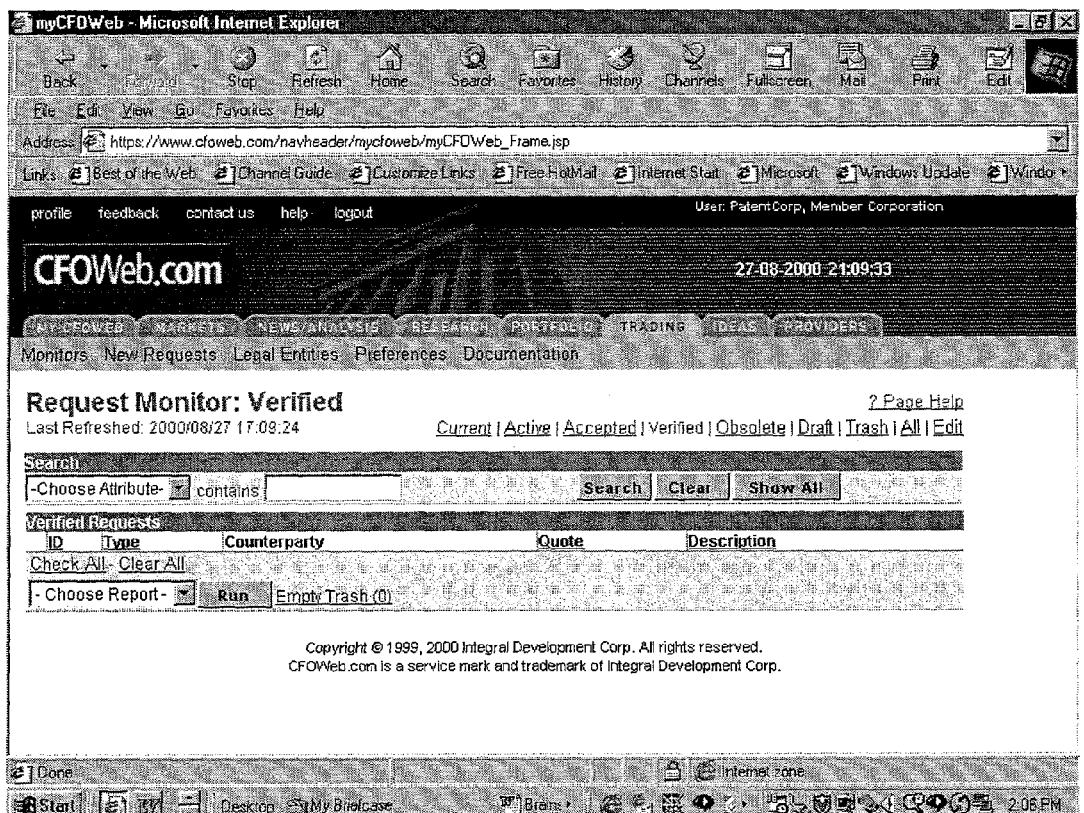
FIG. 72 shows a screen print of an interactive user interface for displaying a summary of a Member's verified transaction requests created using the system in an embodiment of the present invention.
Figure 73:
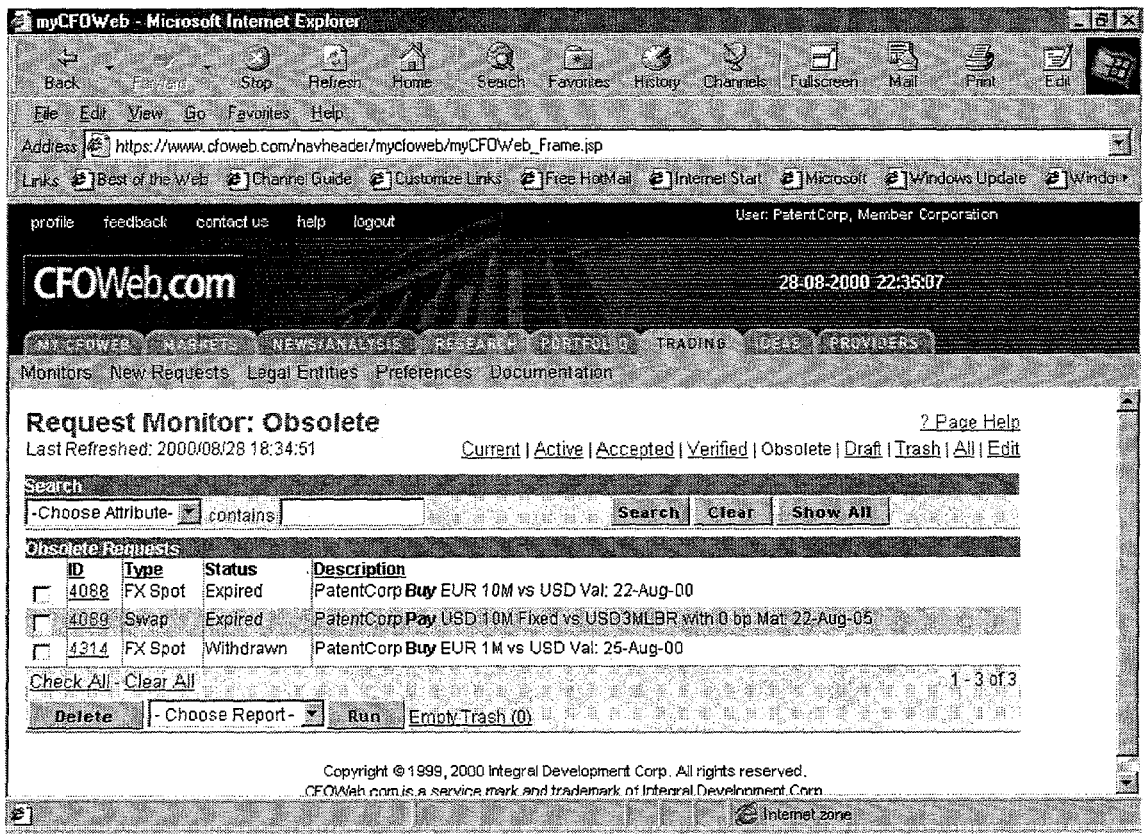
FIG. 73 shows a screen print of an interactive user interface for displaying a summary of a Member's obsolete transaction requests created using the system in an embodiment of the present invention.
Figure 74:
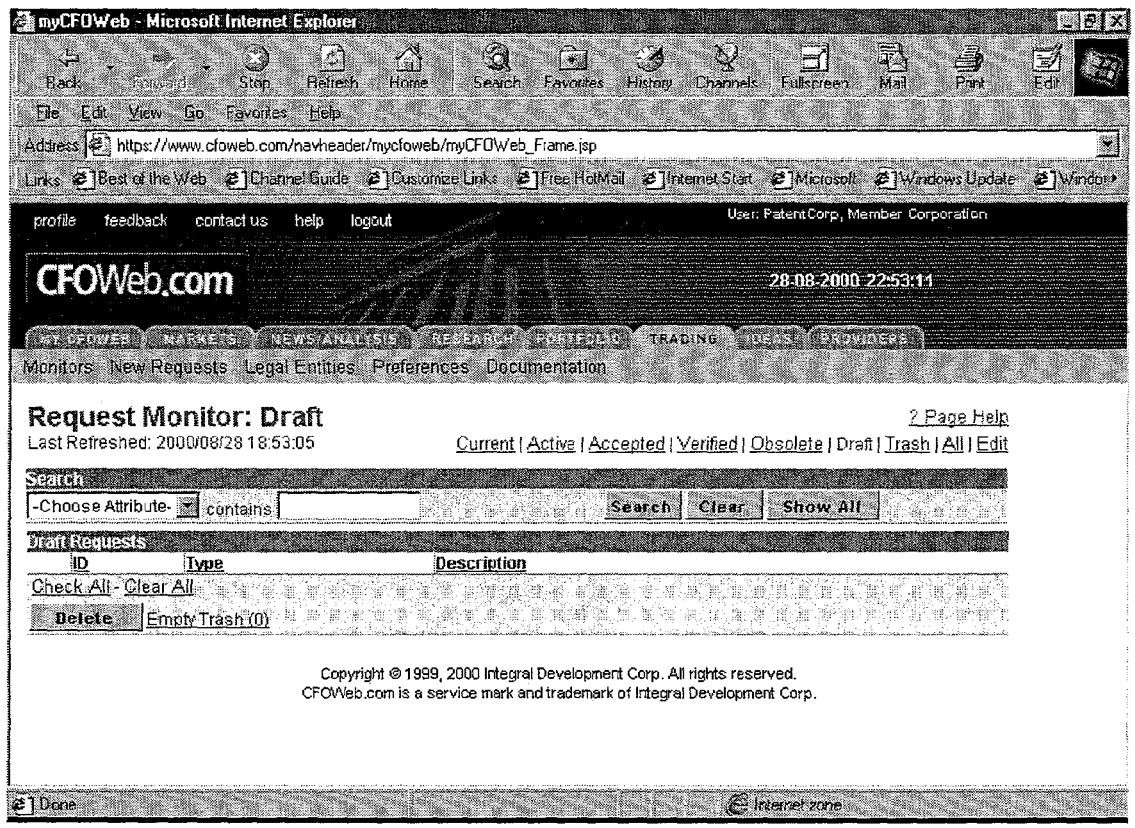
FIG. 74 shows a screen print of an interactive user interface for displaying a summary of a Member's draft transaction requests created using the system in an embodiment of the present invention.
Figure 75:
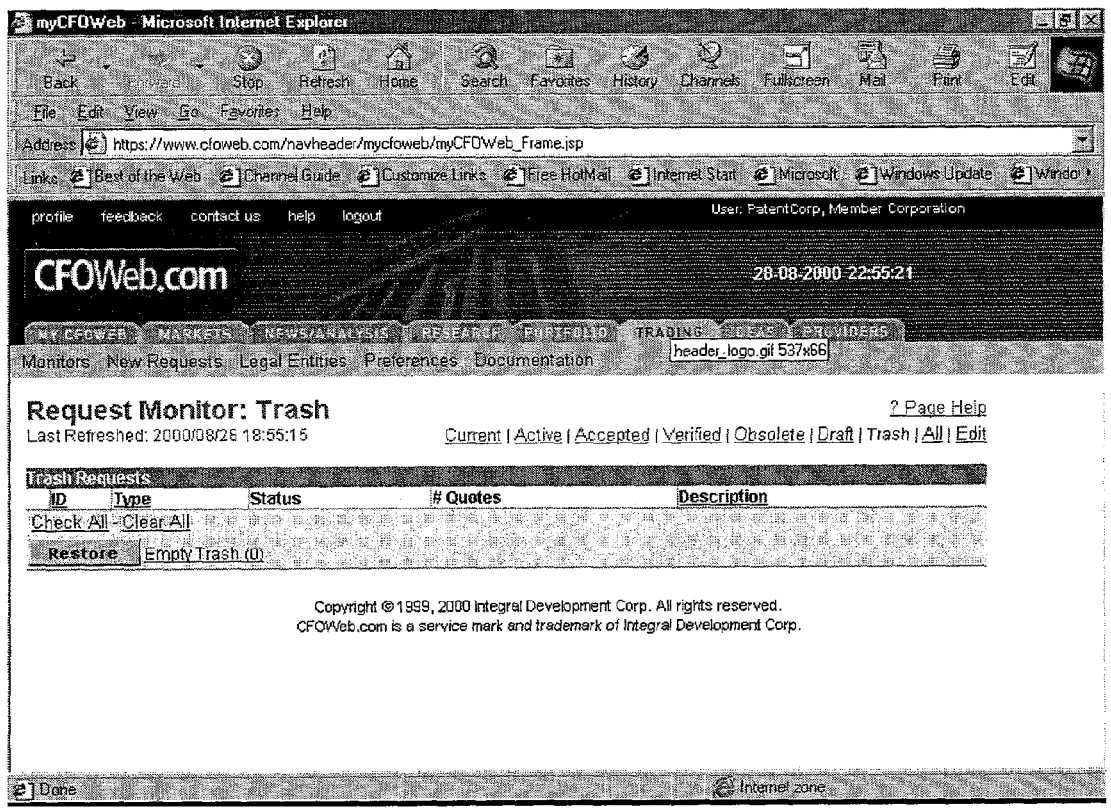
FIG. 75 shows a screen print of an interactive user interface for displaying a summary of a Member's deleted transaction requests created using the system in an embodiment of the present invention.

The "Request Monitor: Accepted" interface, illustrated by FIG. 71, which can be accessed by clicking "Accepted" button 3870 on the "Request Monitor: Current" interface (shown in FIG. 67), enables a Member to view an aggregated summary of the Member's accepted transaction requests, i.e., each transaction request for which the Member has accepted a price quote from a Provider. As shown in FIG. 71, the information displayed for each "accepted" request includes the following:

a "Chat" button that can be clicked to communicate with the Provider (if Provider permits chat communication for particular type of transaction)
unique (system-assigned) identification number
transaction type
counterparty name
price quote amount/rate
description (d) Verified Request Monitor The "Request Monitor: Verified" interface, illustrated by FIG. 72, which can be accessed by clicking "Verified" button 3810 on the "Request Monitor: Current" interface (shown in FIG. 67), enables a Member to view an aggregated summary of the Member's verified transaction requests, i.e., each transaction request for which the Member has accepted a price quote from a Provider and the Provider has verified the Member's acceptance. As shown in FIG. 72, the information displayed for each "verified" request includes the following:

unique (system-assigned) identification number
transaction type
counterparty name
price quote amount/rate
description (e) Obsolete Request Monitor The "Request Monitor: Obsolete" interface, illustrated by FIG. 73, which can be accessed by clicking "Obsolete" button 3820 on the "Request Monitor: Current" interface (shown in FIG. 67), enables a Member to view an aggregated summary of the Member's obsolete transaction requests, i.e., each transaction request that has expired or that the Member has withdrawn. As shown in FIG. 73, the information displayed for each "obsolete" request includes the following:

unique (system-assigned) identification number
status (i.e., "Expired" or "Withdrawn")
transaction type
description (f) Draft Request Monitor The "Request Monitor: Draft" interface, illustrated by FIG. 74, which can be accessed by clicking "Draft" button 3860 on the "Request Monitor: Current" interface (shown in FIG. 67), enables a Member to view an aggregated summary of the Member's draft transaction requests, i.e., each transaction request that the Member has drafted and saved, but not yet submitted to Providers. As shown in FIG. 74, the information displayed for each "obsolete" request includes the following:

unique (system-assigned) identification number
transaction type
description (g) Trash Request Monitor The "Request Monitor: Trash" interface, illustrated by FIG. 75, which can be accessed by clicking "Trash" button 3850 on the "Request Monitor: Current" interface (shown in FIG. 67), enables a Member to view an aggregated summary of the Member's "trashed" (i.e., obsolete and draft) transaction requests and permanently delete such requests. As shown in FIG. 75, the information displayed for each "trashed" request includes the following:

selection indicator that can be clicked to select the request for deletion or restoration
unique (system-assigned) identification number
transaction type (e.g., FX Spot)
status
the number of price quotes received in response to the request
description By clicking on the selection indicator for a particular request, the Member can mark it for restoration. Subsequently clicking the "Restore" button will restore the selected requests to "active" status. Clicking the "Empty Trash" button will permanently delete all "trashed" requests.

(h) All Request Monitor

Figure 75A:
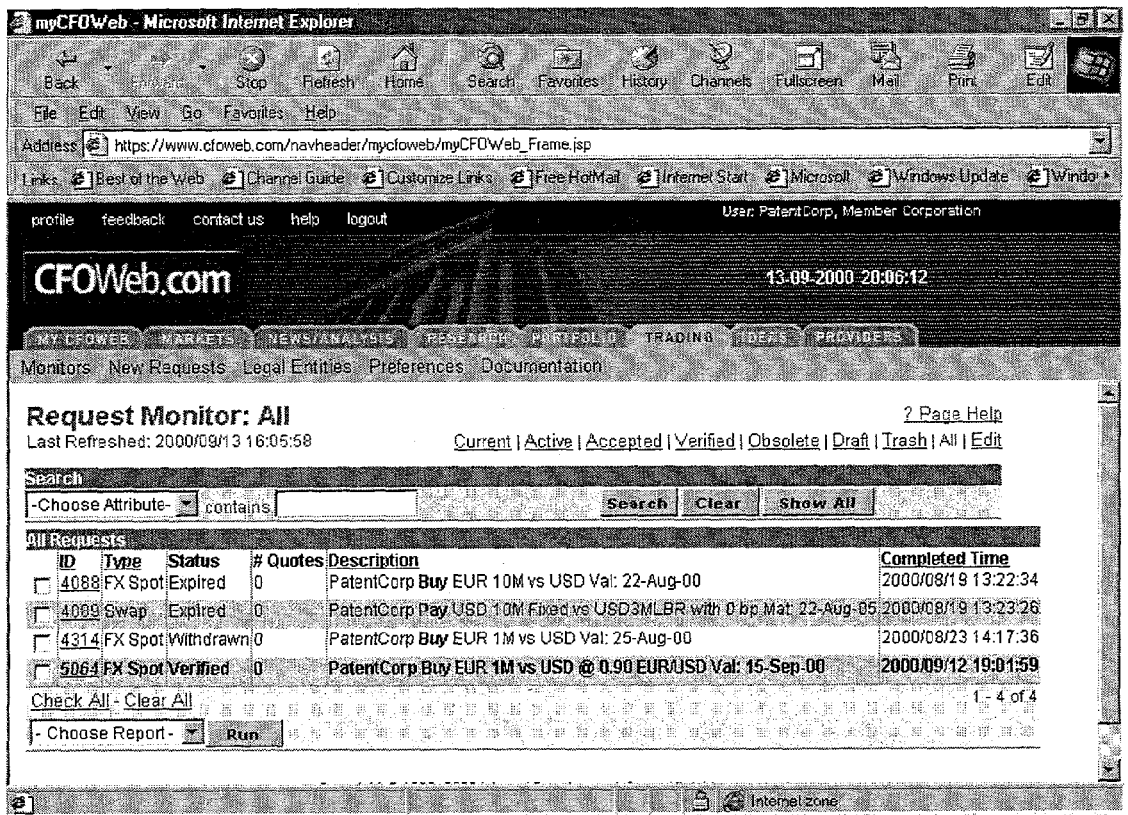
FIG. 75A shows a screen print of an interactive user interface for displaying the status and a summary of all of a Member's transaction requests created using the system in an embodiment of the present invention.
Figure 76:
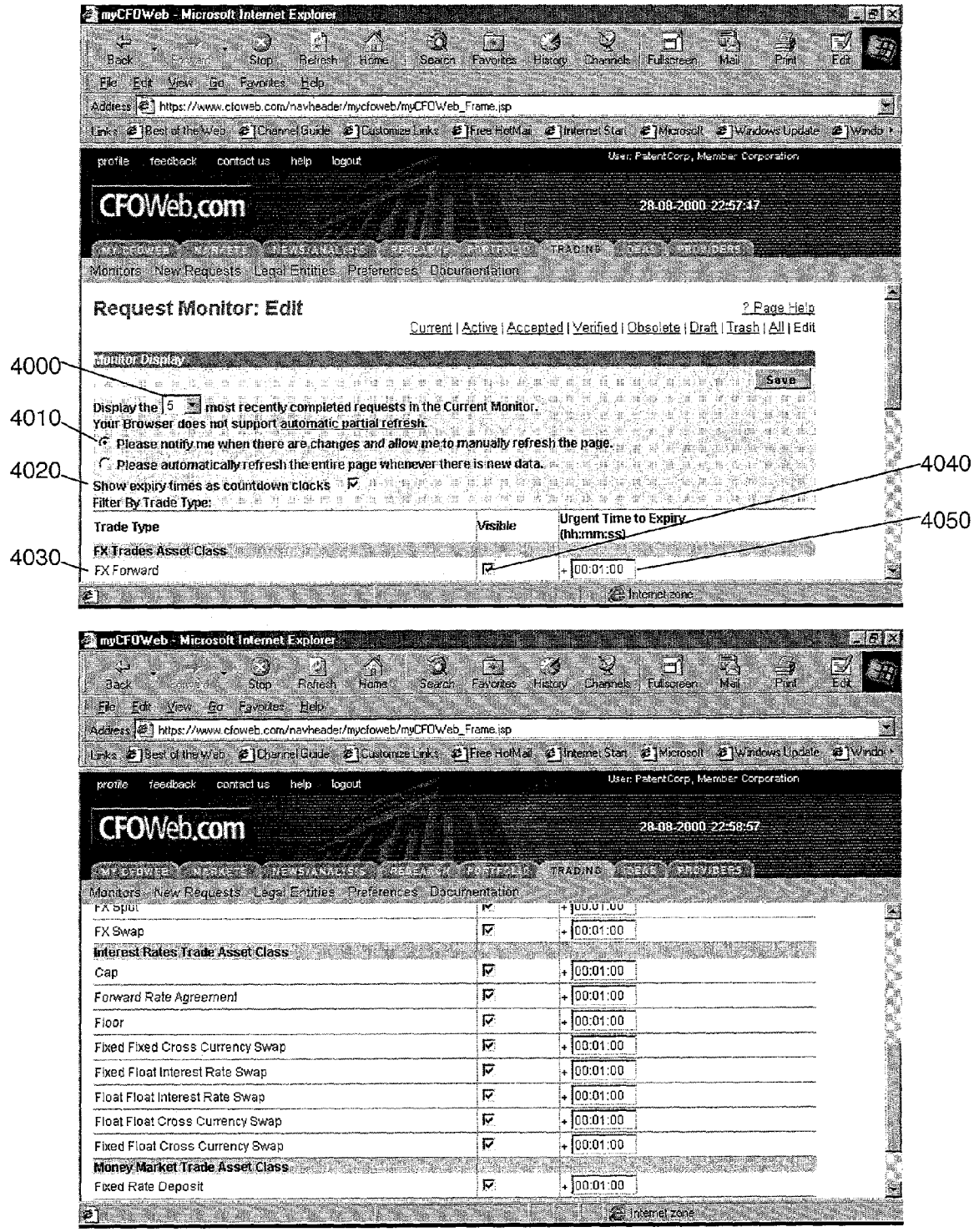
FIG. 76 shows a screen print of an interactive user interface for enabling a Member to set defaults and filters for the monitor display screens for the Member's transaction requests created using the system in an embodiment of the present invention.

The "Request Monitor: All" interface, illustrated by FIG. 75A, which can be accessed by clicking "All" button 3840 on the "Request Monitor: Current" interface (shown in FIG. 67), enables a Member to view an aggregated summary of all of the Member's transaction requests, including active, accepted, verified, withdrawn, and expired requests. As shown in FIG. 75A, the information displayed for each request includes the following:

unique (system-assigned) identification number
transaction type (e.g., FX Spot)
status (e.g., "Expired")
the number of price quotes received in response to the request
description
completion date and time/comments (i) Edit Request Monitor The "Request Monitor: Edit" interface, illustrated by FIG. 76, which can be accessed by clicking "Edit" button 3830 on the "Request Monitor: Current" interface (shown in FIG. 67), enables a Member to customize the request monitor interfaces. Using pull-down menu 4000, the Member can specify the number of most recently completed requests to be displayed in the "Request Monitor: Current" interface (shown in FIG. 67). By clicking radio button 4010, the Member can specify whether the system will (i) electronically notify the Member when there are changes to a request (e.g., expiration or new price quote) so that the Member can manually refresh the monitor display or (ii) automatically refresh the monitor display when there are changes to a request. By clicking indicator 4020, the Member can set whether the system will display a "countdown" meter showing time until expiration of a price quote in the monitor display. For each type of transaction, the Member can set "Visible" indicator 4040 which acts as a filter that determines whether the particular type of transaction will be displayed on the Member's monitor. Finally, using "Urgent Time to Expiry" field 4050, the Member can set a default time at which the time until expiration countdown meter will change colors (e.g., from green to red) to indicate urgency. By clicking the "Save" button, the Member can save the pricing request preference settings.

iii. Provider Request Monitoring

The present embodiment of the invention includes a series of interfaces that enable a Provider to monitor the status of transactions created by Member, including new transactions requests, requests to which the Provider has submitted responsive price quotes, accepted requests, verified requests, and expired requests, as will be described below. Such monitors aggregate the requests for the particular Provider, regardless of the counterparty (e.g., Member) to the transaction.

(a) Current Request Monitor

Figure 84:
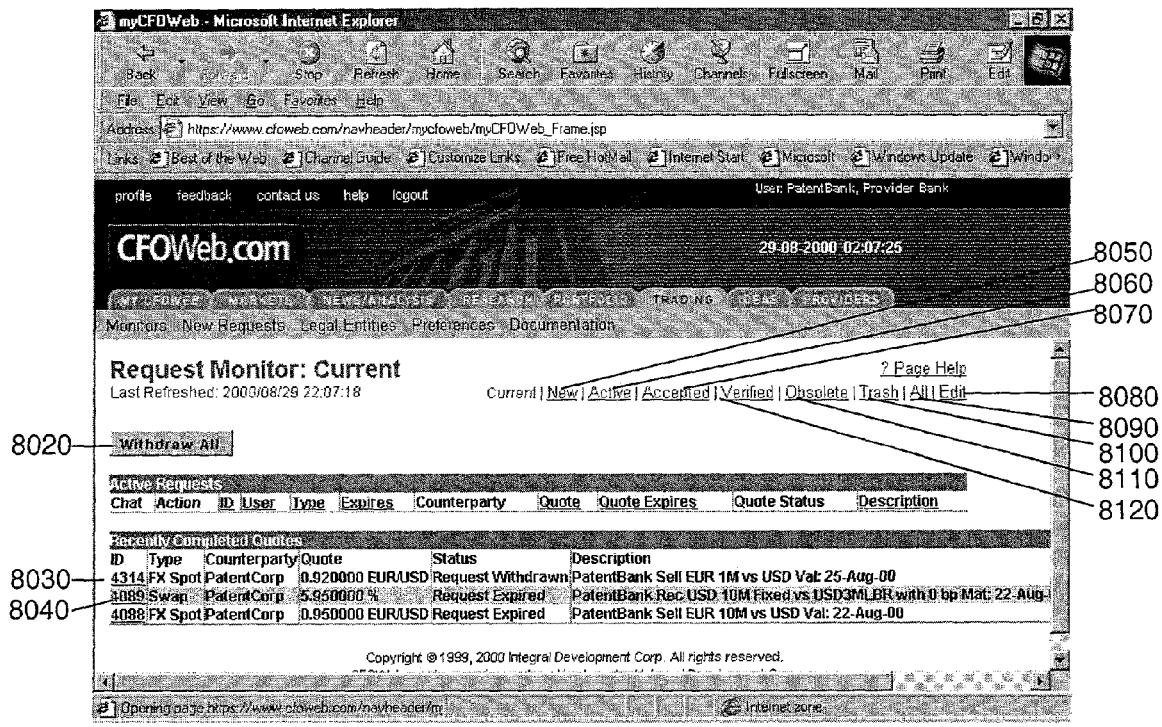
FIG. 84 shows a screen print of an interactive user interface for displaying the status and a summary of a Provider's active requests and recently-completed price quotes created using the system in an embodiment of the present invention.

The "Request Monitor: Current" interface, illustrated by FIG. 84, enables a Provider to view an aggregated summary of (i) active transaction requests from Members and (ii) the Provider's recently-completed price quotes. As shown in FIG. 84, the information displayed for each "active" (i.e., unexpired) request received from Members includes the following:

a "Chat" button that can be clicked to communicate with the Member that submitted the request (if Member permits chat communication for particular type of transaction)
an "Action" button (e.g., "Decline") that can be clicked to initiate an action regarding the request
unique (system-assigned) identification number
transaction type (e.g., FX Spot)
expiration date and time of request
counterparty name
Provider's current price quote
expiration date and time of price quote
price quote status (e.g., "Expired")
transaction request description The display of "active" requests can be sorted by identification number, transaction type, request expiration date/time, price quote, price quote expiration date/time, or description, by clicking on the respective column header.

The information displayed on the interface for each "recently completed" quote includes the following:

unique (system-assigned) identification number
transaction type (e.g., FX Spot)
counterparty name
price quote
status (e.g., "Expired")
description Clicking on the identification number for a particular quote will cause the system to display the details for that quote. This functionality is also available on the other request monitor interfaces described below. For example, clicking on the identification number ("4314") for the FX Spot quote (identified as button 8030) will cause the system to display the "Request Detail: FX Spot" interface shown in FIG. 85. This interface shows the details of the FX Spot price quote created by the Provider, including the following information:

- Start and end date/time of the request.
- Status of the request (e.g., "Withdrawn").
- Counterparty name.
- Trade Date: the date on which the currency trade has been agreed to by the parties.
- Value Date: the date on which the traded currencies will be exchanged.
- Transaction amount and currency.
- Currency to be acquired or the currency to which the quote will be pegged (e.g., "USD" in FIG. 85).
- Exchange rate and currency pair of quote.
- Date/time quote expires.
- Time remaining until quote expires.
- Legal Entity: the name of the Provider or the Provider's associated legal entity to which the transaction will be assigned.
- Legal Contact: the name of a contact within the Legal Entity.
- Comments regarding the quote, which may include standard text defined by the Provider (see "Standard Text" and "Standard Text Definition" interfaces described above and shown in FIGS. 101-102).

The interface will also display the following information regarding the transaction request:

- start date/time
- expiration date/time
- status
- credit rating(s) of counterparty The Provider can click on the Counterparty name, which will cause the system to display profile information regarding the counterparty (see FIG. 96 described below). By clicking "History" button 8150, the Provider will cause the system to display a summary of all events related to the price quote, such as modifications to the initial request and price quote.

Figure 86:
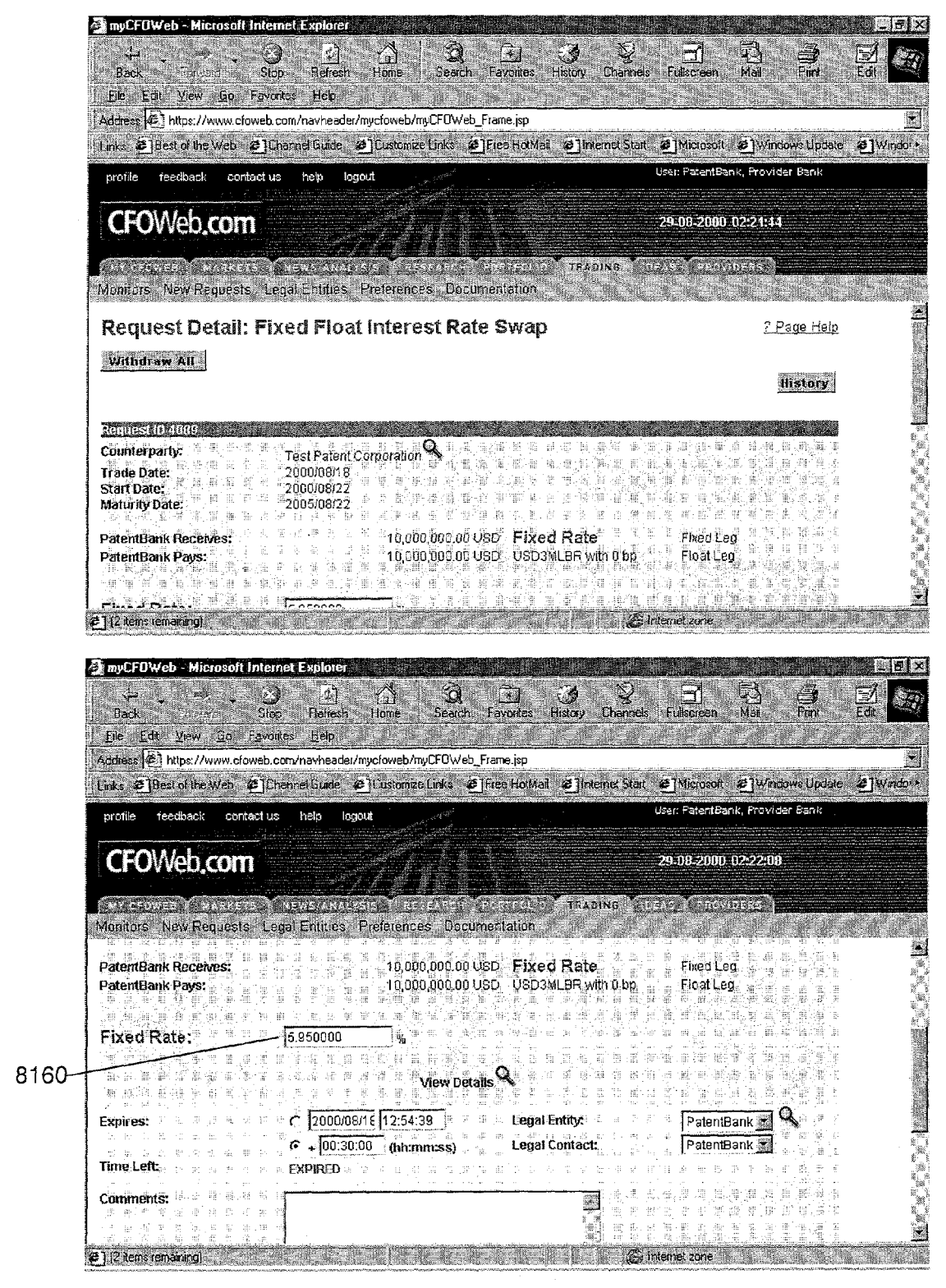

As another example, clicking on the identification number ("4089") for the Swap transaction request (identified as button 8040 on FIG. 84) will cause the system to display the "Request Detail: Fixed Float Interest Rate Swap" interface shown in FIGS. 86-86A. This interface shows the details of the Fixed-Float Interest Rate Swap price quote created by the Provider, including the following information:

- Counterparty name.
- Trade Date: the date on which the swap has been agreed to by the parties.
- Start Date: the date on which the swap contract will begin.
- Maturity Date: the date on which the swap contract will end.
- Amount and currency to be paid by the Member for the fixed Pay Leg
- Amount and currency to be paid by the Provider for the floating Receive Leg.
- Fixed interest rate for the Pay Leg.
- Floating rate index and basis point spread for the Receive Leg.
- Date/time quote expires.
- Time remaining until quote expires.
- Legal Entity: the name of the Provider or the Provider's associated legal entity to which the transaction will be assigned.
- Legal Contact: the name of a contact within the Legal Entity.
- Comments regarding the quote, which may include standard text defined by the Provider (see "Standard Text" and "Standard Text Definition" interfaces described above and shown in FIGS. 101-102).

Figure 86A:
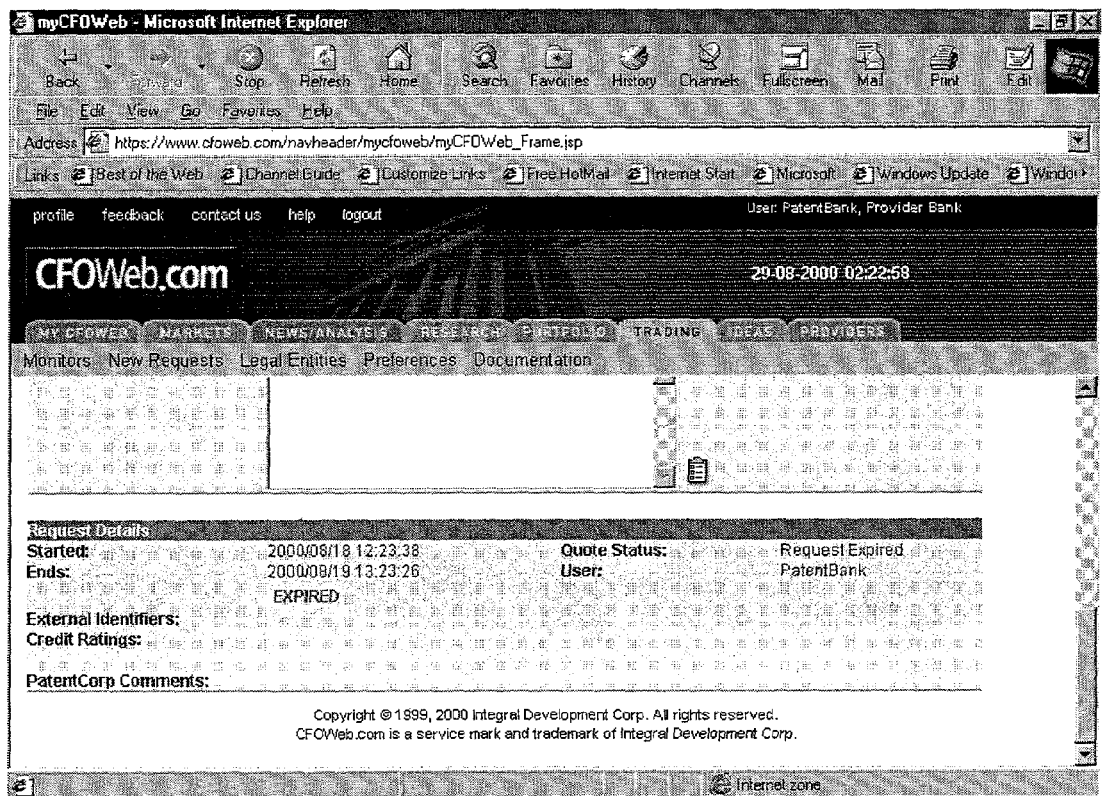

As shown in FIG. 86A, the interface will also display the following information regarding the transaction request:

- start date/time
- expiration date/time
- status
- credit rating(s) of counterparty The Provider can click on the Counterparty name, which will cause the system to display profile information regarding the counterparty (see FIG. 96 described below). By clicking "Withdraw All" button 8130, the Provider can withdraw all of the Provider's active price quotes. By clicking the "History" button, the Provider will cause the system to display a summary of all events related to the price quote, such as modifications to the initial request and price quote.

The system will automatically refresh the "Request Monitor: Current" interface when a new transaction request is received or the status of a price quote changes. The interface will also display the status of transaction requests for which the requesting Member accepted the price quote of another Provider. In such event, the status of the transaction request will be shown as "Dealt Away"; the accepted price quote will not be displayed.

(b) New Request Monitor

Figure 87:
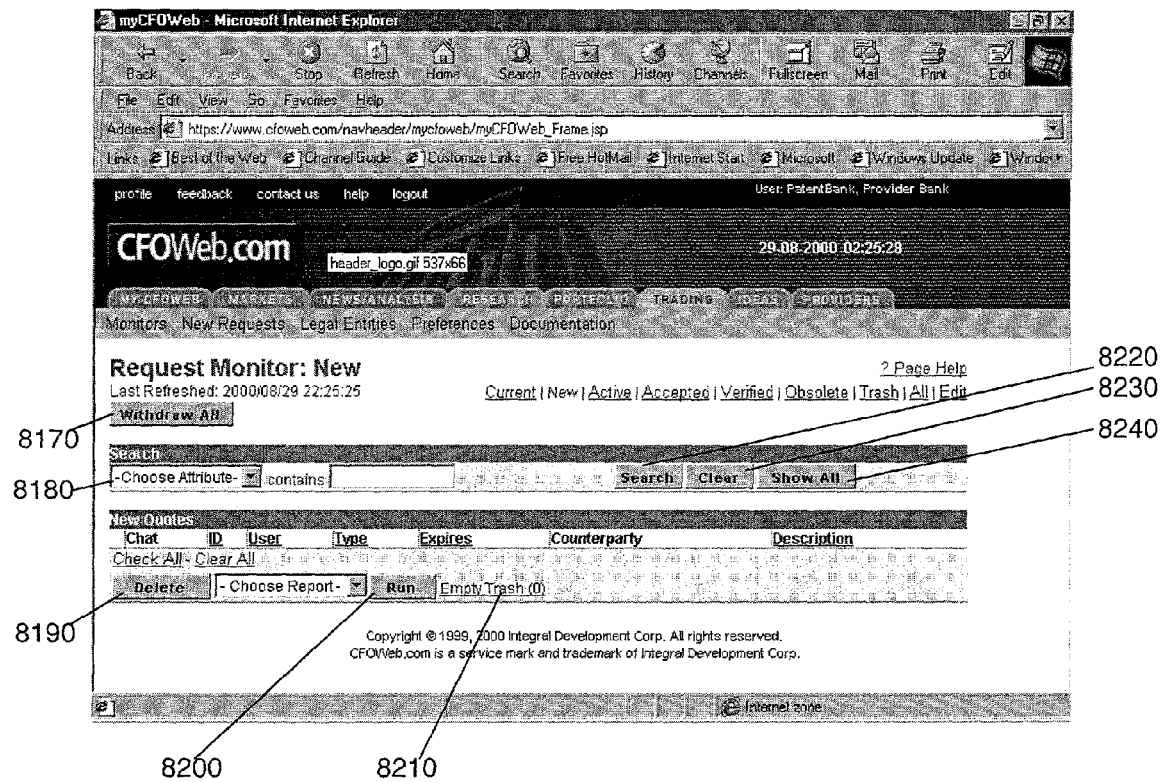
FIG. 87 shows a screen print of an interactive user interface for displaying the status and a summary of a Provider's new price quotes created using the system in an embodiment of the present invention.

The "Request Monitor: New" interface, illustrated by FIG. 87, which can be accessed by clicking "New" button 8050 on the "Request Monitor: Current" interface (shown in FIG. 84), enables a Provider to view an aggregated summary of the most recent transaction requests received from Members. As shown in FIG. 87, the information displayed for each "new" transaction request includes the following:

- a "Chat" button that can be clicked to communicate with the Member that submitted the request (if Member permits chat communication for particular type of transaction)
- unique (system-assigned) identification number transaction type (e.g., FX Spot)
- expiration date and time
- counterparty name
- description By clicking the "ID" button, "Type" button, or "Expires" button, the display of "active" requests can be sorted by identification number, transaction type, or expiration date/time, respectively. Clicking "Run" button 8200 will cause the system to run a report that can be selected from the adjacent pull-down menu regarding the new request(s). Such reports may include an activity log of events, transaction statistics, and an audit log regarding the active requests. Such aggregate reports are available for each of the request monitors described below.

The "Request Monitor: New" interface, as well as the other request monitor interfaces describe below, also enables the Provider to conduct an automated search of the listed requests, which is useful in the event that there are a large number of new requests. Using pull-down menu 8180, the user can select the attribute on which to search (e.g., transaction type, description) and input the search term in the adjacent field (e.g., "FX Spot"). Clicking "Search" button 8220 will cause the system to run the search and display the results. Clicking "Clear" button 8230 will cause the system to clear the search criteria in order that new search criteria can be entered. Clicking "Show All" button 8240 will cause the system to display all new requests. Clicking the "check" indicator adjacent to one or more requests (or clicking the "Check All" button to select all displayed requests) and then clicking "Delete" button 8190 will cause the system to delete the selected request(s) from view. Clicking "Empty Trash" button 8210 will cause the system to permanently delete obsolete or draft price quotes; the quantity of such requests is indicated next to "Empty Trash" button 8210. Clicking "Withdraw All" button 8170 will cause all of the Provider's active price quotes to be withdrawn from the view of Members, thereby removing such quotes from potential acceptance by a Member. The functionality described in this paragraph is available on each of the request monitor interfaces described herein.

(c) Active Request Monitor

Figure 88:
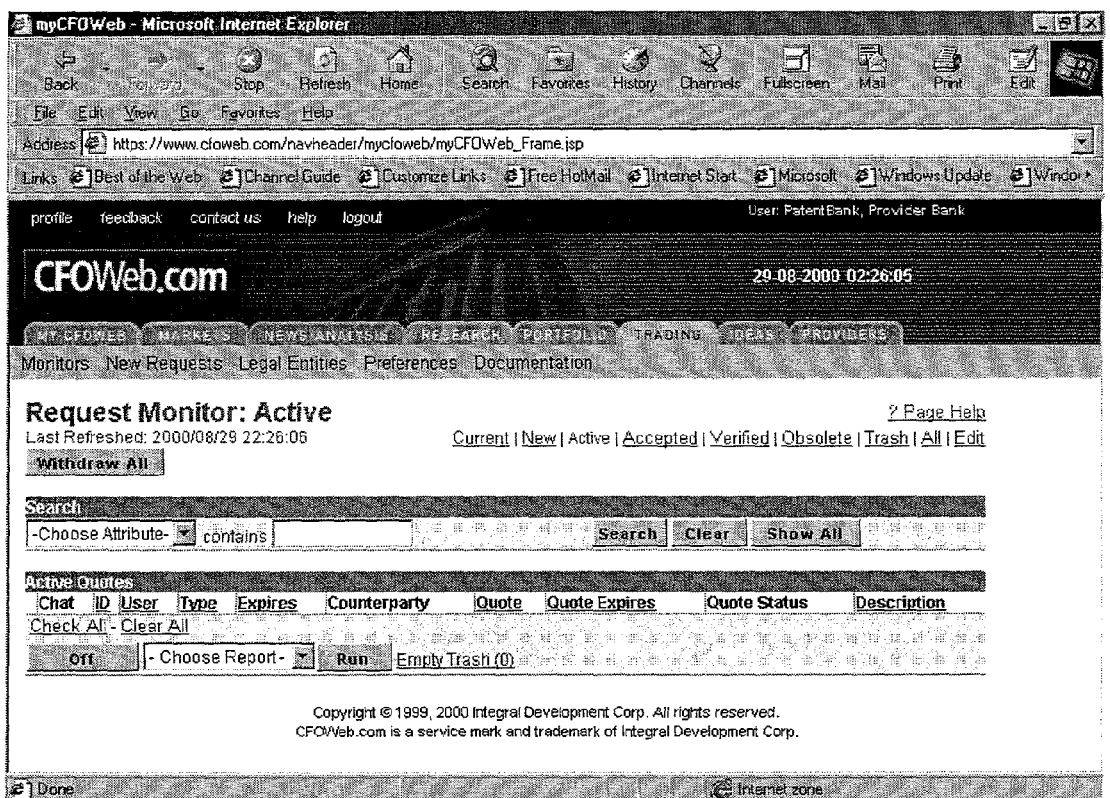
FIG. 88 shows a screen print of an interactive user interface for displaying the status and a summary of a Provider's active price quotes created using the system in an embodiment of the present invention.
Figure 89:
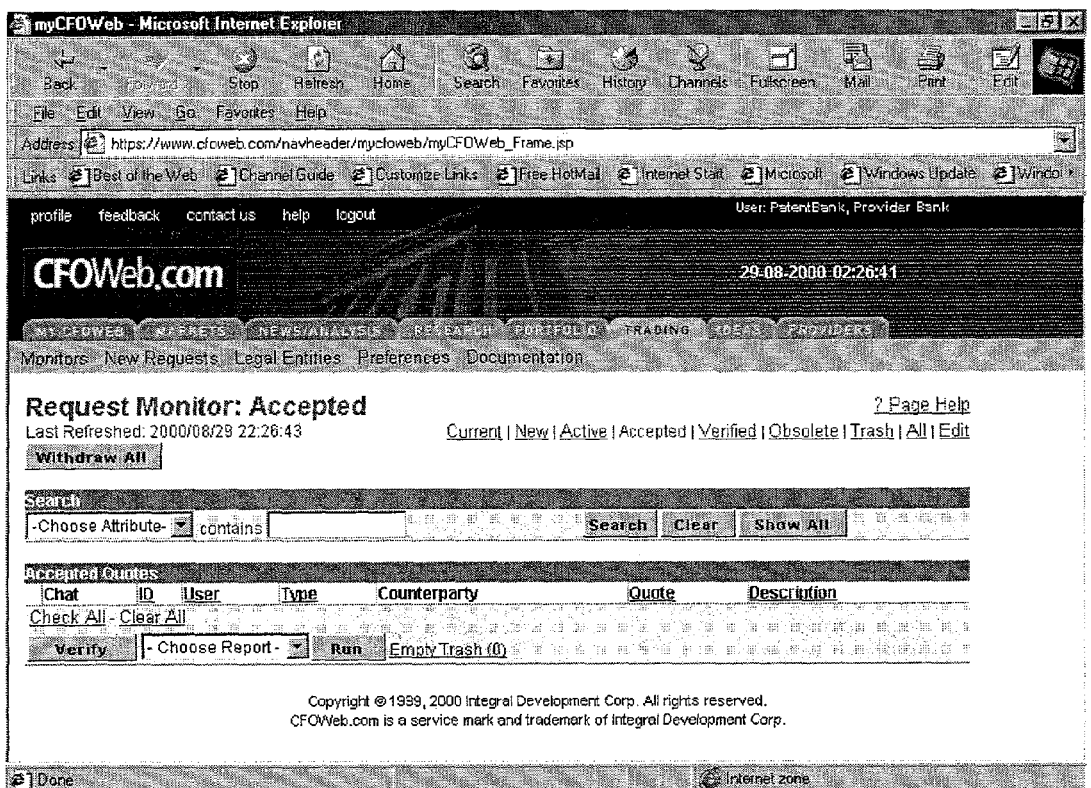
FIG. 89 shows a screen print of an interactive user interface for displaying a summary of a Provider's accepted price quotes created using the system in an embodiment of the present invention.
Figure 90:
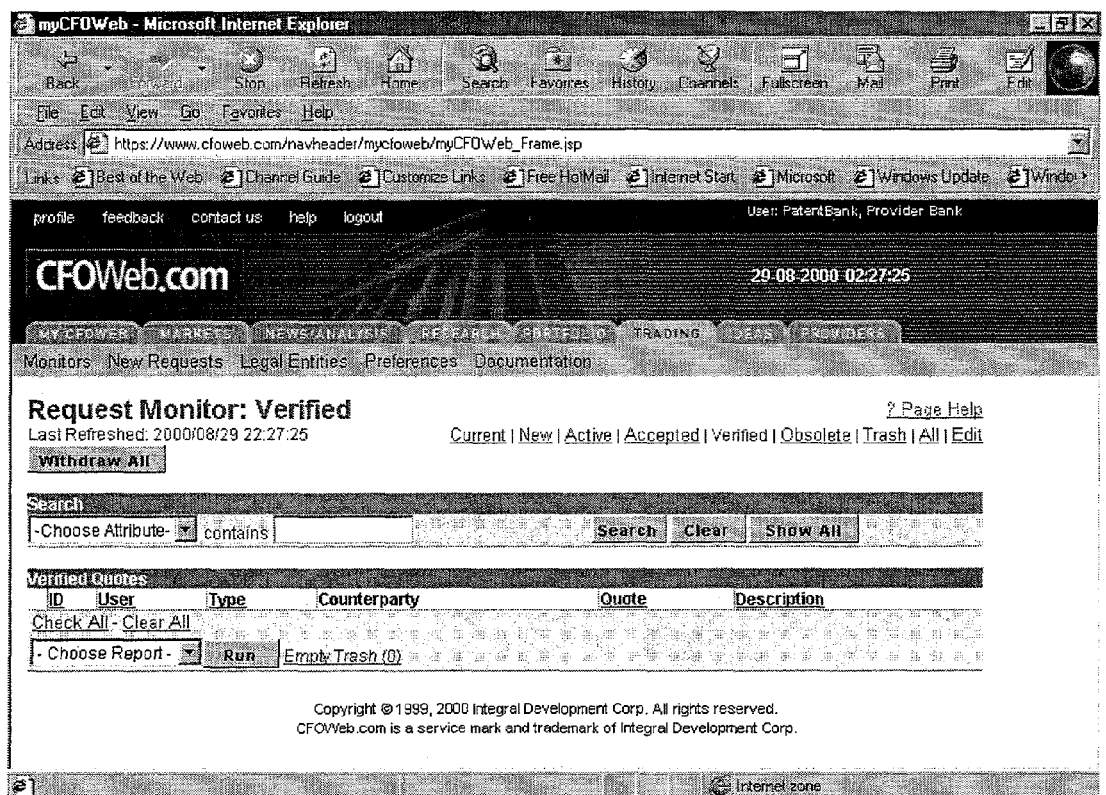
FIG. 90 shows a screen print of an interactive user interface for displaying a summary of a Provider's verified price quotes created using the system in an embodiment of the present invention.
Figure 92:
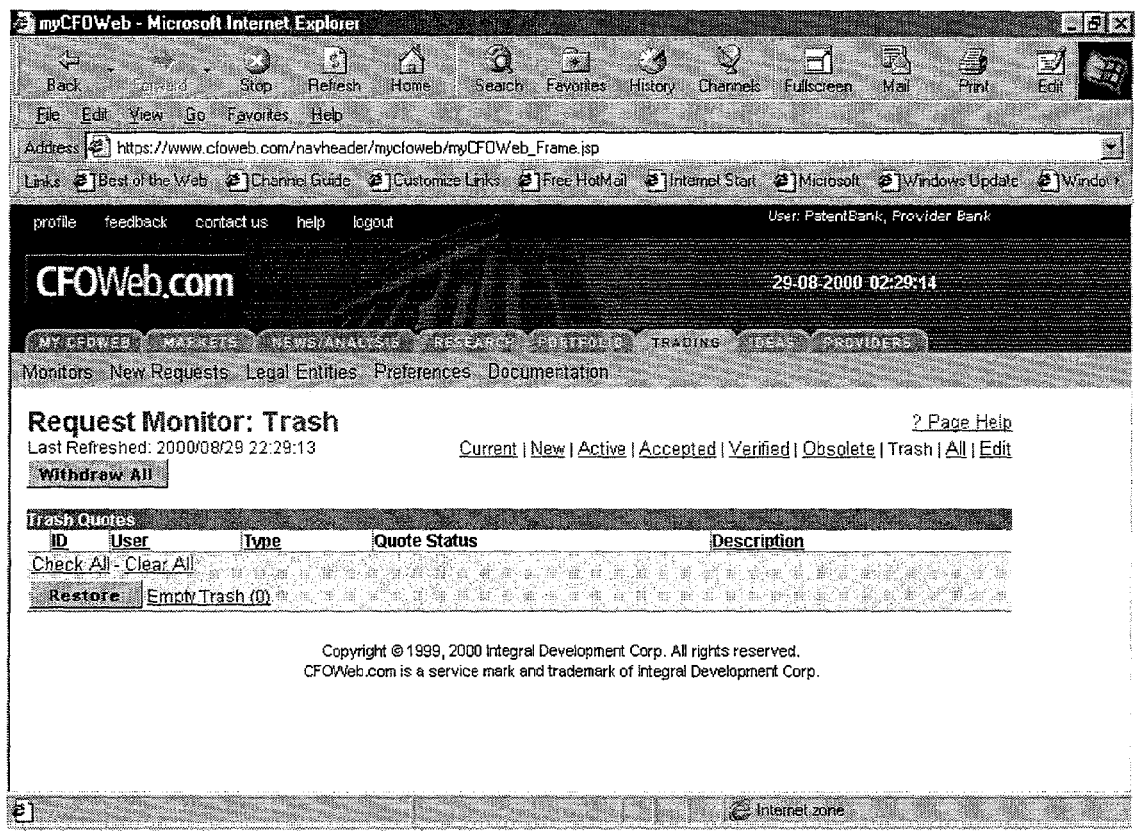
FIG. 92 shows a screen print of an interactive user interface for displaying a summary of a Provider's deleted price quotes created using the system in an embodiment of the present invention.

The "Request Monitor: Active" interface, illustrated by FIG. 88, which can be accessed by clicking "New" button 8060 on the "Request Monitor: Current" interface (shown in FIG. 84), enables a Provider to view an aggregated summary of the Provider's "active" (i.e., un-expired) price quotes. As shown in FIG. 88, the information displayed for each "active" quote includes the following:

- a "Chat" button that can be clicked to communicate with the Member that submitted the request (if Member permits chat communication for particular type of transaction)
- unique (system-assigned) identification number
- transaction type (e.g., FX Spot)
- transaction expiration date and time
- counterparty name
- quote amount/rate
- quote expiration date and time
- quote status
- description (d) Accepted Request Monitor The "Request Monitor: Accepted" interface, illustrated by FIG. 89, which can be accessed by clicking "Accepted" button 8070 on the "Request Monitor: Current" interface (shown in FIG. 84), enables a Provider to view an aggregated summary of the Provider's accepted price quotes, i.e., each quote that has been accepted by a Member. As shown in FIG. 89, the information displayed for each "accepted" quote includes the following:

- a "Chat" button that can be clicked to communicate with the Member (if Member permits chat communication for particular type of transaction)
- unique (system-assigned) identification number
- transaction type
- counterparty name
- price quote amount/rate
- description (e) Verified Request Monitor The "Request Monitor: Verified" interface, illustrated by FIG. 90, which can be accessed by clicking "Verified" button 8120 on the "Request Monitor: Current" interface (shown in FIG. 84), enables a Provider to view an aggregated summary of the Provider's verified price quotes, i.e., each quote accepted by a Member for which the acceptance has been verified by the Provider. As shown in FIG. 90, the information displayed for each "verified" quote includes the following:

- unique (system-assigned) identification number
- transaction type
- counterparty name
- price quote amount/rate
- description (f) Obsolete Request Monitor The "Request Monitor: Obsolete" interface, illustrated by FIG. 90, which can be accessed by clicking "Obsolete" button 8110 on the "Request Monitor: Current" interface (shown in FIG. 84), enables a Provider to view an aggregated summary of the Provider's obsolete price quotes, i.e., each quote that has expired or that the Provider has withdrawn. As shown in FIG. 91, the information displayed for each "obsolete" quote includes the following:

- unique (system-assigned) identification number
- transaction type
- status (i.e., "Expired" or "Withdrawn")
- description (g) Trash Request Monitor The "Request Monitor: Trash" interface, illustrated by FIG. 92, which can be accessed by clicking "Trash" button 8100 on the "Request Monitor: Current" interface (shown in FIG. 84), enables a Provider to view an aggregated summary of the Provider's "trashed" (i.e., obsolete and draft) price quotes and permanently delete such quotes. As shown in FIG. 92, the information displayed for each "trashed" quote includes the following:

- selection indicator that can be clicked to select the request for deletion or restoration
- unique (system-assigned) identification number
- transaction type (e.g., FX Spot)
- status
- description By clicking on the selection indicator for a particular request, the Provider can mark it for restoration. Subsequently clicking the "Restore" button will restore the selected requests to "active" status. Clicking the "Empty Trash" button will permanently delete all "trashed" requests.

(h) All Request Monitor

Figure 93:
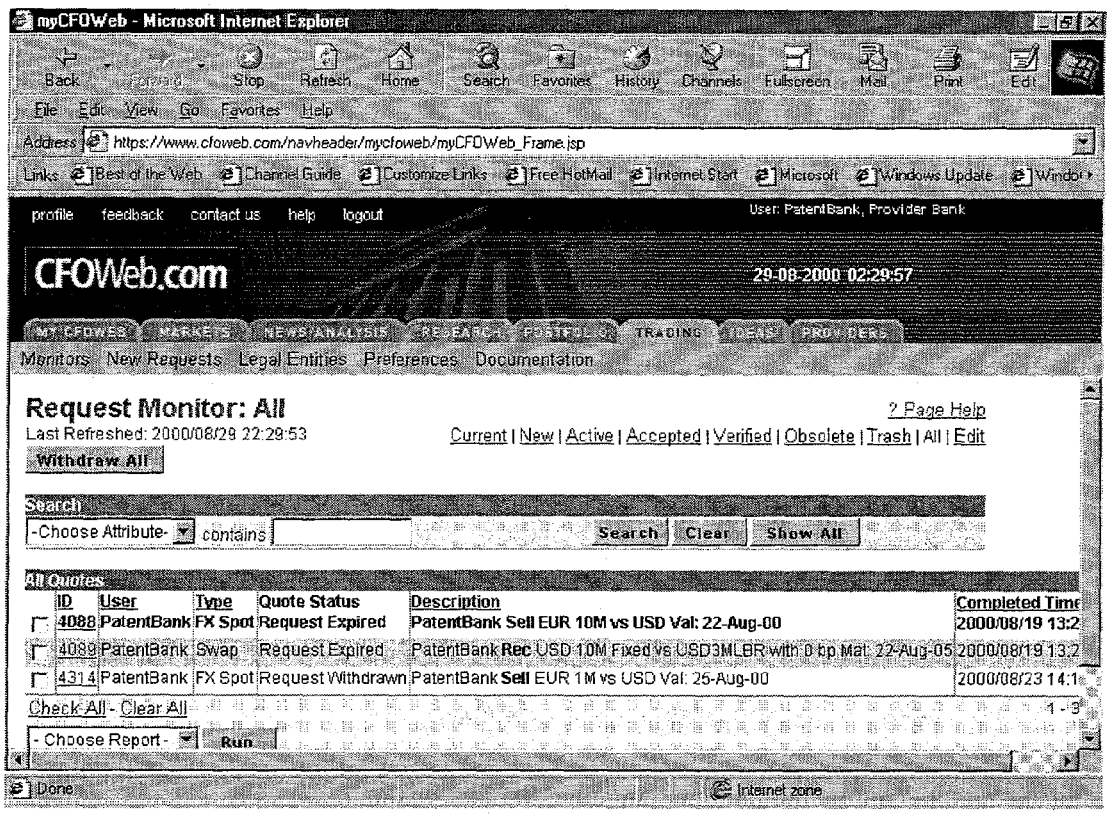
FIG. 93 shows a screen print of an interactive user interface for displaying the status and a summary of all of a Provider's price quotes created using the system in an embodiment of the present invention.

The "Request Monitor: All" interface, illustrated by FIG. 93, which can be accessed by clicking "All" button 8090 on the "Request Monitor: Current" interface (shown in FIG. 84), enables a Provider to view an aggregated summary of all of the Provider's price quotes requests, including active, accepted, verified, withdrawn, and expired requests. As shown in FIG. 93, the information displayed for each quote includes the following:

- unique (system-assigned) identification number
- transaction type (e.g., FX Spot)
- status (e.g., "Expired")
- description
- completion date and time/comments (i) Change Display Request Monitor The "Request Monitor: Change Display" interface, illustrated by FIG. 94, which can be accessed by clicking "Edit" button 8080 on the "Request Monitor: Current" interface (shown in FIG. 84), enables a Provider to customize the request monitor interfaces. Using pull-down menu 8250, the Provider can specify the number of most recently completed requests to be displayed in the "Request Monitor: Current" interface (shown in FIG. 84). By clicking radio button 8260, the Provider can specify whether the system will (i) electronically notify the Provider when there are changes to a request (e.g., expiration or modification) so that the Provider can manually refresh the monitor display or (ii) automatically refresh the monitor display when there are changes to a request (depending upon the user's web browser). By clicking the "countdown" indicator, the Provider can set whether the system will display a countdown meter showing time until expiration of a transaction request in the monitor display. For each type of transaction, the Provider can set the "Visible" indicator, which acts as a filter that determines whether the particular type of transaction will be displayed on the Provider's monitor. Finally, using the "Urgent Time to Expiry" field, the Provider can set a default time at which the time until expiration countdown meter will change colors (e.g., from green to red) to indicate urgency. By clicking the "Save" button, the Provider can save the pricing request preference settings.

iv. Provider Quote Creation

The present embodiment of the invention includes a price quote creation interface that enables a Provider to create a quote in response to each type of financial transaction request structured by a Member using the system. Upon selecting a particular transaction request, as described above, the Provider can review the details of the transaction request and input a price quote to be submitted to the Member.

For example, as shown in FIG. 84 described above, clicking on the identification number ("4314") for the FX Spot quote (identified as button 8030 in FIG. 84) will cause the system to display the "Request Detail: FX Spot" interface shown in FIG. 85. That interface shows the details of the FX Spot transaction request created by the Member and enables the Provider to input the foreign exchange quote rate (e.g., "0.920000" in field 8140), as well as the following quote details:

- Date/time quote expires or time remaining until quote expires.
- Legal Entity: the name of the Provider or the Provider's associated legal entity to which the transaction will be assigned.
- Legal Contact: the name of a contact within the Legal Entity.
- Comments regarding the quote, which may include standard text defined by the Provider (see "Standard Text" and "Standard Text Definition" interfaces described above and shown in FIGS. 101-102).

As another example, clicking on the identification number ("4089") for the Swap transaction request (identified as button 8040 on FIG. 84) will cause the system to display the "Request Detail: Fixed Float Interest Rate Swap" interface shown in FIGS. 86-86A. That interface shows the details of the Fixed-Float Interest Rate Swap transaction request created by the Member and enables the Provider to input the fixed quote rate (e.g., "5.950000%" in field 8160), as well as the quote details described above.

Using the "Request Detail" interfaces, the Provider can also create and submit "indicative" price quotes. Such quotes cannot be accepted by Members, but allow the Provider to send an indication of the market level for the transaction type, in order to encourage negotiation or a potential transaction between the Provider and Member. Indicative quotes may also be used where the Member does not yet have a credit relationship with the Provider. The Provider can identify an indicative price quote as such using the comments field of the quote.

v. Execution of Transaction

Using an embodiment of this invention, Members and Providers can engage in the online execution of financial transactions. An example of such a transaction—a Foreign Exchange Spot ("FX Spot") transaction—is described below with reference to the flowchart set forth in FIG. 2. Note that these steps could be executed using this invention for each of the different types of transactions described herein.

(a) Preliminary Steps

This example presupposes that the Member and Provider have executed the standardized agreements necessary for online trading using the system (step 300 in FIG. 2) and that they have negotiated a credit line to be assigned to the Member (step 310). As described above, these steps can be performed using the "Trading Documentation" interface shown in FIG. 83, which includes credit relationship functionality, as well as the various communication mechanisms provided by the system.

(b) Structuring of Transaction and Request

Figure 103:
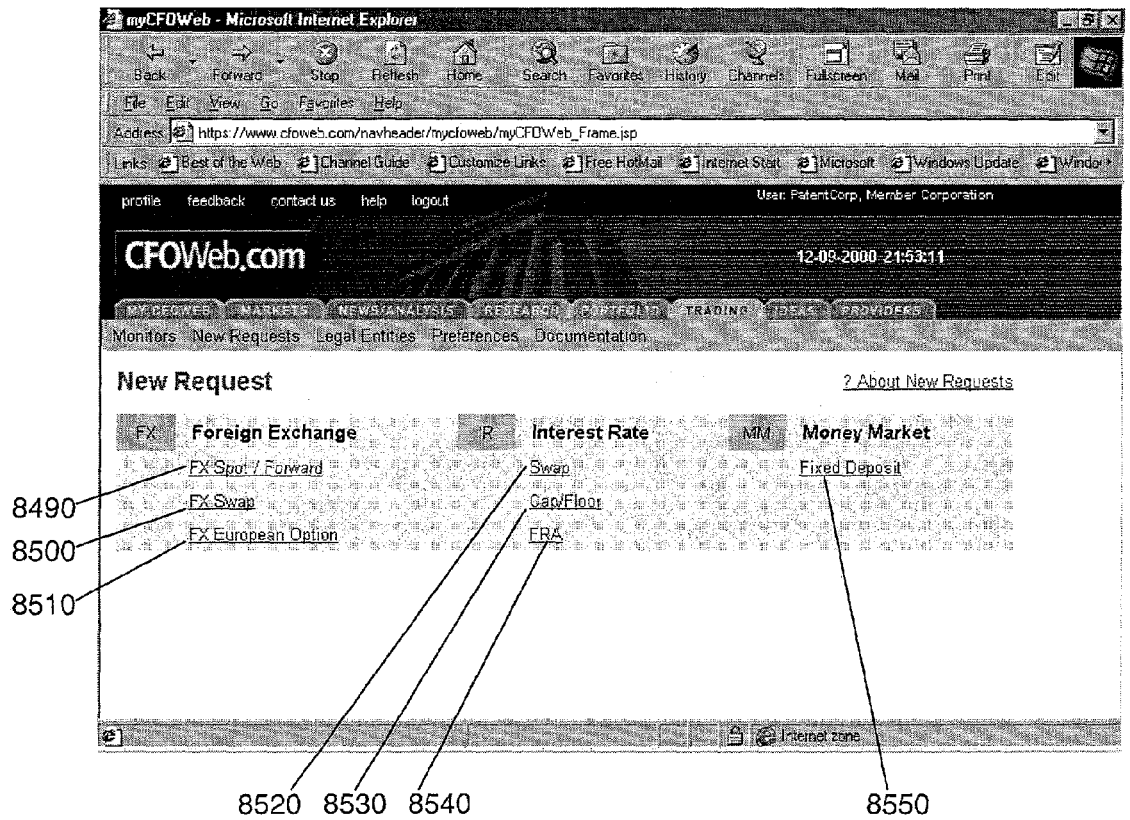
FIG. 103 shows a screen print of an interactive user interface for enabling a Member to select a transaction request type to be created using the system in an embodiment of the present invention.

The Member must first structure and create the desired transaction request (step 320 in FIG. 2). The "New Request" interface, shown in FIG. 103, is the starting point for that task, as it provides a road map to the various new request interfaces included in the present embodiment of the invention. In this example, the Member desires to create a FX Spot transaction, so the Member clicks on "FX Spot/Forward" button 8490, which causes the system to display the "New Request: FX" interface, shown in FIG. 104. On this interface, the Member inputs the following details regarding the desired FX Spot transaction:

- Trade Date is Sep. 13, 2000 (field 8590).
- Value Date (for Spot exchange) is Sep. 15, 2000 (field 8600) (note that date can be set by clicking "Set Date" button 8630).
- Member will buy (radio button 8570) 1,000,000 (field 8610) Euro (pull-down menu 8580) against U.S. Dollars (pull-down menu 8620).
- Member's "Legal Entity" for the transaction is "PatentCorp".

Figure 105:
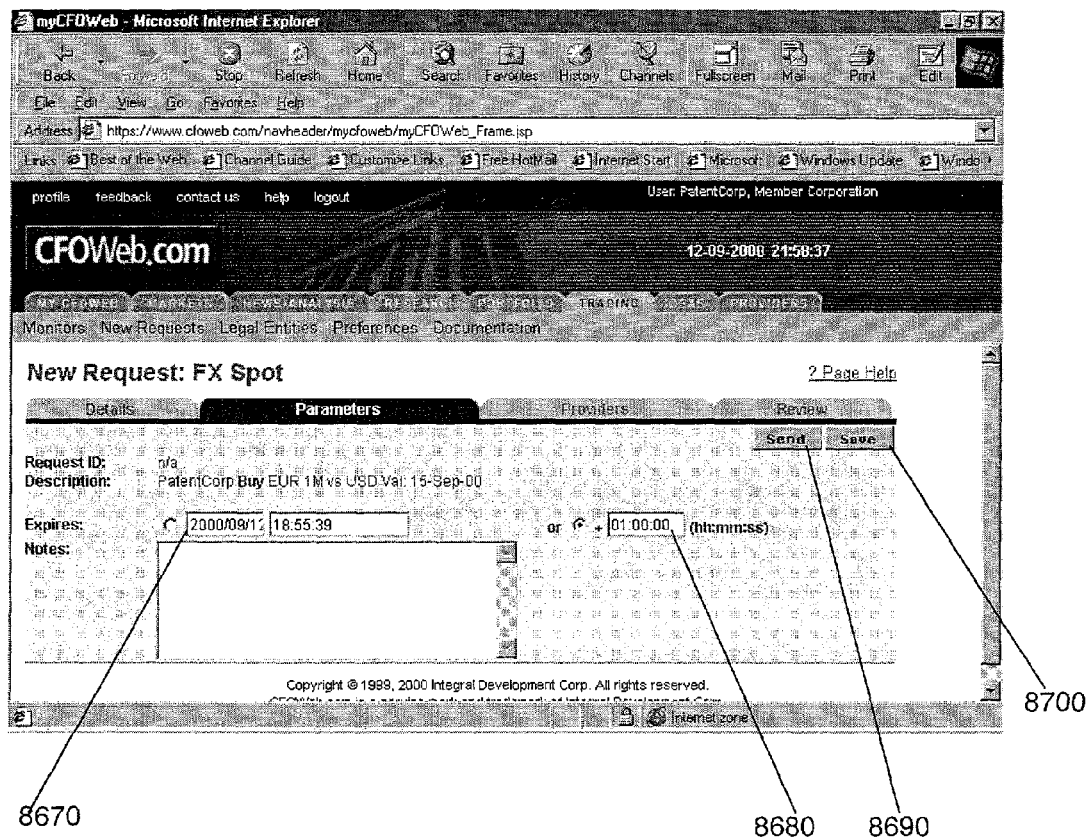
FIG. 105 shows a screen print of an interactive user interface for setting and displaying the parameters of a Member's FX Spot transaction request using the system in an embodiment of the present invention.

Clicking "Parameters" button 8560 will cause the system to display the "Parameters" interface for the FX Spot transaction, shown in FIG. 105. On this interface, the Member provides the parameters of the online transaction request, including (i) expiration date/time (field 8670) or (ii) time remaining until expiration (field 8680) and notes/comments regarding the request. Clicking "Save" button 8700 will cause the system to save the information regarding the transaction request. Clicking "Send" button 8690 will cause the transaction request details and parameters to be sent to Providers via the system.

Figure 104:
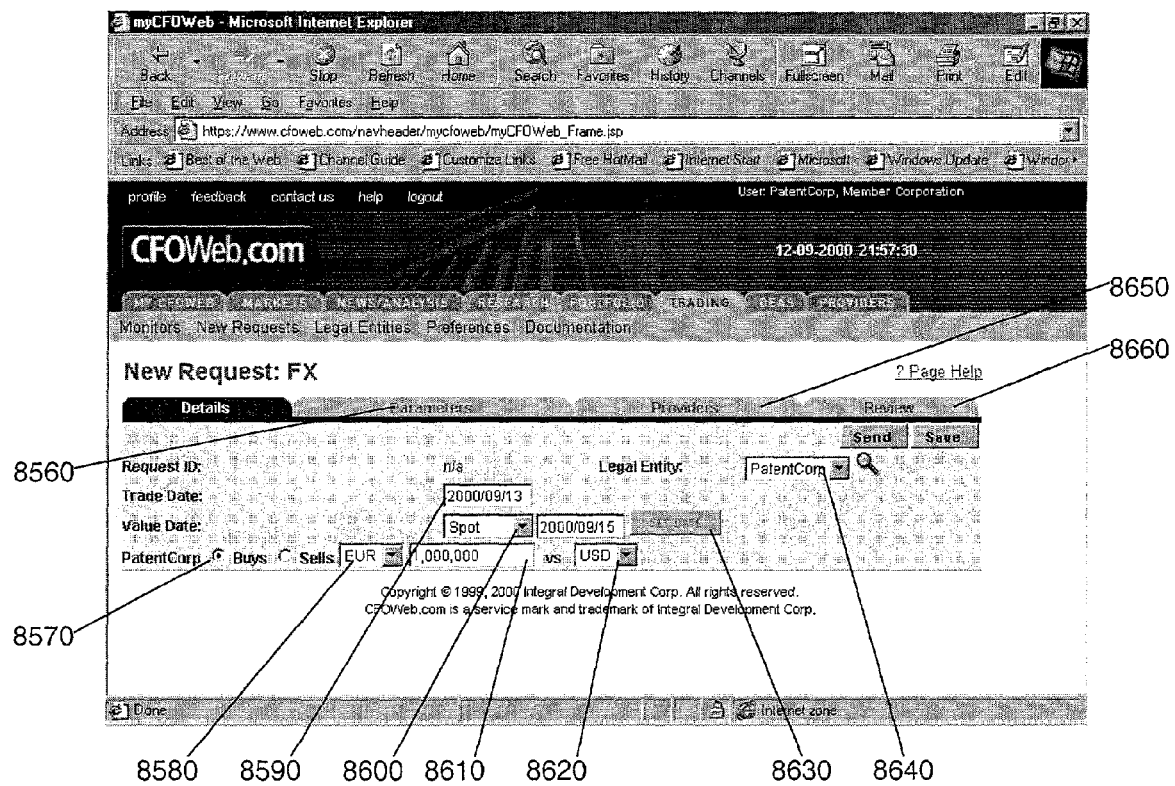
FIG. 104 shows a screen print of an interactive user interface for creating and displaying the details of a Member's Foreign Exchange ("FX") Spot transaction request using the system in an embodiment of the present invention.

Clicking "Providers" button 8650 in FIG. 104 will cause the system to display the "Providers" interface for the FX Spot transaction, shown in FIG. 106. On this interface, the Member can specify the Providers (e.g., "PatentBank") to whom the online transaction request is to be sent when the Member clicks the "Send" button.

Figure 108:
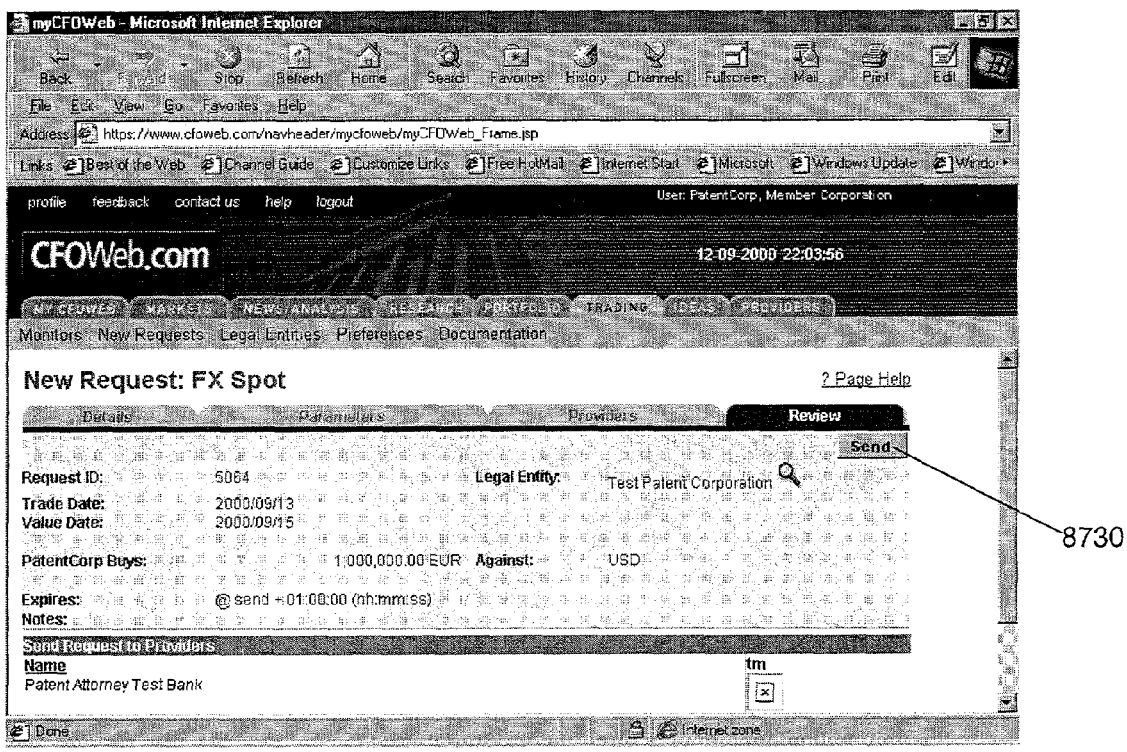
FIG. 108 shows a screen print of an interactive user interface for reviewing the details of a Member's FX Spot transaction request created using the system in an embodiment of the present invention.

Clicking "Review" button 8660 in FIG. 104 will cause the system to display the "Review" interface for the FX Spot transaction, shown in FIG. 108. On this interface, the Member can review the details and parameters of the transaction request before sending it to one or more Providers (by clicking "Send" button 8730). If, after review, the Member wishes to modify any of the transaction request details or parameters, the Member can return to the "New Request: FX" interface (FIG. 104) or "Parameters" interface (FIG. 105), as necessary.

Figure 107:
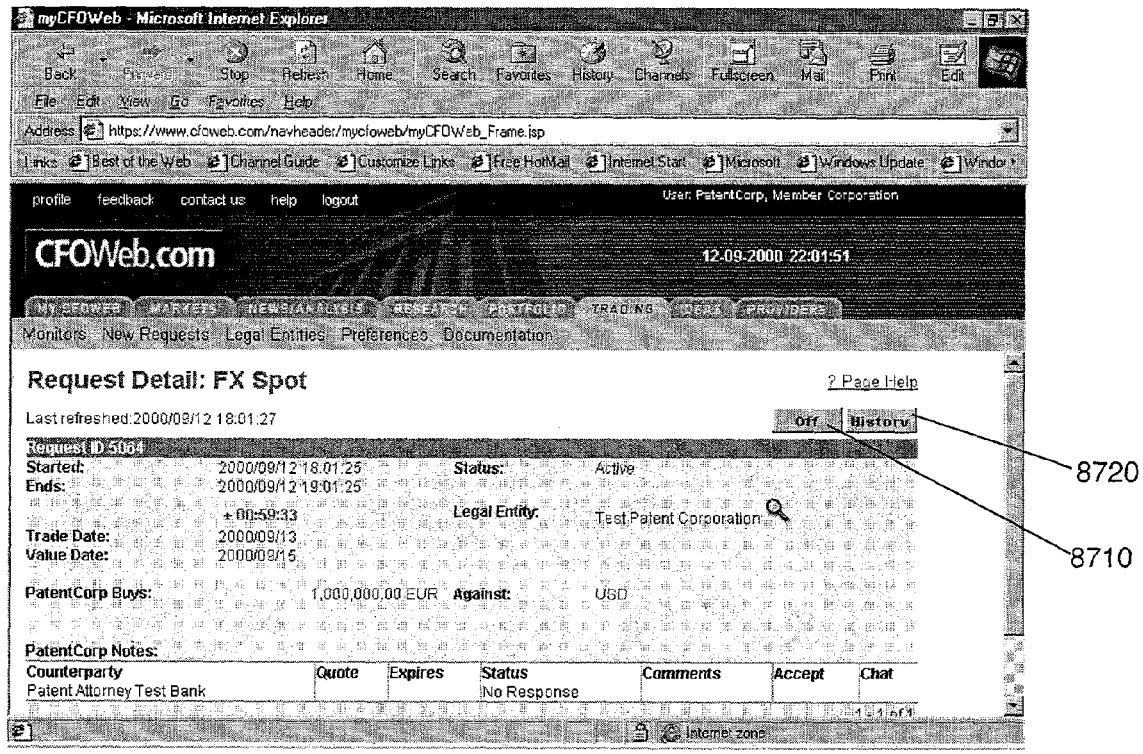
FIG. 107 shows a screen print of an interactive user interface for displaying the details and status of a Member's FX Spot transaction request created using the system in an embodiment of the present invention.

Upon submission of the transaction request to one or more Providers (step 330 in FIG. 2), the Member can review the transaction request and its status, including any price quote information, via the "Request Detail: FX Spot" interface, shown in FIG. 107 and described above.

(c) Monitoring and Review of Transaction Request

Figure 109A:
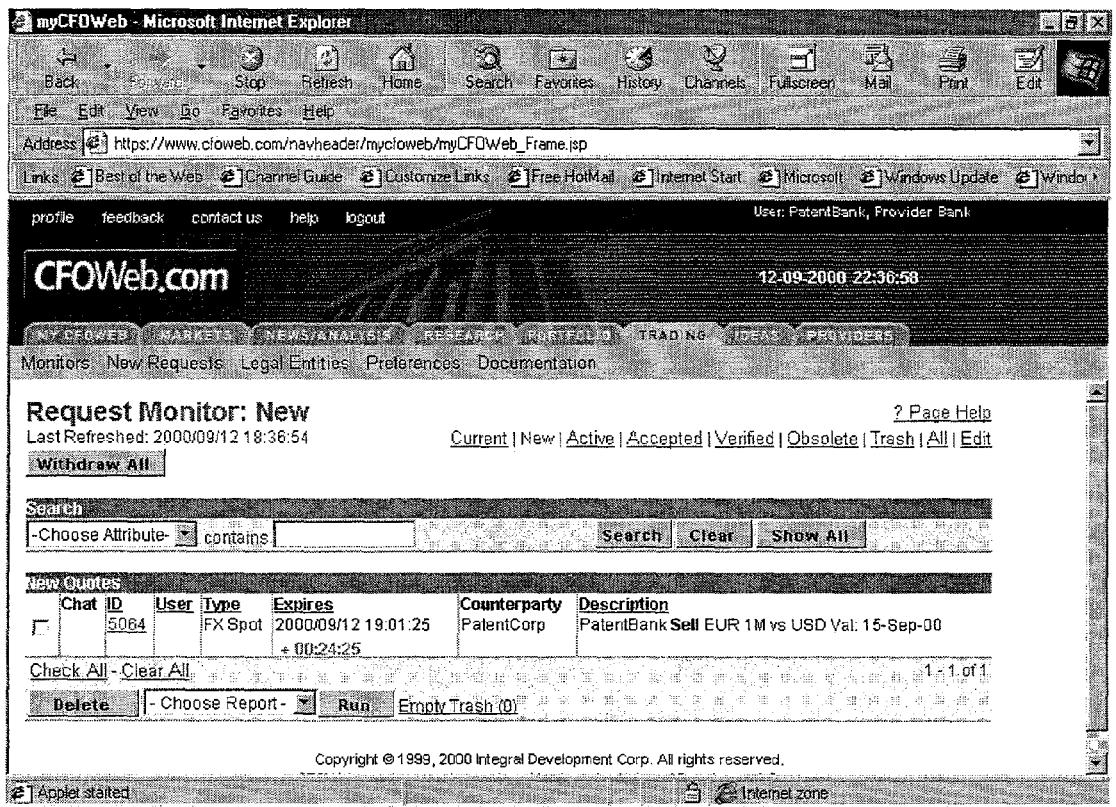
FIG. 109A shows a screen print of an interactive user interface for displaying the status and a summary of a Provider's active transaction requests and recently-completed price quotes created using the system in an embodiment of the present invention.
Figure 109B:
FIG. 109B shows a screen print of an interactive user interface for displaying to a Provider new transaction requests created using the system in an embodiment of the present invention.
Figure 109C:
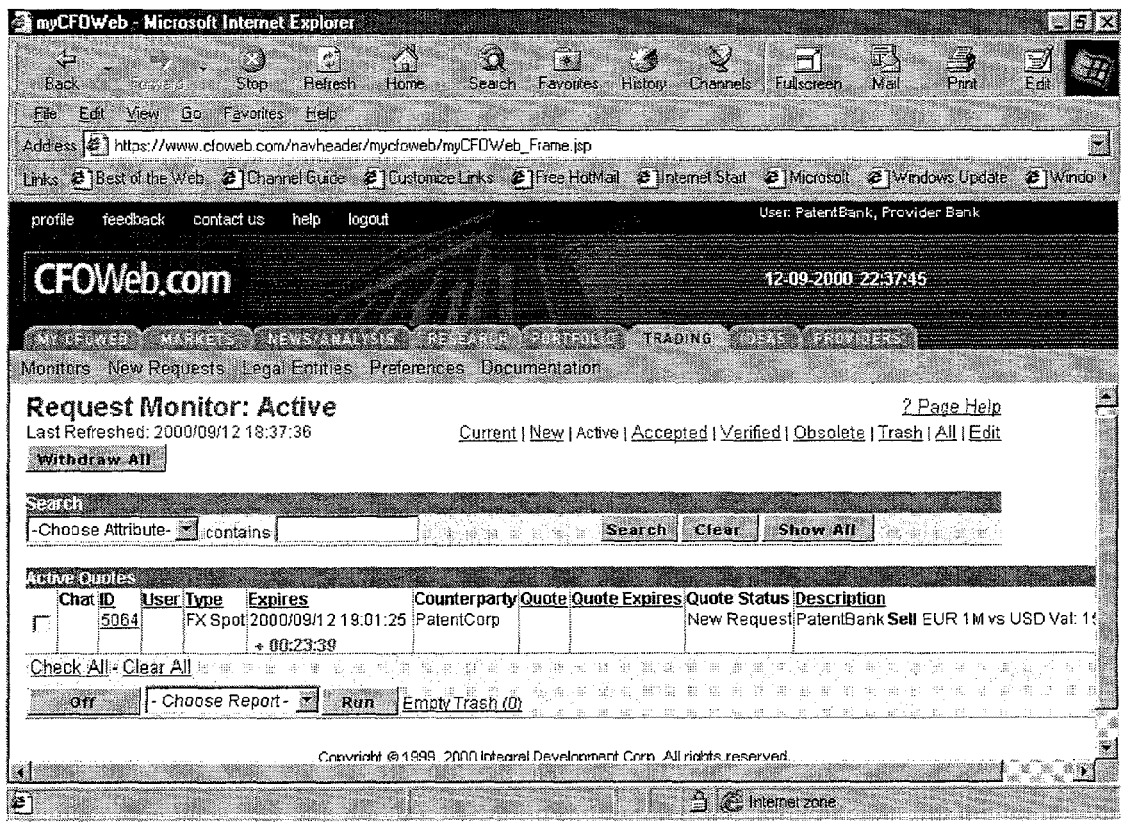

The next step in the execution of the trade is the receipt and review of the Member's transaction request by one or more Providers (step 340 in FIG. 2). Using the system, Providers monitor incoming transaction requests using the request monitor interfaces described above. In addition, if specified as a preference, a Provider can receive automatic notifications (e.g., e-mail messages) from the system upon receipt of a new transaction request. The "Request Monitor: Current" interface, shown in FIG. 109A and described above, displays the new transaction request. In the present example, the Member's FX Spot request is displayed with the system-assigned identification number "5064". Clicking on that identification number (button 8750) will cause the system to display the "Request Detail: FX Spot" interface, shown in FIG. 85 and described above, from which the Provider can create a responsive price quote. Alternatively, the Provider may choose to decline the transaction request, by clicking "Decline" button 8750 in FIG. 109A, which will trigger a system notification to the Member that the Provider declined the request. The new FX Spot transaction request will also be displayed on the Provider's (i) "Request Monitor: New" interface, shown in FIG. 109B and described above, and (ii)) "Request Monitor: Active" interface, shown in FIG. 109C and described above.

(d) Creation and Submission of Price Quote

Figure 109D:
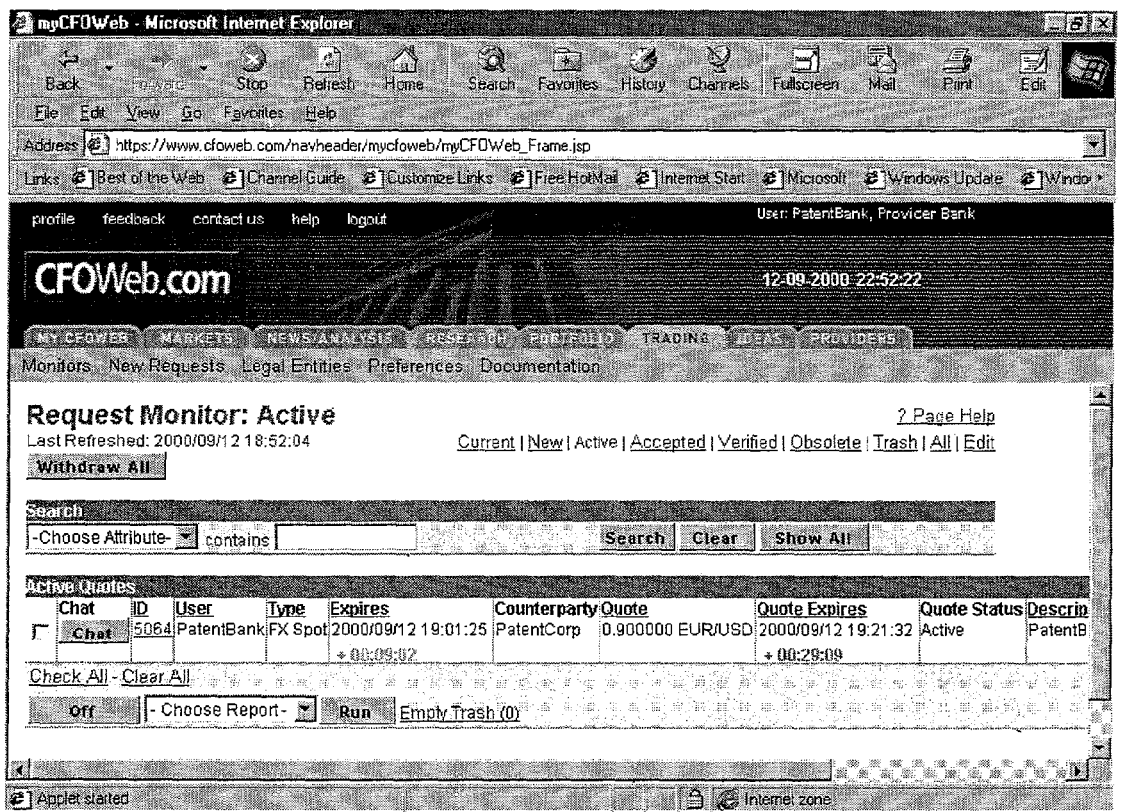

After receiving and reviewing the Member's transaction request, if desired, the Provider may create and submit a responsive price quote (step 350 in FIG. 2) using the "Request Detail: FX Spot" interface, shown in FIG. 85 and describe above. Using this interface, the Provider inputs the foreign exchange quote rate ("0.920000" in field 8140) to be offered to the Member. This step may go through multiple iterations during negotiations between the Provider and the Member, with such negotiations occurring via the communication mechanisms provided by the system (chat, e-mail, instant messaging) or traditional means such as telephone. After submitting its quote, the Provider can monitor the status of the quote using the "Request Monitor: Active" interface, shown in FIG. 109D and described above. The Provider may withdraw the quote at any time while the quote is "Active".

(e) Monitoring and Review of Price Quotes

Figure 110A:
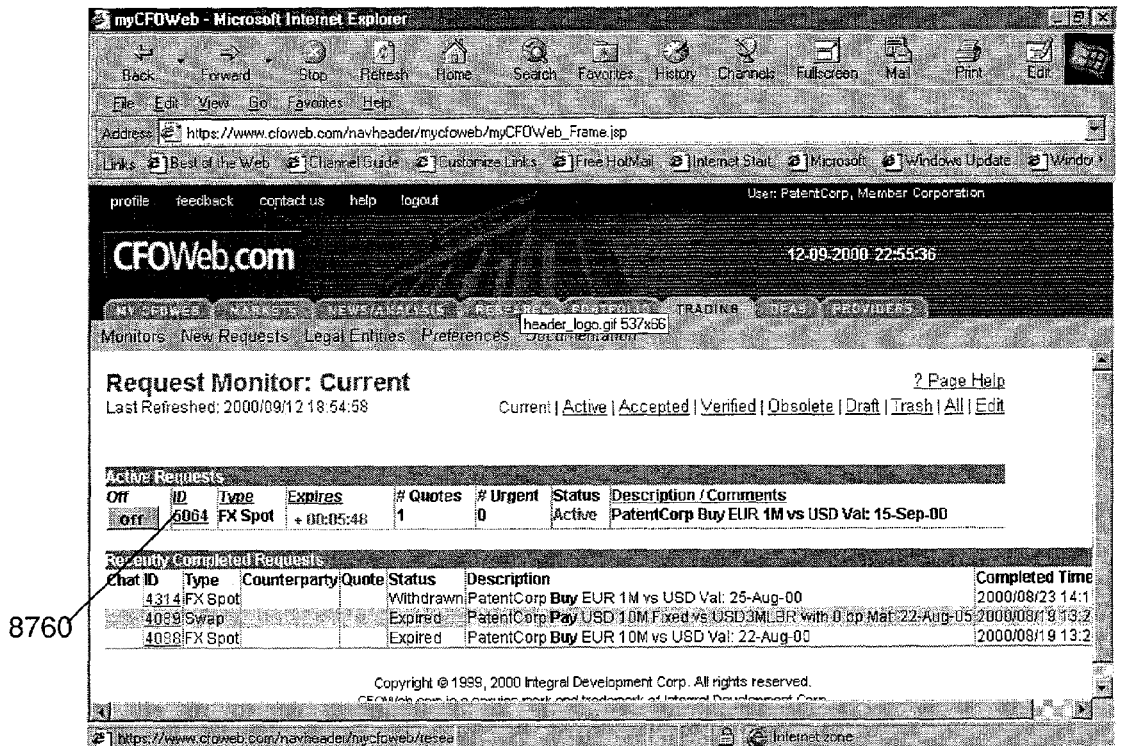

The next step in the execution of the trade is the receipt and review of price quotes from one or more Providers by the Member (step 360 in FIG. 2). Using the system, Members monitor incoming quotes using the request monitor interfaces described above. In addition, if specified as a preference, a Member can receive automatic notifications (e.g., e-mail messages) from the system upon receipt of a new transaction request. The "Request Monitor: Current" interface, shown in FIG. 110A and described above, displays the new quote. In the present example, the Member's FX Spot request and the Provider's quote is displayed with the system-assigned identification number "5064". The display indicates that the member has received one quote in response to its transaction request. Clicking on the request identification number (button 8760) will cause the system to display the "Request Detail: FX Spot" interface, shown in FIG. 110B and described above. This interface displays the details of the Member's request as well as the details of the Provider's quote.

(f) Selection and Acceptance of Price Quote

After receiving and reviewing the price quote(s) from one or more Providers, unless the Member withdraws its request (as described above), the Member will select the price quote(s) of one or more Providers and likely negotiate with the Provider(s) to obtain a more favorable quote (step 370 in FIG. 2). Such negotiations may occur via the communication mechanisms provided by the system (chat, e-mail, instant messaging) or traditional means such as telephone. For example, the Member could click on "Chat" button 8780 shown in FIG. 110B to engage in negotiations with the Provider regarding the price quote for that FX Spot transaction. Following such negotiations, the Member will accept the quote from one of the Providers (step 380 in FIG. 2). The Member can automatically perform this step by clicking "Accept" button 8770 shown in FIG. 110B. This will cause the system to display the "Acceptance: FX Spot" interface shown in FIG. 110C. This interface displays the details of the accepted quote and transaction, including terms and counterparty information.

Figure 110B:
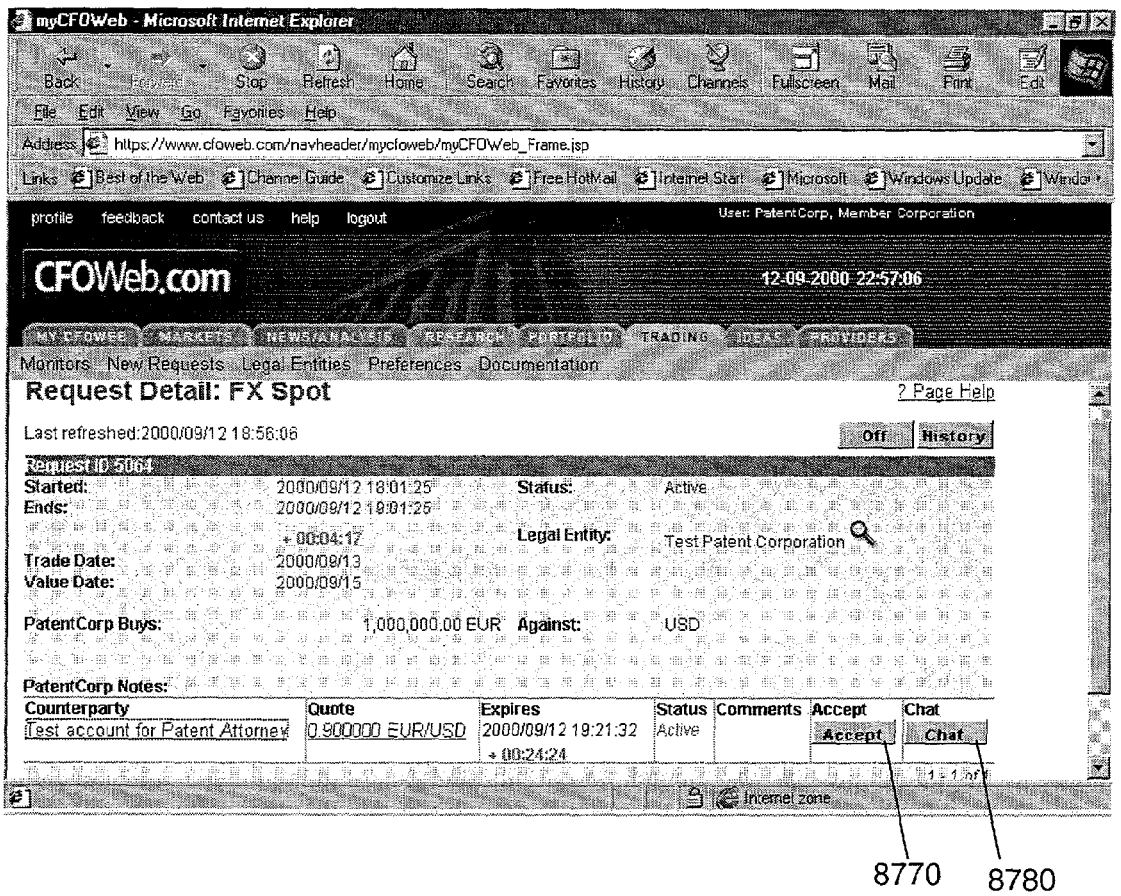
Figure 110C:
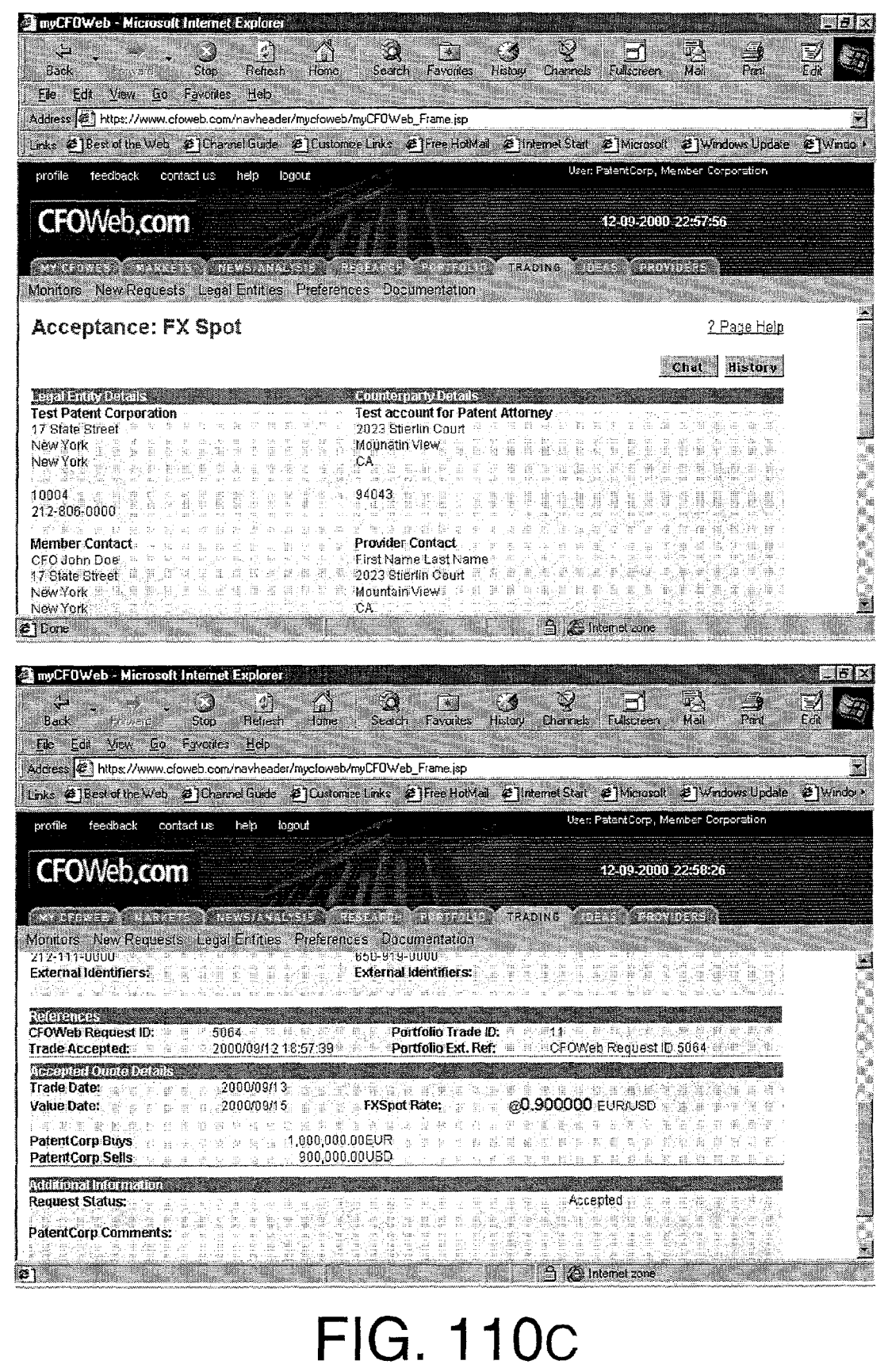
Figure 110D:
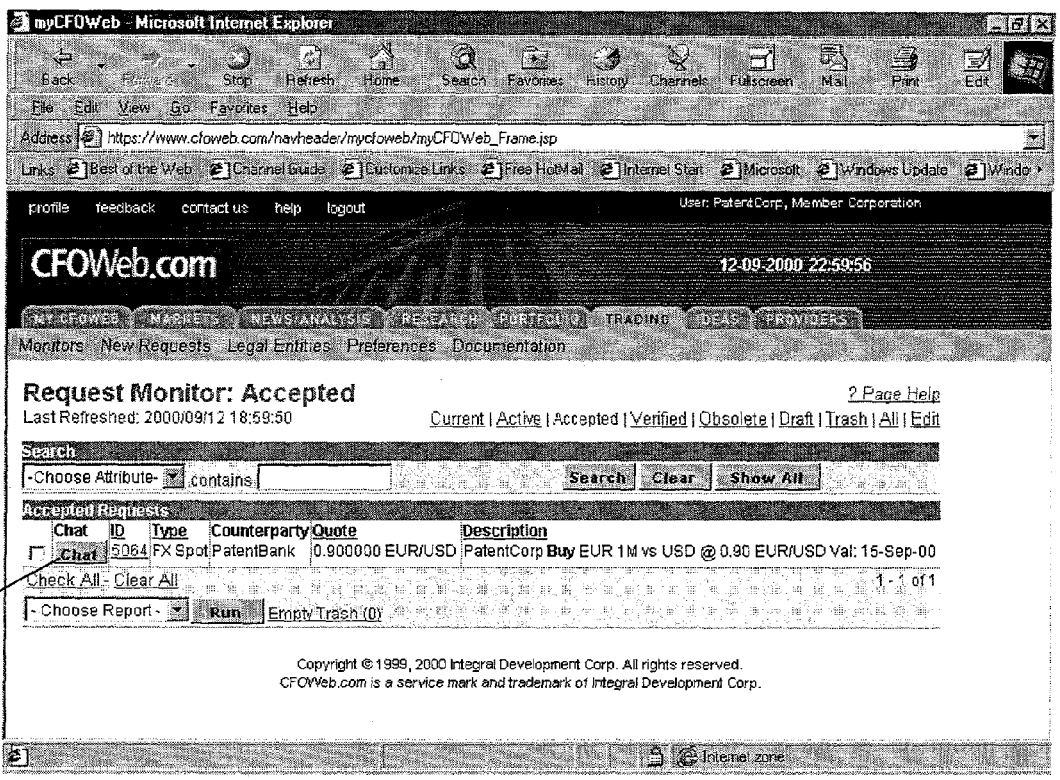

The Member's action of clicking "Accept" button 8770 shown in FIG. 110B will also update the respective request monitors of the Member and the Provider. The Member's "Request Monitor: Accepted", shown in FIG. 110D and described above, displays the aggregated details of the Member's accepted transaction requests, including the FX Spot transaction ("5064") of the present example.

(g) Verification of Accepted Transaction

Figure 111A:
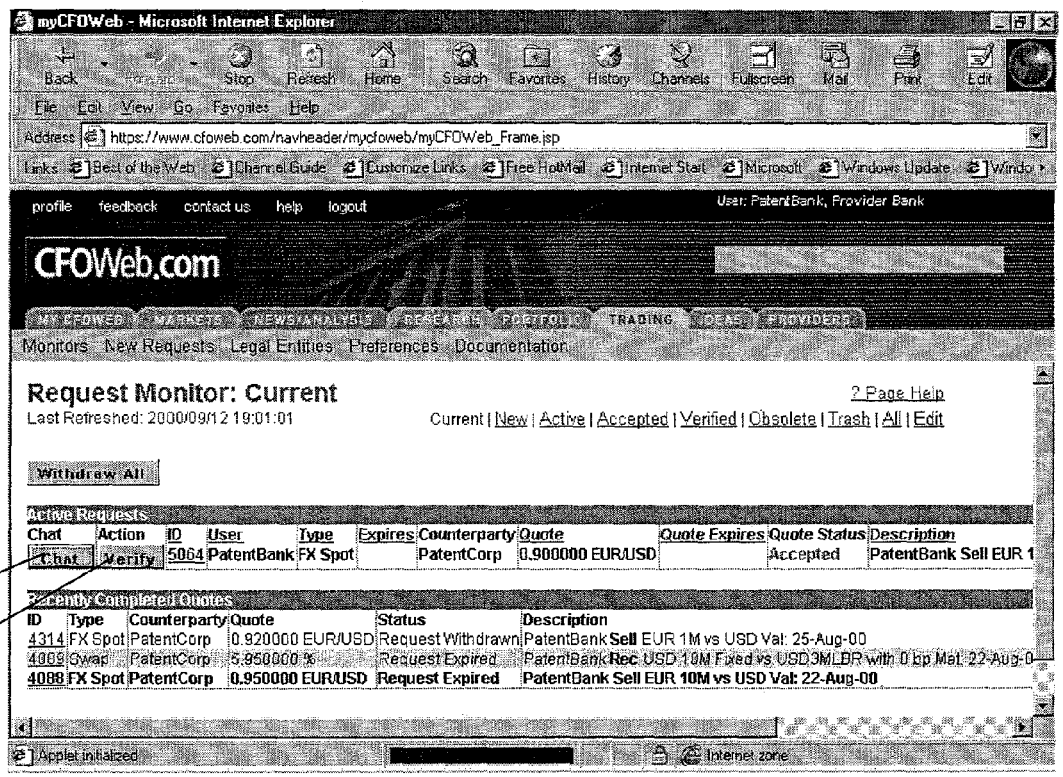
Figure 111B:
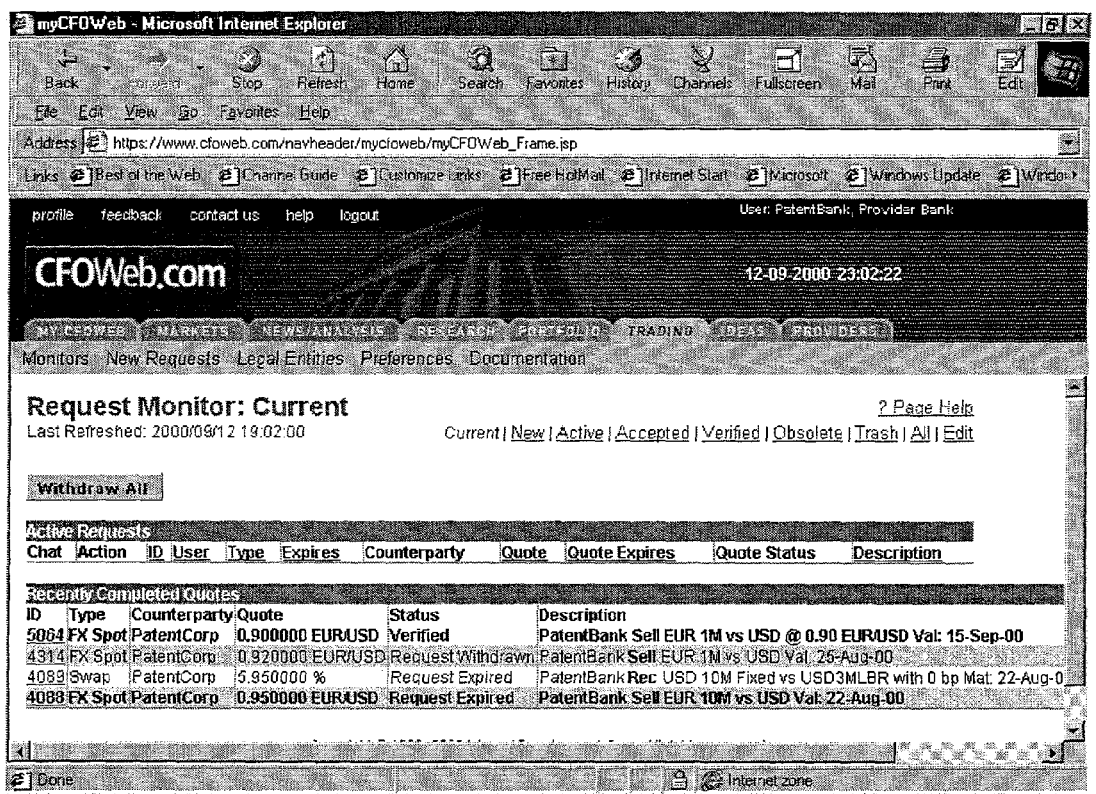
Figure 111C:
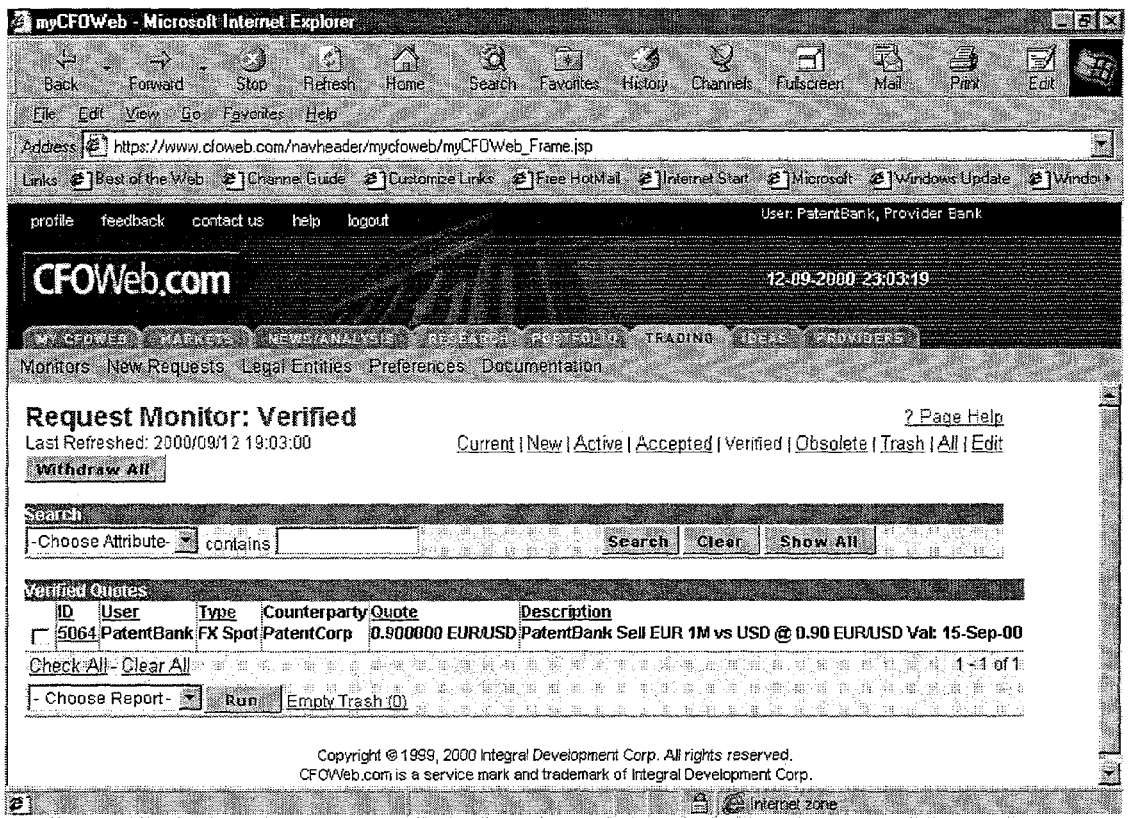

The Provider's "Request Monitor: Current" interface, shown in FIG. 111A and described above, will display the aggregated details of the Provider's active price quotes accepted by Members, including the FX Spot transaction ("5064") of the present example. In addition, if specified as a preference, a Provider can receive automatic notifications (e.g., e-mail messages) from the system upon receipt of acceptance of a quote by a Member. At this stage, and using this interface, the Provider could attempt to further communicate or negotiate with the Member (e.g., by initiating a chat session by clicking "Chat" button 8800) or verify (i.e., confirm) the Member's acceptance of the Provider's quote. This verification step (step 390 in FIG. 2) can be performed by clicking "Verify" button 8810 shown in FIG. 111A. Upon verification, the system will re-categorize the transaction from an Active" request to a "Recently Completed" quote, as shown in FIG. 111B. In this example, the FX Spot transaction ("5064") is shown with a status of "Verified". The transaction will also be displayed on the Provider's "Request Monitor: Verified" interface, shown in FIG. 111C and described above. In addition, this verification will be displayed on (i) the Member's "Request Monitor: Verified" interface, shown in FIG. 72 and described above, and (ii) the "Request Monitor: Current" of other Providers, on which the transaction request will be displayed with a status of "Dealt Away".

(h) Settlement and Back-End Processing

Following acceptance and verification of the transaction and quote, the Member and Provider can use the system of this invention to automatically update their proprietary back-end systems regarding the transaction (step 400 in FIG. 2), as described above, and to communicate with each other regarding settlement and payment (step 410 in FIG. 2). The system also enables the Member and Provider to continue to track and manage the transaction, including cashflows and fees, as will be described below.

2. Non-Transaction-Specific Functionality

In addition to providing system users (i.e., Members and Providers) with the ability to engage in online financial transactions, the present embodiment of this invention also provides a wealth of other interactive functionality to users, as described below.

a. System Personalization

The present embodiment of the invention includes a series of interfaces that enable Members and Providers to personalize and customize the system, in order to increase user efficiency and ease of use and enhance the user's experience executing online financial transactions using the system.

i. Content

Figure 26:
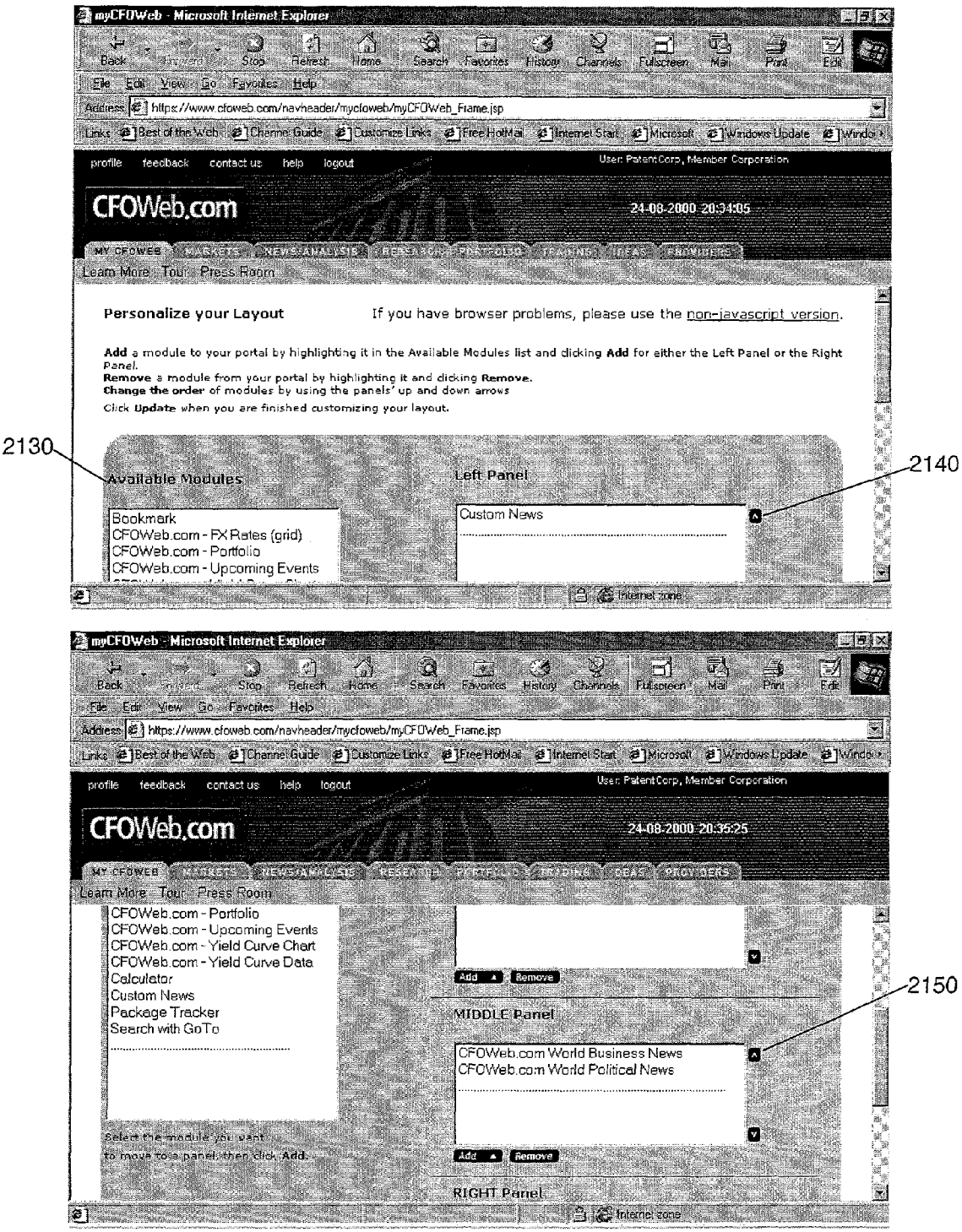
FIGS. 26-26A show a screen print of an interactive user interface for customizing the layout of the user's home page in an embodiment of the present invention.
Figure 26A:
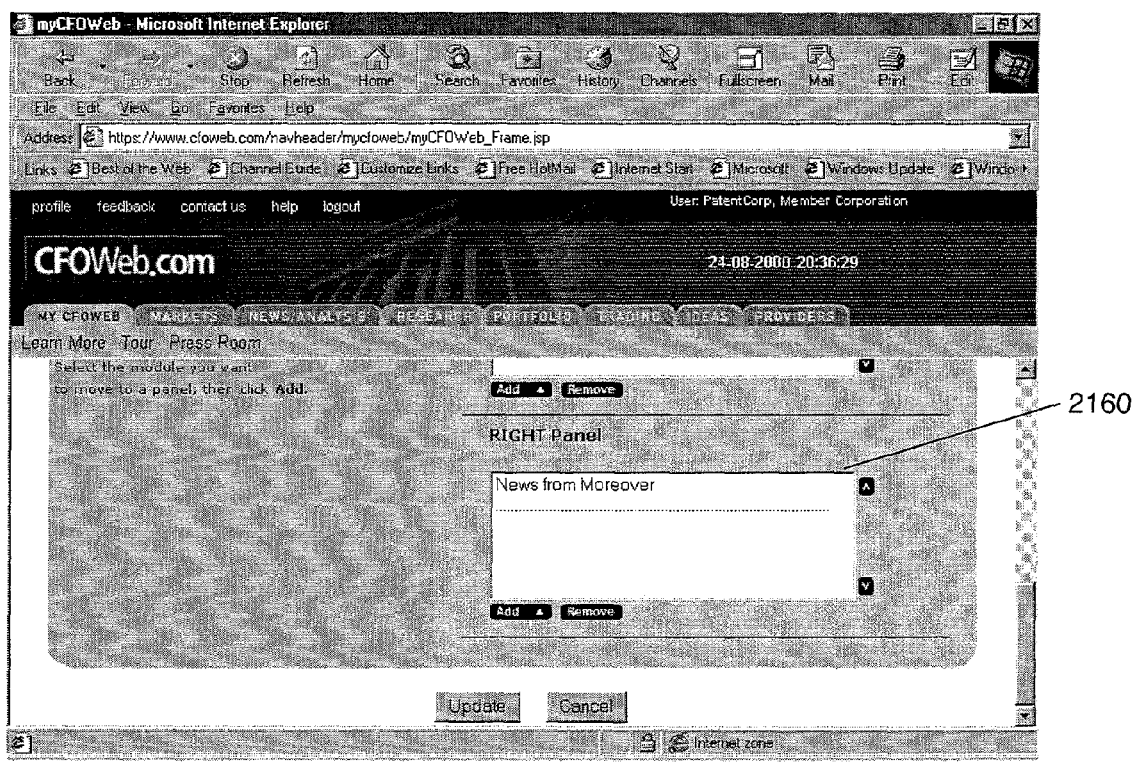

Users can personalize the news content provided by the system as shown, for example, on the "My CFOWeb" interface illustrated by FIG. 25. By using the personalization interface shown in FIGS. 26-26A, a user can select one or more news content modules, tools, summaries, and charts from "Available Modules" pull-down menu 2130, and specify the on-screen location of such content using the "Left Panel" 2140, "Middle Panel" 2150, and "Right Panel" 2160 fields, in conjunction with the "Add"/"Remove" buttons. Clicking the "Update" button shown in FIG. 26A will cause the system to save the user's selections.

ii. Profile

Figure 81:
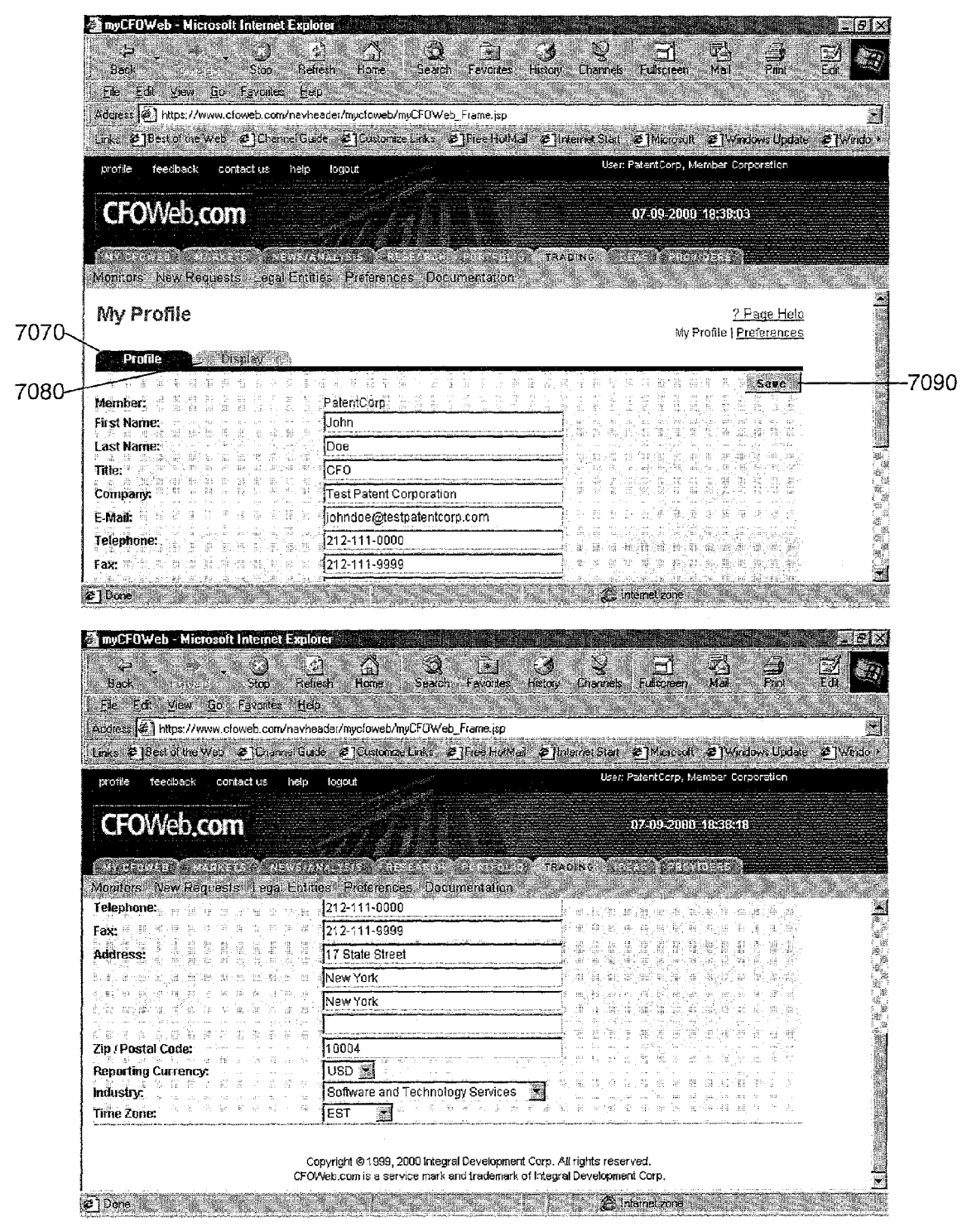

In addition to the "filtering" feature described above, the system provides interfaces that enable users to set their system profiles. Members can specify their identifying and contact information on the Member "My Profile" interface shown in FIG. 81. Using pull-down menus, the Member can indicate default reporting currency, industry, and time zone. Clicking "Save" button 7090 will cause the system to save such profile information.

Figure 95:
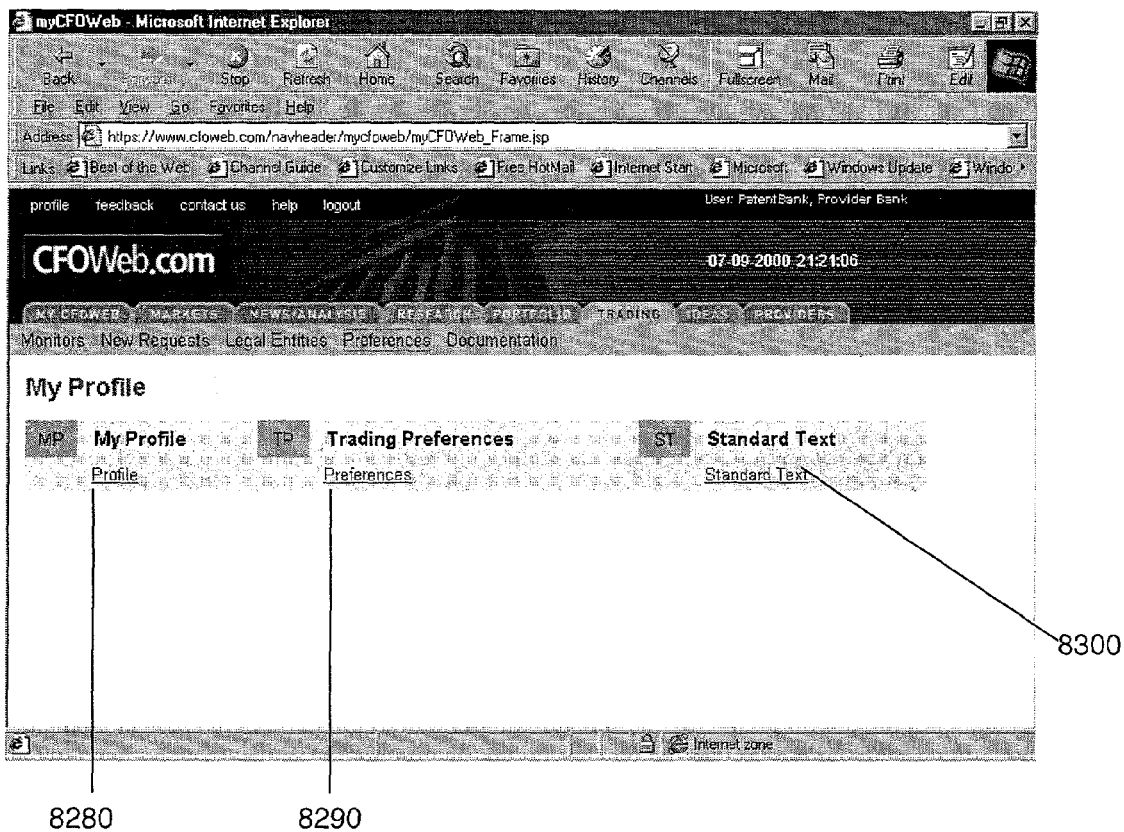
FIG. 95 shows a screen print of an interactive user interface for enabling a Provider to access customizing functionality in an embodiment of the present invention.
Figure 96:
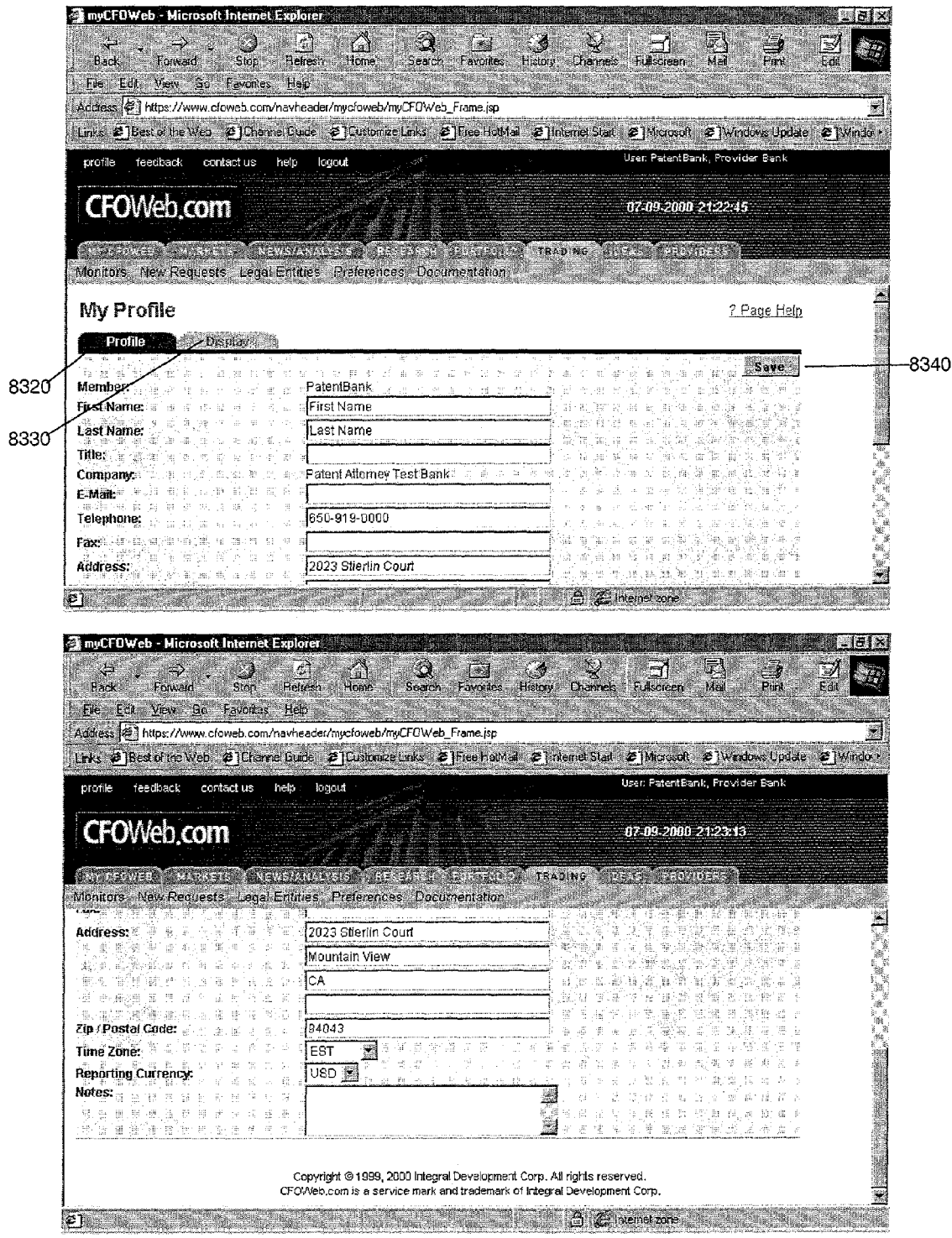
FIG. 96 shows a screen print of an interactive user interface for creating and updating a Provider's profile in an embodiment of the present invention.

Similarly, Providers can specify their identifying and contact information on the Provider "My Profile" interface shown in FIG. 96 (which can be reached by clicking "Profile" button 8280 on the "My Profile" menu illustrated by FIG. 95). Using pull-down menus, the Provider can indicate default reporting currency, industry, and time zone. Clicking "Save" button 8340 will cause the system to save such profile information.

b. Portfolio Management

Figure 44:
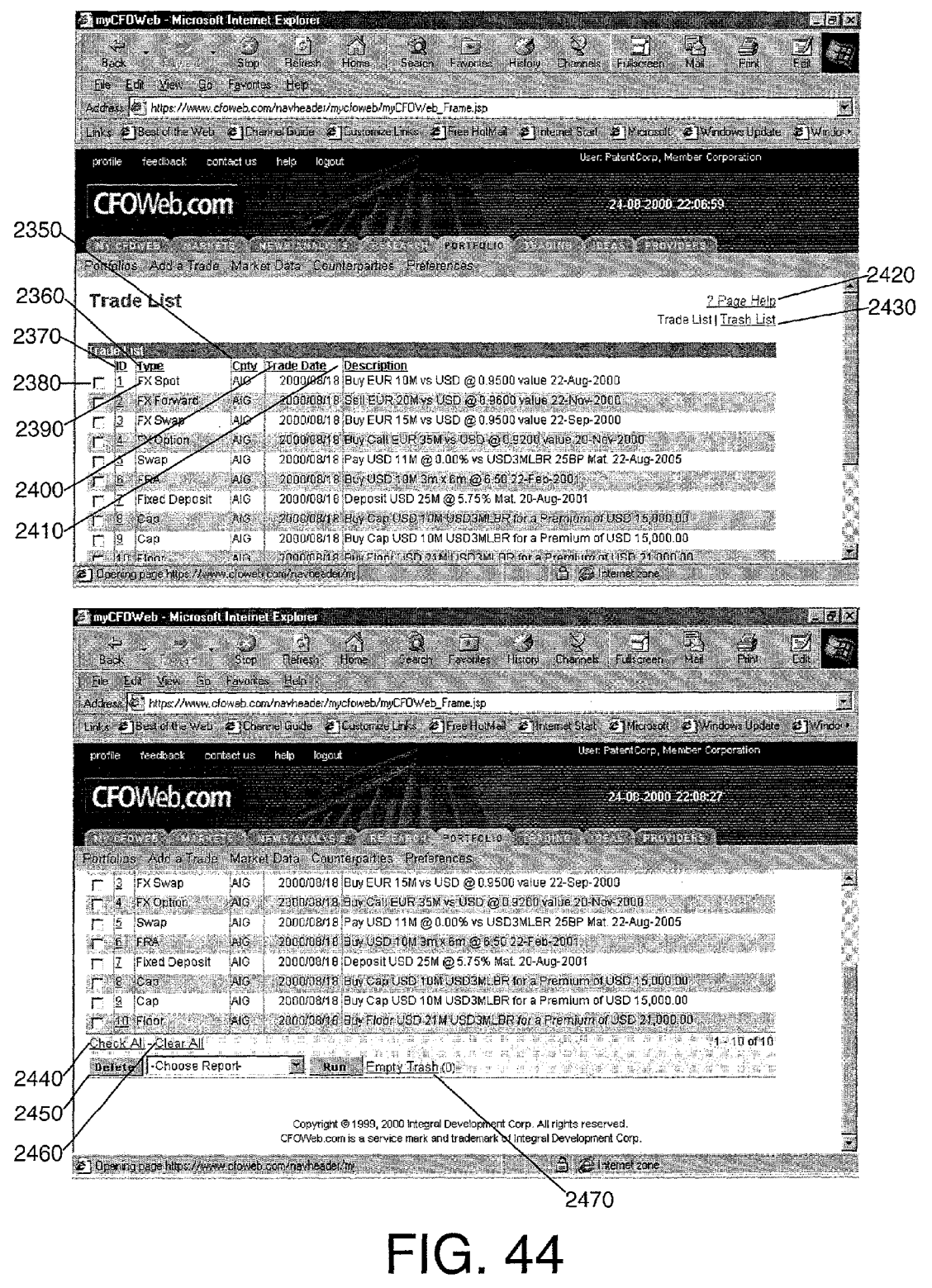
Figure 44A:
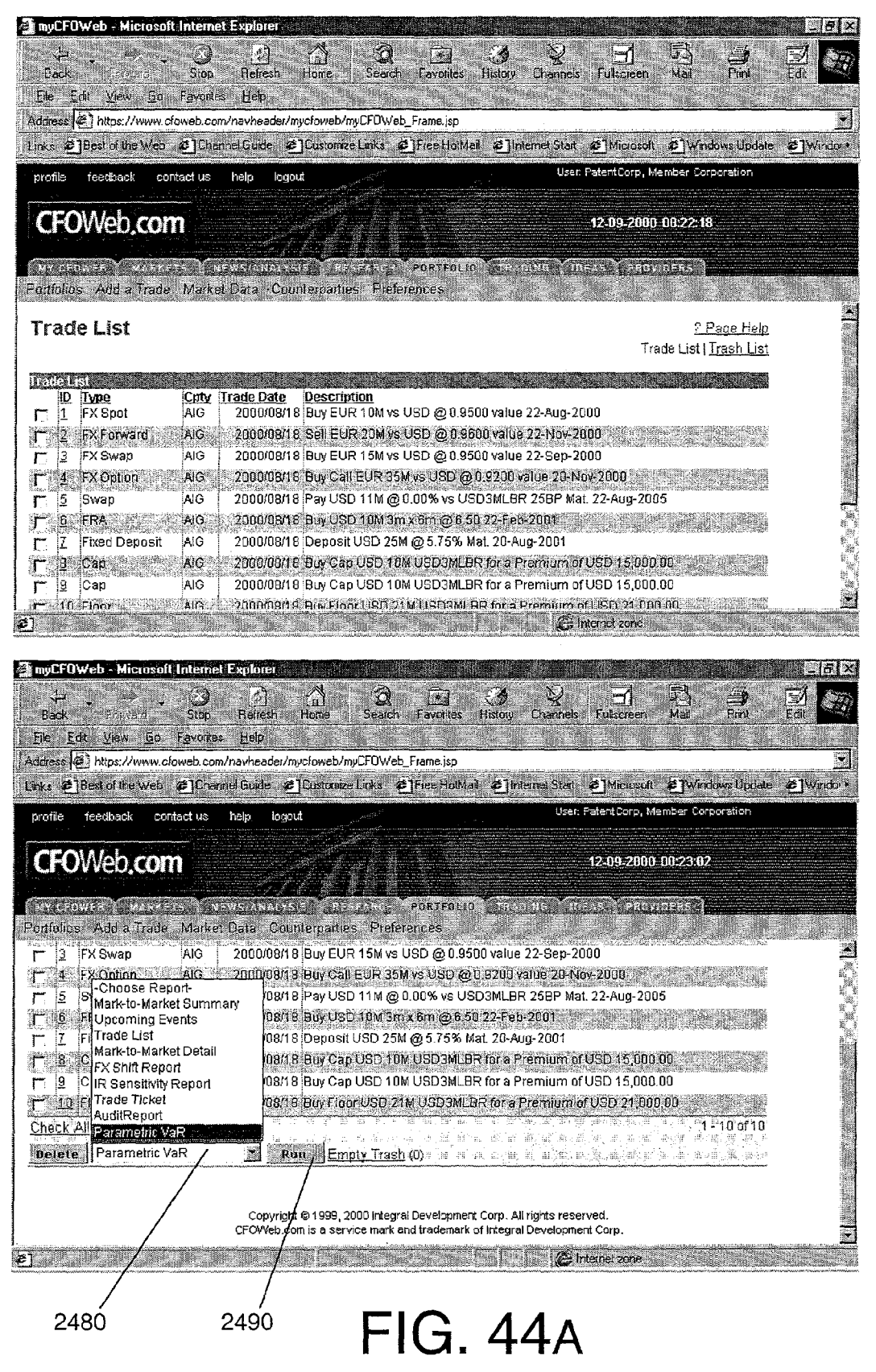

The present embodiment of the invention includes a series of interfaces that enable Members to manage their portfolios of completed transactions. The "Trade List" interface, shown in FIGS. 44-44A, provides an aggregated summary of each of the Member's completed transactions, including the following information for each transaction:

unique (system-assigned) identification number 2370
transaction type 2360 (e.g., "FX Spot")
counterparty 2350
trade date 2400
description 2410

The listing can be ordered by any of the above-listed categories of information, by clicking on the respective column header. Transaction listings can be deleted by clicking the select indicator adjacent to a listing (or clicking "Check All" button 2440 to select all) and clicking "Delete" button 2450. Clicking "Run" button 2490 (shown in FIG. 44A) will cause the system to run a report that can be selected from pull-down menu 2480 (shown in FIG. 44A) regarding the displayed portfolio of transactions. Such reports may include mark-to-market summary or detail, upcoming events (e.g., payments due, rate resets), foreign exchange shift report, interest rate sensitivity report, trade ticket, or audit report.

Clicking on any of the individual transactions listed in the summary will cause the system to display a detail summary of that particular transaction. In addition, the system generates and displays cashflow, fee, and additional information displays regarding each type of transaction. For example, clicking on the identification number ("1") 2390 (shown in FIG. 44) for the "FX Spot" transaction will cause the system to display the "FX Spot Details" interface shown in FIG. 45. The detail interfaces for each type of transaction will be described below. In describing these interfaces, features and/or interfaces that are common to more than one type of transaction will only be described once.

i. FX Spot

Figure 45:
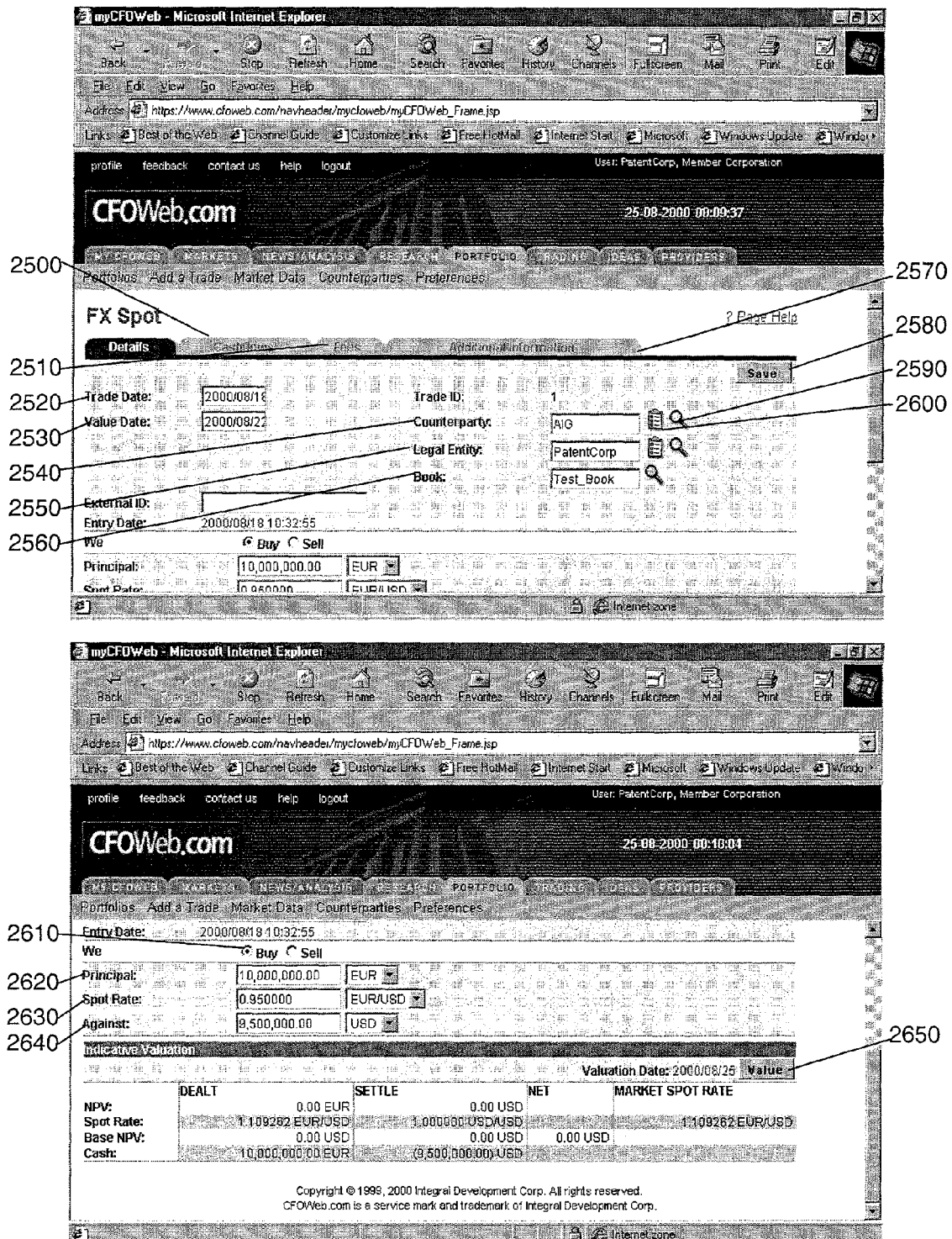
FIG. 45 shows a screen print of an interactive user interface for displaying the details of a Member's Foreign Exchange ("FX") Spot transaction created using the system in an embodiment of the present invention.

The "FX Spot Details" interface, illustrated by FIG. 45, displays the details of a particular FX Spot transaction in the Member's transaction portfolio, including the following:

Trade Date 2520: the date on which the currency trade has been agreed to by the parties.
Value Date 2530: the date on which the traded currencies will be exchanged.
Radio button 2610 showing whether Member bought or sold currency.
Principal 2620: the specified amount of currency to be converted into the currency being acquired.
Spot Rate 2630: the foreign exchange rate at which the trade was executed.
Against 2640: the specified amount of currency purchased.
Trade ID: unique (system assigned) identification number.
Counterparty name 2540. By clicking profile button 2590, the Member can view the counterparty's profile information.
Legal Entity 2550: the name of the Member or the Member's associated legal entity to which the transaction will be assigned.
Book 2560: the trading book in which the Member includes the transaction.

The interface also displays indicative valuation information (e.g., net present value) regarding the transaction, which is the value of the transaction against the latest market data. The valuation can be calculated for the particular date of display by clicking "Value" button 2650.

Figure 45A:
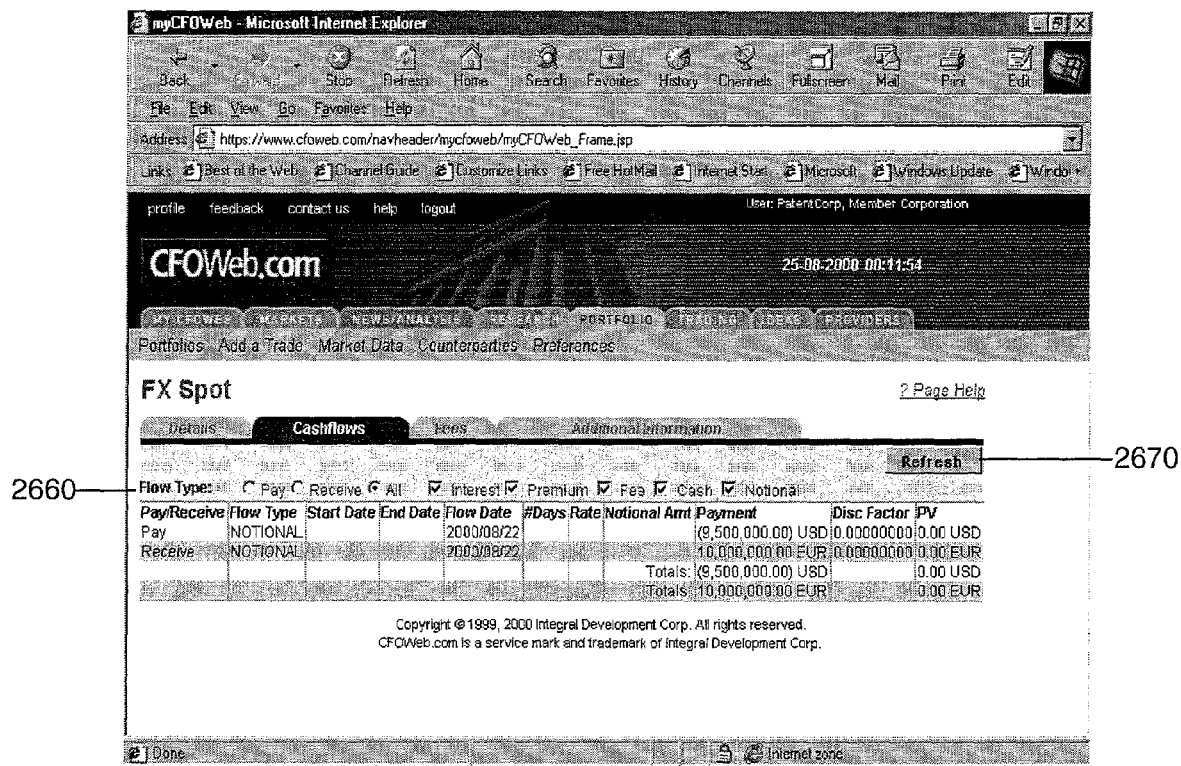
FIG. 45A shows a screen print of an interactive user interface for displaying the cashflows associated with a Member's FX Spot transaction created using the system in an embodiment of the present invention.

Clicking "Cashflows" button 2500 will cause the system to display the "Cashflows" interface, illustrated by FIG. 45A, which shows future cashflow information—payments in or out—regarding the particular transaction. This information can be refreshed by clicking "Refresh" button 2670.

Figure 46:
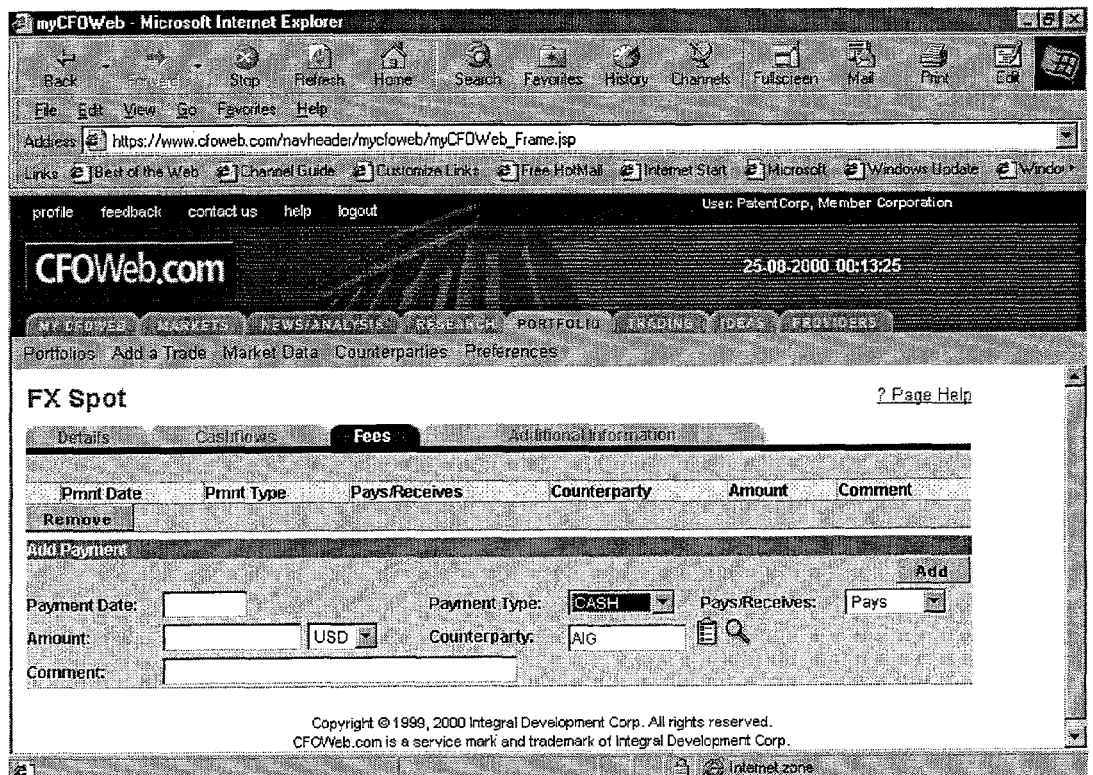
FIG. 46 shows a screen print of an interactive user interface for displaying the fees associated with a Member's FX Spot transaction created using the system in an embodiment of the present invention.

Clicking "Fees" button 2510 (in FIG. 45) will cause the system to display the "Fees" interface, illustrated by FIG. 46, which shows fees associated with the particular transaction. This interface also enables the Member to add (by inputting the information requested in the displayed fields and clicking the "Add" button) or delete (by clicking the "Delete" button) payments associated with the transaction.

Figure 47:
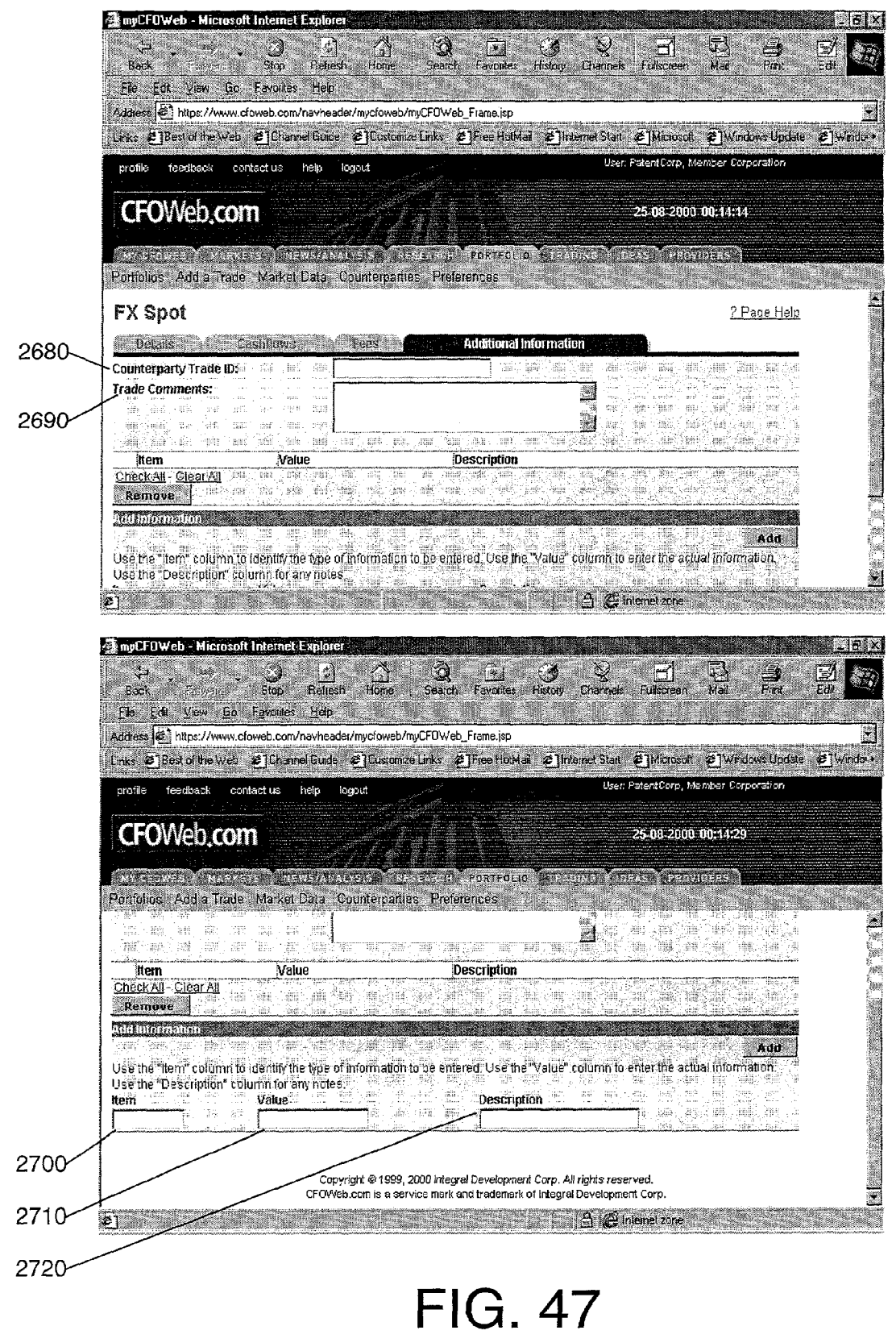

Clicking "Additional Information" button 2570 (in FIG. 45) will cause the system to display the "Additional Information" interface, illustrated by FIG. 47, which shows user-input comments or other information regarding the particular transaction. This interface also enables the Member to add (by inputting the information and clicking the "Add" button) or delete (by clicking the "Delete" button) additional information. If adding information, the Member must input item type 2700, value 2710 (i.e., information), and description 2720 for each item added.

ii. FX Forward

Figure 48:
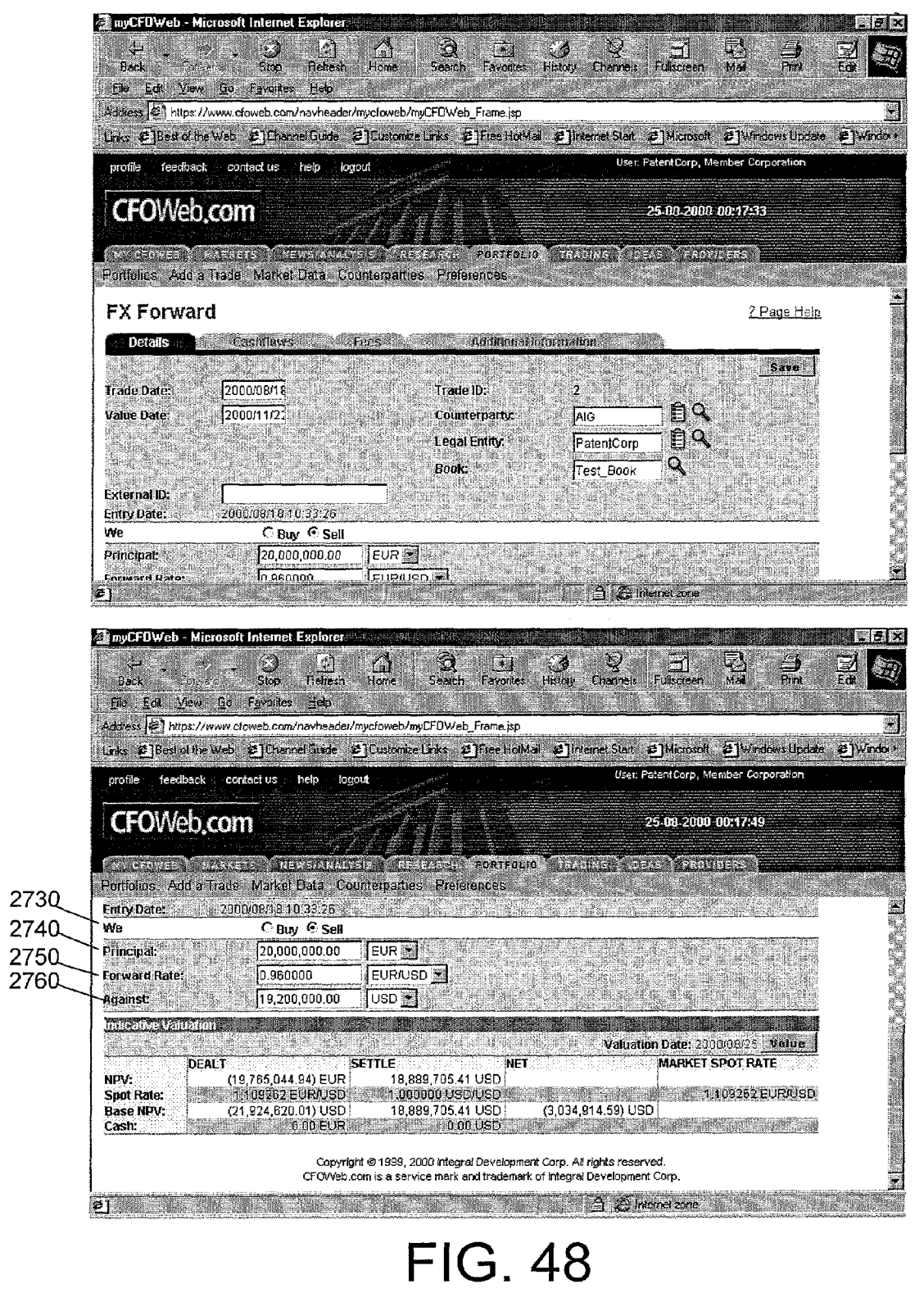

The "FX Forward Details" interface, illustrated by FIG. 48, displays the details of a particular FX Forward transaction in the Member's transaction portfolio, including the following:

Trade Date: the date on which the currency trade has been agreed to by the parties.
Value Date: the date on which the traded currencies will be exchanged.
Radio button 2730 showing whether Member bought or sold currency.
Principal 2740: the specified amount of currency to be converted into the currency being acquired.
Forward Rate 2750: the foreign exchange rate at which the trade was executed.
Against 2760: the specified amount of currency purchased.
Trade ID: unique (system assigned) identification number.
Counterparty name.
Legal Entity: the name of the Member or the Member's associated legal entity to which the transaction will be assigned.
Book: the trading book in which the Member includes the transaction.

The interface also displays indicative valuation information (e.g., net present value) regarding the transaction, which is the value of the transaction against the latest market data.

The valuation can be calculated for the particular date of display by clicking the "Value" button.

Figure 48A:
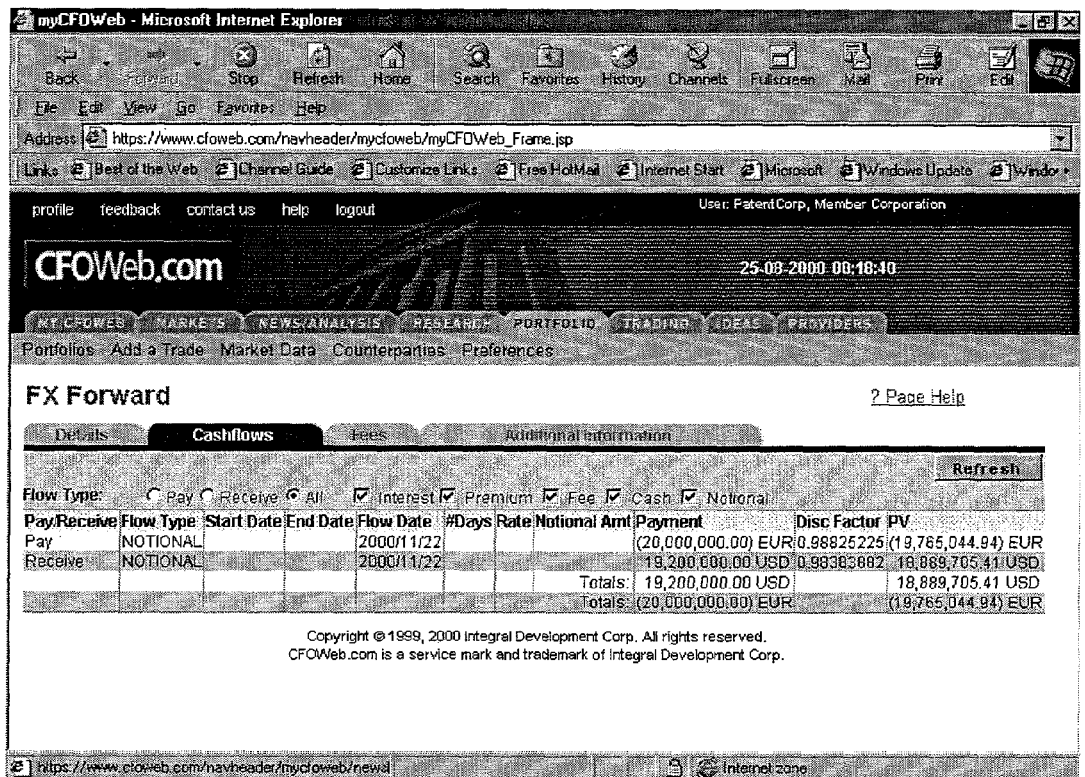
FIG. 48A shows a screen print of an interactive user interface for displaying the cashflows associated with a Member's FX Forward transaction created using the system in an embodiment of the present invention.

Clicking the "Cashflows" button will cause the system to display the "Cashflows" interface, illustrated by FIG. 48A, which shows future cashflow information—payments in or out—regarding the particular transaction. This information can be refreshed by clicking the "Refresh" button.

iii. FX Swap

Figure 49:
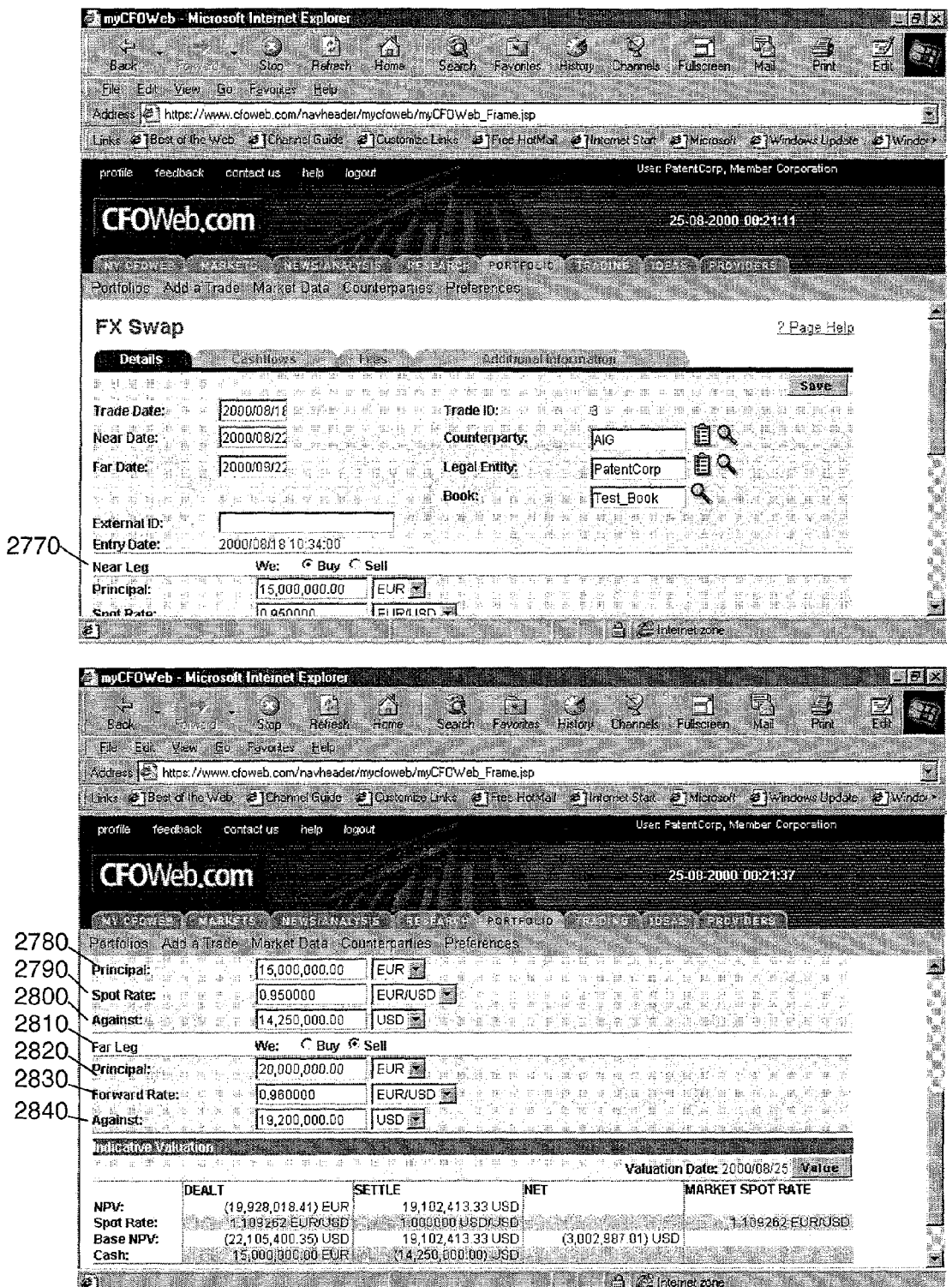
FIG. 49 shows a screen print of an interactive user interface for displaying the details of a Member's Foreign Exchange ("FX") Swap transaction created using the system in an embodiment of the present invention.

The "FX Swap Details" interface, illustrated by FIG. 49, displays the details of a particular FX Swap transaction in the Member's transaction portfolio, including the following:

Trade Date: the date on which the currency trade has been agreed to by the parties.

Near Date: the date on which the payment of the first leg ("Near Leg") of the swap will be paid.

Far Date: the date on which the payment of the second leg ("Far Leg") of the swap will be paid.

Radio button 2770 showing whether Member bought or sold currency in Near Leg.

Near Leg Principal 2780: the amount of currency to be paid under the Near Leg.

Near Leg Spot Rate 2790: the foreign exchange rate of the Near Leg.

Near Leg Against 2800: the amount used as the basis for calculating the amount paid under the Near Leg.

Radio button 2810 showing whether Member bought or sold currency in Far Leg.

Far Leg Principal 2820: the amount of currency to be paid under the Far Leg.

Far Leg Forward Rate 2830: the foreign exchange rate of the Far Leg.

Far Leg Against 2840: the amount used as the basis for calculating the amount paid under the Far Leg.

Trade ID: unique (system assigned) identification number.

Counterparty name.

Legal Entity: the name of the Member or the Member's associated legal entity to which the transaction will be assigned.

Book: the trading book in which the Member includes the transaction.

The interface also displays indicative valuation information (e.g., net present value) regarding the transaction, which is the value of the transaction against the latest market data. The valuation can be calculated for the particular date of display by clicking the "Value" button.

Figure 49A:
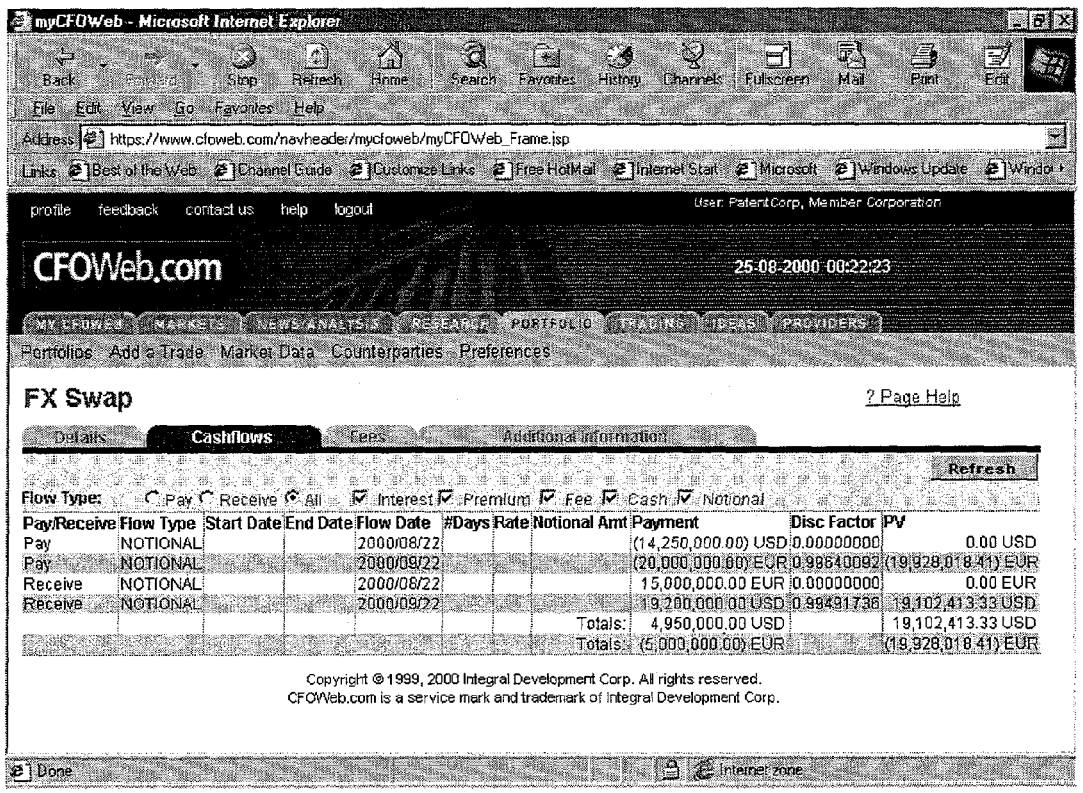
FIG. 49A shows a screen print of an interactive user interface for displaying the cashflows associated with a Member's FX Swap transaction created using the system in an embodiment of the present invention.

Clicking the "Cashflows" button will cause the system to display the "Cashflows" interface, illustrated by FIG. 49A, which shows future cashflow information—payments in or out—regarding the particular transaction. This information can be refreshed by clicking the "Refresh" button.

iv. FX European Option

Figure 50:
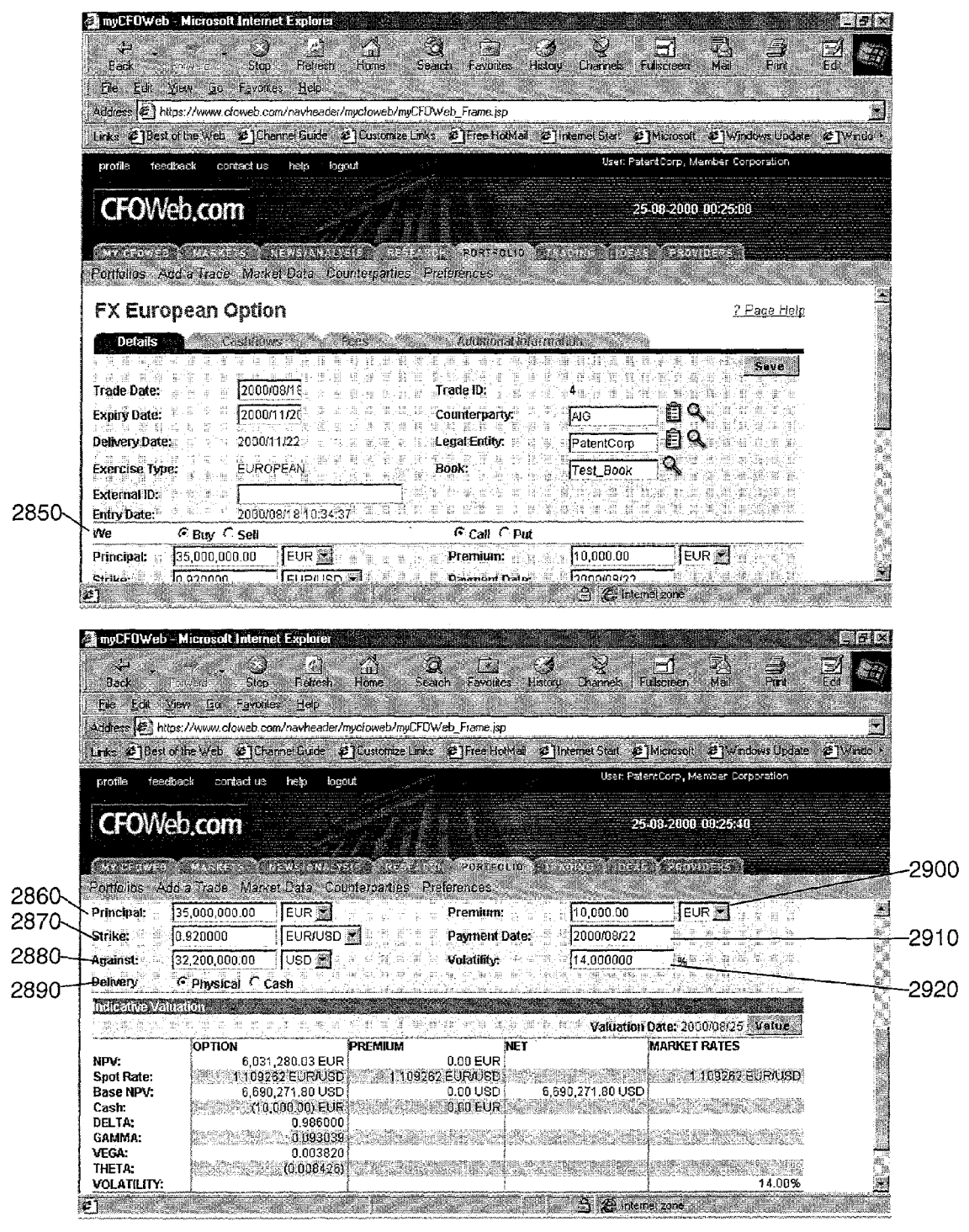

The "FX European Option Details" interface, illustrated by FIG. 50, displays the details of a particular FX European Option (Foreign Exchange Option) transaction in the Member's transaction portfolio, including the following:

Trade Date: the date on which the currency trade has been agreed to by the parties.

Expiry Date: the date by which the option may be exercised.

Delivery Date: the date on which either the cashflow or underlying trade amount must be exchanged upon exercise of the option.

Radio button 2850 showing whether Member is buying or selling currency.

Principal 2860: the amount of currency to be converted into the currency to be bought or sold upon exercise of the option.

Strike 2870: the strike rate that triggers the exercise of the option.

Premium 2900: the premium amount to be paid for exercise of the option.

Payment Date 2910: the date of payment of the premium.

Against 2880: the settled amount of currency that will be bought or sold upon exercise of the option.

Volatility 2920: the volatility rate of the underlying option.

Delivery 2890 radio button showing whether to settle (i) the net cashflow, only, of the underlying trade ("Cash") or (ii) the underlying trade ("Physical"), upon exercise of the option.

Counterparty name.

Legal Entity: the name of the Member or the Member's associated legal entity to which the transaction will be assigned.

Book: the trading book in which the Member includes the transaction.

The interface also displays indicative valuation information (e.g., net present value) regarding the transaction, which is the value of the transaction against the latest market data. The valuation can be calculated for the particular date of display by clicking the "Value" button.

Figure 50A:
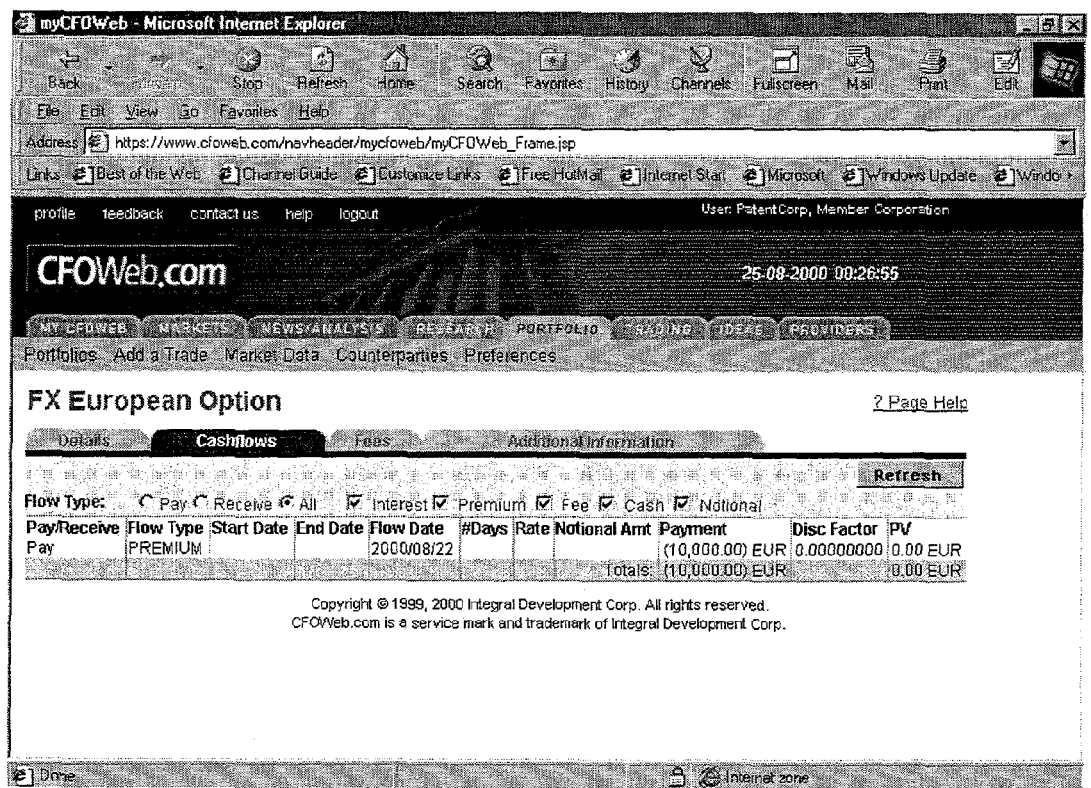
FIG. 50A shows a screen print of an interactive user interface for displaying the cashflows associated with a Member's FX European Option transaction created using the system in an embodiment of the present invention.

Clicking the "Cashflows" button will cause the system to display the "Cashflows" interface, illustrated by FIG. 50A, which shows future cashflow information—payments in or out—regarding the particular transaction. This information can be refreshed by clicking the "Refresh" button.

v. Fixed-Float Interest Rate Swap

Figure 51:
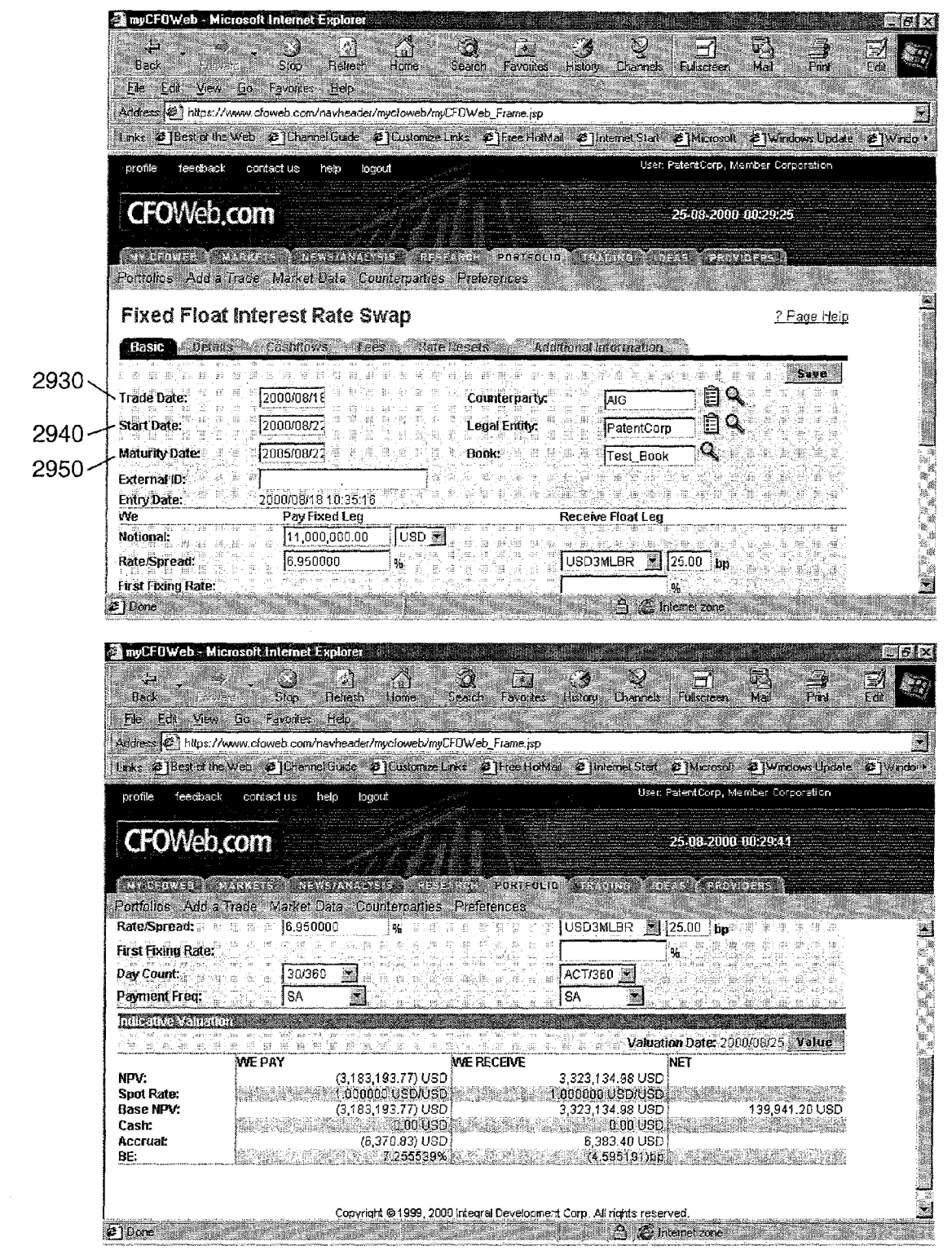
Figure 51A:
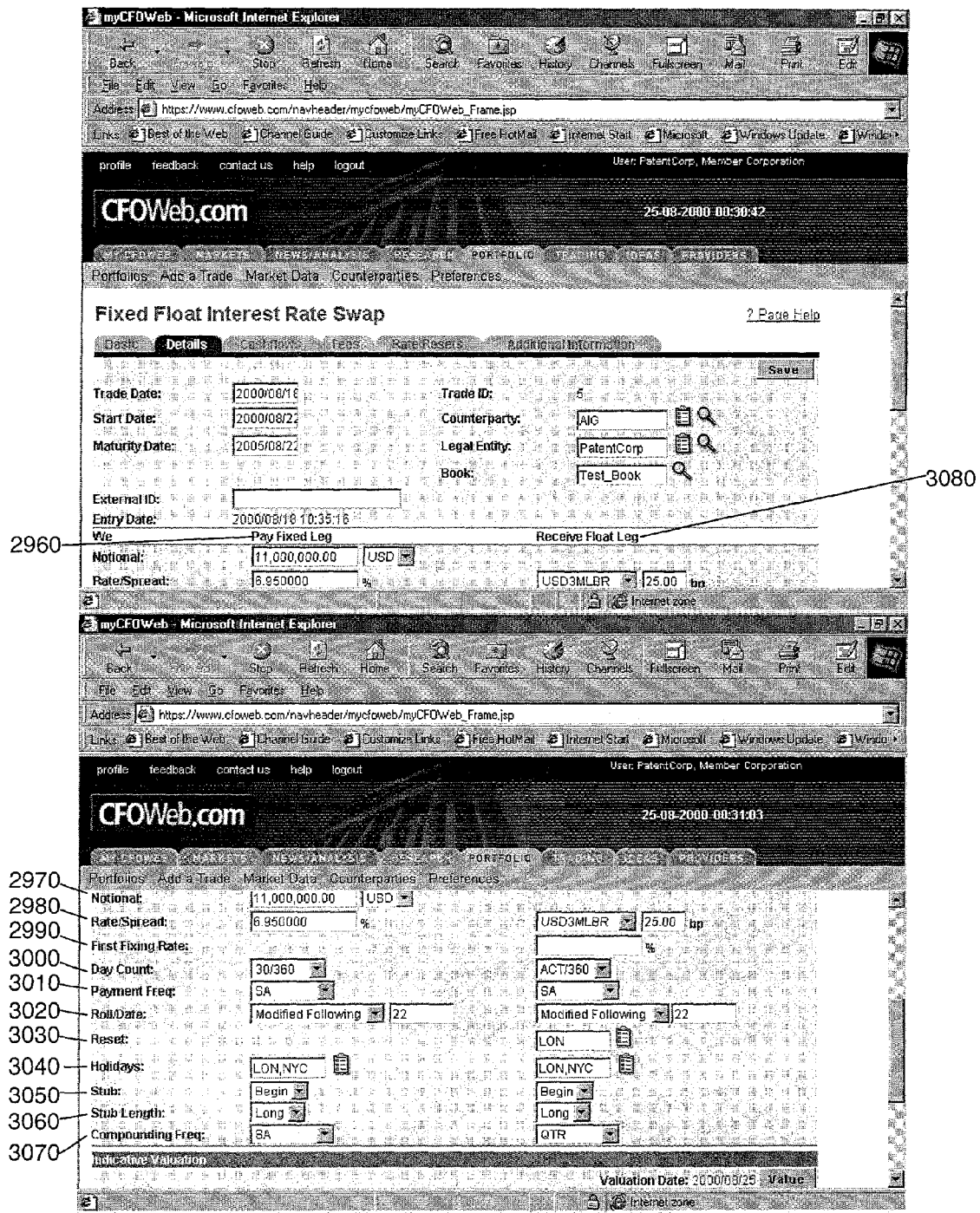
FIGS. 51A-51B show a screen print of an interactive user interface for displaying the details of a Member's Fixed Float Interest Rate Swap transaction created using the system in an embodiment of the present invention.
Figure 51B:
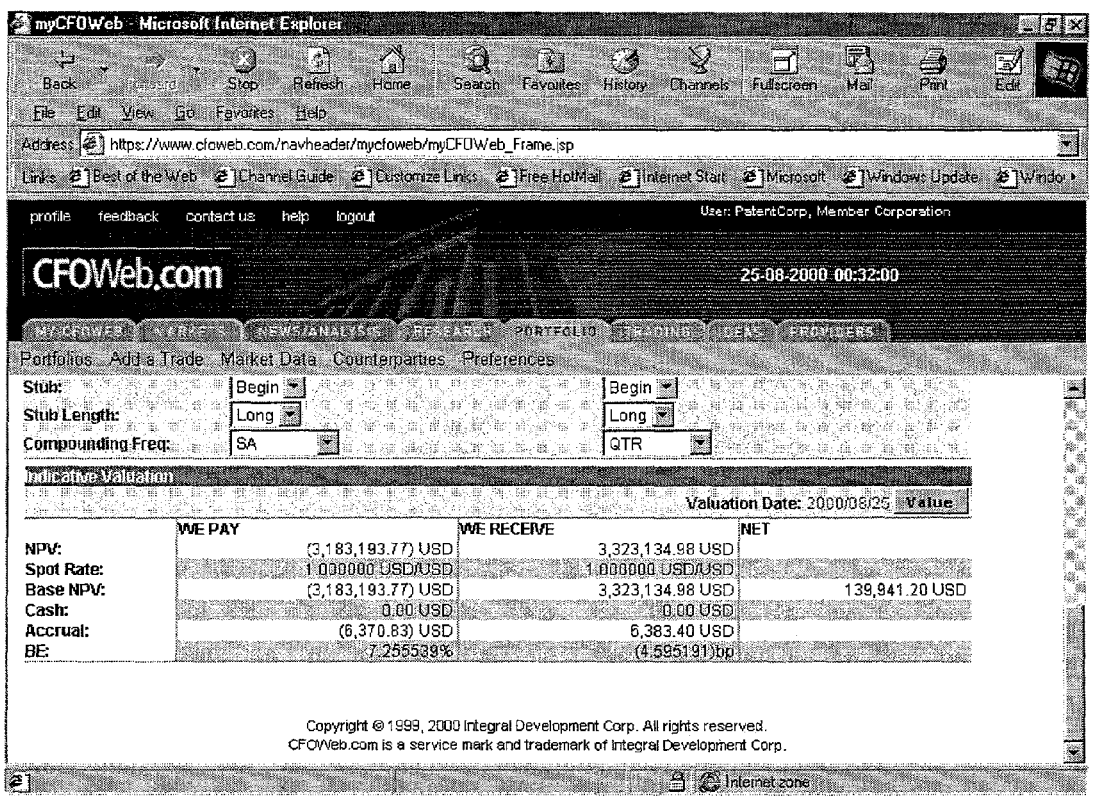

The "Fixed Float Interest Rate Swap Details" interface, illustrated by FIGS. 51-51B, displays the details of a particular Fixed-Float Interest Rate Swap transaction (or a Float-Fixed Interest Rate Swap) in the Member's transaction portfolio. The system includes similar interfaces for the Float-Float Interest Rate Swap, Fixed-Fixed Cross-Currency Swap, Fixed-Float Cross-Currency Swap (or a Float-Fixed Cross-Currency Swap), and Float-Float Cross-Currency Swap transactions. The details displayed by the interface include the following:

Trade Date 2930: the date on which the swap has been agreed to by the parties.

Start Date 2940: the date on which the swap contract will begin.

Maturity Date 2950: the date on which the swap contract will end.

Indicator 2960 showing whether Member bought or sold currency in Pay or Receive Leg.

Notional Amount 2970 and Currency for the fixed or floating leg.

Fixed Rate 2980 for fixed leg and Floating Rate index and basis point Spread for the floating leg.

First Fixing Rate 2990: the interest rate to be used for the first interest rate calculation period for the floating Receive Leg (optional).

Day Count 3000: the day-count method to be used for calculating interest, specified for each of the (i) fixed leg and (ii) floating leg.

Payment Frequency 3010: the frequency of interest payment, specified for each of the (i) fixed leg and (ii) floating leg.

Roll/Date 3020: the specific convention and day for each period to be used for determination of payment of interest when such event occurs on a non-business day, specified for each of the (i) fixed leg and (ii) floating leg.

Rate Reset Calendar 3030: the location-specific (e.g., New York, London) calendar to be used for reference to business holidays for interest rate resets for the floating leg.

Holidays 3040: the location-specific e.g., New York, London) business holidays to be used for reference for payment calculations, specified for each of the (i) fixed leg and (ii) floating leg.

Stub 3050: an indicator for an irregular schedule of payments, specified for each of the (i) fixed leg and (ii) floating leg.

Stub Length 3060: the irregular payment schedule length, specified for each of the (i) fixed leg and (ii) floating leg.

Compounding Frequency 3070: interest compounding calculation frequency, specified for each of the (i) fixed leg and (ii) floating leg.

Counterparty name.

Legal Entity: the name of the Member or the Member's associated legal entity to which the transaction will be assigned.

Book: the trading book in which the Member includes the transaction.

The interface also displays indicative valuation information (e.g., net present value) regarding the transaction, which is the value of the transaction against the latest market data. The valuation can be calculated for the particular date of display by clicking the "Value" button.

Figure 52:
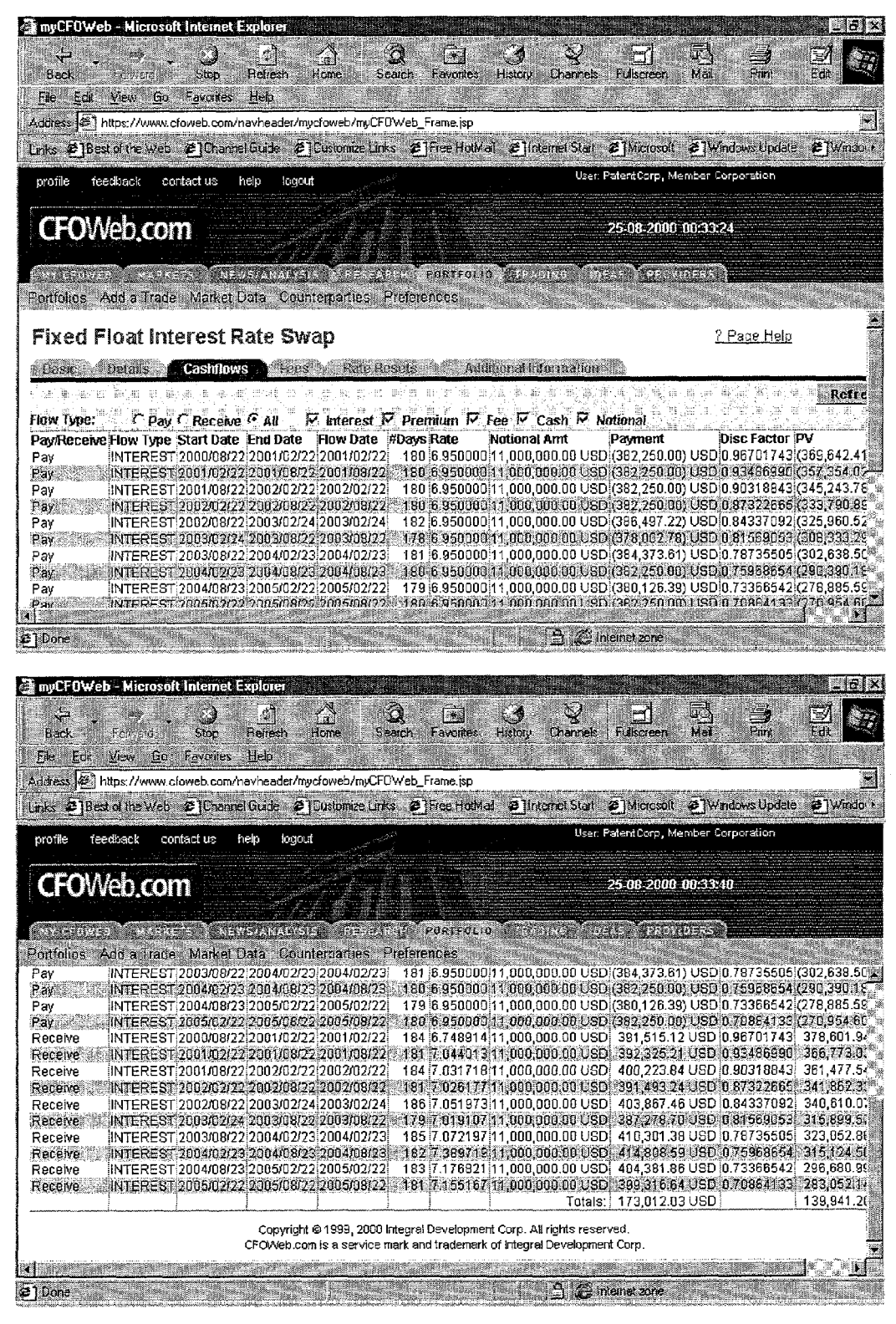

Clicking the "Cashflows" button will cause the system to display the "Cashflows" interface, illustrated by FIG. 52, which shows future cashflow information—payments in or out—regarding the particular transaction. This information can be refreshed by clicking the "Refresh" button.

Clicking the "Rate Resets" button (in FIG. 51) will cause the system to display the "Rate Resets" interface, illustrated by FIG. 53, which shows all (past and future) rate reset events for the particular transaction, and enables specification of a "Lock" and "Lock Rate". Any one of these rates can be locked by resetting such rate and clicking the "Update" button.

vi. Forward Rate Agreement

Figure 54:
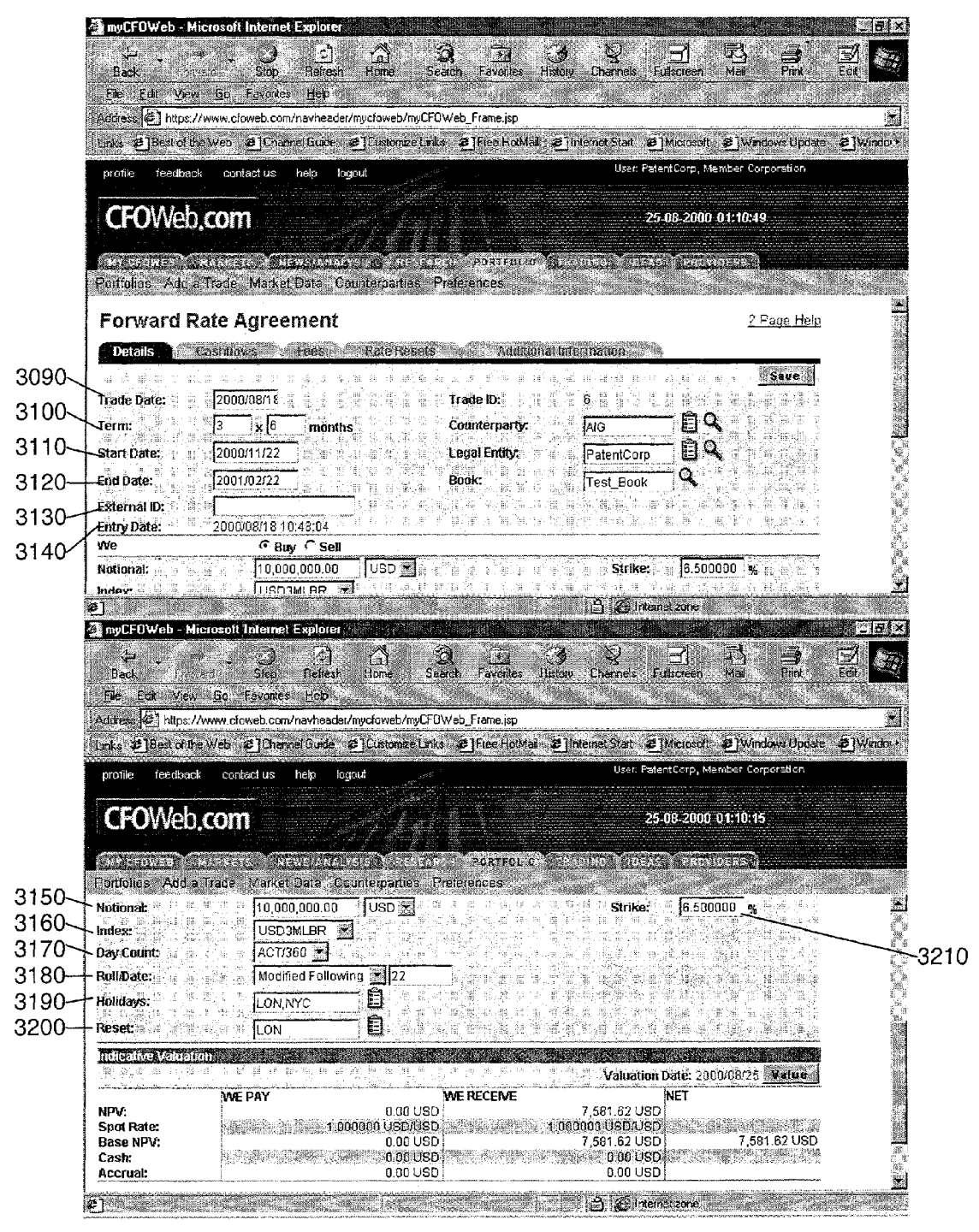

The "Forward Rate Agreement Details" interface, illustrated by FIG. 54, displays the details of a particular Forward Rate Agreement transaction in the Member's transaction portfolio, including the following:

Trade Date 3090: the date on which the trade has been agreed to by the parties.

Term 3100: the start and end dates of the trade; e.g., "3×6 months" means that the trade will begin on the first business date three months after the trade date and will end on the first business date six months after the trade date.

Start Date 3110: the date on which the Forward Rate Agreement contract will begin.

End Date 3120: the date on which the Forward Rate Agreement contract will end.

Radio button showing whether Member is buying or selling a Forward Rate Agreement.

Notional Amount 3150: the amount and type of currency to be used as a basis for calculating the payment stream.

Forward Rate Agreement Rate 3210: the Forward Rate Agreement rate that triggers the payments of the Forward Rate Agreement.

Index 3160 for interest rate.

Day Count 3170: the day-count method to be used for calculating interest.

Roll/Date 3180: the specific convention and day for each period to be used for determination of payment of interest when such event occurs on a non-business day.

Holidays 3190: the location-specific (e.g., New York, London) business holidays to be used for reference for payment calculations.

Rate Reset Calendar 3200: the location-specific (e.g., New York, London) calendar to be used for reference to business holidays for interest rate resets.

The interface also displays indicative valuation information e.g., net present value) regarding the transaction, which is the value of the transaction against the latest market data. The valuation can be calculated for the particular date of display by clicking the "Value" button.

Figure 55:
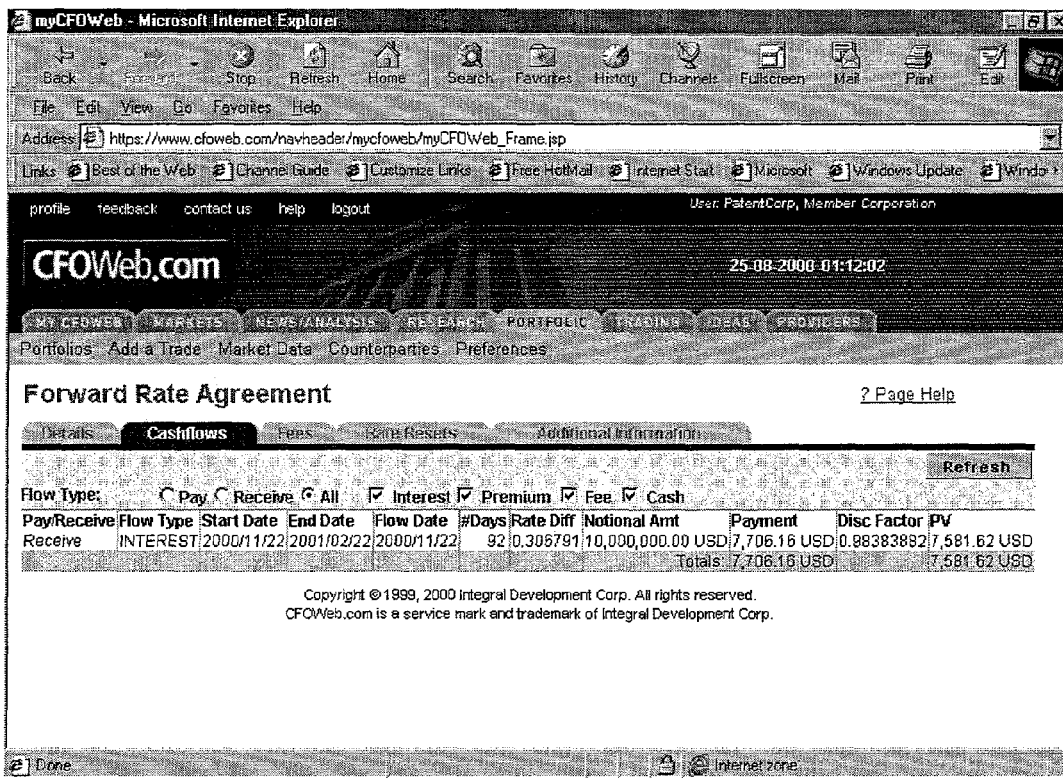
FIG. 55 shows a screen print of an interactive user interface for displaying the cashflows associated with a Member's Forward Rate Agreement transaction created using the system in an embodiment of the present invention.

Clicking the "Cashflows" button will cause the system to display the "Cashflows" interface, illustrated by FIG. 55, which shows future cashflow information—payments in or out—regarding the particular transaction. This information can be refreshed by clicking the "Refresh" button.

Figure 56:
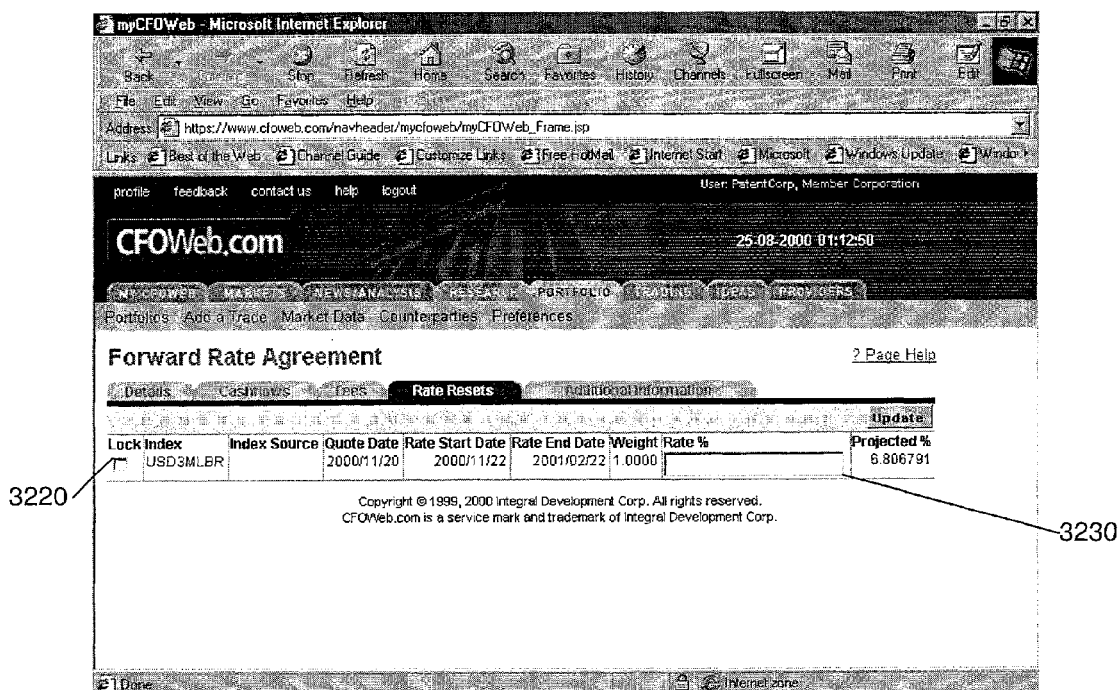
FIG. 56 shows a screen print of an interactive user interface for displaying the rate resets associated with a Member's Forward Rate Agreement transaction created using the system in an embodiment of the present invention.

Clicking the "Rate Resets" button (in FIG. 54) will cause the system to display the "Rate Resets" interface, illustrated by FIG. 56, which shows all (past and future) rate reset events for the particular transaction, and enables specification of a "Lock" 3220 and "Lock Rate" 3230. Any one of these rates can be locked by resetting such rate and clicking the "Update" button.

vii. Fixed Rate Deposit

Figure 57:
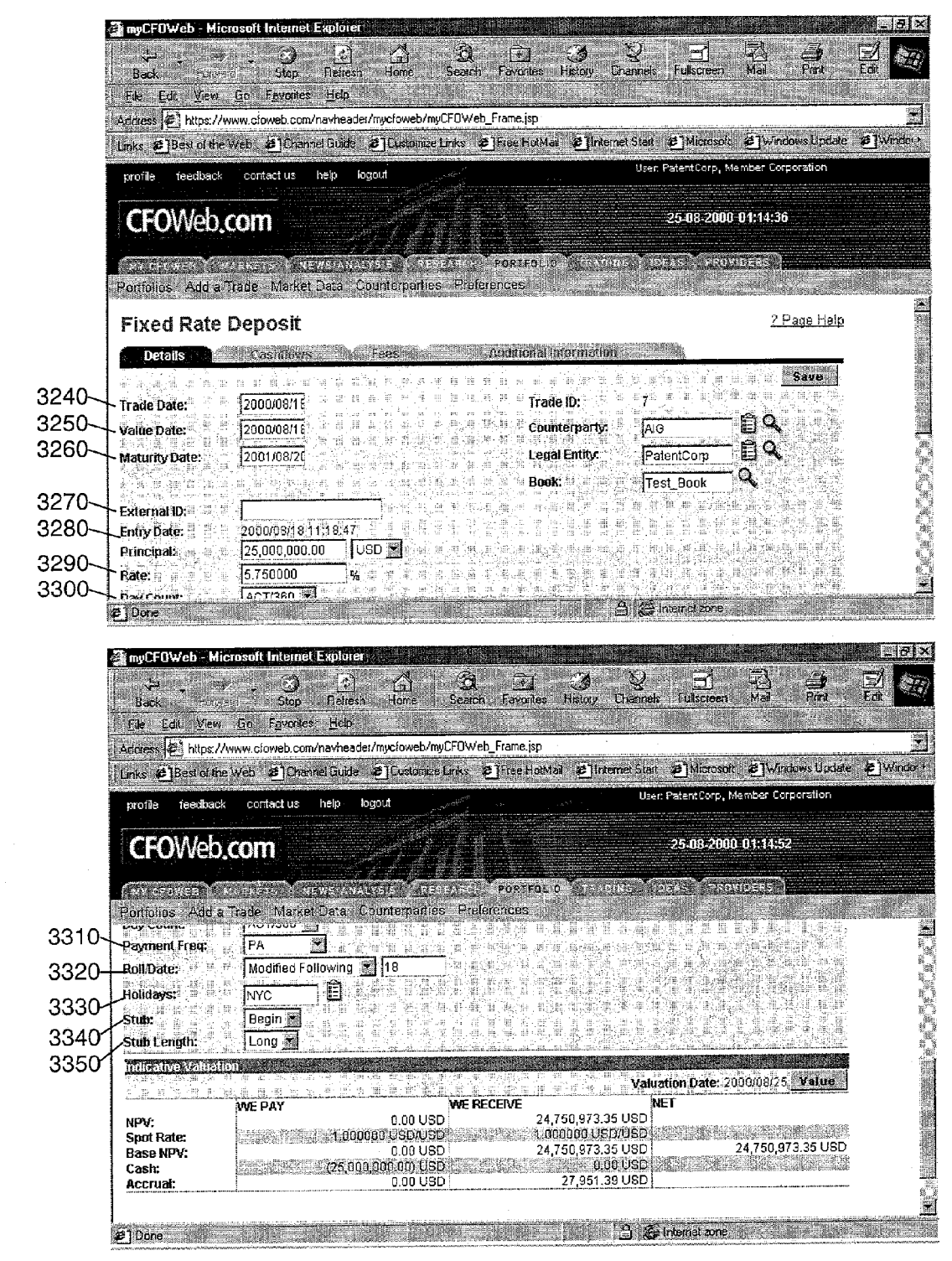

The "Fixed Rate Deposit Details" interface, illustrated by FIG. 57, displays the details of a particular Fixed Rate Deposit transaction in the Member's transaction portfolio, including the following:

Trade Date 3240: the date on which the deposit has been agreed to by the parties.

Value Date 3250: the date on which the deposit will begin.

Maturity Date 3260: the date on which the deposit will end.

Principal 3280: the amount and type of currency of the deposit.

Rate 3290: the interest rate of the deposit.

Day Count 3300: the day-count method to be used for calculating interest.

Payment Frequency 3310: the frequency of interest payment.

Roll/Date 3320: the specific convention and day for each period to be used for determination of payment of interest when such event occurs on a non-business day.

Holidays 3330: the location-specific (e.g., New York, London) business holidays to be used for reference for payment calculations.

Stub 3340: an indicator for an irregular schedule of payments.

Stub Length 3350: the irregular payment schedule length.

Counterparty name.

Legal Entity: the name of the Member or the Member's associated legal entity to which the transaction will be assigned.

Book: the trading book in which the Member includes the transaction.

The interface also displays indicative valuation information (e.g., net present value) regarding the transaction, which is the value of the transaction against the latest market data. The valuation can be calculated for the particular date of display by clicking the "Value" button.

Figure 58:
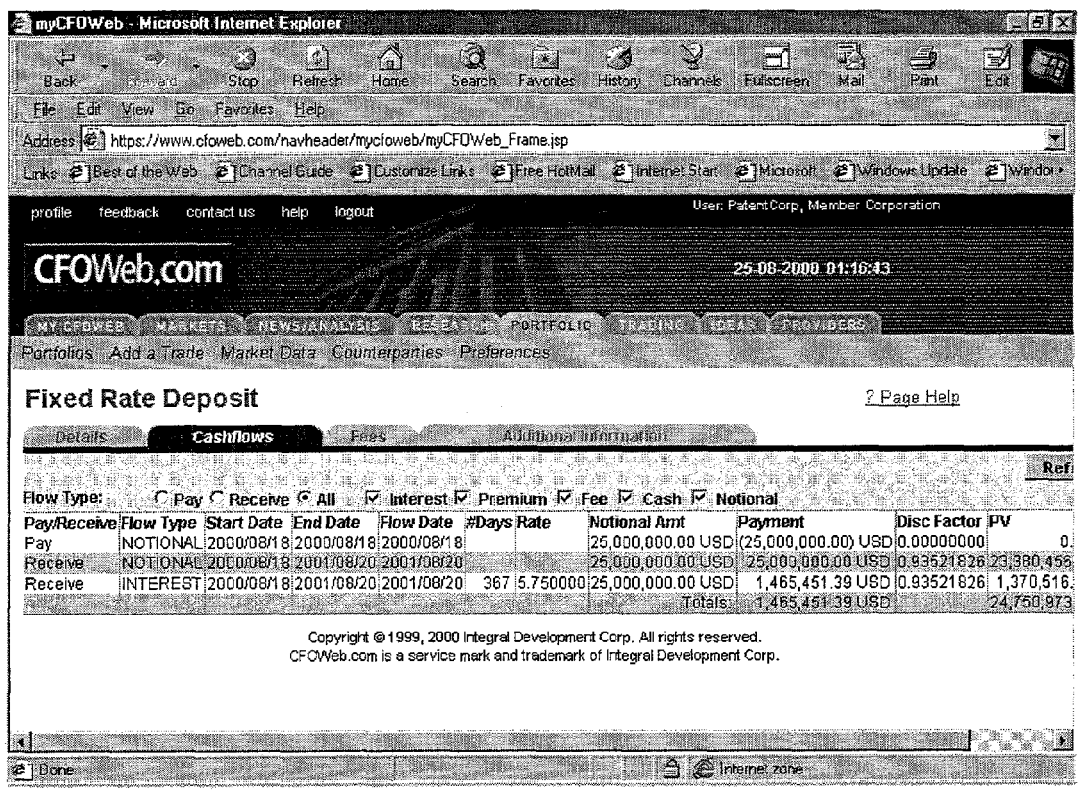
FIG. 58 shows a screen print of an interactive user interface for displaying the cashflows associated with a Member's Fixed Rate Deposit transaction created using the system in an embodiment of the present invention.

Clicking the "Cashflows" button will cause the system to display the "Cashflows" interface, illustrated by FIG. 58, which shows future cashflow information—payments in or out—regarding the particular transaction. This information can be refreshed by clicking the "Refresh" button.

viii. Cap

Figure 59:
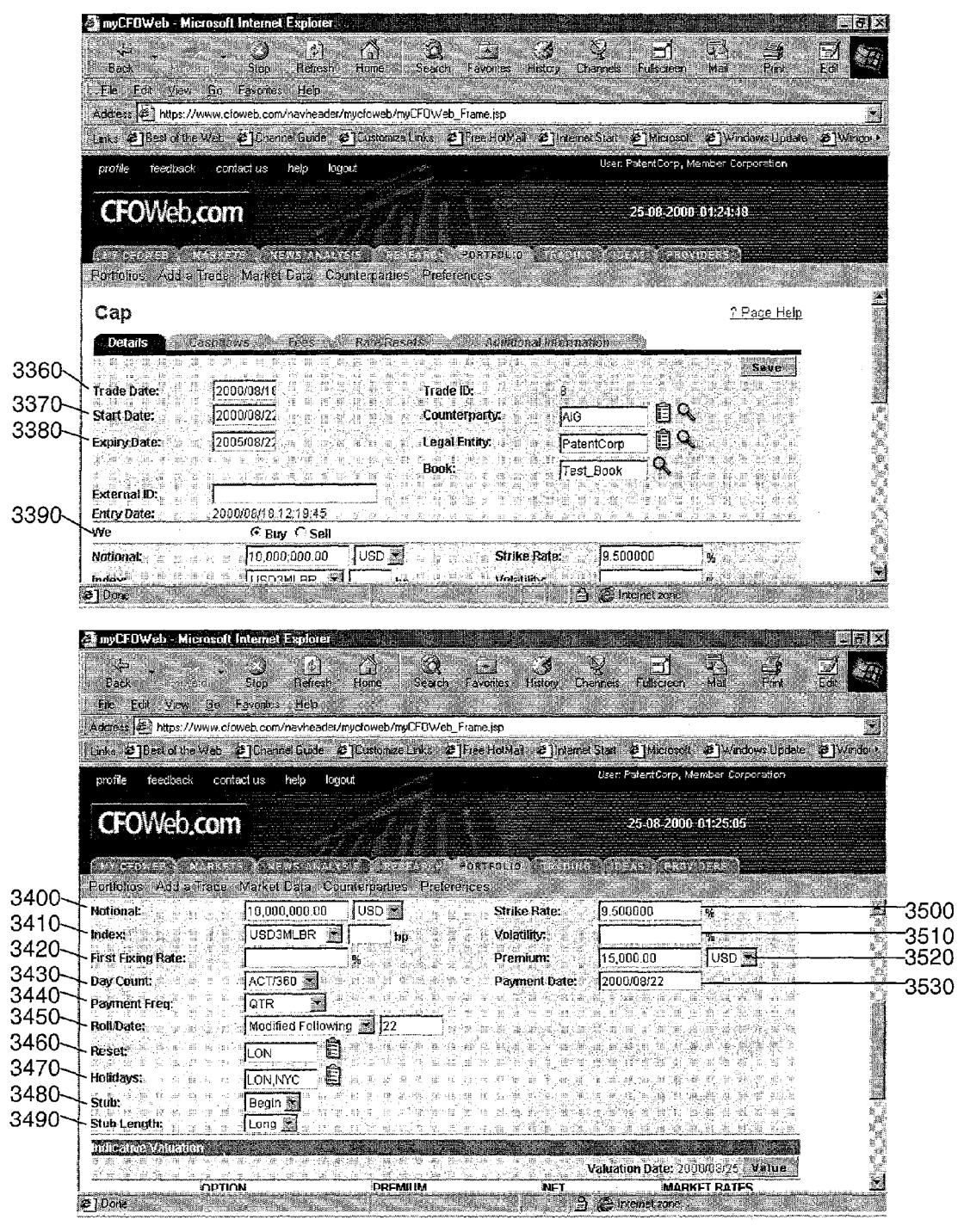
Figure 59A:
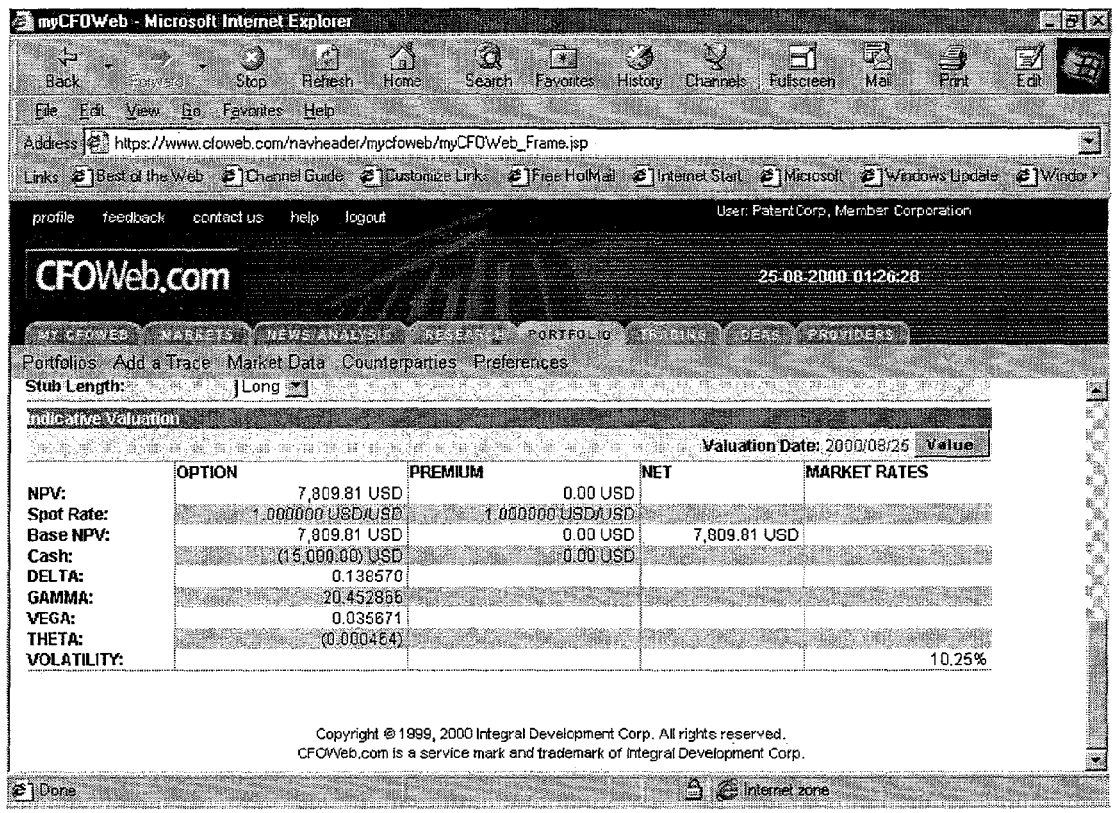

The "Cap Details" interface, illustrated by FIGS. 59-59A, displays the details of a particular Cap transaction in the Member's transaction portfolio, including the following:

Trade Date 3360: the date on which the trade has been agreed to by the parties.

Start Date 3370: the date on which the option will begin.
Expiry Date 3380: the date on which the option will expire.
Radio button 3390 showing whether Member buying or selling Cap.
Notional Amount 3400: the amount and type of currency to be used as a basis for calculating the payment stream.
Strike Rate 3500: strike rate for exercise of Cap transaction.
Index 3410 and basis point spread for floating interest rate.
First Fixing Rate 3420: the interest rate to be used for the first Caplet calculation period.
Premium 3520: amount to be paid for the Cap.
Premium Date 3530: the date on which the premium payment will be made.
Day Count 3430: the day-count method to be used for calculating interest.
Payment Frequency 3440: the frequency of Cap payment.
Roll/Date 3450: the specific convention and day for each period to be used for determination of payment of interest when such event occurs on a non-business day.
Rate Reset Calendar 3460: the location-specific (e.g., New York, London) calendar to be used for reference to business holidays for interest rate resets.
Holidays 3470: the location-specific (e.g., New York, London) business holidays to be used for reference for payment calculations.
Stub 3480: an indicator for an irregular schedule of payments.
Stub Length 3490: the irregular payment schedule length.
Counterparty name.
Legal Entity: the name of the Member or the Member's associated legal entity to which the transaction will be assigned.
Book: the trading book in which the Member includes the transaction.

The interface (in FIG. 59A) also displays indicative valuation information (e.g., net present value) regarding the transaction, which is the value of the transaction against the latest market data. The valuation can be calculated for the particular date of display by clicking the "Value" button.

Figure 60:
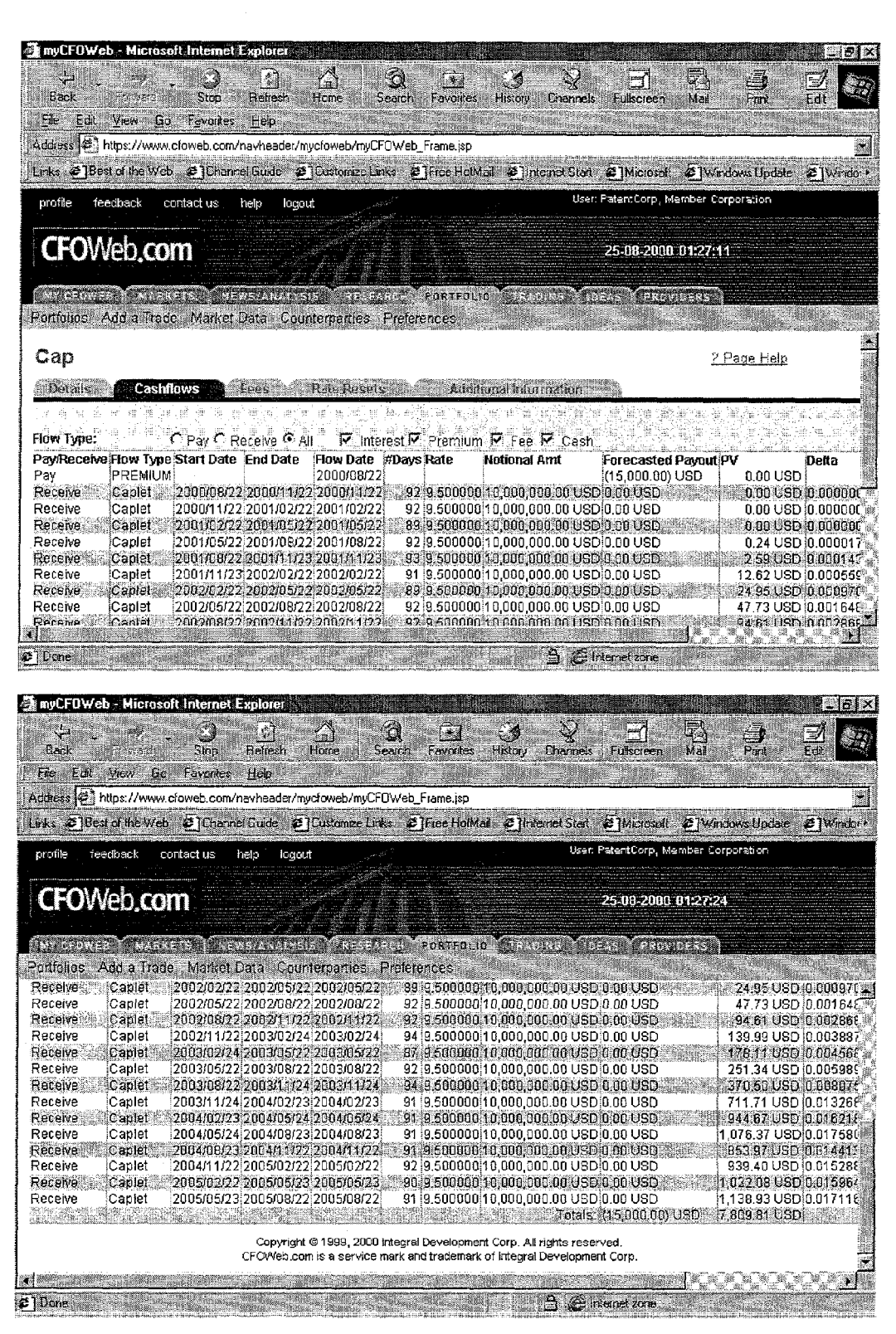

Clicking the "Cashflows" button (in FIG. 59) will cause the system to display the "Cashflows" interface, illustrated by FIG. 60, which shows future cashflow information regarding the particular transaction. This information can be refreshed by clicking the "Refresh" button.

Figure 61:
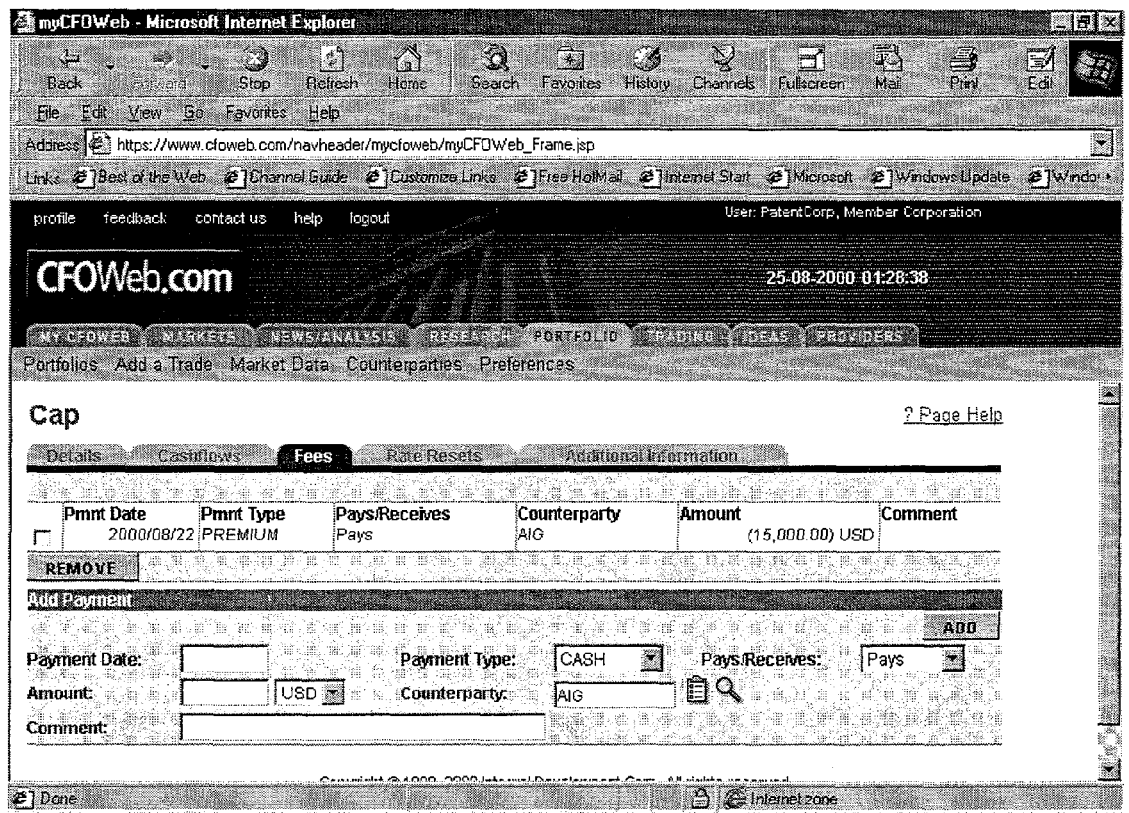
FIG. 61 shows a screen print of an interactive user interface for displaying the fees associated with a Member's Cap transaction created using the system in an embodiment of the present invention.

Clicking the "Fees" button (in FIG. 59) will cause the system to display the "Fees" interface, illustrated by FIG. 61, which shows fees associated with the particular transaction. This interface also enables the Member to add (by inputting the information requested in the displayed fields and clicking the "Add" button) or delete (by clicking the "Remove" button) payments associated with the transaction.

Figure 62:
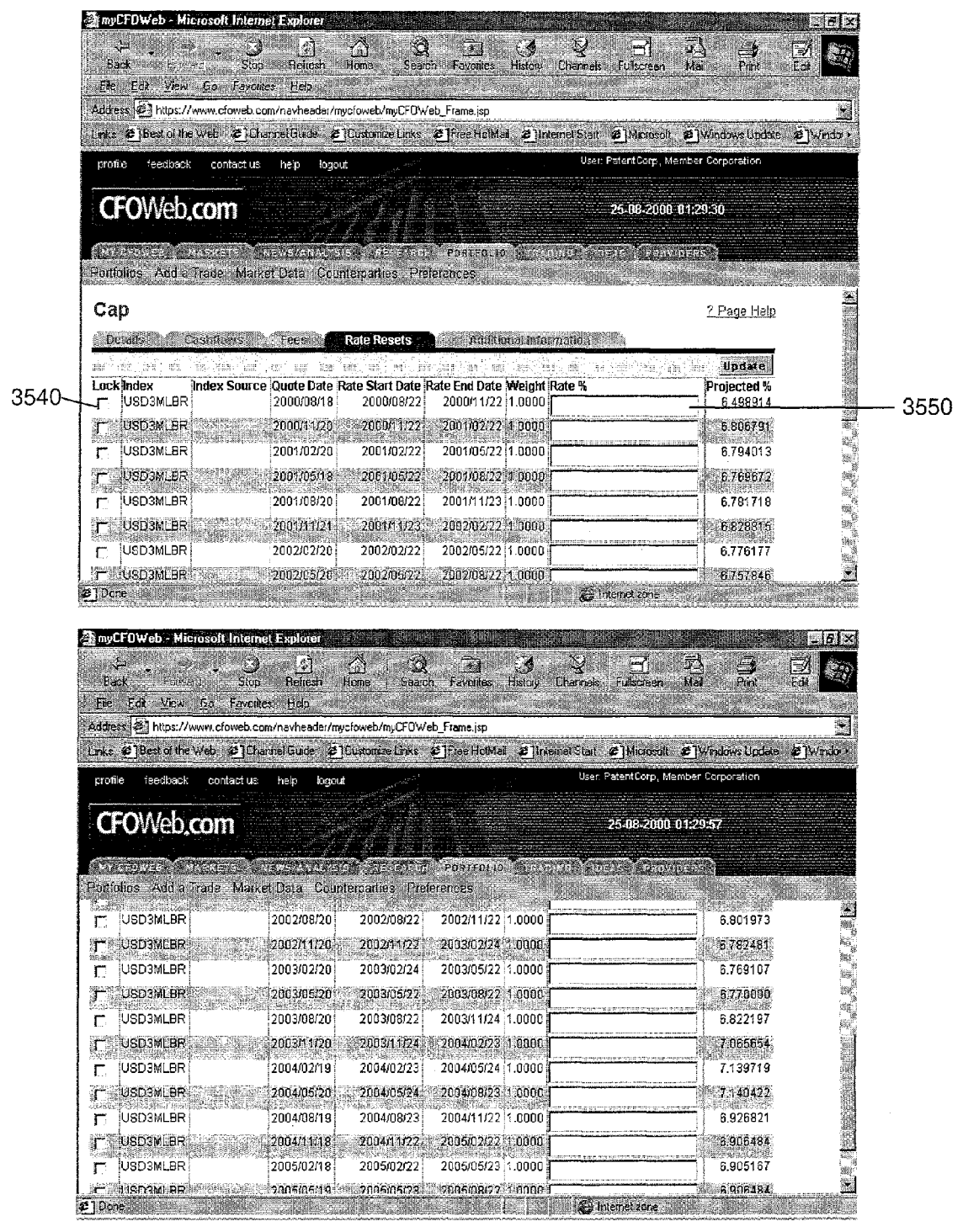

Clicking the "Rate Resets" button (in FIG. 59) will cause the system to display the "Rate Resets" interface, illustrated by FIG. 62, which shows all (past and future) rate reset events for the particular transaction, and enables specification of a "Lock" 3540 and "Lock Rate" 3550. Any one of these rates can be locked by resetting such rate and clicking the "Update" button.

ix. Floor

Figure 63:
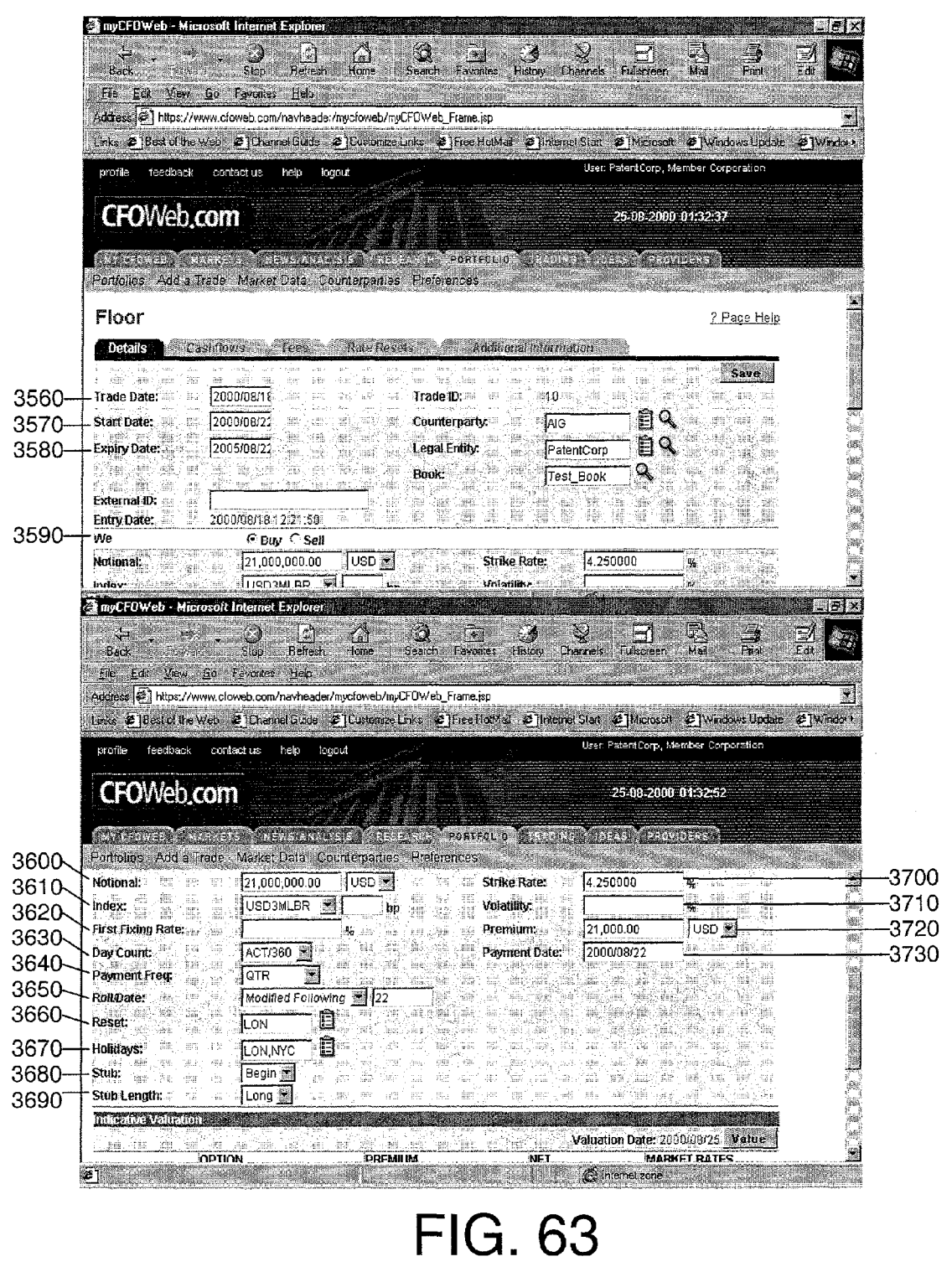
Figure 63A:
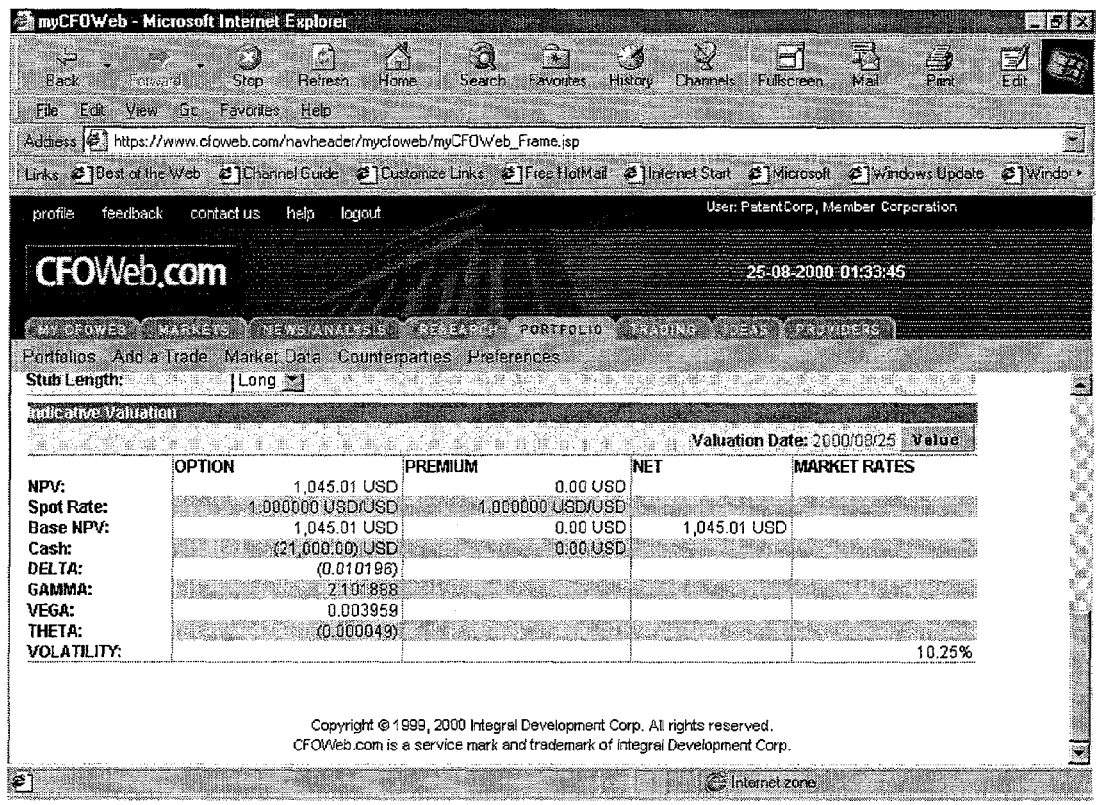

The "Floor Details" interface, illustrated by FIGS. 63-63A, displays the details of a particular Floor transaction in the Member's transaction portfolio, including the following:
Trade Date 3560: the date on which the trade has been agreed to by the parties.
Start Date 3570: the date on which the option will begin.
Expiry Date 3580: the date on which the option will expire.
Radio button 3590 showing whether Member buying or selling Floor.
Notional Amount 3600: the amount and type of currency to be used as a basis for calculating the payment stream.
Strike Rate 3700: strike rate for exercise of Floor transaction.
Index 3610 and basis point spread for floating interest rate.
First Fixing Rate 3620: the interest rate to be used for the first Floorlet rate calculation period.
Premium 3720: amount to be paid for the Floor.
Payment Date 3730: the date on which the premium payment will be made.
Day Count 3630: the day-count method to be used for calculating interest.
Payment Frequency 3640: the frequency of interest/principal payment.
Roll/Date 3650: the specific convention and day for each period to be used for determination of payment of interest when such event occurs on a non-business day.
Rate Reset Calendar 3660: the location-specific (e.g., New York, London) calendar to be used for reference to business holidays for interest rate resets.
Holidays 3670: the location-specific (e.g., New York, London) business holidays to be used for reference for payment calculations.
Stub 3680: an indicator for an irregular schedule of payments.
Stub Length 3690: the irregular payment schedule length.
Counterparty name.
Legal Entity: the name of the Member or the Member's associated legal entity to which the transaction will be assigned.
Book: the trading book in which the Member includes the transaction.

The interface (in FIG. 63A) also displays indicative valuation information (e.g., net present value) regarding the transaction, which is the value of the transaction against the latest market data. The valuation can be calculated for the particular date of display by clicking the "Value" button.

Figure 64:
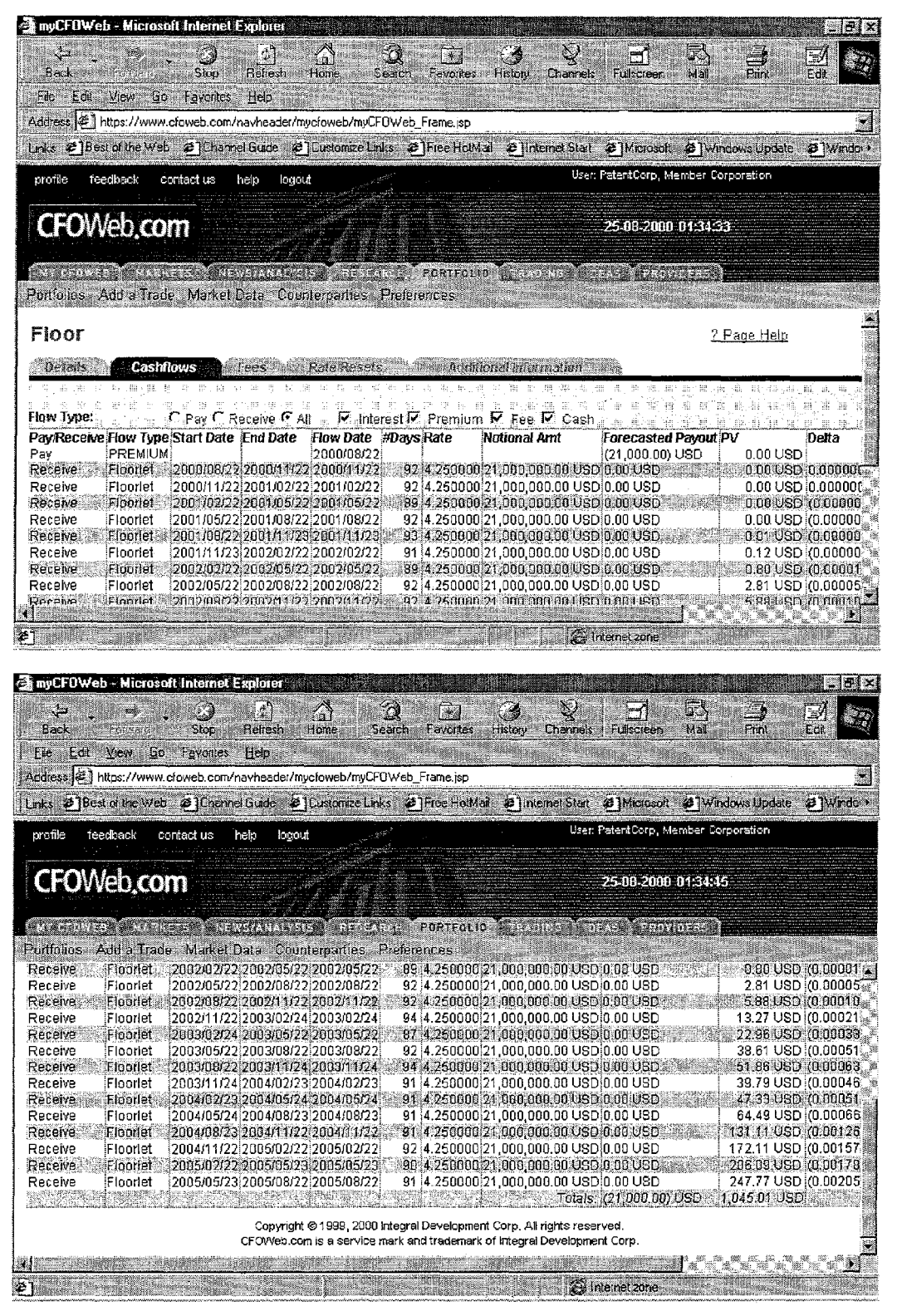

Clicking the "Cashflows" button (in FIG. 63) will cause the system to display the "Cashflows" interface, illustrated by FIG. 64, which shows future cashflow information regarding the particular transaction. This information can be refreshed by clicking the "Refresh" button.

Figure 65:
FIG. 65 shows a screen print of an interactive user interface for displaying the fees associated with a Member's Floor transaction created using the system in an embodiment of the present invention.

Clicking the "Fees" button (in FIG. 63) will cause the system to display the "Fees" interface, illustrated by FIG. 65, which shows fees associated with the particular transaction. This interface also enables the Member to add (by inputting the information requested in the displayed fields and clicking the "Add" button) or delete (by clicking the "Remove" button) payments associated with the transaction.

Figure 66:
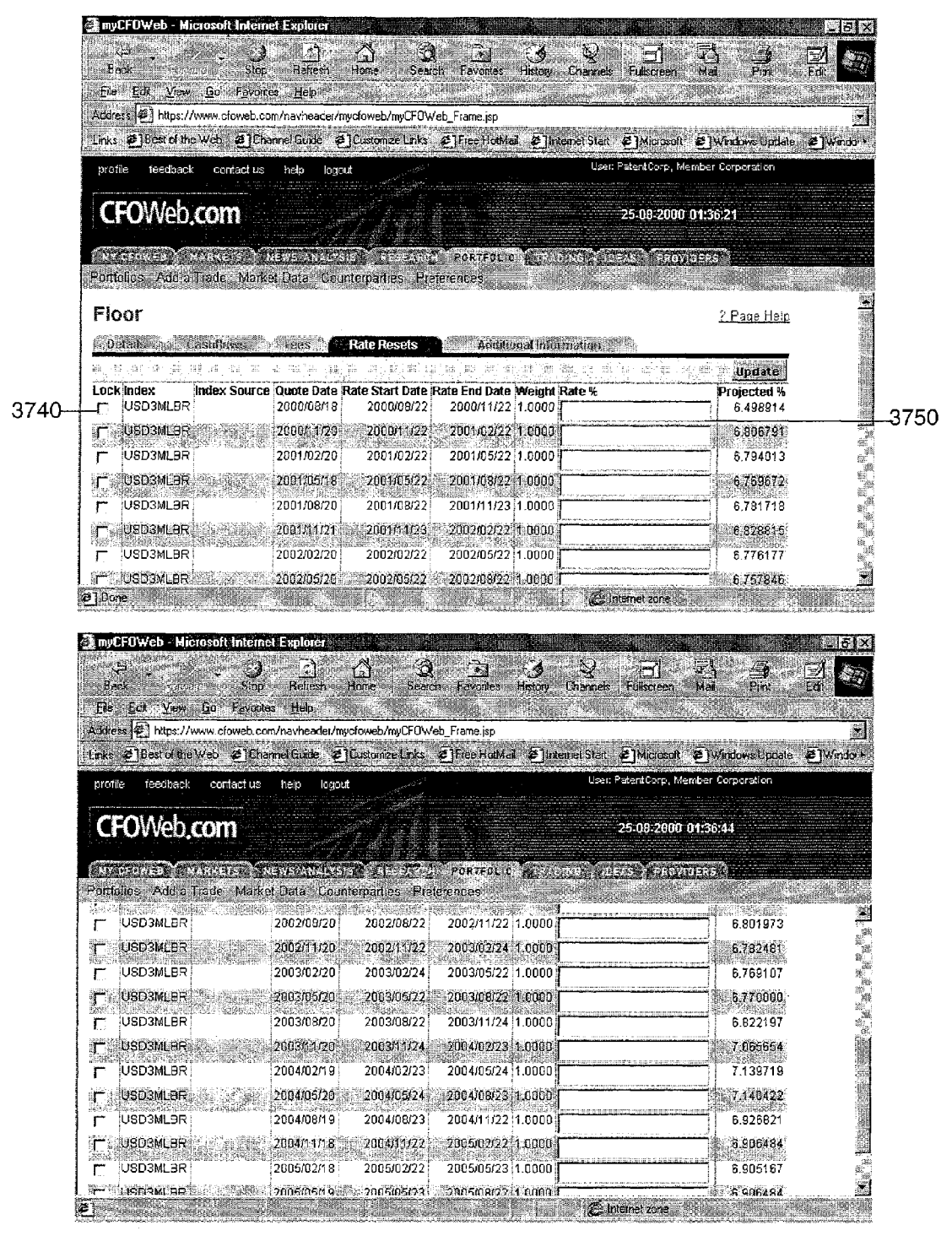

Clicking the "Rate Resets" button (in FIG. 63) will cause the system to display the "Rate Resets" interface, illustrated by FIG. 66, which shows all (past and future) rate reset events for the particular transaction, and enables specification of a "Lock" 3740 and "Lock Rate" 3750. Any one of these rates can be locked by resetting such rate and clicking the "Update" button.

c. Market Data

Figure 27:
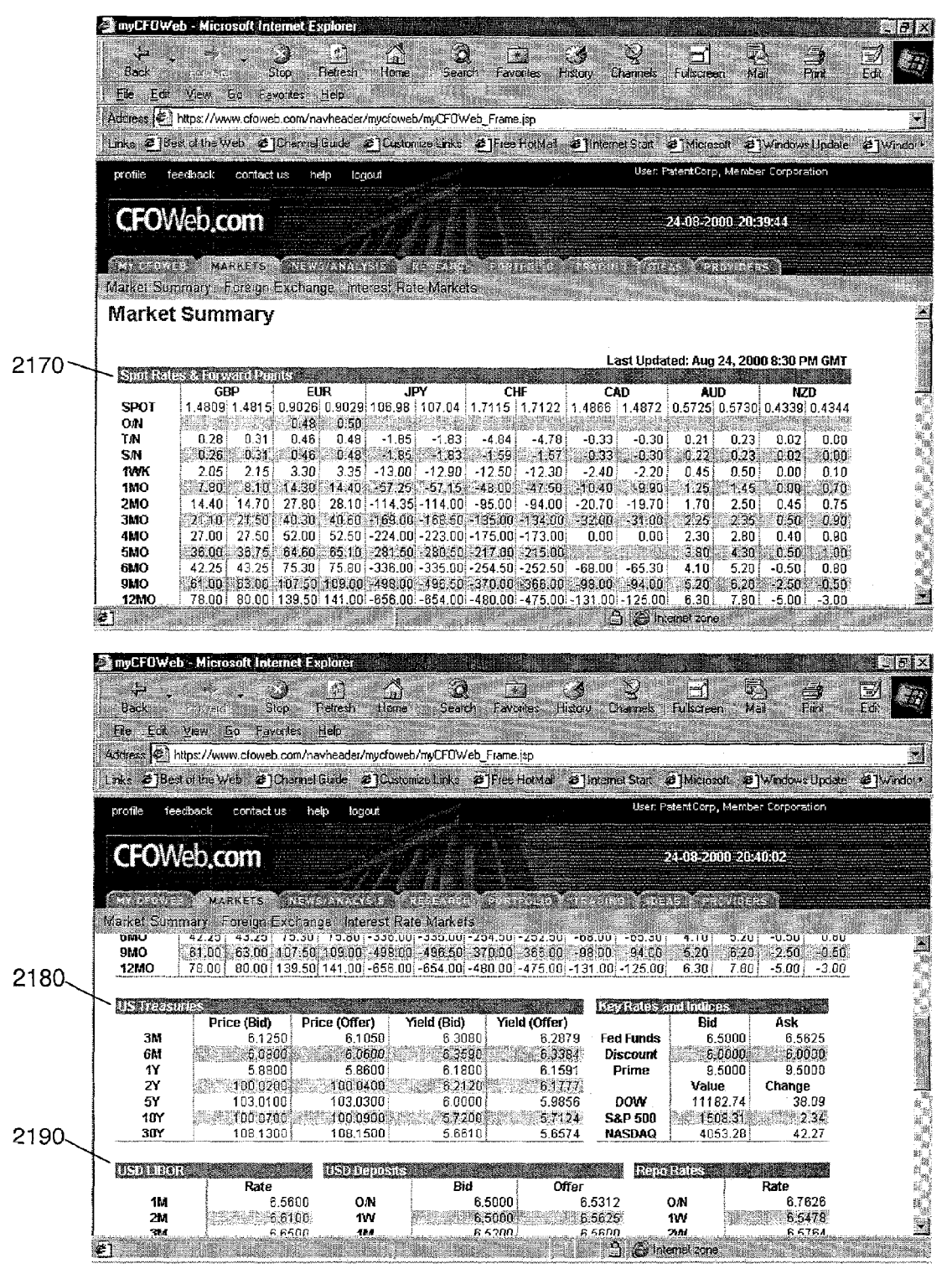
Figure 27A:
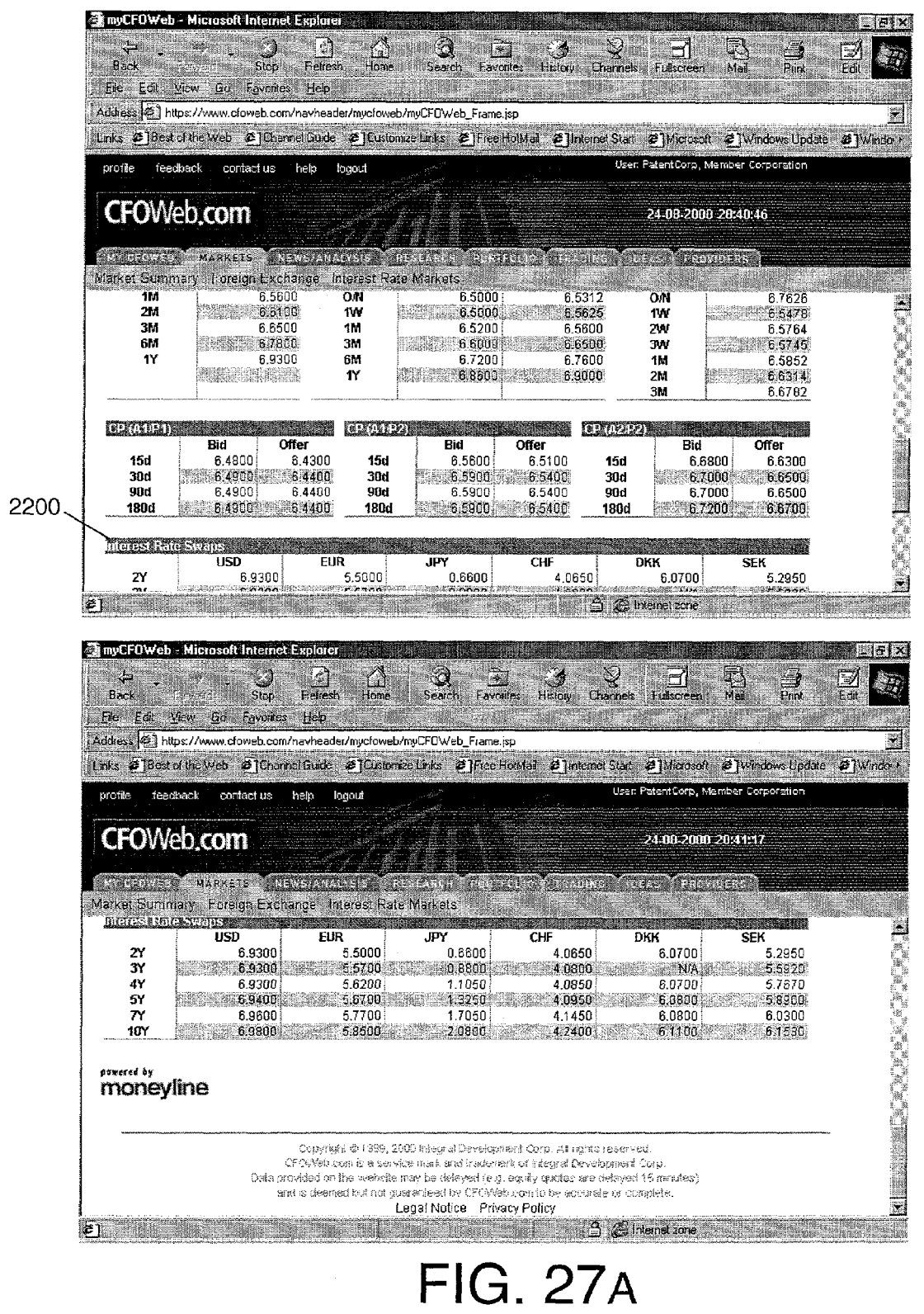

The present embodiment of the invention includes a series of interfaces that provide current market data to system users. Such data is periodically (at fixed intervals) refreshed by real-time market feeds to the system. These interfaces include the following:
"Market Summary" interface, shown in FIGS. 27-27A, provides an overview summary of key exchange rates, interest rates, treasury rates, and other indices.

Figure 28:
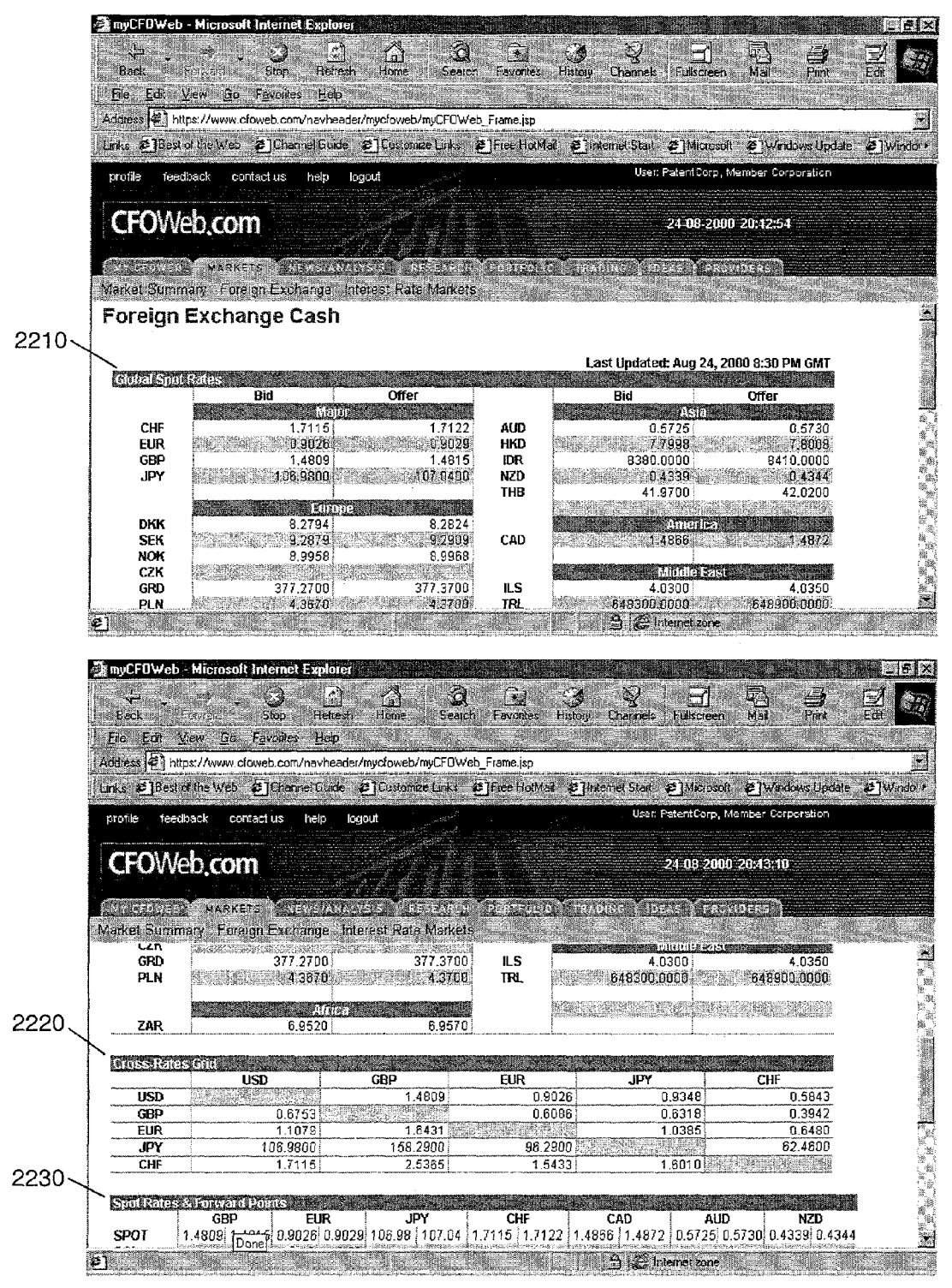

"Foreign Exchange Cash" interface, shown in FIGS. 28-28A, provides a summary of international currency exchange rates.

Figure 29A:
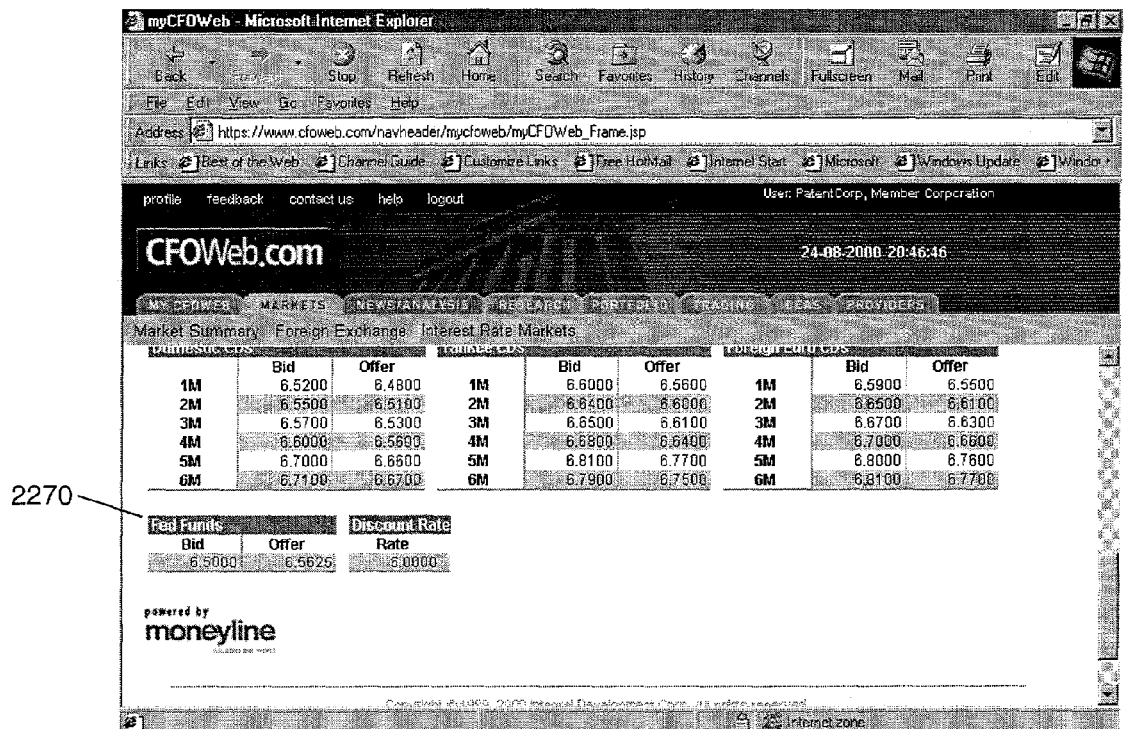

"Money" interface, shown in FIGS. 29-29A, provides a summary of international deposit and other lending rates.

Figure 30:
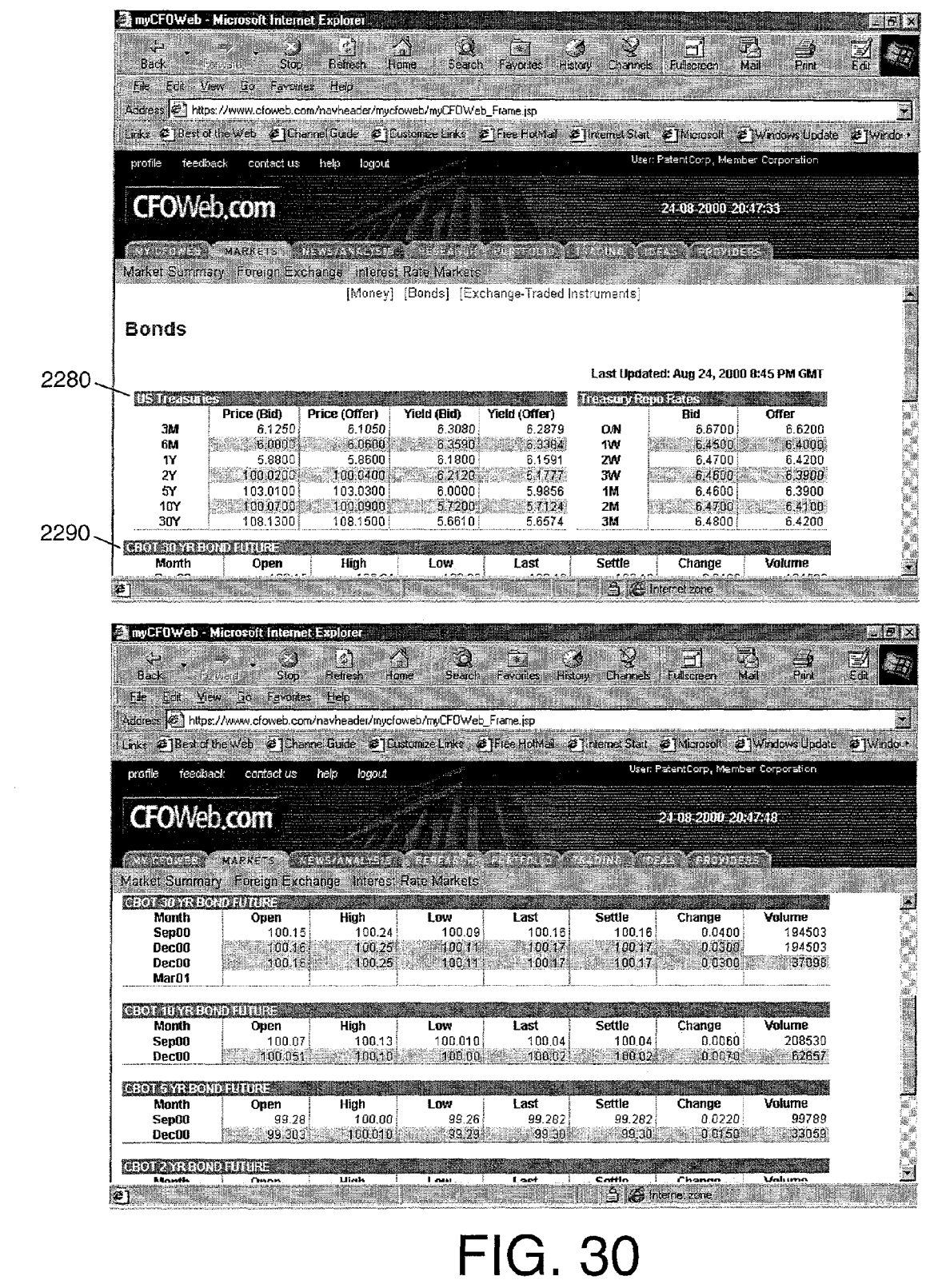
Figure 30A:
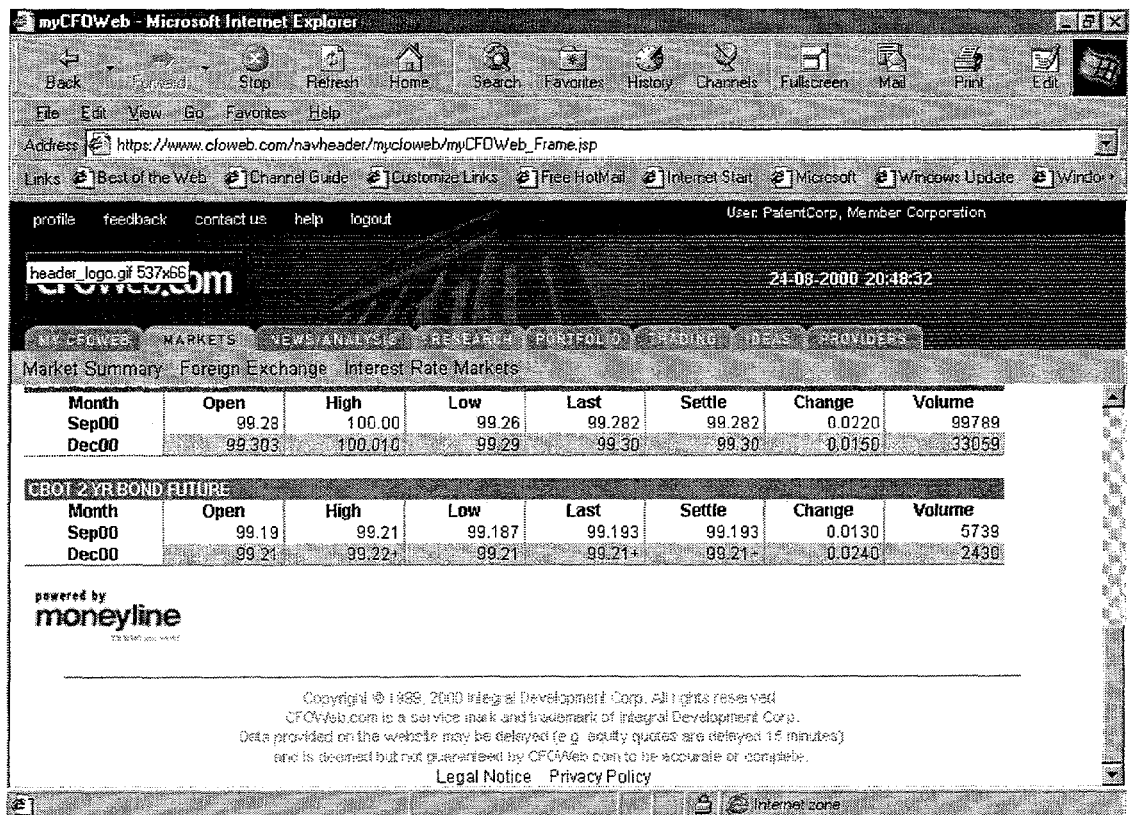

"Bonds" interface, shown in FIGS. 30-30A, provides a summary of international treasury and other bond rates.

Figure 31:
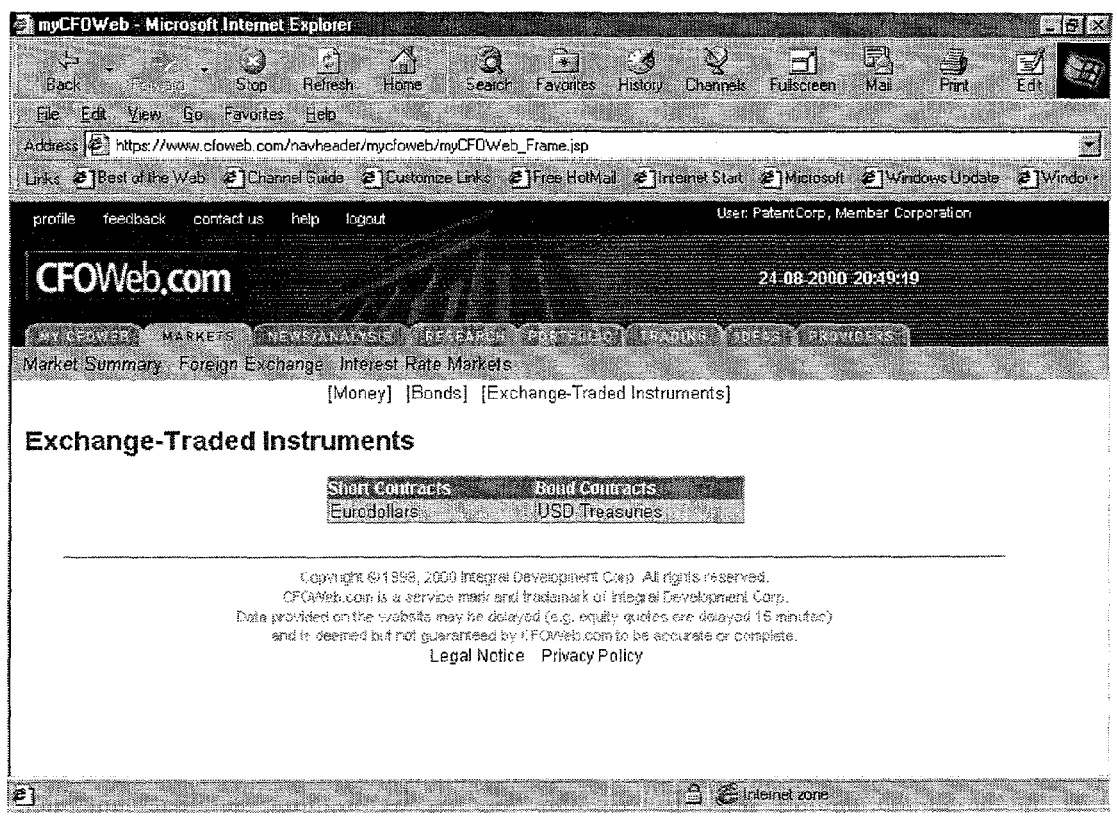
FIG. 31 shows a screen print of a user interface displaying a summary of exchange-traded instrument rates in an embodiment of the present invention.

"Exchange-traded Instruments" interface, shown in FIG. 31, provides a summary of international exchange-traded instrument (e.g., bond and short contracts).

The system may display certain portions of the market data in the form of graphical yield curves.

d. News and Financial Information

Figure 32:
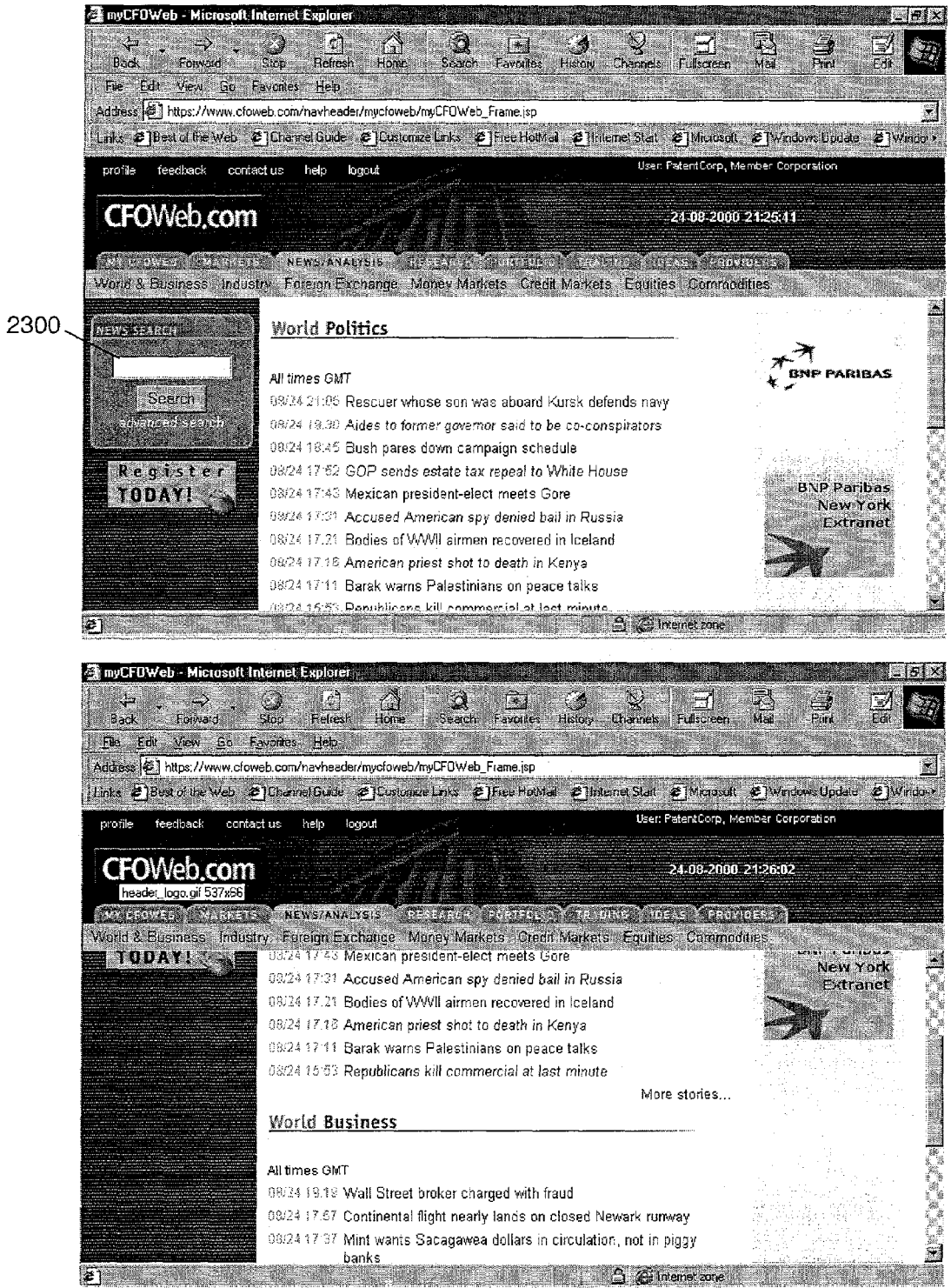
FIG. 32 shows a screen print of an interactive user interface for displaying and searching world news headlines in an embodiment of the present invention.

The present embodiment of the invention includes a series of interfaces that provide current news and financial information to system users. Such data is continually refreshed. The "World & Business" interface, illustrated by FIG. 32, displays current world and business news headlines. In addition, this interface and other news interfaces include a search function that enables a user to input a term in field 2300 and search for that term in the news by clicking the "Search" button.

The "Industry" news interface, illustrated by FIG. 33, displays the current news headlines for the particular industry (e.g., "Airlines") selected by the user in industry list 2310. The "World Business" news interface, illustrated by FIG. 34, displays the current international business news headlines.

Figure 35:
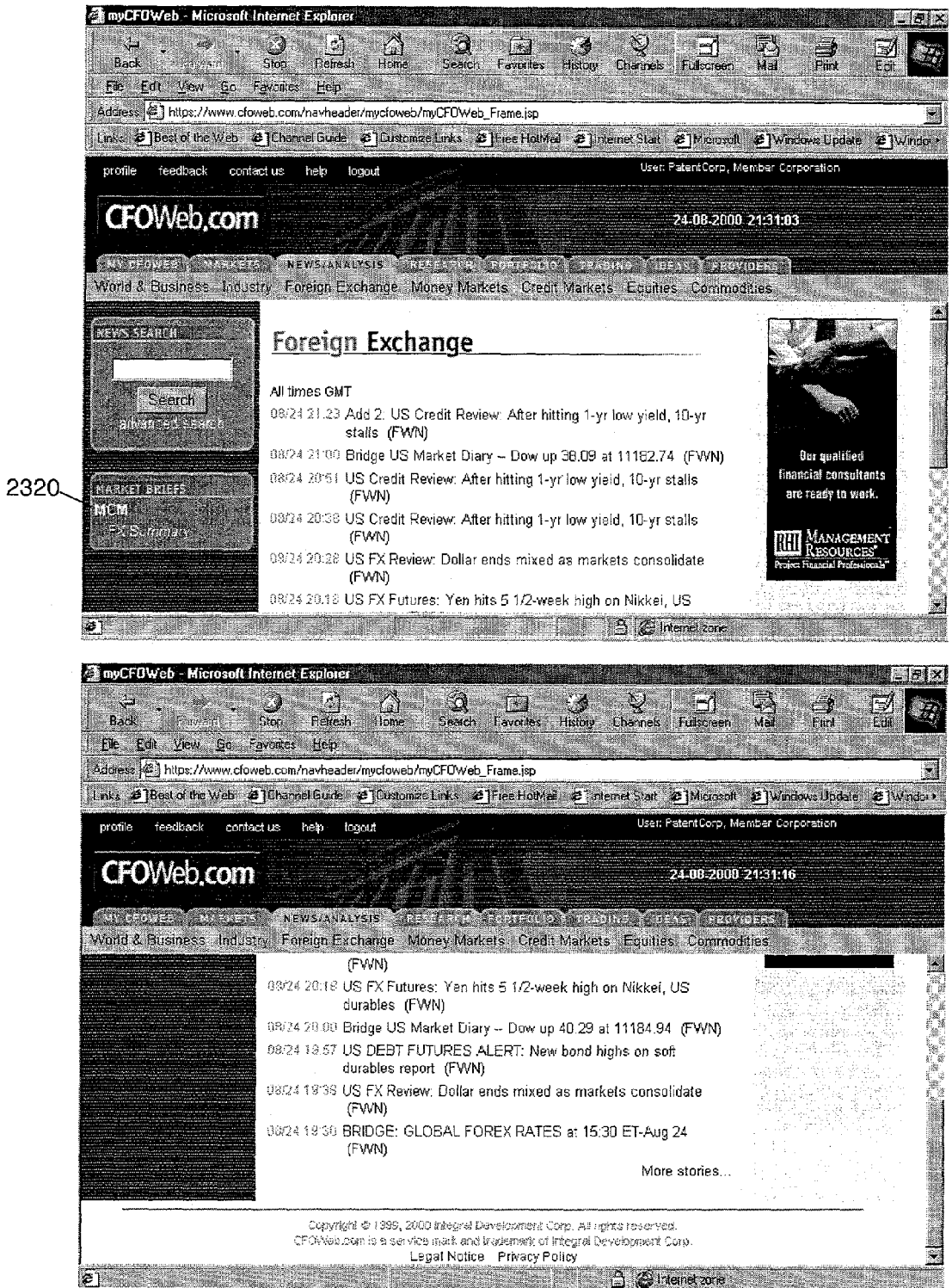
FIG. 35 shows a screen print of an interactive user interface for displaying and searching foreign exchange news headlines in an embodiment of the present invention.
Figure 36:
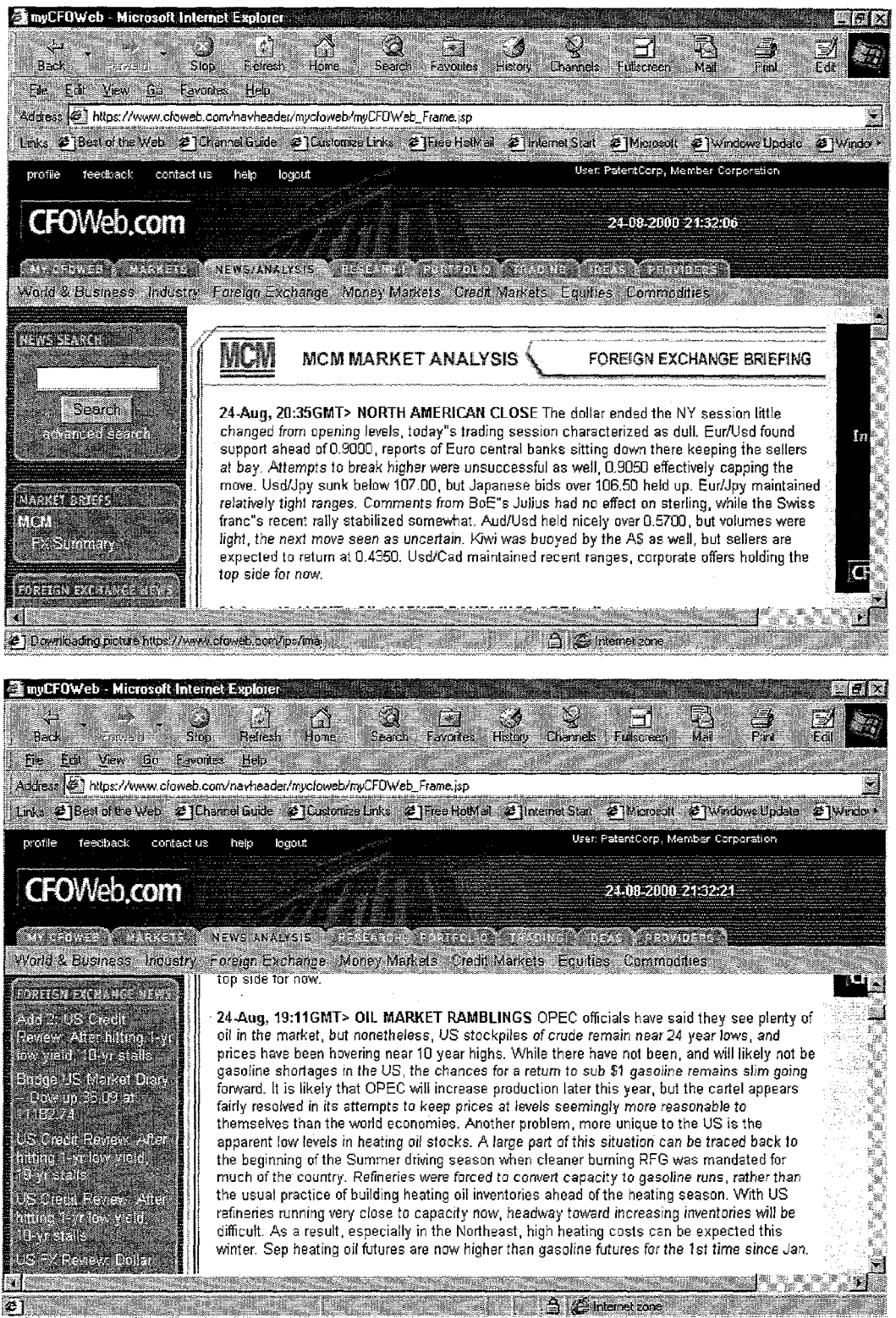
FIG. 36 shows a screen print of an interactive user interface for displaying foreign exchange market briefs in an embodiment of the present invention.

The "Foreign Exchange" news interface, illustrated by FIG. 35, displays the current news headlines relating to international exchange rates and markets. The interface also provides access to market briefs. For example, clicking "MCM" button 2320 will cause the system to display foreign exchange market analysis prepared by MCM, as shown in FIG. 36.

Figure 37:
FIG. 37 shows a screen print of an interactive user interface for displaying and searching money market news headlines in an embodiment of the present invention.
Figure 38:
FIG. 38 shows a screen print of an interactive user interface for displaying money market briefs in an embodiment of the present invention.
Figure 41:
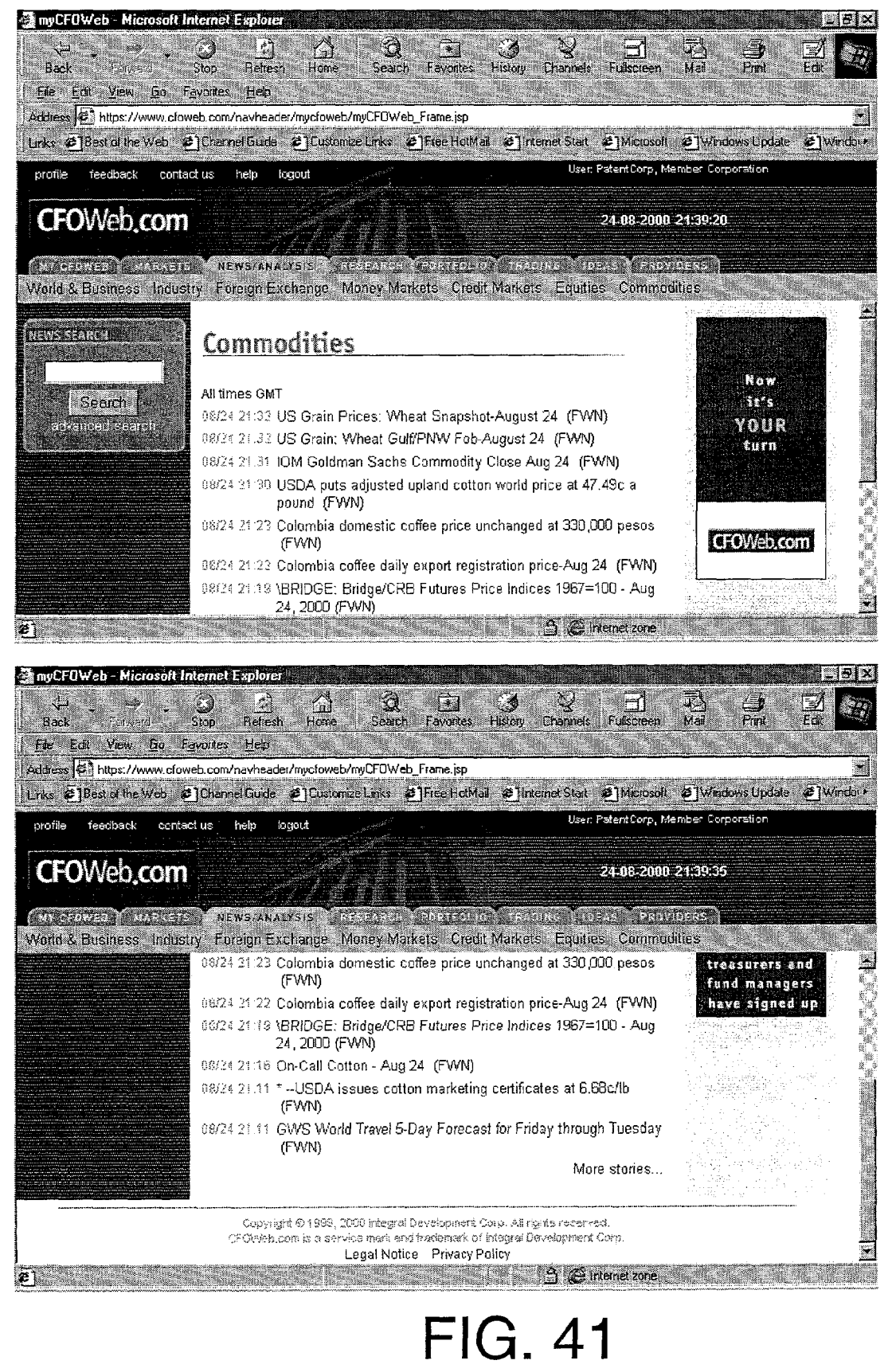

The "Money Markets" news interface, illustrated by FIG. 37, displays the current news headlines relating to international money markets. The interface also provides access to market briefs. For example, clicking "Briefing.com" button 2330 will cause the system to display interest rate analysis prepared by Briefing.com, as shown in FIG. 38. The "Credit Markets" news interface, illustrated by FIG. 39, displays the current news headlines relating to international credit markets and provides access to market briefs. The "Equities" news interface, illustrated by FIG. 40, displays the current news headlines relating to international equities markets and provides access to market briefs. Finally, the "Commodities" news interface, illustrated by FIG. 41, displays the current news headlines relating to international commodities markets and provides access to market briefs.

e. Research

Figure 22:
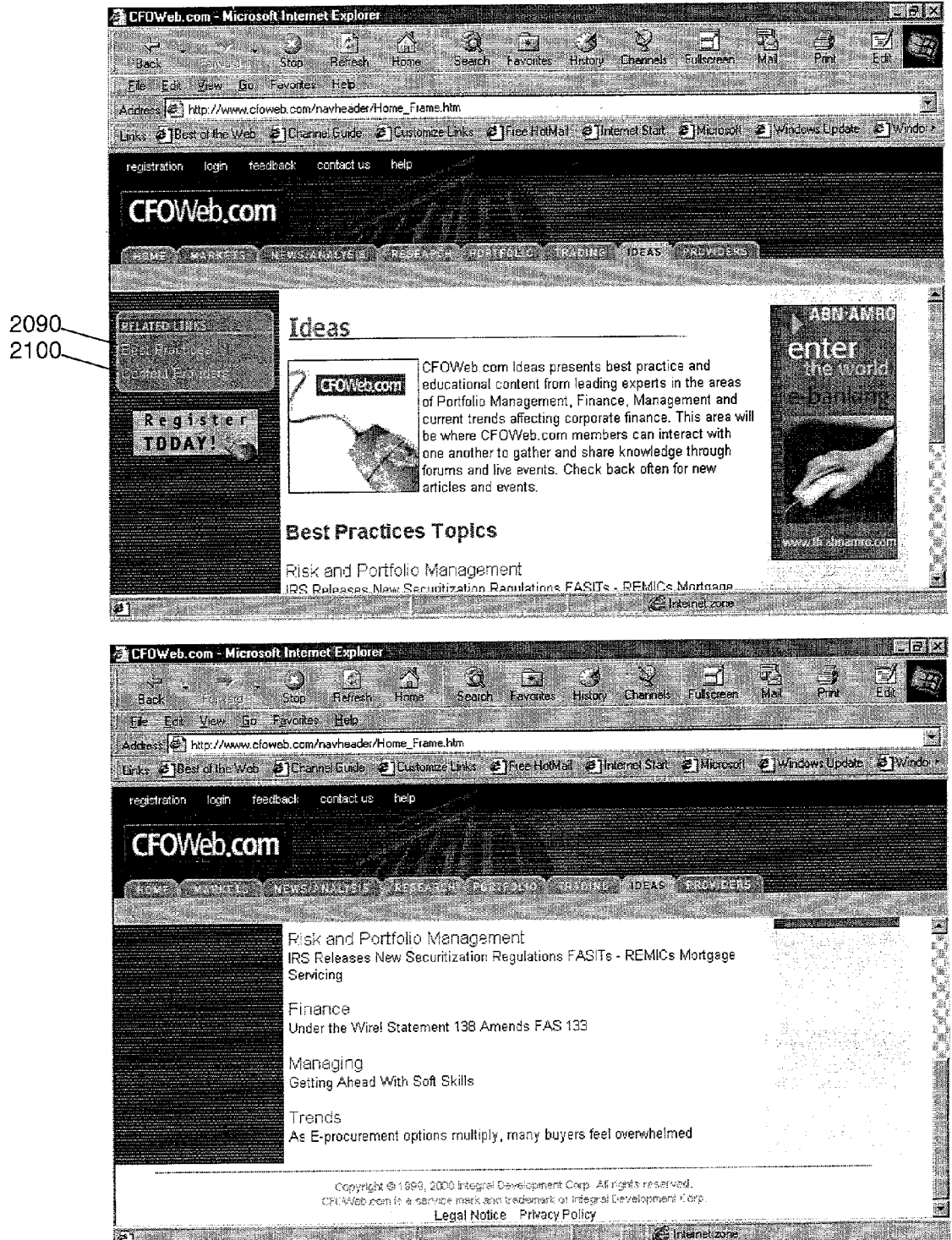
FIG. 22 shows a screen print of an interactive user interface for displaying content regarding corporate finance in an embodiment of the present invention.
Figure 23:
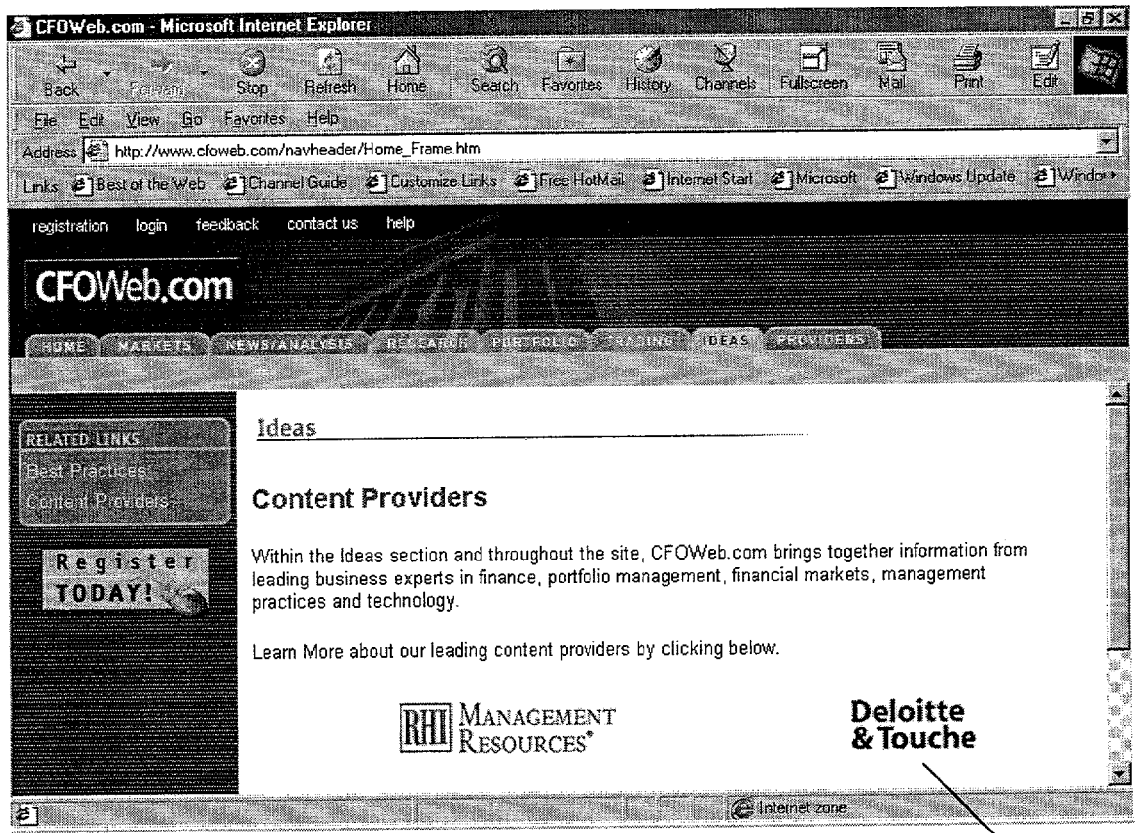
FIG. 23 shows a screen print of an interactive user interface for linking to providers of corporate finance content in an embodiment of the present invention.

The present embodiment of the invention includes a series of interfaces that provide relevant financial research content to system users. The "Ideas" interface, illustrated by FIG. 22, displays links to content and articles regarding international finance topics. The interface also includes links to "Best Practices" 2090 and "Content Providers" 2100. Clicking "Content Providers" button 2100 causes the system to display the "Content Providers" interface, illustrated by FIG. 23. This interface includes links to information regarding the providers of system content. For example, clicking link 2110 will cause the system to display information regarding content provider Deloitte & Touche.

Figure 43:
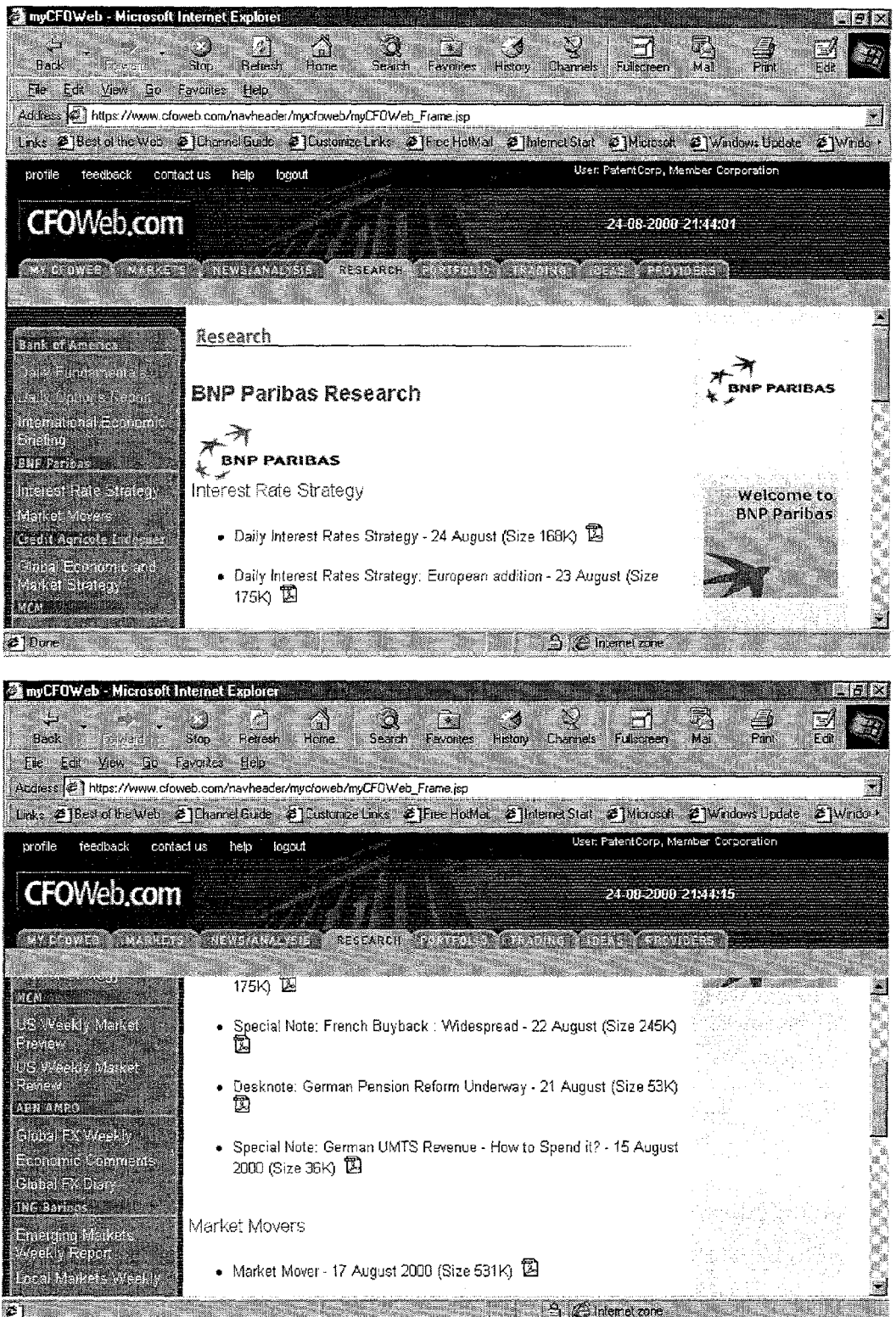
FIG. 43 shows a screen print of an interactive user interface for selecting for display research briefs from a particular provider of corporate finance content in an embodiment of the present invention.

The "Research" interface, illustrated by FIG. 42, displays a topic index to financial research and analysis briefs prepared by various content providers. The user can link to particular briefs or a listing of all briefs prepared by a content provider. For example, clicking "BNP Paribas" link 2340 or 2345 will cause the system to display the "BNP Paribas Research" interface illustrated in FIG. 43. This interface lists various research briefs prepared by BNP Paribas that can be downloaded by the user.

Figure 24:
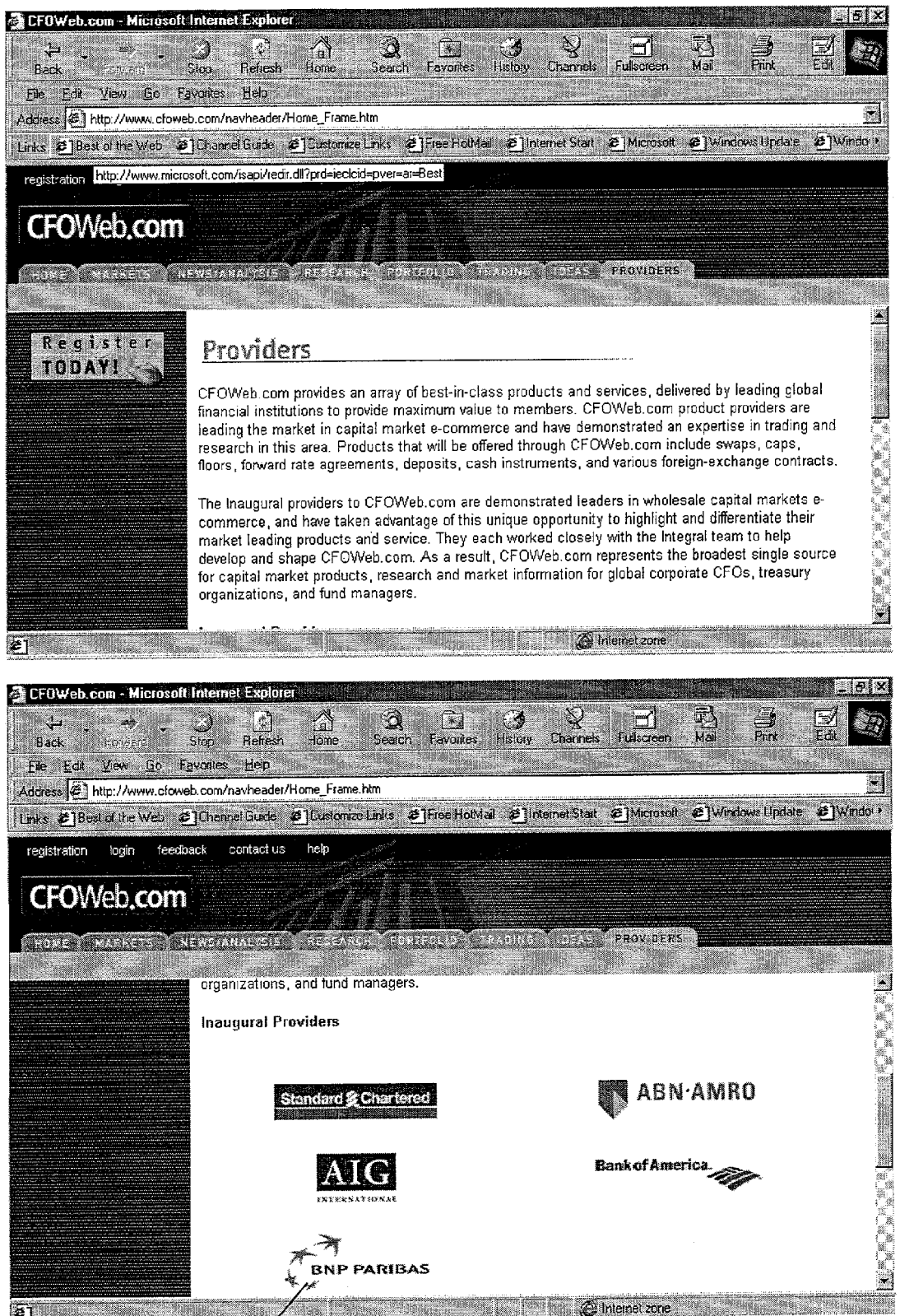
FIG. 24 shows a screen print of an interactive user interface for linking to the web sites of banks and financial institutions ("Providers") in an embodiment of the present invention.

The "Providers" interface, illustrated by FIG. 24, provides links to the web sites of certain Providers. These are the same Providers that engage in transactions with Members. For example, clicking "BNP Paribas" link 2120 will cause the system to link to BNP Paribas' web site.

f. Communication Among Users i. Chat

As described above, the present embodiment of the invention enables users (i.e., Members and Providers) to engage in chat communications regarding transaction requests and price quotes. The system supports such chat via chat server 120 (in FIG. 1). For example, the Member "Request Monitor: Current" interface, shown in FIG. 84, enables the Member to click on the "Chat" button to initiate chat with a Provider regarding a particular transaction request. In the present embodiment, upon initiation of the chat, the system will display a pop-up interface that displays the following:

- the system-assigned identification number of the subject transaction request
- a text-entry field
- the counterparty's e-mail address
- the Member's e-mail address
- the date and time the chat started As the chat takes place, the chat interface will also display the text sent by each party.

ii. Electronic Mail

The present embodiment of the invention also enables users (i.e., Members and Providers) to communicate with each other, as well as the system, via electronic mail. The system supports secure e-mail via e-mail server 140 (in FIG. 1). An e-mail message may include an XML document detailing the description of a transaction request; the recipient of such a message can examine the transaction description using a variety of XML tools. Such XML tools may have the capability to create the transaction and provide real-time pricing analytics from the e-mail message. The system may also send XML messages directly to users' back-end systems; such systems may include XML interpreters that receive and automatically process transaction requests.

D. Two-Way Pricing

The present embodiment of this invention includes a system that enables a corporate entity to request "two-way" pricing from banks using the system, i.e., the entity can request a price quote for both the purchase and sale of currency, without informing the banks in advance whether the entity will be buying or selling currency. Such two-way pricing is available for the various transaction types (e.g., FX Spot, FX Swap, Outright, etc. handled by the system as described herein).

FIG. 132 shows an example of a user interface that can be used by a corporate entity to request a two-way price quote from participant banks using an embodiment of this invention. Note that the same interface could be used to request a typical one-way price quote. The entity specifies the bank or banks that it would like to receive the request for price quote by setting indicator(s) 10300. The entity also inputs trade date 10305, buy currency 10310, sale currency 10315, and buy amount 10320 or sale amount 10325. The entity submits its request for price quote by clicking "Quote Two-Way" button 10335 (or "Quote One-Way" button 10330 for a typical one-way price quote request). Following receipt of a price quote, the two-way quote will be displayed on the same user interface, including bank name, bid and offer quotes, and a button for accepting the quote. Note that the requesting entity can only accept the quote for the "side" (i.e., buy or sell) that the entity initially indicated to the system that it wanted to deal in. In this way, the system enables the entity to receive a fair price quote from the banks, which do not know how the entity will ultimately trade, and also protects the banks from competing on price with the corporate entity. The interface also includes a button that the entity can click in order to withdraw the price quote request.

FIG. 133 shows an example of a user interface that can be used by a bank to submit a two-way price quote to a requesting corporate entity using an embodiment of this invention. Note that the same interface could be used to provide a typical one-way price quote. The bank will receive from the requesting entity the entity name and parameters of the requested price quote, including buy and sale currencies, buy and sale amounts, and trade and valuation dates; while the requesting entity inputs either buy or sale amount, the system will calculate the other (e.g., sale amount if requesting entity input buy amount) using a rate input daily by a system administrator and display both buy and sale amounts to the bank. The bank can use this interface to input the bid 10400 and offer 10405 rates for two-way pricing of a FX transaction. On the user interface shown in this example, the bid rate is "0.8922" and the offer rate is "0.8926". The user can manipulate these rates using the arrow buttons below the rate input fields: the single "up" and "down" buttons will move the number on that side of the quote up or down (e.g., single click of left-side up button will change bid rate suffix 22 to 23; single click of right-side down button will change offer rate suffix 26 to 25); the double "<<" and ">>" buttons will move the numbers on both sides of the quote up or down (e.g., single click of "<<" button will change bid rate suffix 22 to 21 and offer rate suffix 26 to 25; single click of ">>" button will change bid rate suffix 22 to 23 and offer rate suffix 26 to 27); the "< >" button will increase (i.e., widen) the spread between the bid and offer rates (e.g., single click of "<>" button will change bid rate suffix 22 to 21 and offer rate suffix 26 to 27); and the "><" button will decrease (i.e., tighten) the spread between the bid and offer rates (e.g., single click of "> <" button will change bid rate suffix 22 to 23 and offer rate suffix 26 to 25). Similar adjustments can be made to the input FX Swap rates 10410 and 10415. In some embodiments of this invention, this user interface can be connected to an automated rate feed that will automatically provide the bid and offer rates.

The user interface shown in FIG. 133 also includes buttons that enable the bank to refresh the bid/offer rates from an automatic feed (button 10420), withdraw a price quote (button 10425), decline a request for price quote (button 10430), and send a new or modified price quote to the requesting entity (button 10435).

E. Multi-Bank Pricing

The inventions described herein can be implemented to process transactions involving multiple bank users, for example, a bank-to-bank-to-bank-to-corporate user transaction. By way of example, as shown in FIG. 122, corporate user 9515 seeks a price quote for a particular currency-pair transaction from regional bank 9510 and sends Request for Quote 1. Unknown to corporate user 9515, upon receipt of Request for Quote 1, regional bank 9510 automatically generates and sends Request for Quote 2 to money centre bank 9505, using the same terms and parameters as Request for Quote 1. Note that regional bank 9510 can send Request for Quote 2 to more than one money centre bank in order to receive the best price quote from multiple money centre banks.

If money centre bank 9505 does not make a currency trading market in the particular currency pair of Request for Quote 2, money centre bank 9505, unknown to regional bank 9510, automatically generates and sends Request for Quote 3 to local bank 9500, using the same terms and parameters as Request for Quote 2. Note that money centre bank 9505 can send Request for Quote 3 to more than one local bank in order to receive the best price quote from multiple local banks.

If local bank 9500 makes a currency trading market in the particular currency pair of Request for Quote 3, local bank 9500 automatically generates and sends Price Quote A to money centre bank 9505, which represents the price at which local bank 9500 will deal with money centre bank 9505 for the requested currency-pair transaction. If local bank 9500 does not make a currency trading market in the particular currency pair of Request for Quote 3, local bank 9500, unknown to money centre bank 9505, automatically generates and sends a request for quote to one or more other banks (not shown), using the same terms and parameters as Request for Quote 3. This process could be repeated until the system located a bank that made a currency trading market in the particular currency pair of Request for Quote 3.

Upon receipt of Price Quote A from local bank 9500 (or if money centre bank 9505 makes a currency trading market in the particular currency of Request for Quote 2), money centre bank 9505 automatically generates and sends Price Quote B to regional bank 9510, which represents the price at which money centre bank 9505 will deal with regional bank 9510 for the requested currency-pair transaction. If money centre bank 9505 received Price Quote A from local bank 9500, Price Quote B would reflect the application of a spread function to the rate of Price Quote A.

Upon receipt of Price Quote B from money centre bank 9505, regional bank 9510 automatically generates and sends Price Quote C to corporate user 9515, which represents the price at which regional bank 9510 will deal with corporate user 9515 for the requested currency-pair transaction. Price Quote C would reflect the application of a spread function to the rate of Price Quote B.

Note that the number of (i) levels of banks (e.g., regional bank, money centre bank, local bank) (ii) and banks per level that participate in such a transaction can be greater or lesser than the example described above. Furthermore, the flow of a transaction need not follow the path illustrated by FIG. 122 but instead may pass through one or more of the bank levels in a different order or direction than shown.

F. Continuous Pricing Auction

The present embodiment of this invention includes a system that provides customized, continuous price quotes specific to a particular customer (e.g., corporate user) for certain financial products. The banks providing such price quotes compute the quotes based on information regarding the particular customer including, for example, the customer's transaction history or credit history with a particular bank. The system provides customers with continuously-available prices that enable a customer to select and accept a specific, "best" rate (buy or sell) for a specific financial product and execute a transaction for that product with a particular bank, without having to negotiate with the bank regarding the transaction. The system provides the quotes to a particular customer based on the customer's profile criteria, for example, particular types of financial products for which the customer chooses to receive price quotes, and particular banks from which the customer choose to receive such quotes.

FIG. 123 illustrates the workflow of the continuous pricing auction system with respect to a particular customer. First, participating banks (selected by the customer as providers from which the customer is willing to receive price quotes) submit offers to pricing server 9700. For example, in step 9705, Bank 1 submits an offer to sell US $1,000,000 at the rate of 0.8510 Euro (Quote 1). In step 9710, Bank 2 submits an offer to buy US $3,000,000 at the rate of 0.8512 Euro (Quote 2). In step 9715, Bank 3 submits an offer to sell US $2,000,000 at the rate of 0.8511 Euro (Quote 3). In step 9720, Bank 4 submits an offer to buy US $2,000,000 at the rate of 0.8511 Euro (Quote 4).

Pricing server 9700 distinguishes the offers to sell (Quotes 1 & 3) from the offers to buy (Quotes 2 & 4) and processes them separately. In step 9725, pricing server 9700 determines the best offer to sell by comparing Quote 1 with Quote 3. Upon determining the best offer to sell—Quote 1 in this example, as the Euro rate is lower—pricing server 9700 will perform a credit check on the bank that provided the best offer to sell—Bank 1—in order to determine whether the particular customer has a current credit relationship with that bank (step 9730) and that the daily notional amount of credit between the customer and the bank has not been exhausted. If such a credit relationship exists and is not exhausted, pricing server 9700 will display the best offer to sell (Quote 1) to the customer on an interactive display interface (step 9735); if not, pricing server 9700 will return to step 9725 in order to determine the next best offer to sell, and then perform a credit check on that offer.

Similarly, with respect to the offers to buy (Quotes 2 & 4), in step 9740, pricing server 9700 determines the best offer to buy by comparing Quote 2 with Quote 4. Upon determining the best offer to sell—Quote 2 in this example, as the Euro rate is higher—pricing server 9700 will perform a credit check on the bank that provided the best offer to buy—Bank 2—in order to determine whether the particular customer has a current credit relationship with that bank (step 9745). If such a credit relationship exists, pricing server 9700 will display the best offer to buy (Quote 2) to the customer on an interactive display interface (step 9750); if not, pricing server 9700 will return to step 9740 in order to determine the next best offer to sell, and then perform a credit check on that offer.

Once pricing server 9700 displays to the customer the respective best offers to buy and/or sell, the customer can select and execute a purchase and/or sale of currency up to the amounts specified by the offering bank(s). For example, if the customer selected to execute Quote 1, the customer could purchase up to US $6,000,000 from Bank 1 at the rate of 0.8510 Euro. If the customer elected to purchase only US $4,000,000 at that rate, the particular offer to sell would continued to be displayed, except the amount of currency for sale would be modified by pricing server 9700 in order to reflect the customer's purchase (i.e., US $2,000,000 instead of US $6,000,000); if the customer elected to purchase the entire amount of currency offered for sale, pricing server 9700 would remove the offer to sell from the customer's display interface. The best offer to buy would be processed in the same manner.

Pricing server 9700 will display each of the best offers to the customer until one of three events occurs: (1) the offering bank withdraws the particular offer or it automatically expires; (2) the entire amount of currency offered for purchase or sale is exhausted, whether in one or multiple transactions; or (3) pricing server 9700 receives a new offer and determines that it is the "best offer" and removes the current "best offer" from that display position. Note that in certain embodiments of this invention, the customer could choose to have more than one best offer displayed for each type of transaction (e.g., purchase or sale of currency), in which case pricing server 9700 would perform the best offer determinations and credit checks accordingly.

G. "Best Price" Rules

In an embodiment of the present invention, the system includes a method and mechanism for enabling an entity requesting a price quote to define the "best price" rules used to highlight the price quotes displayed to the entity when quotes are returned from banks in response to a request for price quote. The rules that can be defined using the system include: highest bid/lowest offer, tightest spread of bid/offer, fastest initial price, fastest current price, and specified bank.

The entity can define such rules using the "Best Price Rules" preference user interface, as shown in FIG. 131. Using that interface, the entity can define the best price criteria (e.g., "Highest bid and lowest offer", "Tightest bid/offer spread", "Selected bank") and specify the rank for application of each definition by clicking on the appropriate indicator (e.g., "First" 10200, "Second" 10205, "Third" 10210). The system will apply the entity's ranked definitions in order to display the best price as price quotes are returned from banks. In the case of a tie between price quotes under the "first" definition, the system will use the "second" and "third" definitions to break the tie and determine the best price. If the price quotes are still tied under all three definitions, the system will choose the best price based on alphabetical order of the banks' names. Note that in different embodiments of this invention, the number of definition levels could be lower or higher, the "best price" criteria could be different, and the "tie-breaking" rules could be different.

With respect to the highest bid/lowest offer rule, the "best price" is defined as either the highest bid or the lowest offer, depending on whether the entity is looking to sell or buy the base currency in the requested currency pair. When the entity is looking to buy the base currency, the "best price" will be the lowest offer quoted by a bank; conversely, when the entity is looking to sell the base currency, the "best price" will be the highest bid quoted by a bank.

With respect to the tightest bid/offer spread rule, the "best price" is defined as the set of price quotes with the narrowest bid-offer spread.

With respect to the fastest initial price rule, the "best price" is defined as the first price quote made most quickly in response to the request for quote. As a bank may change or refresh its price while the corporate entity is waiting for other banks to respond, the "best price" definition under this scenario will still take the first price quote made most quickly as the best price, even if an equivalent price was actually a subsequent change to a price quote. As the quotes on the screen are listed in the order in which the initial quotes are made, the "best price" will thus be the first line of the price quote for the particular transaction.

With respect to the fastest current price rule, the "best price" is defined as the fastest submitted price quote among all the available price quotes. Once there are updates made to the quotes, the amended quotes will be moved to the end of the displayed queue. If this happens to the current "best price", the next-in-line quote will then be used as the current "best price".

With respect to the specified bank rule, the "best price" is defined as the price quote being submitted by the specified bank identified by the corporate entity on its preference user interface. This selection will not be considered for the particular request if the bank selected on the preference interface is not included on the list of banks to which the request for price quote is being sent.

H. Additional Features

In addition to the features described herein, embodiments of this invention may include further features integrated into the system.

1. Price Improvement

In certain embodiments of this invention, as described above, (i) users (e.g., Members) submit transaction requests that are aggregated and displayed to one or more other users (e.g., Providers) and (ii) one or more of the recipient users (i.e., Providers) submit responsive price quotes that are aggregated and displayed to the requesting user (i.e., Member). The participating users negotiate with each other regarding such transaction requests and quotes via the system-supported chat, instant messaging, e-mail communications, and text included with the requests and quotes, or other traditional means such as telephone or Internet-wide e-mail.

Price "improvement" occurs when a price quote changes or "improves" for certain trading partners, either publicly or confidentially, using automated software routines or manual intervention. Price improvement may occur on the basis of existing relationships between certain users (e.g., a particular Member always receives a discount from a Provider), transaction type (e.g., "FX Spot"), transaction size (e.g., volume discount), credit ratings of potential partners, industry of potential partners, or other trading policies or parameters.

2. Automated Trading Policies

In certain embodiments of this invention, Providers can execute custom, user-defined trading policy templates or utilize system-defined buying pattern templates (or a mix of user-defined and system-defined templates) that will automatically modify price quotes according to the parameters detected. Similarly, in certain embodiments, Members can execute custom, user-defined trading policy templates or utilize system-defined buying pattern templates (or a mix of user-defined and system-defined templates) that will automatically respond to price quotes by modifying them and submitting such modifications to the quoting Providers, according to the parameters detected. Automated trading policies (or templates) can also be implemented to conduct block transactions. Such automated policies may include:

breaking a transaction into smaller volume pieces that will not affect the price quote distributing pieces of a transaction among multiple trading partners distributing pieces of a transaction among multiple transaction types breaking a transaction into pieces over multiple time increments 3. Price Push In certain embodiments of this invention, Providers or other users may "push" tradable price quotes to an aggregated, real-time display for review by potential trading partners (i.e., Members). The "tradable" quotes submitted by Providers are at price levels at which the Providers are willing to execute transactions, though the prices may be "improved" or negotiated down. Such quotes may be targeted to and customized for certain trading partners and enable potential trading partners to view transaction price quotes before submitting requests for price quotes. The "pushing" users may include individual banks and financial institutions, as well as consortiums of multiple banks and financial institutions. The aggregated display of tradable quotes, which may be in the form of a product matrix (including product (e.g., FX Spot), price or rate, currency, Provider, transaction limits, expiration date/time), may also include a filter to display only the "best" price for a particular type of financial transaction. The tradable price quotes are determined by sending a market data message through a set of workflow rules, which may consider transaction type, notional amount, date and time, and/or category and credit rating of the potential trading partners.

Upon review of such price quotes in the aggregated, real-time display, recipient trading partners may: (i) accept a quote, as is, and execute a transaction; (ii) accept an "improved" quote and execute a transaction; or (iii) communicate with the "pushing" user and negotiate the price down. Quote acceptance occurs when a trading partner "hits" a price at an acceptable level, either (1) manually by clicking on the quote in the display and triggering acceptance, verification, and settlement with the pushing user, or (2) automatically via a software routine (or "robot") programmed to accept quotes at a certain level.

4. Multi-Party Transactions

Embodiments of this invention can support multi-party transactions. In such a transaction, a user (i.e., Member) structures the transaction so that it is divided among more than one other parties (i.e., Providers). Each of those other parties will provide a portion of the traded asset, in an amount determined by the user's structured transaction. For example, a Member may seek an exchange of 1 Million Euro for U.S. Dollars where one Provider will exchange a certain amount of U.S. Dollars for 400 Thousand Euro and the other Provider will exchange a certain amount of U.S. Dollars for 600 Thousand Euro. The system enables the user to accept multiple price quotes for the transaction with one acceptance and it displays such acceptance on the various display monitors, in the same way that a single party transaction is displayed. In other embodiments, the system enables the user to accept multiple price quotes for the same transaction with multiple acceptances.

5. User Alerts

Embodiments of this invention include automated alerts whereby the system providers a user with customized notifications or "alerts" based on the particular user's portfolio, trading activity, or profile information. Such alerts may be in the form of e-mail messages or auto-refreshing pop-up windows that are displayed while a user is engaged with the system. Alerts may be sent to notify users of events, including without limitation: a new transaction request or price quote; a change in an interest, market, or foreign exchange rate or equity price; an upcoming event relating to the user's portal, e.g., payment due date, option date; or an upcoming economic event.

6. Aggregation of Pricing Orders

Embodiments of this invention include functionality that enables Providers, such as individual banks and financial institutions, to automatically aggregate or net buy and sell orders from requesting users (e.g., Members) for execution, in order to eliminate the step of having such orders transmitted to the Provider's trading desk for execution. For example, for a particular foreign exchange transaction, a Provider may offer at a particular moment in time a "bid" (i.e., buy) price of $34 and an "ask" (i.e., sell) price of $36, which produces a "spread" of $2 ($36-$34). Typically, the Provider will pass that spread on to its trading desk which, in order to make a profit, will increase the spread by $1 on each side: i.e., bid price=$33, ask price=$37, spread=$4. The trading desk will, in turn, pass the spread on to individual salespersons who, in order to make a profit, will increase the spread when they offer the foreign exchange transaction to customers. The offers may also vary by customer, based on factors that may include creditworthiness, relationship with the Provider, and industry. Thus, in this example, a salesperson may offer a bid price of $31 and an ask price of $39 (spread=$8) to a particular customer, but on average will offer a bid price of $32 and an ask price of $38 (average spread=$6). The trading desk will pass the spread offer to the salesperson with for a set duration of time (e.g., 10 seconds) during which the trading desk will honor the offer, even though the market prices for the transaction continue to move. The salesperson will accept orders from customers based on the offer and submit each order separately to the trading desk (less the salesperson's profit included in the offer spread) for execution.

Using the functionality included in embodiments of this invention, during the time period (e.g., 10 seconds) during which the trading desk will honor the offer to the salesperson, the system will automatically aggregate the customers' orders to buy and sell based on the trading desk offer and transmit the net difference to the trading desk for execution. The opportunity to net the trades will occur where different customers have accepted offsetting offer prices but where the offer duration (e.g., 10 seconds) for the first accepting customer has not yet expired. This functionality will eliminate overhead salesforce costs in that most orders will be aggregated without requiring separate execution of trades by the trading desk.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. One skilled in the art will readily appreciate that other applications may be substituted for those set forth herein without departing from the spirit and scope of the present invention. Accordingly, the invention should only be limited by the claims included below.

The invention claimed is:

1. An online system for facilitating financial transactions involving the exchange of financial instruments, the online system comprising:
   a connect processor to facilitate the exchange of messages between a member and a provider, including trans action messages that contain information and data regarding transactions between the member and the provider, wherein the connect processor is configured to convert XML documents to/from Java objects; and
   a web server in communication with the connect processor and operable to enable the member to engage in a trans action with one or more providers, the web server operable to generate:
      an interactive interface that enables the member to generate the details of a request for price quote and communicate such request for price quote to the one or more providers;
      an interactive interface that enables the provider to generate and modify the details of price quotes and communicate such price quotes to the one or more members, and wherein the request for price quote generated by the member includes a request for both purchase and sale price quote;
      an interactive interface that enables the member to view price quotes received from the one or more providers; and
      an interactive interface that enables the member to accept price quotes received from the one or more providers, generate transaction terms related to each price quote, and communicate the transaction terms and acceptances to the one or more providers, wherein the transaction terms are generated as Java objects and communicated as XML documents.

2. The system of claim 1, wherein a price quote generated by the provider includes both purchase and sale price quotes.

3. The system of claim 1, wherein the transaction comprises one of a Foreign Exchange Spot, a Foreign Exchange Forward, or an Interest Rate Swap.

4. An online system for facilitating financial transactions involving the exchange of financial instruments, the online system comprising:
   a connect processor to facilitate the exchange of messages among member and provider systems, including transaction messages that contain information and data regarding transactions between members and providers, wherein the connect processor is configured to convert XML documents to/from Java objects; and
   a web server in communication with the connect processor and operable to enable a buyer to engage in a transaction with one or more sellers the web server operable to generate:
      an interactive interface that enables providers to generate the details of price quotes for both purchase and sale transactions and communicate such price quotes to a pricing engine wherein the pricing engine determines the purchase and sale price quotes to be displayed to the member, based on pre-selected pricing criteria associated with each member of the one or more members, and communicates such price quotes to the member;
      an interactive interface that enables the member to view the purchase and sale price quotes received from the pricing engine; and
      an interactive interface that enables the member to accept price quotes received from one or more providers, generate transaction terms related to each price quote, and communicate the transaction terms and acceptances to the providers, wherein the transaction terms are generated as Java objects and communicated as XML documents.

5. The system of claim 4, wherein the pricing criteria selected by the member includes one or more of the following categories:
   (a) the type of transaction of the price quote;
   (b) the currency of the price quote;
   (c) the interest rate or exchange rate of the price quote;
   (d) the notional amount of the price quote;
   (e) the name of the provider that provided the price quote; and
   (f) the member's credit relationship with the provider that provided the price quote.

6. The system of claim 4, wherein the transaction comprises one of a Foreign Exchange Spot, a Foreign Exchange Forward, or an Interest Rate Swap.

7. An online system for facilitating financial transactions involving the exchange of financial instruments, the online system comprising:
   a connect processor to facilitate the exchange of messages between a member and a provider, including trans action messages that contain information and data regarding transactions between members and providers, wherein the connect processor is configured to convert XML documents to/from Java objects; and
   a web server that enables a member to engage in a transaction with one or more providers, the web server including:
      (1) an interactive interface that enables the provider to generate and modify the details of price quotes and communicate such price quotes to the one or more members, and wherein a price quote generated by a provider includes both purchase and sale price quotes;
      (2) an interactive interface that enables the member to view price quotes received from the one or more providers; and (3) an interactive interface that enables the member to accept price quotes received from the one or more providers, generate transaction terms related to each price quote, and communicate the transaction terms and acceptances to the one or more providers, wherein the transaction terms are generated as Java objects and communicated as XML documents.

8. The system of claim 7, wherein the web server also includes a mechanism that aggregates the acceptances of the one or more members and communicates the net difference of the orders to at least one of the one or more providers for processing.

9. The system of claim 7, wherein the transaction comprises one of a Foreign Exchange Spot, a Foreign Exchange Forward, or an Interest Rate Swap.

10. A web server system for facilitating financial transactions, the web server system comprising:
 a reporting server operable for:
  monitoring one or more financial transactions between one or more provider systems and one or more member systems; and
  obtaining information associated with the one or more financial transactions;
 and
 one or more databases operable for storing the information associated with the one or more financial transactions, and wherein the information associated with the one or more financial transactions comprises pre-transactions data, transaction data, and post transaction data.

11. The web server of claim 10, wherein the information associated with the one or more financial transactions comprises at least one of:
 an identifier for the server system;
 an identifier for the at least one of the one or more member systems;
 an identifier for the at least one of the one or more provider systems; or
 an identifier for each of the one or more financial transactions.

12. The web server of claim 11, wherein each identifier is globally unique.

13. The web server of claim 10, wherein the information associated with the one or more financial transactions is searchable based on one or more criteria from the group consisting of:
 an identifier for the at least one of the one or more member systems;
 an identifier for the at least one of the one or more provider systems; or
 an identifier for each of the one or more financial transactions.

14. The web server of claim 10, wherein the web server further comprising an analysis server operable for analyzing at least a portion of the information associated with the one or more financial transactions to determine and flag off-norm transactions.

15. The web server of claim 14, wherein the analysis server is further operable for conduct real-time monitoring of at least a portion of the obtained information associated with the one or more financial transactions.

16. The web server of claim 10, wherein the web server further comprising a reporting server operable for disclosing at least a portion of the stored information associated with the one or more financial transactions.

17. The web server of claim 16, wherein the disclosing further comprises disclosures to at least one of:
 the one or more provider systems;
 the one or more member systems; or
 a third party.

18. The web server of claim 10, wherein the one or more member systems and the one or more provider systems are designated as counterparties.

* * * * *